(12) United States Patent
Eckhoff et al.

(10) Patent No.: US 8,712,110 B2
(45) Date of Patent: Apr. 29, 2014

(54) IDENTIFYING A CHARACTERISTIC OF AN INDIVIDUAL UTILIZING FACIAL RECOGNITION AND PROVIDING A DISPLAY FOR THE INDIVIDUAL

(75) Inventors: Philip A. Eckhoff, Bellevue, WA (US); William Gates, Redmond, WA (US); Peter L. Hagelstein, Carlisle, MA (US); Roderick A. Hyde, Redmond, WA (US); Muriel Y. Ishikawa, Livermore, CA (US); Jordin T. Kare, Seattle, WA (US); Robert Langer, Newton, MA (US); Eric C. Leuthardt, St. Louis, MO (US); Erez Lieberman, Cambridge, MA (US); Nathan P. Myhrvold, Bellevue, WA (US); Michael Schnall-Levin, Cambridge, MA (US); Clarence T. Tegreene, Bellevue, WA (US); Lowell L. Wood, Jr., Bellevue, WA (US)

(73) Assignee: The Invention Science Fund I, LC, Bellevue, WA (US)

( * ) Notice: Subject to any disclaimer, the term of this patent is extended or adjusted under 35 U.S.C. 154(b) by 587 days.

(21) Appl. No.: 12/655,179

(22) Filed: Dec. 23, 2009

(65) Prior Publication Data
US 2011/0150294 A1 Jun. 23, 2011

(51) Int. Cl.
*G06K 9/00* (2006.01)

(52) U.S. Cl.
USPC ............... 382/118; 382/128; 345/1.3; 345/2; 345/7; 345/173; 725/27; 725/28; 725/29; 725/30; 725/31

(58) Field of Classification Search
CPC .......... G06K 9/00228; G06K 9/00221; G06K 9/00288
USPC ........ 382/128; 725/27–31, 14, 20, 34, 35, 46, 725/12, 25; 345/1.3, 2, 7, 173
See application file for complete search history.

(56) References Cited

U.S. PATENT DOCUMENTS

| | | | |
|---|---|---|---|
| 6,504,942 B1 | 1/2003 | Hong et al. |
| 6,633,655 B1 | 10/2003 | Hong et al. |
| 6,708,176 B2 | 3/2004 | Strunk et al. |
| 6,819,783 B2 | 11/2004 | Goldberg et al. |
| 6,819,796 B2 | 11/2004 | Hong et al. |
| 6,831,678 B1 | 12/2004 | Travis |

(Continued)

OTHER PUBLICATIONS

"Ultra-Directional Audio Technology", Audio Spotlight—Add Sound and preserve the quiet webpage, http://www.holosonics.com/?g&gclid=CJnRgoDT55sCFQ_xDAodfWf44w; reprinted Mar. 23, 2010, 2 pages; Holosonics.

(Continued)

*Primary Examiner* — Ruiping Li
(74) *Attorney, Agent, or Firm* — Suiter Swantz pc llo

(57) ABSTRACT

A method may include automatically remotely identifying at least one characteristic of an individual via facial recognition; and providing a display for the individual, the display having a content at least partially based on the identified at least one characteristic of the individual. A system may include a facial recognition module configured for automatically remotely identifying at least one characteristic of an individual via facial recognition; and a display module coupled with the facial recognition module, the display module configured for providing a display for the individual, the display having a content at least partially based on the identified at least one characteristic of the individual.

40 Claims, 325 Drawing Sheets

(56) References Cited

U.S. PATENT DOCUMENTS

| | | |
|---|---|---|
| 6,996,460 B1 | 2/2006 | Krahnstoever et al. |
| 7,003,530 B2 | 2/2006 | Johnson |
| 7,134,130 B1 | 11/2006 | Thomas |
| 7,225,414 B1 | 5/2007 | Sharma et al. |
| 7,286,112 B2 | 10/2007 | Kinjo |
| 7,305,108 B2 | 12/2007 | Waehner et al. |
| 7,369,100 B2 | 5/2008 | Zacks et al. |
| 7,634,662 B2 | 12/2009 | Monroe |
| 7,636,456 B2 | 12/2009 | Collins et al. |
| 7,643,658 B2 | 1/2010 | Kilner et al. |
| 7,676,150 B2 | 3/2010 | Nakashima |
| 7,742,951 B2 | 6/2010 | Ebrom et al. |
| 7,921,036 B1 * | 4/2011 | Sharma et al. ............. 705/14.66 |
| 7,930,204 B1 | 4/2011 | Sharma et al. |
| 7,987,111 B1 | 7/2011 | Sharma et al. |
| 8,031,891 B2 | 10/2011 | Ball et al. |
| 8,081,158 B2 | 12/2011 | Harris |
| 8,299,889 B2 | 10/2012 | Kumar et al. |
| 2003/0061607 A1 | 3/2003 | Hunter et al. |
| 2005/0175218 A1 | 8/2005 | Vertegaal et al. |
| 2005/0195330 A1 | 9/2005 | Zacks et al. |
| 2007/0013624 A1 | 1/2007 | Bourhill |
| 2007/0060390 A1 | 3/2007 | Wells |
| 2007/0282682 A1 | 12/2007 | Dietz et al. |
| 2008/0004950 A1 * | 1/2008 | Huang et al. .................... 705/14 |
| 2008/0004953 A1 * | 1/2008 | Ma et al. ......................... 705/14 |
| 2008/0040277 A1 | 2/2008 | DeWitt |
| 2008/0059282 A1 * | 3/2008 | Vallier et al. .................... 705/10 |
| 2008/0249793 A1 | 10/2008 | Angell et al. |
| 2010/0023400 A1 * | 1/2010 | DeWitt ....................... 705/14.53 |

OTHER PUBLICATIONS

"In Bid to Sway Sales, Cameras Track Shoppers"; NY Times.com, Mar. 19, 2010, 3 pages.

PCT International Search Report; International App. No. PCT/US2012/000043; May 29, 2012; pp. 1-2.

* cited by examiner

62 Action of an Individual

- 64 Gaze Orientation
- 66 Gesture
- 68 Audio Sound
- 70 Vocal Sound
- 72 Motion of a Body Part
- 74 Orientation of a Body Part

FIG. 1C

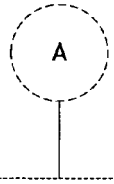

```
1520
selecting at least one of the first content for the first individual or the second
content for the second individual at least partially based on the identity of the
at least one of the relative, the friend, or the associate of the at least one of
the first individual or the second individual 1522
    selecting at least one of the first content for the first individual or the
    second content for the second individual at least partially based on a
    known characteristic of the at least one of the relative, the friend, or the
    associate of the at least one of the first individual or the second
    individual.

1524
        selecting at least one of the first content for the first individual or
        the second content for the second individual at least partially based
        on a facial characteristic of the at least one of the relative, the
        friend, or the associate of the at least one of the first individual or
        the second individual
```

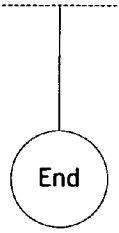

FIG. 15B

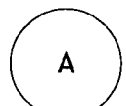

1710
automatically remotely identifying a third higher priority individual

1720
cease providing at least one of the first display to the first individual or the second display to the second individual at least partially based on the identified third higher priority individual

2702
identifying at least one of the first individual, the second individual, or the third higher priority individual by a lack of an action

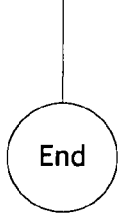

FIG. 27B

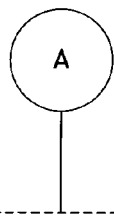

240
providing a second display for the second individual, the second display having a second content at least partially based on the identified at least one characteristic of the second individual 906
providing a second display having an informational content targeted to the second individual 1106
providing specific information selected based on the identity of the second individual 1008
providing at least one of an email or a scheduled event to the second individual 3310
selecting the individual at least partially based on an orientation of the individual

FIG. 41B

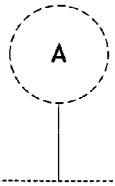

1520
selecting at least one of the first content for the first individual or the second content for the second individual at least partially based on the identity of the at least one of the relative, the friend, or the associate of the at least one of the first individual or the second individual 1522
selecting at least one of the first content for the first individual or the second content for the second individual at least partially based on a known characteristic of the at least one of the relative, the friend, or the associate of the at least one of the first individual or the second individual.

1524
selecting at least one of the first content for the first individual or the second content for the second individual at least partially based on a facial characteristic of the at least one of the relative, the friend, or the associate of the at least one of the first individual or the second individual

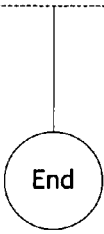

FIG. 46B

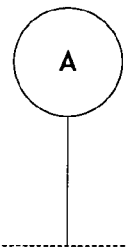

1710
automatically remotely identifying a third higher priority individual

1720
cease providing at least one of the first display to the first individual or the second display to the second individual at least partially based on the identified third higher priority individual

2702
identifying at least one of the first individual, the second individual, or the third higher priority individual by a lack of an action

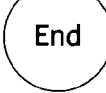

FIG. 58B

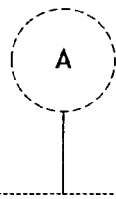

1520
selecting at least one of the first content for the first individual or the second content for the second individual at least partially based on the identity of the at least one of the relative, the friend, or the associate of the at least one of the first individual or the second individual

1522
selecting at least one of the first content for the first individual or the second content for the second individual at least partially based on a known characteristic of the at least one of the relative, the friend, or the associate of the at least one of the first individual or the second individual.

1524
selecting at least one of the first content for the first individual or the second content for the second individual at least partially based on a facial characteristic of the at least one of the relative, the friend, or the associate of the at least one of the first individual or the second individual

FIG. 77B

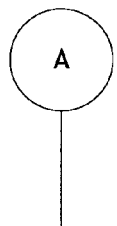

1710
automatically remotely identifying a third higher priority individual

1720
cease providing at least one of the first display to the first individual or the second display to the second individual at least partially based on the identified third higher priority individual

2702
identifying at least one of the first individual, the second individual, or the third higher priority individual by a lack of an action

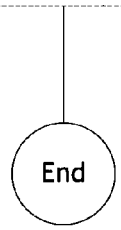

FIG. 89B

○ A 240
providing a second display for the second individual, the second display having a second content at least partially based on the identified at least one characteristic of the second individual 906
providing a second display having an informational content targeted to the second individual 1106
providing specific information selected based on the identity of the second individual 1008
providing at least one of an email or a scheduled event to the second individual 9510
providing a focused audio message audible to the individual, the focused audio message having a voice tailored to the individual ○ End

FIG. 103B

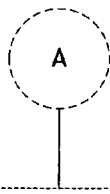

1520
selecting at least one of the first content for the first individual or the second content for the second individual at least partially based on the identity of the at least one of the relative, the friend, or the associate of the at least one of the first individual or the second individual

1522
selecting at least one of the first content for the first individual or the second content for the second individual at least partially based on a known characteristic of the at least one of the relative, the friend, or the associate of the at least one of the first individual or the second individual.

1524
selecting at least one of the first content for the first individual or the second content for the second individual at least partially based on a facial characteristic of the at least one of the relative, the friend, or the associate of the at least one of the first individual or the second individual

240
providing a second display for the second individual, the second display having a second content at least partially based on the identified at least one characteristic of the second individual

906
providing a second display having an informational content targeted to the second individual

1106
providing specific information selected based on the identity of the second individual

1008
providing at least one of an email or a scheduled event to the second individual

---

12610
providing a display having at least one of an illumination level, a color scheme, an aspect ratio, a resolution, or a refresh rate targeted to the individual ( End )

FIG. 134B

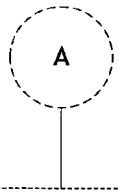

1520
selecting at least one of the first content for the first individual or the second content for the second individual at least partially based on the identity of the at least one of the relative, the friend, or the associate of the at least one of the first individual or the second individual

1522
selecting at least one of the first content for the first individual or the second content for the second individual at least partially based on a known characteristic of the at least one of the relative, the friend, or the associate of the at least one of the first individual or the second individual.

1524
selecting at least one of the first content for the first individual or the second content for the second individual at least partially based on a facial characteristic of the at least one of the relative, the friend, or the associate of the at least one of the first individual or the second individual

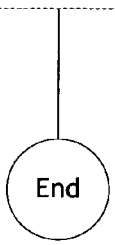

FIG. 139B

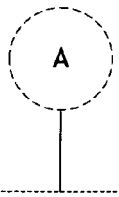

```
1520
selecting at least one of the first content for the first individual or the second
content for the second individual at least partially based on the identity of the
at least one of the relative, the friend, or the associate of the at least one of
the first individual or the second individual 1522
    selecting at least one of the first content for the first individual or the
    second content for the second individual at least partially based on a
    known characteristic of the at least one of the relative, the friend, or the
    associate of the at least one of the first individual or the second
    individual.

1524
        selecting at least one of the first content for the first individual or
        the second content for the second individual at least partially based
        on a facial characteristic of the at least one of the relative, the
        friend, or the associate of the at least one of the first individual or
        the second individual
```

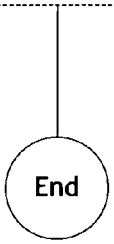

FIG. 170B

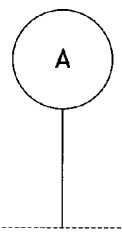

1710
automatically remotely identifying a third higher priority individual 1720
cease providing at least one of the first display to the first individual or the second display to the second individual at least partially based on the identified third higher priority individual 2602
identifying at least one of the first individual, the second individual, or the third higher priority individual by an action

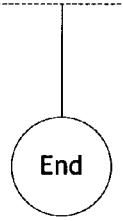

FIG. 181B

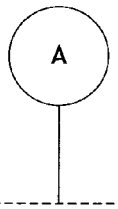

```
240
providing a second display for the second individual, the second display having a
second content at least partially based on the identified at least one
characteristic of the second individual 906
    providing a second display having an informational content targeted to the
    second individual 1106
        providing specific information selected based on the identity of the
        second individual 1008
            providing at least one of an email or a scheduled event to the
            second individual
```

```
18810
documenting the provision of the content of the display for the individual
```

FIG. 196B

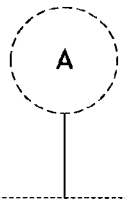

```
1520
selecting at least one of the first content for the first individual or the second
content for the second individual at least partially based on the identity of the
at least one of the relative, the friend, or the associate of the at least one of
the first individual or the second individual 1522
    selecting at least one of the first content for the first individual or the
    second content for the second individual at least partially based on a
    known characteristic of the at least one of the relative, the friend, or the
    associate of the at least one of the first individual or the second
    individual.

1524
        selecting at least one of the first content for the first individual or
        the second content for the second individual at least partially based
        on a facial characteristic of the at least one of the relative, the
        friend, or the associate of the at least one of the first individual or
        the second individual
```

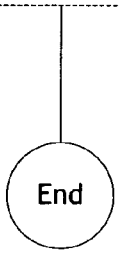

FIG. 201B

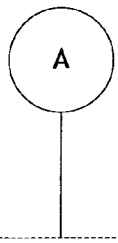

1710
automatically remotely identifying a third higher priority individual

1720
cease providing at least one of the first display to the first individual or the second display to the second individual at least partially based on the identified third higher priority individual

1722
providing at least one of the first display or the second display to the third higher priority individual, the at least one of the first display or the second display having a third content at least partially based on the identified third higher priority individual

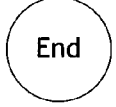

FIG. 203B (A)

240
providing a second display for the second individual, the second display having a second content at least partially based on the identified at least one characteristic of the second individual 906
providing a second display having an informational content targeted to the second individual 1106
providing specific information selected based on the identity of the second individual 1008
providing at least one of an email or a scheduled event to the second individual 21910
wherein the at least one characteristic of the individual comprises at least one of a payment or a charge associated with the individual (End)

FIG. 227B

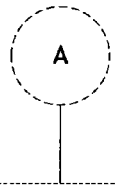

1520
selecting at least one of the first content for the first individual or the second content for the second individual at least partially based on the identity of the at least one of the relative, the friend, or the associate of the at least one of the first individual or the second individual

1522
selecting at least one of the first content for the first individual or the second content for the second individual at least partially based on a known characteristic of the at least one of the relative, the friend, or the associate of the at least one of the first individual or the second individual.

1524
selecting at least one of the first content for the first individual or the second content for the second individual at least partially based on a facial characteristic of the at least one of the relative, the friend, or the associate of the at least one of the first individual or the second individual

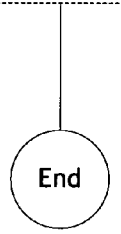

FIG. 232B

IDENTIFYING A CHARACTERISTIC OF AN INDIVIDUAL UTILIZING FACIAL RECOGNITION AND PROVIDING A DISPLAY FOR THE INDIVIDUAL

SUMMARY

In one aspect, a method includes but is not limited to automatically remotely identifying at least one characteristic of an individual via facial recognition; providing a display for the individual, the display having a content at least partially based on the identified at least one characteristic of the individual; and cease providing the display to the individual based on an action of the individual. In addition to the foregoing, other method aspects are described in the claims, drawings, and text forming a part of the present disclosure.

In one aspect, a method includes but is not limited to automatically remotely identifying at least one characteristic of an individual via facial recognition; providing a display for the individual, the display having a content at least partially based on the identified at least one characteristic of the individual; and selecting the individual at least partially based on an orientation of the individual. In addition to the foregoing, other method aspects are described in the claims, drawings, and text forming a part of the present disclosure.

In one aspect, a method includes but is not limited to automatically remotely identifying at least one characteristic of an individual via facial recognition; providing a display for the individual, the display having a content at least partially based on the identified at least one characteristic of the individual; and providing an advertising content targeted to the individual via the display. In addition to the foregoing, other method aspects are described in the claims, drawings, and text forming a part of the present disclosure.

In one aspect, a method includes but is not limited to automatically remotely identifying at least one characteristic of an individual via facial recognition; providing a display for the individual, the display having a content at least partially based on the identified at least one characteristic of the individual; and providing a focused audio message audible to the individual, the focused audio message having voice characteristics determined to be pleasing to the individual. In addition to the foregoing, other method aspects are described in the claims, drawings, and text forming a part of the present disclosure.

In one aspect, a method includes but is not limited to automatically remotely identifying at least one characteristic of an individual via facial recognition; providing a display for the individual, the display having a content at least partially based on the identified at least one characteristic of the individual; and providing a display having at least one of an illumination level, a color scheme, an aspect ratio, a resolution, or a refresh rate targeted to the individual. In addition to the foregoing, other method aspects are described in the claims, drawings, and text forming a part of the present disclosure.

In one aspect, a method includes but is not limited to automatically remotely identifying at least one characteristic of an individual via facial recognition; providing a display for the individual, the display having a content at least partially based on the identified at least one characteristic of the individual; and cease providing the display to the individual at least partially based on automatically remotely identifying a second higher priority individual. In addition to the foregoing, other method aspects are described in the claims, drawings, and text forming a part of the present disclosure.

In one aspect, a method includes but is not limited to automatically remotely identifying at least one characteristic of an individual via facial recognition; providing a display for the individual, the display having a content at least partially based on the identified at least one characteristic of the individual; and documenting the provision of the content of the display for the individual. In addition to the foregoing, other method aspects are described in the claims, drawings, and text forming a part of the present disclosure.

In one aspect, a method includes but is not limited to automatically remotely identifying at least one characteristic of an individual via facial recognition; and providing a display for the individual, the display having a content at least partially based on the identified at least one characteristic of the individual, wherein the at least one characteristic of the individual comprises at least one of a payment or a charge associated with the individual. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to a facial recognition module configured for automatically remotely identifying at least one characteristic of an individual via facial recognition; a display module coupled with the facial recognition module, the display module configured for providing a display for the individual, the display having a content at least partially based on the identified at least one characteristic of the individual; and a controller coupled with the display module, the controller configured to cease providing the display to the individual based on an action of the individual. In addition to the foregoing, other system aspects are described in the claims, drawings, and text forming a part of the present disclosure.

In one aspect, a system includes but is not limited to a facial recognition module configured for automatically remotely identifying at least one characteristic of an individual via facial recognition; a display module coupled with the facial recognition module, the display module configured for providing a display for the individual, the display having a content at least partially based on the identified at least one characteristic of the individual; and a controller coupled with the facial recognition module, the controller configured for selecting the individual at least partially based on an orientation of the individual. In addition to the foregoing, other system aspects are described in the claims, drawings, and text forming a part of the present disclosure.

In one aspect, a system includes but is not limited to a facial recognition module configured for automatically remotely identifying at least one characteristic of an individual via facial recognition; a display module coupled with the facial recognition module, the display module configured for providing a display for the individual, the display having a content at least partially based on the identified at least one characteristic of the individual; and a controller coupled with the display module, the controller configured for providing an advertising content targeted to the individual via the display. In addition to the foregoing, other system aspects are described in the claims, drawings, and text forming a part of the present disclosure.

In one aspect, a system includes but is not limited to a facial recognition module configured for automatically remotely identifying at least one characteristic of an individual via facial recognition; a display module coupled with the facial recognition module, the display module configured for providing a display for the individual, the display having a content at least partially based on the identified at least one characteristic of the individual; and a focused audio module coupled with the facial recognition module, the focused audio module configured for providing a focused audio message audible to the individual, the focused audio message having voice characteristics determined to be pleasing to the individual. In addition to the foregoing, other system aspects are described in the claims, drawings, and text forming a part of the present disclosure.

In one aspect, a system includes but is not limited to a facial recognition module configured for automatically remotely identifying at least one characteristic of an individual via facial recognition; a display module coupled with the facial recognition module, the display module configured for providing a display for the individual, the display having a content at least partially based on the identified at least one characteristic of the individual; and a controller coupled with the display module, the controller configured for providing a display having at least one of an illumination level, a color scheme, an aspect ratio, a resolution, or a refresh rate targeted to the individual. In addition to the foregoing, other system aspects are described in the claims, drawings, and text forming a part of the present disclosure.

In one aspect, a system includes but is not limited to a facial recognition module configured for automatically remotely identifying at least one characteristic of an individual via facial recognition; a display module coupled with the facial recognition module, the display module configured for providing a display for the individual, the display having a content at least partially based on the identified at least one characteristic of the individual; and a controller coupled with the facial recognition module and the display module, the controller configured to cease providing the display to the individual at least partially based on automatically remotely identifying a second higher priority individual. In addition to the foregoing, other system aspects are described in the claims, drawings, and text forming a part of the present disclosure.

In one aspect, a system includes but is not limited to a facial recognition module configured for automatically remotely identifying at least one characteristic of an individual via facial recognition; a display module coupled with the facial recognition module, the display module configured for providing a display for the individual, the display having a content at least partially based on the identified at least one characteristic of the individual; and a controller coupled with the display module, the controller configured for documenting the provision of the content of the display for the individual. In addition to the foregoing, other system aspects are described in the claims, drawings, and text forming a part of the present disclosure.

In one aspect, a system includes but is not limited to a facial recognition module configured for automatically remotely identifying at least one characteristic of an individual via facial recognition; and a display module coupled with the facial recognition module, the display module configured for providing a display for the individual, the display having a content at least partially based on the identified at least one characteristic of the individual, wherein the at least one characteristic of the individual comprises at least one of a payment or a charge associated with the individual. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 1C is a schematic of an action of an individual.

FIG. 130 illustrates an alternative embodiment of the operational flow of FIG. 126.

FIG. 131 illustrates an alternative embodiment of the operational flow of FIG. 126.

FIG. 132 illustrates an alternative embodiment of the operational flow of FIG. 126.

FIG. 133 illustrates an alternative embodiment of the operational flow of FIG. 126.

FIG. 134 illustrates an alternative embodiment of the operational flow of FIG. 126.

FIG. 135 illustrates an alternative embodiment of the operational flow of FIG. 126.

FIG. 136 illustrates an alternative embodiment of the operational flow of FIG. 126.

FIG. 137 illustrates an alternative embodiment of the operational flow of FIG. 126.

Figure 138:
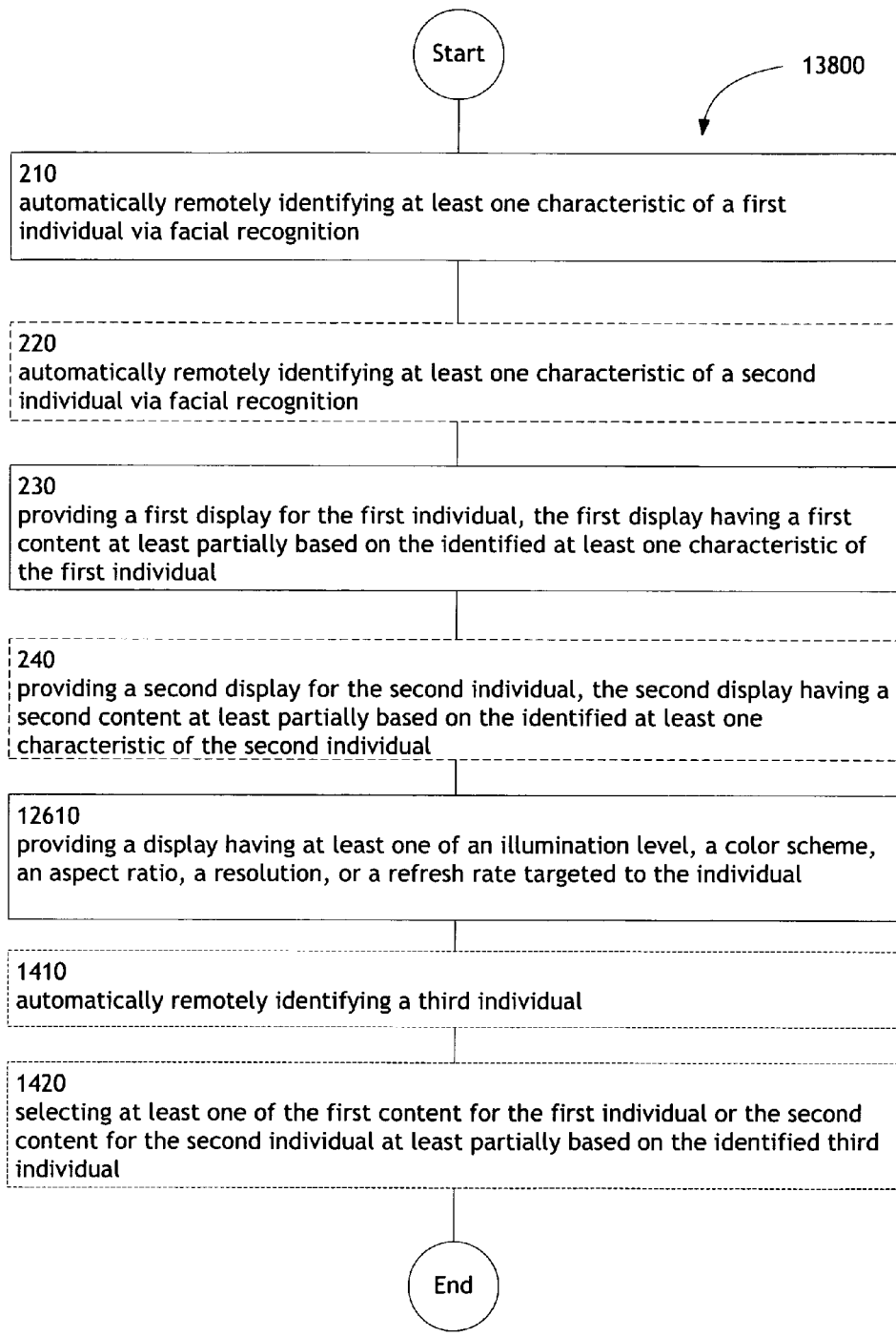

FIG. 138 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, automatically remotely identifying a third individual, and selecting the content for the first individual at least partially based on the identified third individual.

Figure 139A:
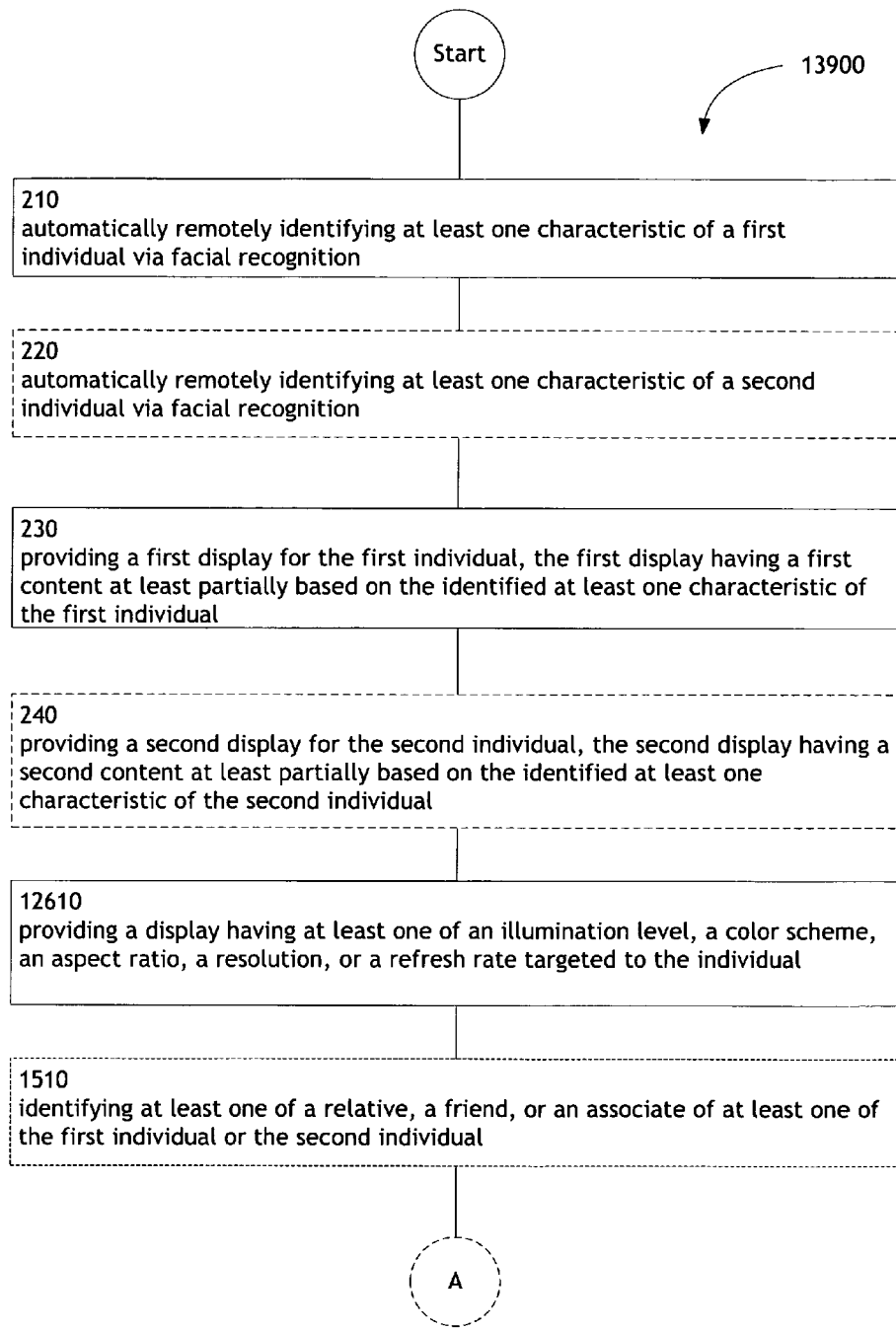

FIG. 139 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, identifying at least one of a relative, a friend, or an associate of the individual, and selecting the content for the individual at least partially based on the identity of the at least one of the relative, the friend, or the associate of the individual.

Figure 140:
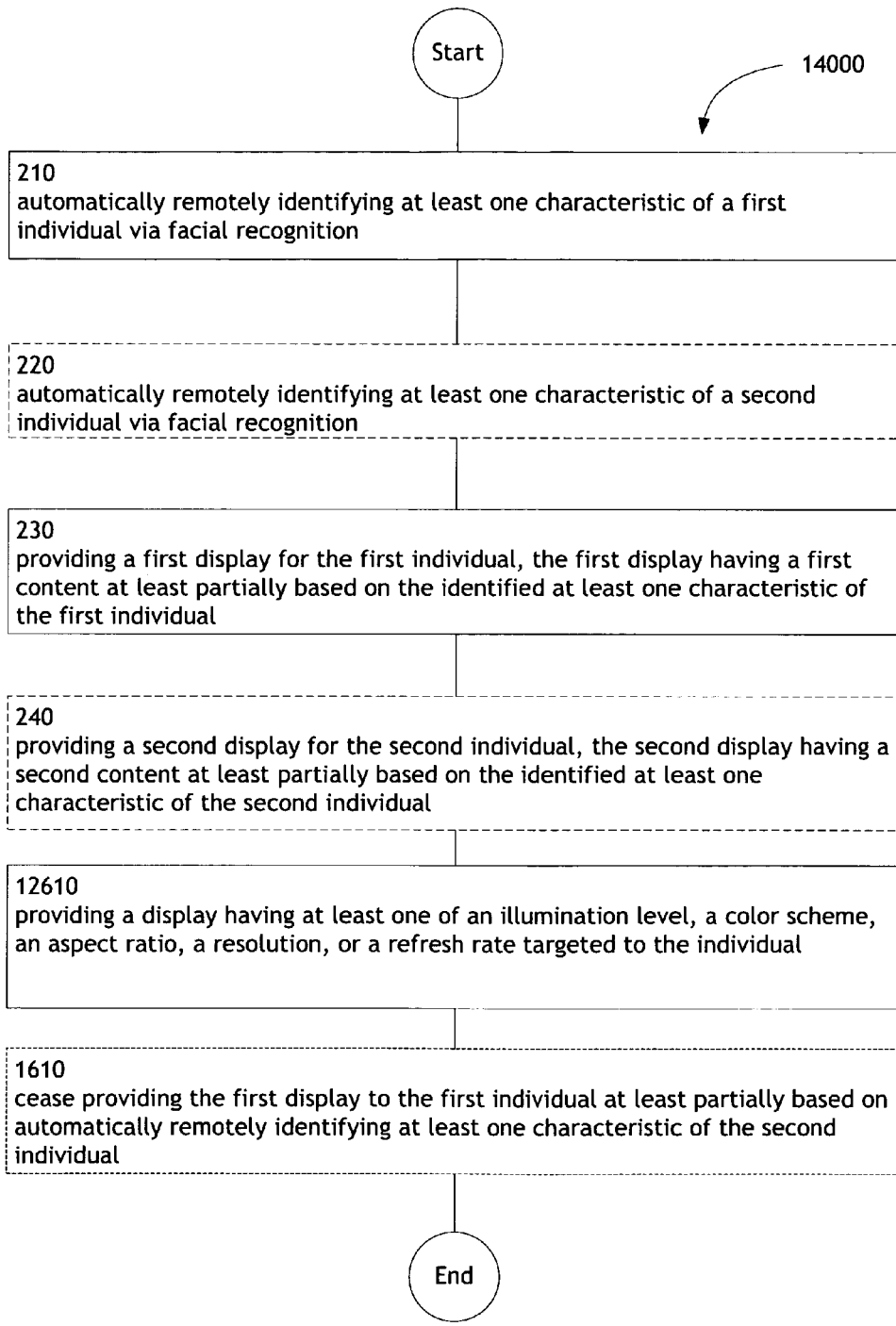

FIG. 140 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, and cease providing the display to the first individual at least partially based on automatically remotely identifying at least one characteristic of a second individual.

Figure 141A:
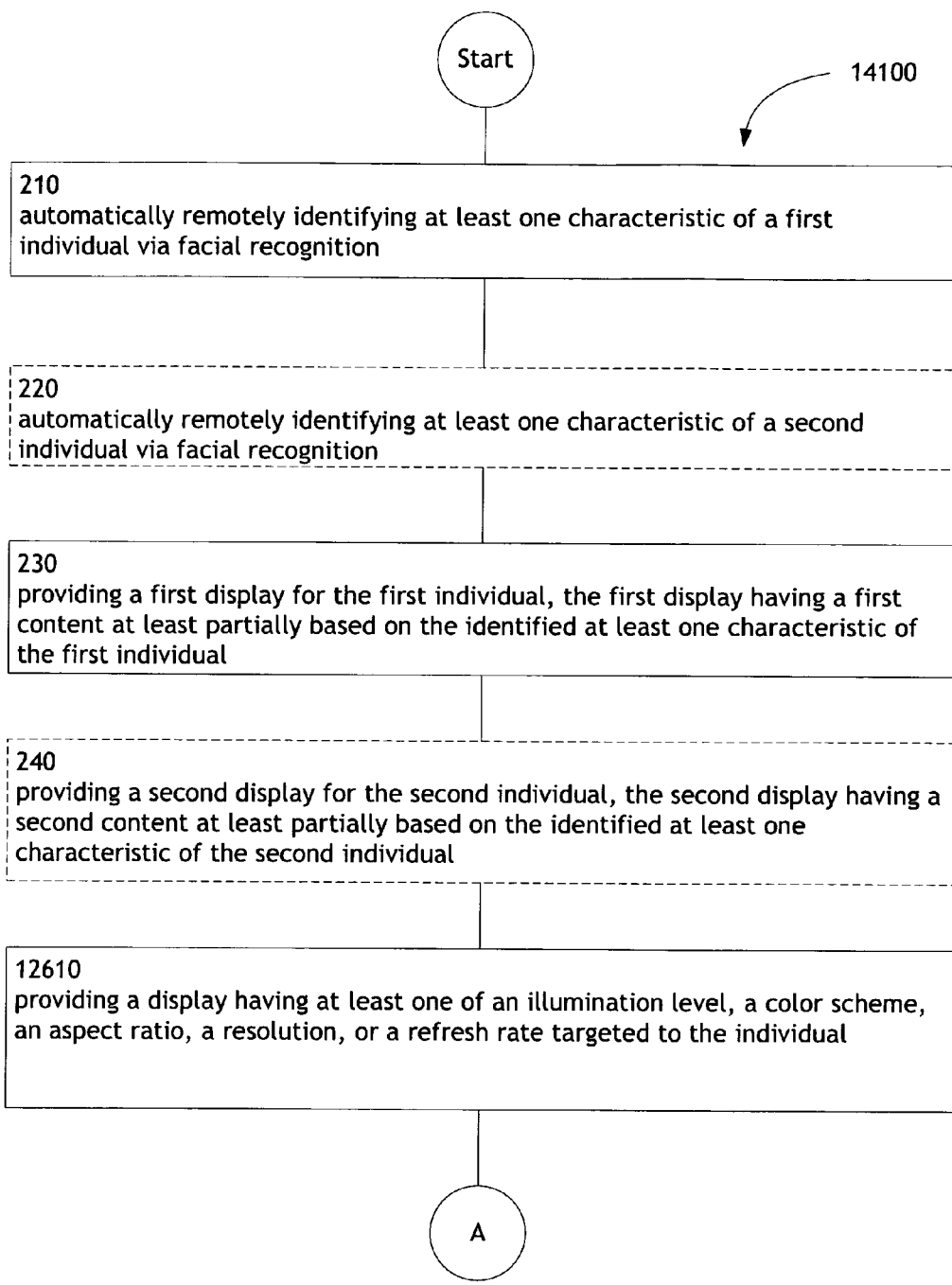
Figure 141B:
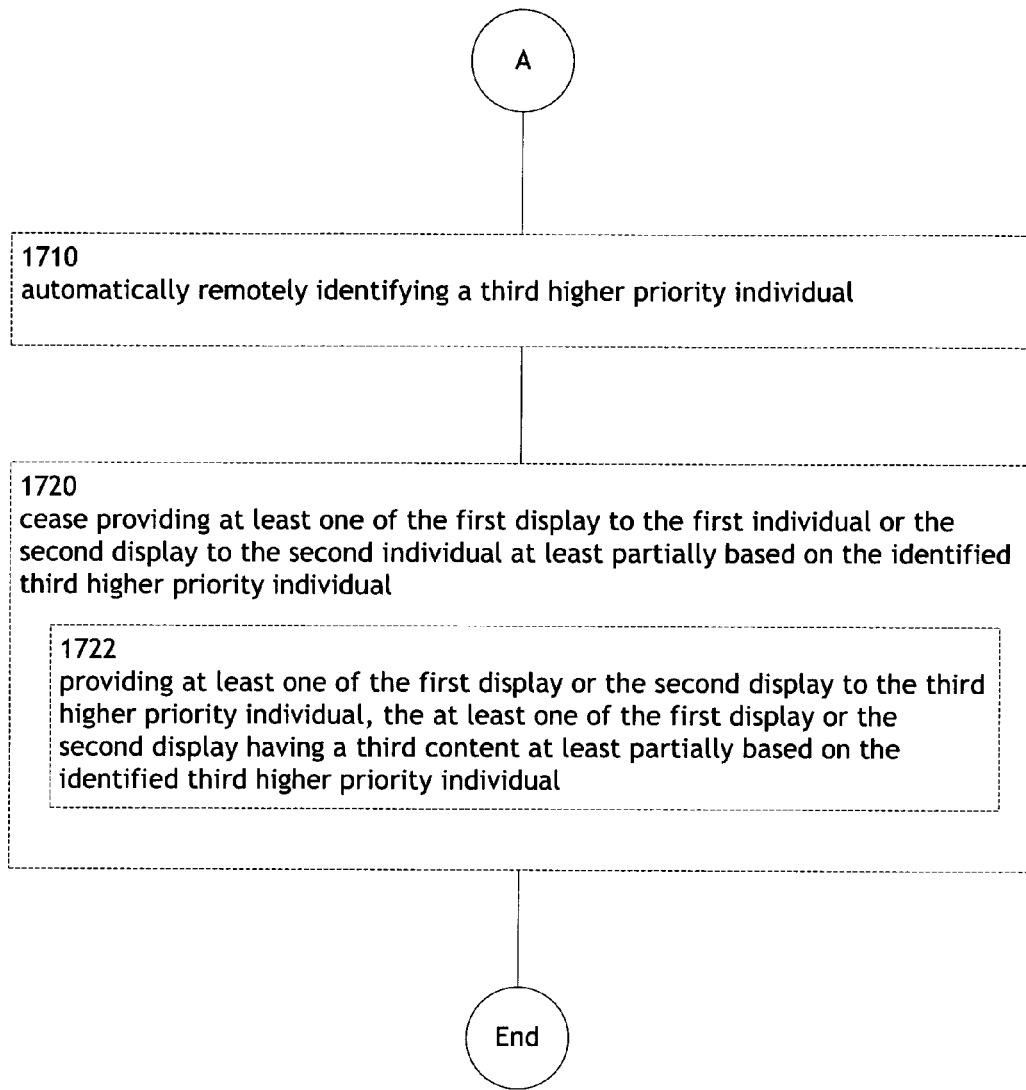

FIG. 141 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, automatically remotely identifying a third higher priority individual, and cease providing the display to the first individual at least partially based on the identified third higher priority individual.

Figure 142:
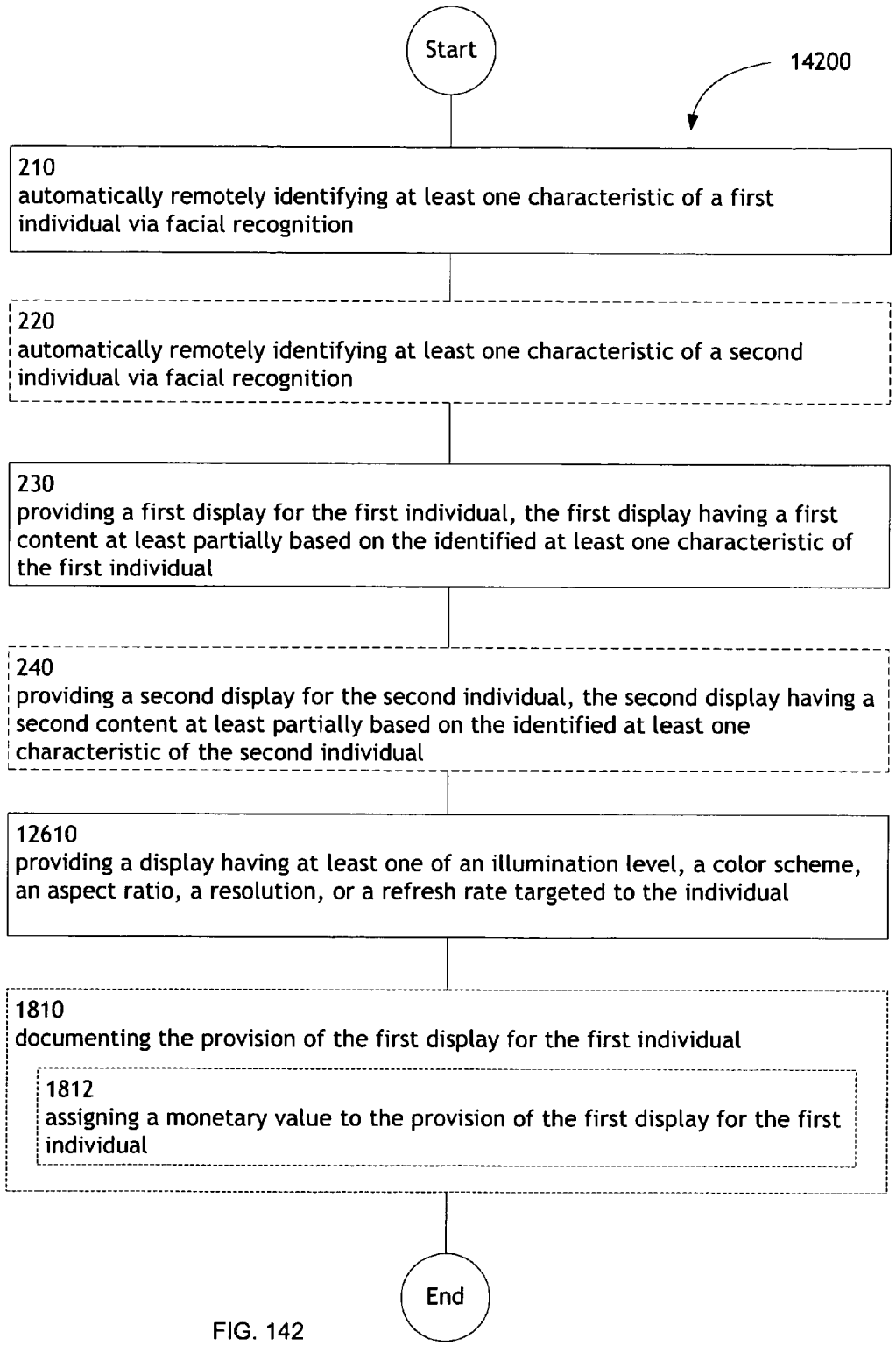

FIG. 142 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, and documenting the provision of the display for the individual.

Figure 143:
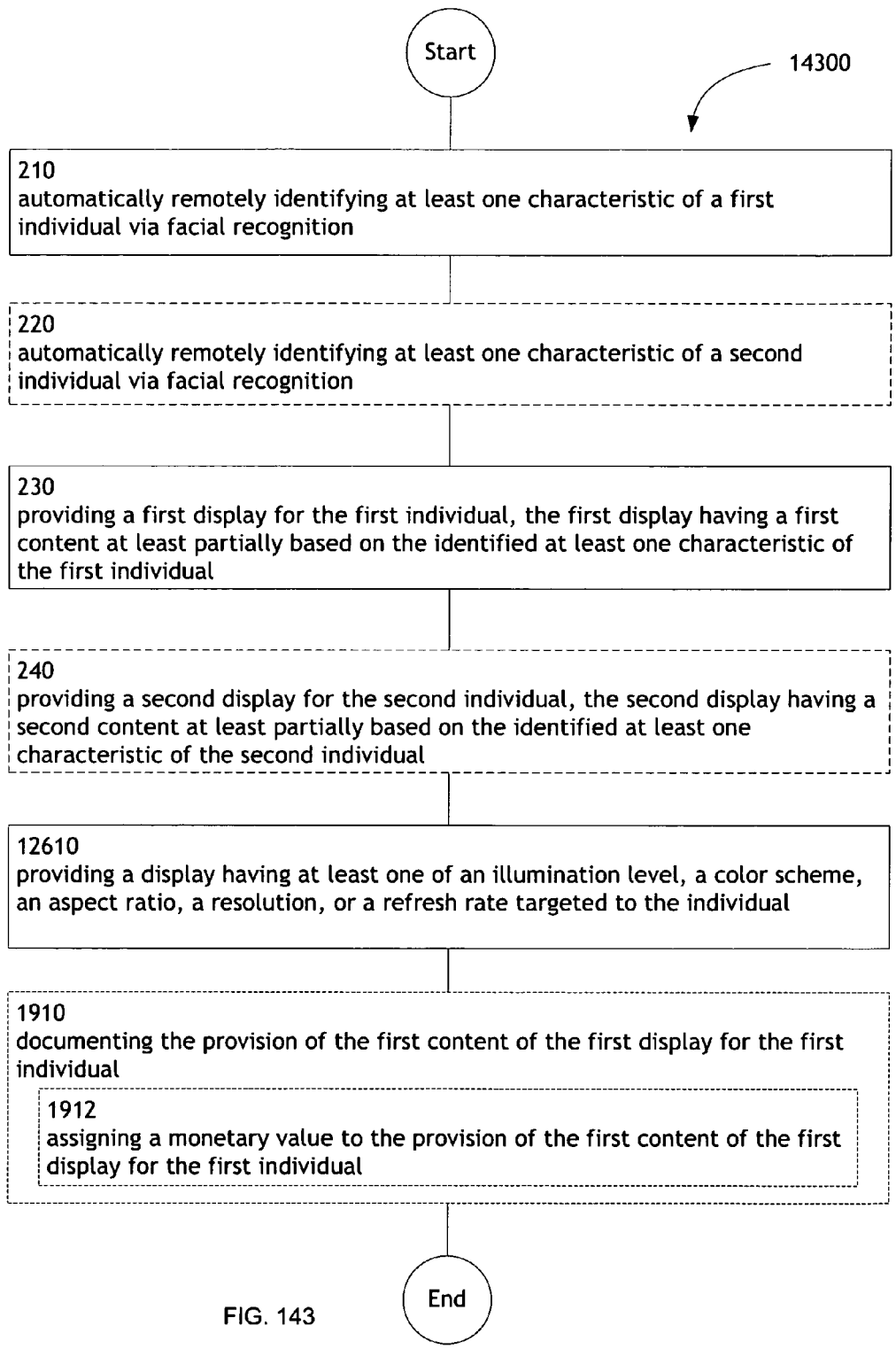

FIG. 143 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, and documenting the provision of the content of the display for the individual.

Figure 144:
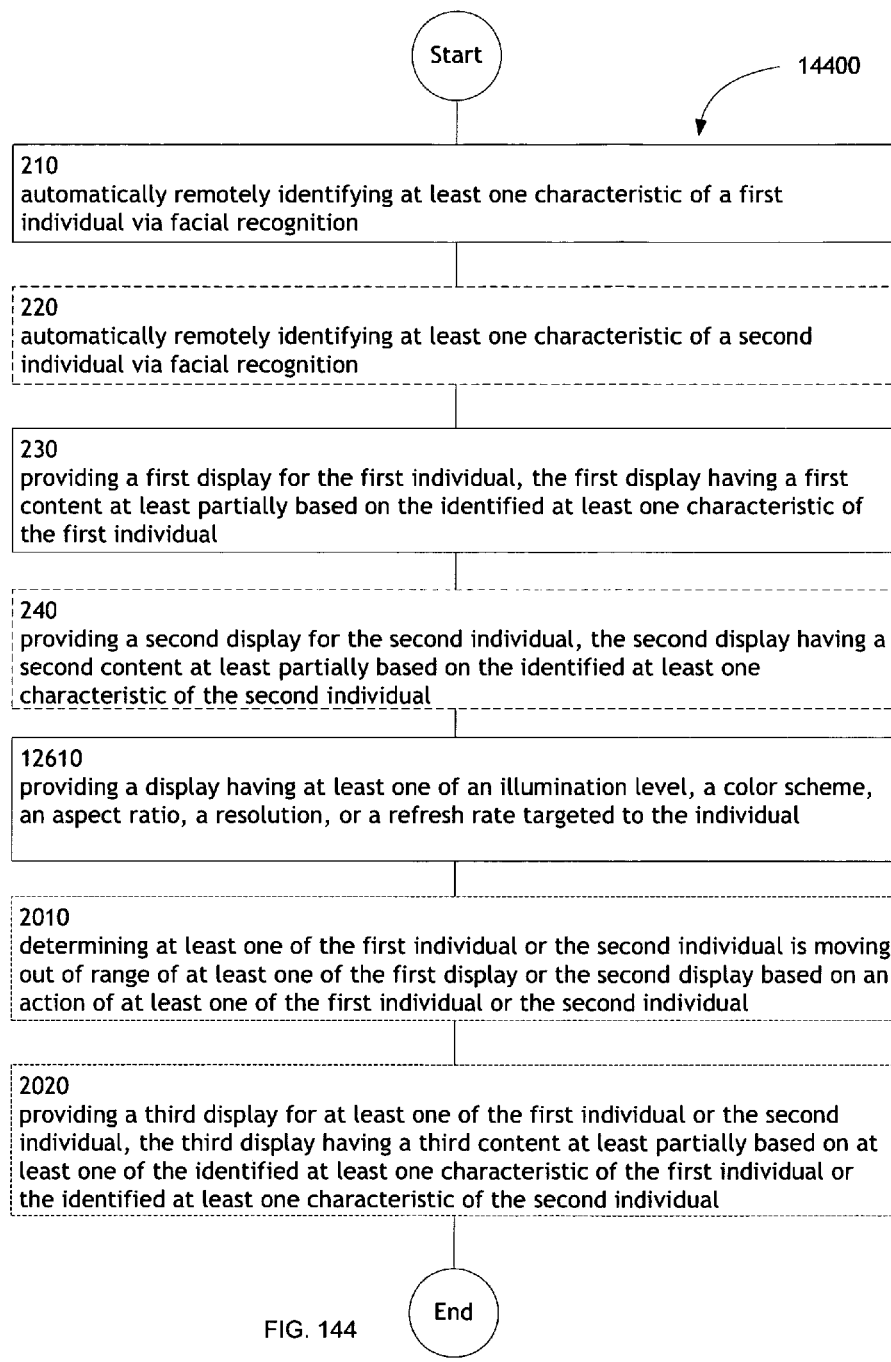

FIG. 144 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, determining the individual is moving out of range of the display based on an action of the individual, and providing a third display for the individual, the third display having a third content at least partially based on the identified at least one characteristic of the individual.

Figure 145:
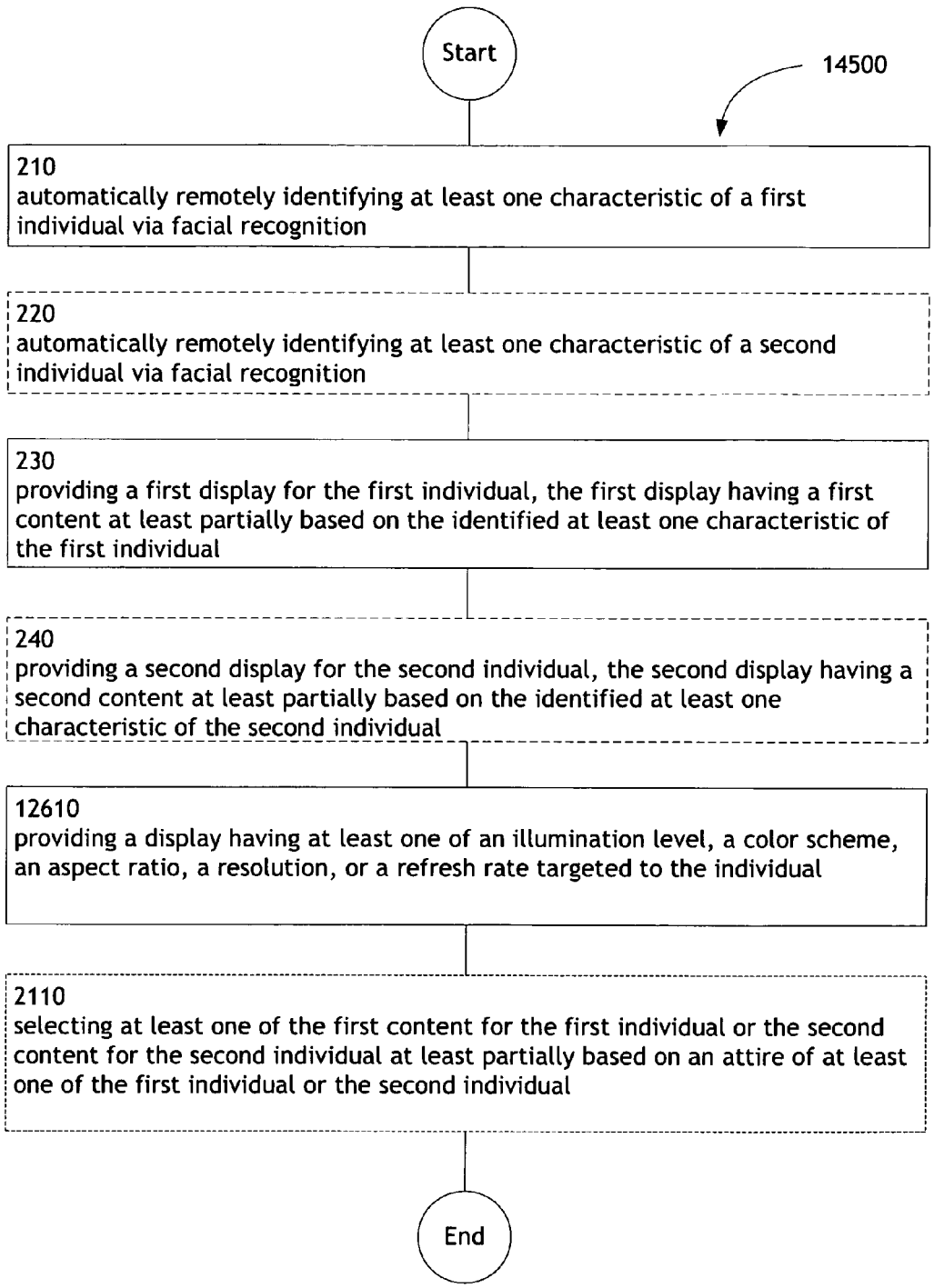

FIG. 145 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, selecting the content for the individual at least partially based on an attire of the individual.

Figure 146:
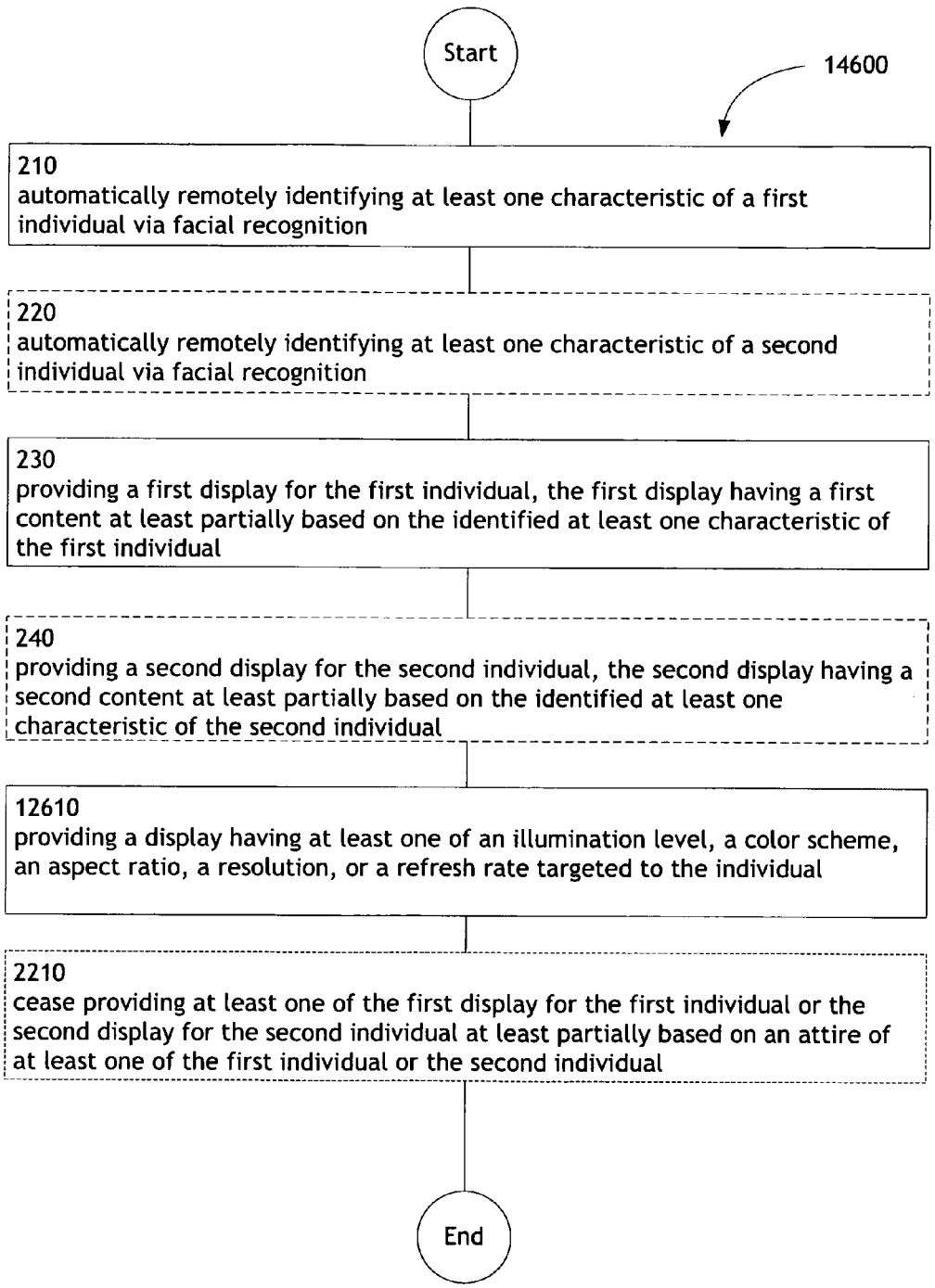

FIG. 146 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, and cease providing the display for the individual at least partially based on an attire of the individual.

Figure 147:
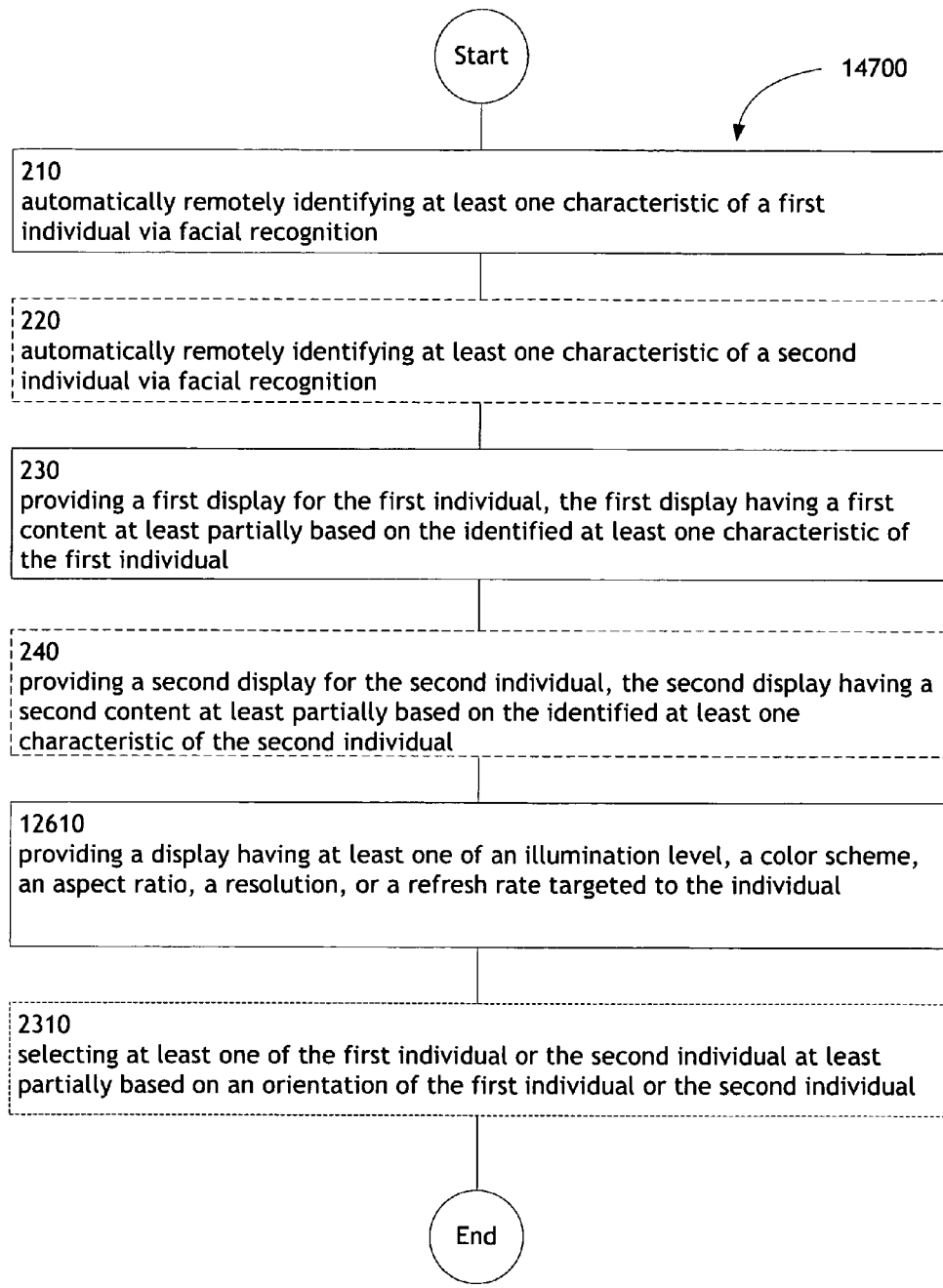

FIG. 147 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, and selecting the individual at least partially based on an orientation of the individual.

Figure 126:
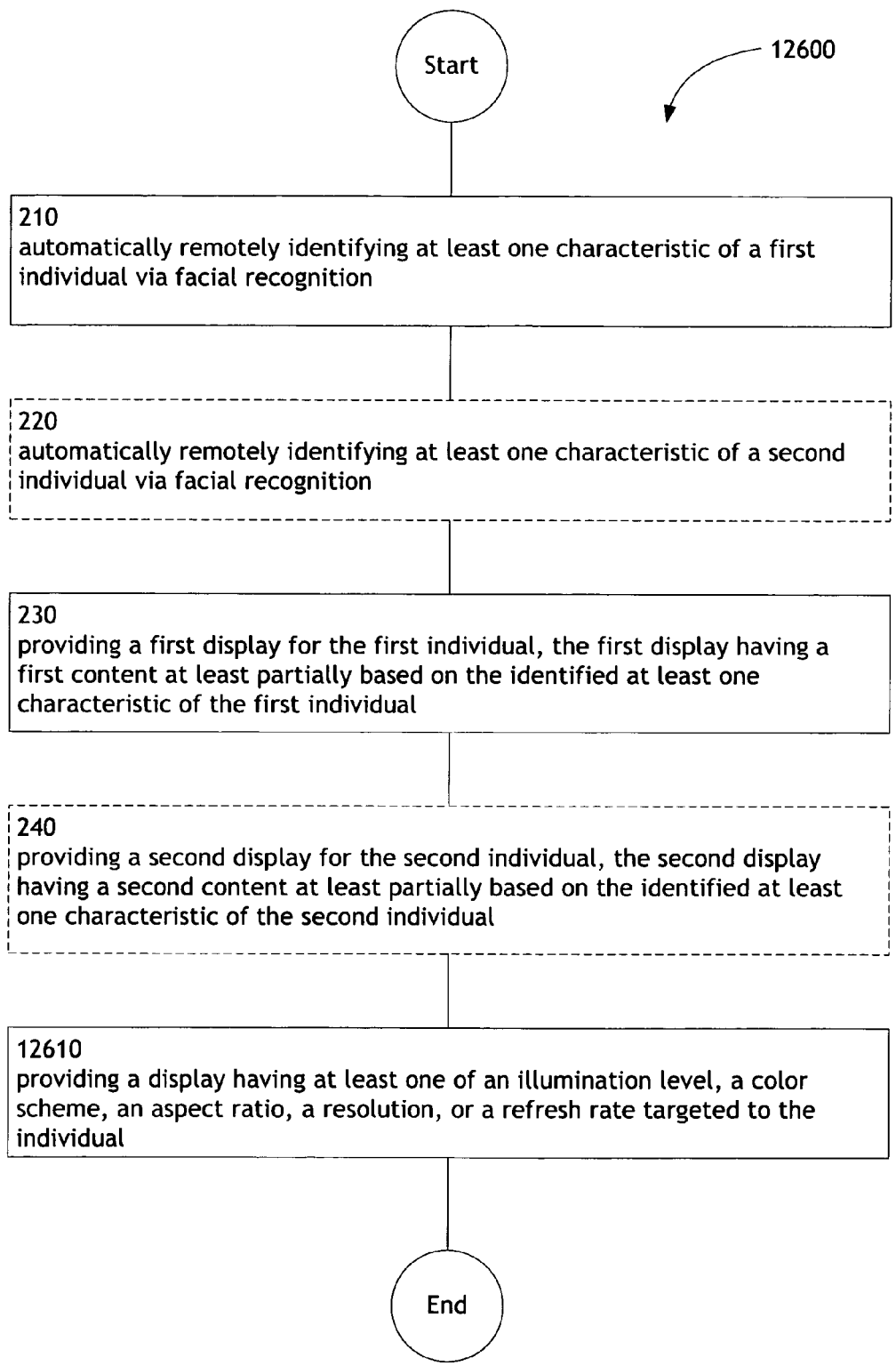
FIG. 126 illustrates an operational flow representing example operations related to automatically remotely identifying one or more characteristics of an individual utilizing facial recognition, providing a display for the individual having a content at least partially based on the one or more identified characteristics of the individual, and providing a display having at least one of an illumination level, a color scheme, an aspect ratio, a resolution, or a refresh rate targeted to the individual.
Figure 148A:
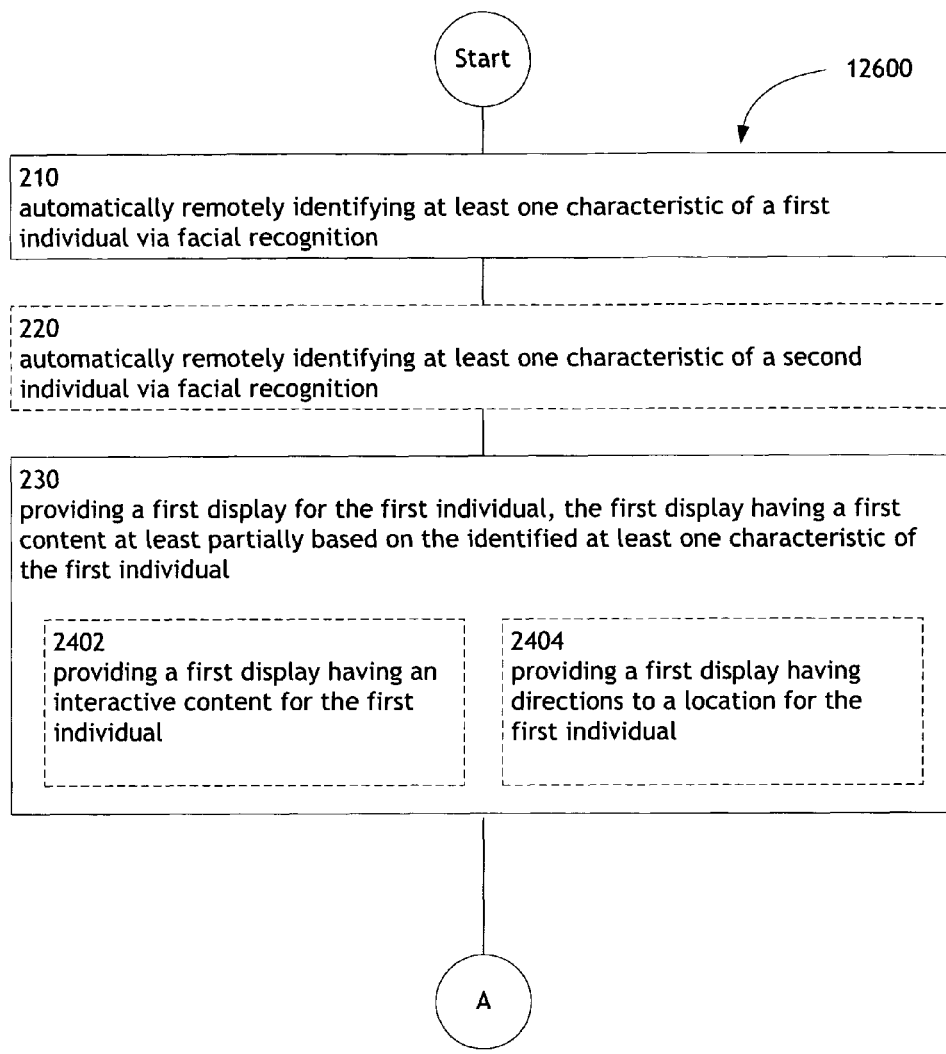
Figure 148B:
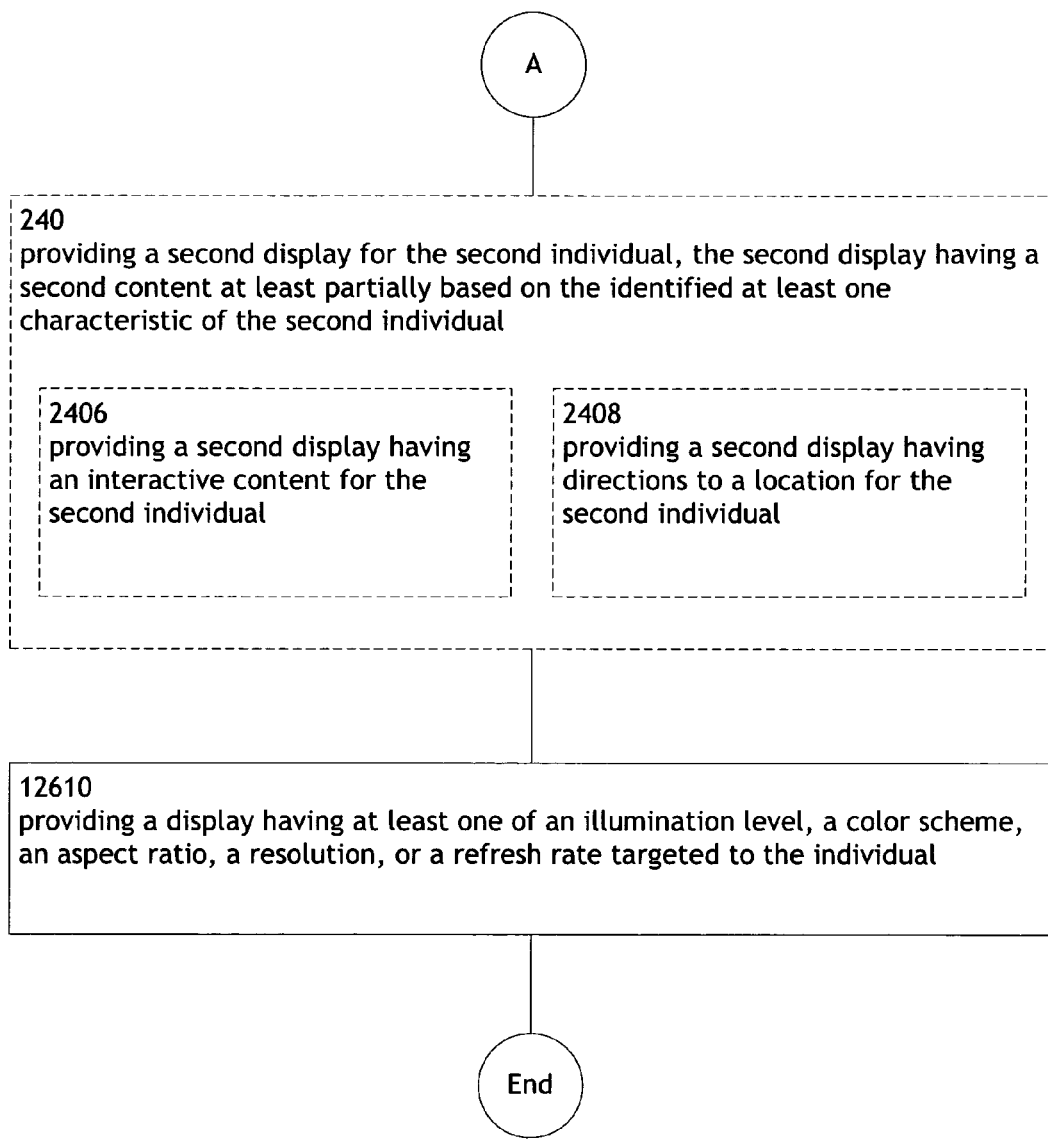

FIG. 148 illustrates an alternative embodiment of the operational flow of FIG. 126.

Figure 149A:
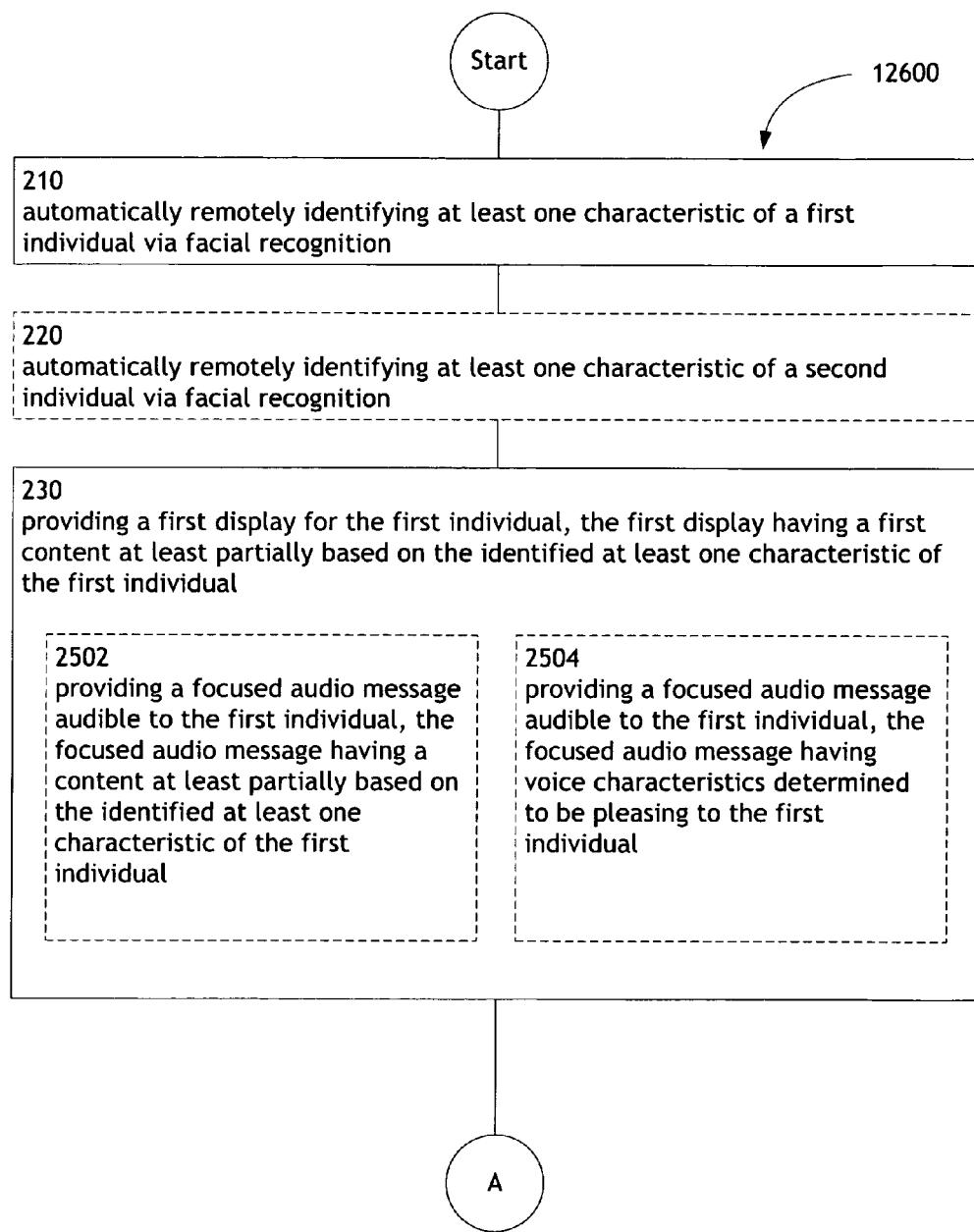
Figure 149B:
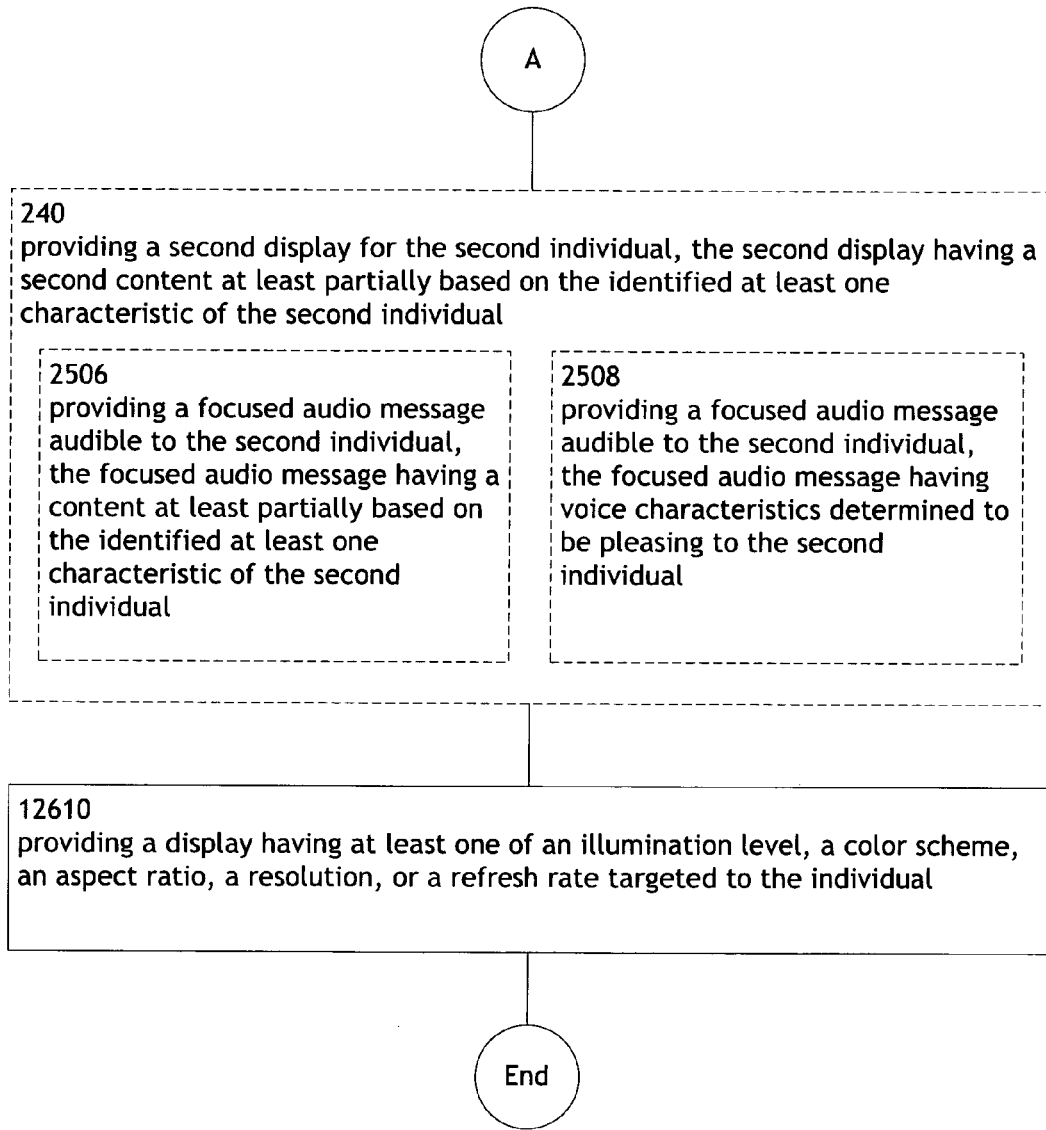

FIG. 149 illustrates an alternative embodiment of the operational flow of FIG. 126.

Figure 150A:
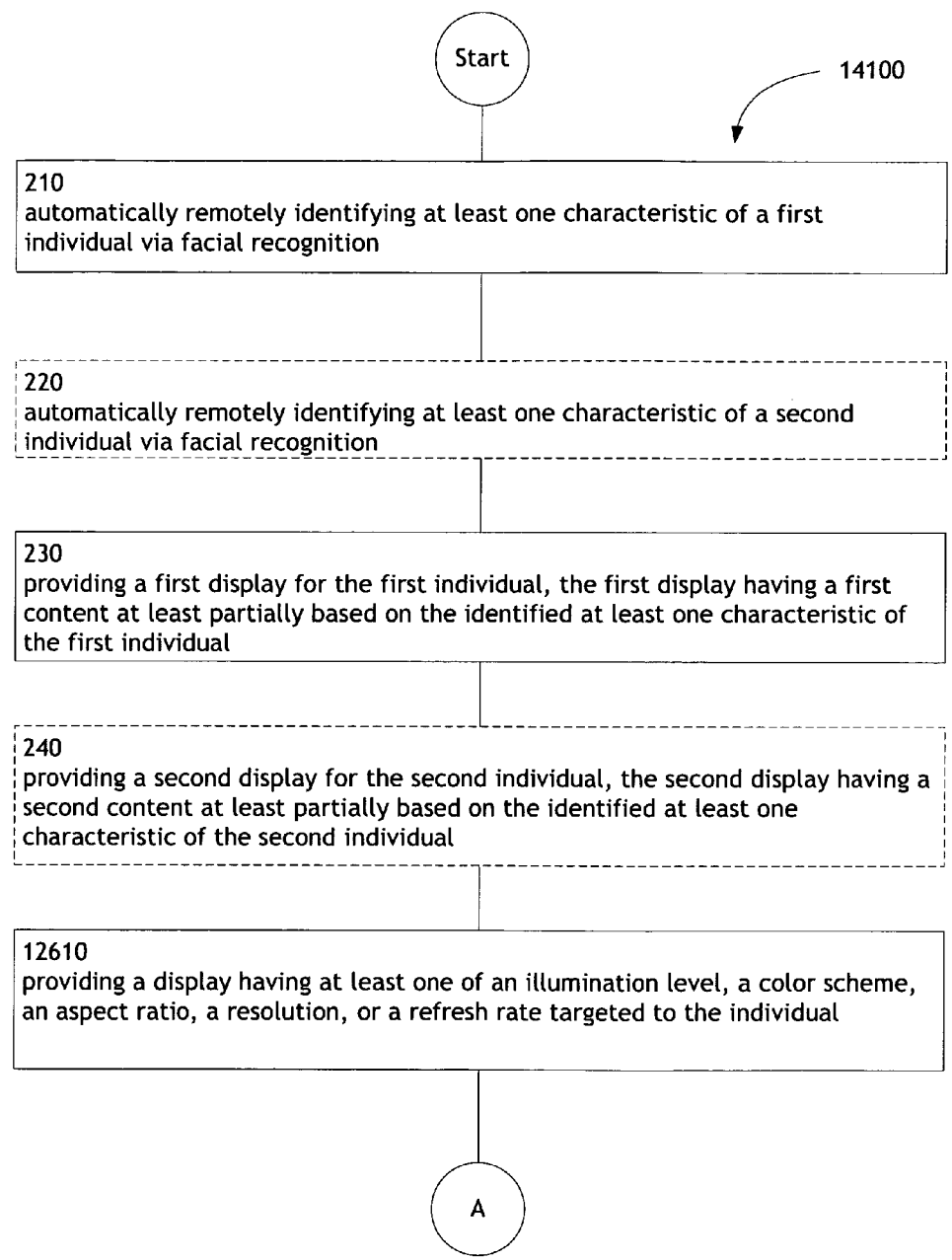
Figure 150B:
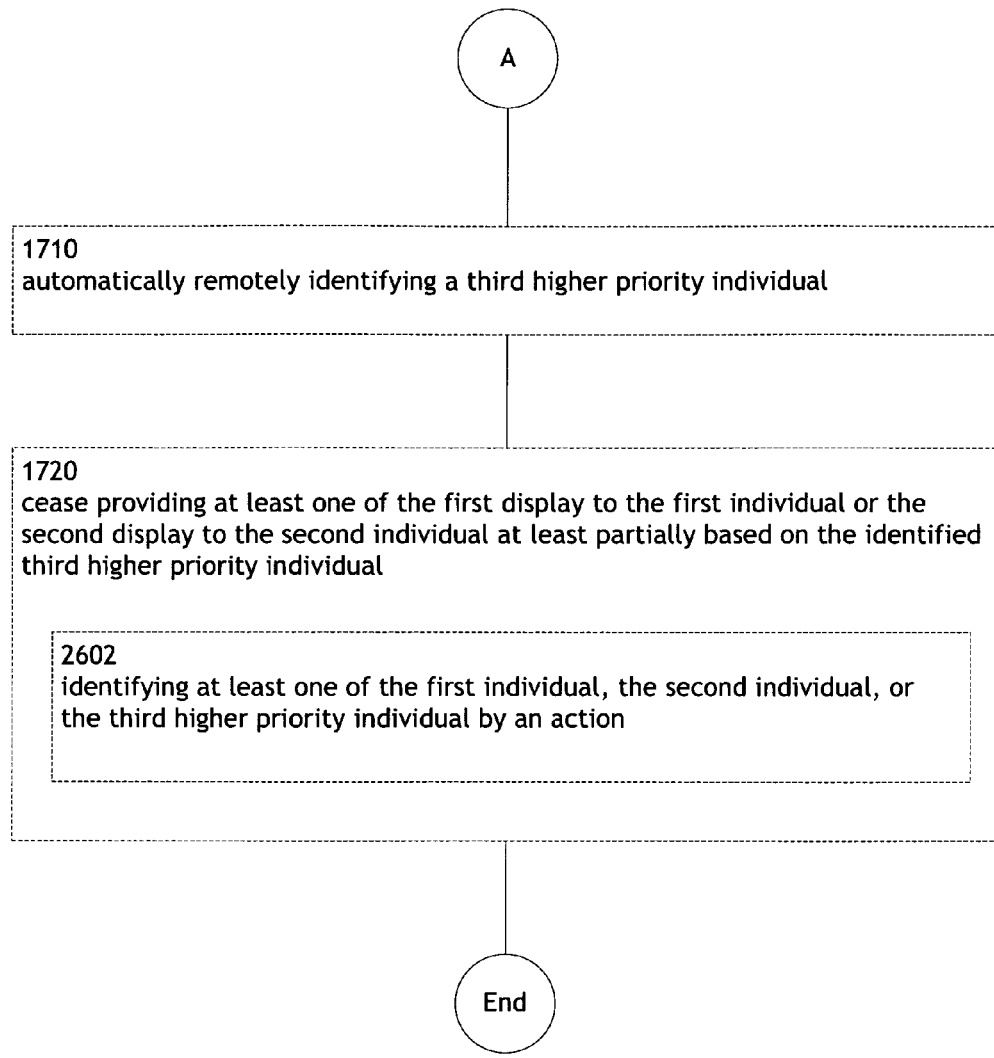

FIG. 150 illustrates an alternative embodiment of the operational flow of FIG. 141.

Figure 151A:
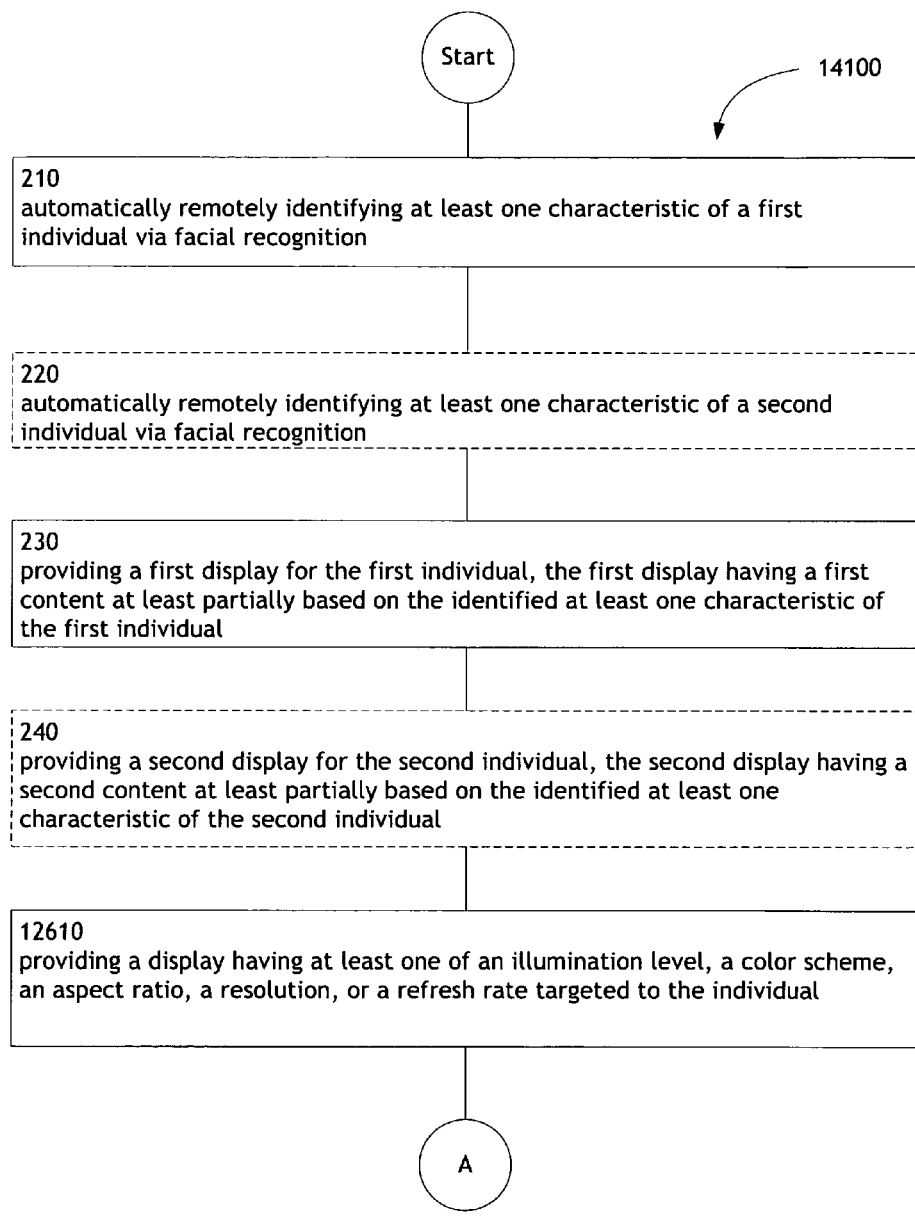
Figure 151B:
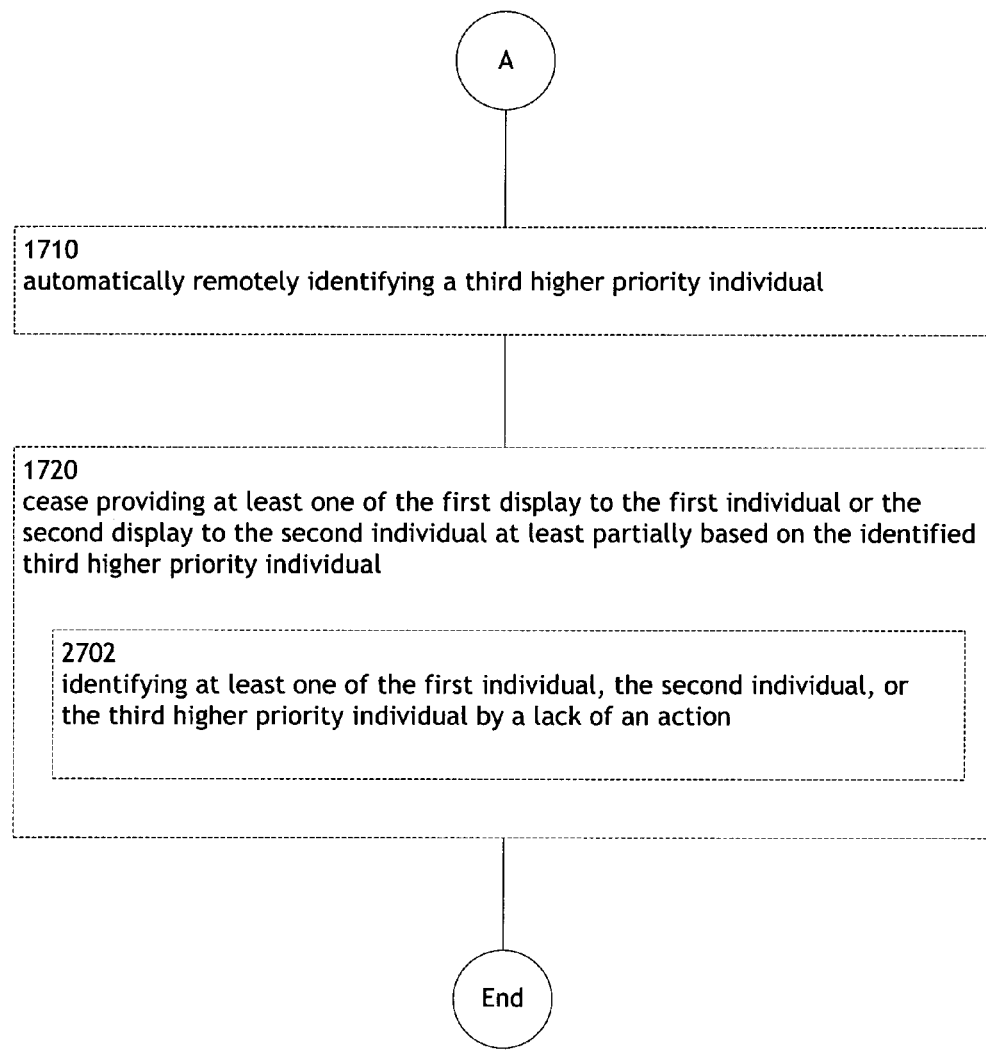

FIG. 151 illustrates an alternative embodiment of the operational flow of FIG. 141.

Figure 152:
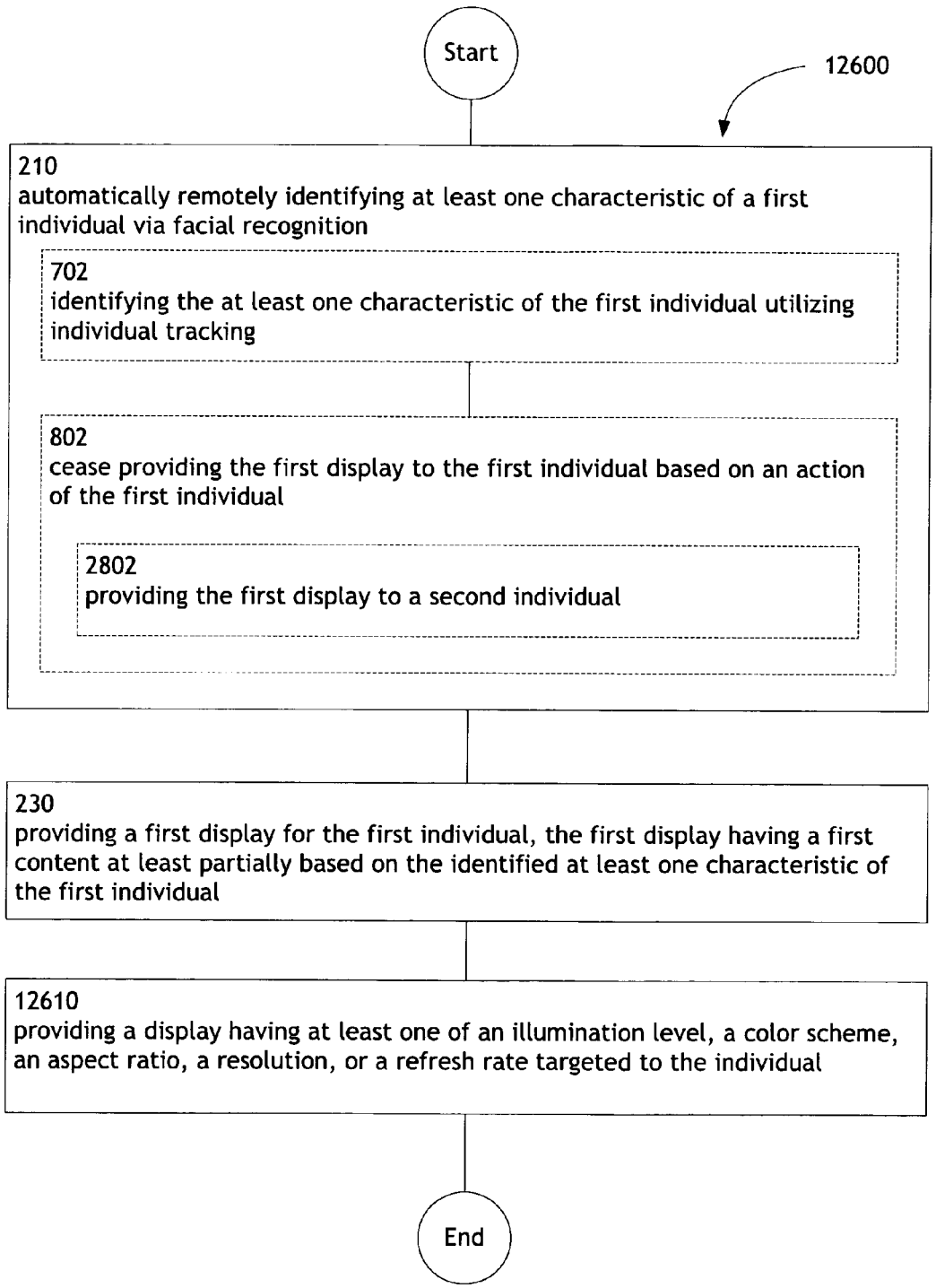

FIG. 152 illustrates an alternative embodiment of the operational flow of FIG. 126.

Figure 153:
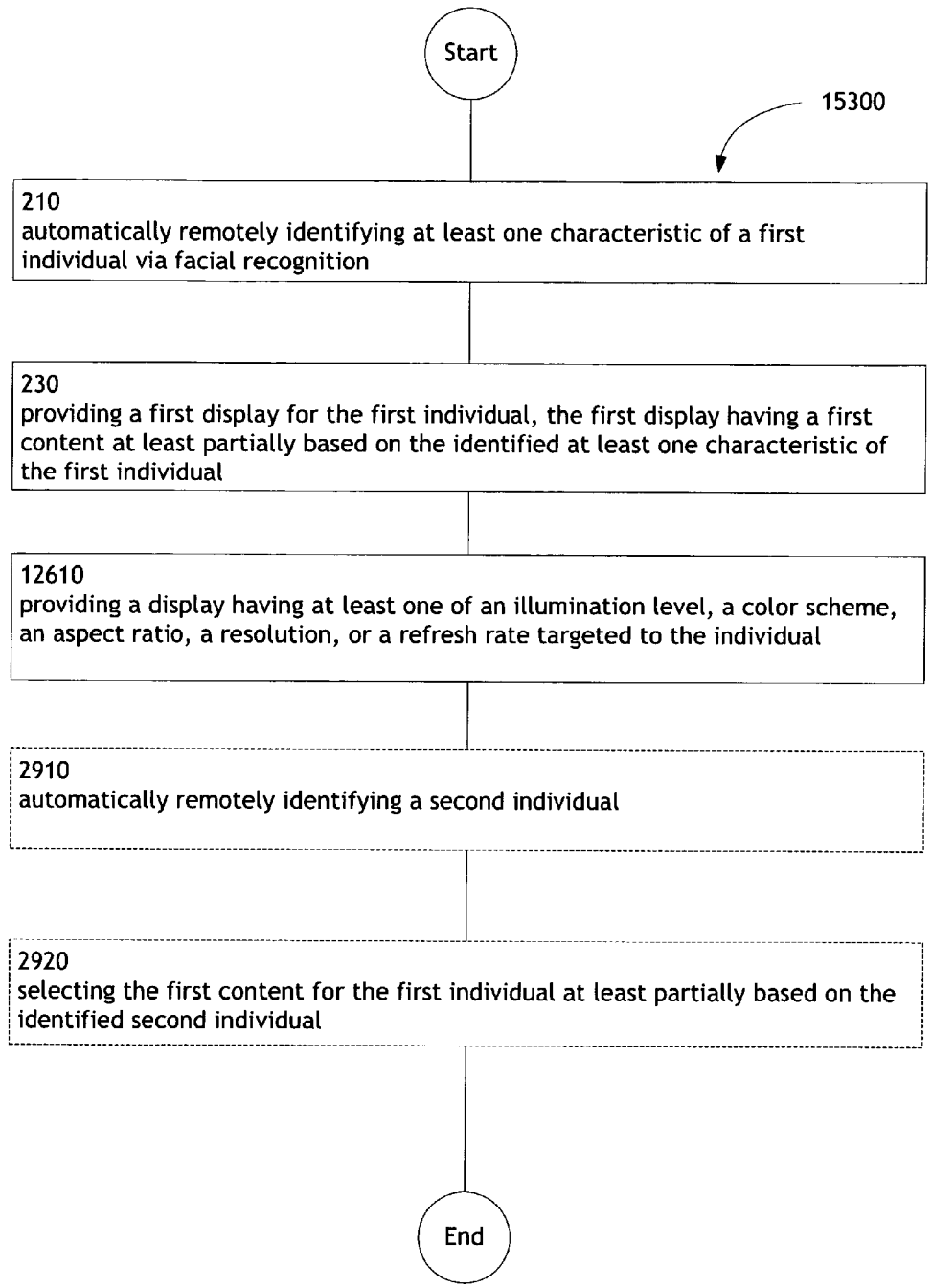

FIG. 153 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, automatically remotely identifying a second individual, and selecting the content for the first individual at least partially based on the identified second individual.

Figure 154:
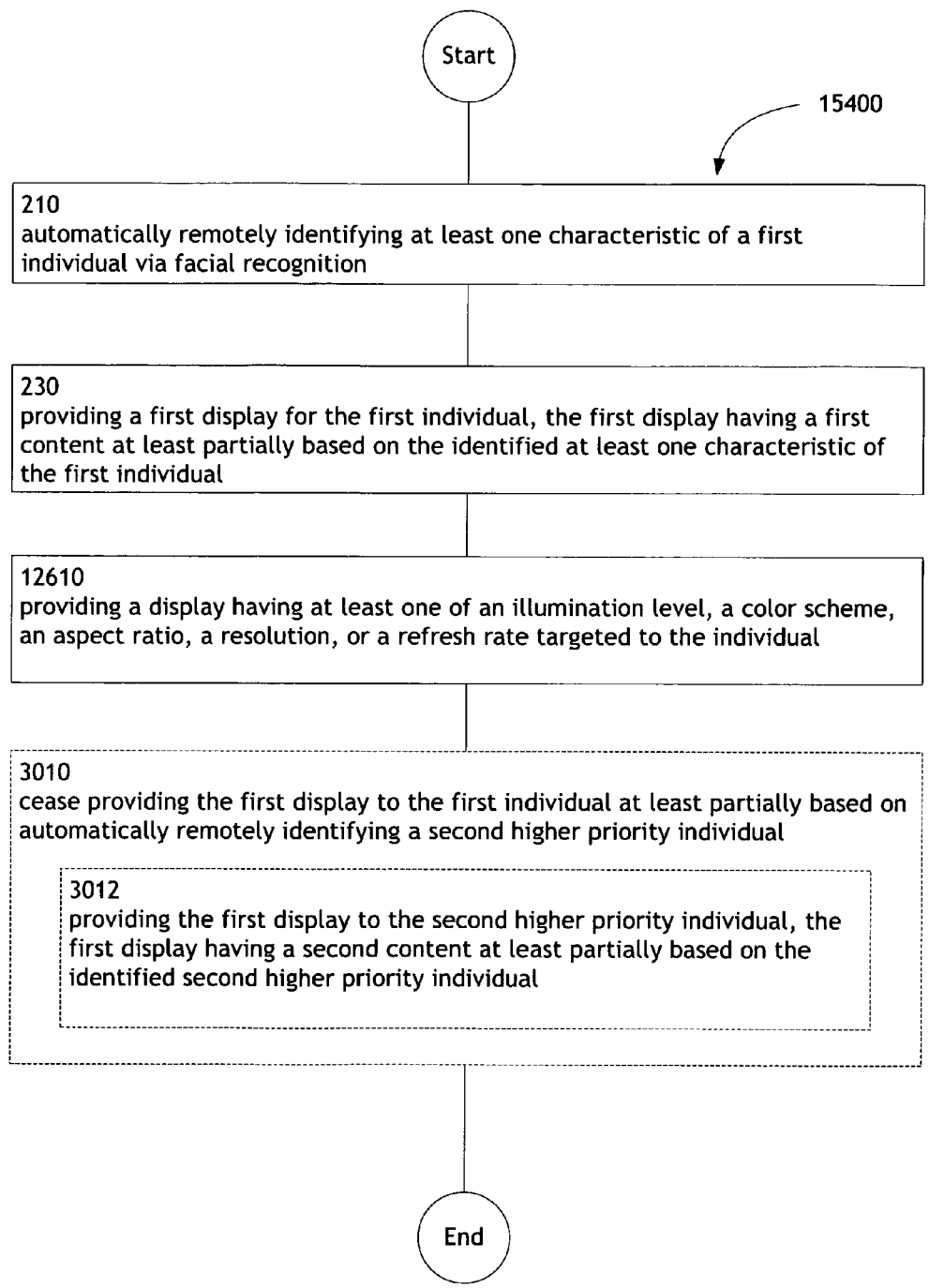

FIG. 154 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, and cease providing the display to the first individual at least partially based on automatically remotely identifying a second higher priority individual.

Figure 155:
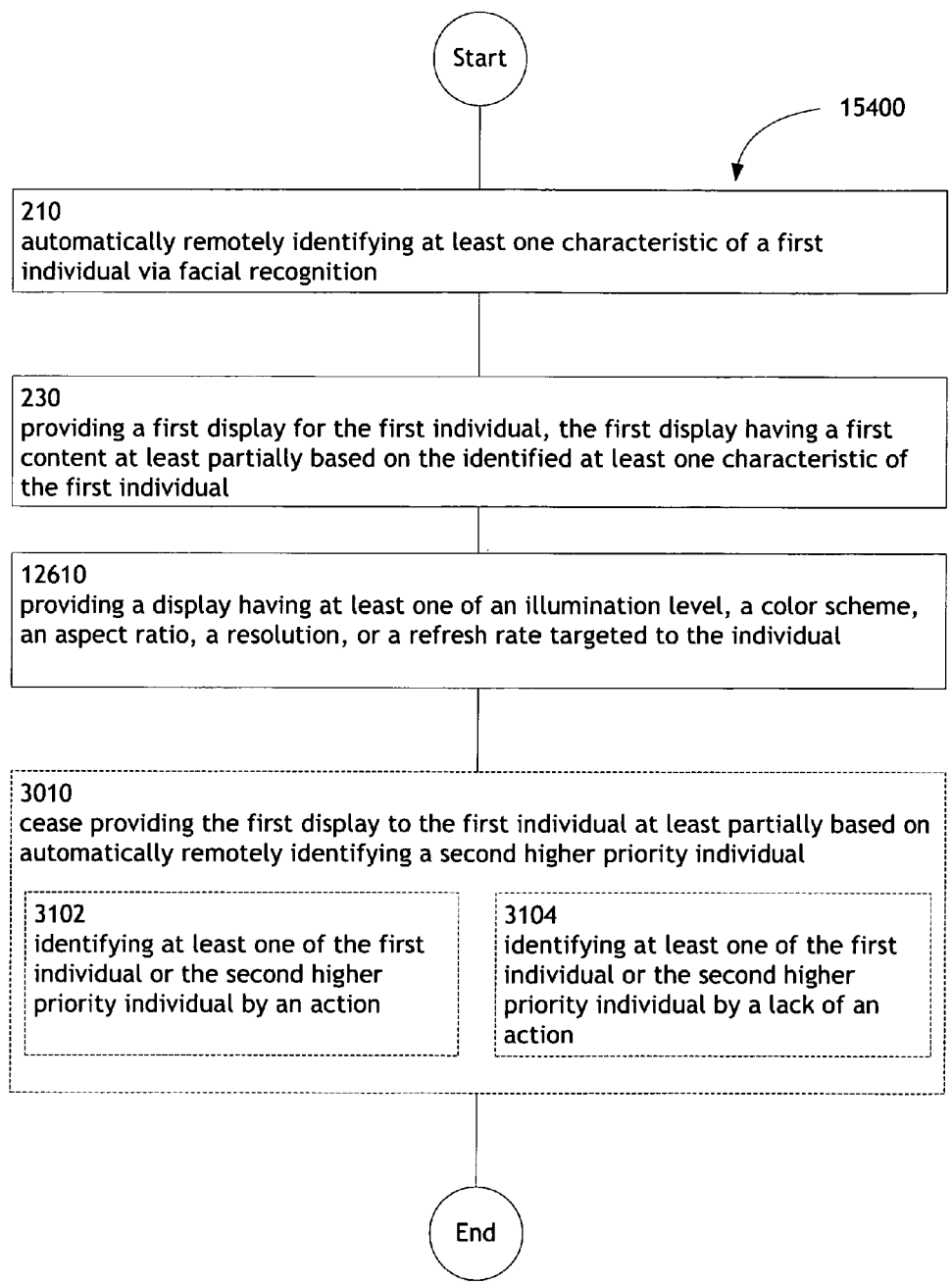

FIG. 155 illustrates an alternative embodiment of the operational flow of FIG. 154.

Figure 156:
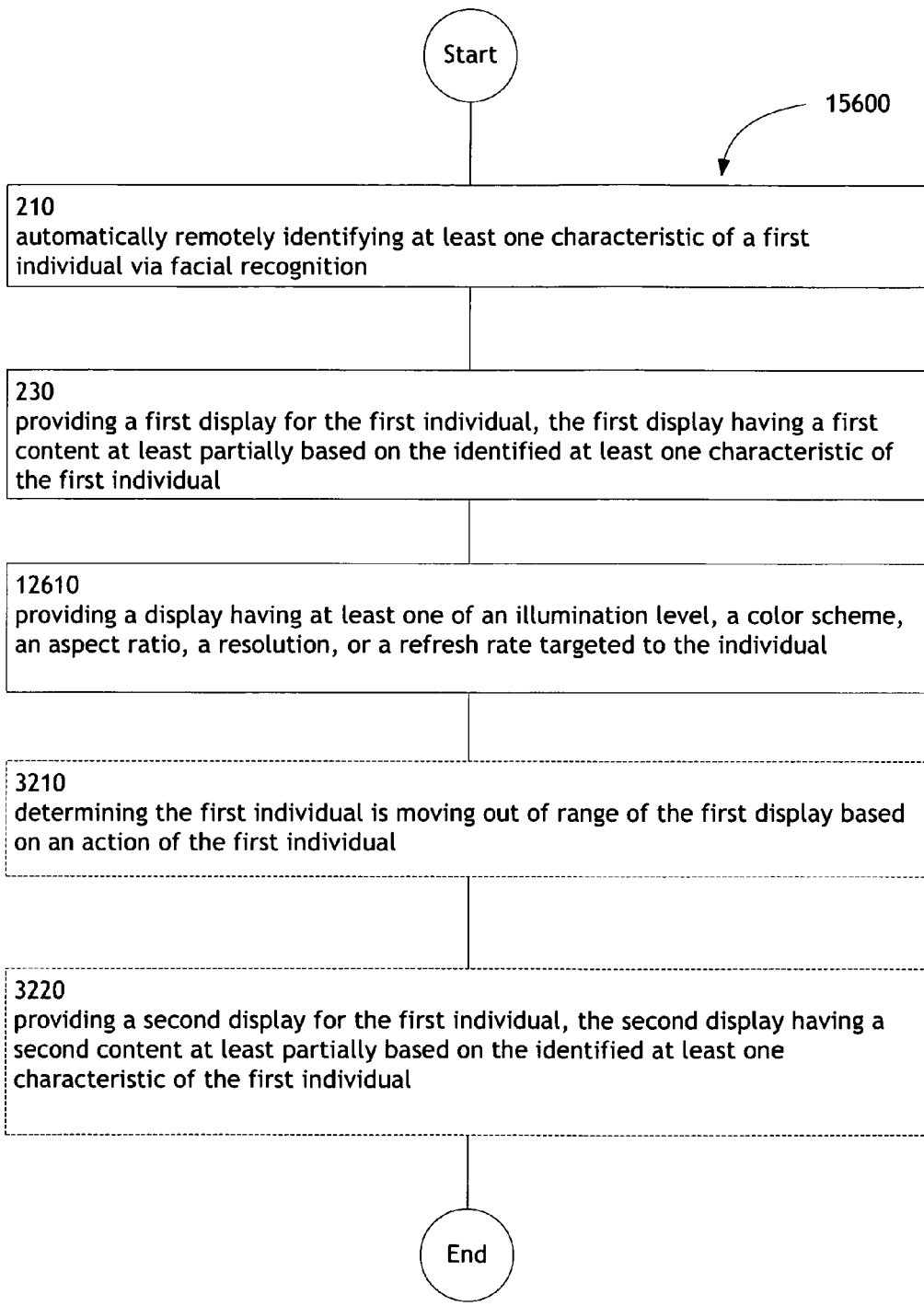

FIG. 156 illustrates an operational flow representing example operations related to automatically remotely identifying one or more characteristics of an individual utilizing facial recognition, providing a display for the individual having a content at least partially based on the one or more identified characteristics of the individual, providing a display having at least one of an illumination level, a color scheme, an aspect ratio, a resolution, or a refresh rate targeted to the individual, determining the individual is moving out of range of the display based on an action of the individual, and providing a second display for the individual, the second display having a second content at least partially based on the identified at least one characteristic of the individual.

Figure 157:
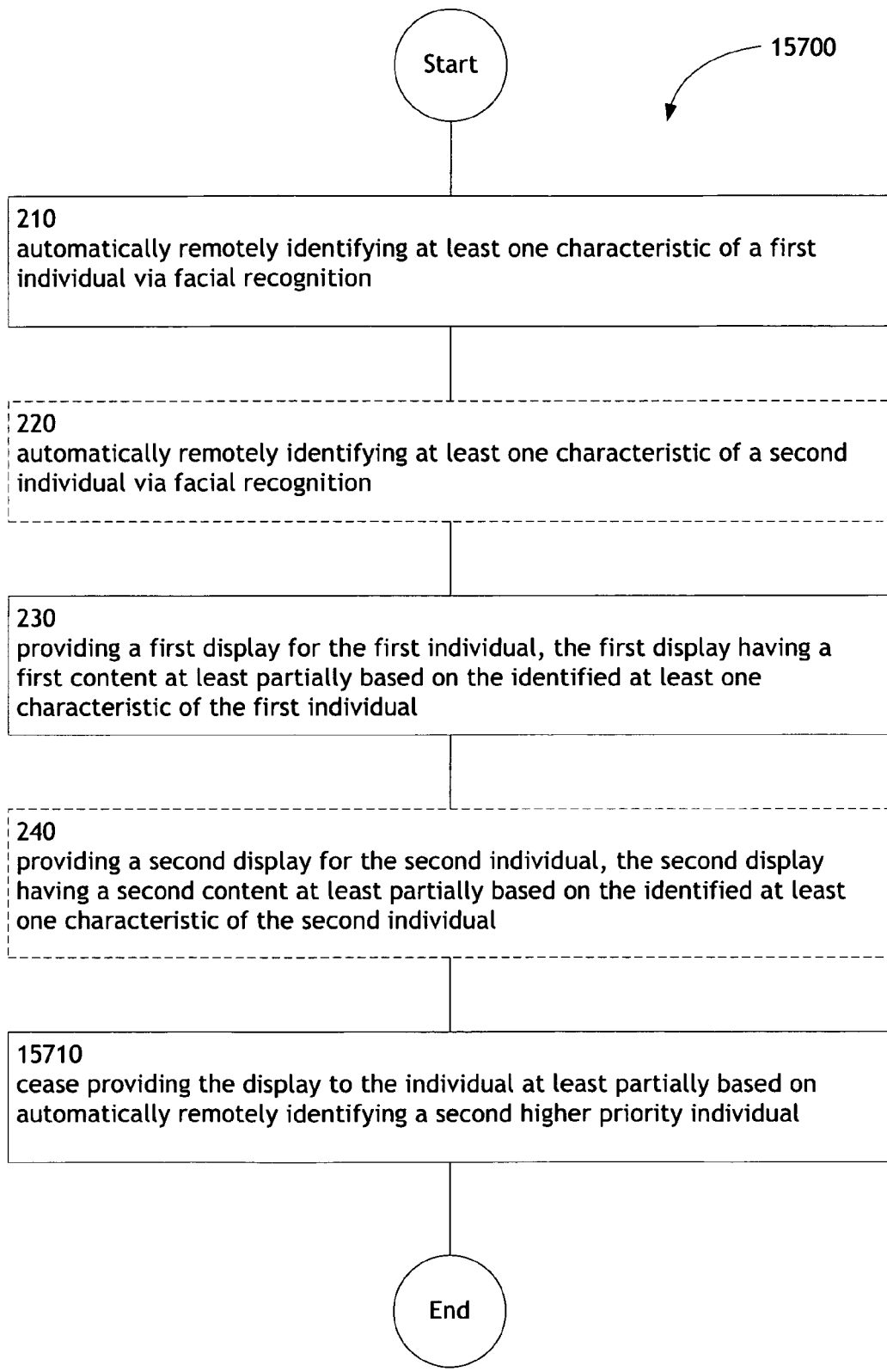

FIG. 157 illustrates an operational flow representing example operations related to automatically remotely identifying one or more characteristics of an individual utilizing facial recognition, providing a display for the individual having a content at least partially based on the one or more identified characteristics of the individual, and cease providing the display to the individual at least partially based on automatically remotely identifying a second higher priority individual.

Figure 158:
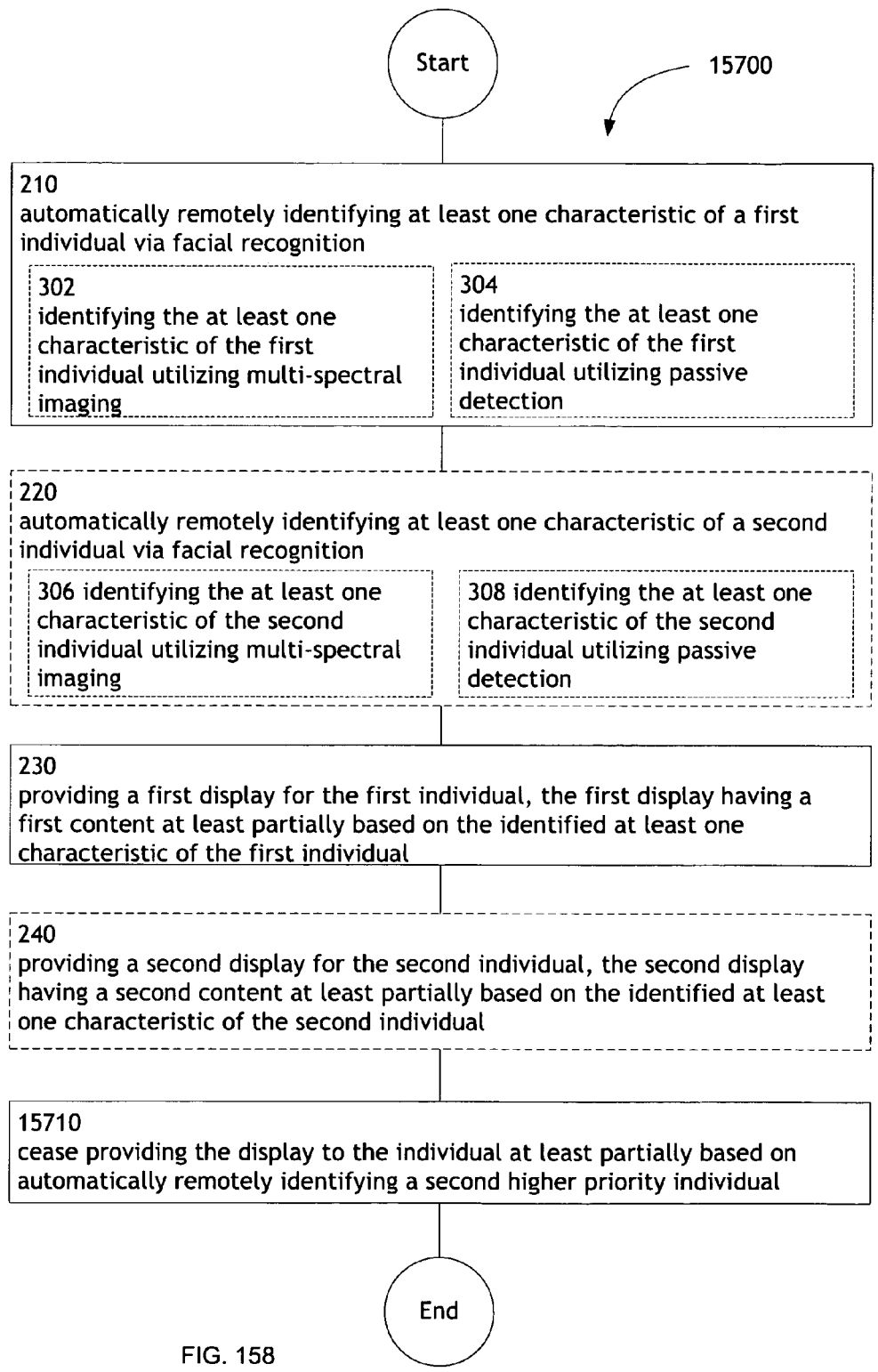

FIG. 158 illustrates an alternative embodiment of the operational flow of FIG. 157.

Figure 159:
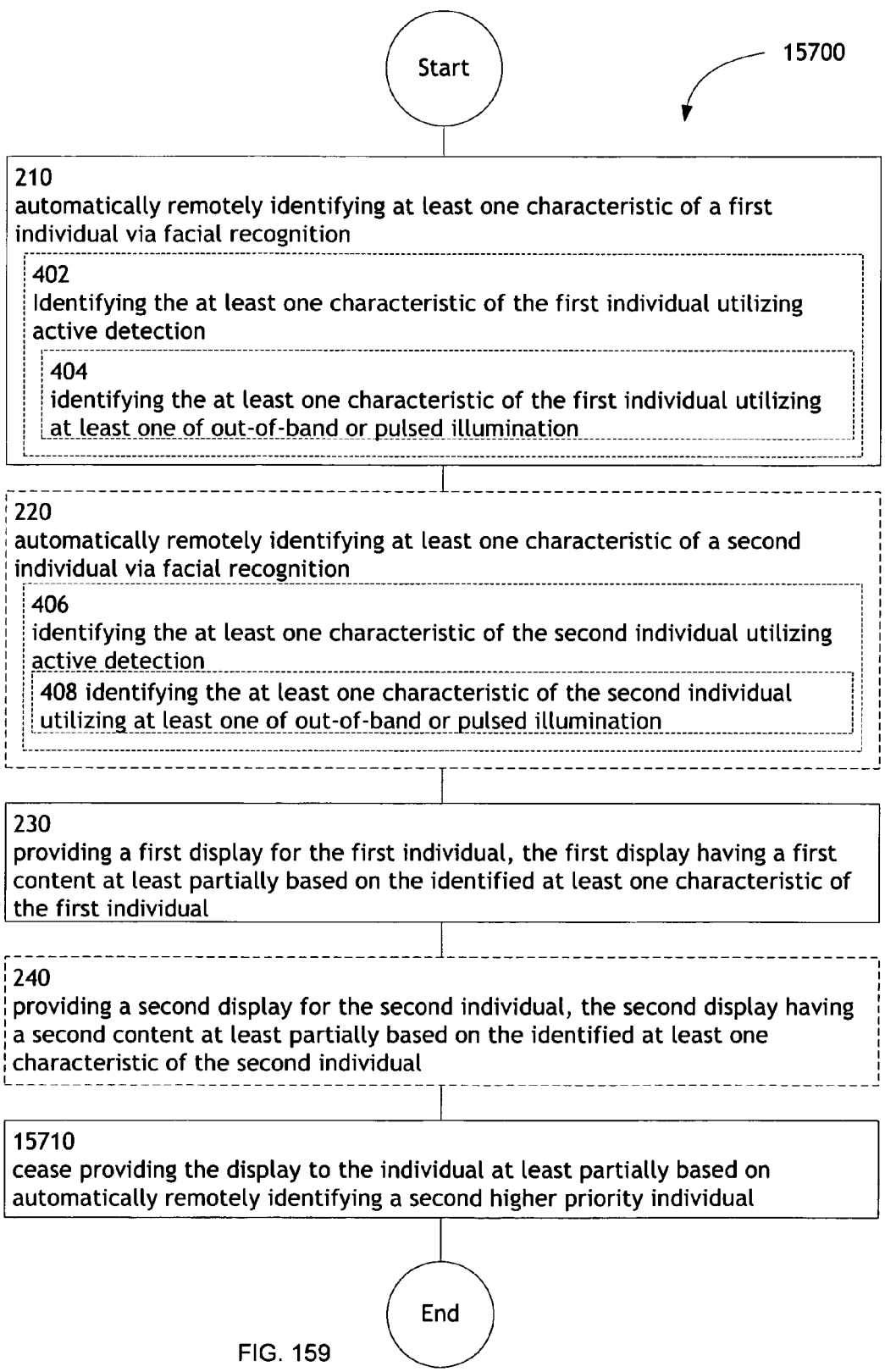

FIG. 159 illustrates an alternative embodiment of the operational flow of FIG. 157.

Figure 160:
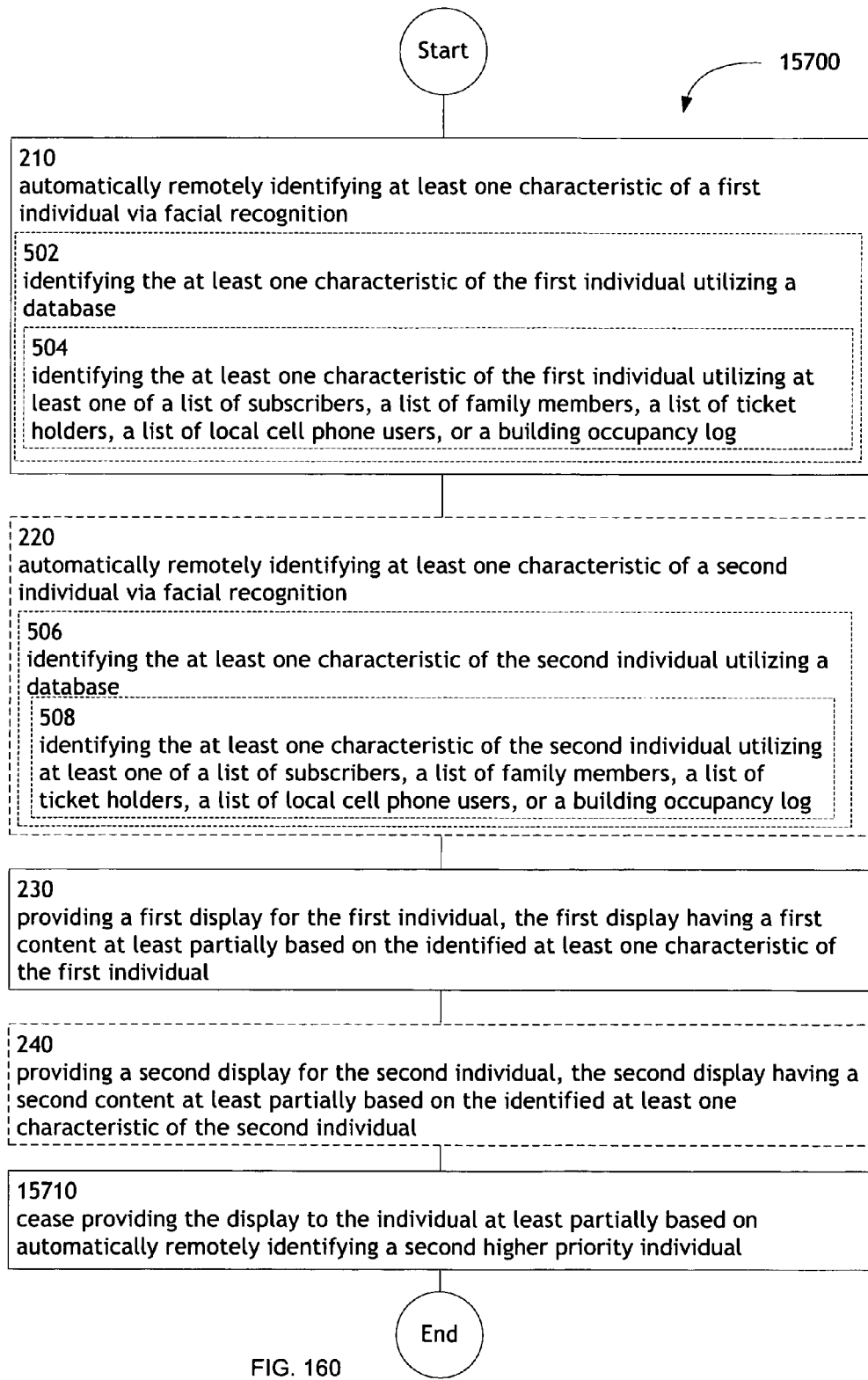

FIG. 160 illustrates an alternative embodiment of the operational flow of FIG. 157.

Figure 161:
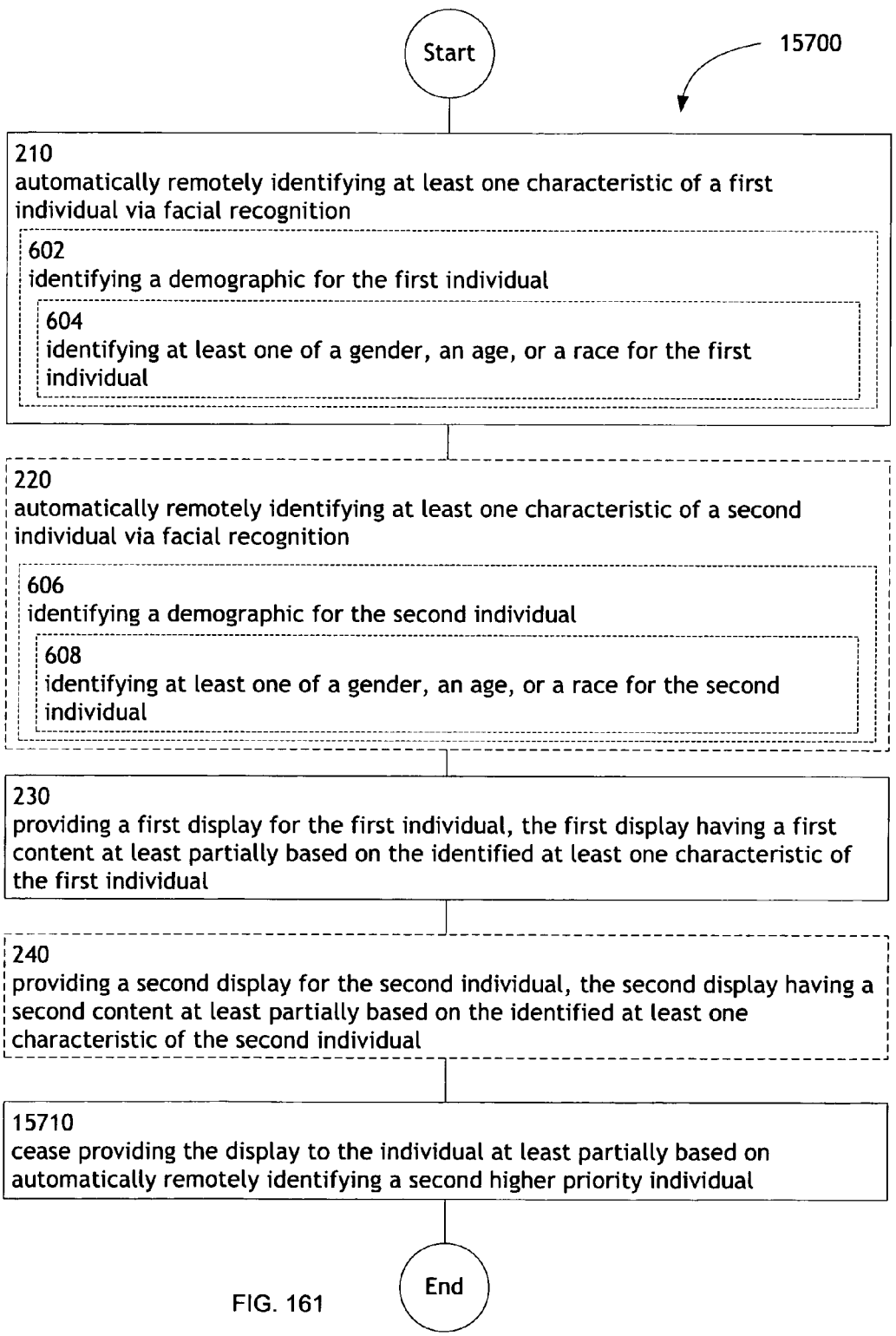

FIG. 161 illustrates an alternative embodiment of the operational flow of FIG. 157.

Figure 162:
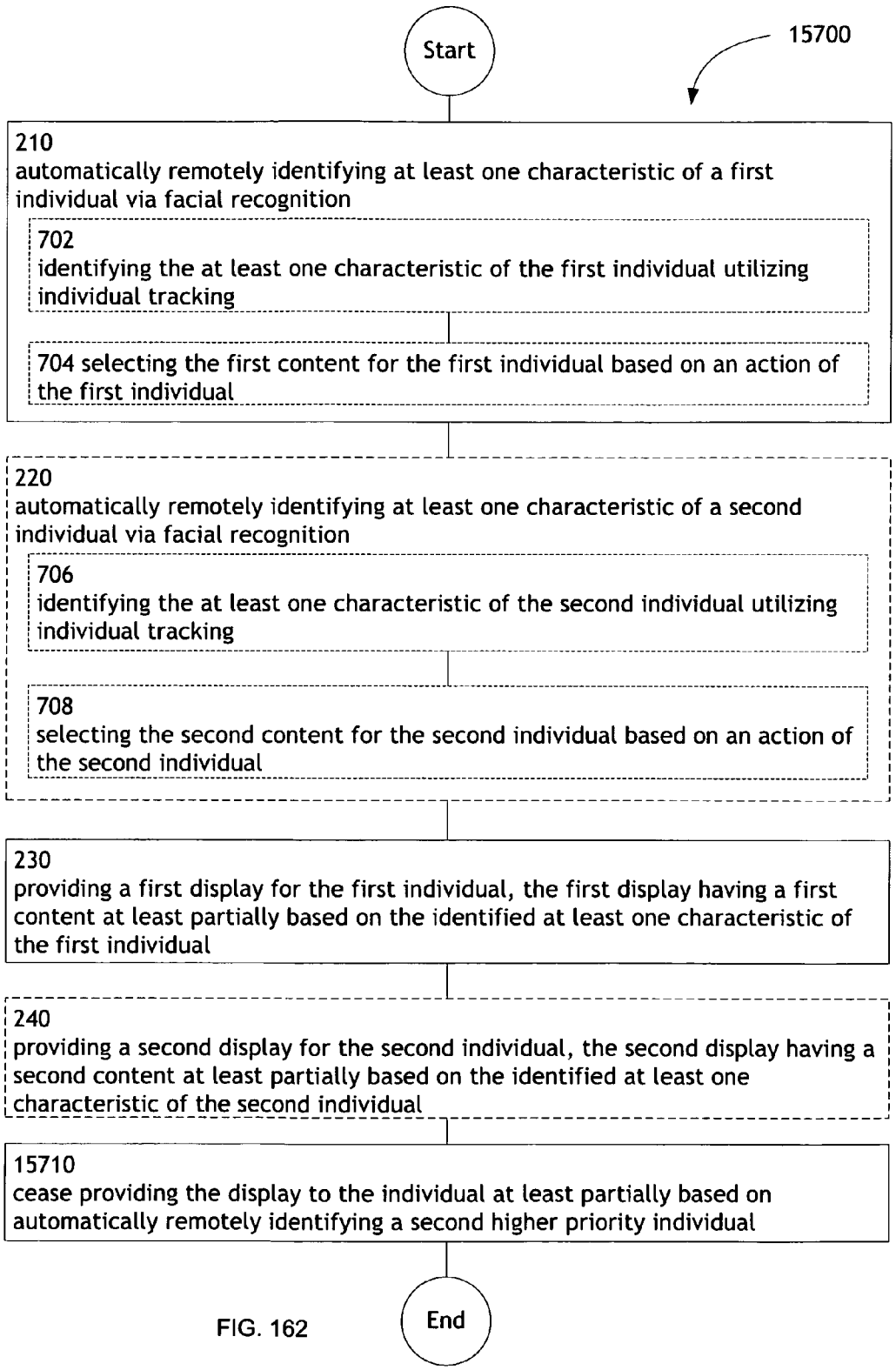

FIG. 162 illustrates an alternative embodiment of the operational flow of FIG. 157.

Figure 163A:
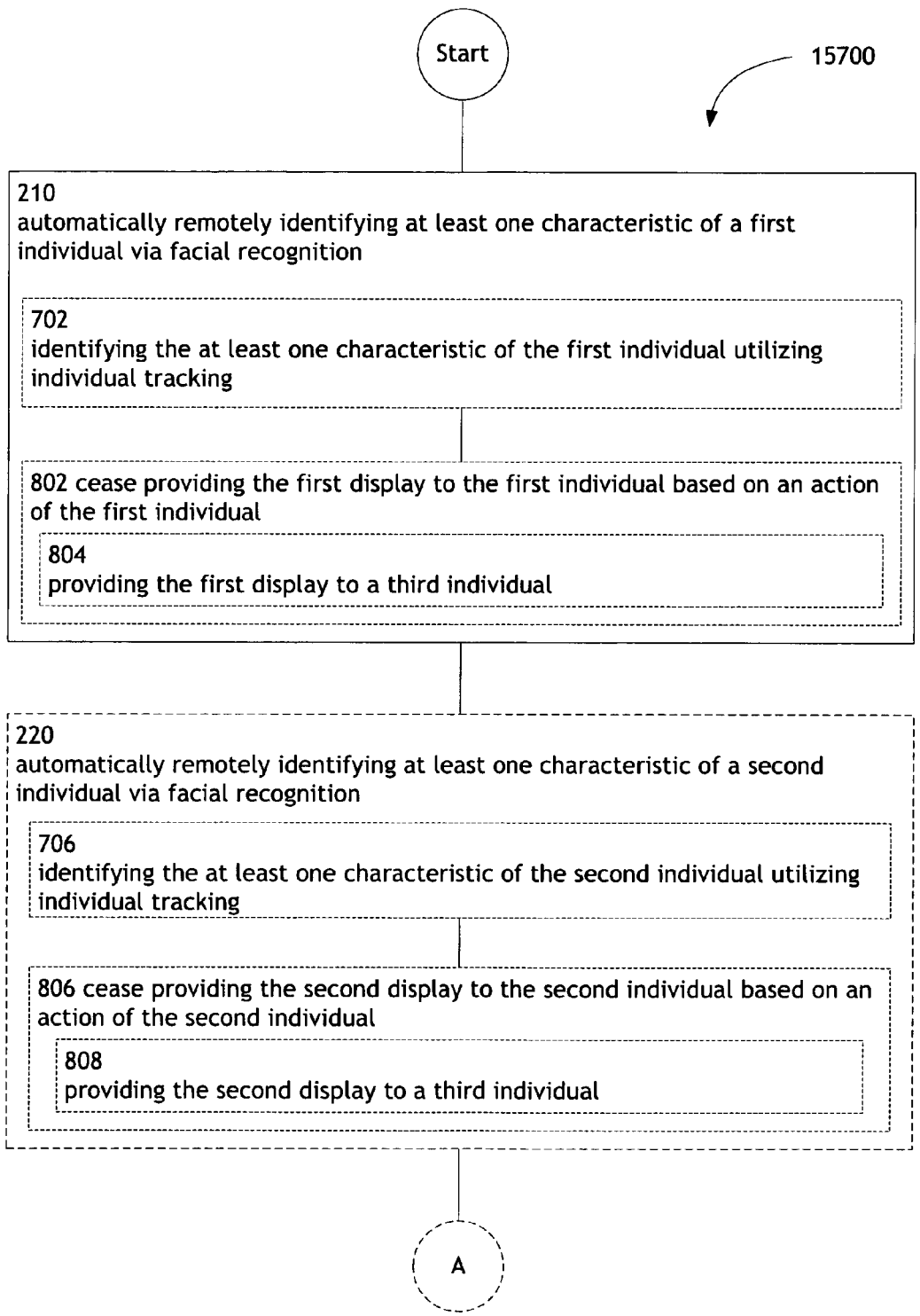
Figure 163B:
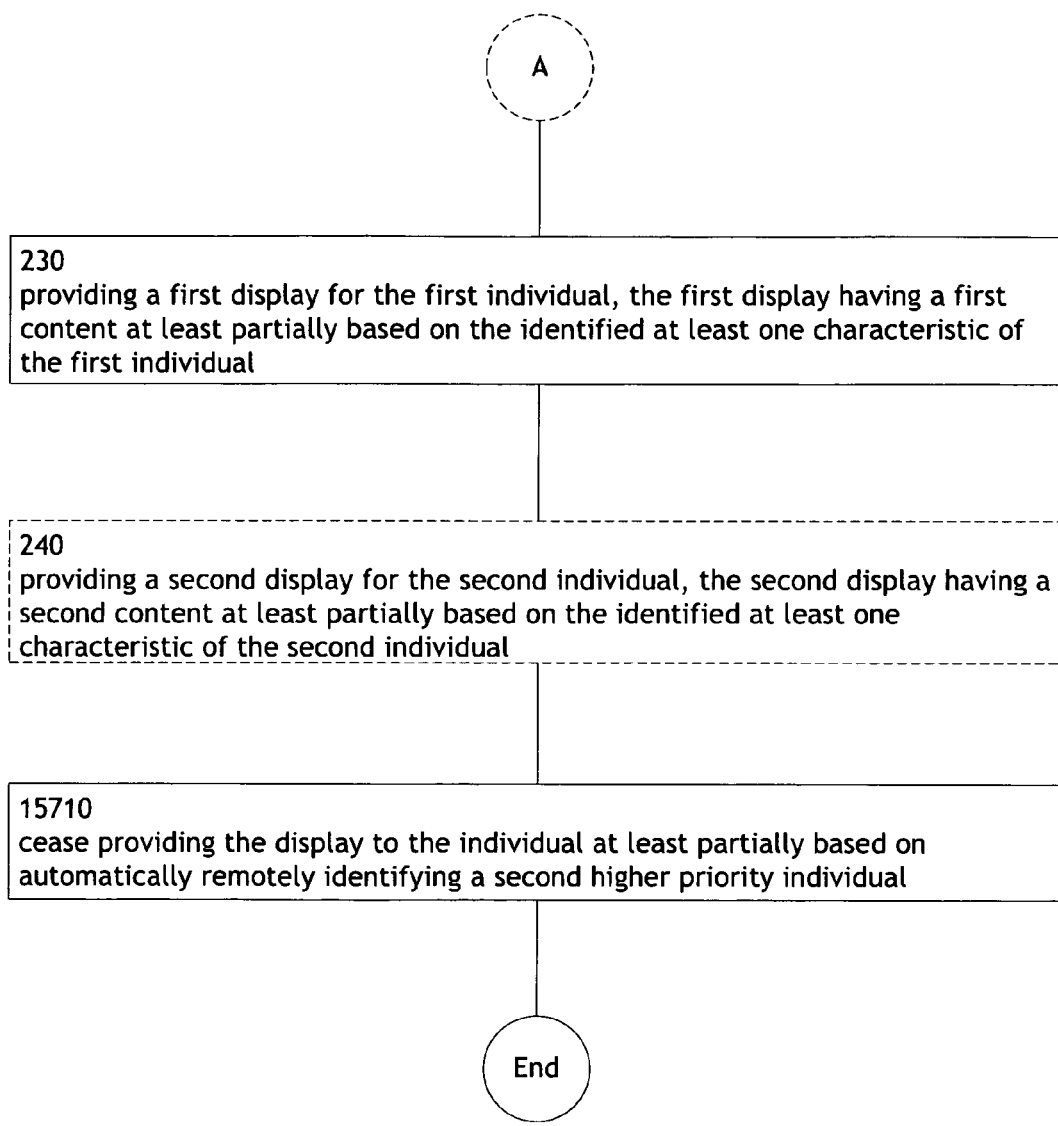

FIG. 163 illustrates an alternative embodiment of the operational flow of FIG. 157.

Figure 164:
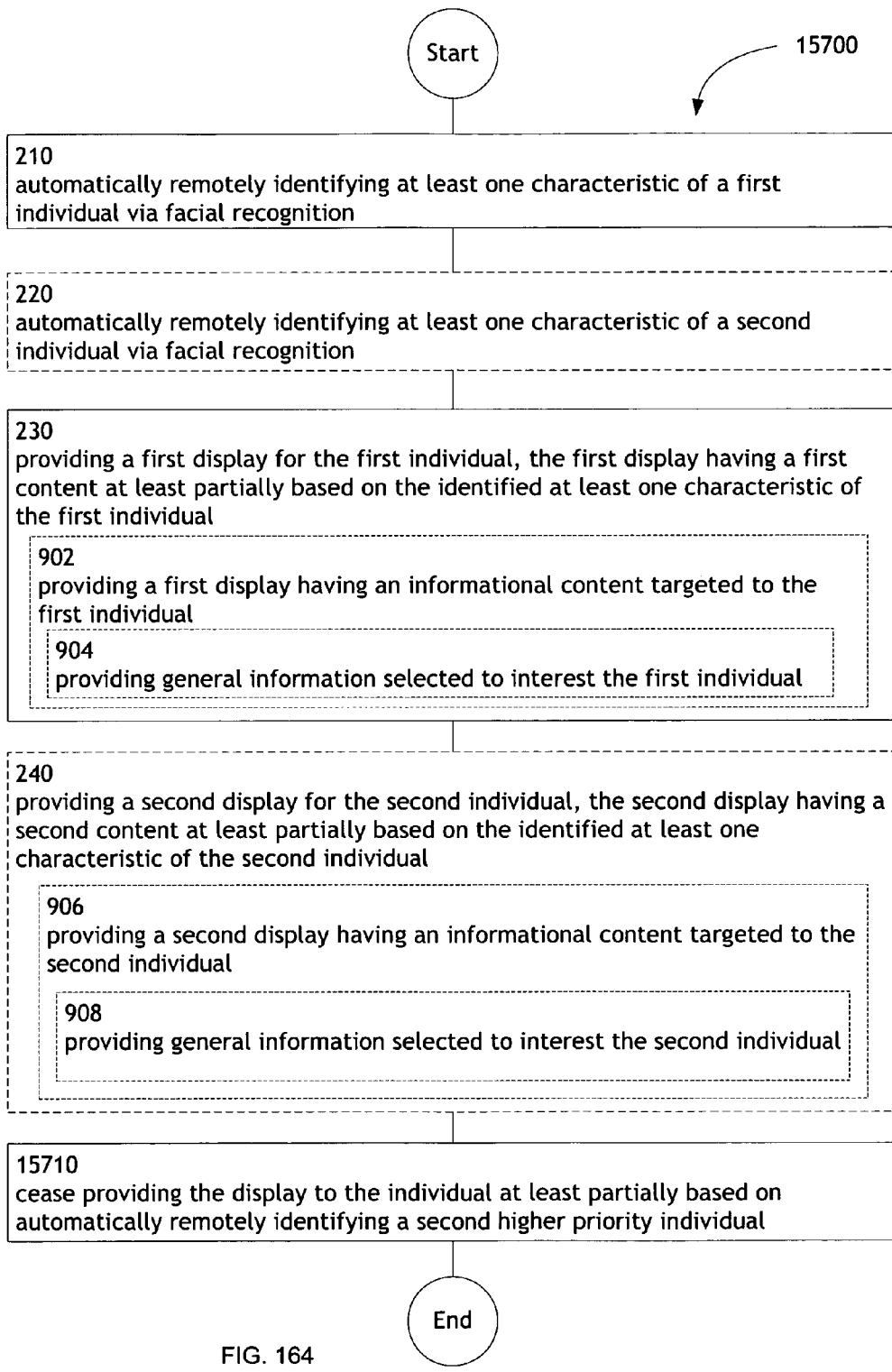

FIG. 164 illustrates an alternative embodiment of the operational flow of FIG. 157.

Figure 165A:
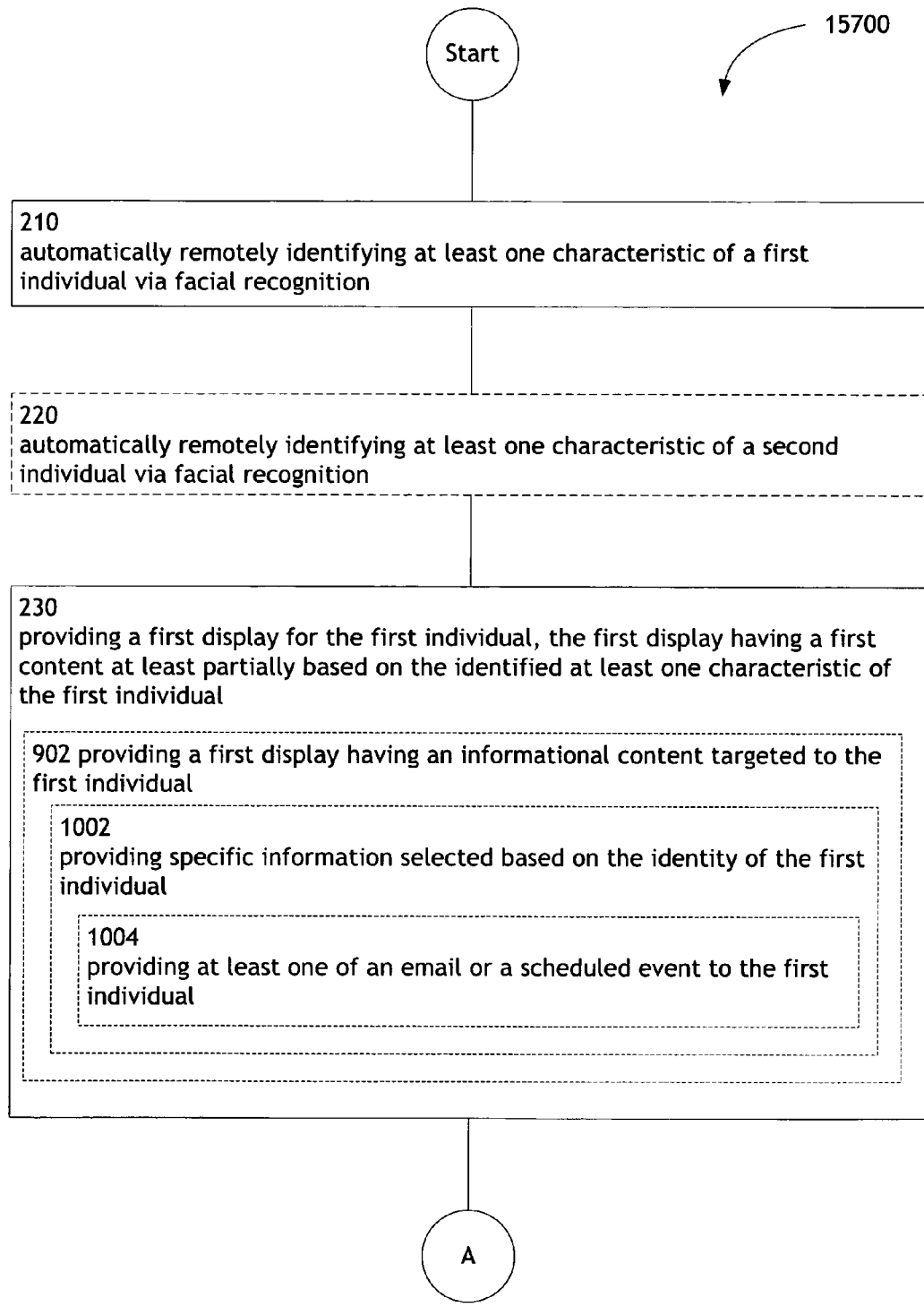
Figure 165B:
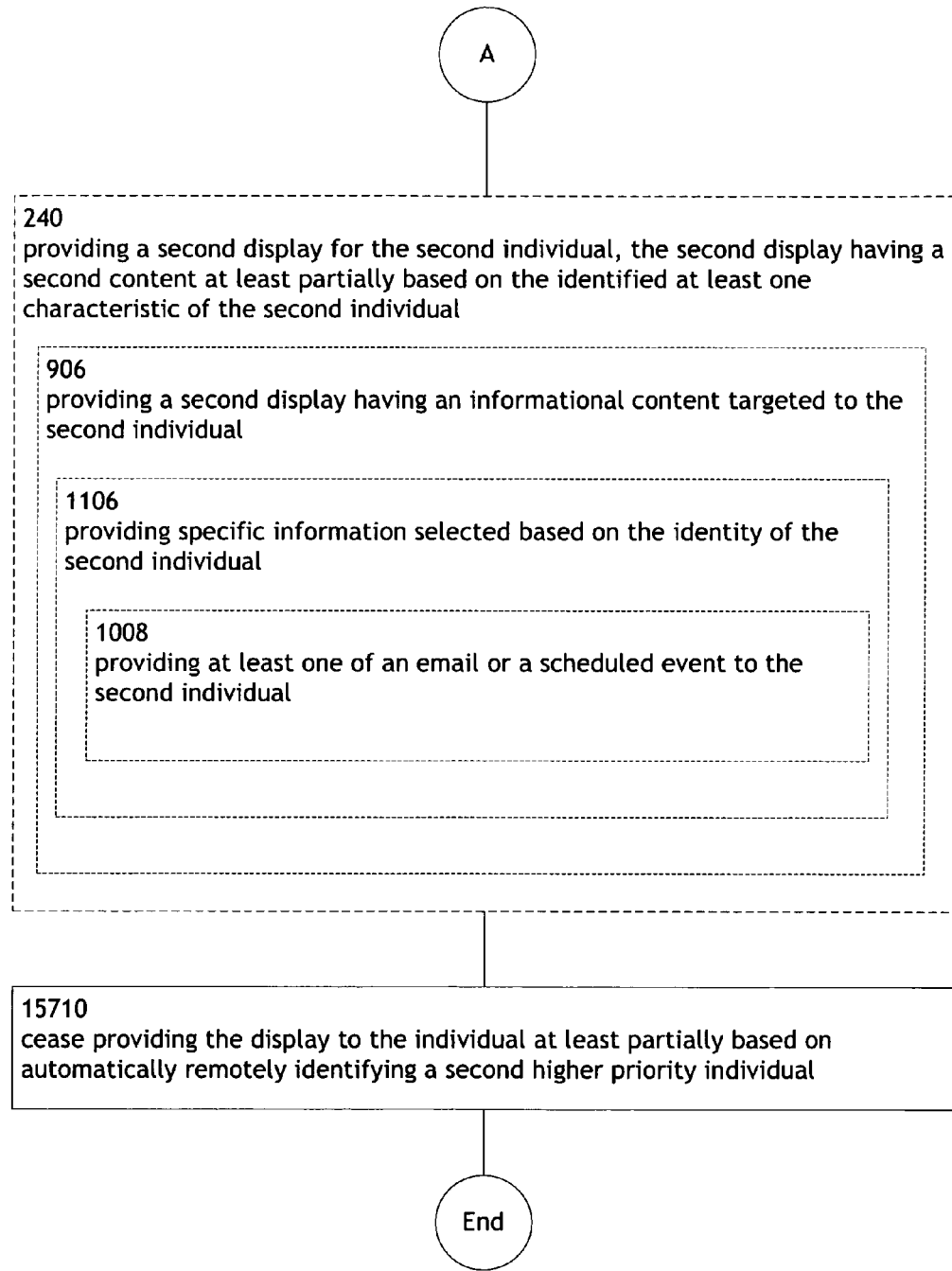

FIG. 165 illustrates an alternative embodiment of the operational flow of FIG. 157.

Figure 166:
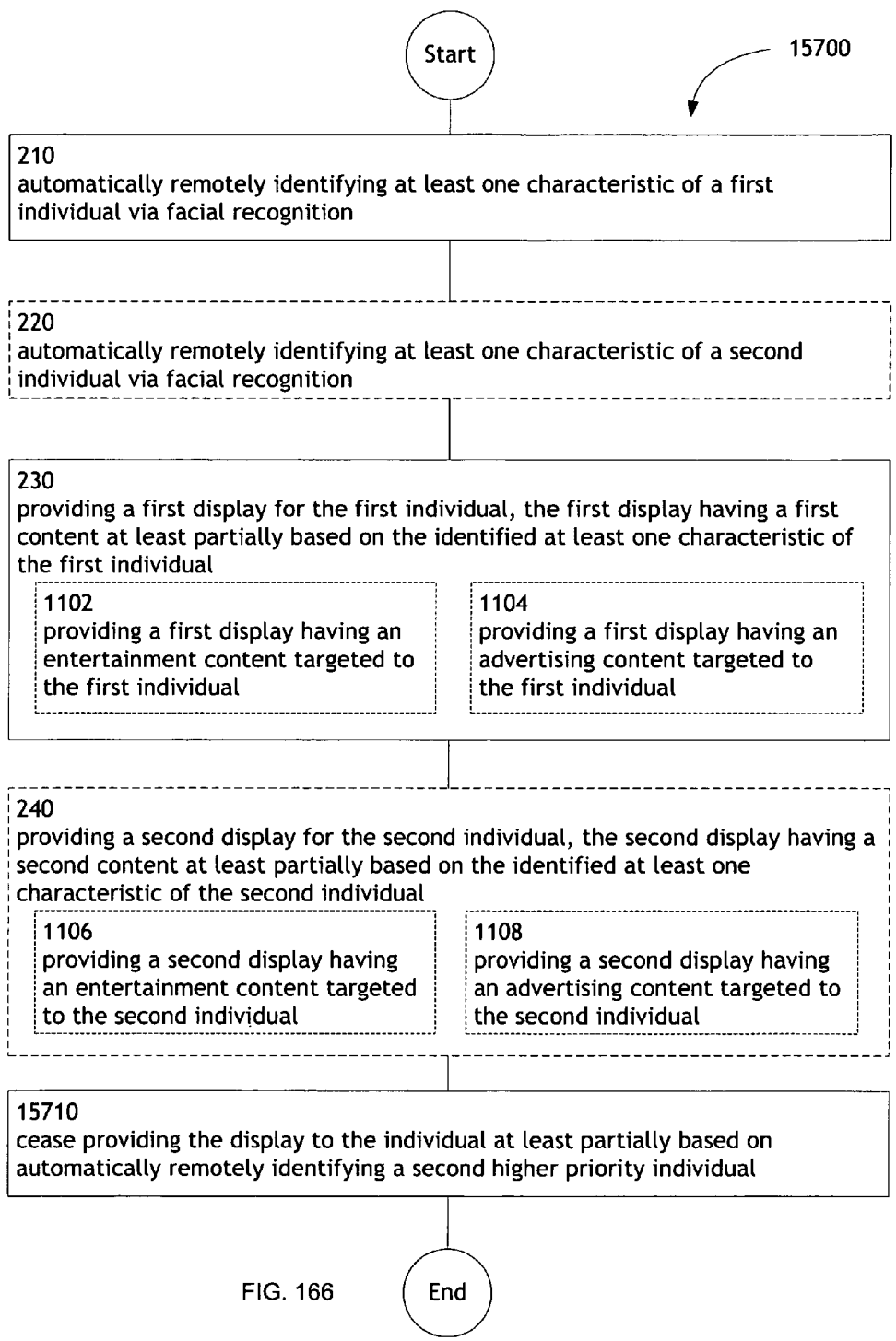

FIG. 166 illustrates an alternative embodiment of the operational flow of FIG. 157.

Figure 167:
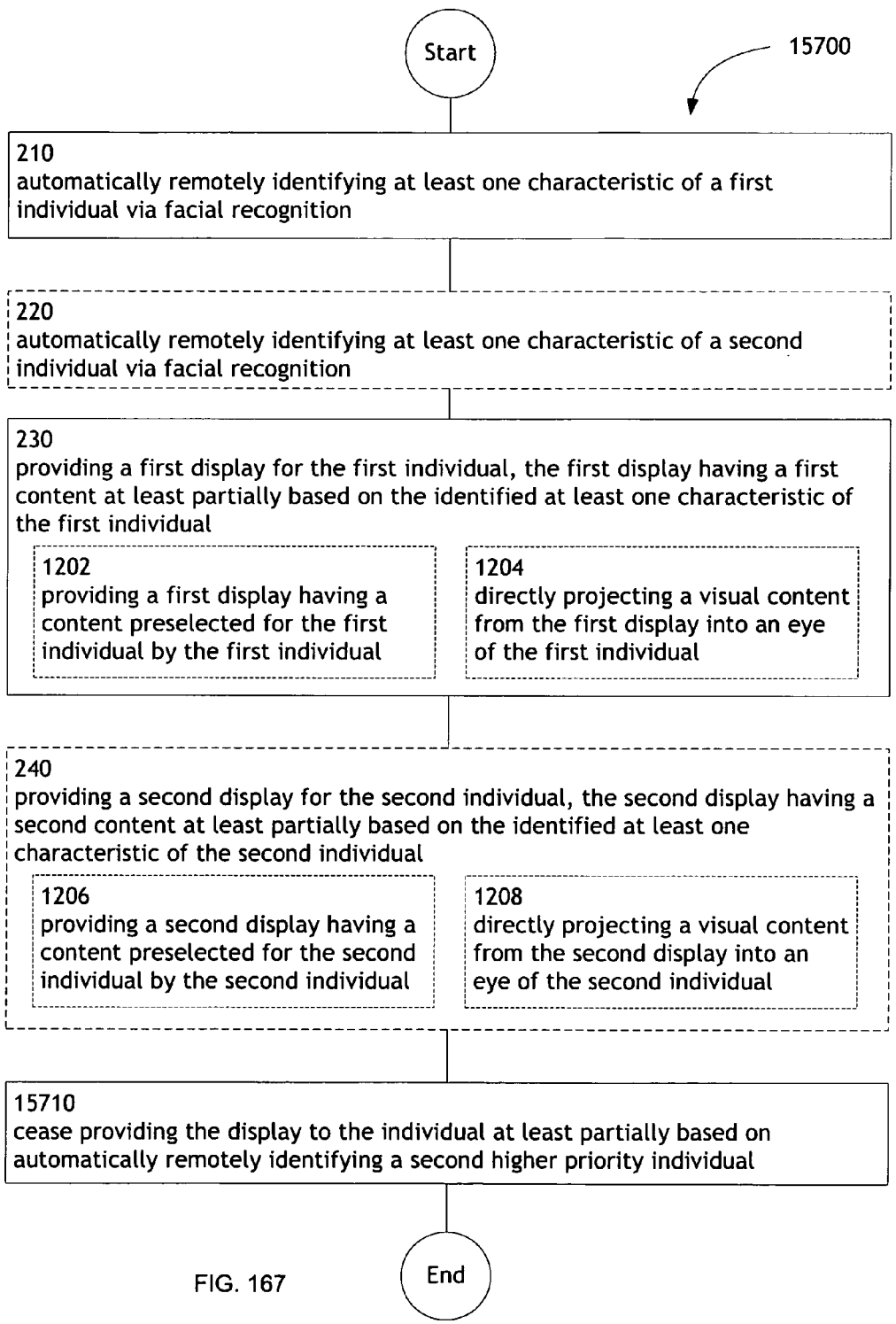

FIG. 167 illustrates an alternative embodiment of the operational flow of FIG. 157.

Figure 168:
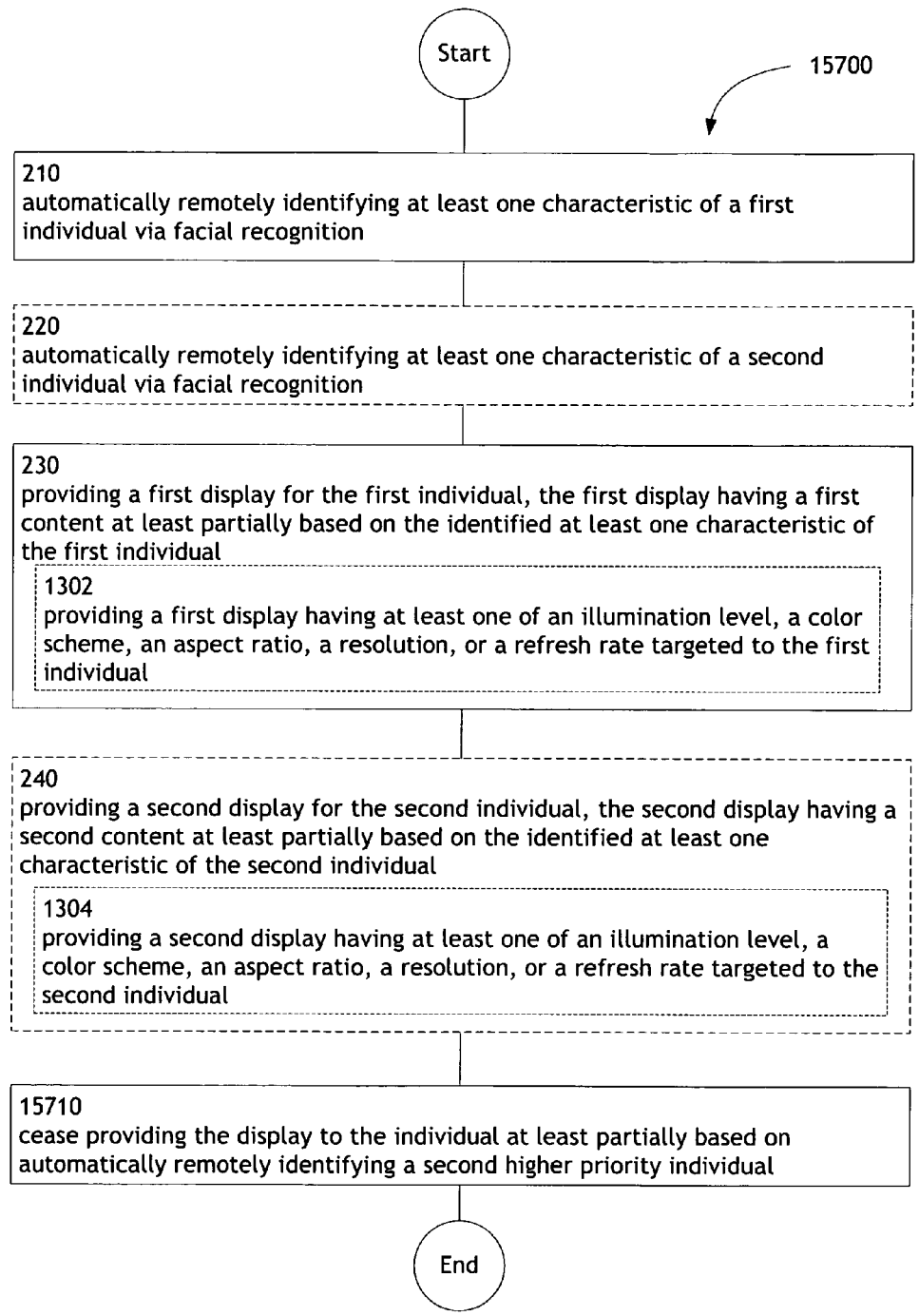

FIG. 168 illustrates an alternative embodiment of the operational flow of FIG. 157.

Figure 169:
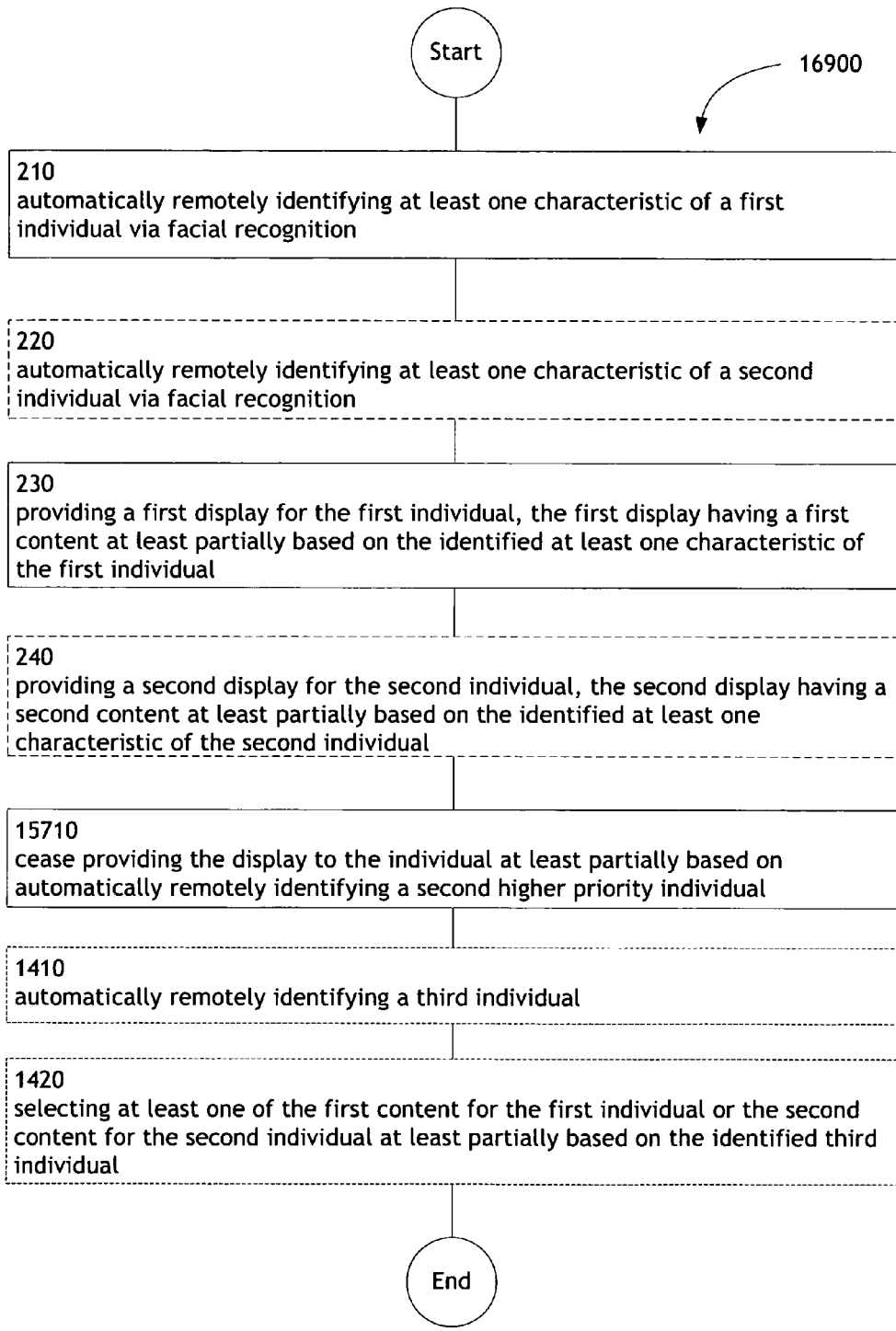

FIG. 169 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, automatically remotely identifying a third individual, and selecting the content for the first individual at least partially based on the identified third individual.

Figure 170A:
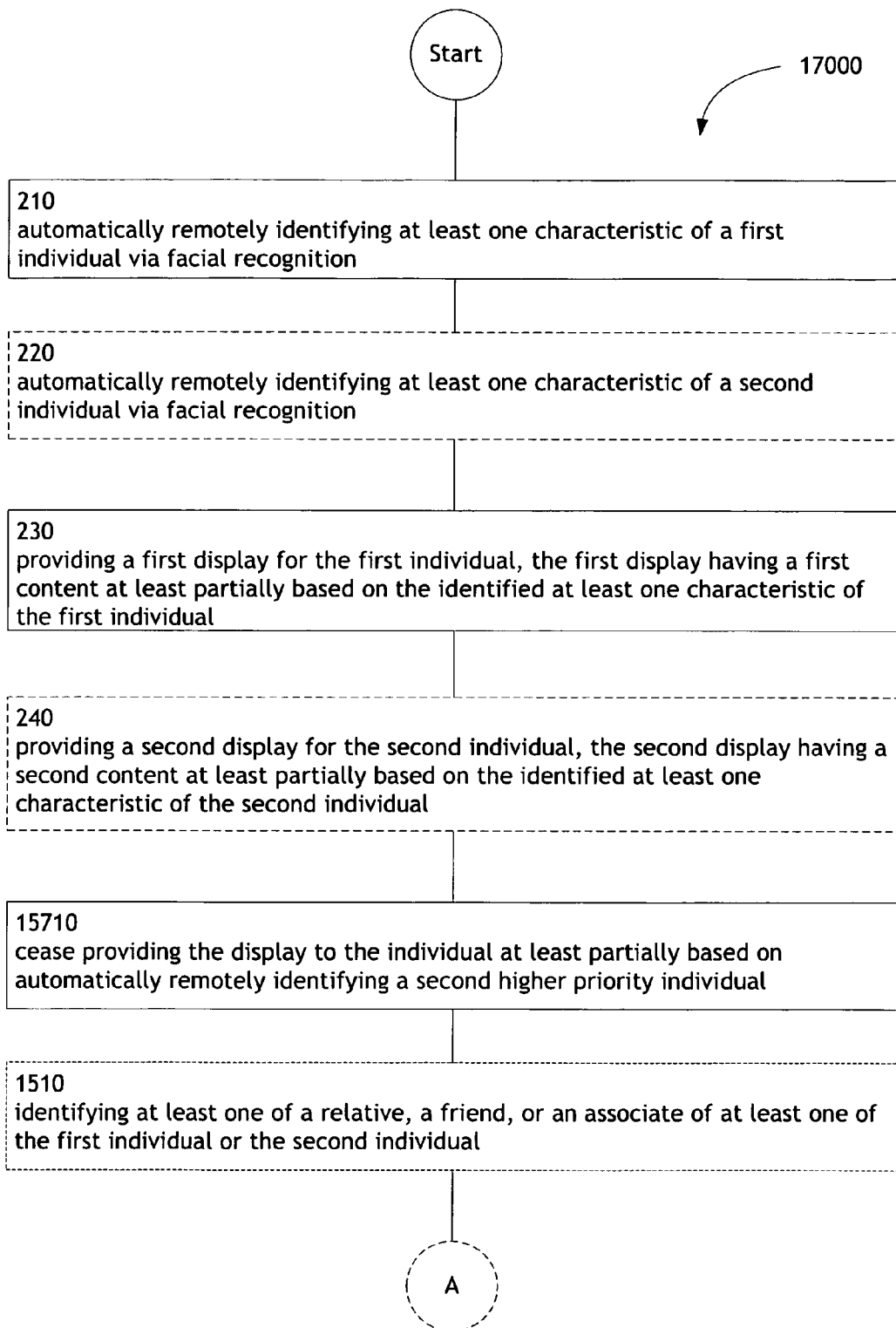

FIG. 170 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, identifying at least one of a relative, a friend, or an associate of the individual, and selecting the content for the individual at least partially based on the identity of the at least one of the relative, the friend, or the associate of the individual.

Figure 171:
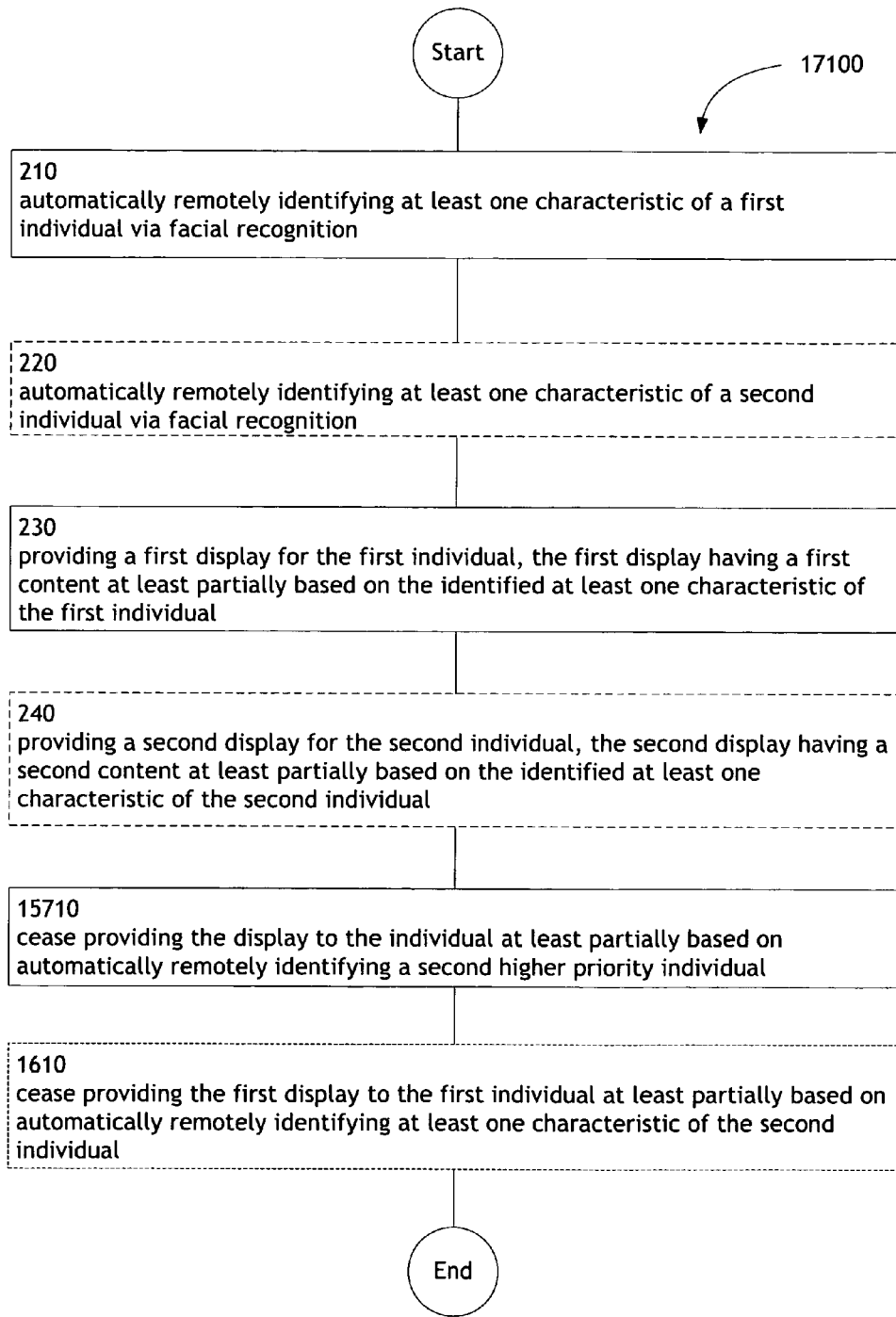

FIG. 171 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, and cease providing the display to the first individual at least partially based on automatically remotely identifying at least one characteristic of a second individual.

Figure 172A:
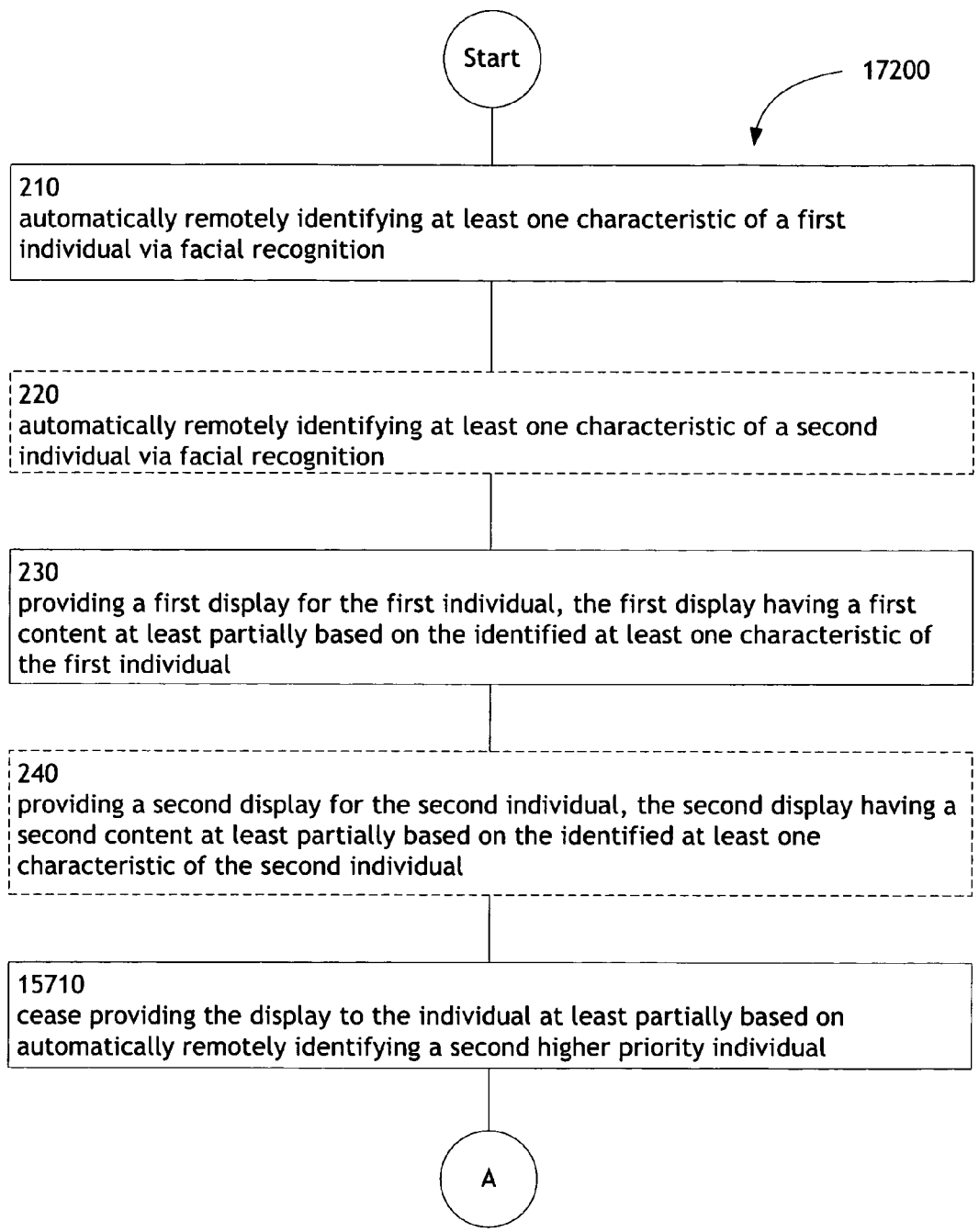
Figure 172B:
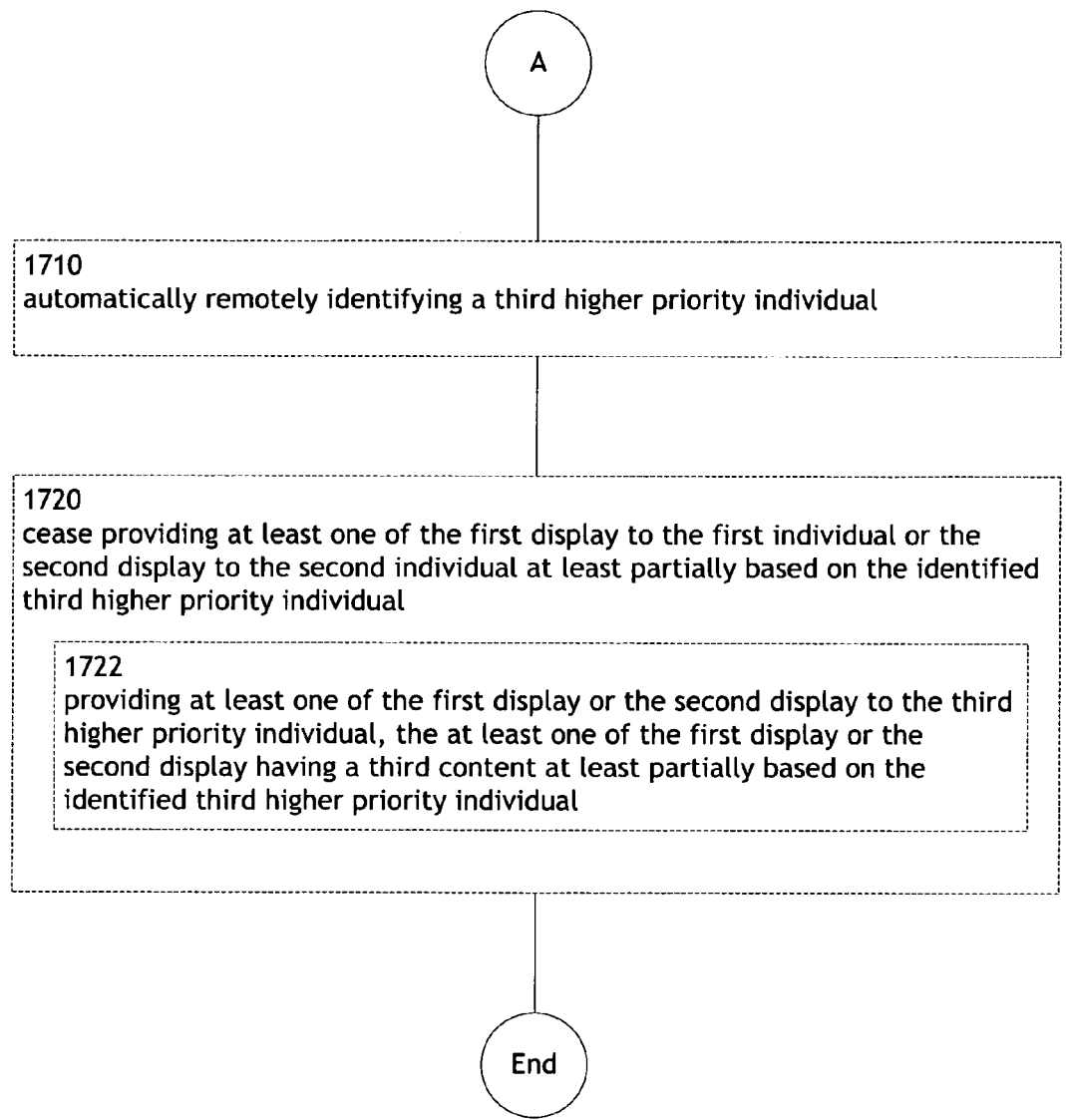

FIG. 172 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, automatically remotely identifying a third higher priority individual, and cease providing the display to the first individual at least partially based on the identified third higher priority individual.

Figure 173:
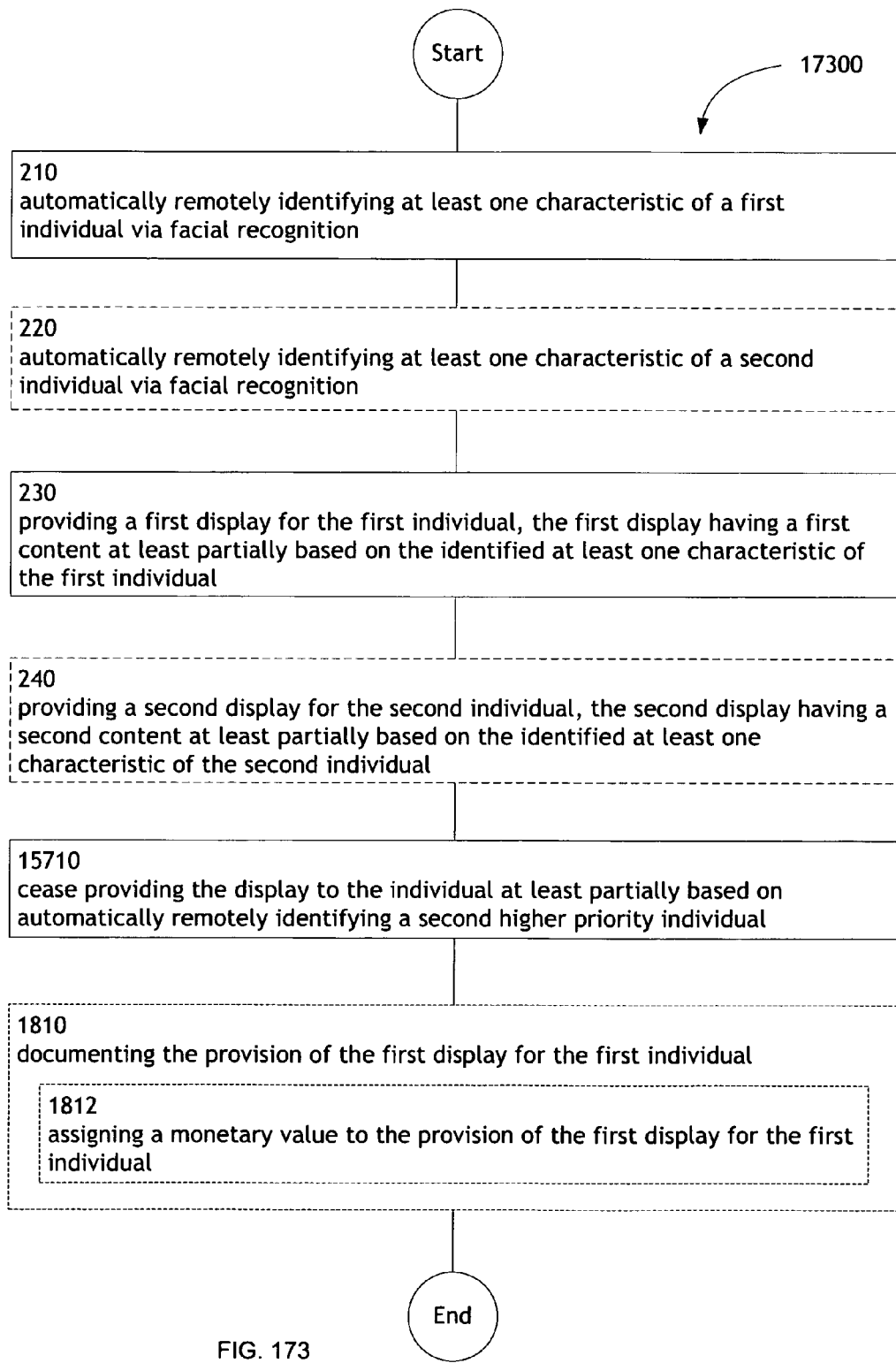

FIG. 173 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, and documenting the provision of the display for the individual.

Figure 174:
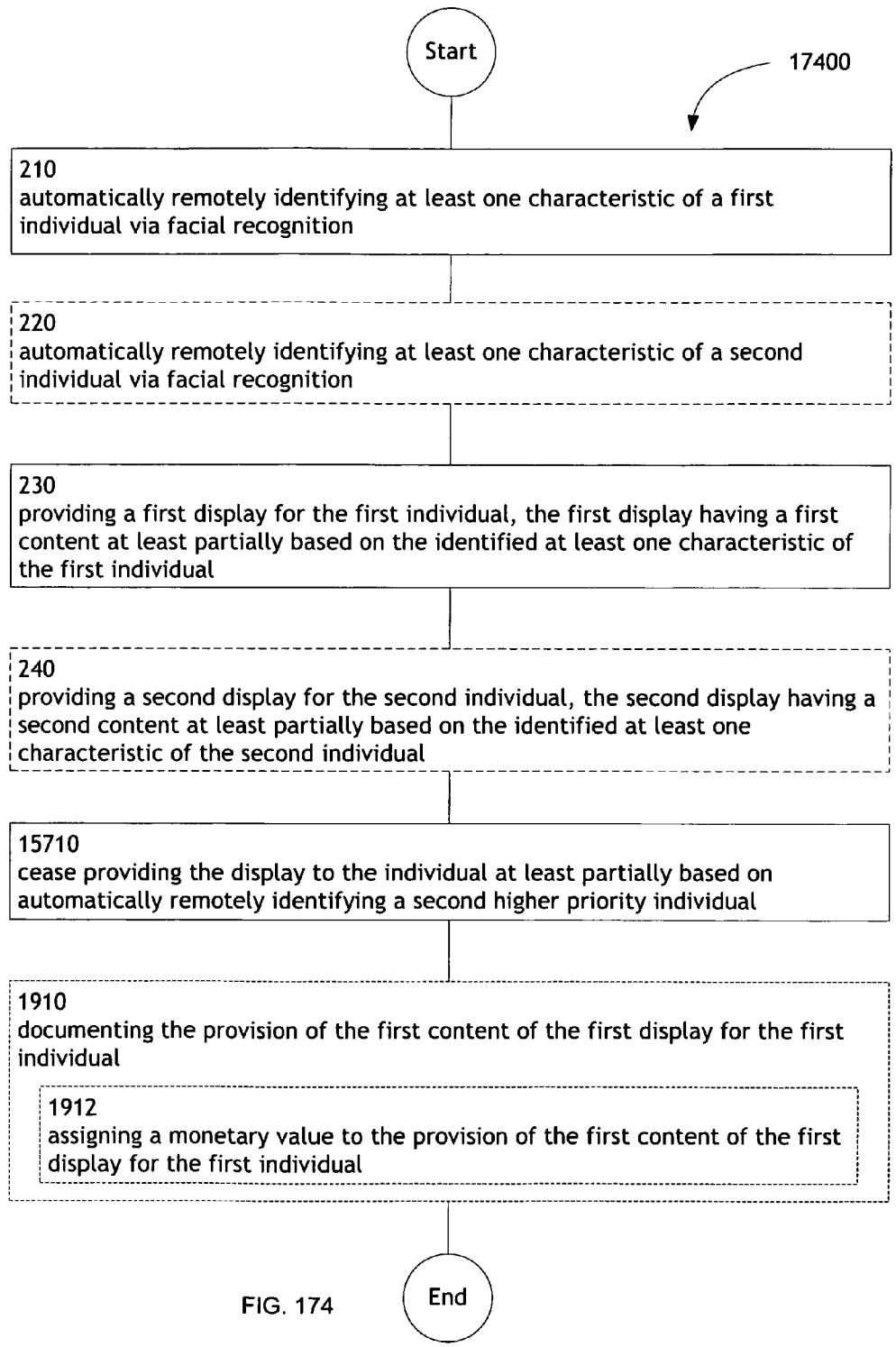

FIG. 174 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, and documenting the provision of the content of the display for the individual.

Figure 175:
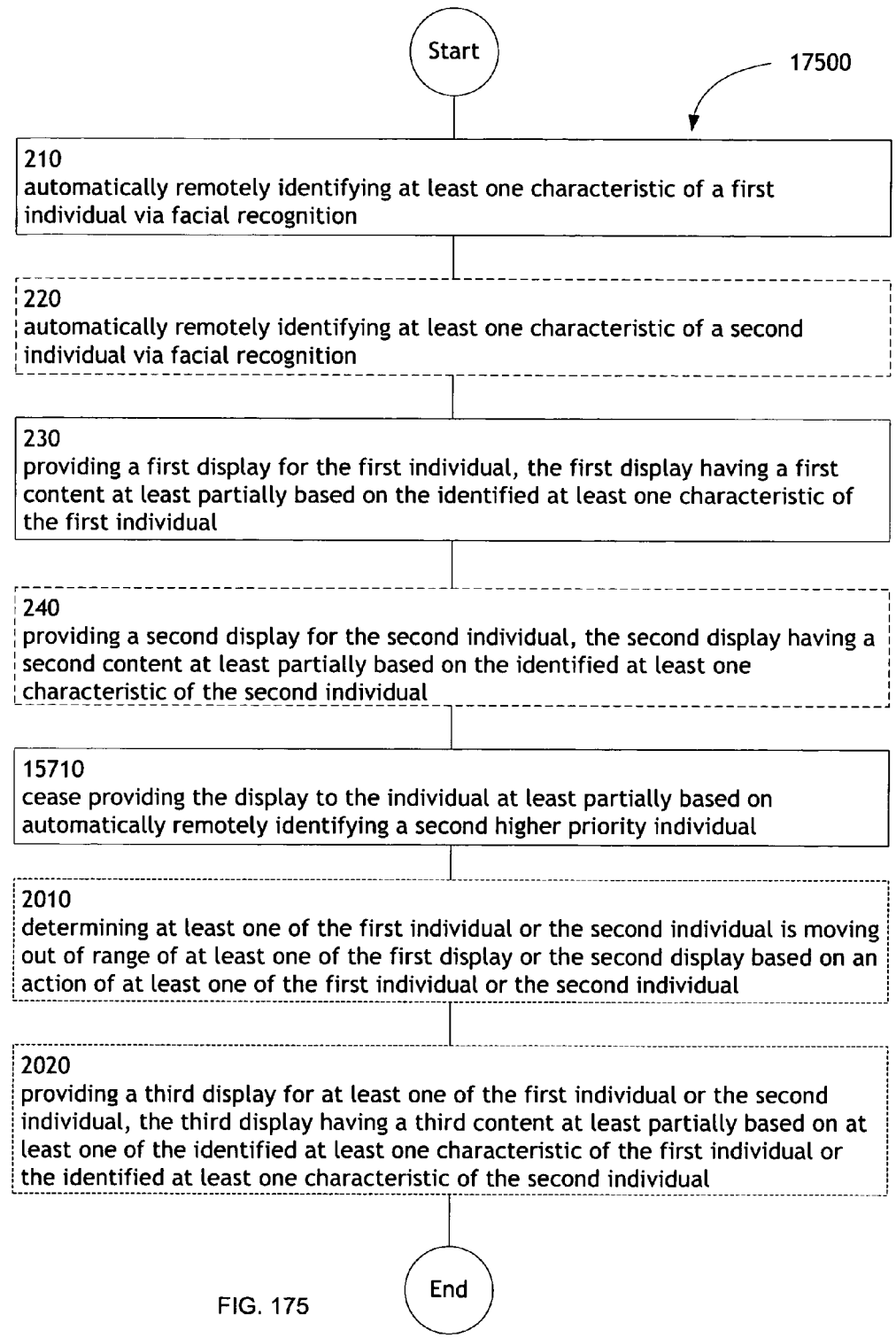

FIG. 175 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, determining the individual is moving out of range of the display based on an action of the individual, and providing a third display for the individual, the third display having a third content at least partially based on the identified at least one characteristic of the individual.

Figure 176:
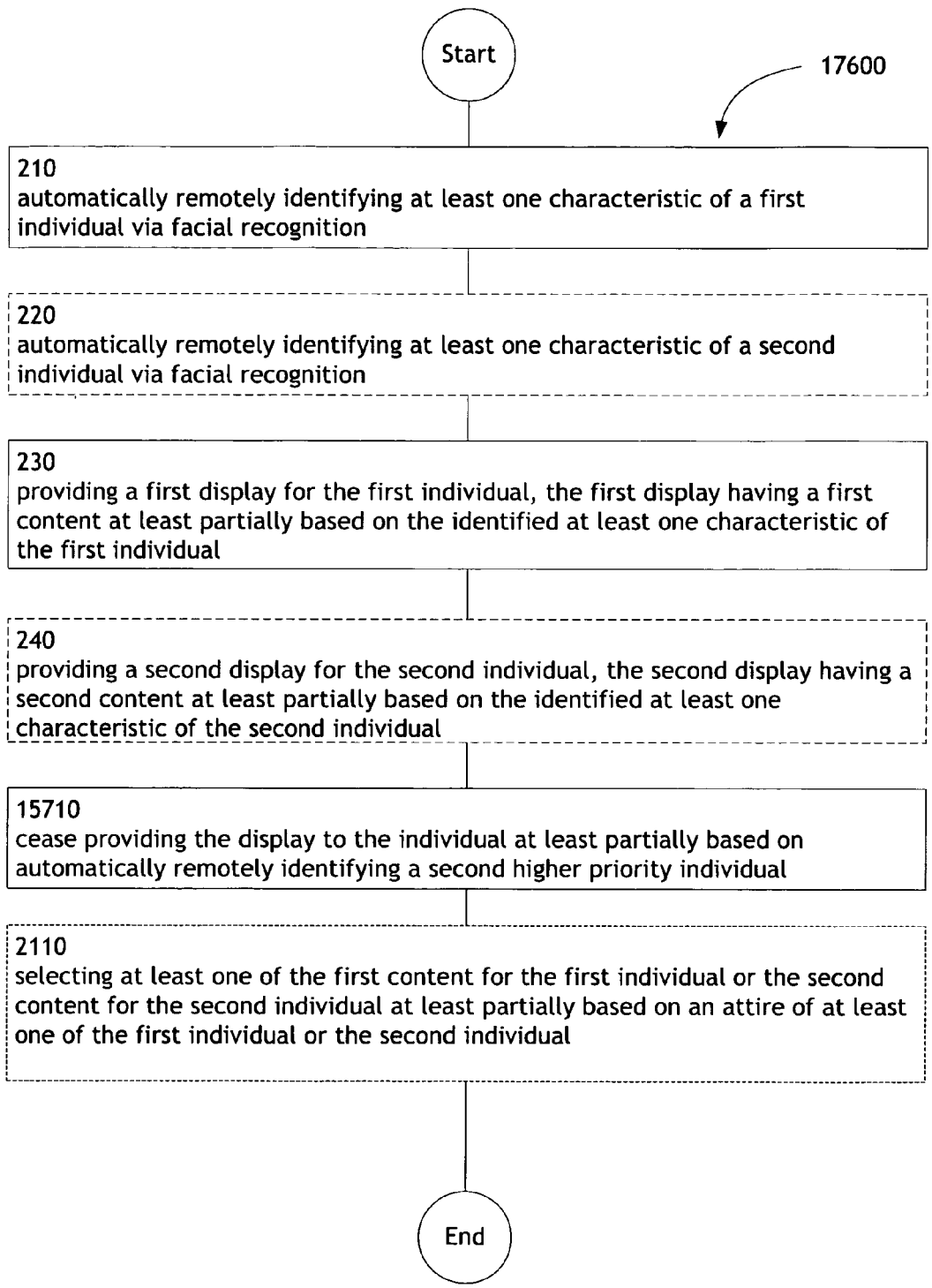

FIG. 176 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, selecting the content for the individual at least partially based on an attire of the individual.

Figure 177:
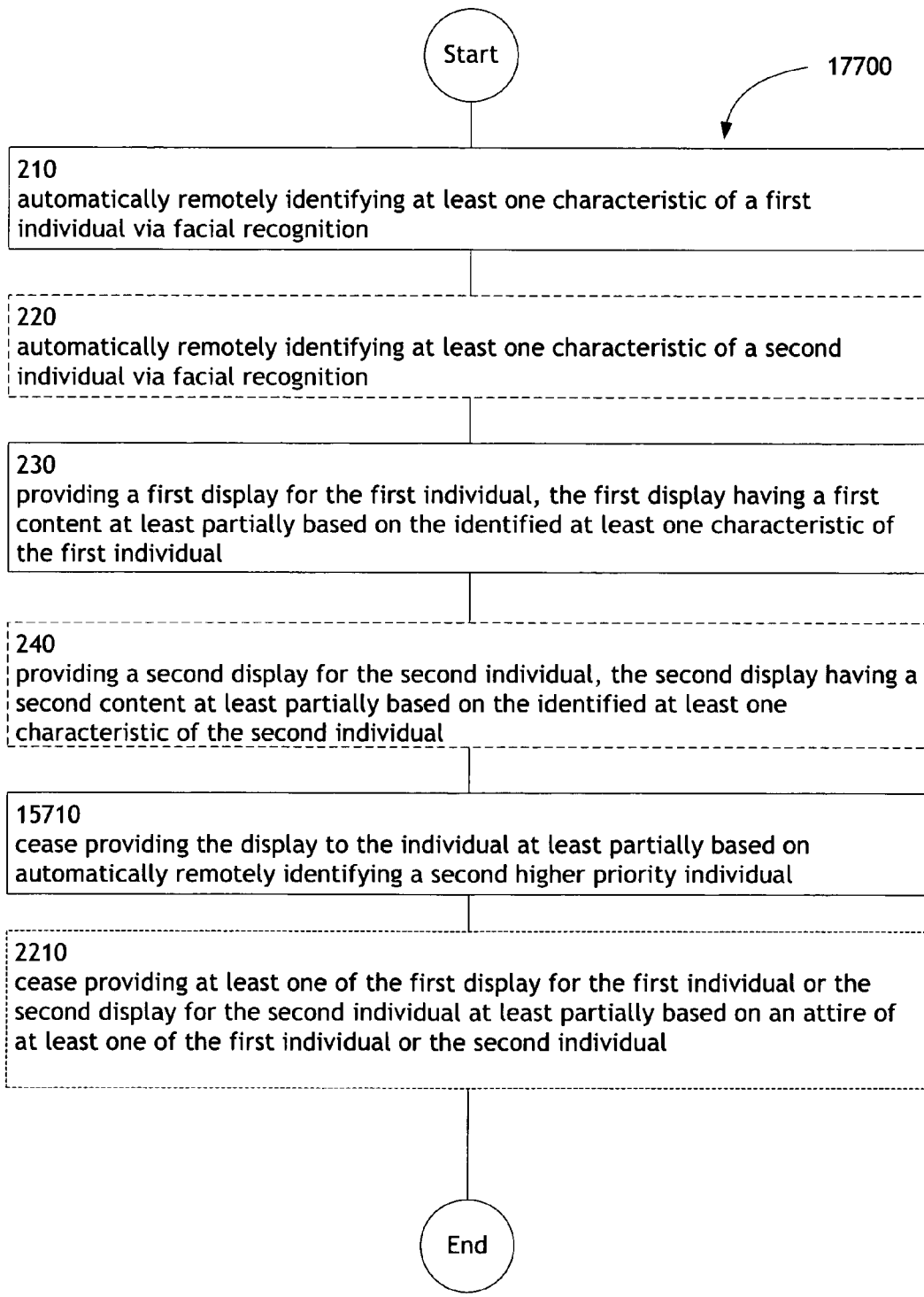

FIG. 177 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, and cease providing the display for the individual at least partially based on an attire of the individual.

Figure 178:
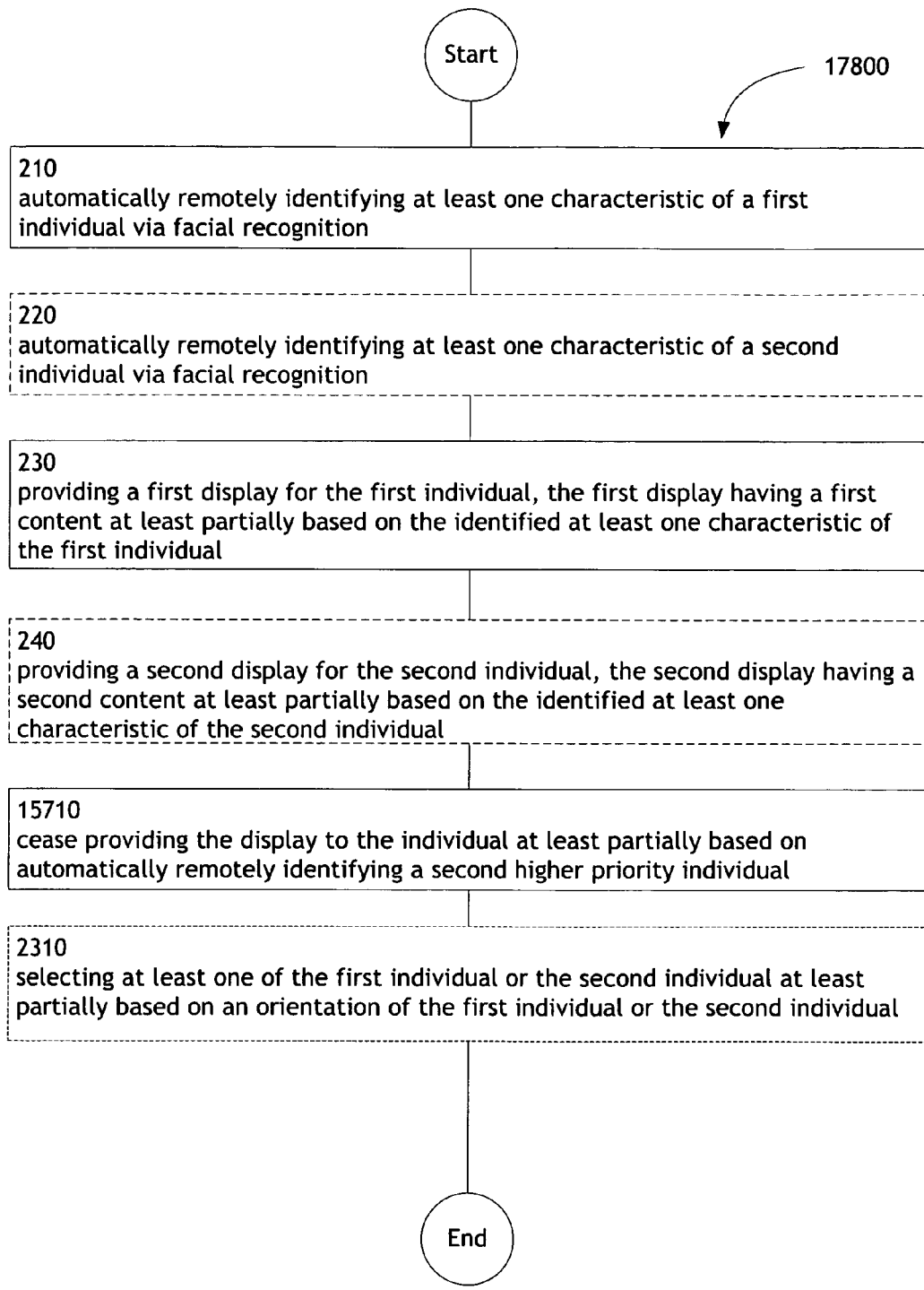

FIG. 178 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, and selecting the individual at least partially based on an orientation of the individual.

Figure 179A:
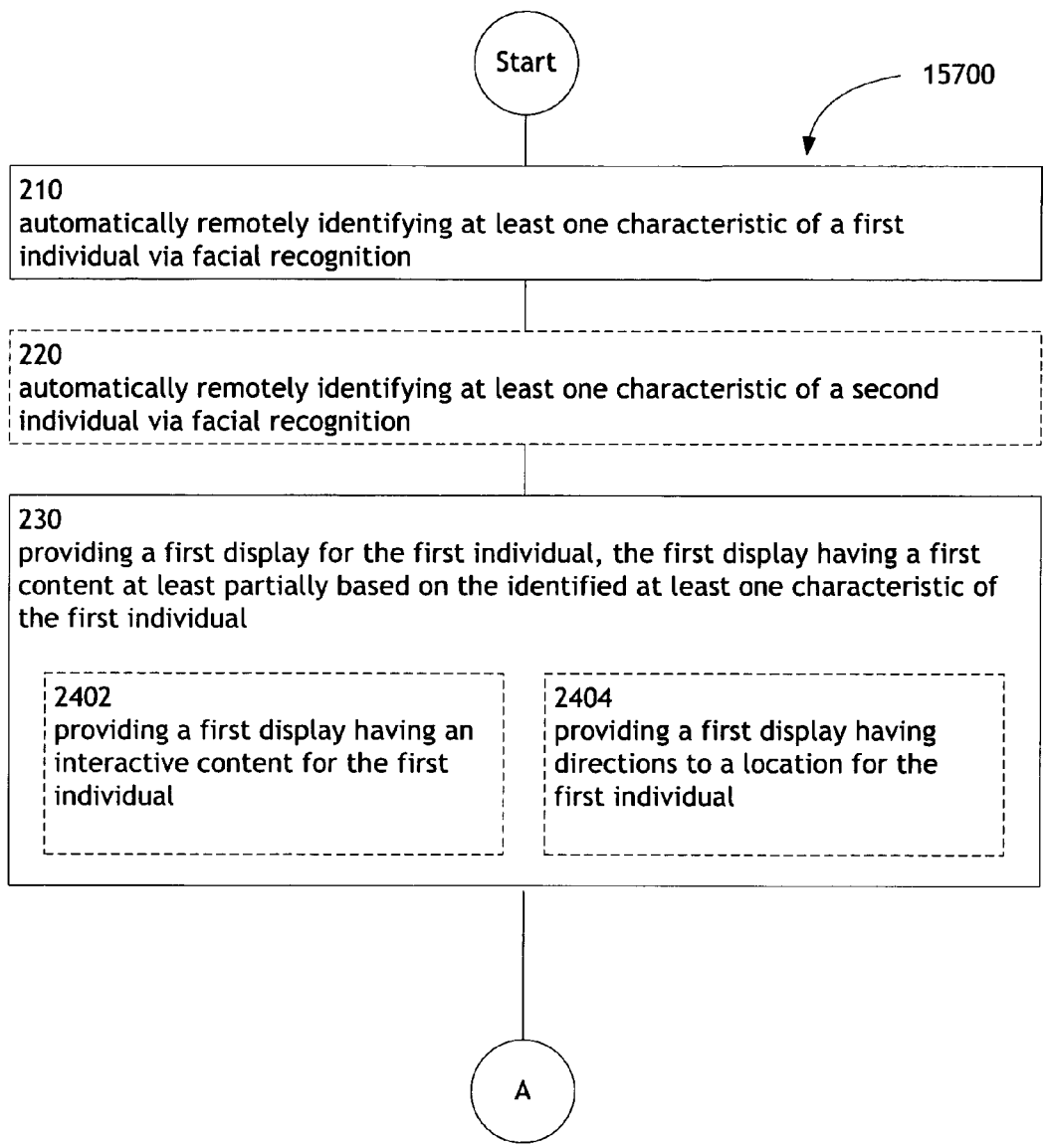
Figure 179B:
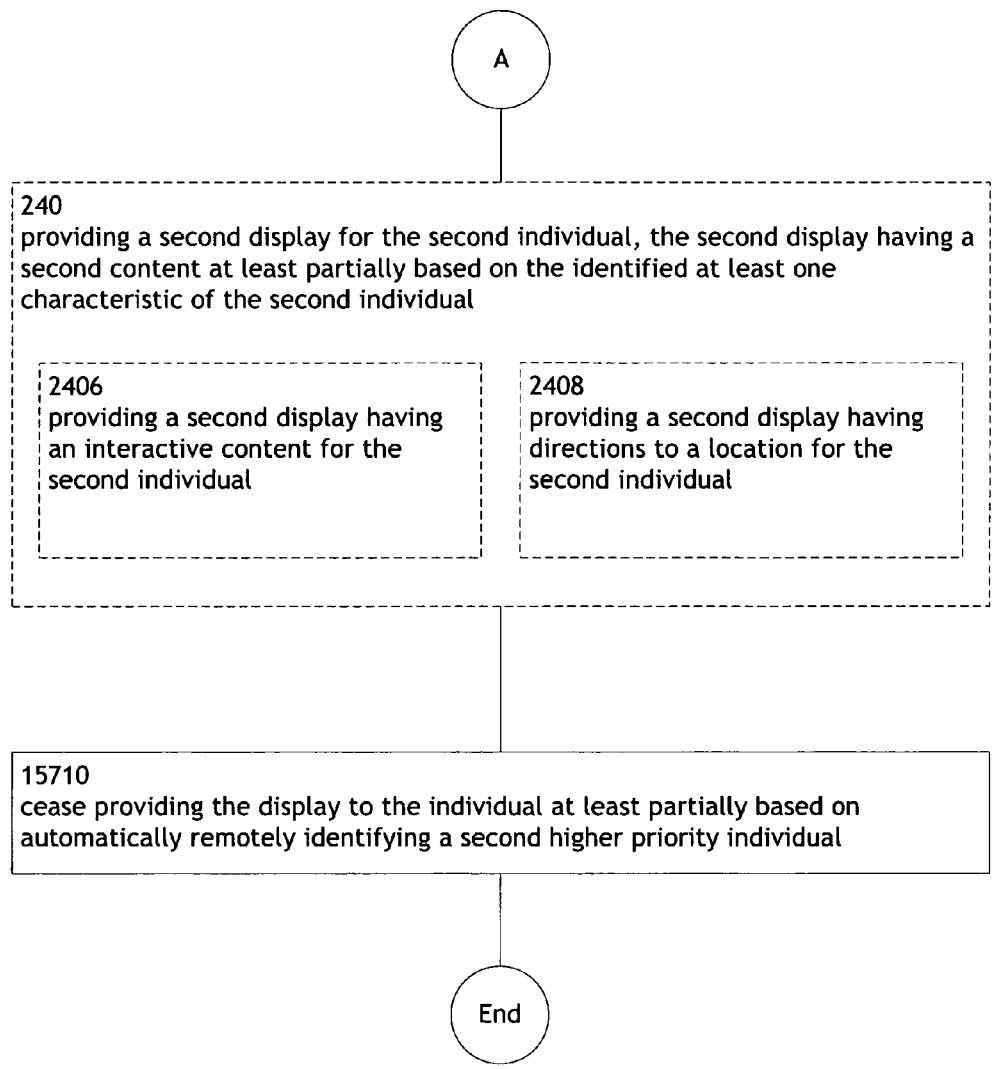

FIG. 179 illustrates an alternative embodiment of the operational flow of FIG. 157.

Figure 180A:
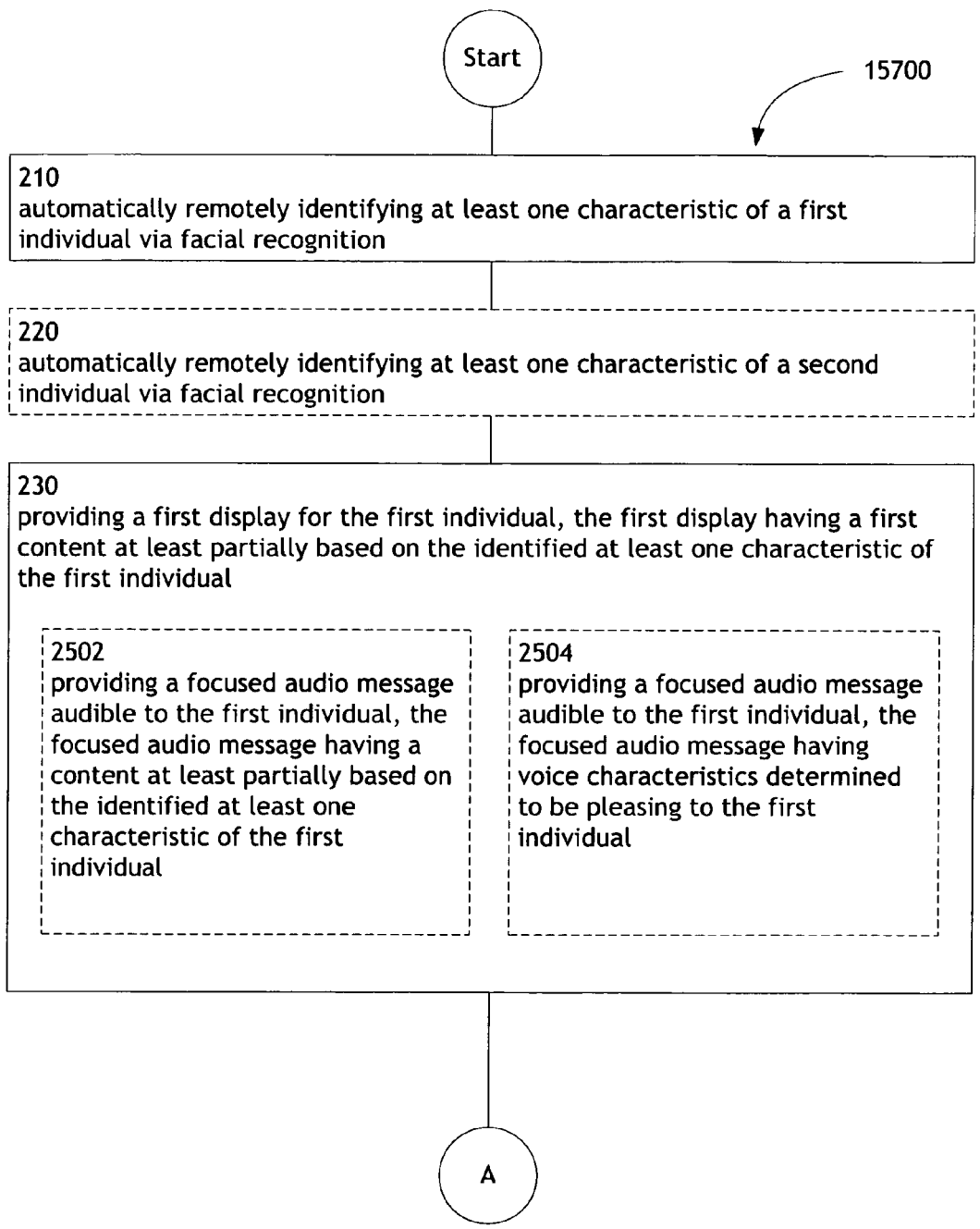
Figure 180B:
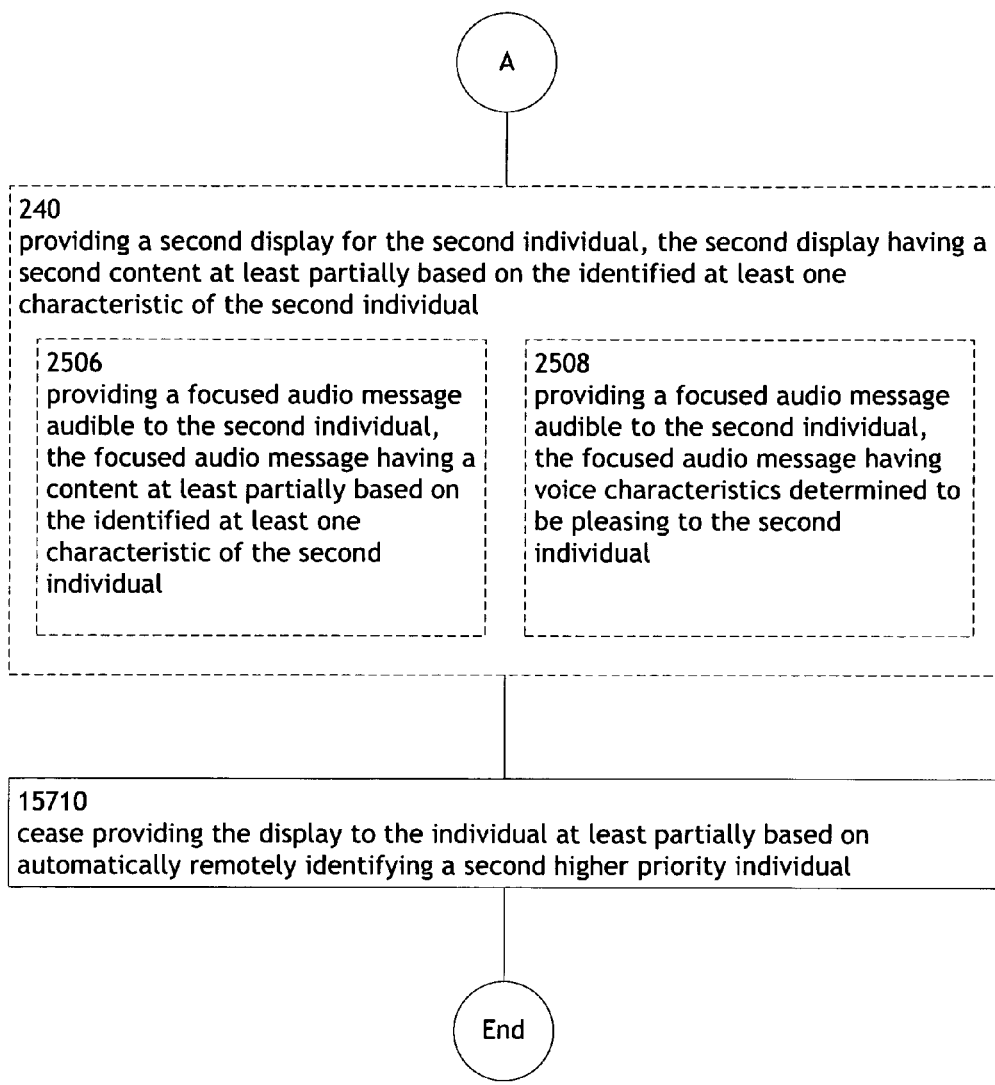

FIG. 180 illustrates an alternative embodiment of the operational flow of FIG. 157.

Figure 181A:
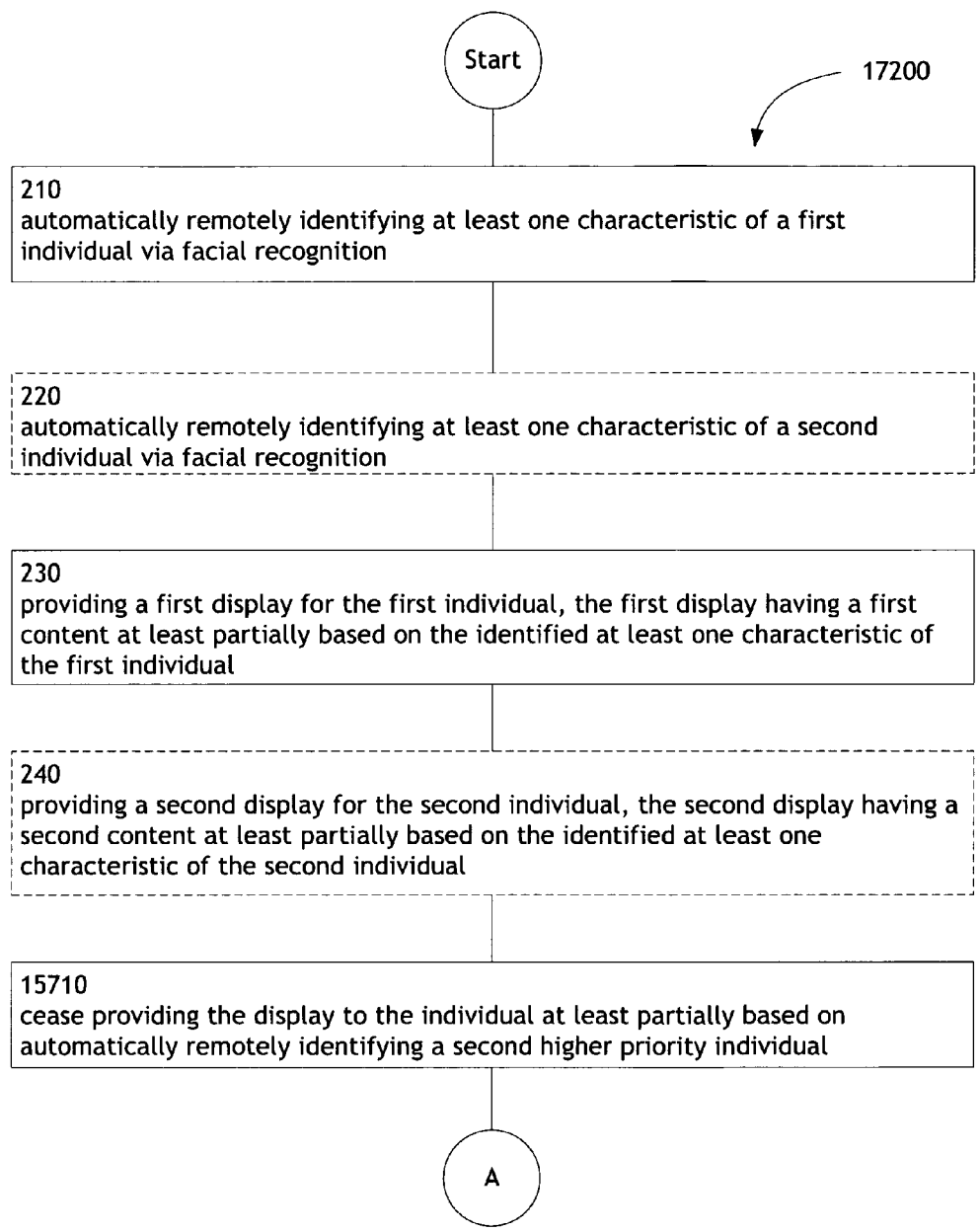

FIG. 181 illustrates an alternative embodiment of the operational flow of FIG. 172.

Figure 182A:
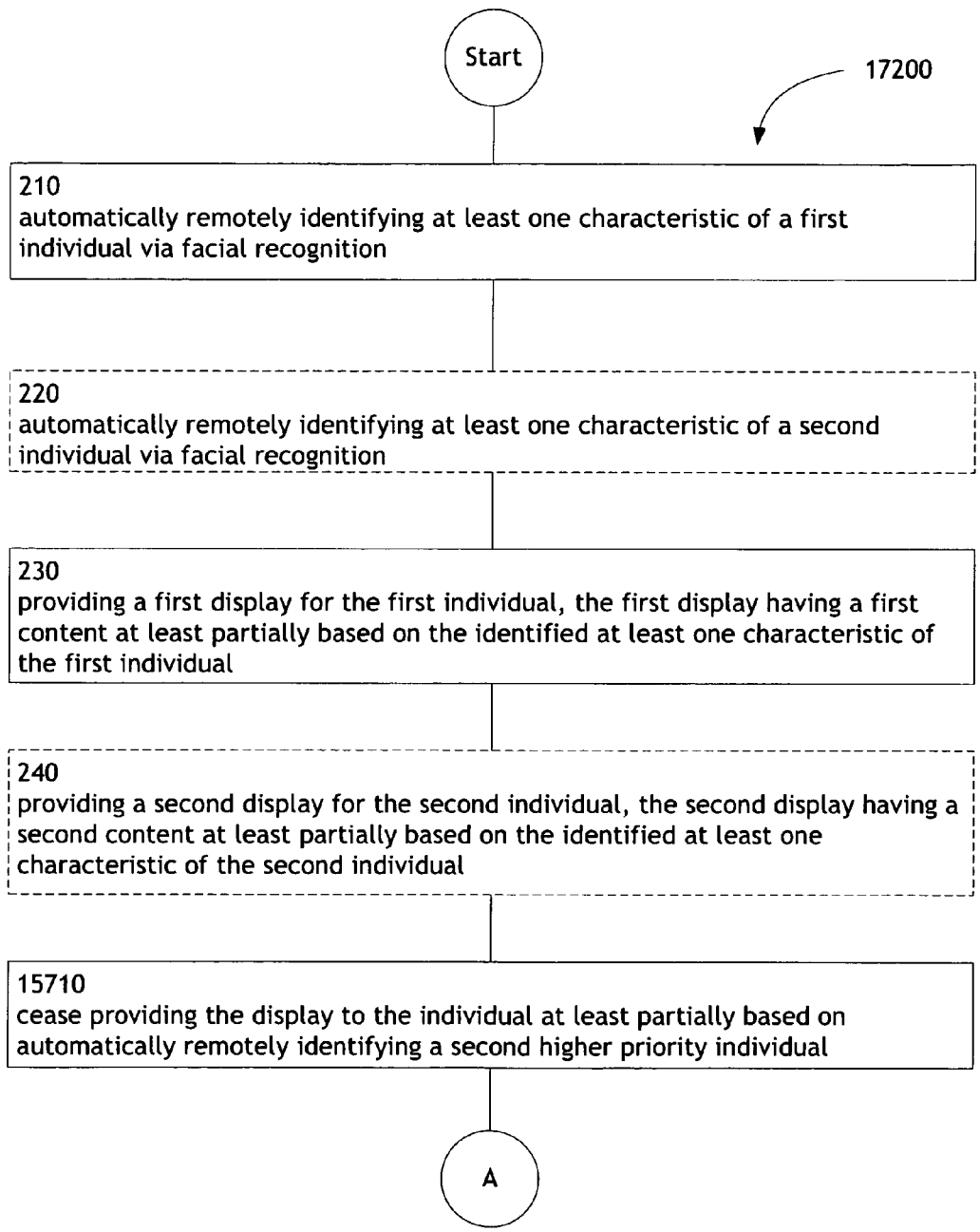
Figure 182B:
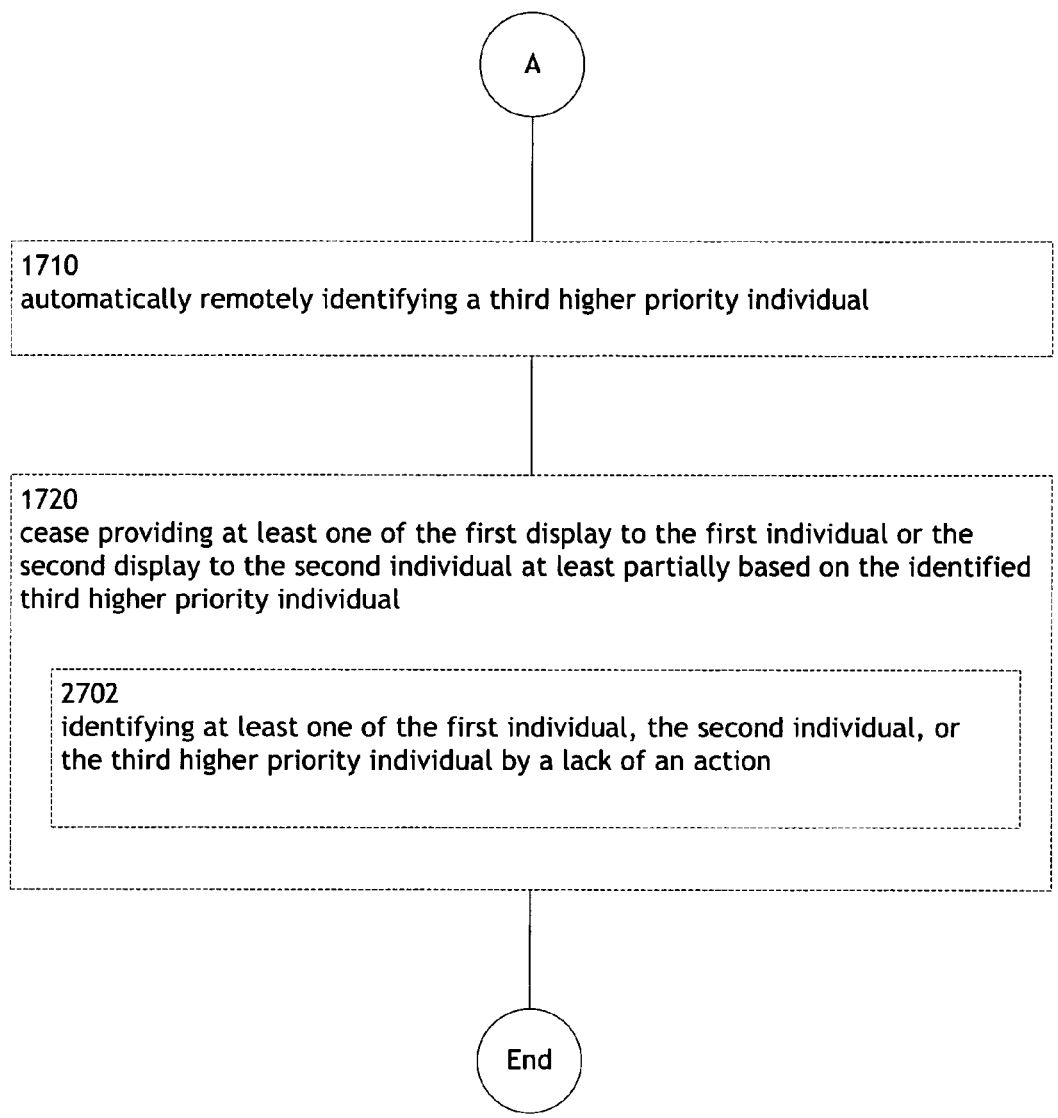

FIG. 182 illustrates an alternative embodiment of the operational flow of FIG. 172.

Figure 183:
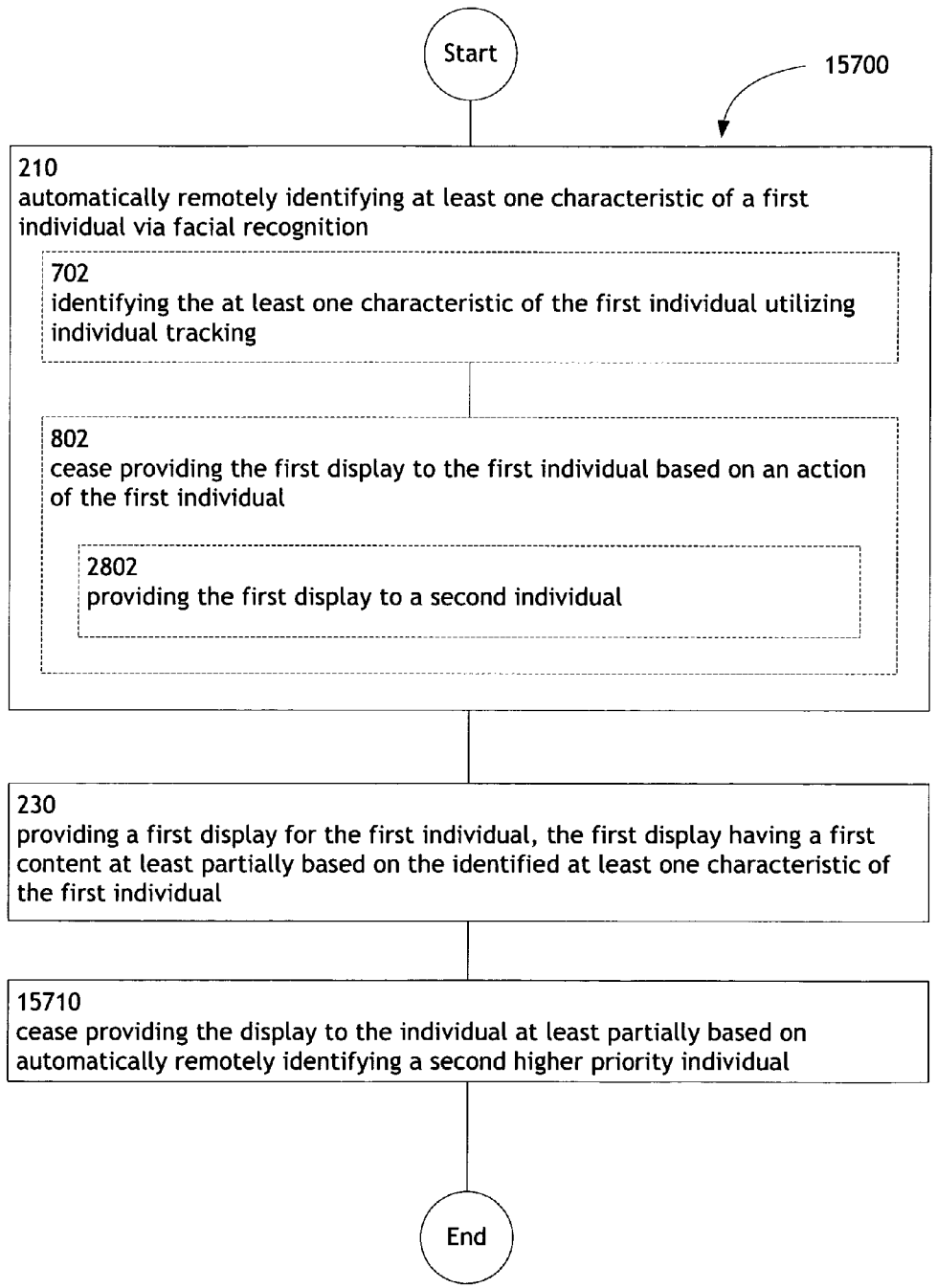

FIG. 183 illustrates an alternative embodiment of the operational flow of FIG. 157.

Figure 184:
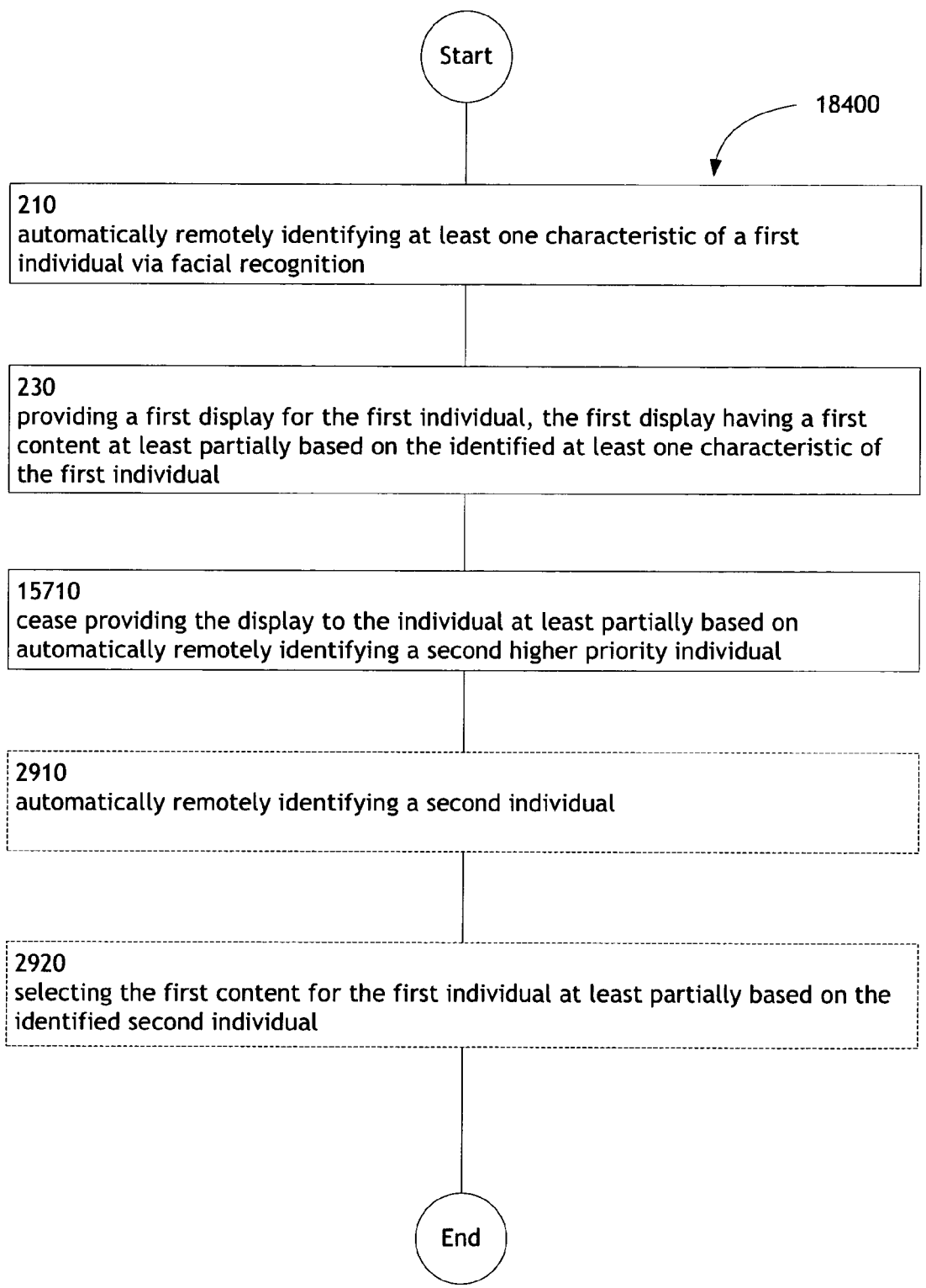

FIG. 184 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, automatically remotely identifying a second individual, and selecting the content for the first individual at least partially based on the identified second individual.

Figure 185:
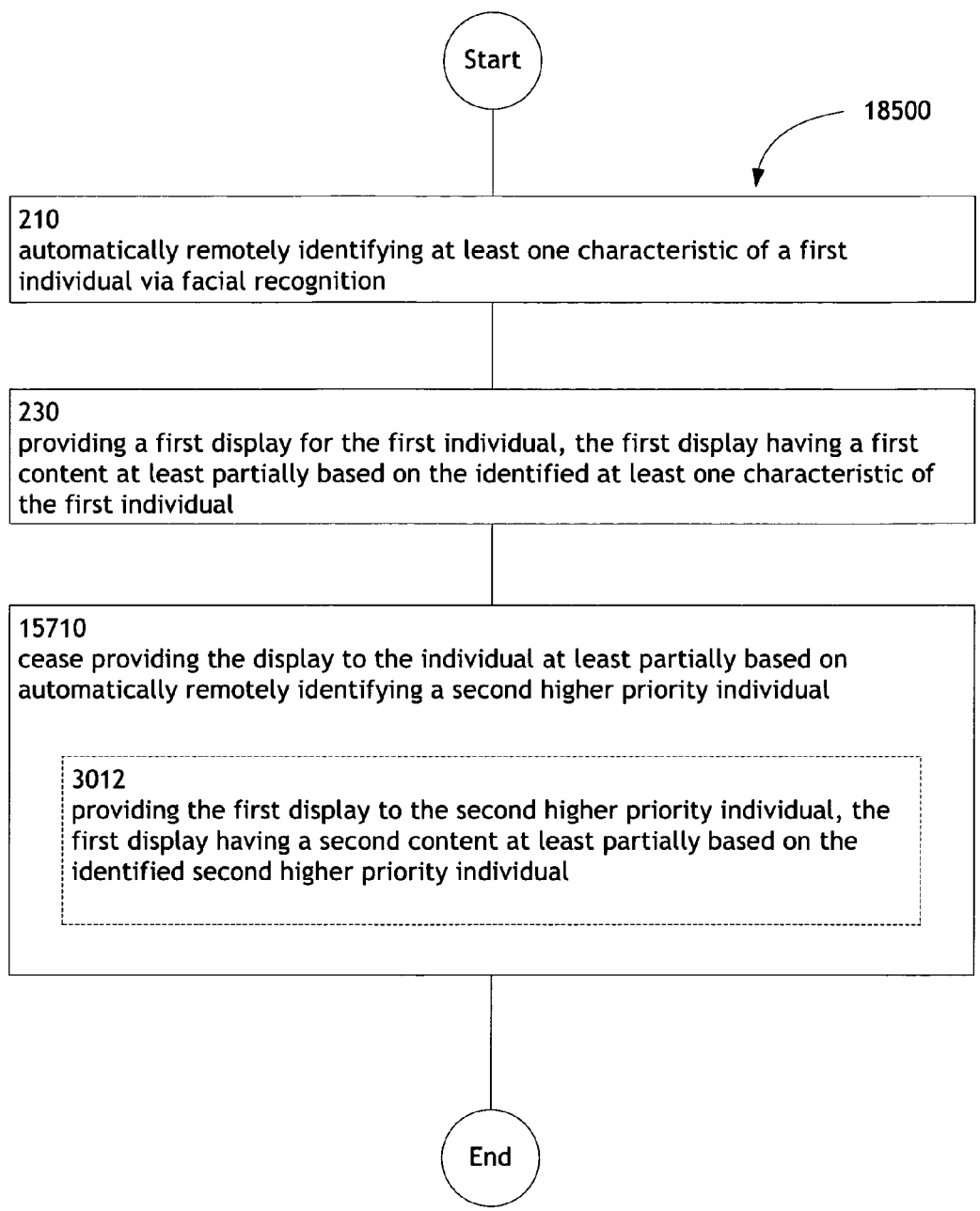

FIG. 185 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, and cease providing the display to the first individual at least partially based on automatically remotely identifying a second higher priority individual.

Figure 186:
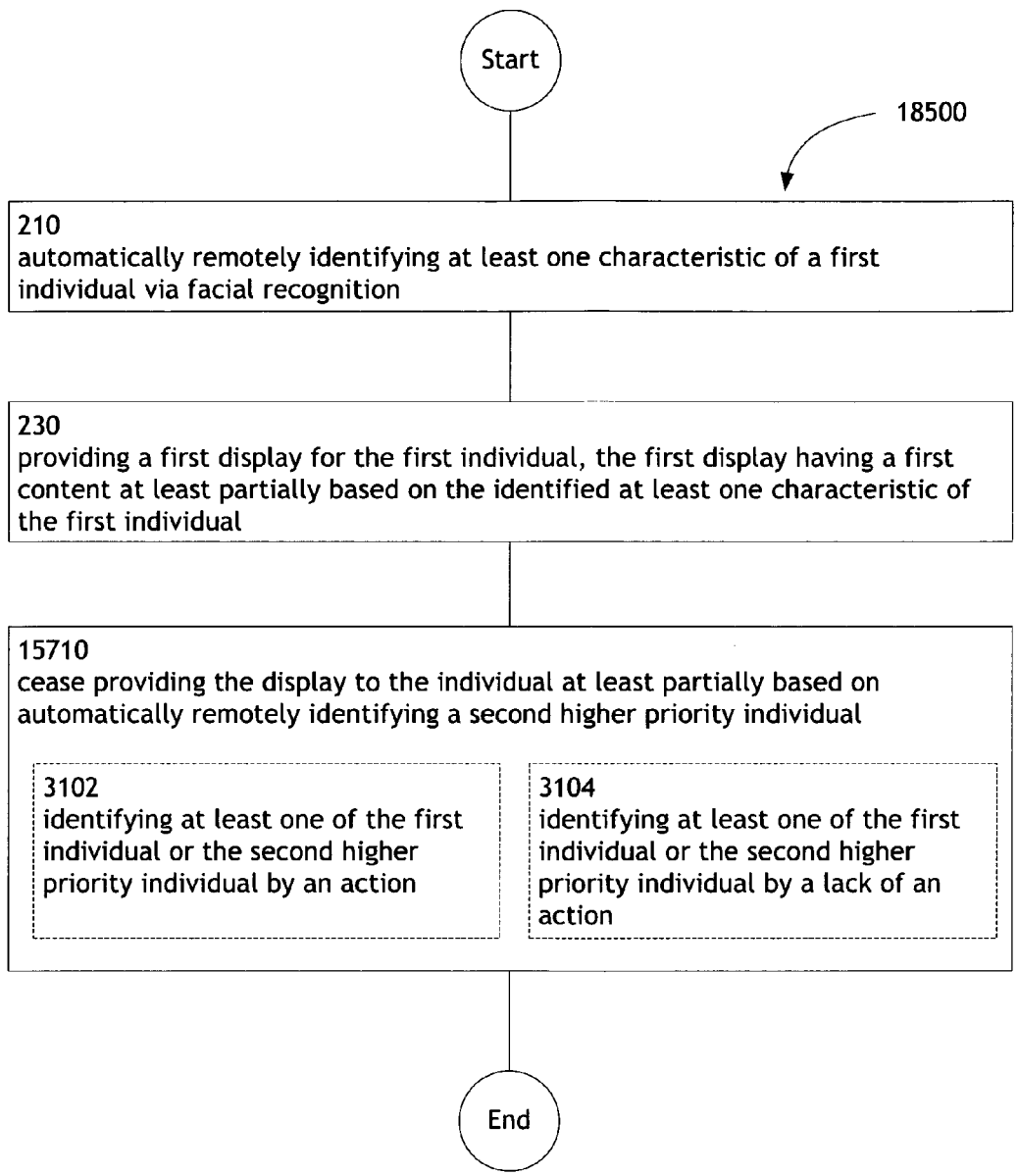

FIG. 186 illustrates an alternative embodiment of the operational flow of FIG. 185.

Figure 187:
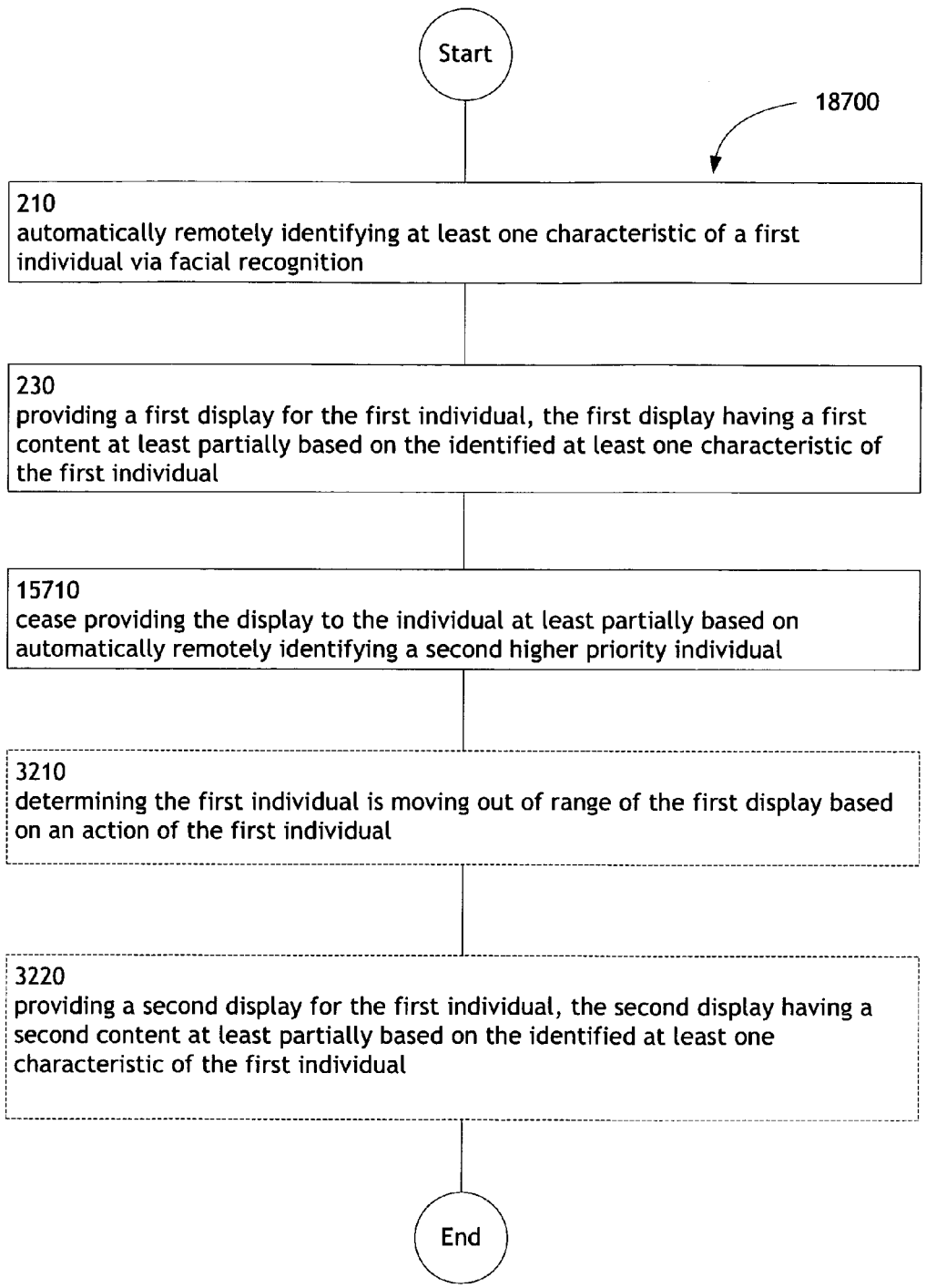

FIG. 187 illustrates an operational flow representing example operations related to automatically remotely identifying one or more characteristics of an individual utilizing facial recognition, providing a display for the individual having a content at least partially based on the one or more identified characteristics of the individual, cease providing the display to the individual at least partially based on automatically remotely identifying a second higher priority individual, determining the individual is moving out of range of the display based on an action of the individual, and providing a second display for the individual, the second display having a second content at least partially based on the identified at least one characteristic of the individual.

Figure 188:
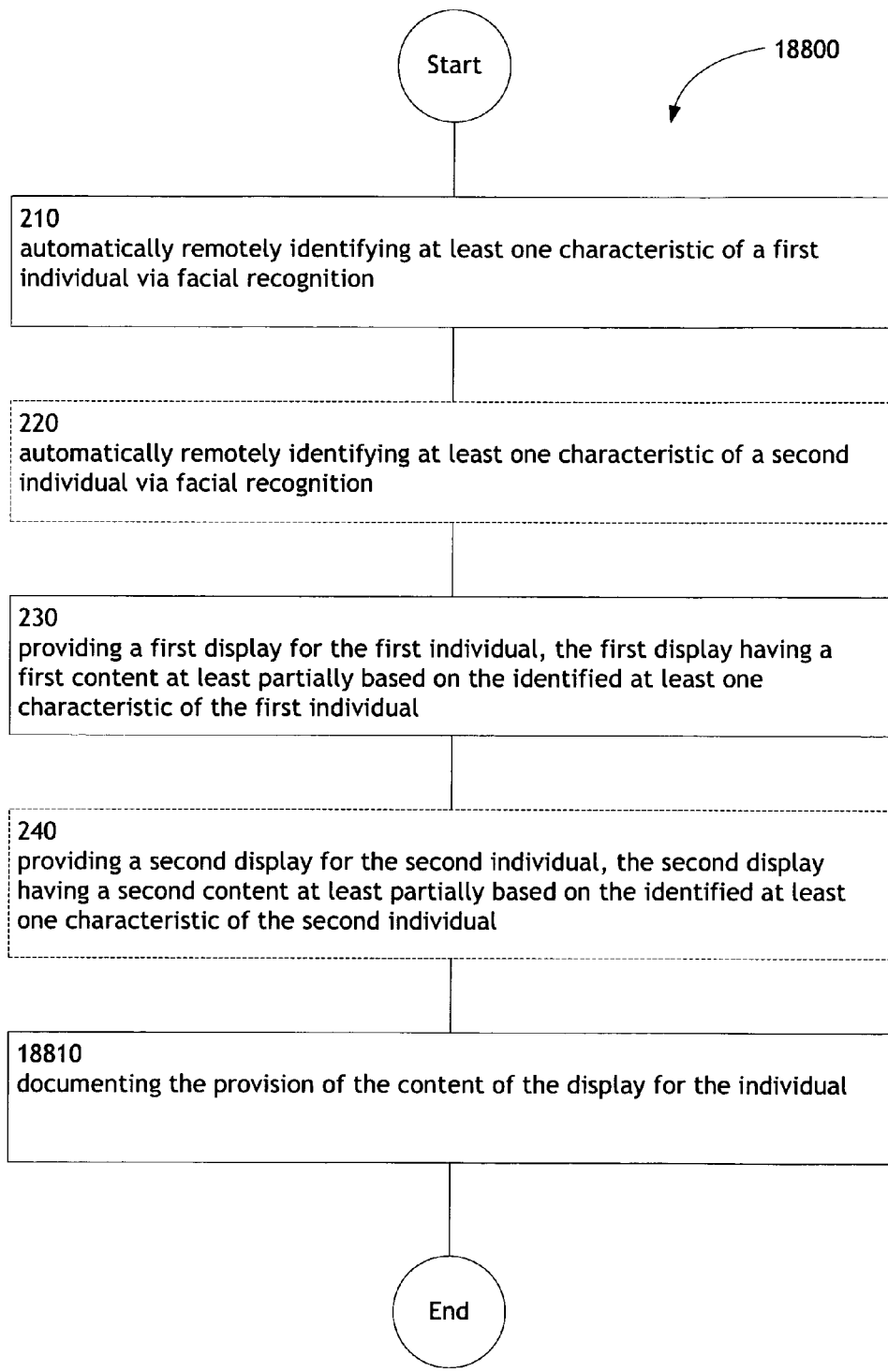

FIG. 188 illustrates an operational flow representing example operations related to automatically remotely identifying one or more characteristics of an individual utilizing facial recognition, providing a display for the individual having a content at least partially based on the one or more identified characteristics of the individual, and documenting the provision of the content of the display for the individual.

Figure 189:
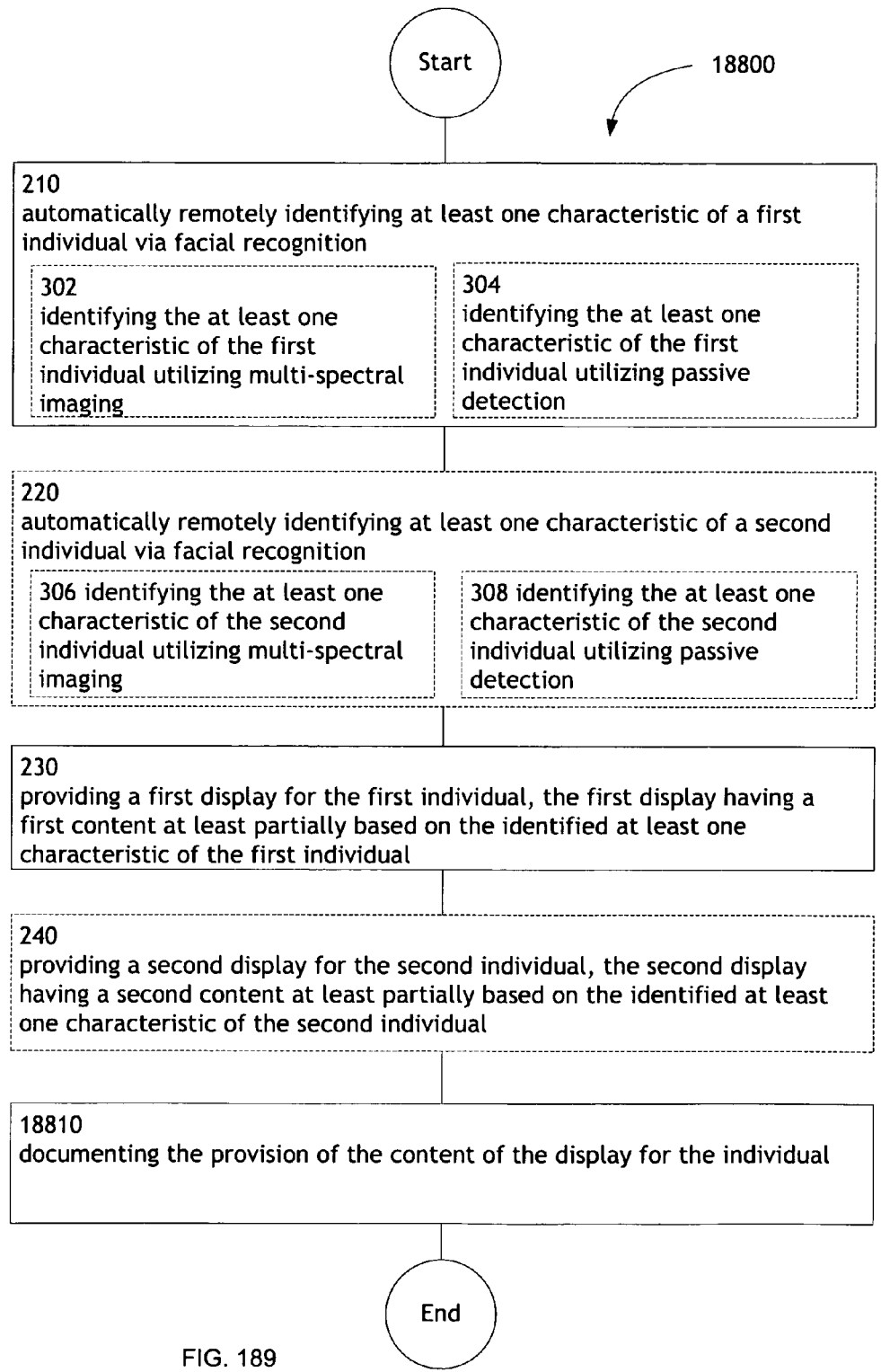

FIG. 189 illustrates an alternative embodiment of the operational flow of FIG. 188.

Figure 190:
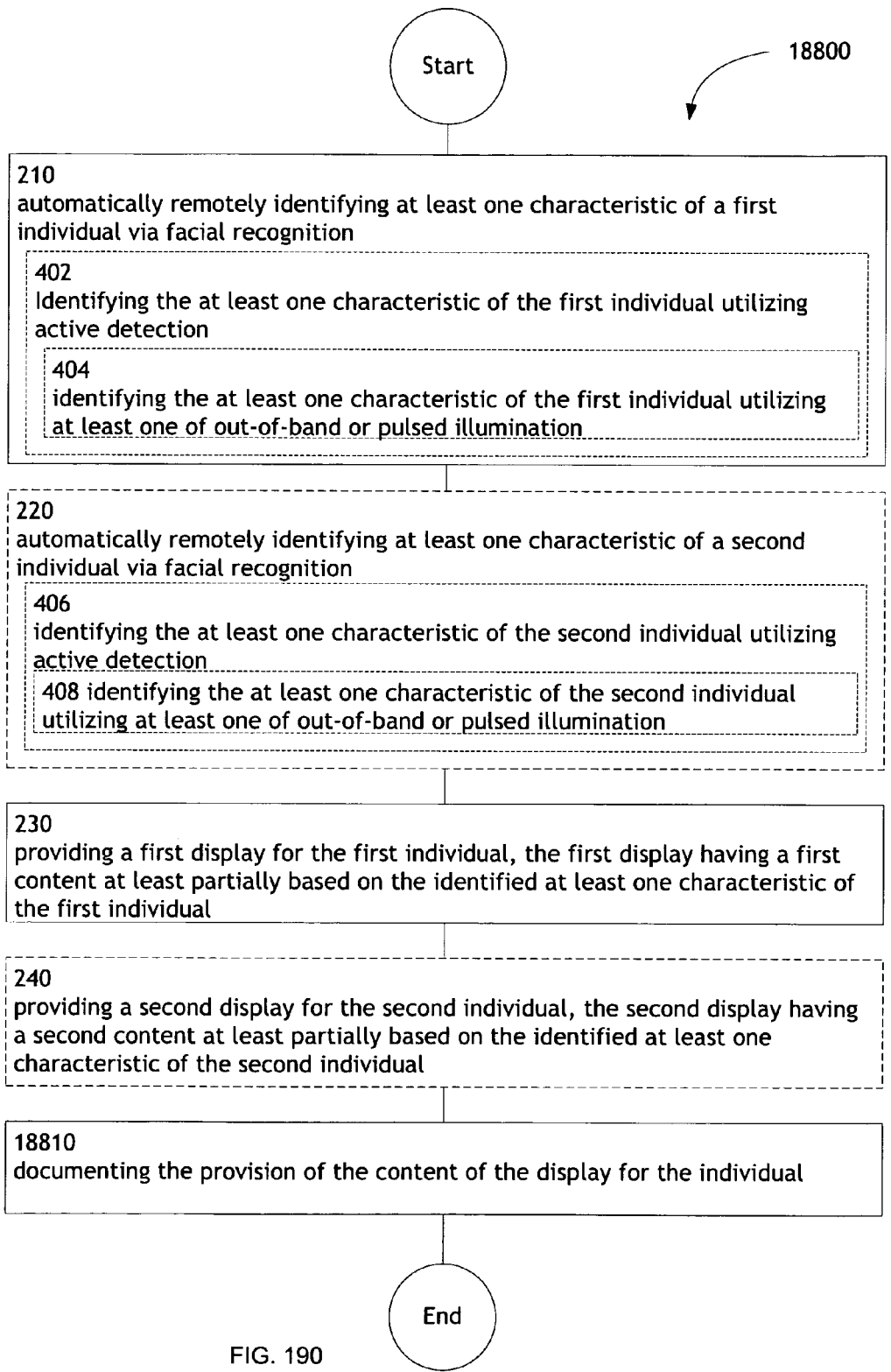

FIG. 190 illustrates an alternative embodiment of the operational flow of FIG. 188.

Figure 191:
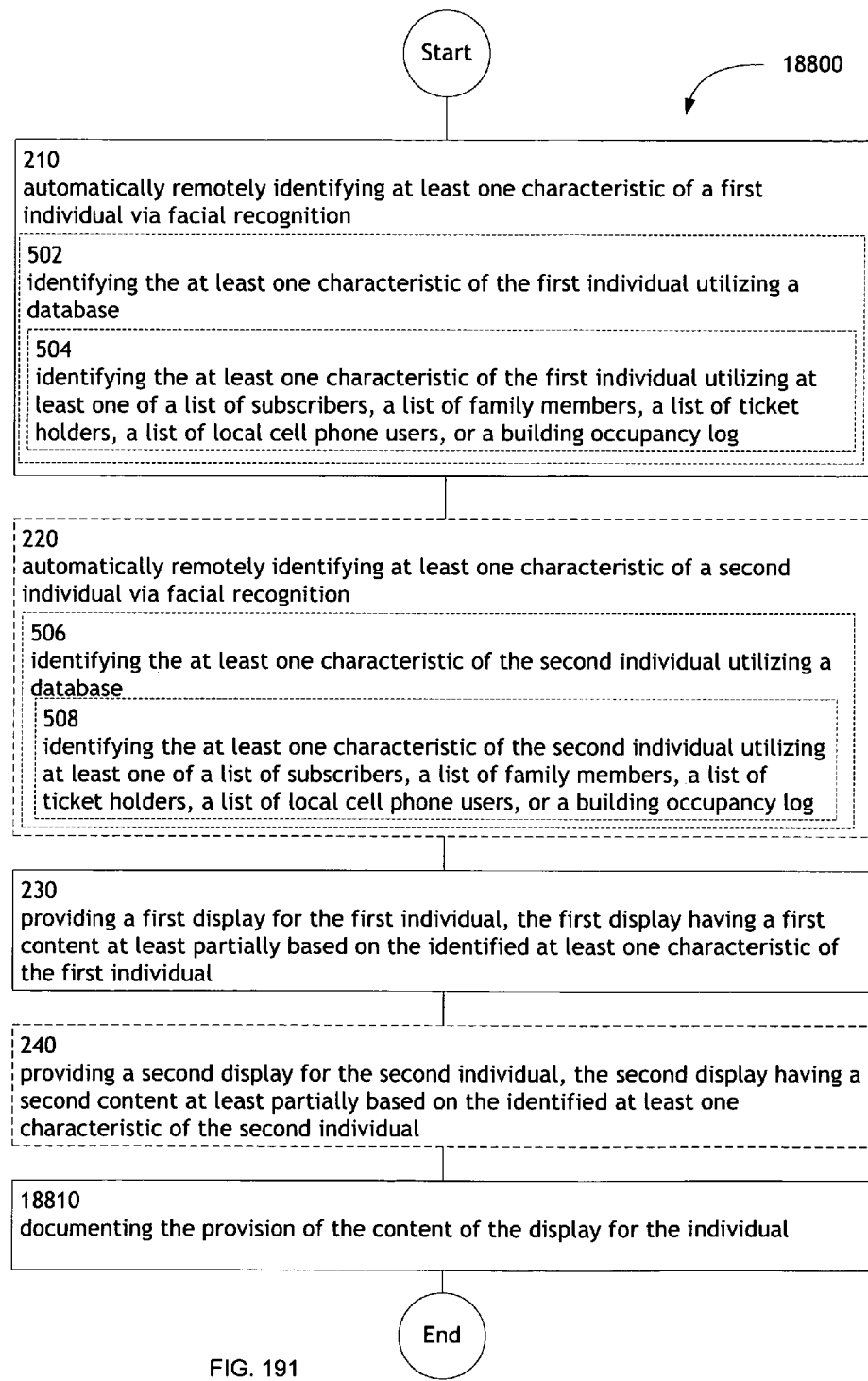

FIG. 191 illustrates an alternative embodiment of the operational flow of FIG. 188.

Figure 192:
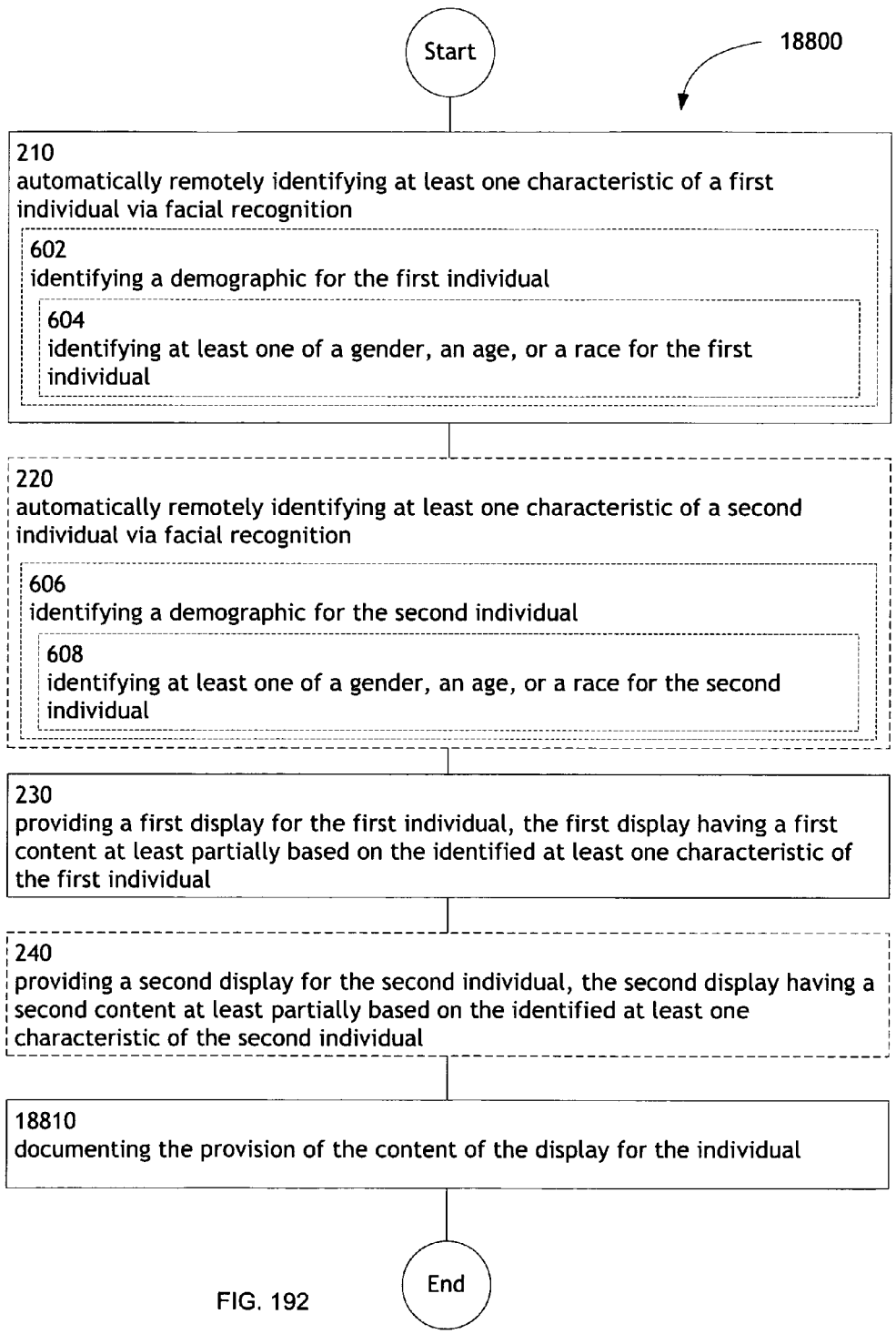

FIG. 192 illustrates an alternative embodiment of the operational flow of FIG. 188.

Figure 193:
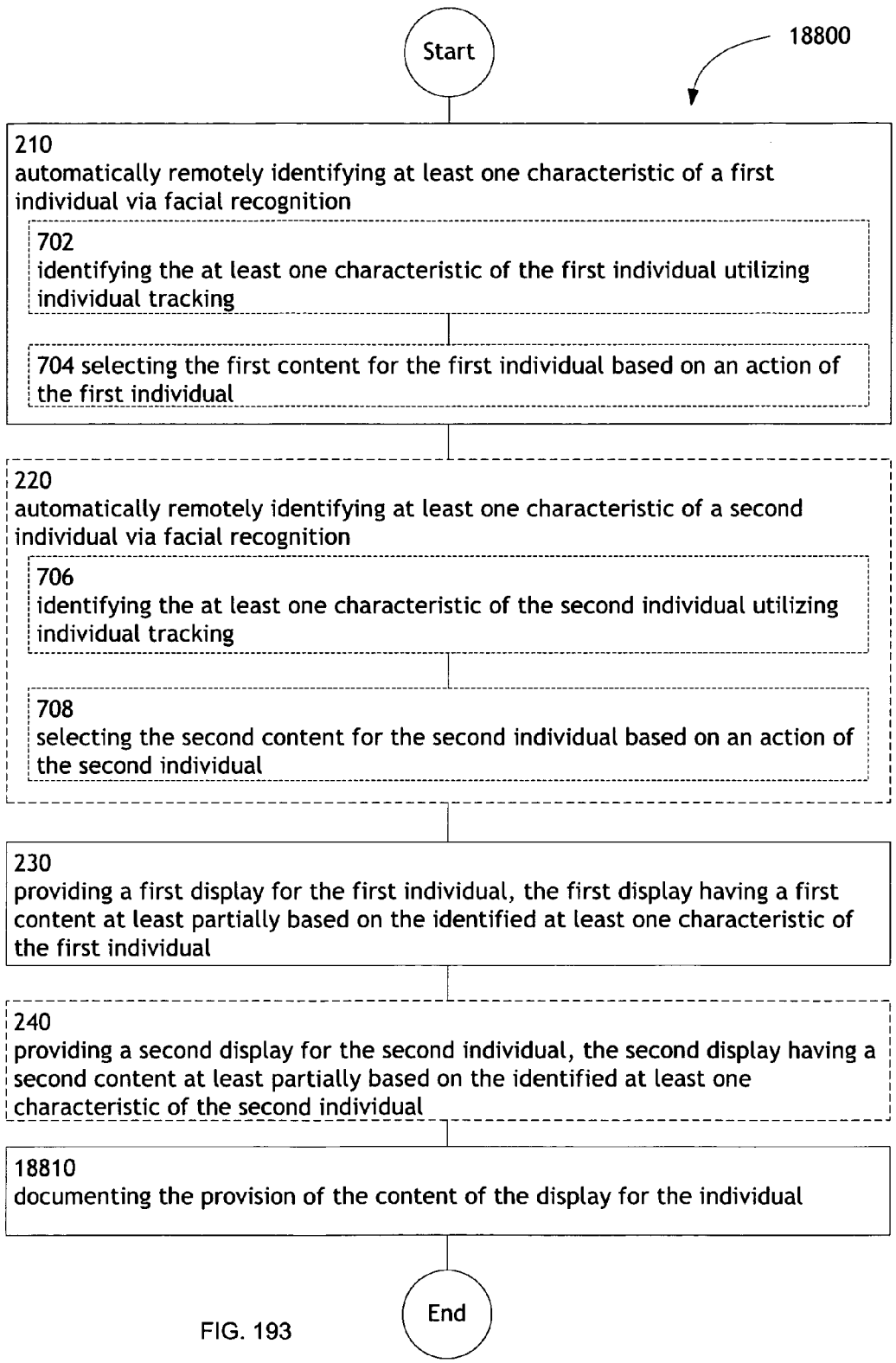

FIG. 193 illustrates an alternative embodiment of the operational flow of FIG. 188.

Figure 194A:
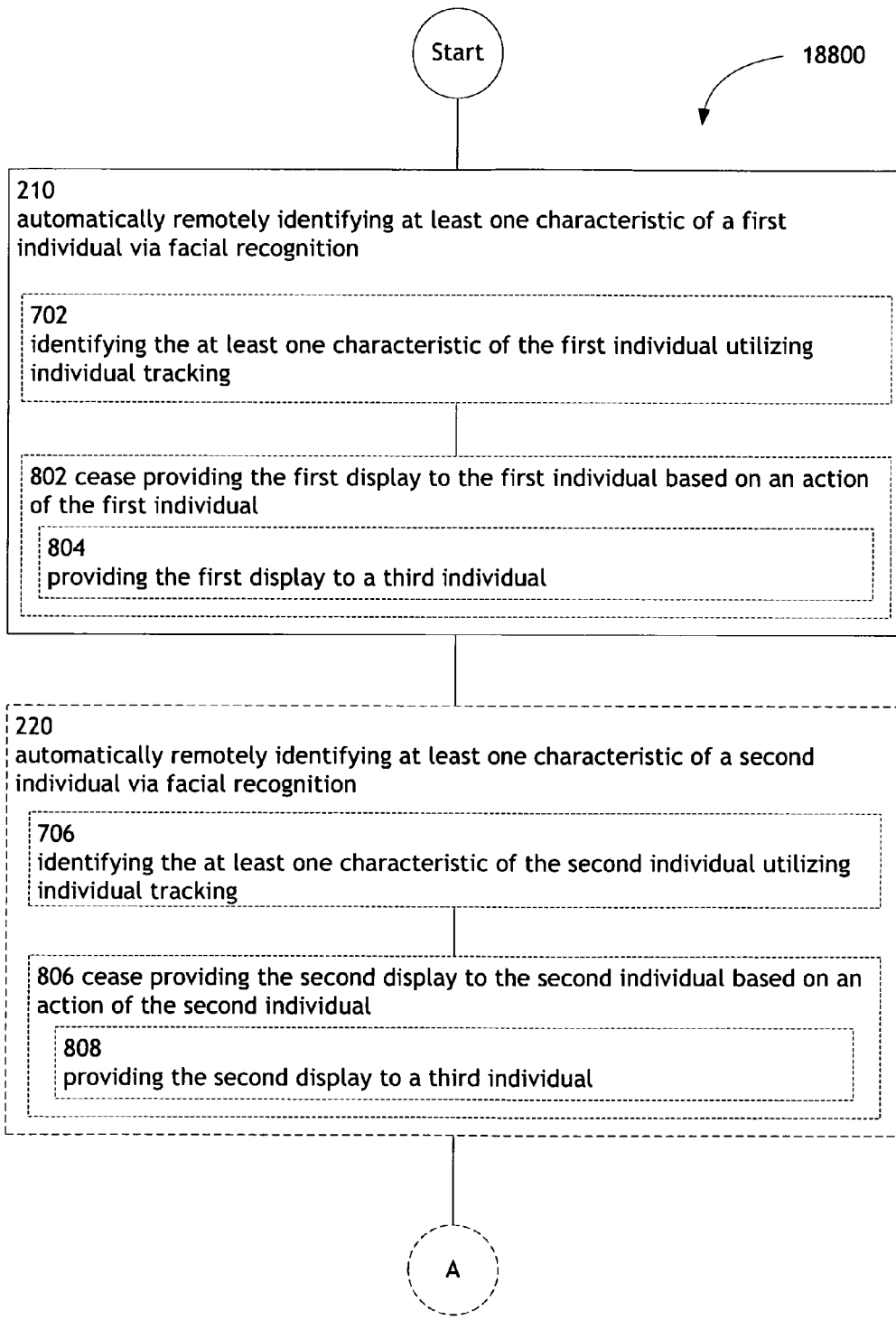
Figure 194B:
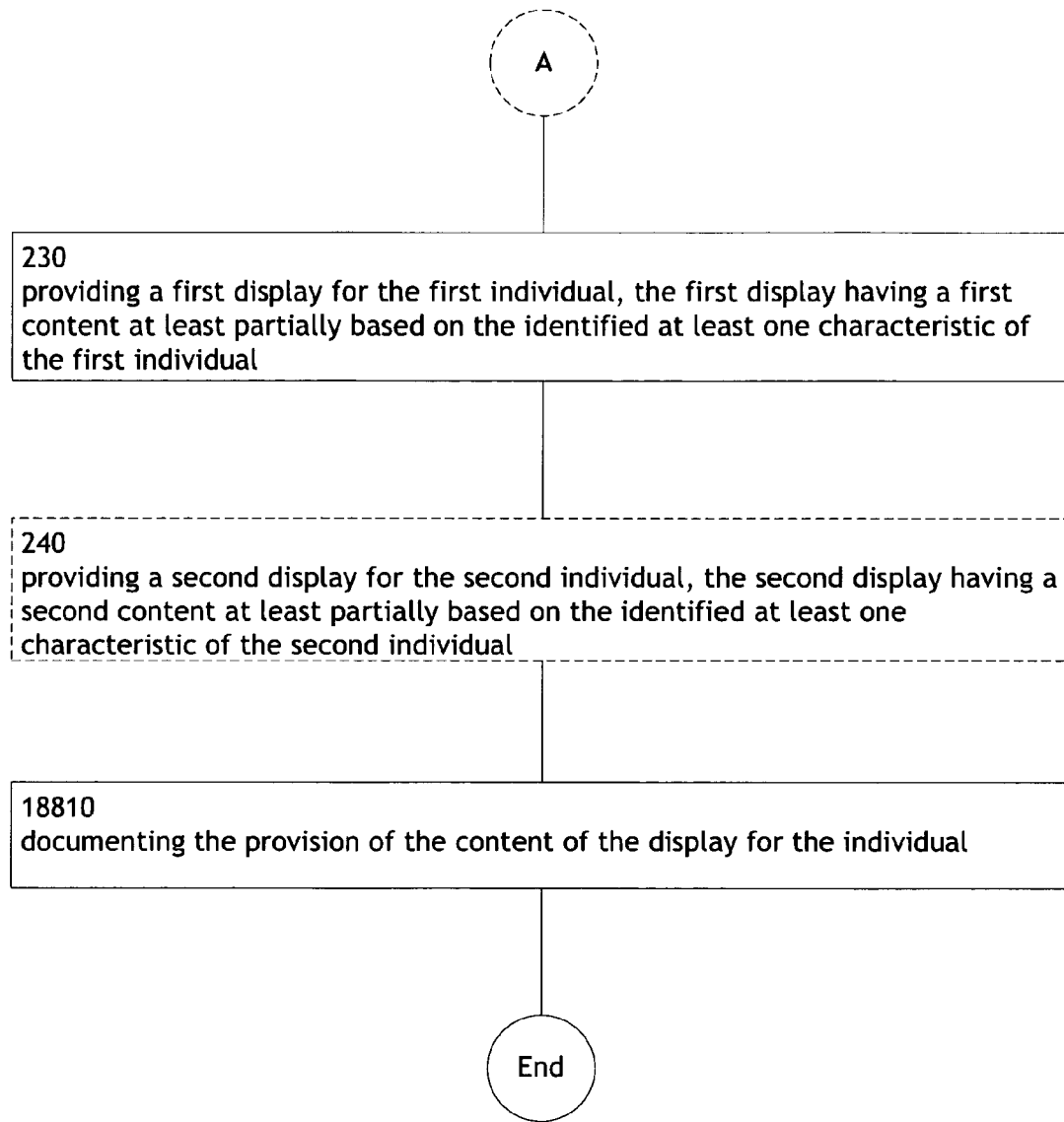

FIG. 194 illustrates an alternative embodiment of the operational flow of FIG. 188.

Figure 195:
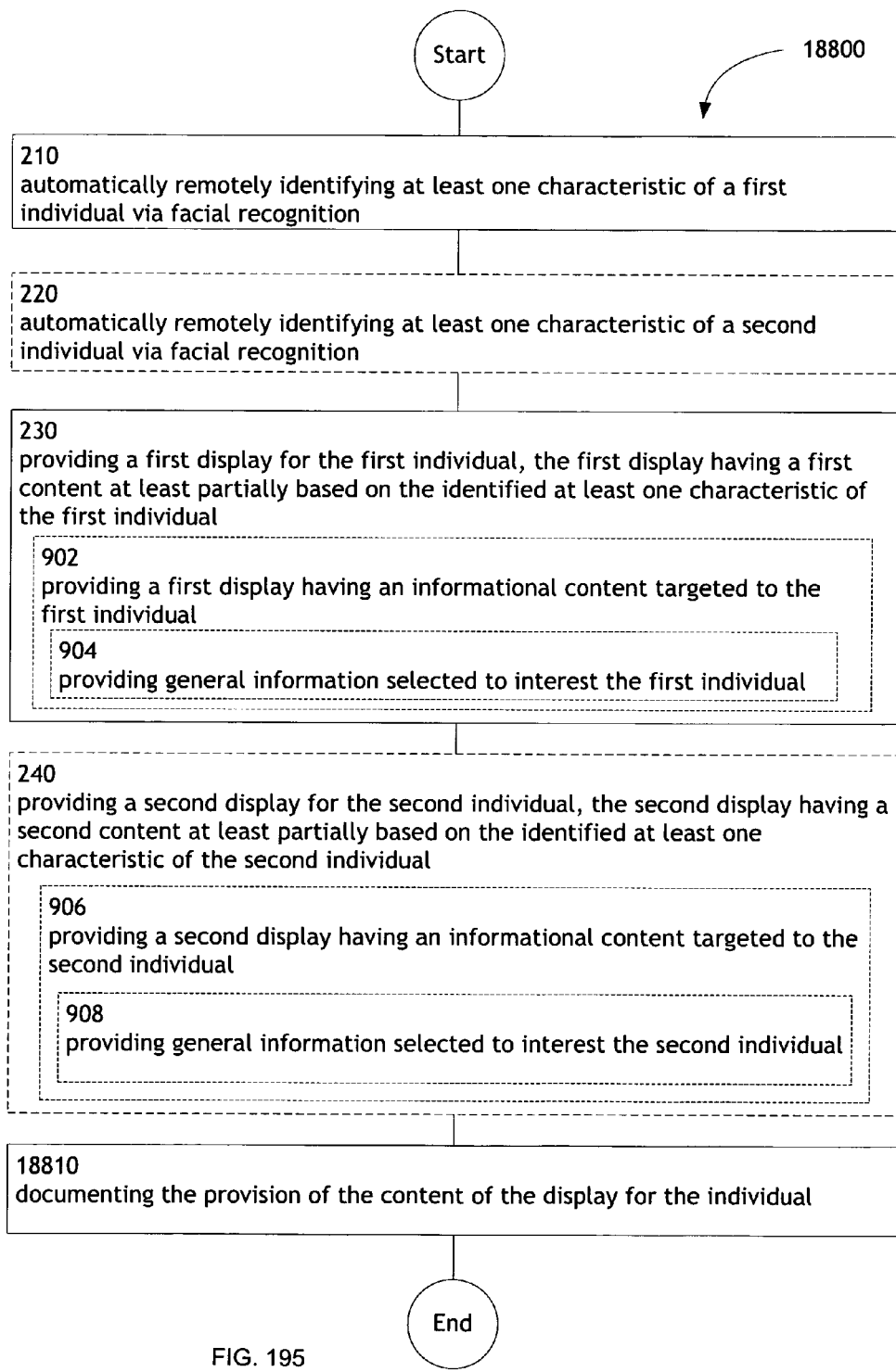

FIG. 195 illustrates an alternative embodiment of the operational flow of FIG. 188.

Figure 196A:
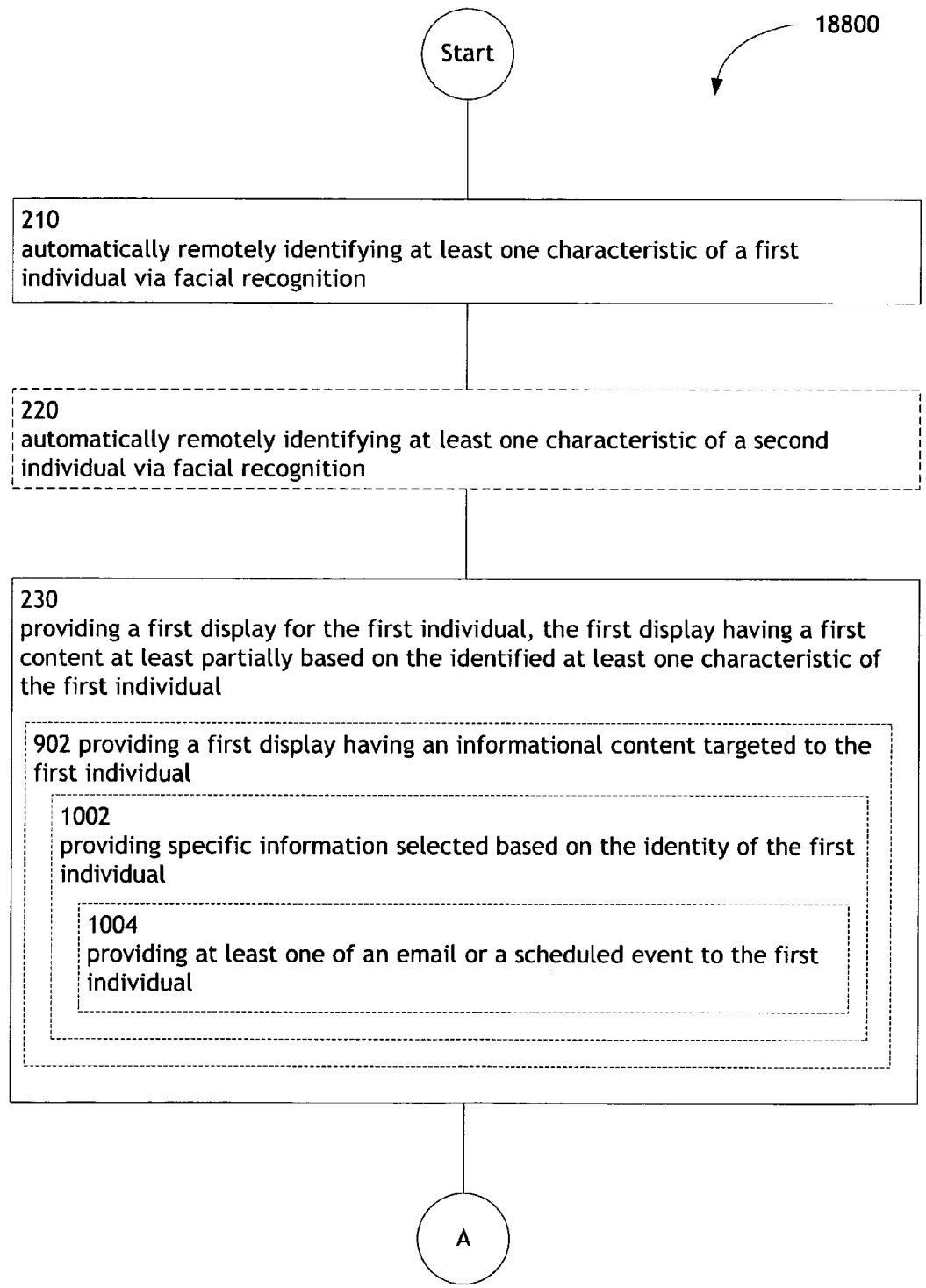

FIG. 196 illustrates an alternative embodiment of the operational flow of FIG. 188.

Figure 197:
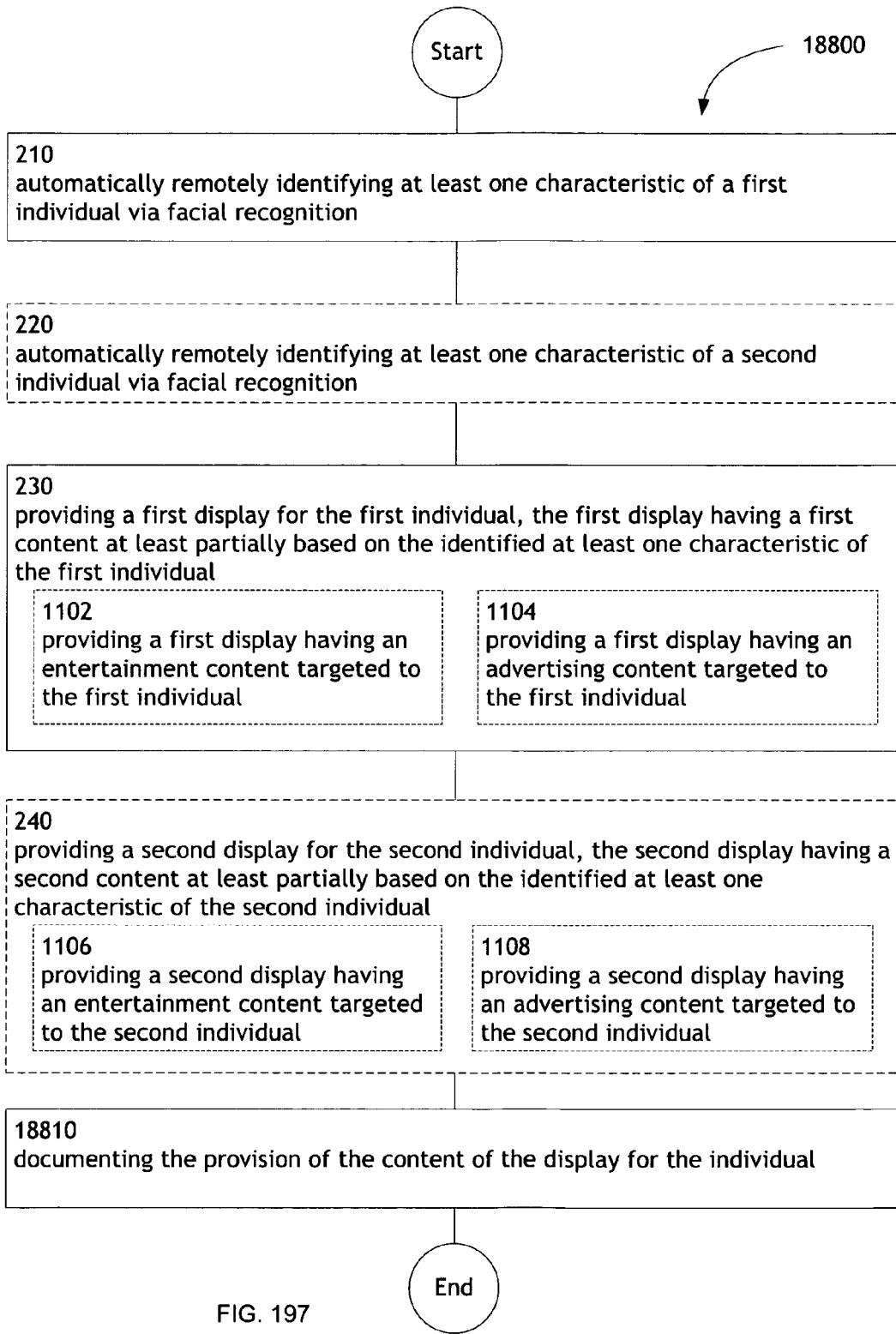

FIG. 197 illustrates an alternative embodiment of the operational flow of FIG. 188.

Figure 198:
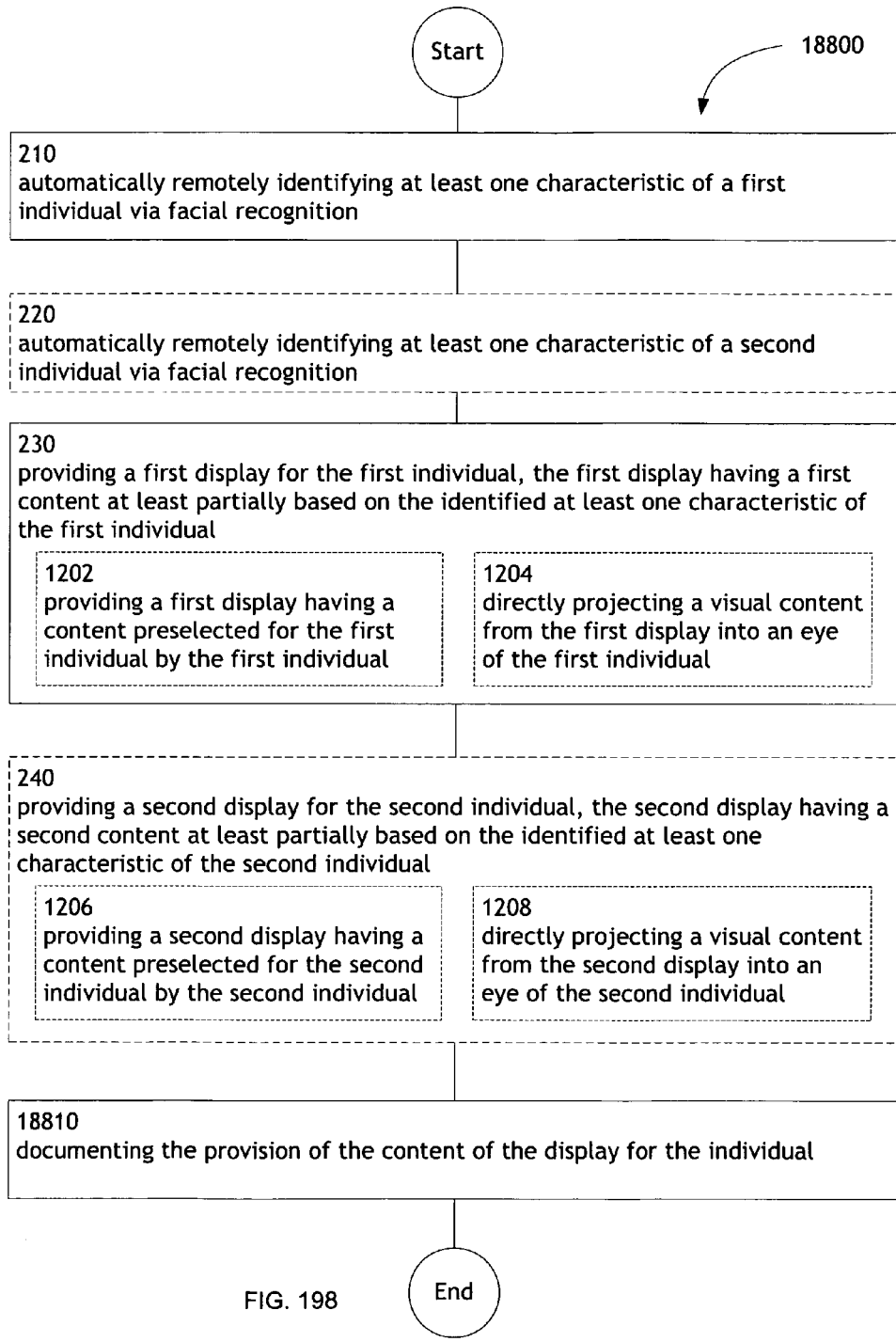

FIG. 198 illustrates an alternative embodiment of the operational flow of FIG. 188.

Figure 199:
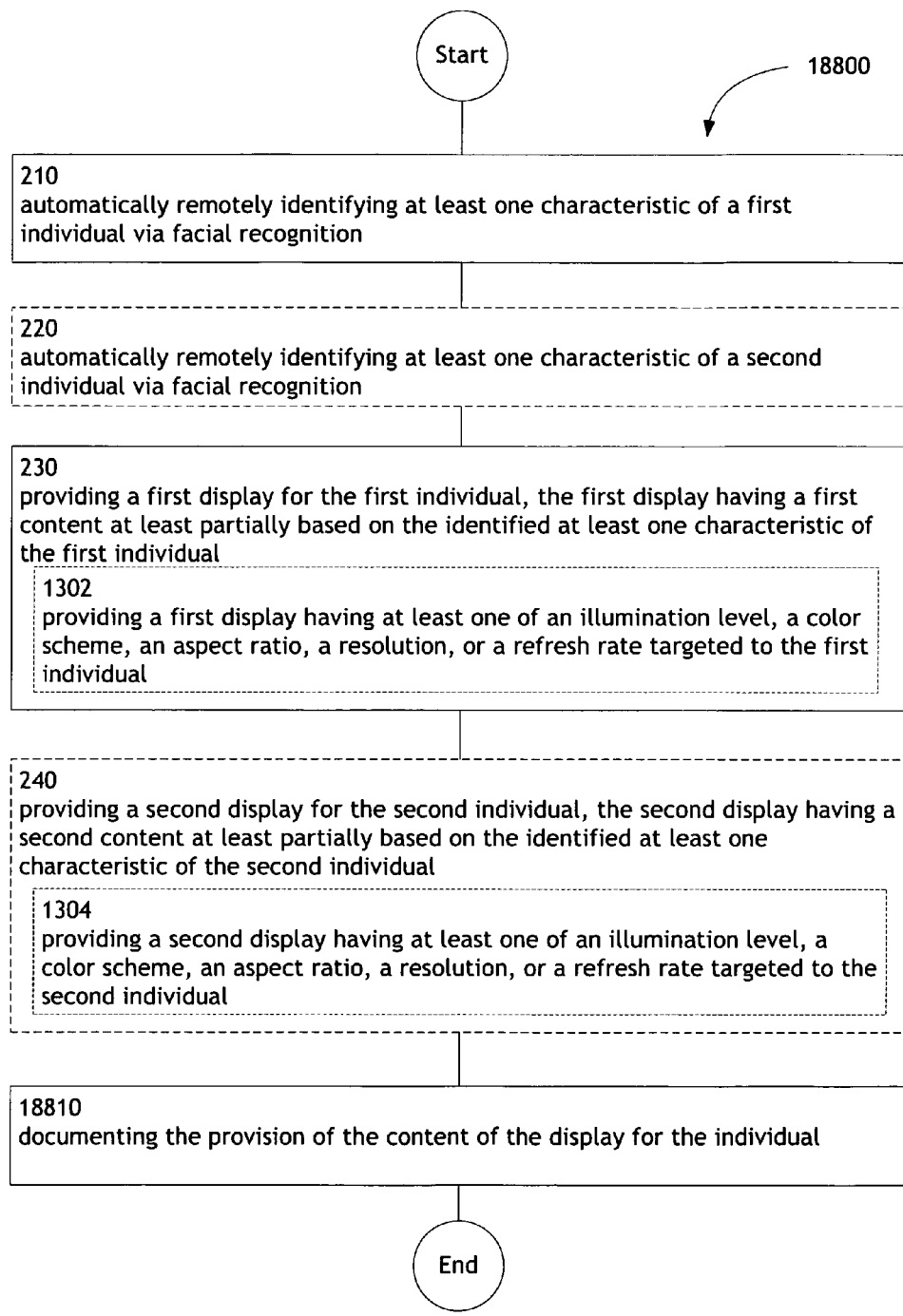

FIG. 199 illustrates an alternative embodiment of the operational flow of FIG. 188.

Figure 200:
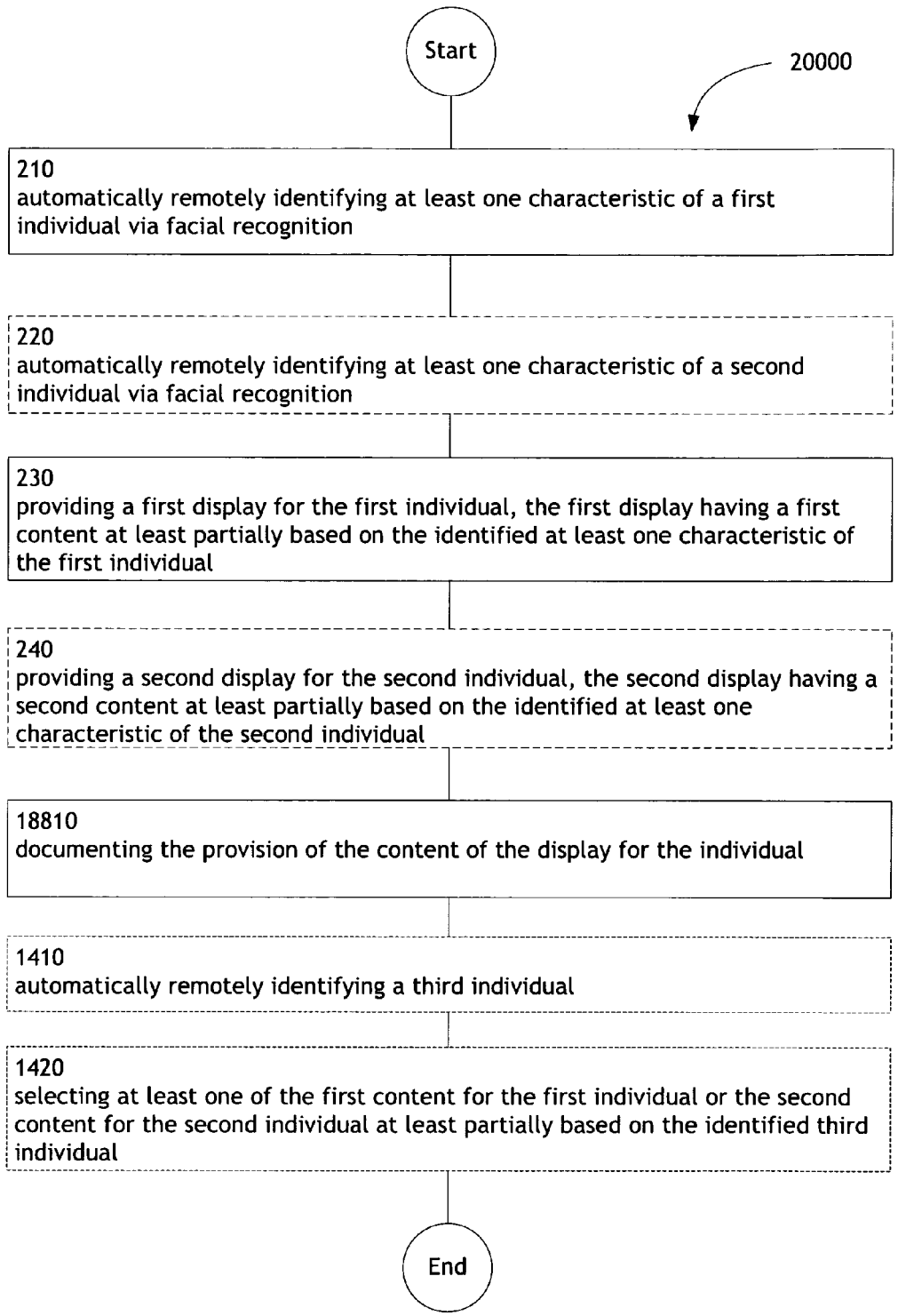

FIG. 200 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, automatically remotely identifying a third individual, and selecting the content for the first individual at least partially based on the identified third individual.

Figure 201A:
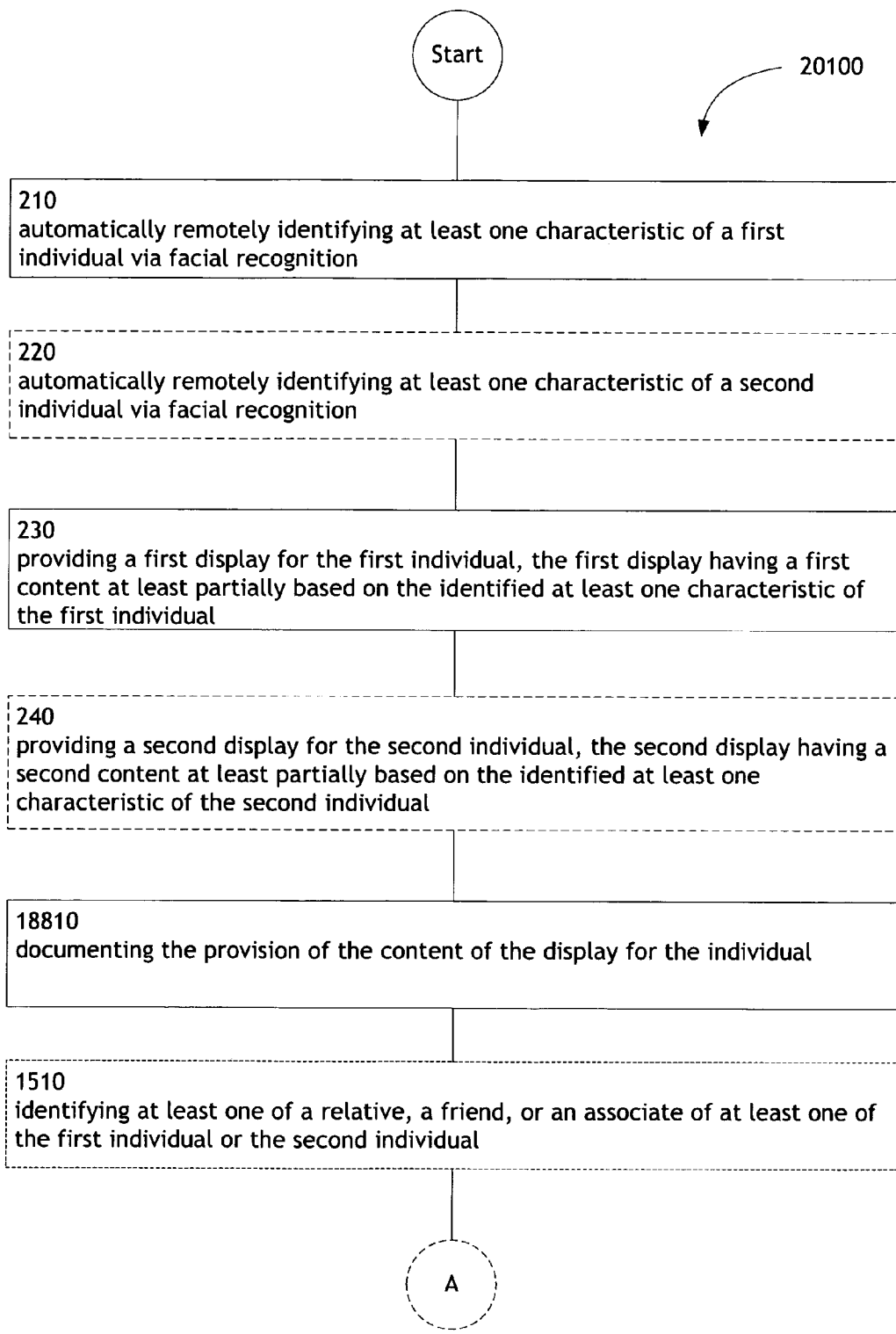

FIG. 201 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, identifying at least one of a relative, a friend, or an associate of the individual, and selecting the content for the individual at least partially based on the identity of the at least one of the relative, the friend, or the associate of the individual.

Figure 202:
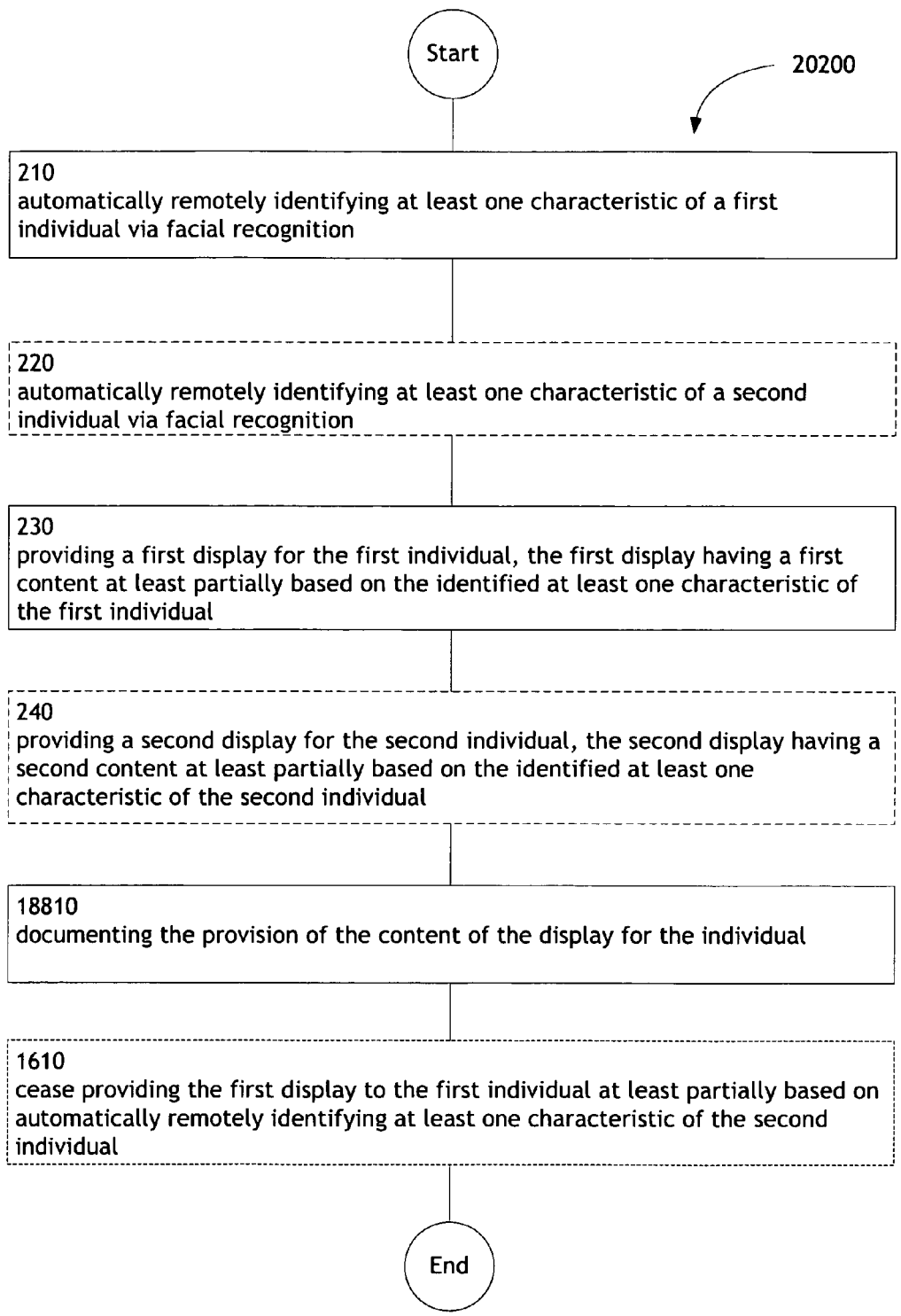

FIG. 202 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, and cease providing the display to the first individual at least partially based on automatically remotely identifying at least one characteristic of a second individual.

Figure 203A:
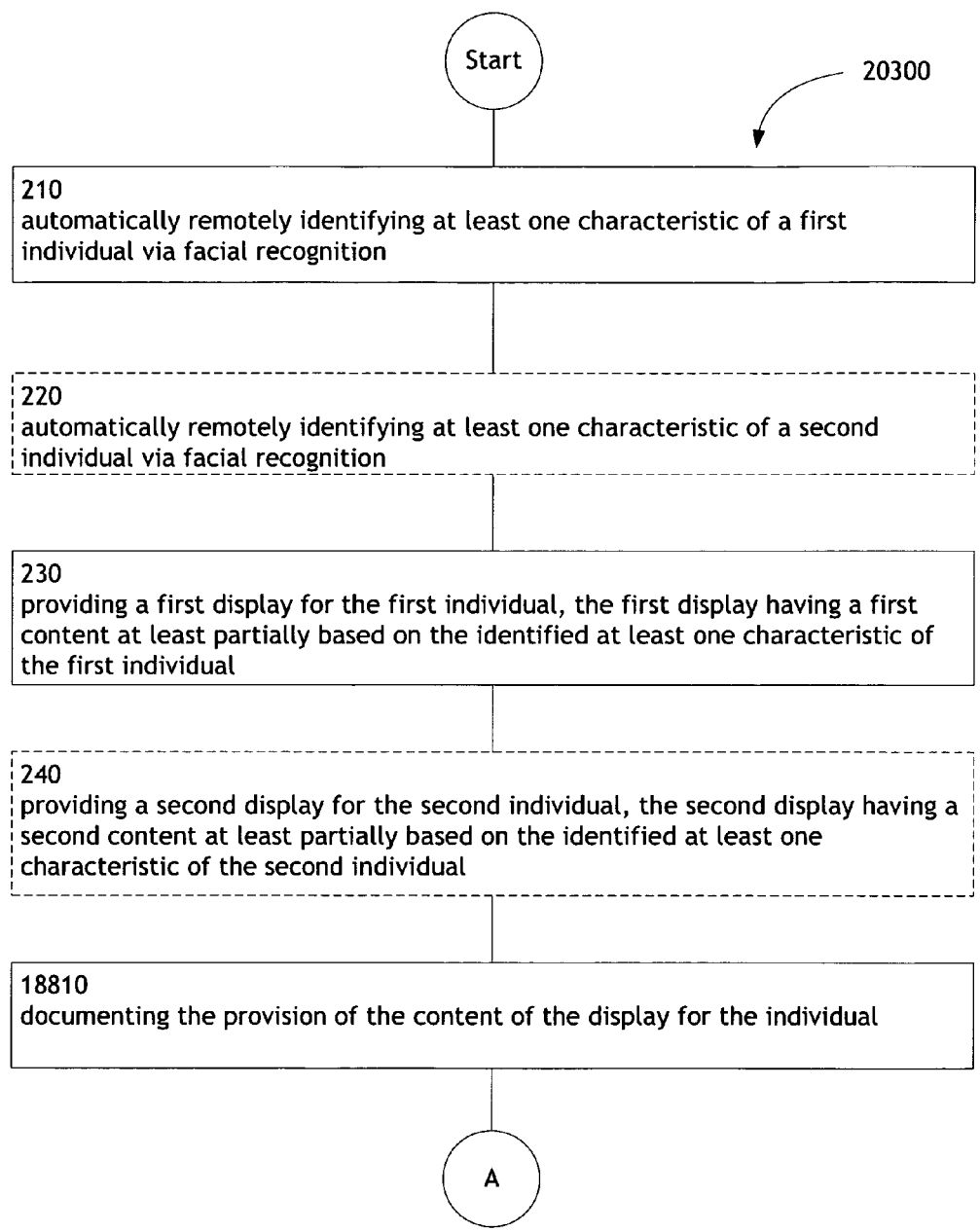

FIG. 203 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, automatically remotely identifying a third higher priority individual, and cease providing the display to the first individual at least partially based on the identified third higher priority individual.

Figure 204:
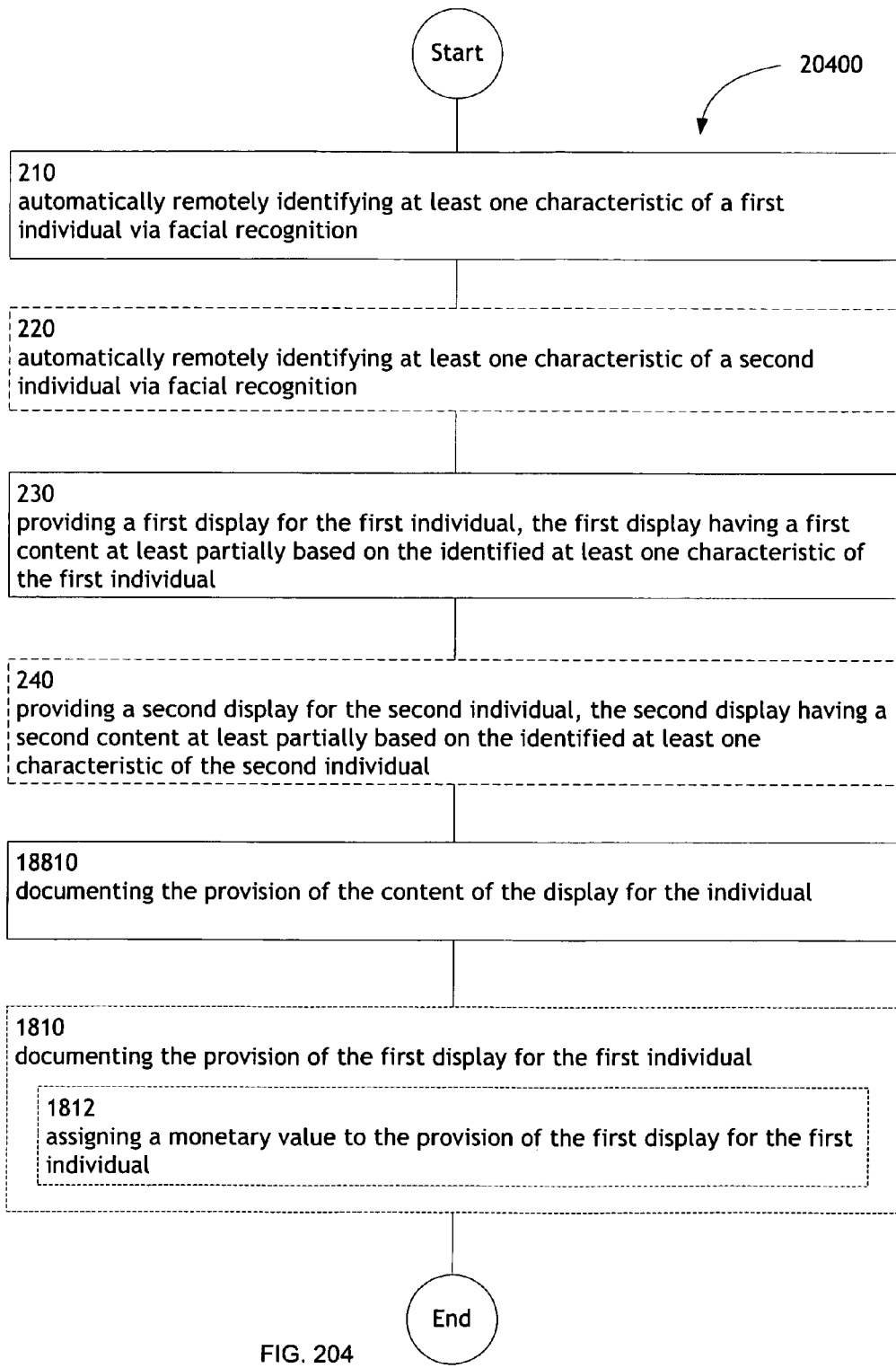

FIG. 204 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, and documenting the provision of the display for the individual.

Figure 205:
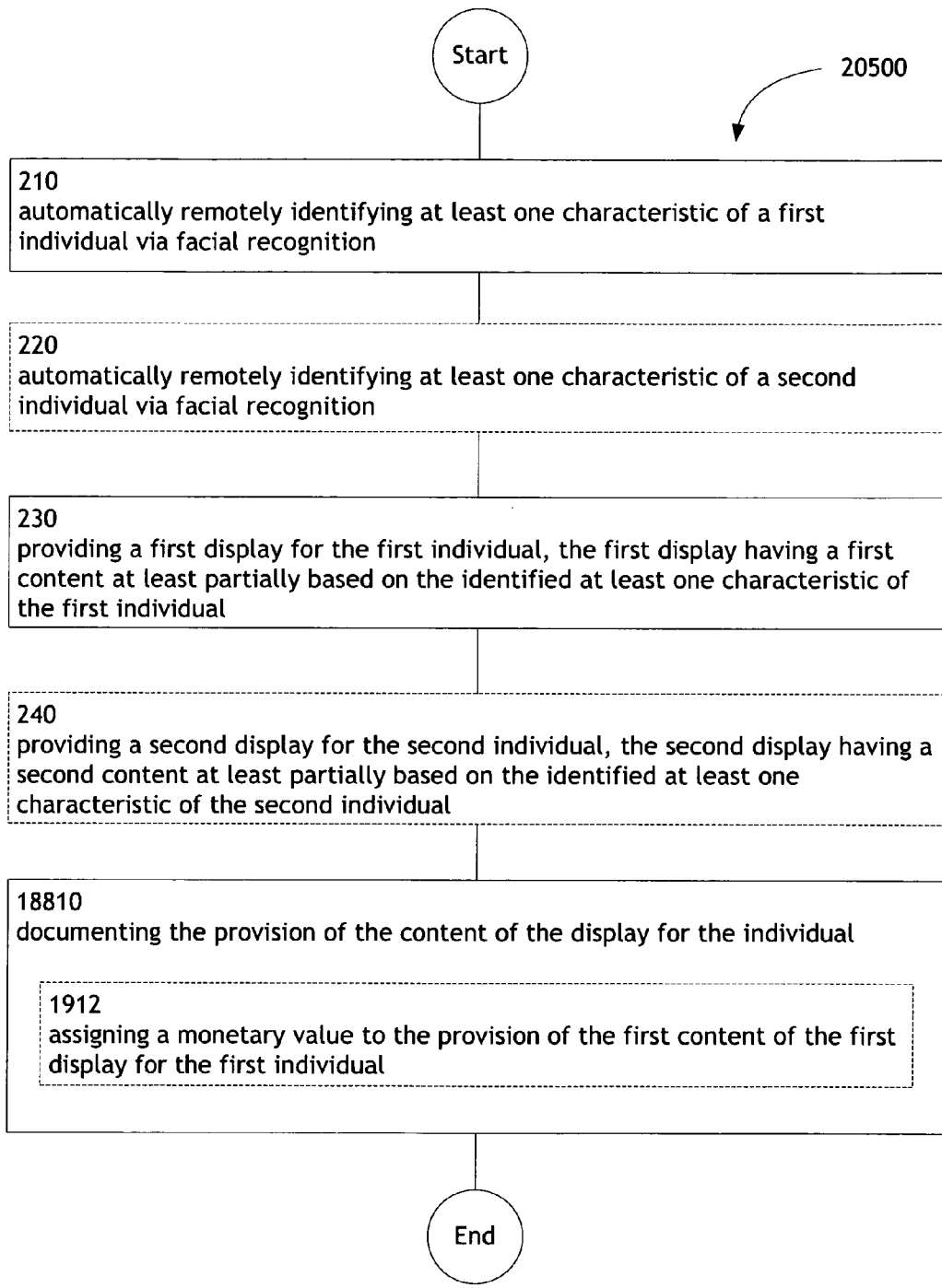

FIG. 205 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, and documenting the provision of the content of the display for the individual.

Figure 206:
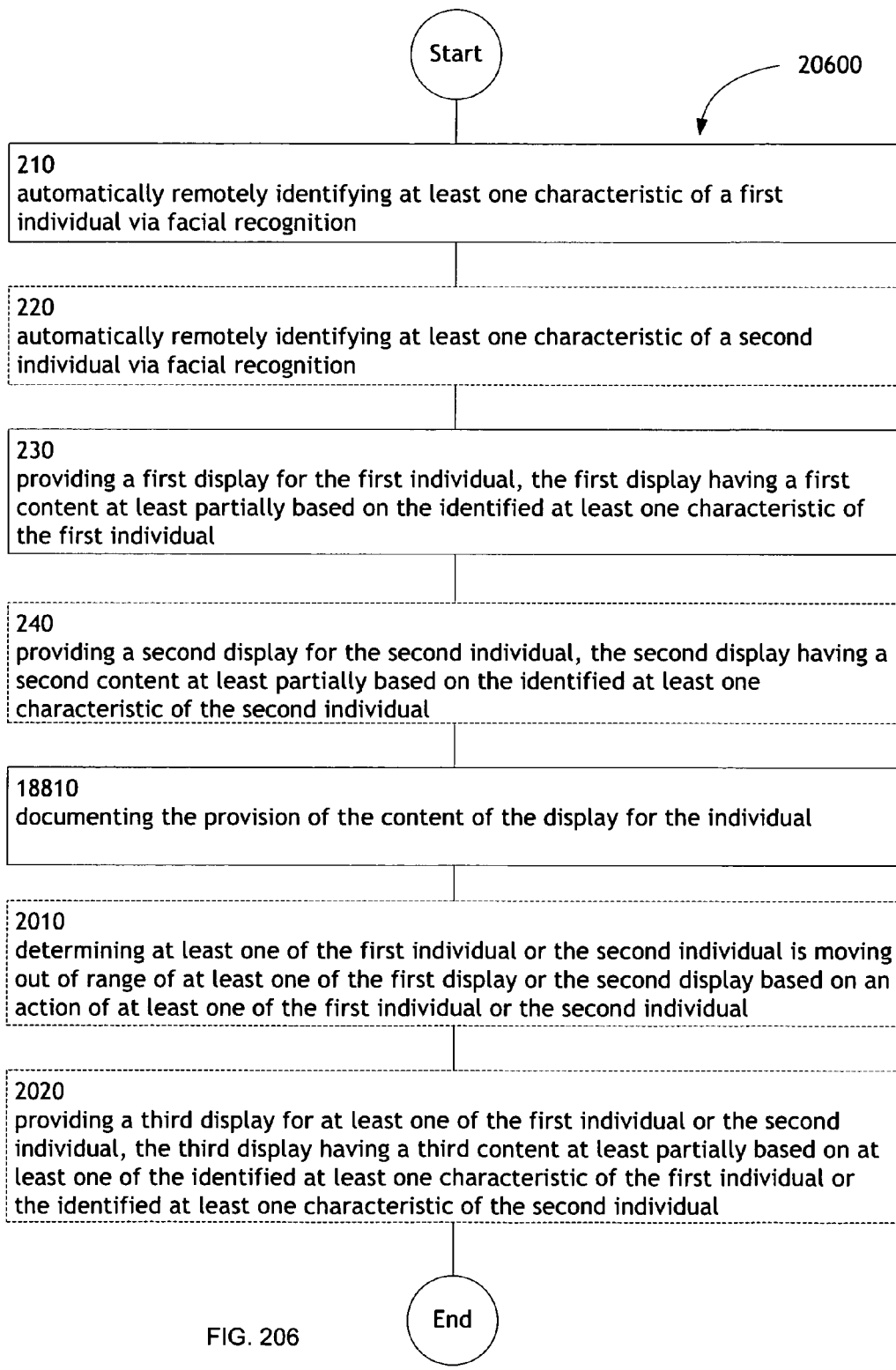

FIG. 206 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, determining the individual is moving out of range of the display based on an action of the individual, and providing a third display for the individual, the third display having a third content at least partially based on the identified at least one characteristic of the individual.

Figure 207:
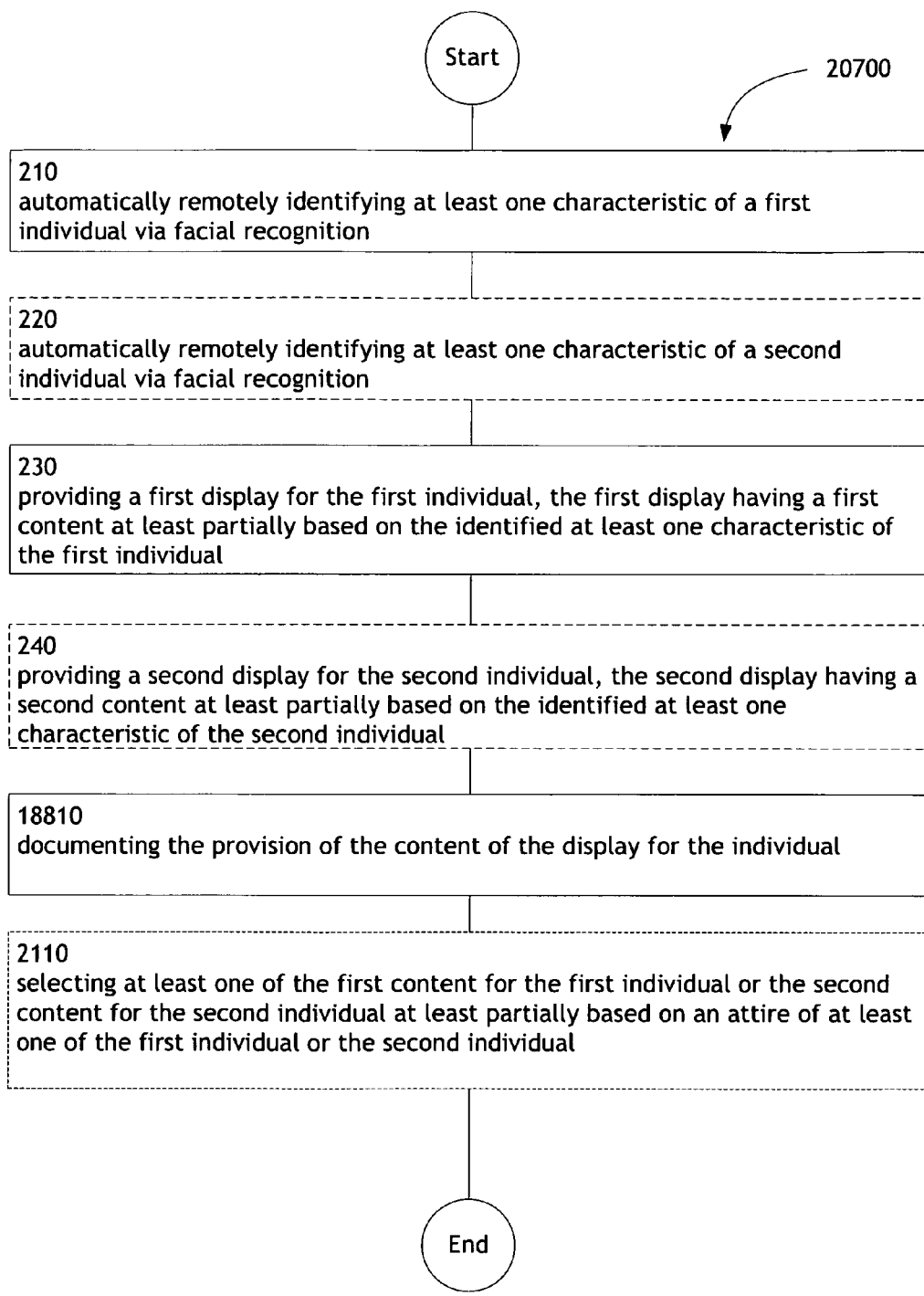

FIG. 207 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, selecting the content for the individual at least partially based on an attire of the individual.

Figure 208:
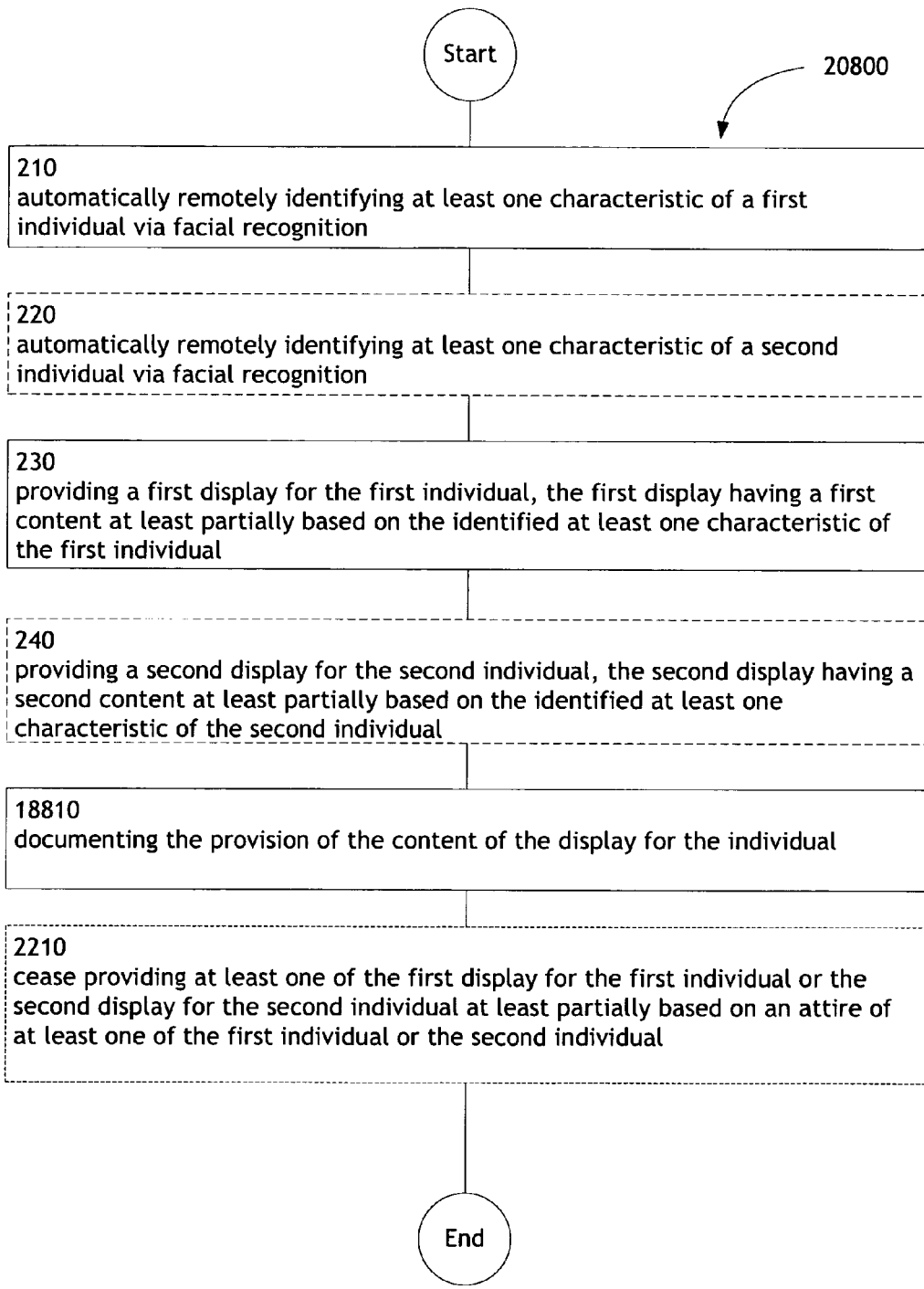

FIG. 208 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, and cease providing the display for the individual at least partially based on an attire of the individual.

Figure 209:
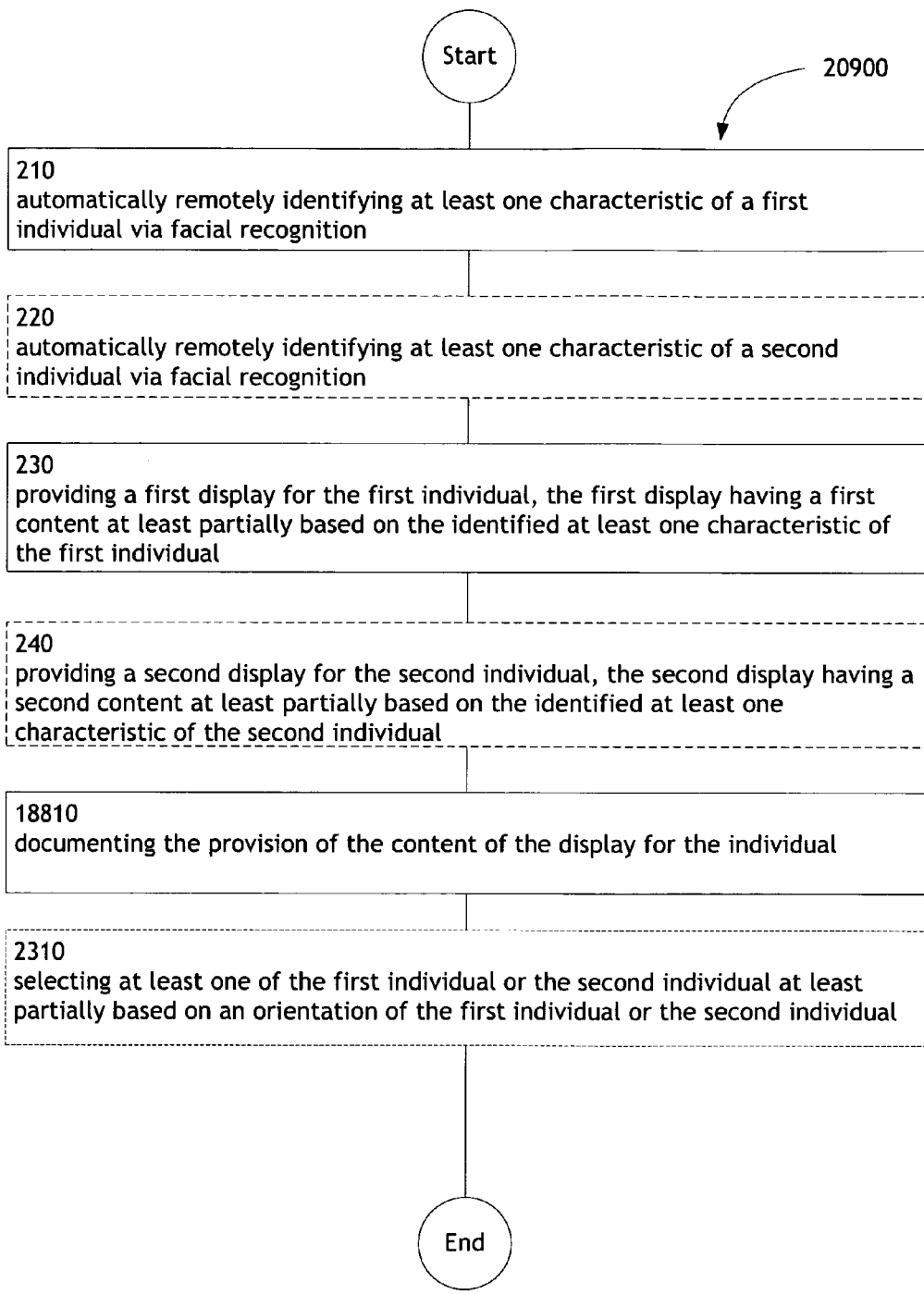

FIG. 209 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, and selecting the individual at least partially based on an orientation of the individual.

Figure 210A:
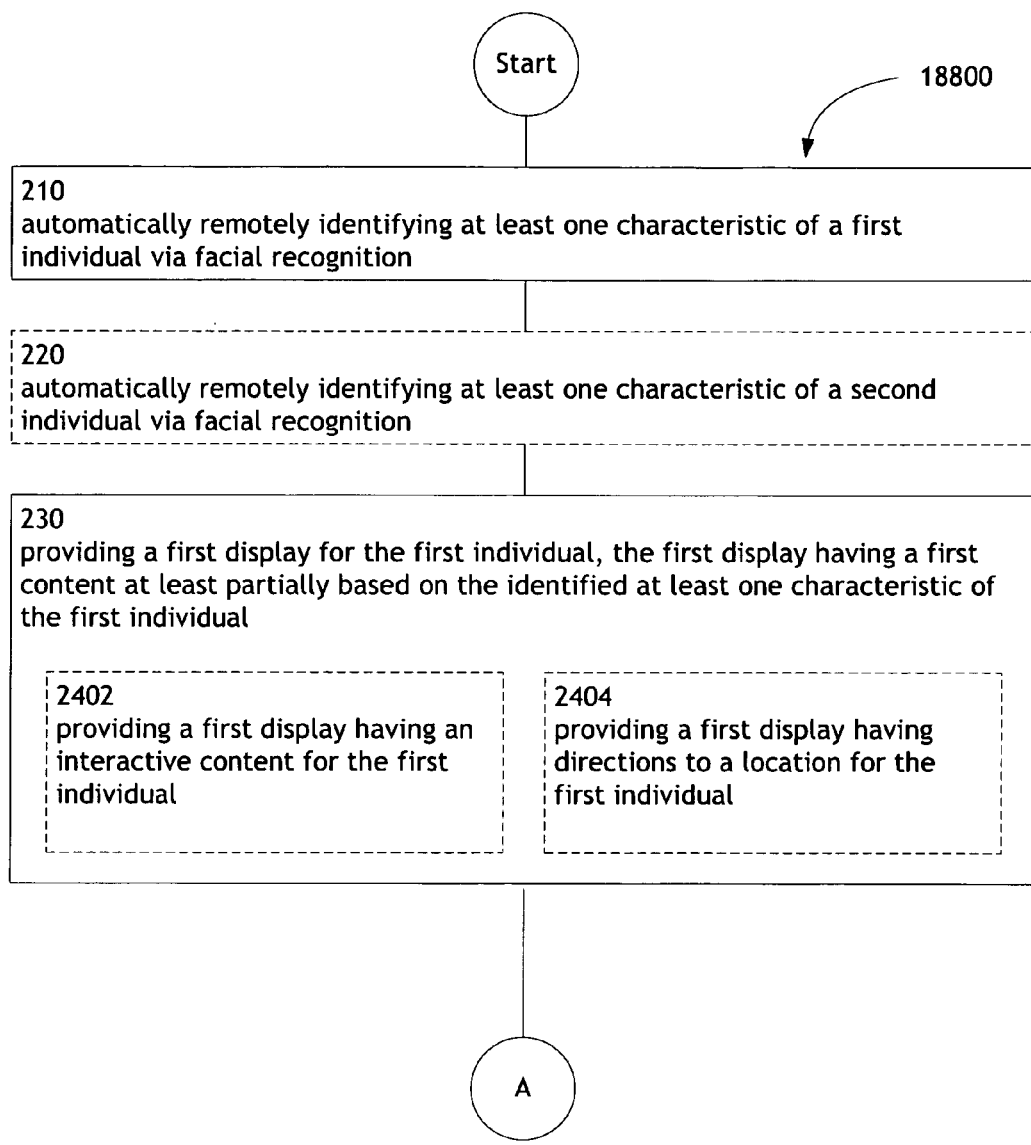
Figure 210B:
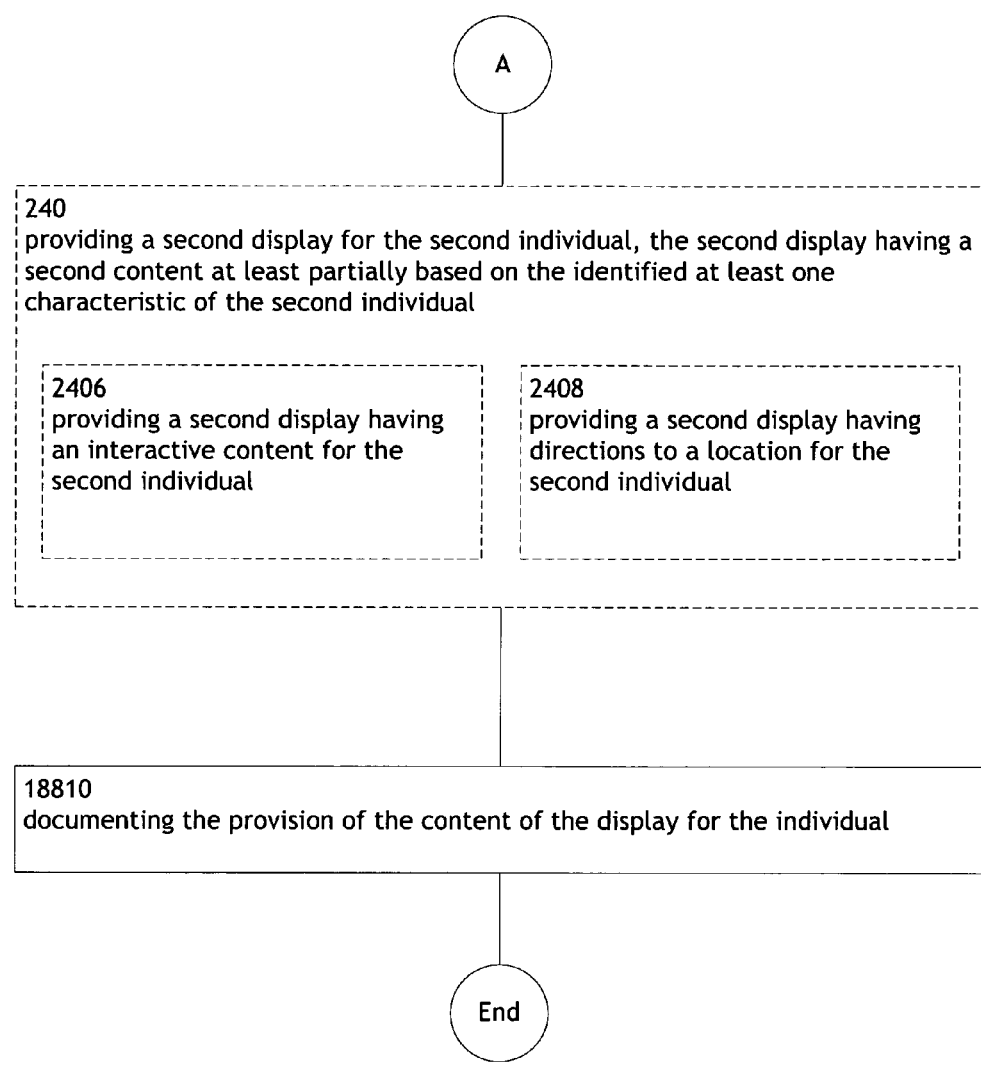

FIG. 210 illustrates an alternative embodiment of the operational flow of FIG. 188.

Figure 211A:
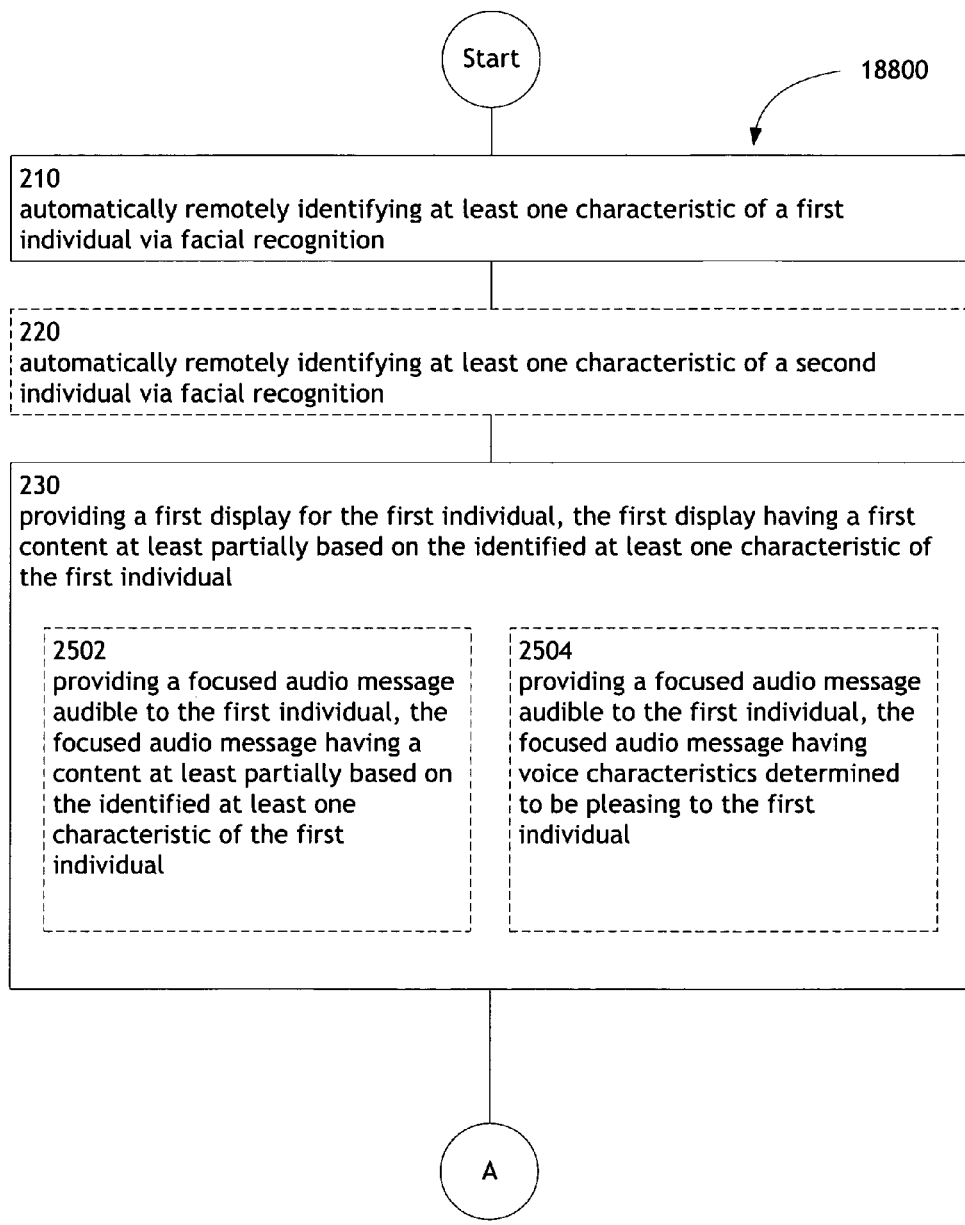
Figure 211B:
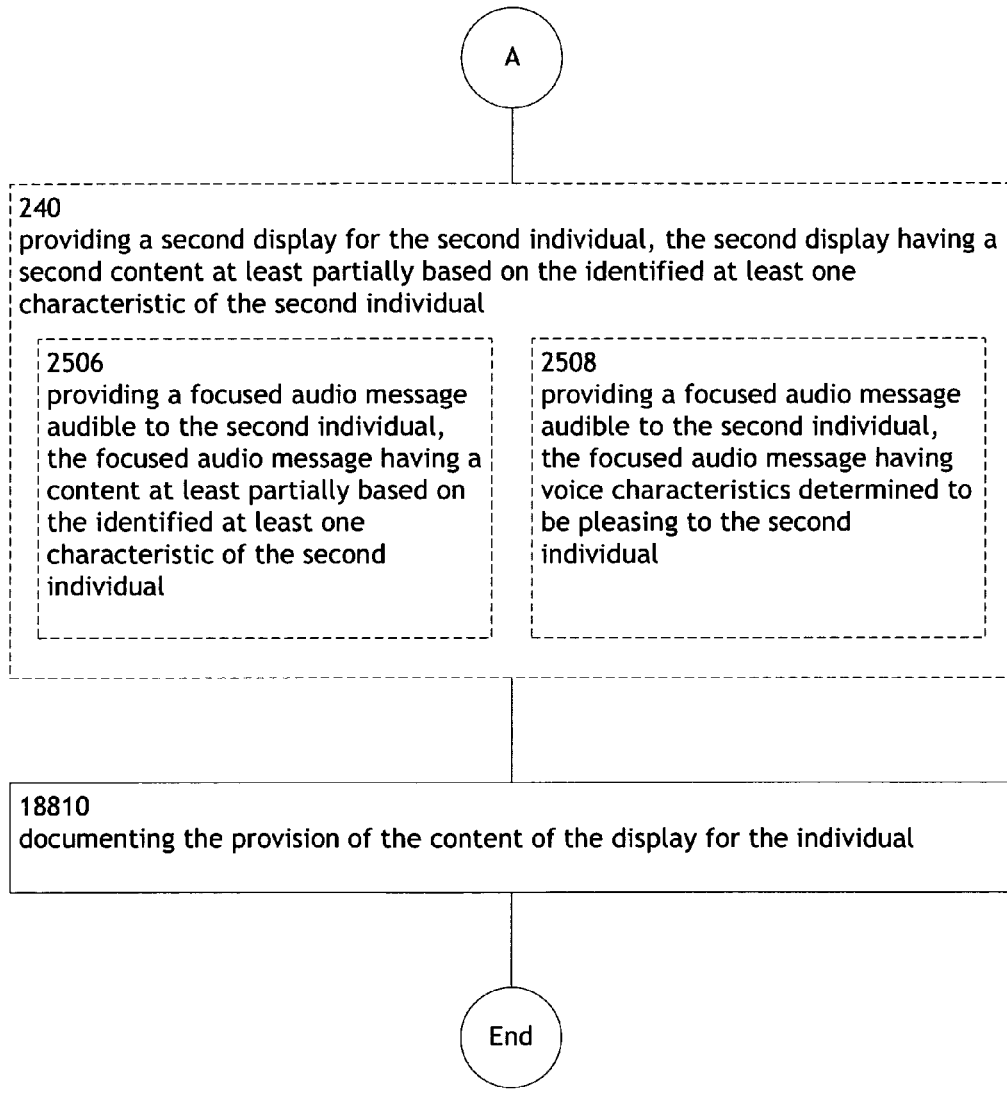

FIG. 211 illustrates an alternative embodiment of the operational flow of FIG. 188.

Figure 212A:
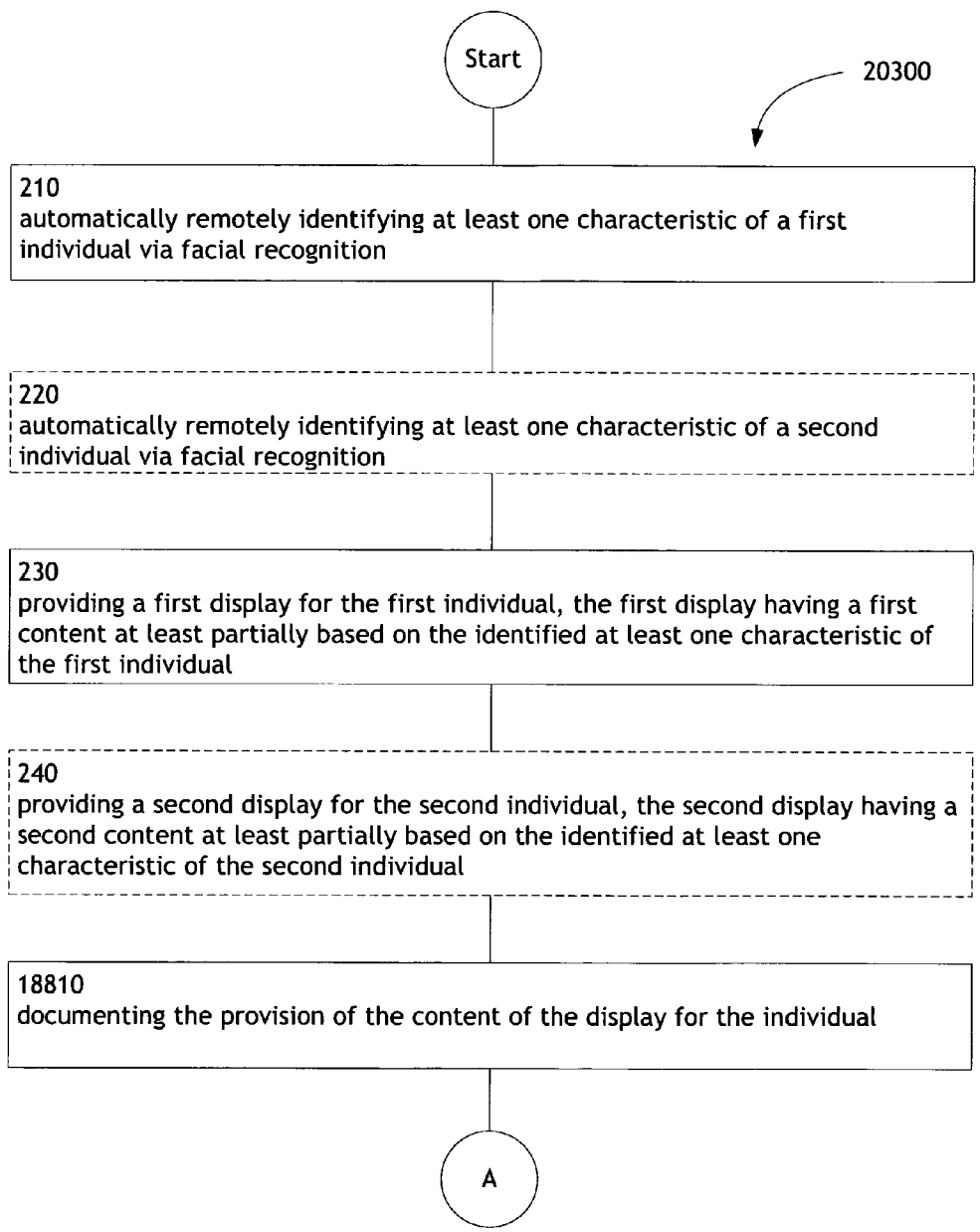
Figure 212B:
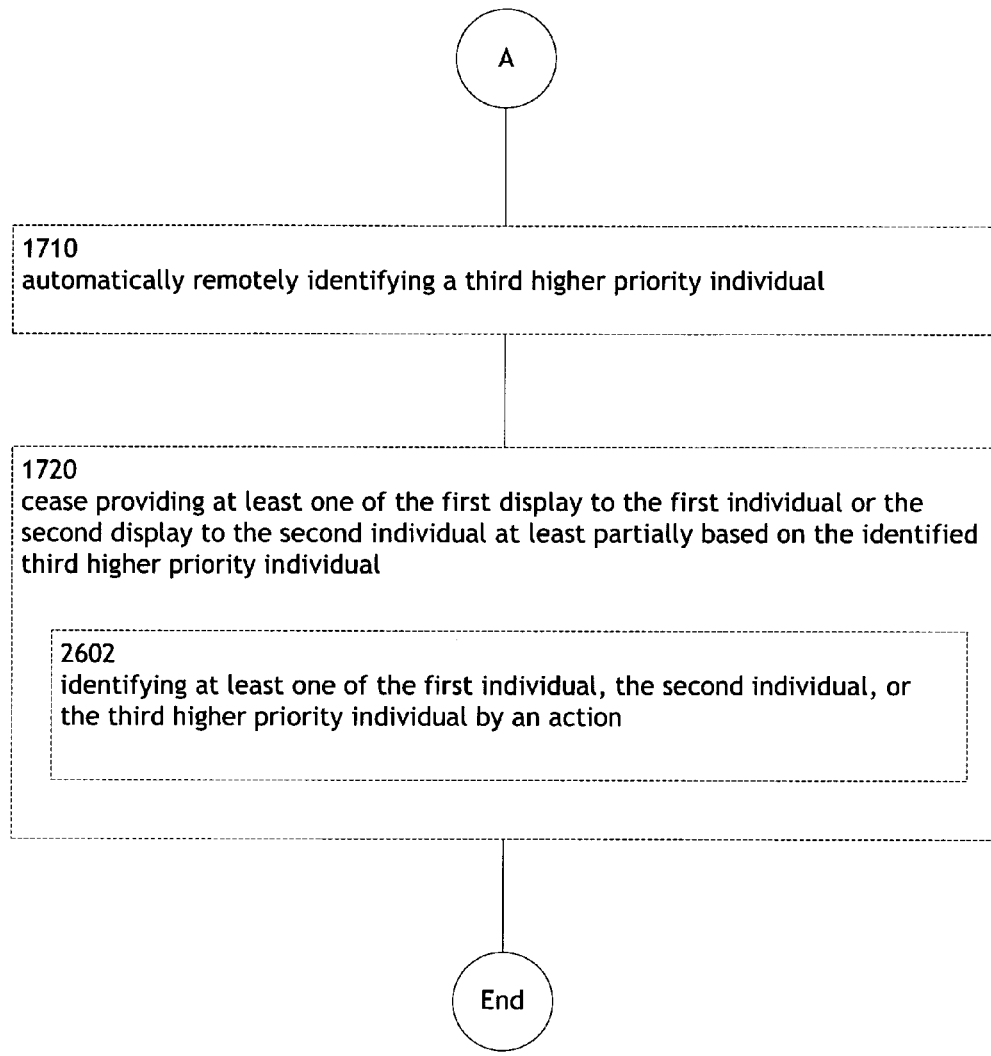

FIG. 212 illustrates an alternative embodiment of the operational flow of FIG. 203.

Figure 213A:
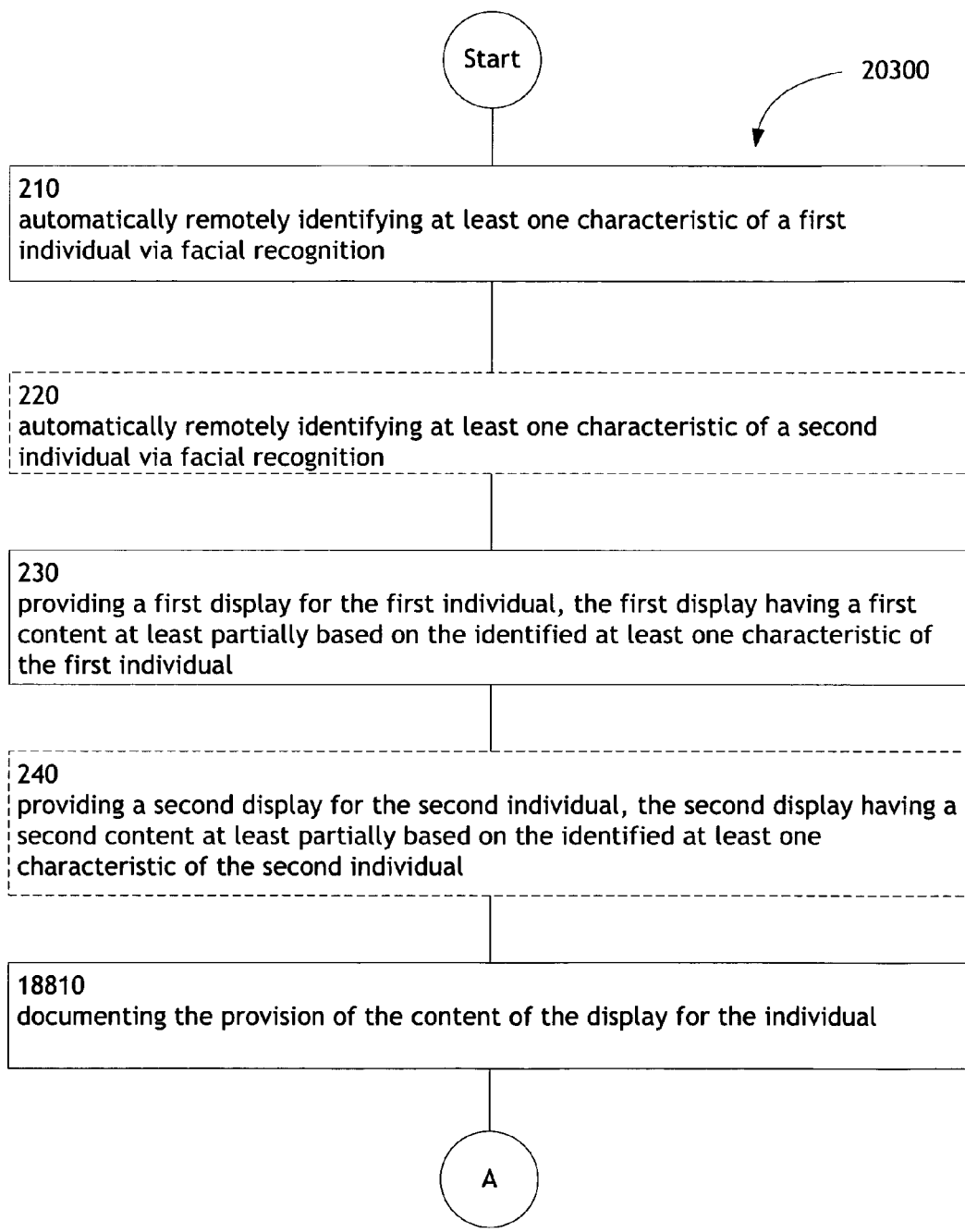
Figure 213B:
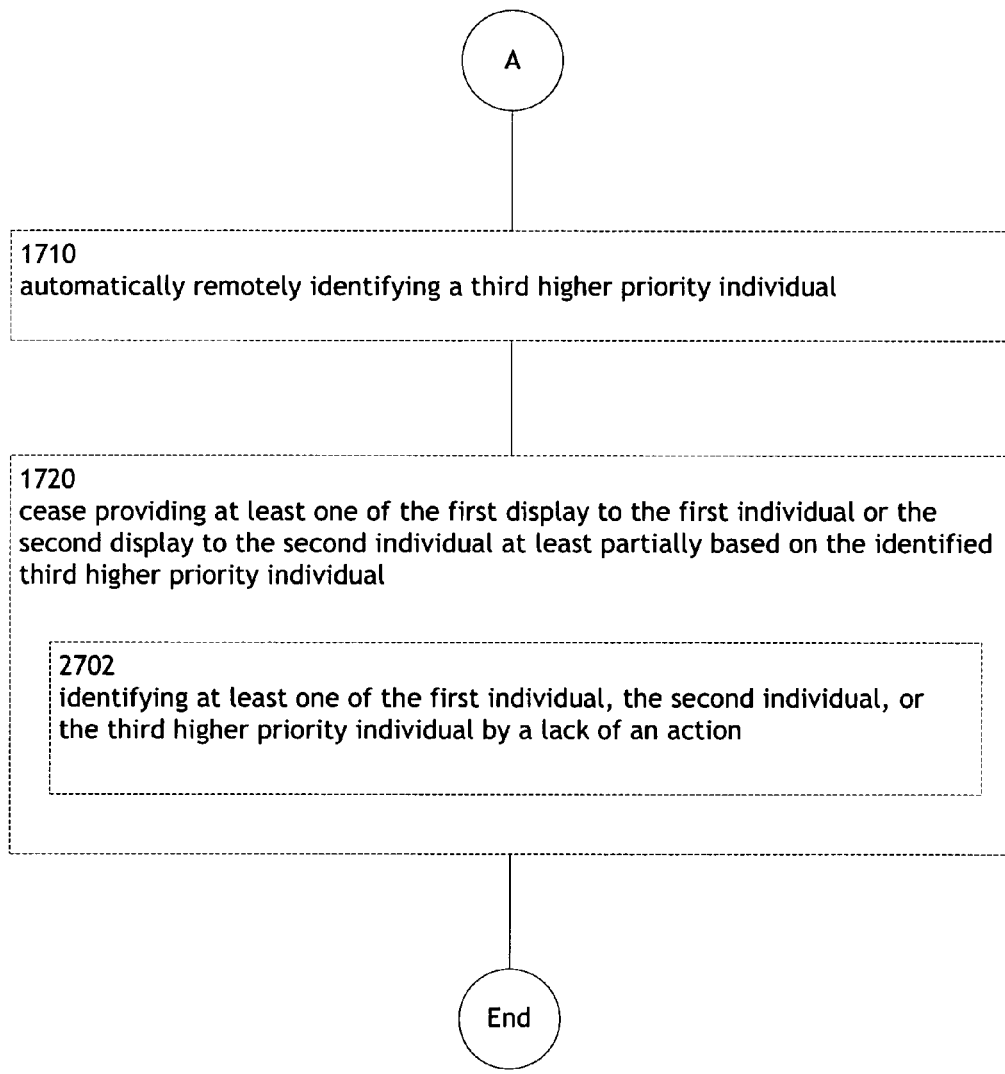

FIG. 213 illustrates an alternative embodiment of the operational flow of FIG. 203.

Figure 214:
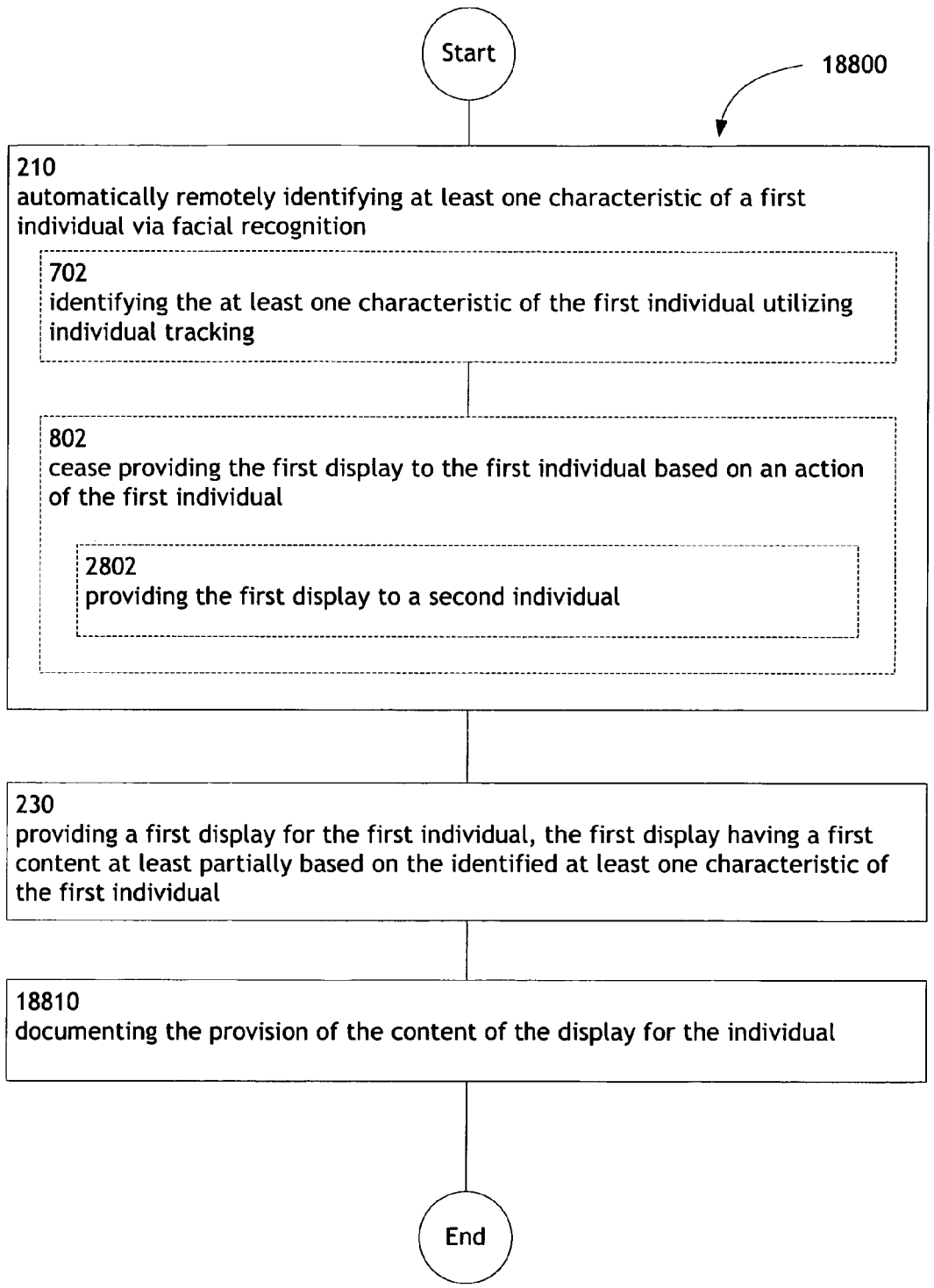

FIG. 214 illustrates an alternative embodiment of the operational flow of FIG. 188.

Figure 215:
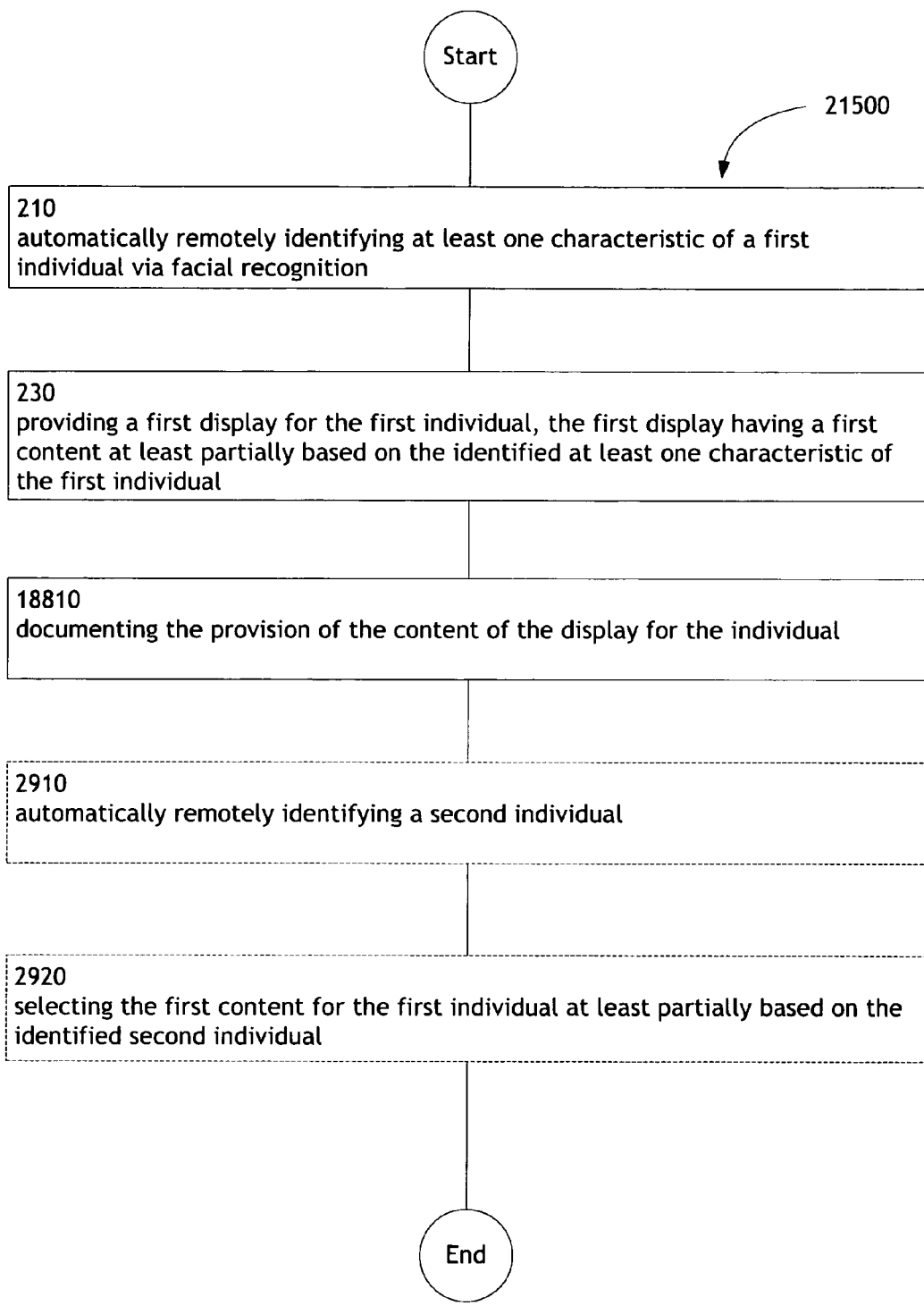

FIG. 215 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, automatically remotely identifying a second individual, and selecting the content for the first individual at least partially based on the identified second individual.

Figure 216:
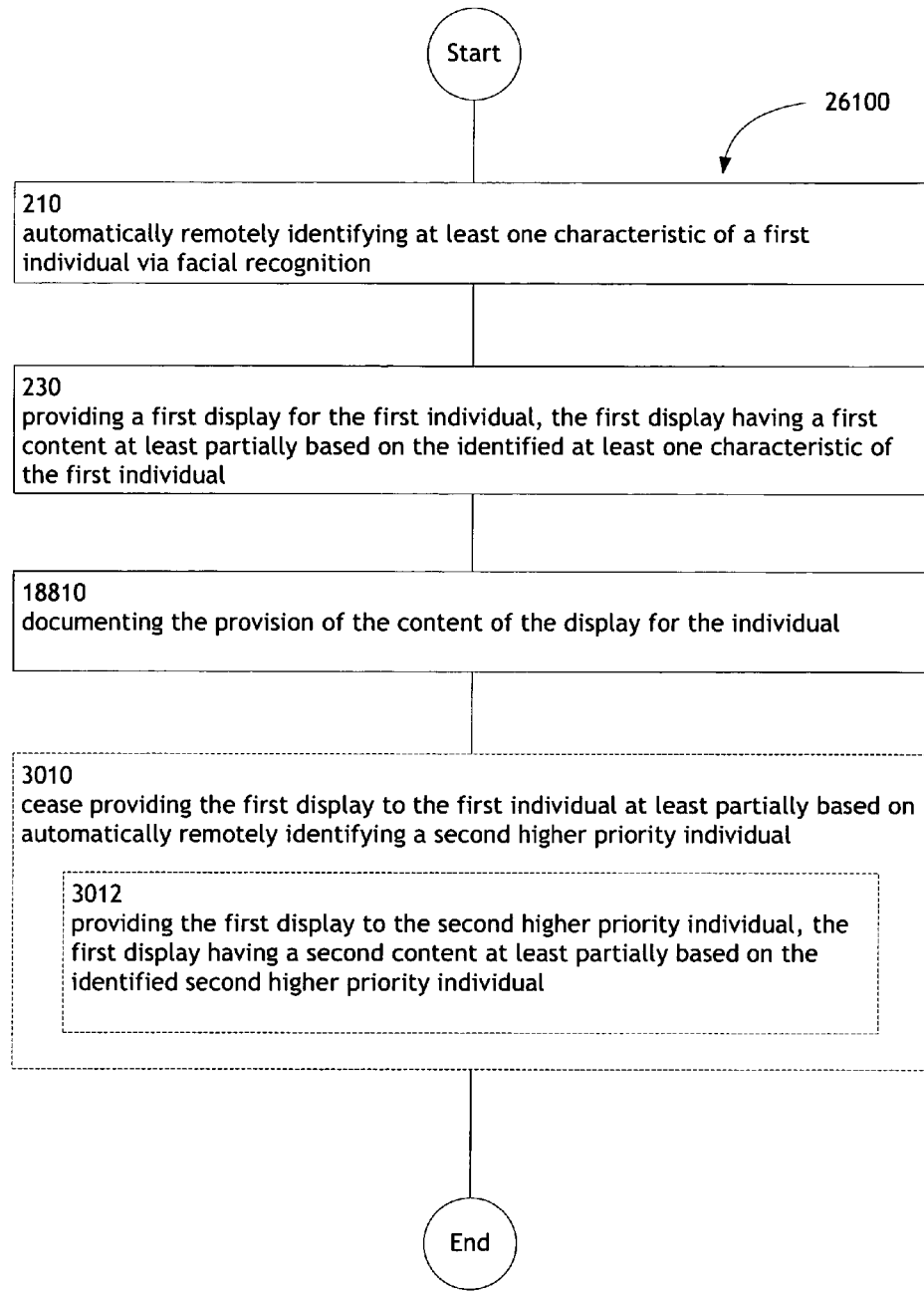

FIG. 216 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, and cease providing the display to the first individual at least partially based on automatically remotely identifying a second higher priority individual.

Figure 217:
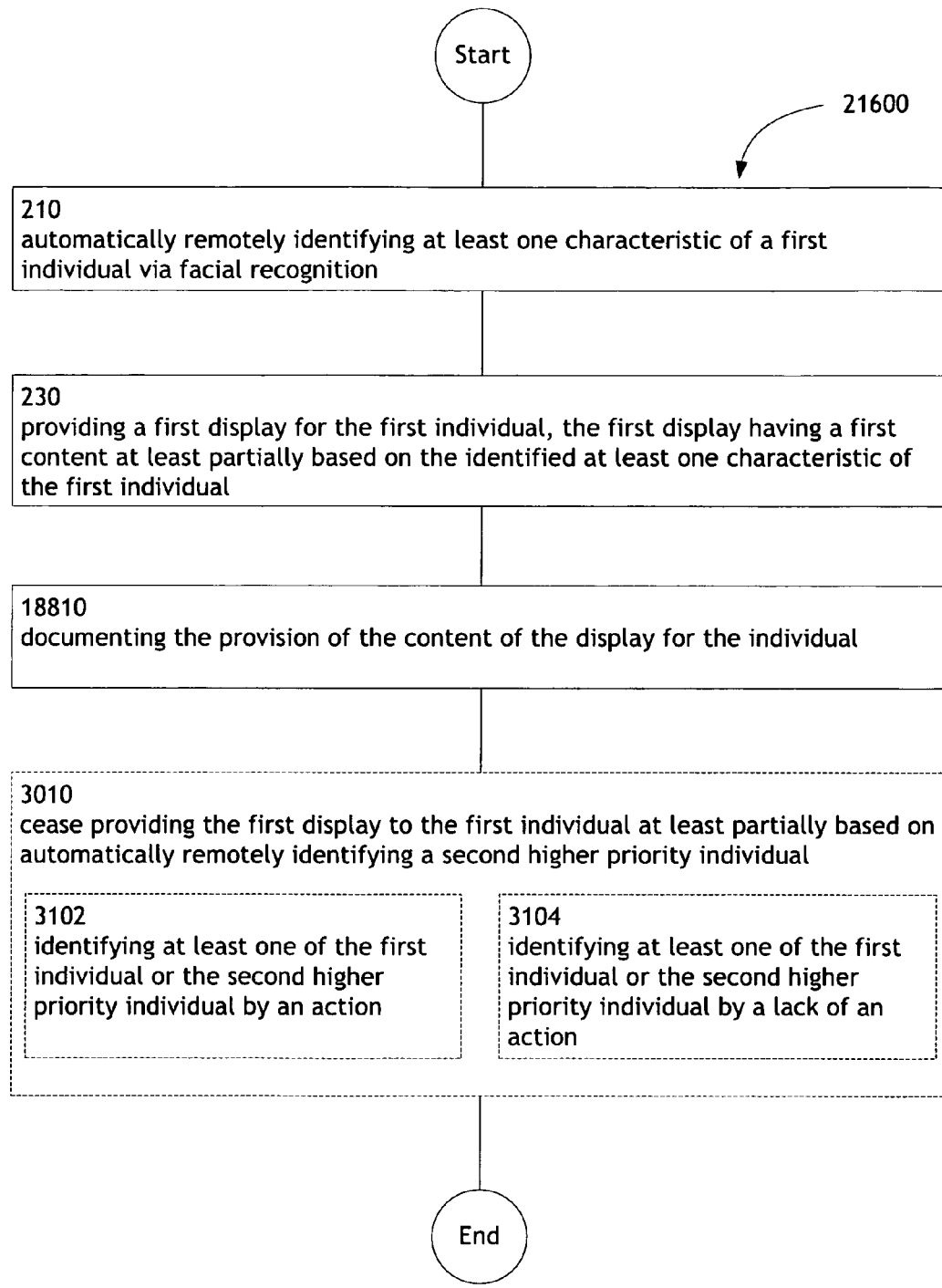

FIG. 217 illustrates an alternative embodiment of the operational flow of FIG. 216.

Figure 218:
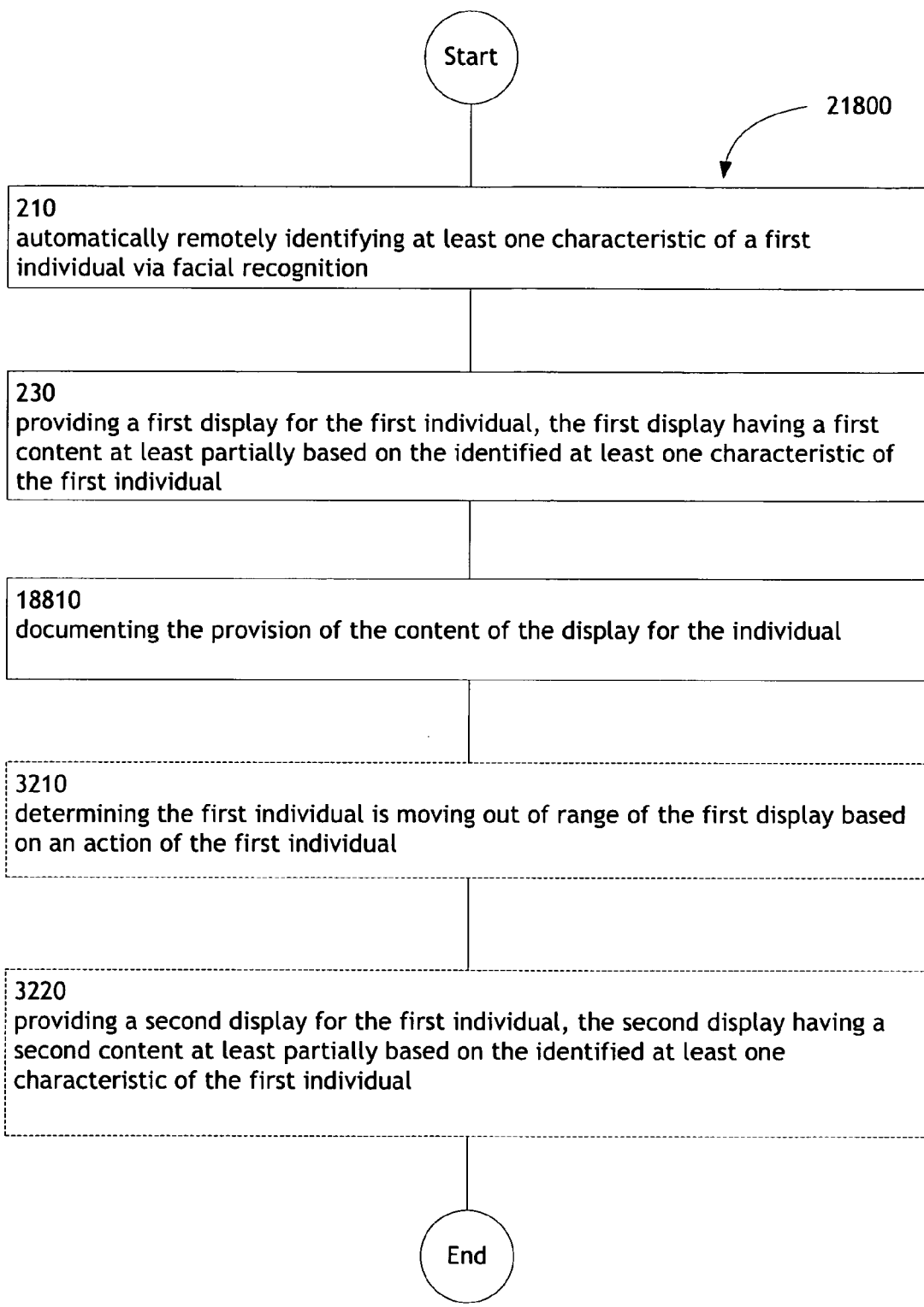

FIG. 218 illustrates an operational flow representing example operations related to automatically remotely identifying one or more characteristics of an individual utilizing facial recognition, providing a display for the individual having a content at least partially based on the one or more identified characteristics of the individual, documenting the provision of the content of the display for the individual, determining the individual is moving out of range of the display based on an action of the individual, and providing a second display for the individual, the second display having a second content at least partially based on the identified at least one characteristic of the individual.

Figure 219:
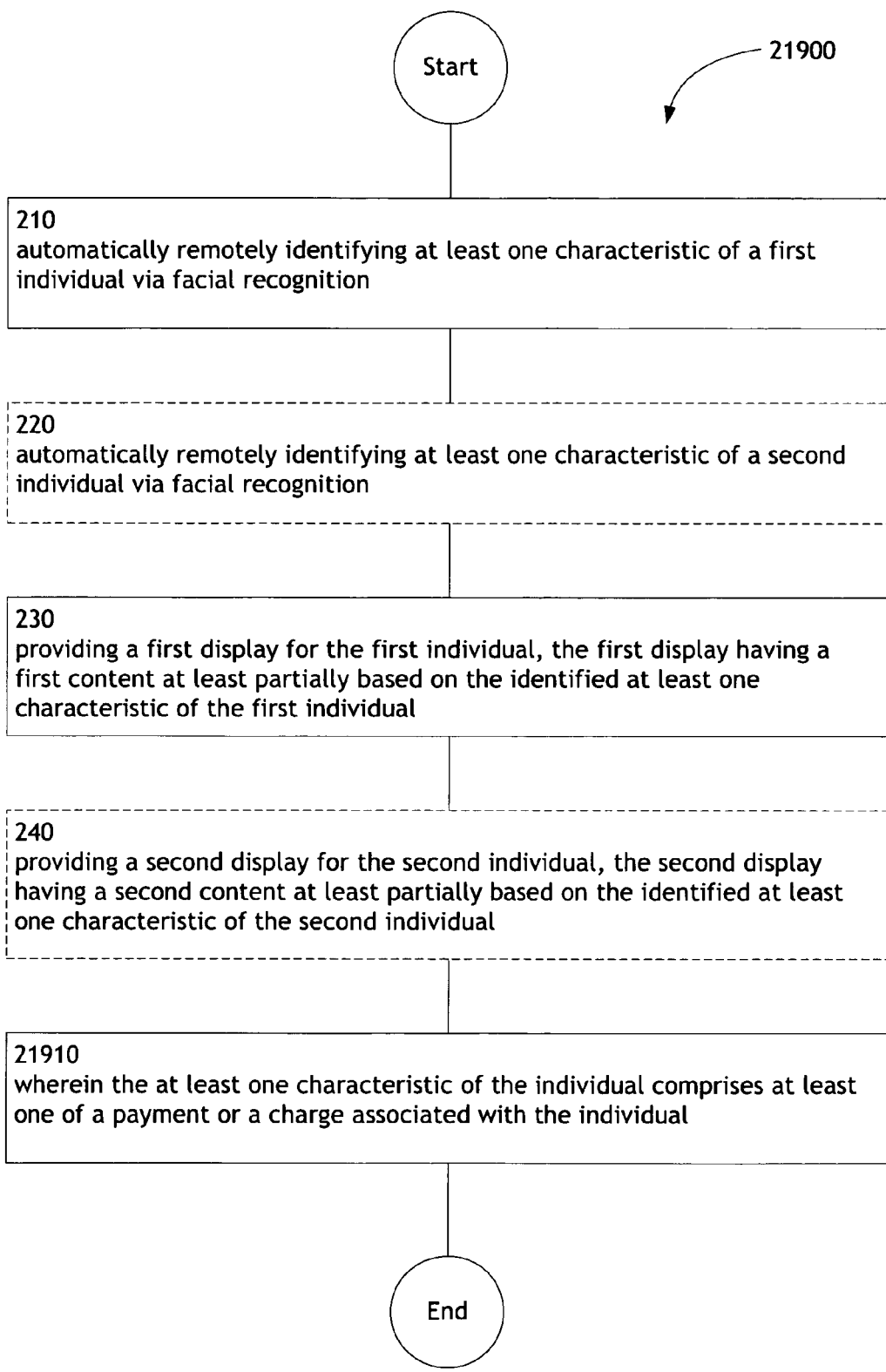

FIG. 219 illustrates an operational flow representing example operations related to automatically remotely identifying one or more characteristics of an individual utilizing facial recognition, providing a display for the individual having a content at least partially based on the one or more identified characteristics of the individual, and wherein the at least one characteristic of the individual comprises at least one of a payment or a charge associated with the individual.

Figure 220:
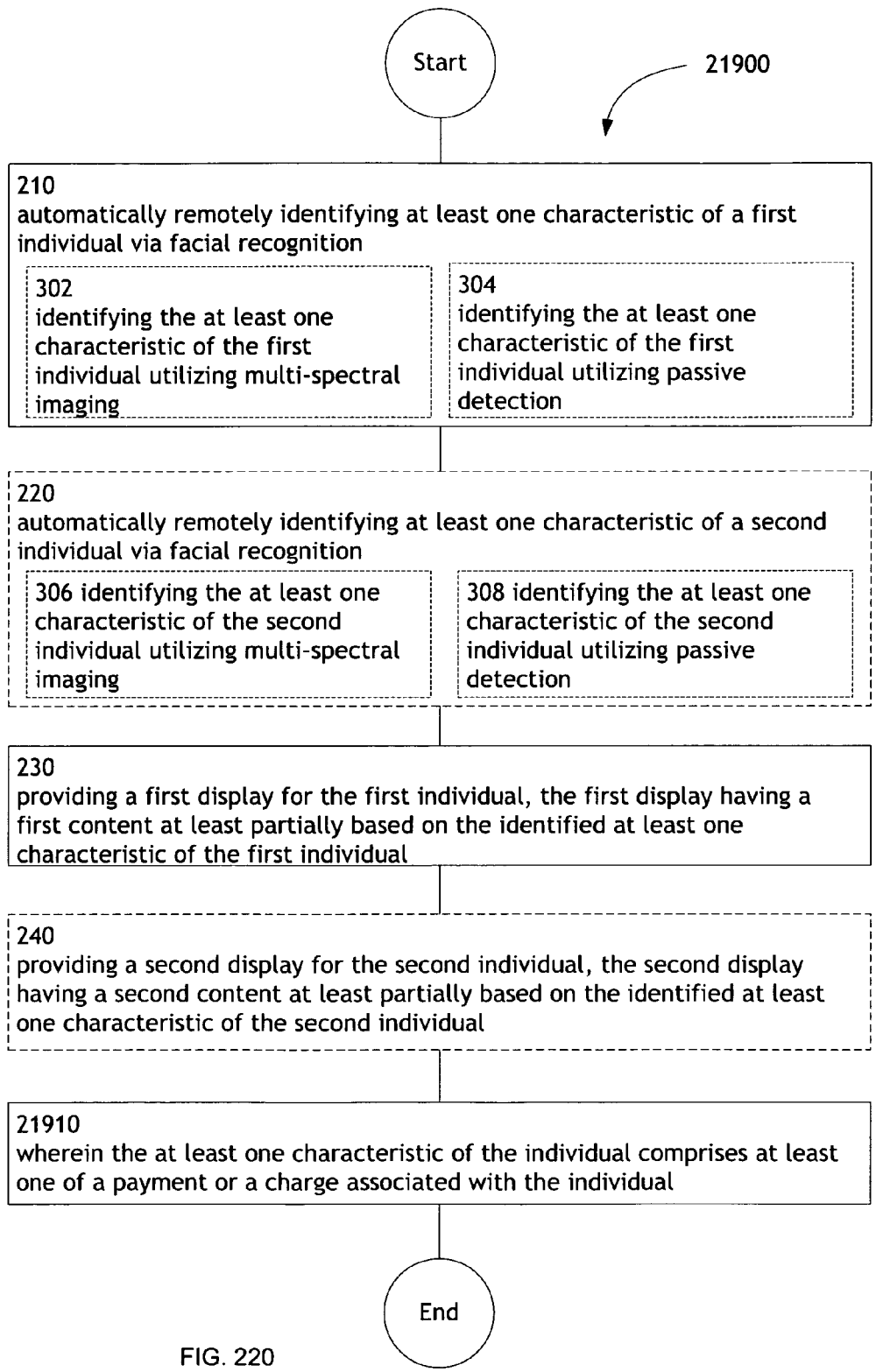

FIG. 220 illustrates an alternative embodiment of the operational flow of FIG. 219.

Figure 221:
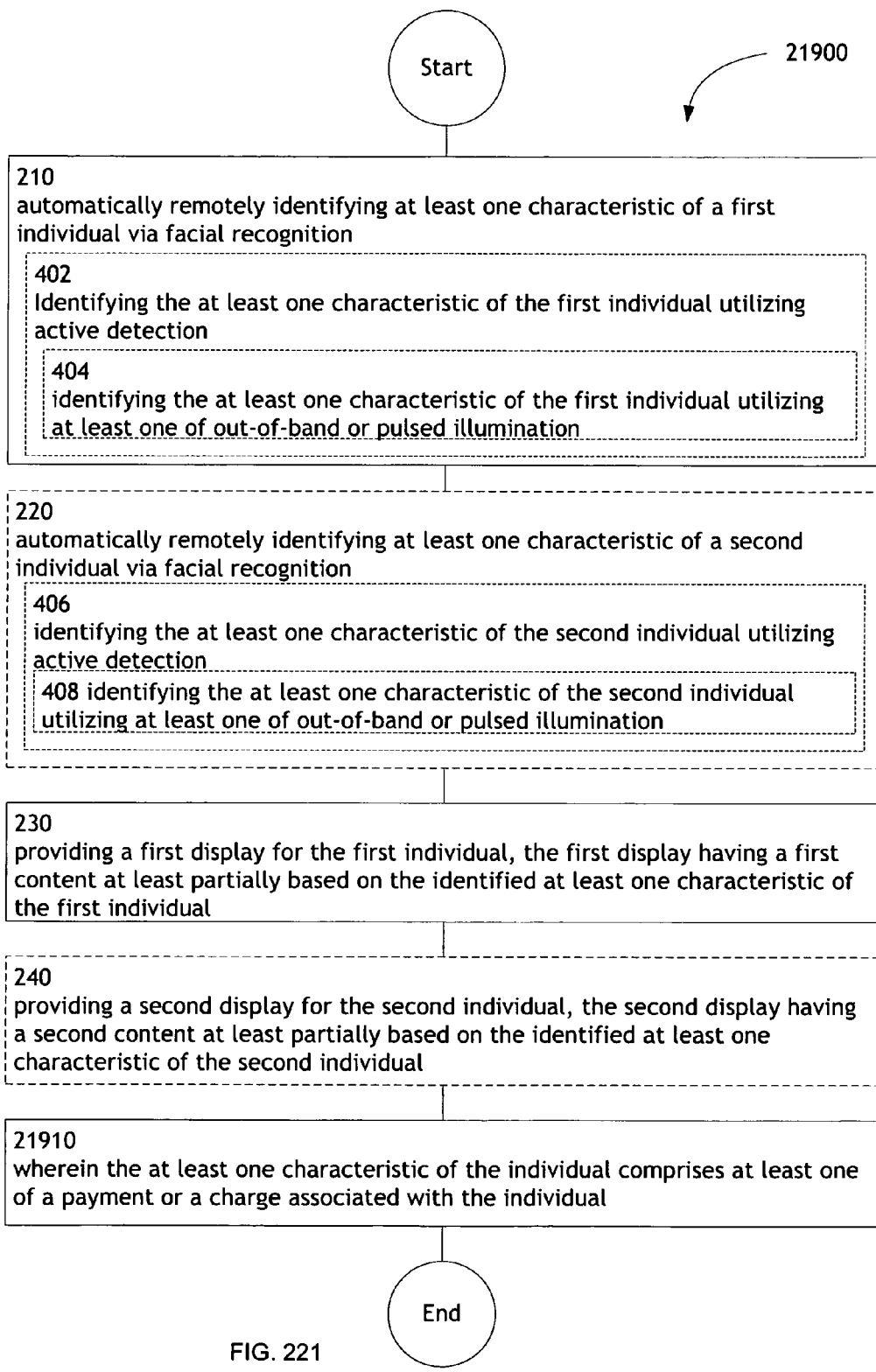

FIG. 221 illustrates an alternative embodiment of the operational flow of FIG. 219.

Figure 222:
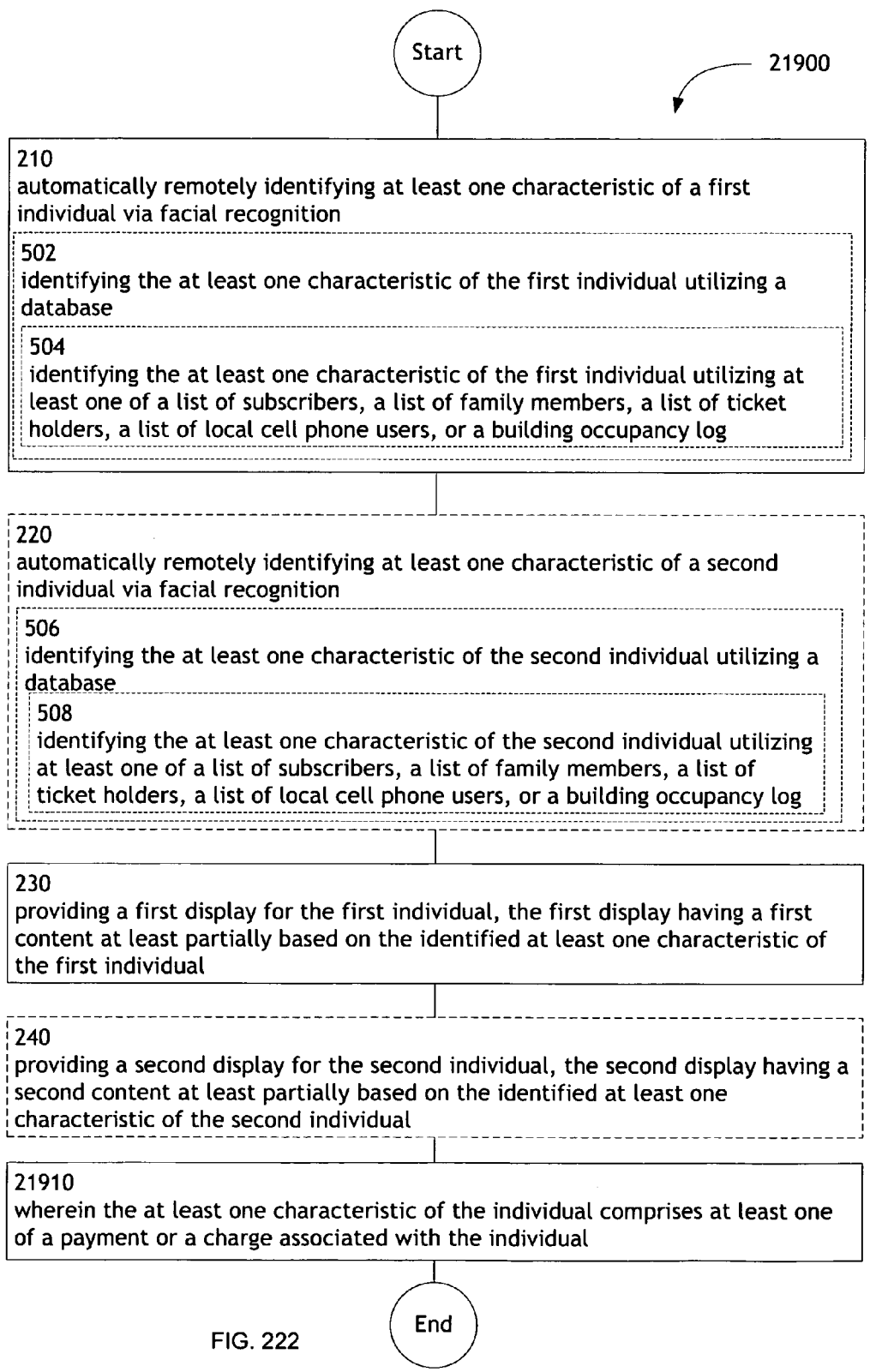

FIG. 222 illustrates an alternative embodiment of the operational flow of FIG. 219.

Figure 223:
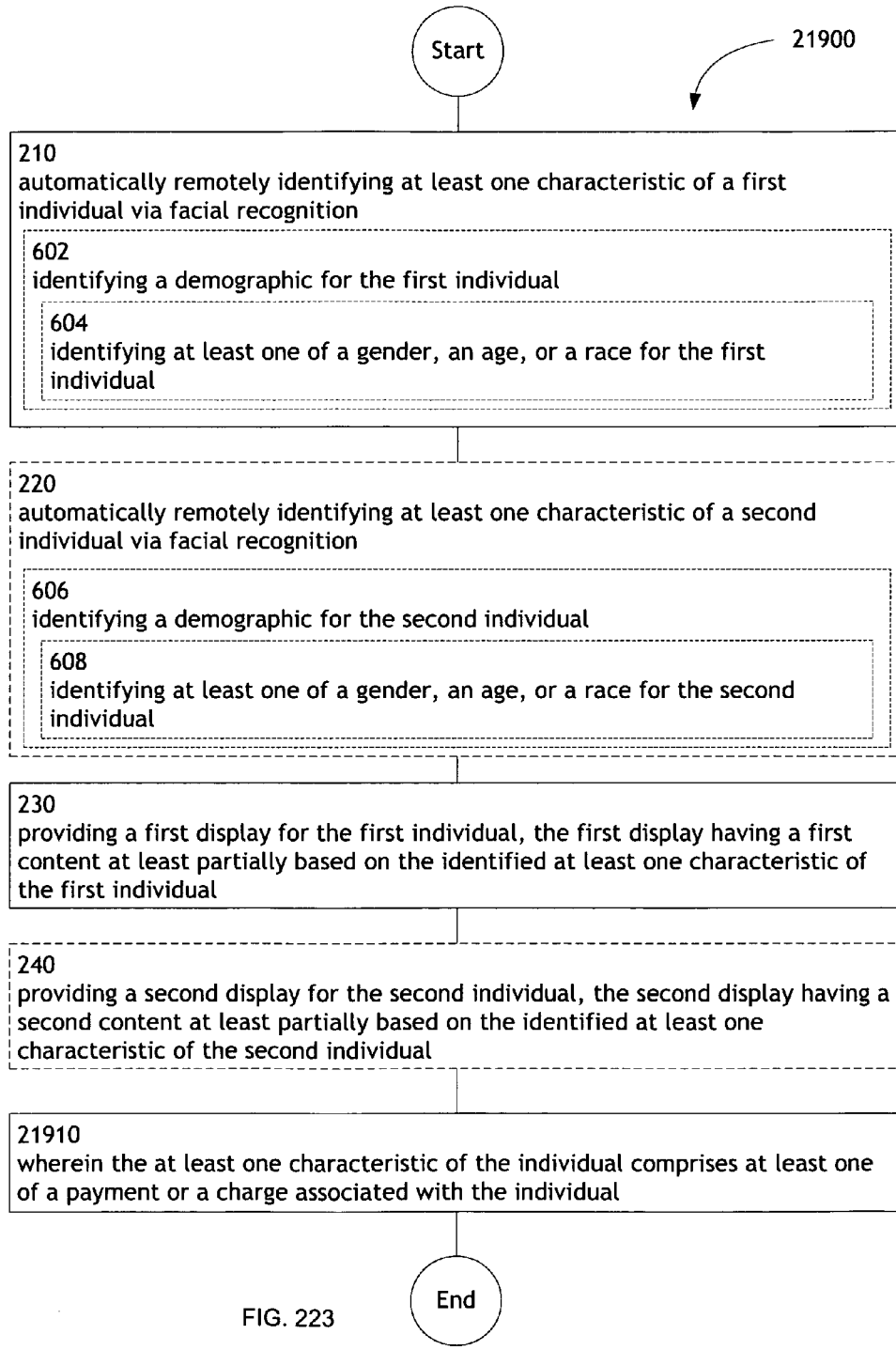

FIG. 223 illustrates an alternative embodiment of the operational flow of FIG. 219.

Figure 224:
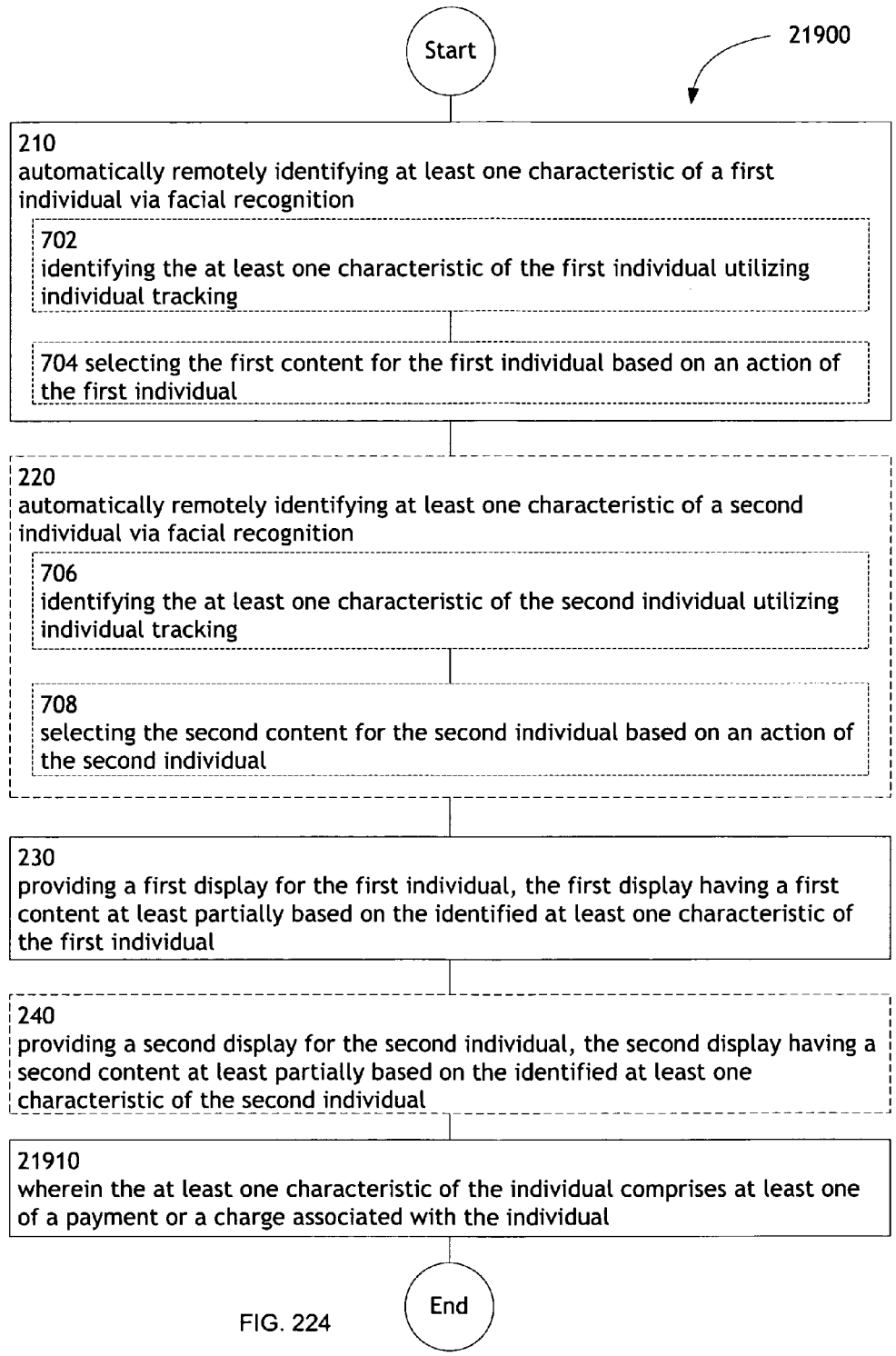

FIG. 224 illustrates an alternative embodiment of the operational flow of FIG. 219.

Figure 225A:
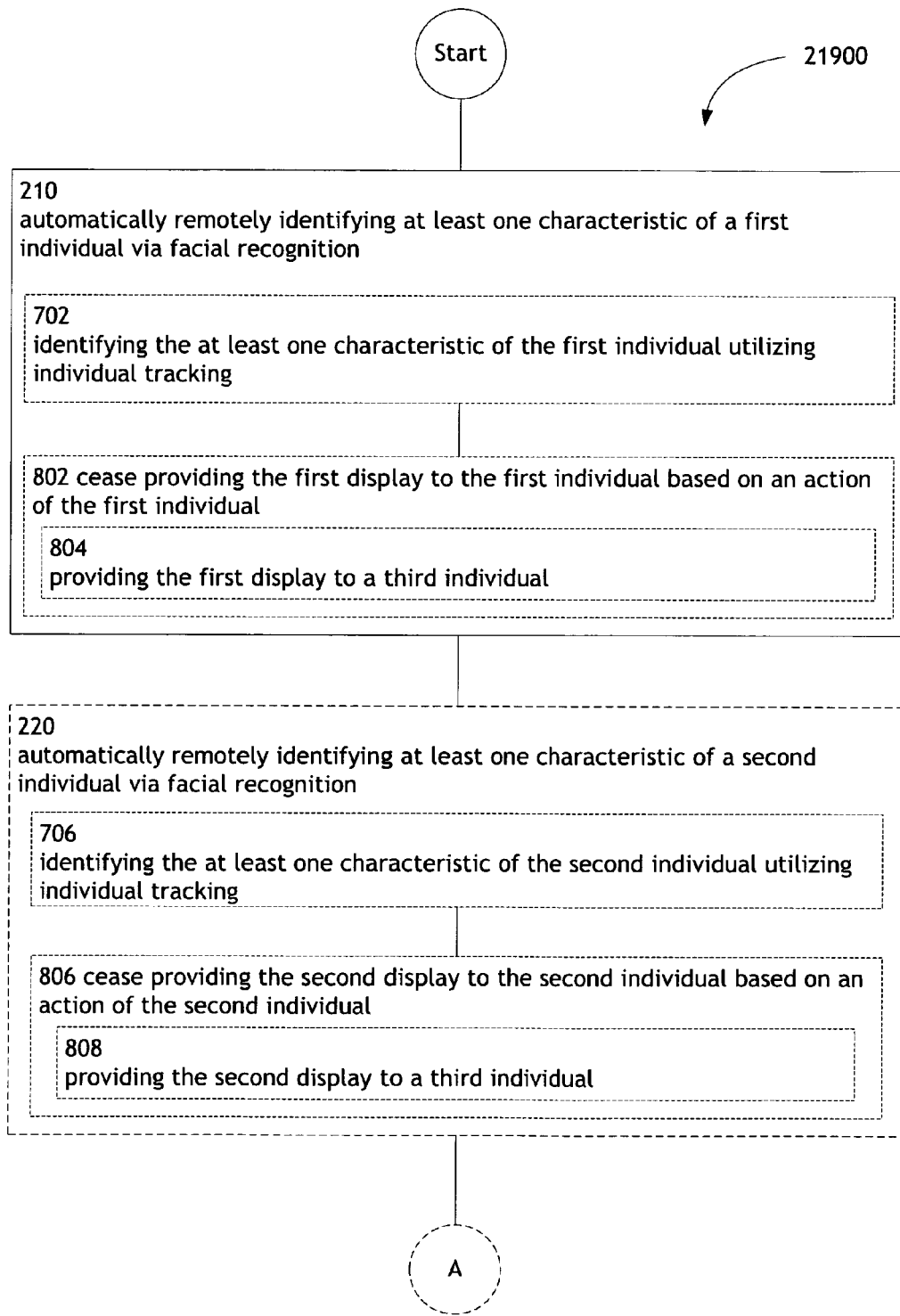
Figure 225B:
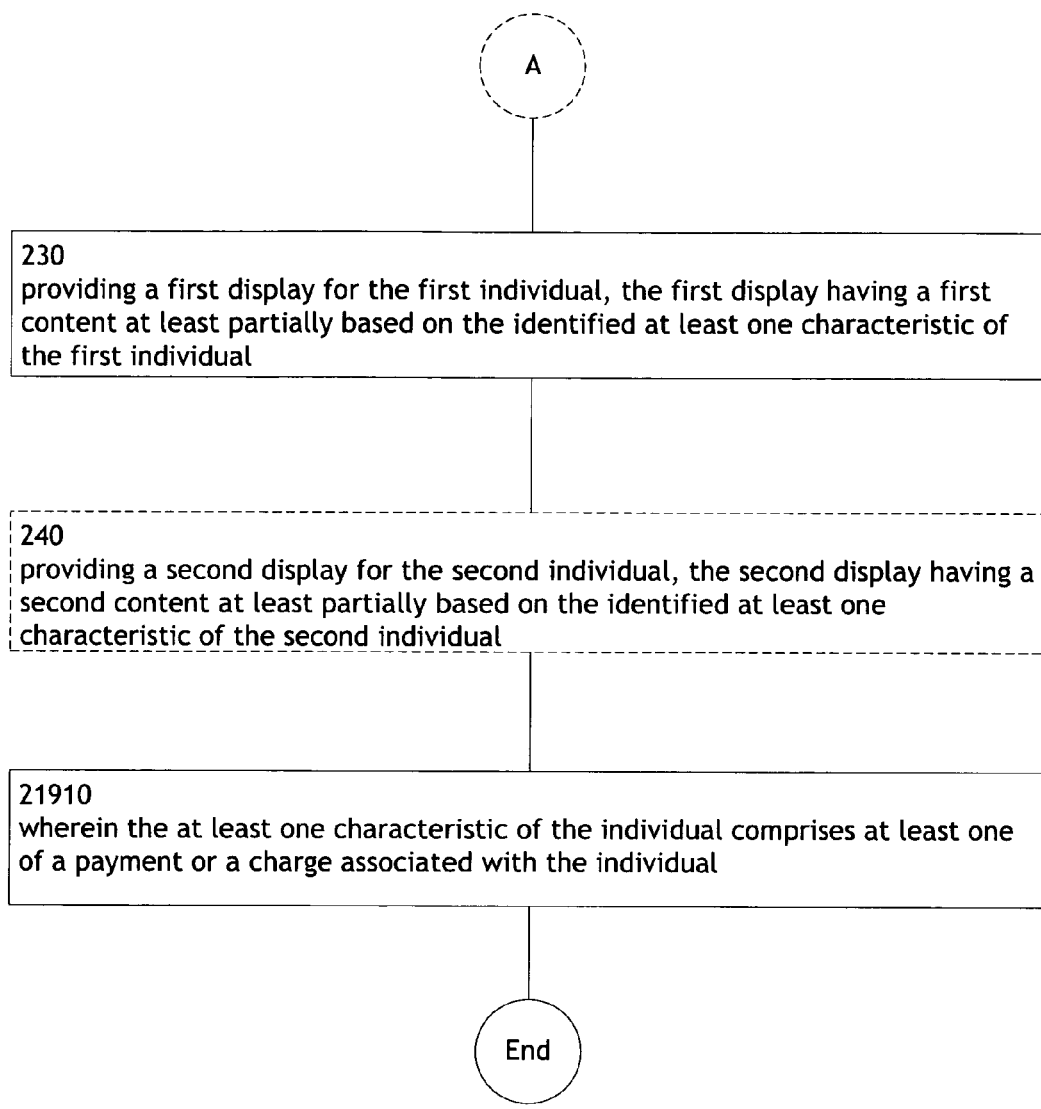

FIG. 225 illustrates an alternative embodiment of the operational flow of FIG. 219.

Figure 226:
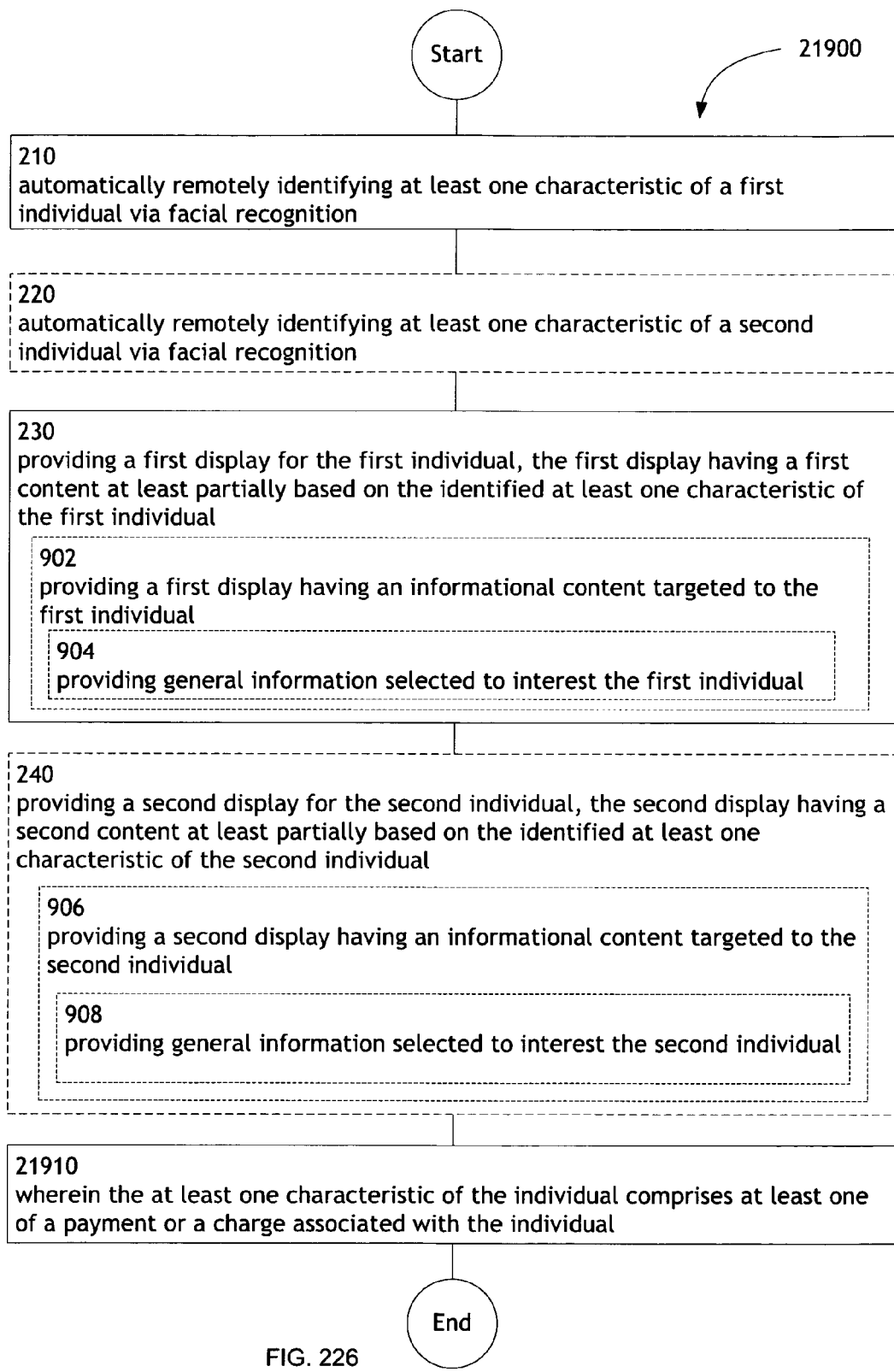

FIG. 226 illustrates an alternative embodiment of the operational flow of FIG. 219.

Figure 227A:
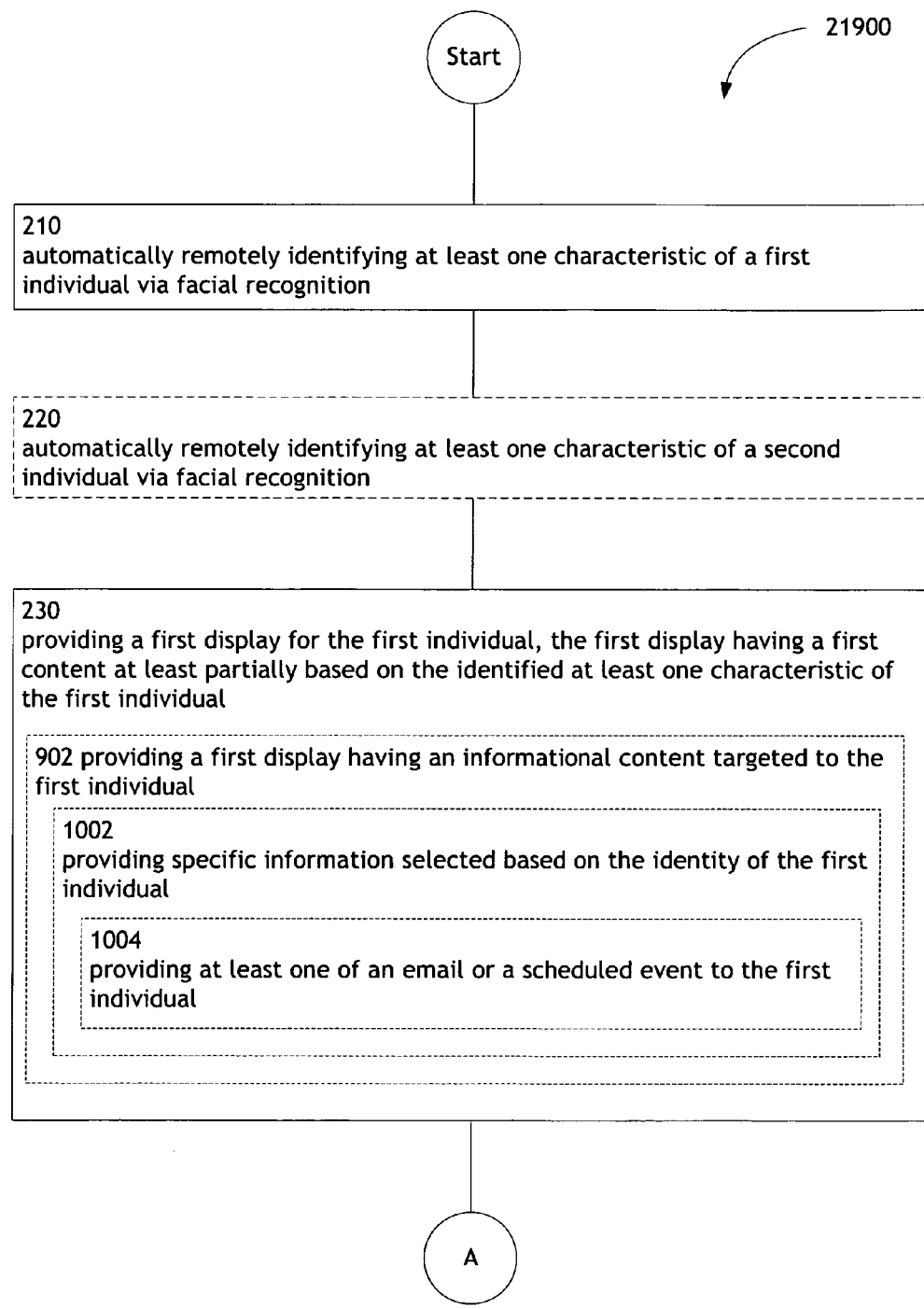

FIG. 227 illustrates an alternative embodiment of the operational flow of FIG. 219.

Figure 228:
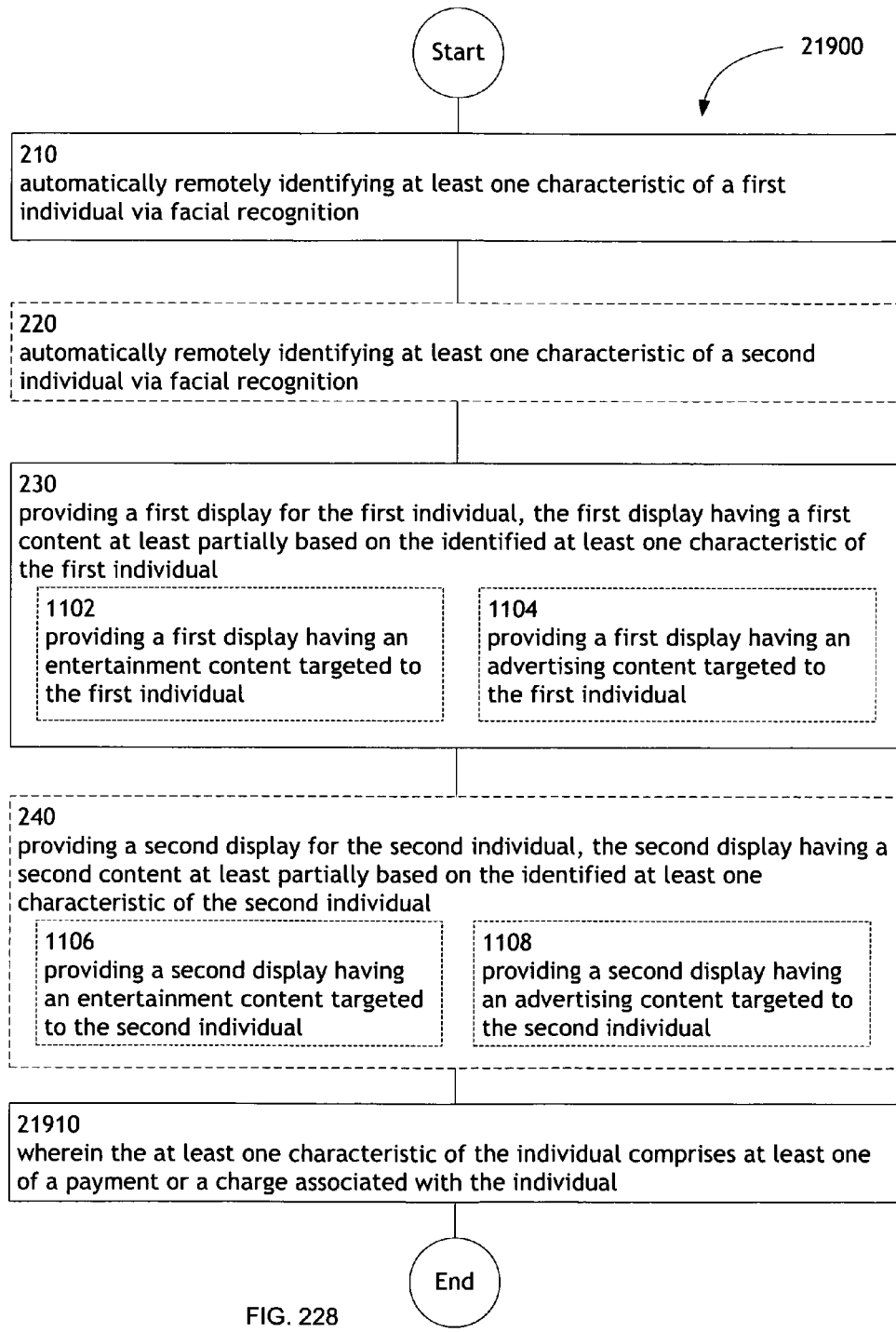

FIG. 228 illustrates an alternative embodiment of the operational flow of FIG. 219.

Figure 229:
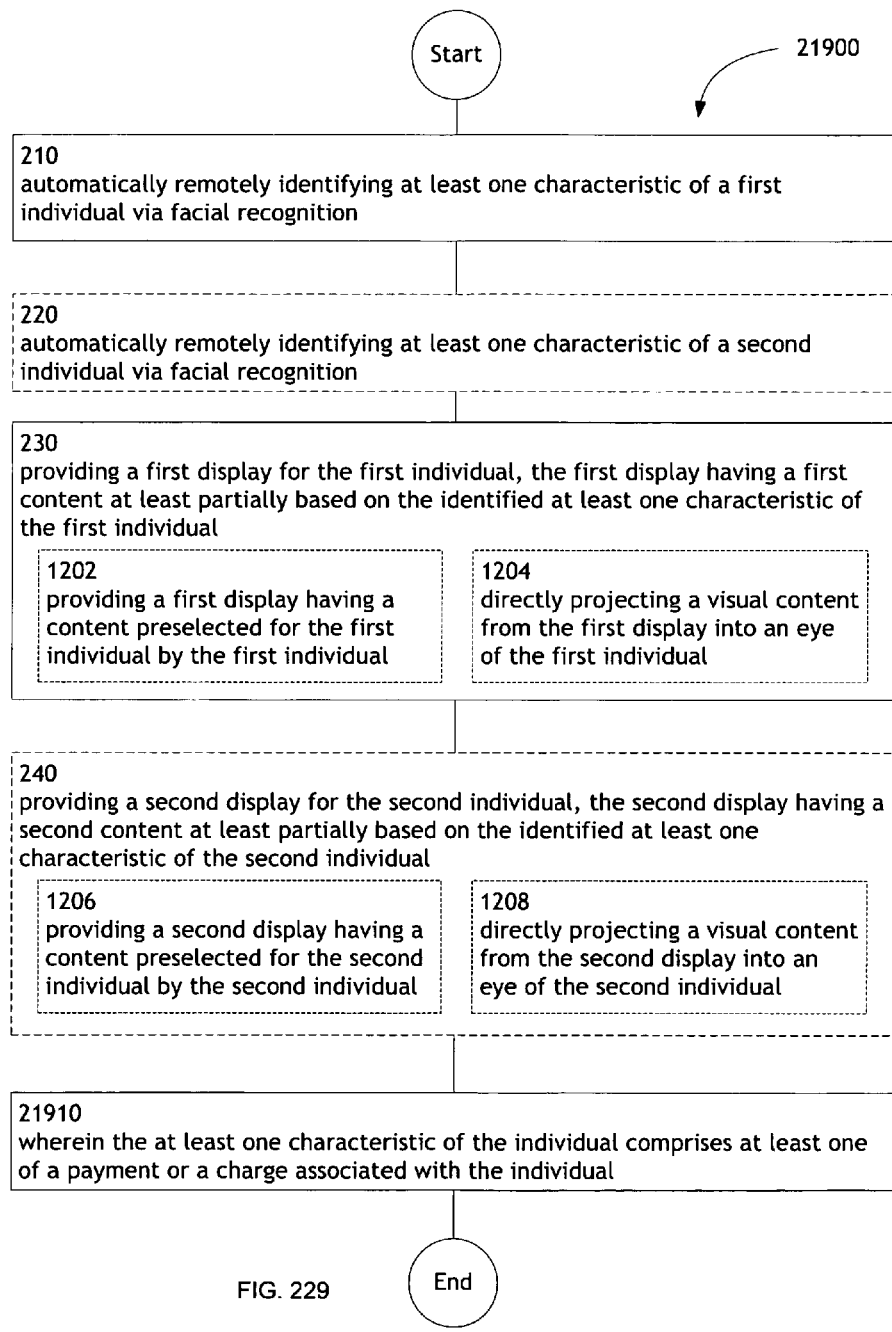

FIG. 229 illustrates an alternative embodiment of the operational flow of FIG. 219.

Figure 230:
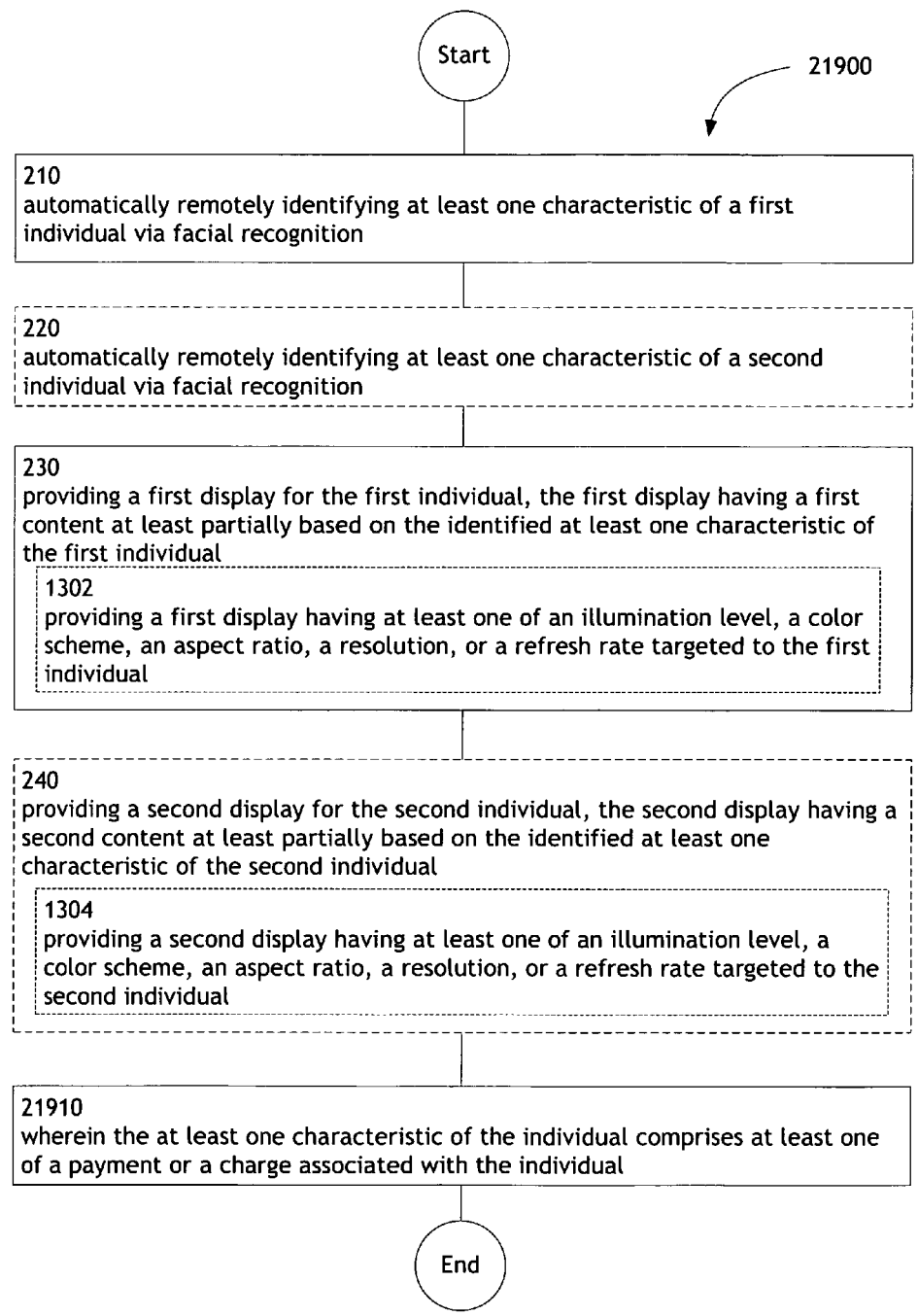

FIG. 230 illustrates an alternative embodiment of the operational flow of FIG. 219.

Figure 231:
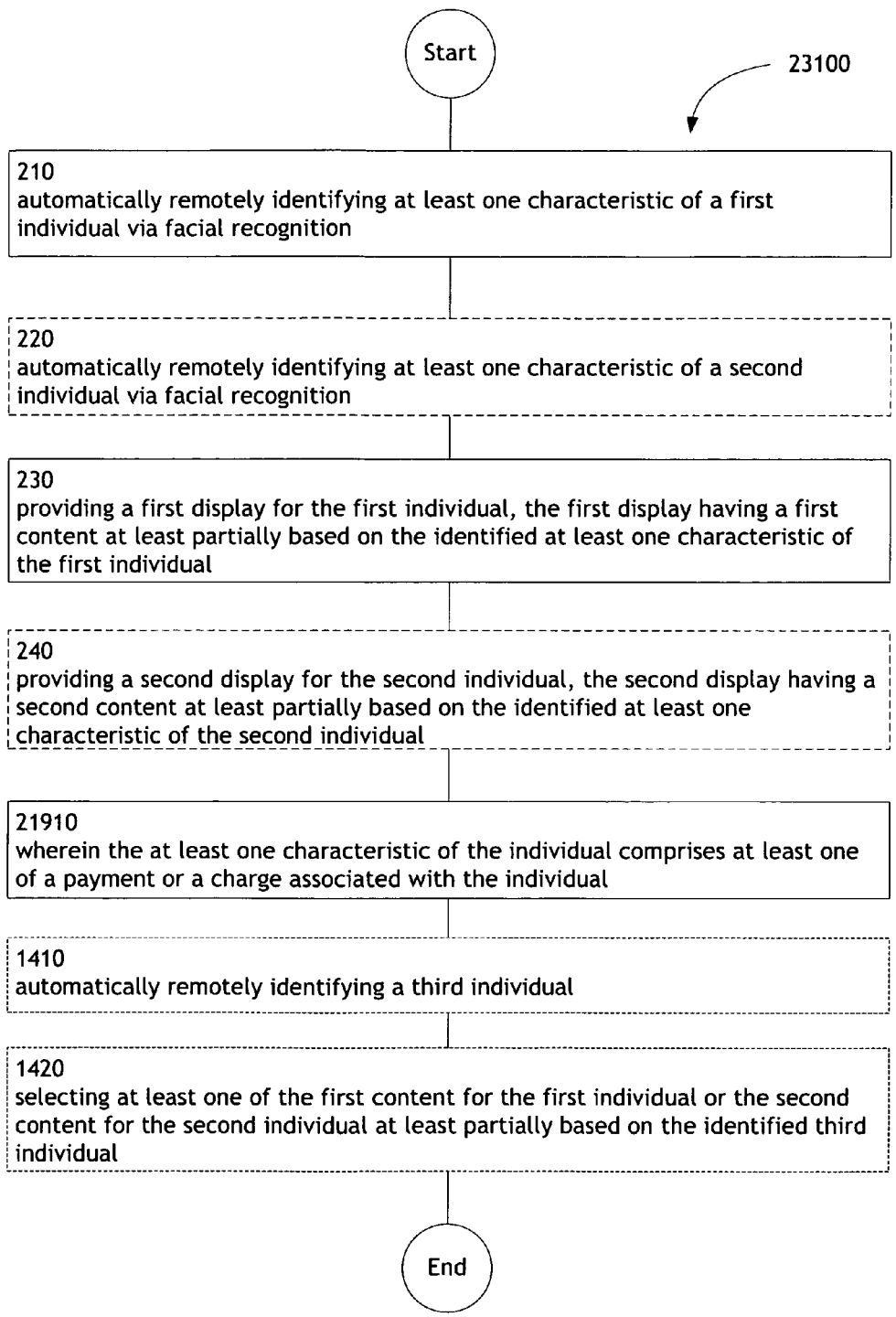

FIG. 231 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, automatically remotely identifying a third individual, and selecting the content for the first individual at least partially based on the identified third individual.

Figure 232A:
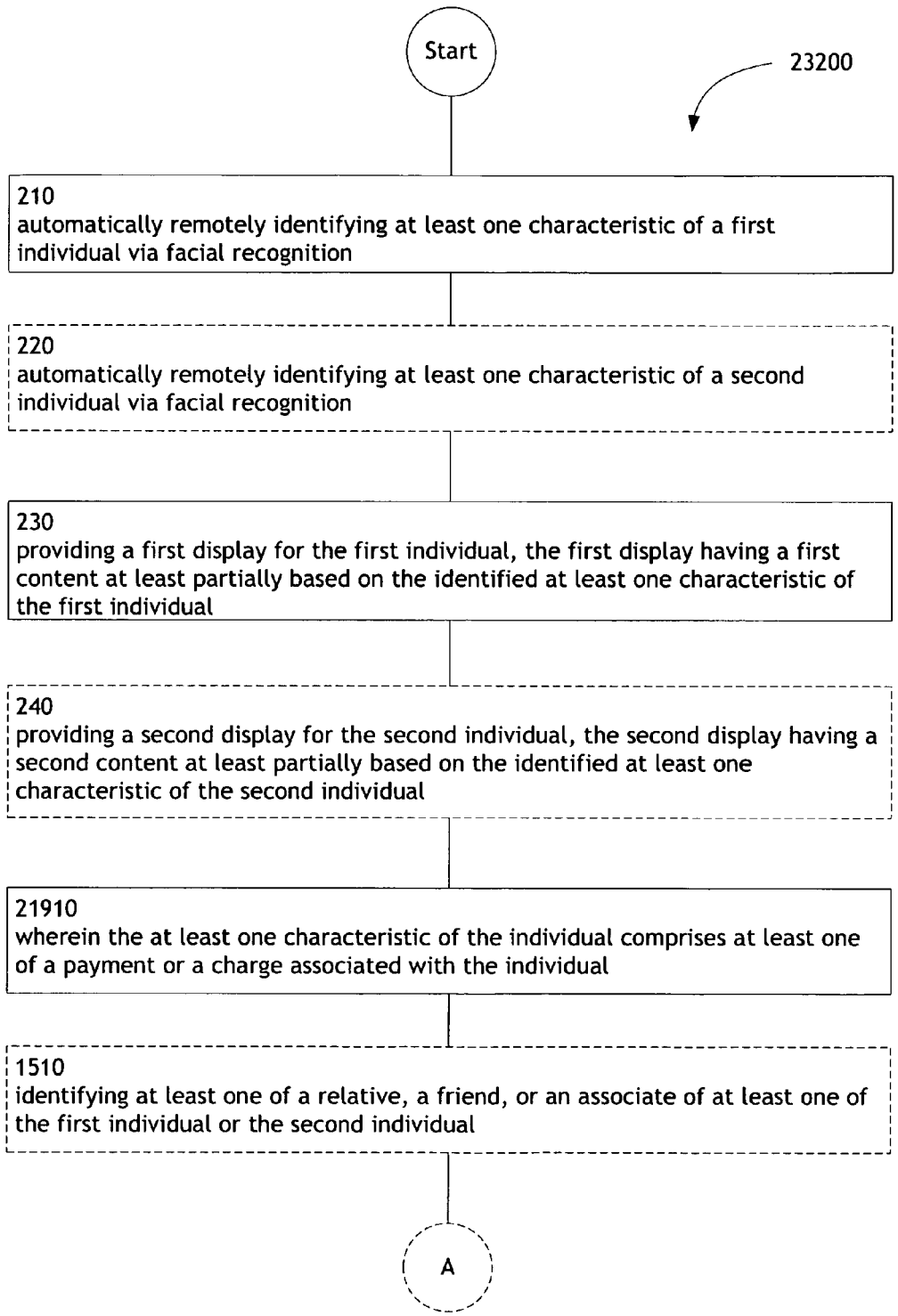

FIG. 232 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, identifying at least one of a relative, a friend, or an associate of the individual, and selecting the content for the individual at least partially based on the identity of the at least one of the relative, the friend, or the associate of the individual.

Figure 233:
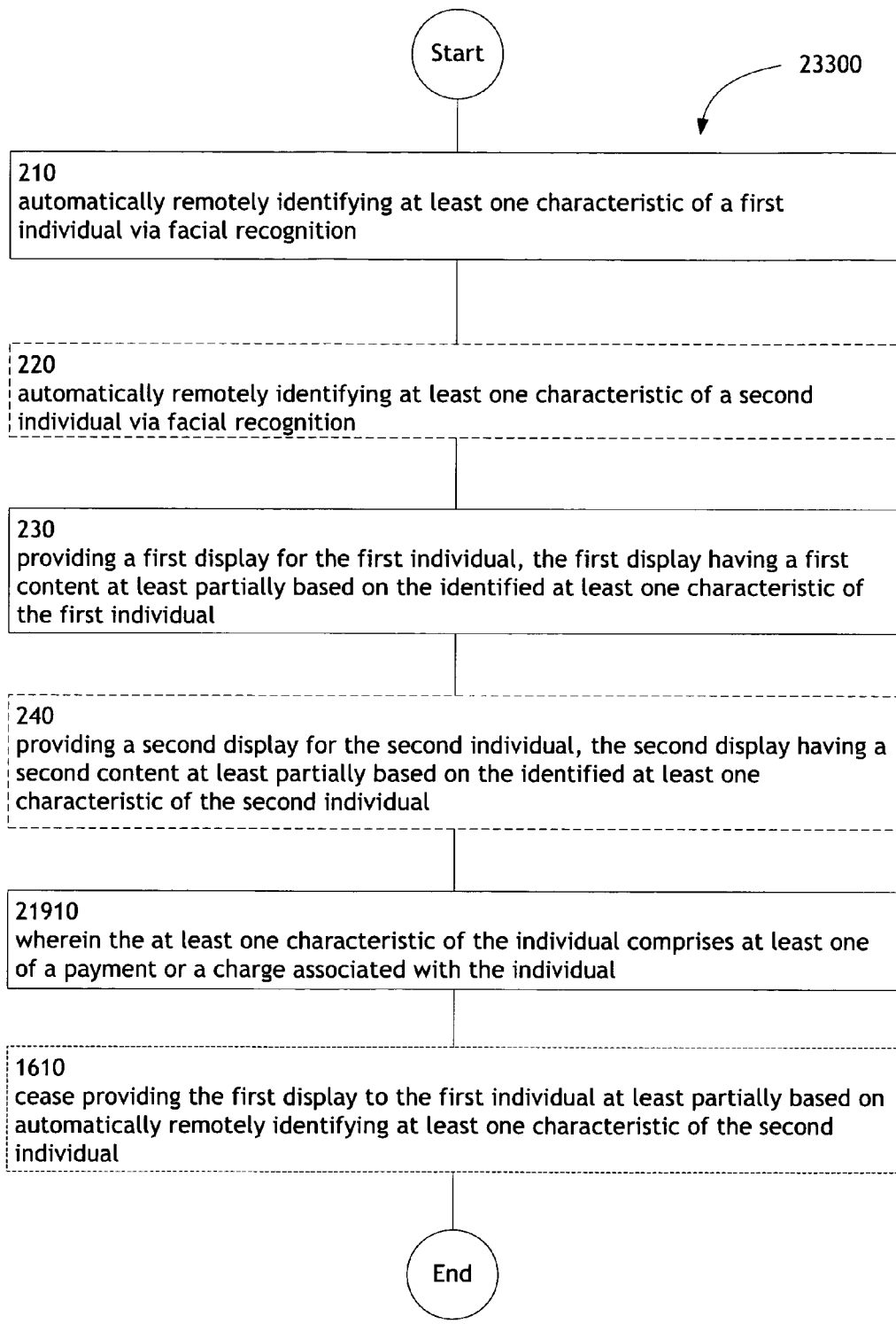

FIG. 233 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, and cease providing the display to the first individual at least partially based on automatically remotely identifying at least one characteristic of a second individual.

Figure 234A:
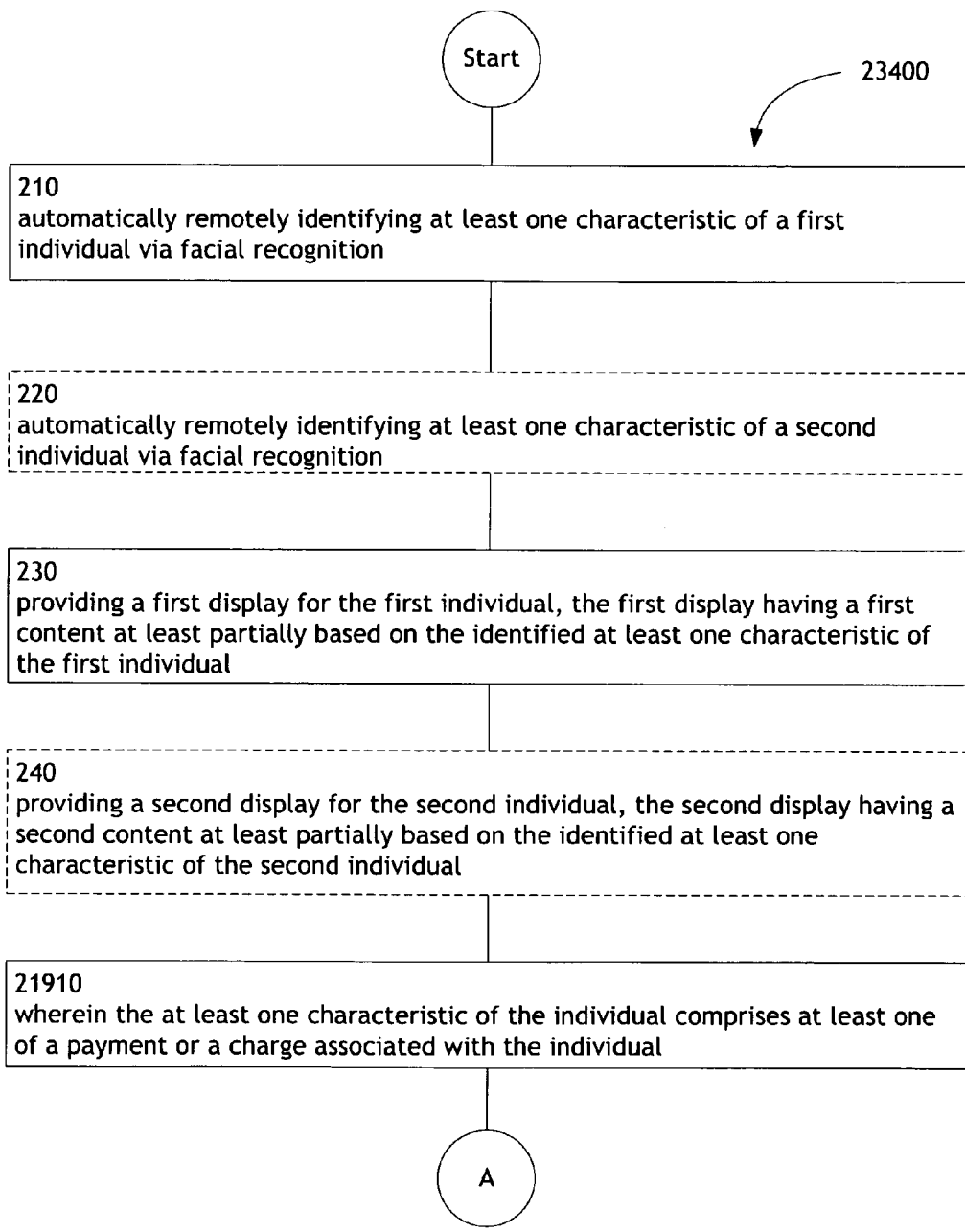
Figure 234B:
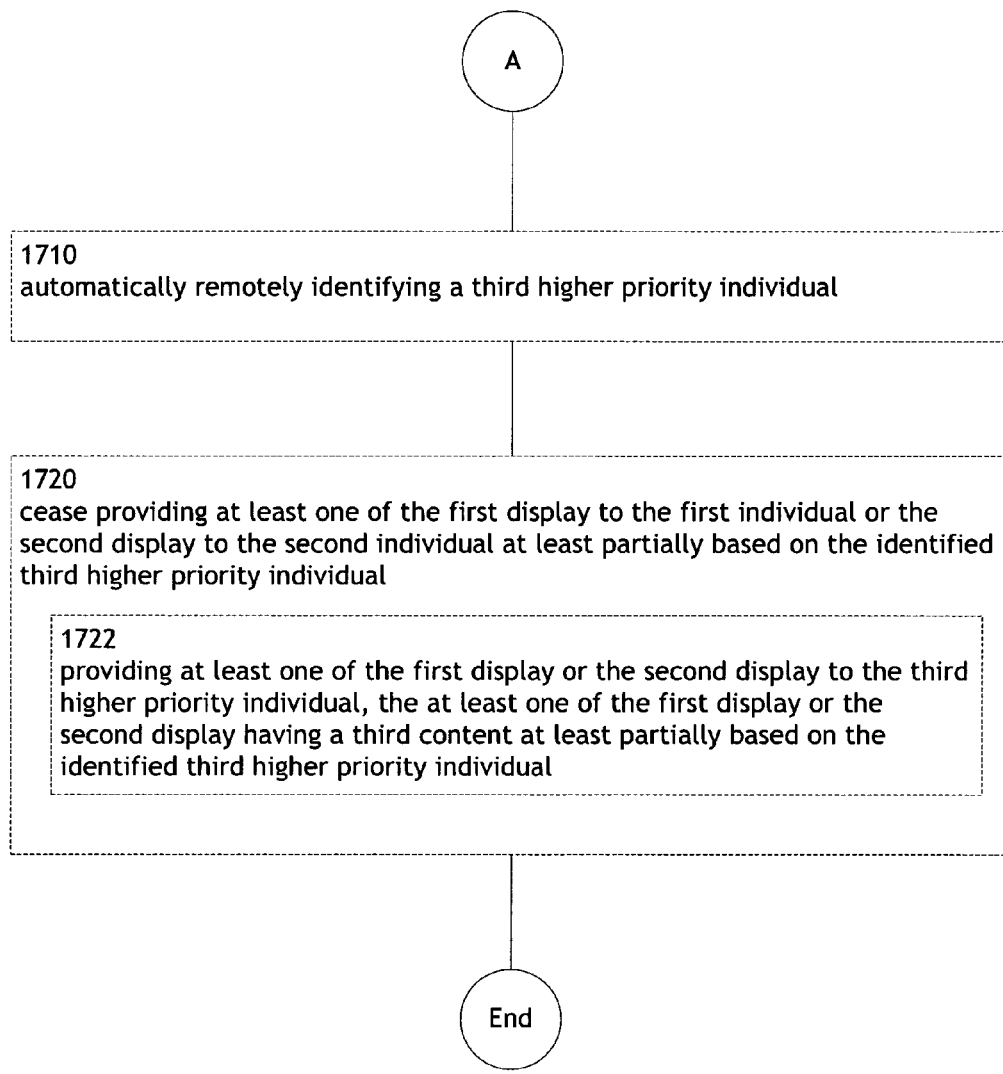

FIG. 234 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, automatically remotely identifying a third higher priority individual, and cease providing the display to the first individual at least partially based on the identified third higher priority individual.

Figure 235:
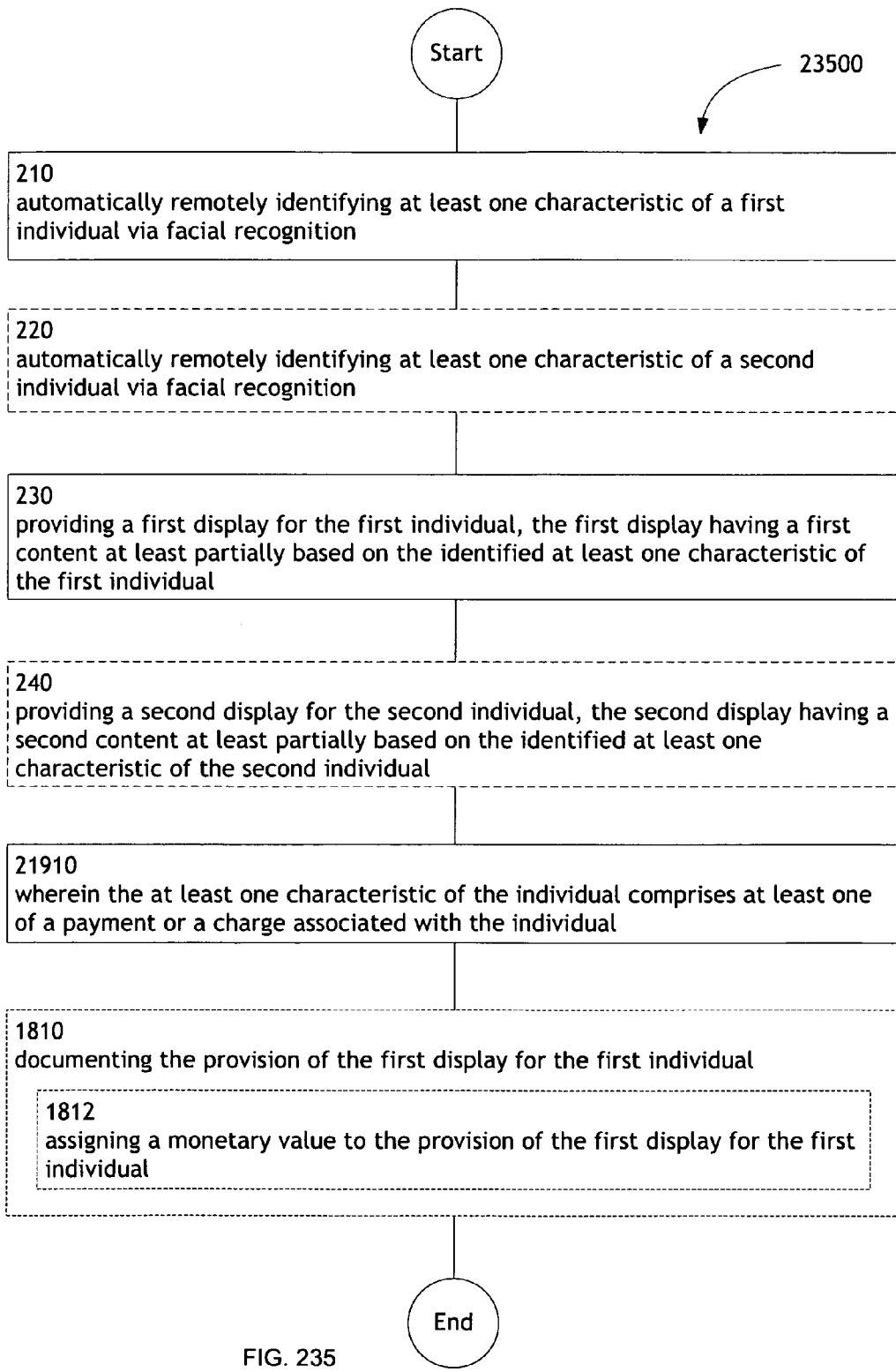

FIG. 235 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, and documenting the provision of the display for the individual.

Figure 236:
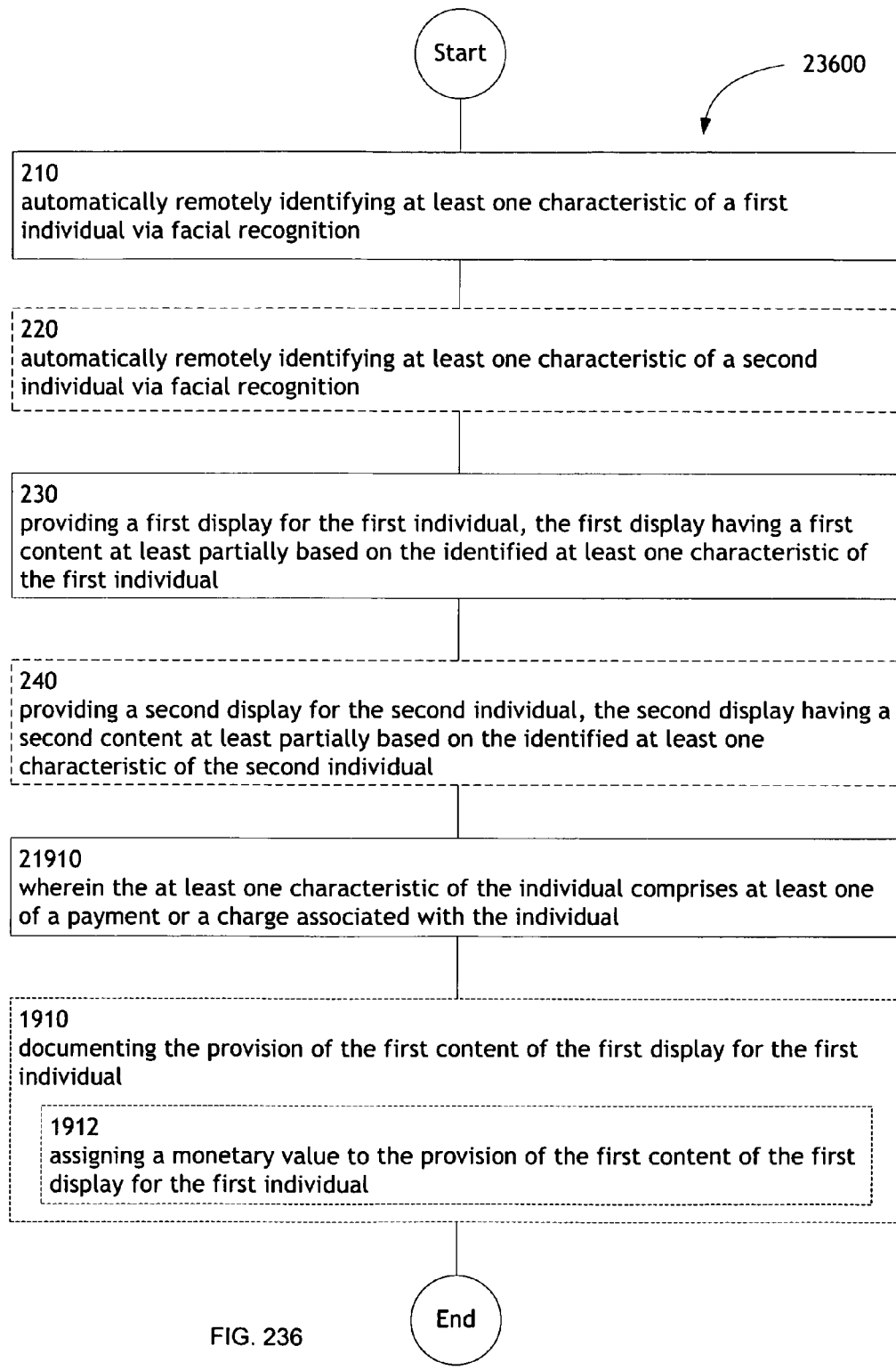

FIG. 236 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, and documenting the provision of the content of the display for the individual.

Figure 237:
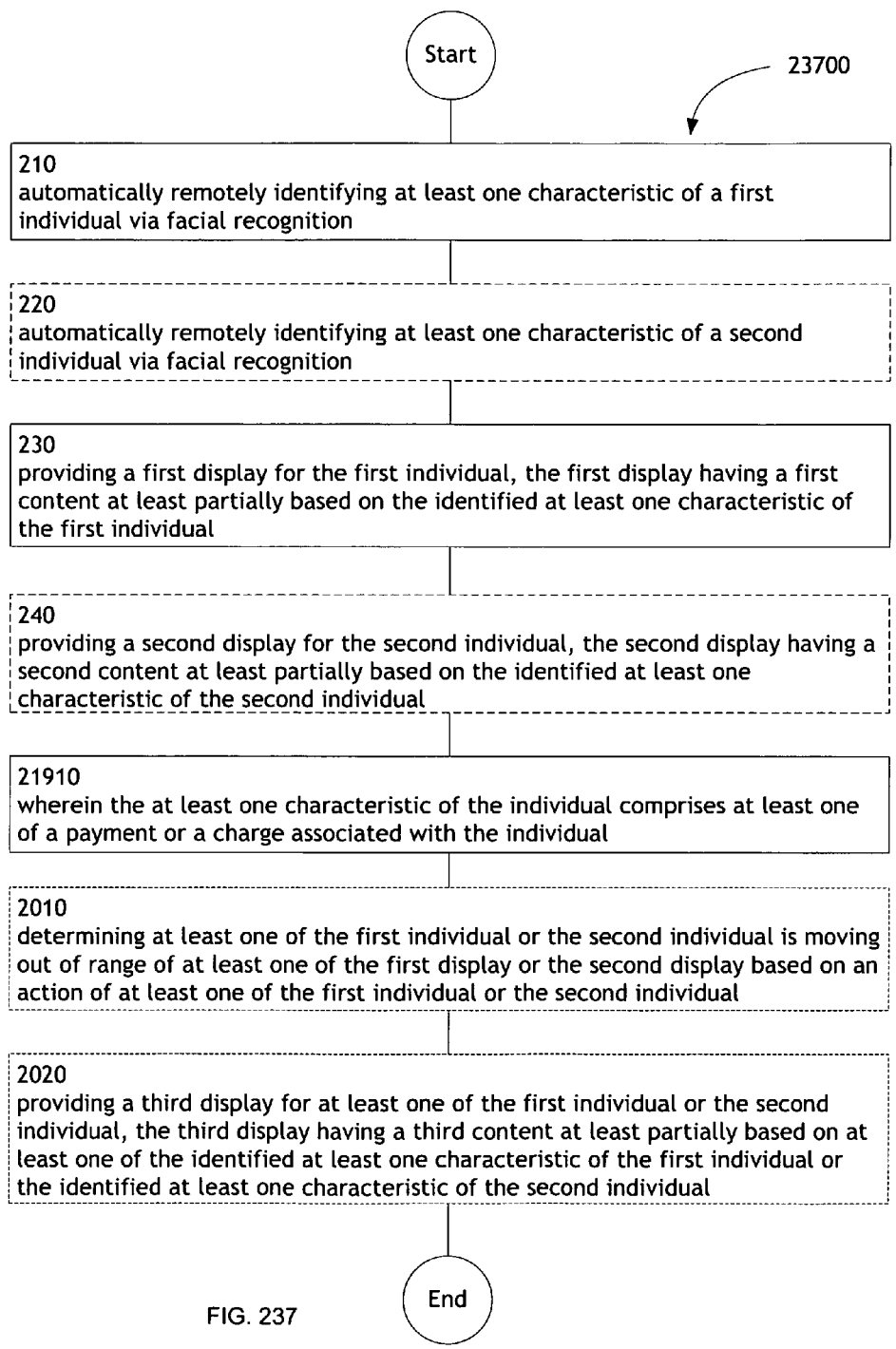

FIG. 237 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, determining the individual is moving out of range of the display based on an action of the individual, and providing a third display for the individual, the third display having a third content at least partially based on the identified at least one characteristic of the individual.

Figure 238:
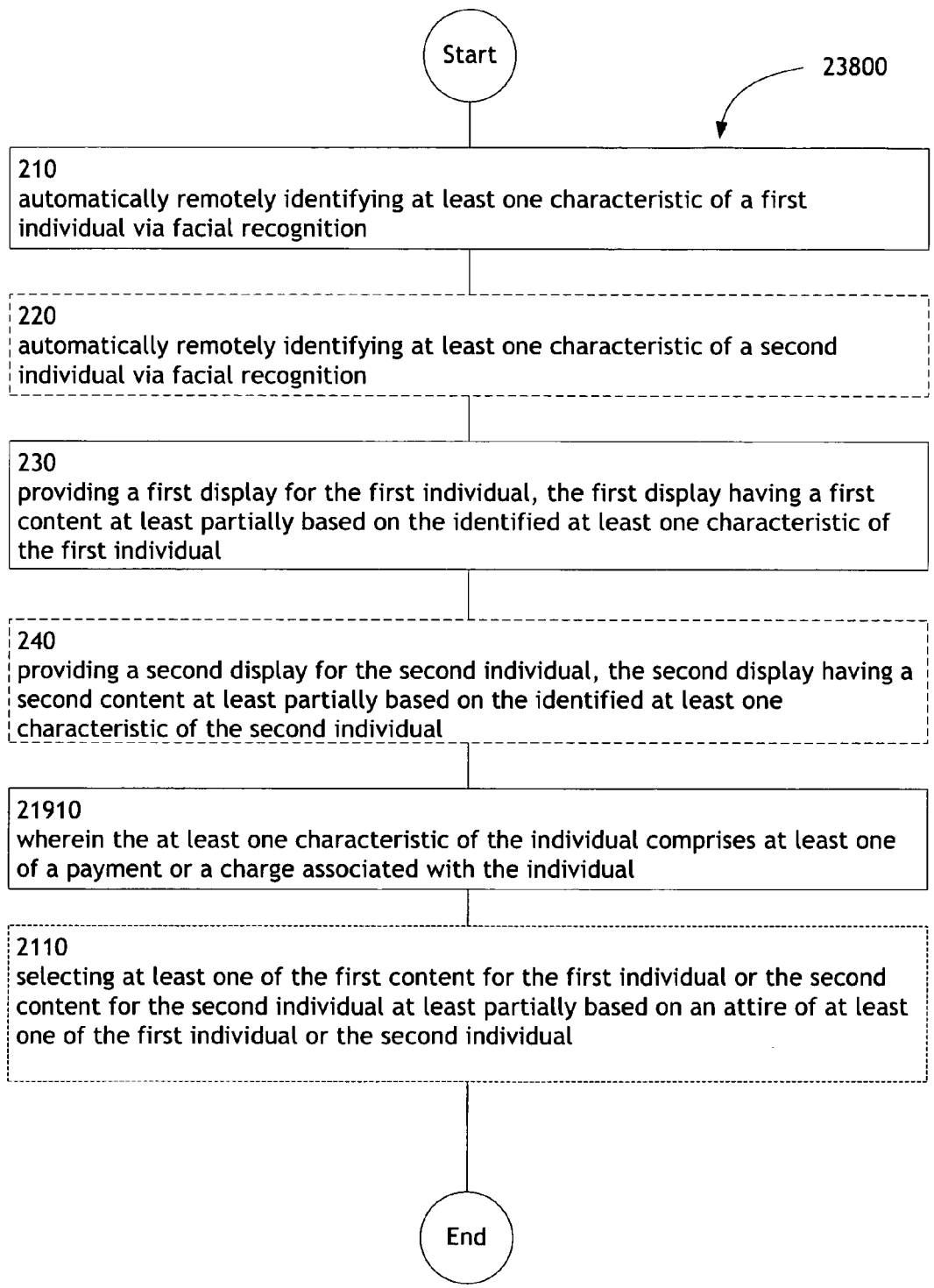

FIG. 238 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, selecting the content for the individual at least partially based on an attire of the individual.

Figure 239:
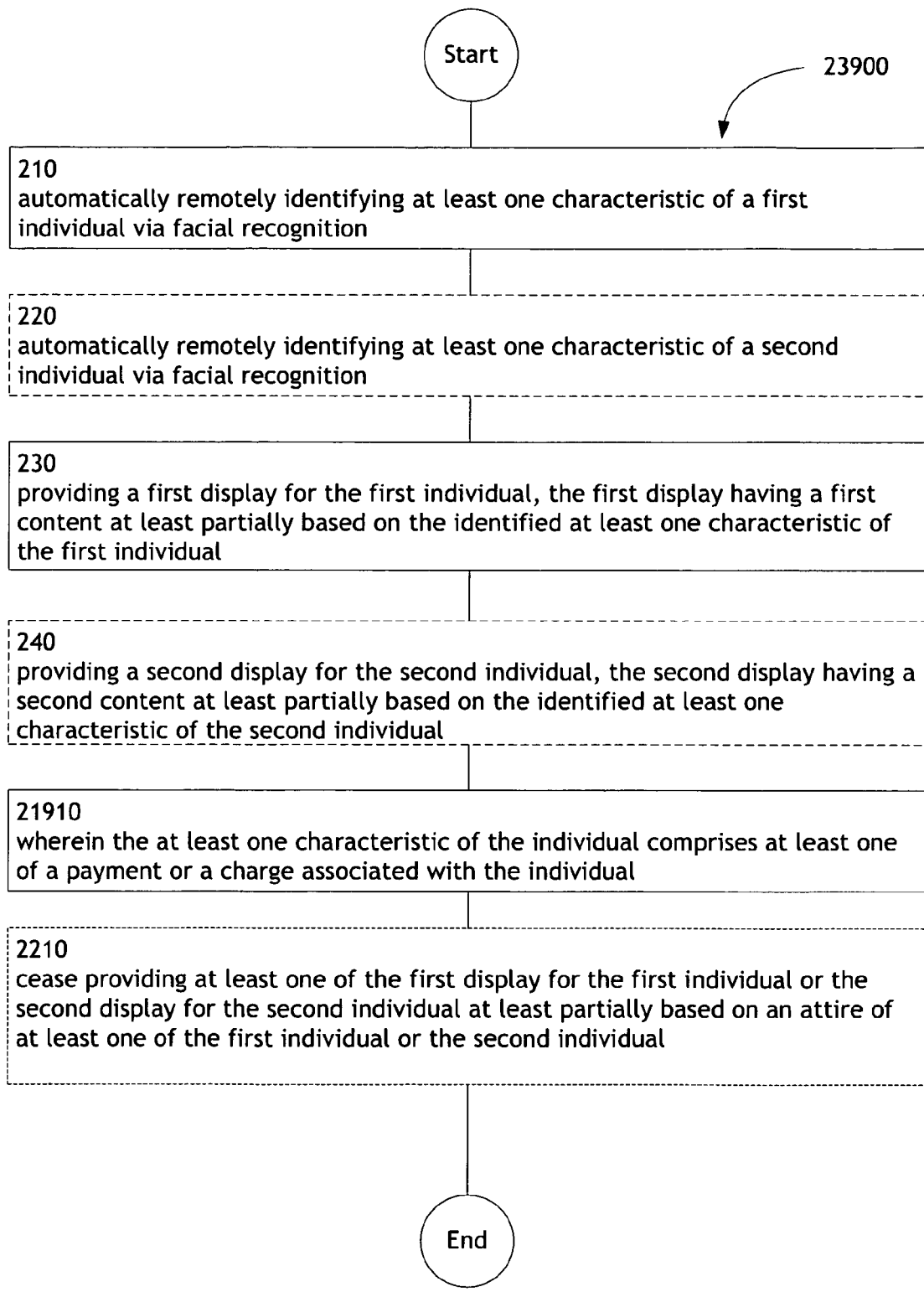

FIG. 239 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, and cease providing the display for the individual at least partially based on an attire of the individual.

Figure 240:
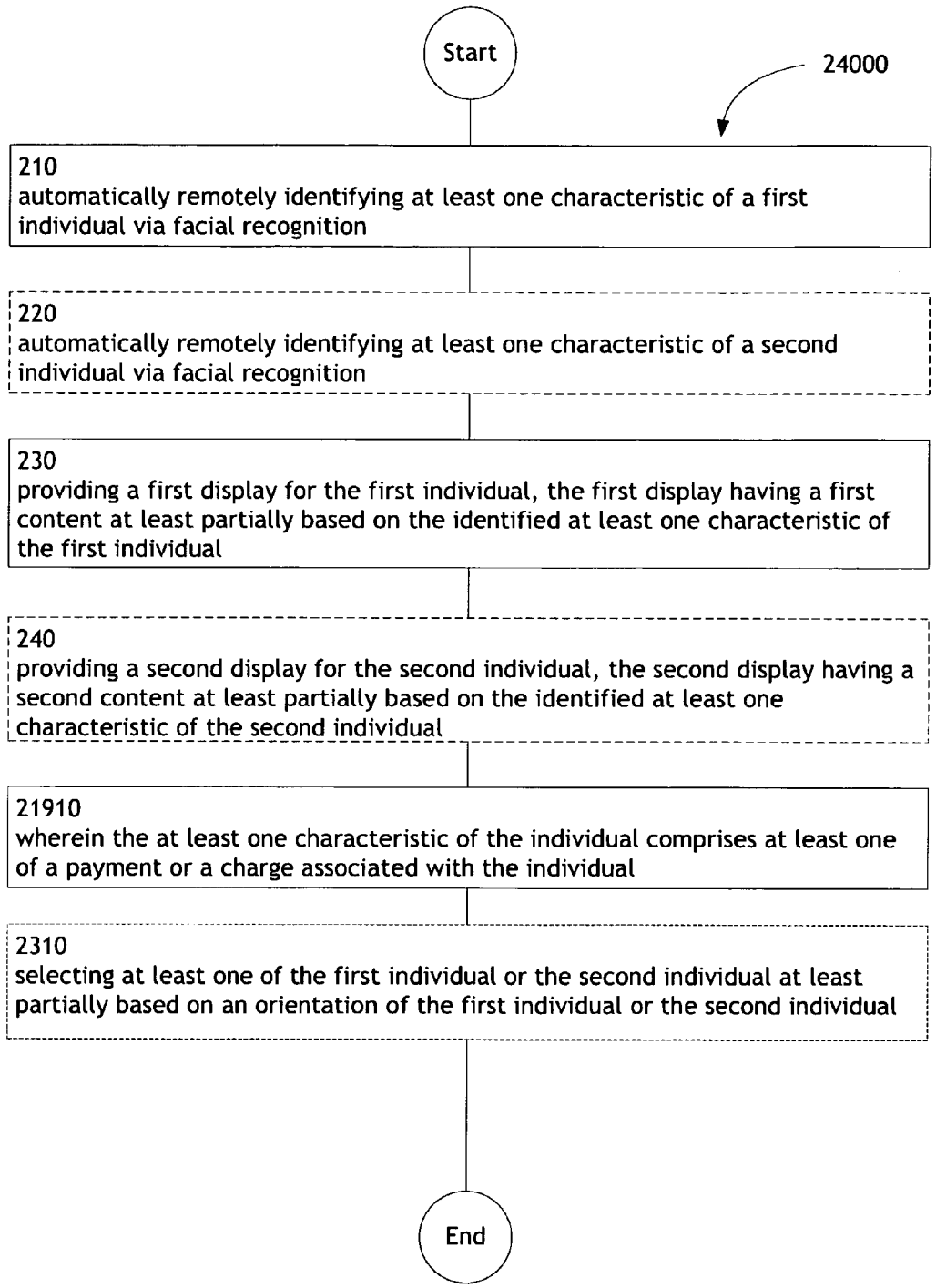

FIG. 240 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, and selecting the individual at least partially based on an orientation of the individual.

Figure 241A:
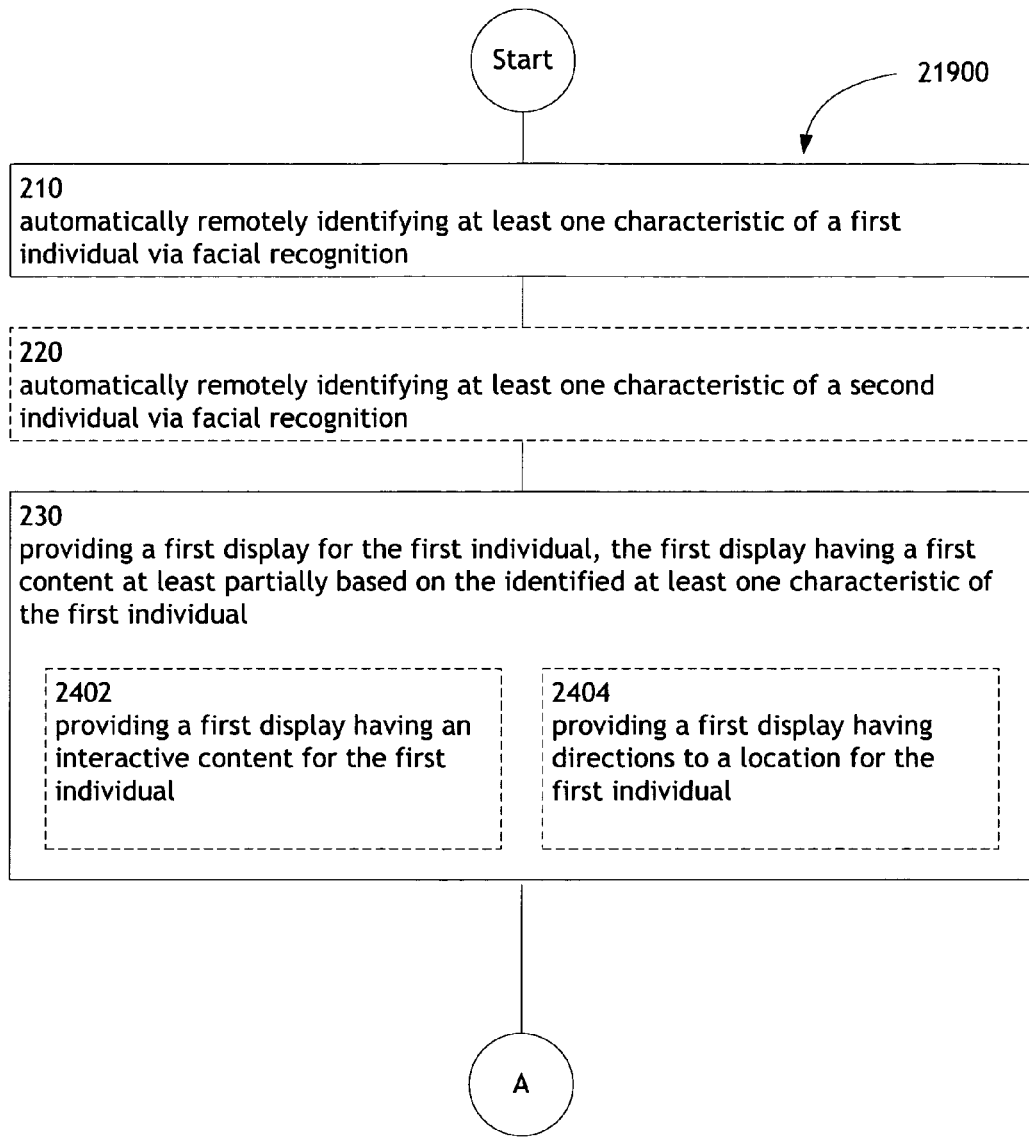
Figure 241B:
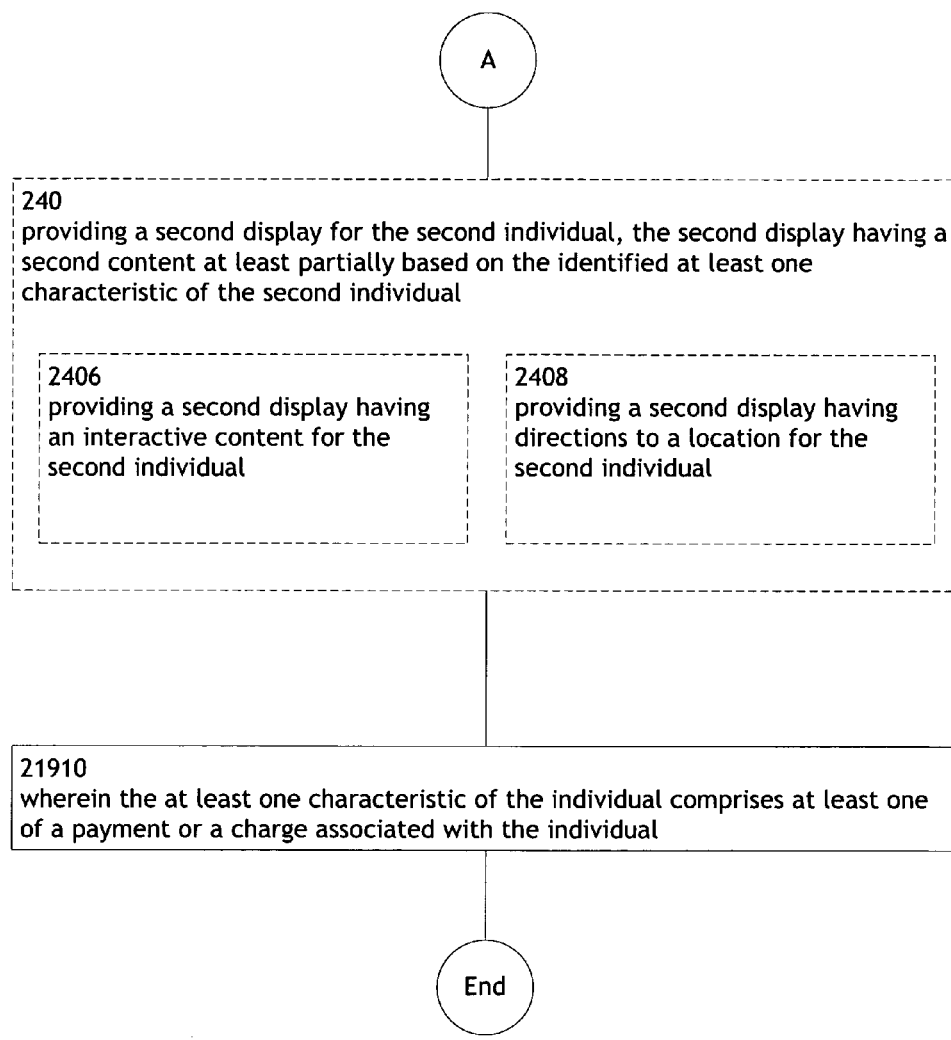

FIG. 241 illustrates an alternative embodiment of the operational flow of FIG. 219.

Figure 242A:
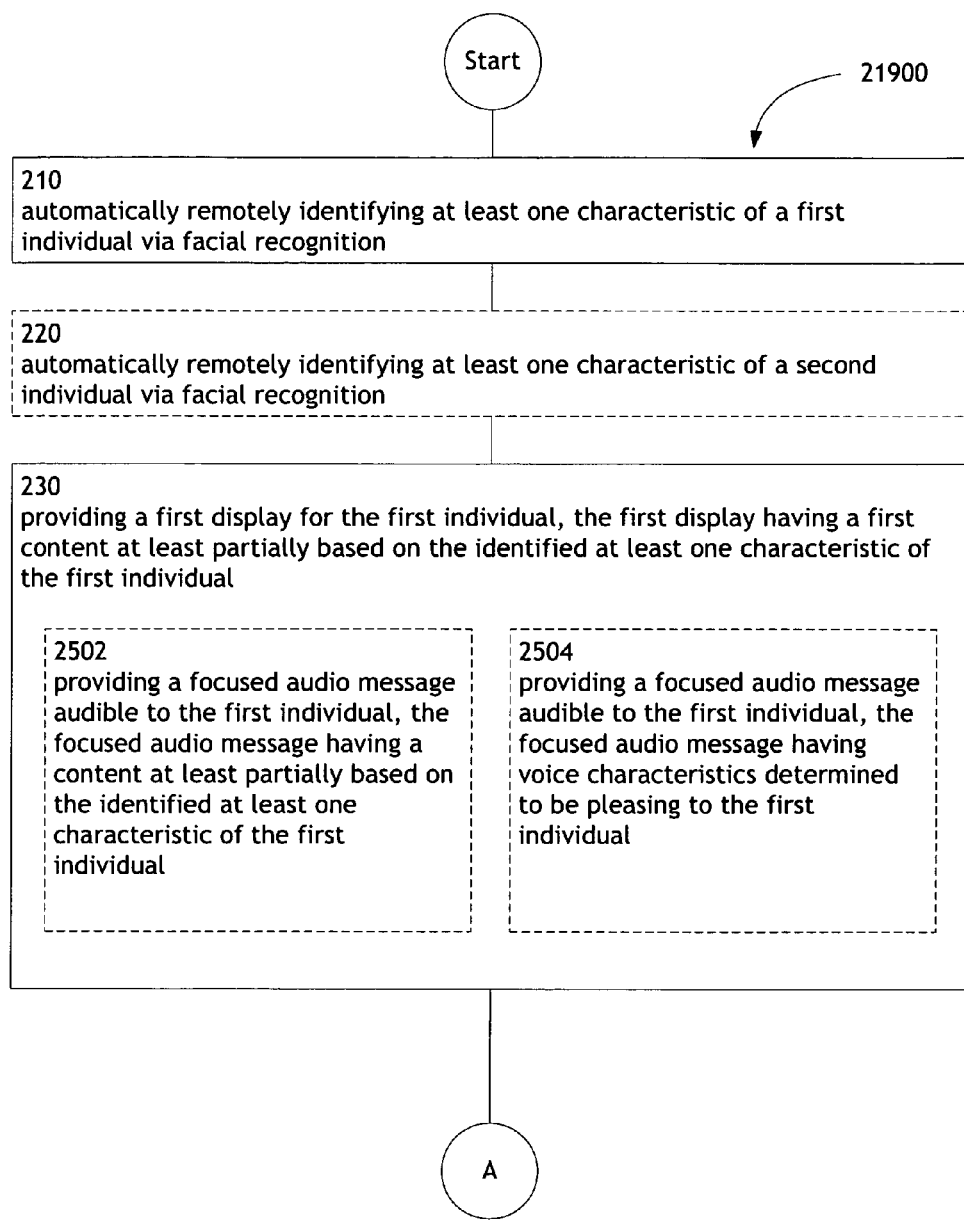
Figure 242B:
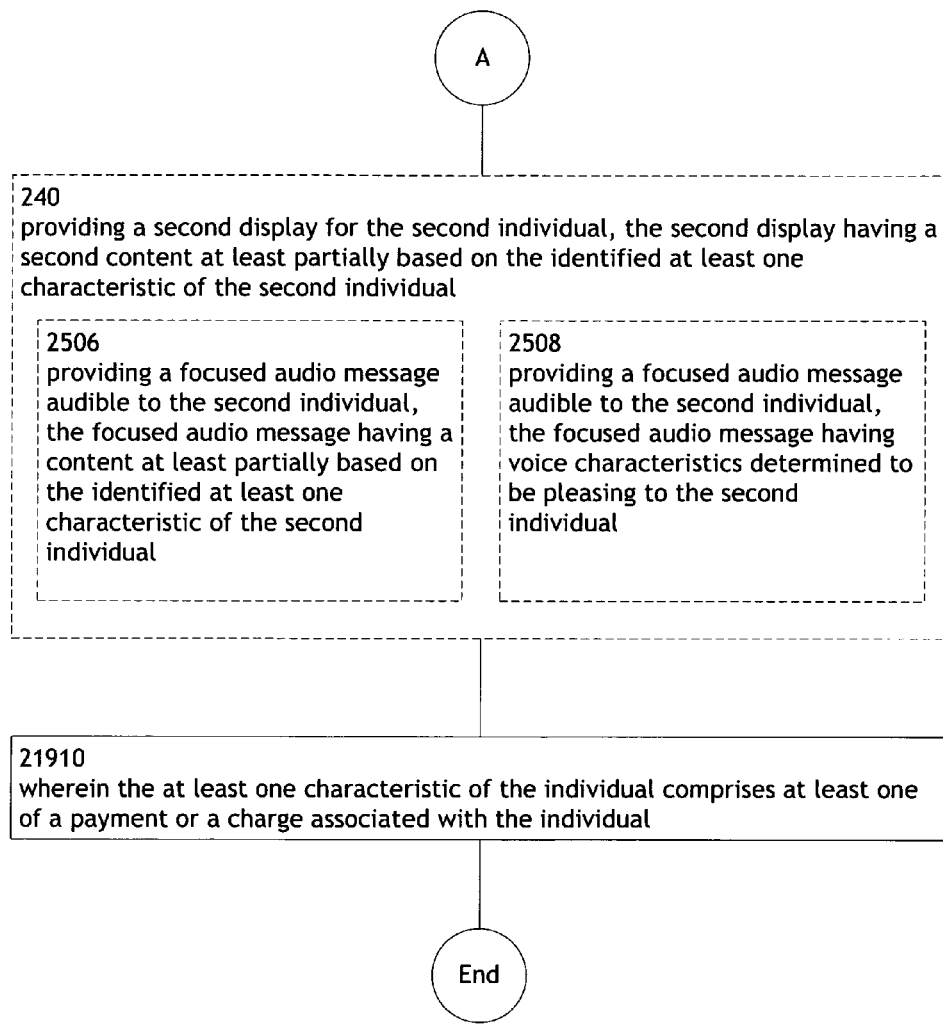

FIG. 242 illustrates an alternative embodiment of the operational flow of FIG. 219.

Figure 243A:
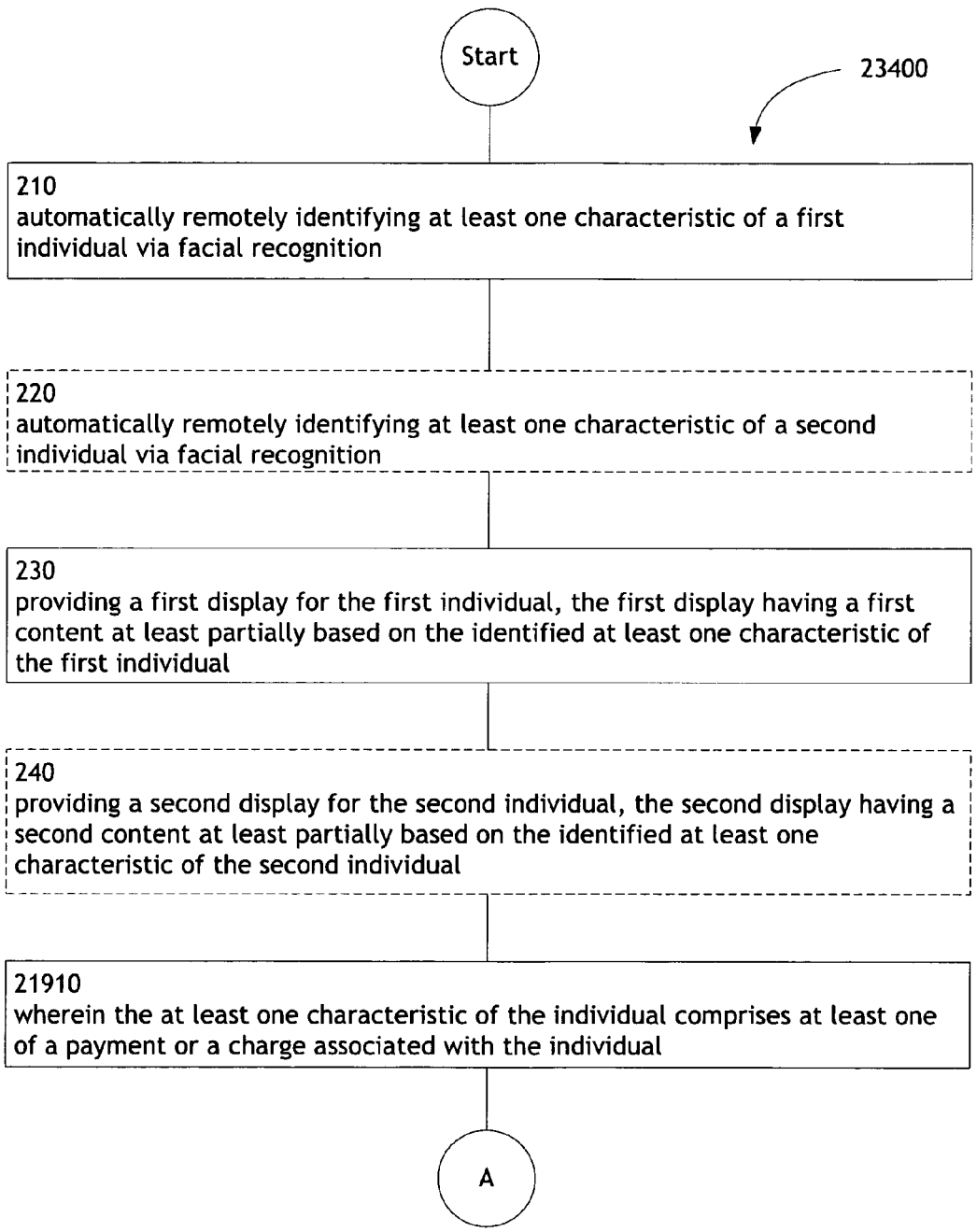
Figure 243B:
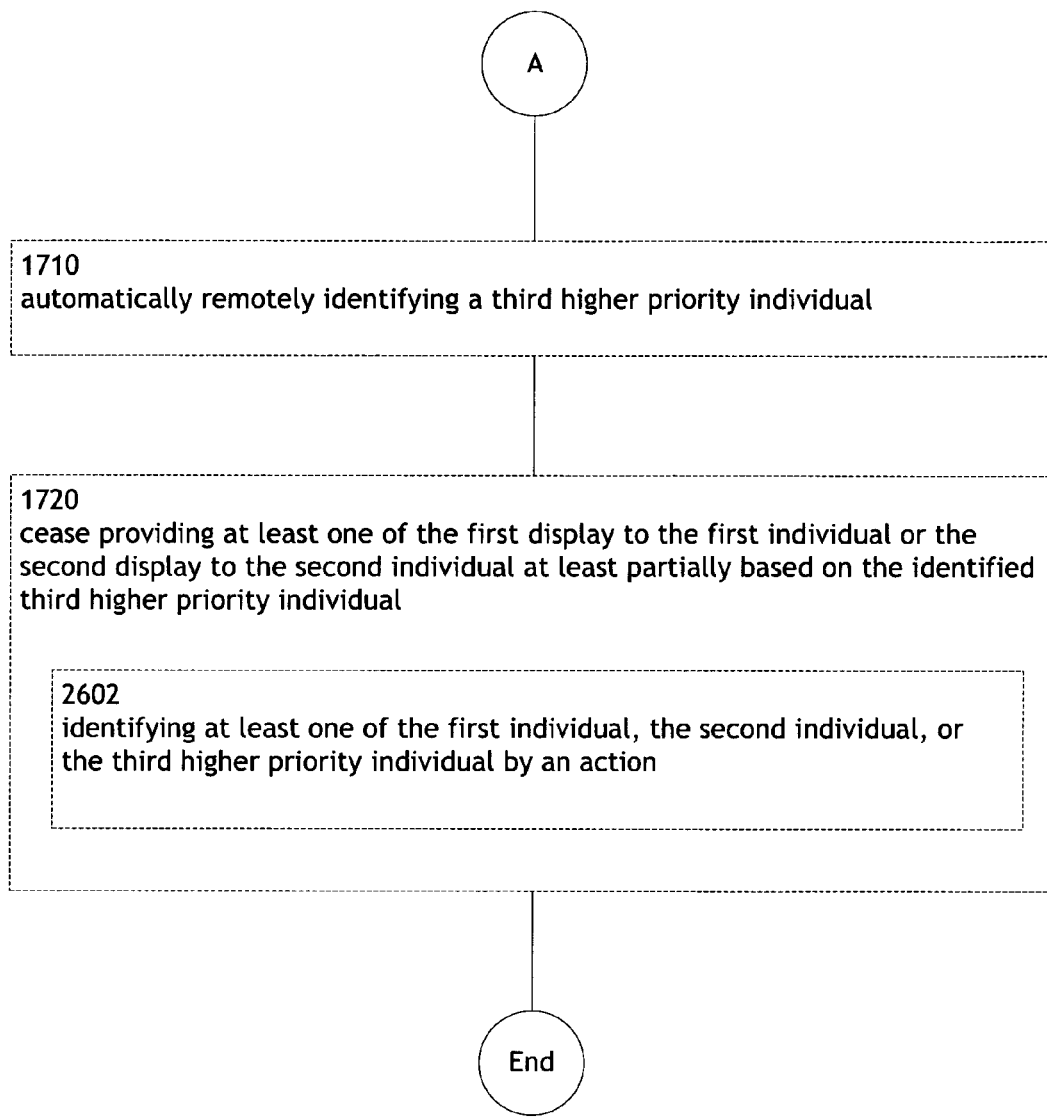

FIG. 243 illustrates an alternative embodiment of the operational flow of FIG. 234.

Figure 244A:
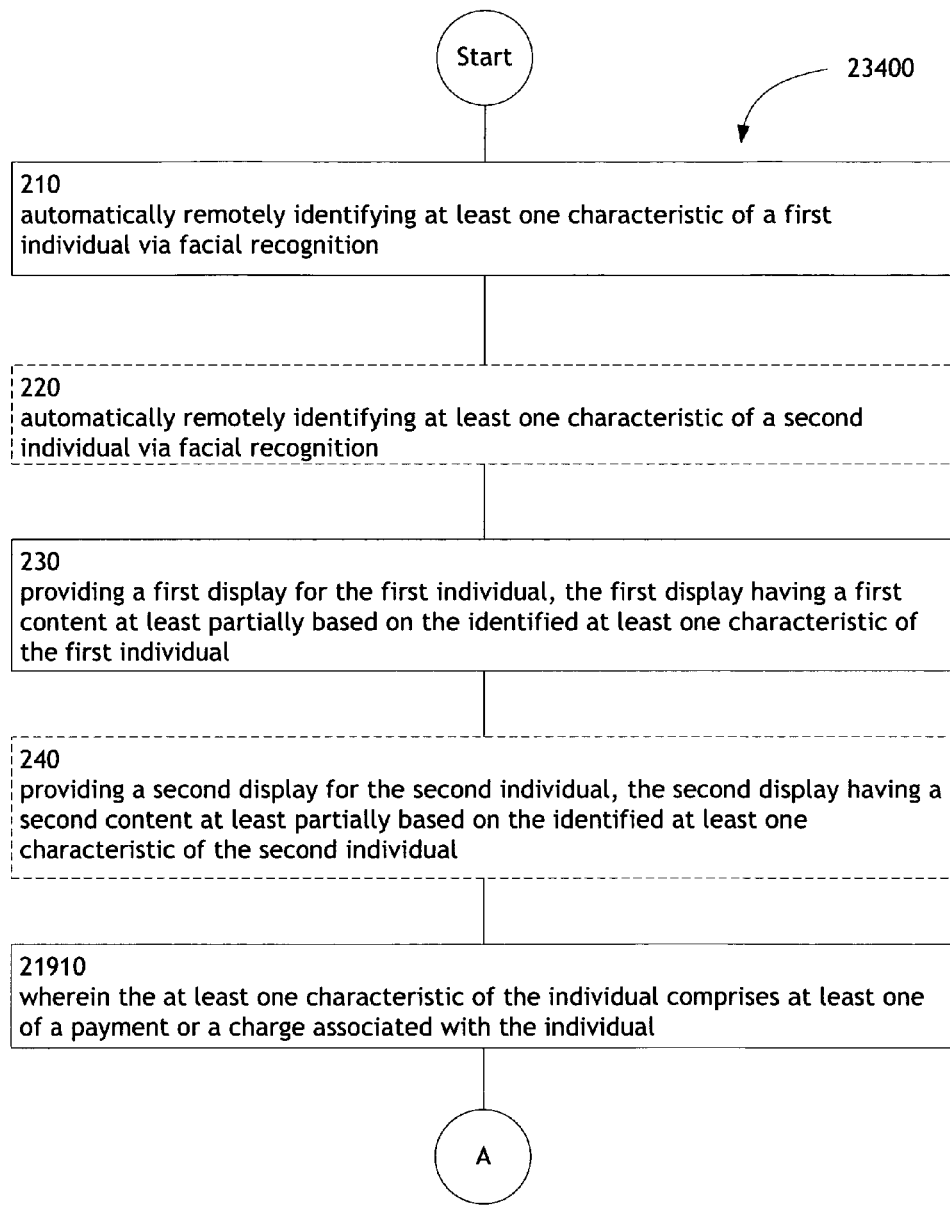
Figure 244B:
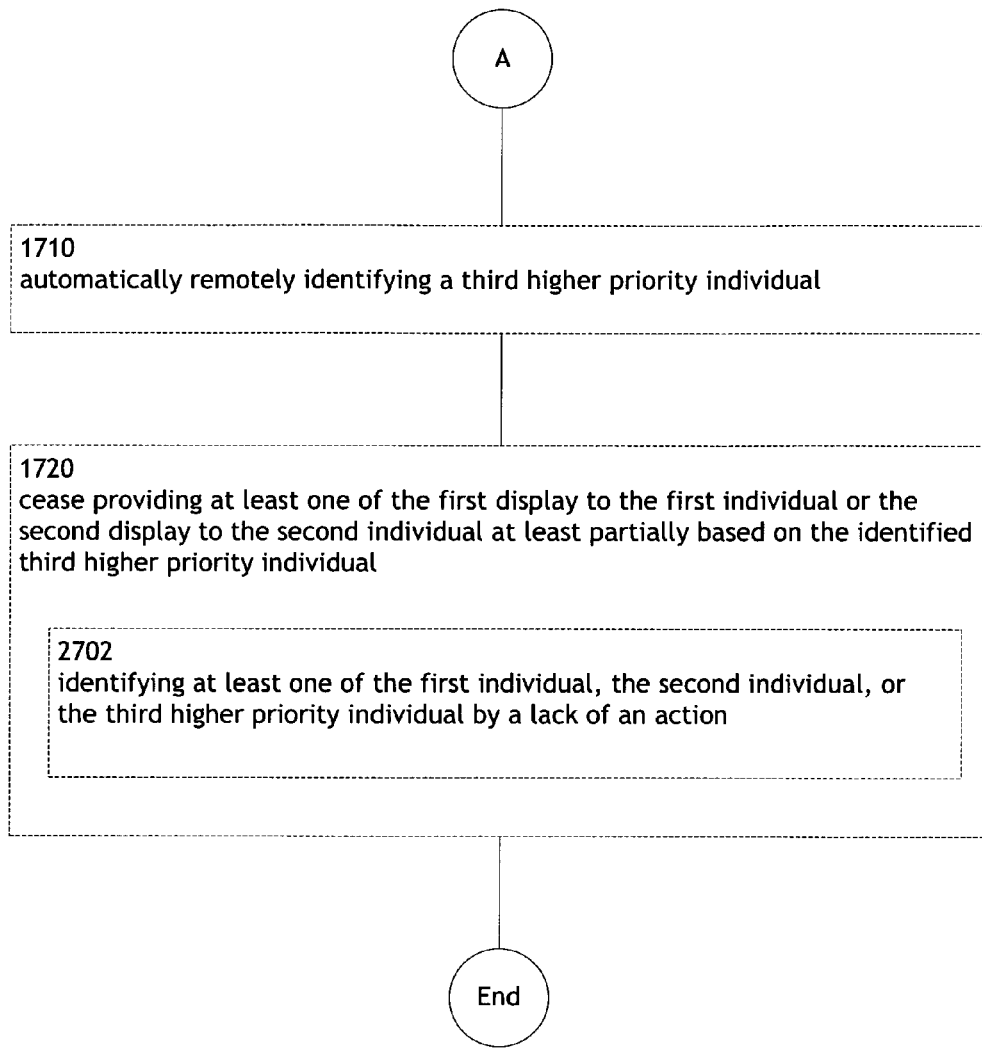

FIG. 244 illustrates an alternative embodiment of the operational flow of FIG. 234.

Figure 245:
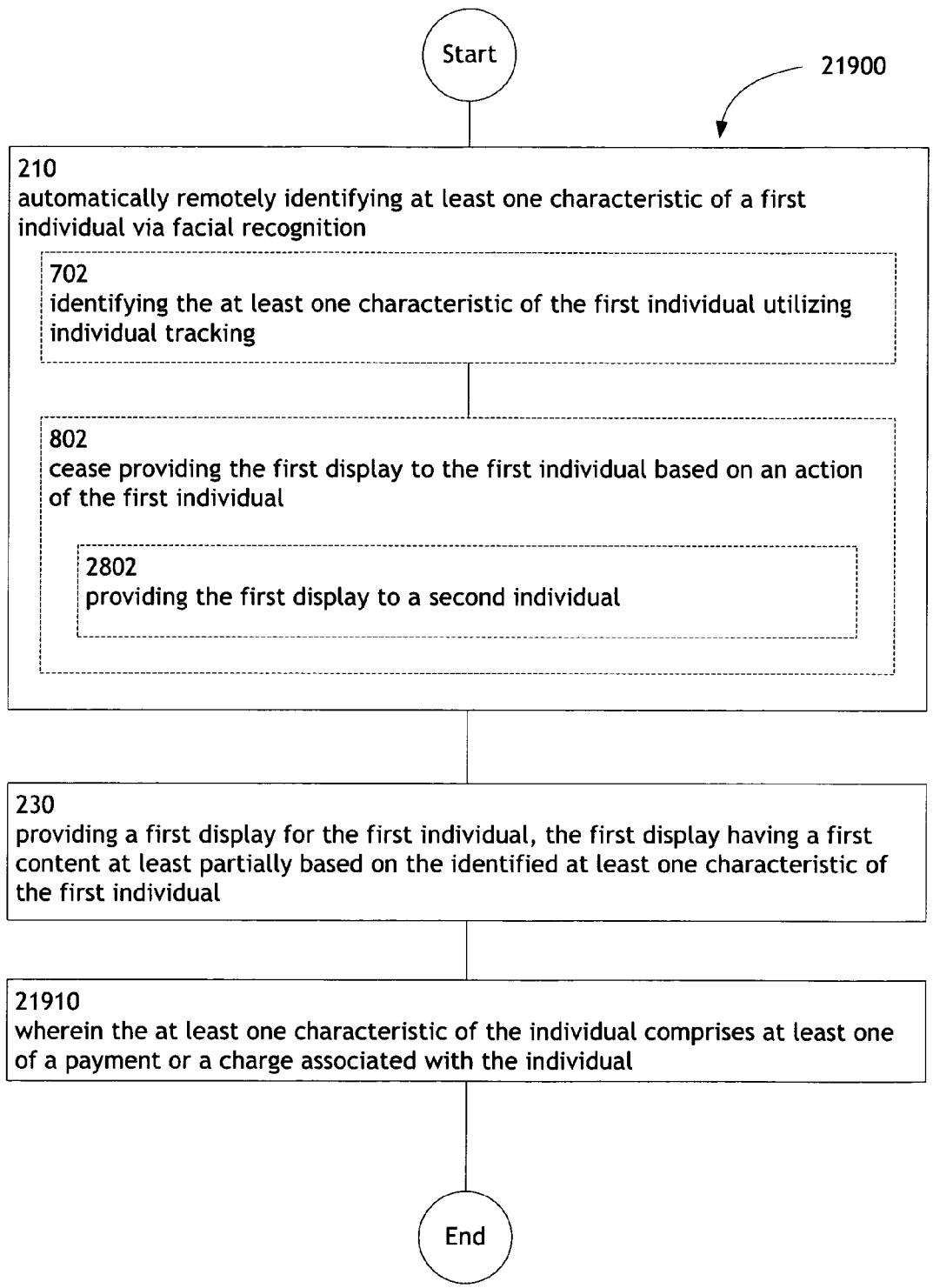

FIG. 245 illustrates an alternative embodiment of the operational flow of FIG. 219.

Figure 246:
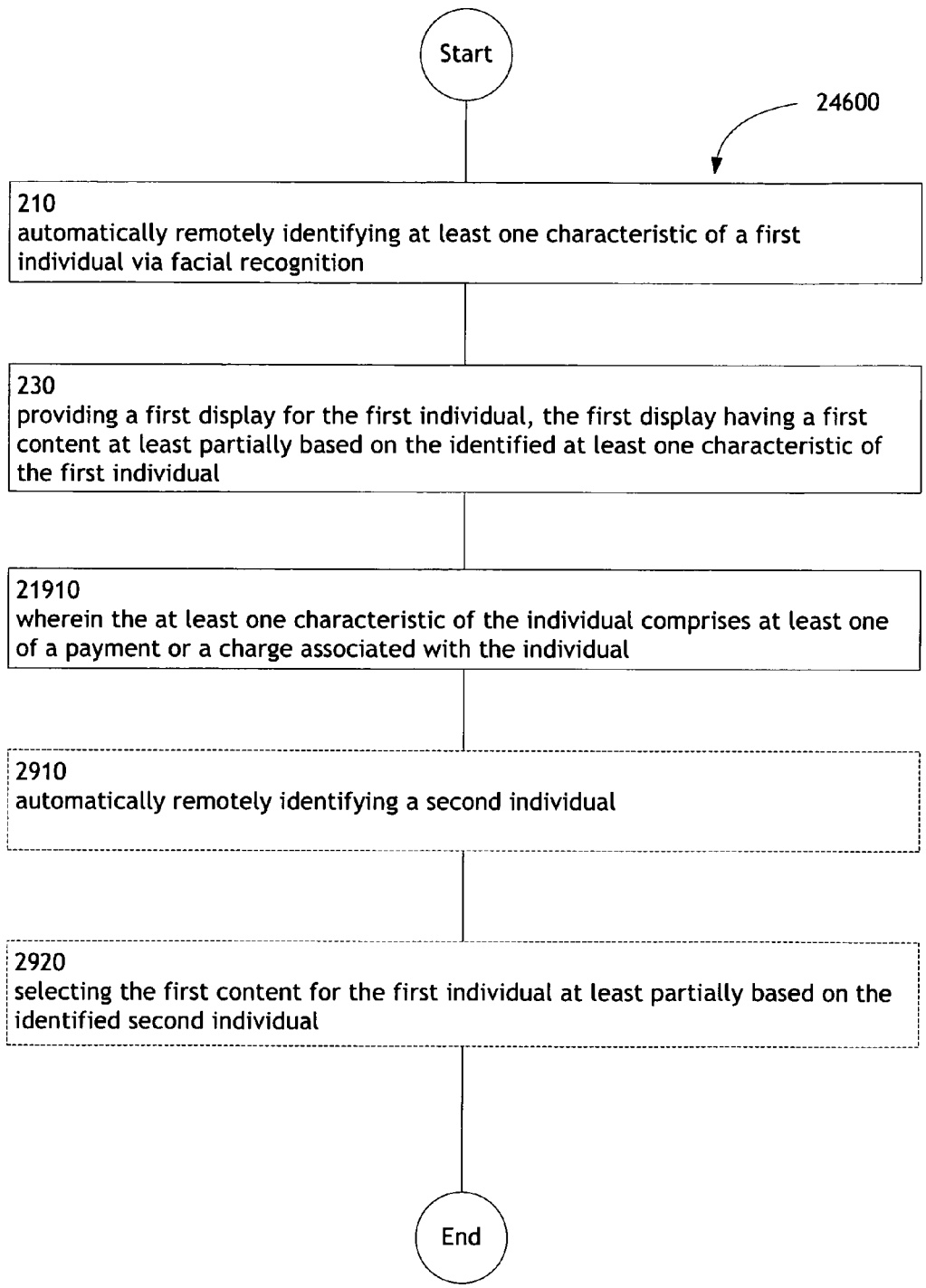

FIG. 246 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, automatically remotely identifying a second individual, and selecting the content for the first individual at least partially based on the identified second individual.

Figure 247:
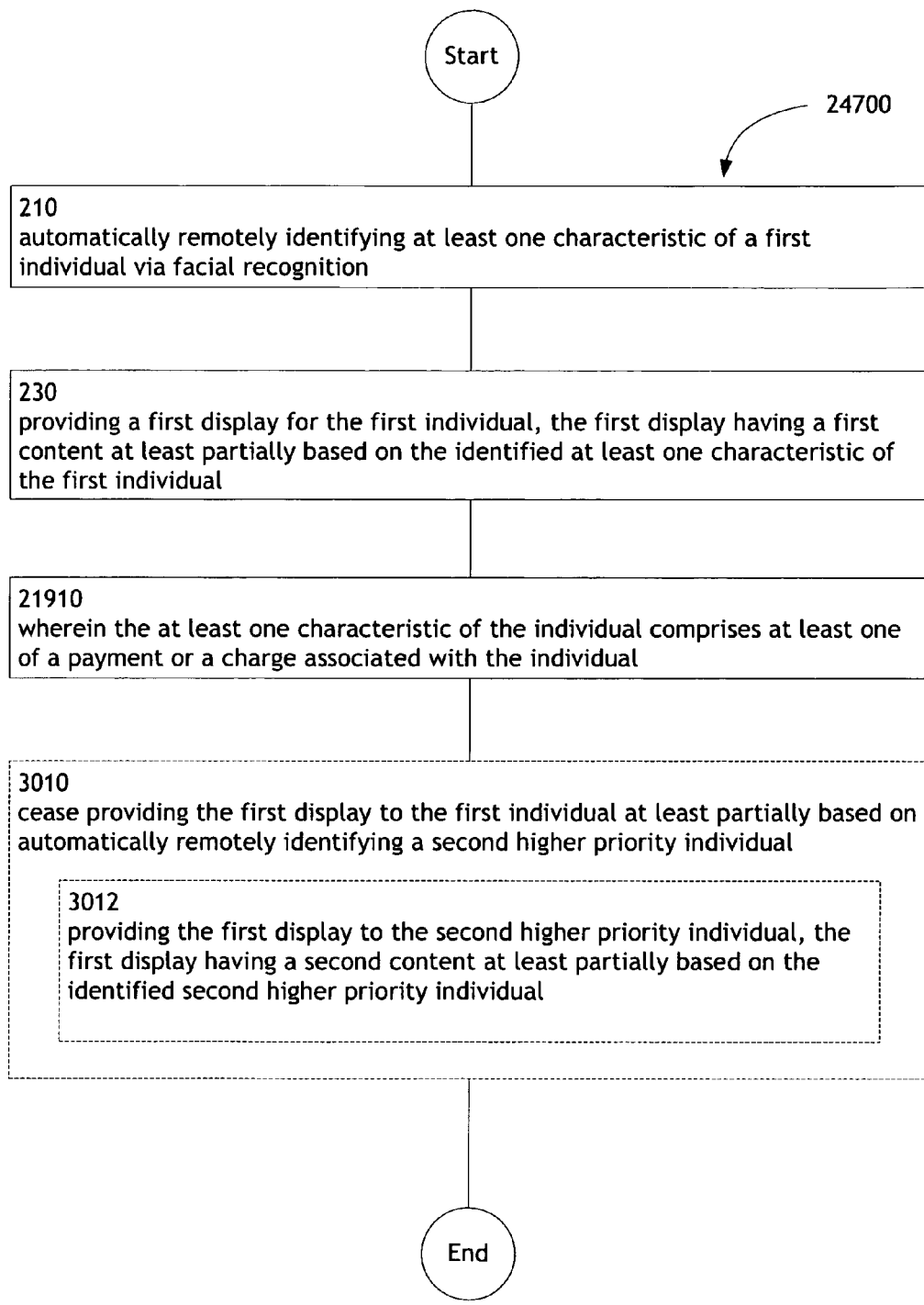

FIG. 247 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, and cease providing the display to the first individual at least partially based on automatically remotely identifying a second higher priority individual.

Figure 248:
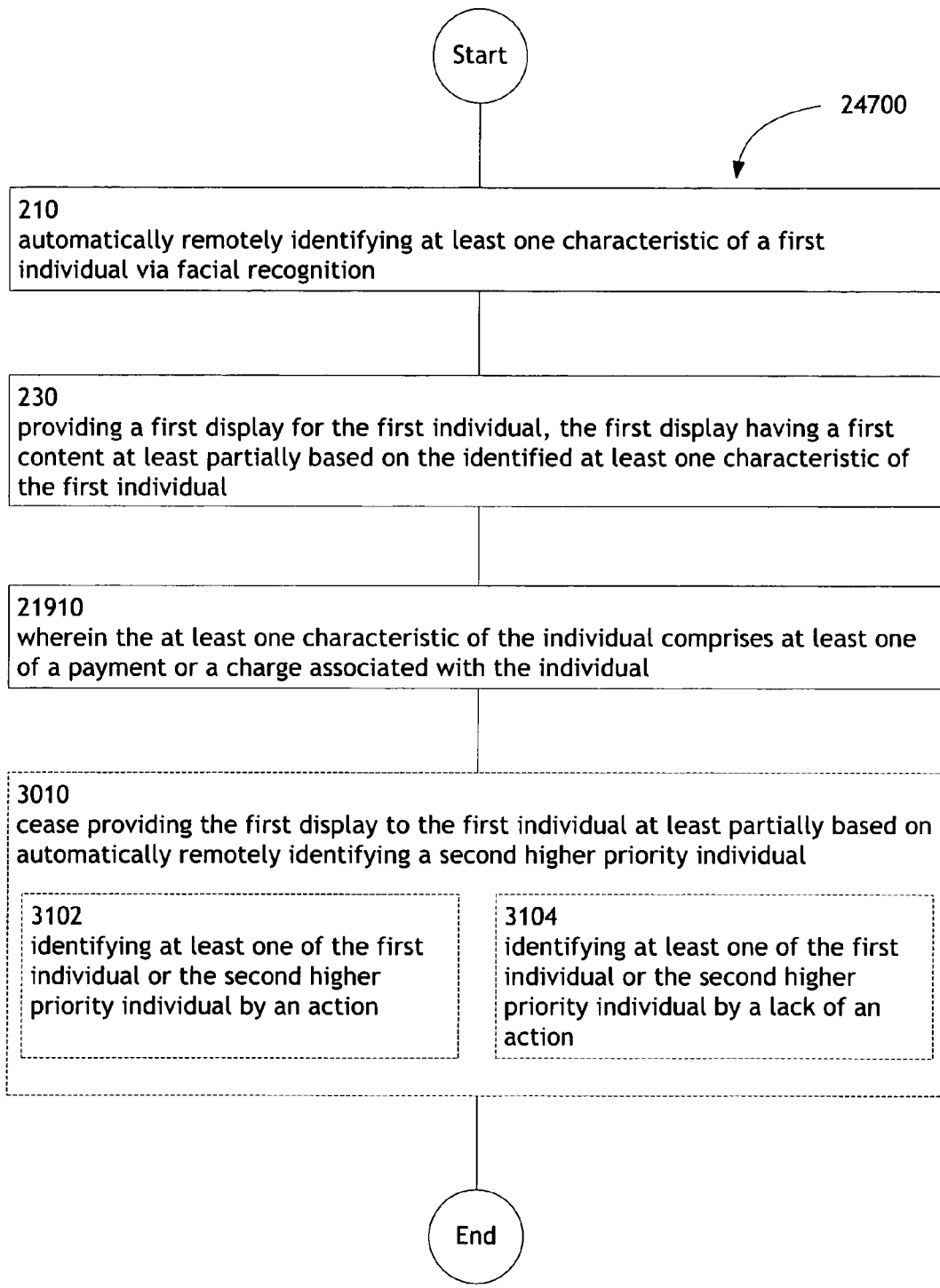

FIG. 248 illustrates an alternative embodiment of the operational flow of FIG. 247.

Figure 249:
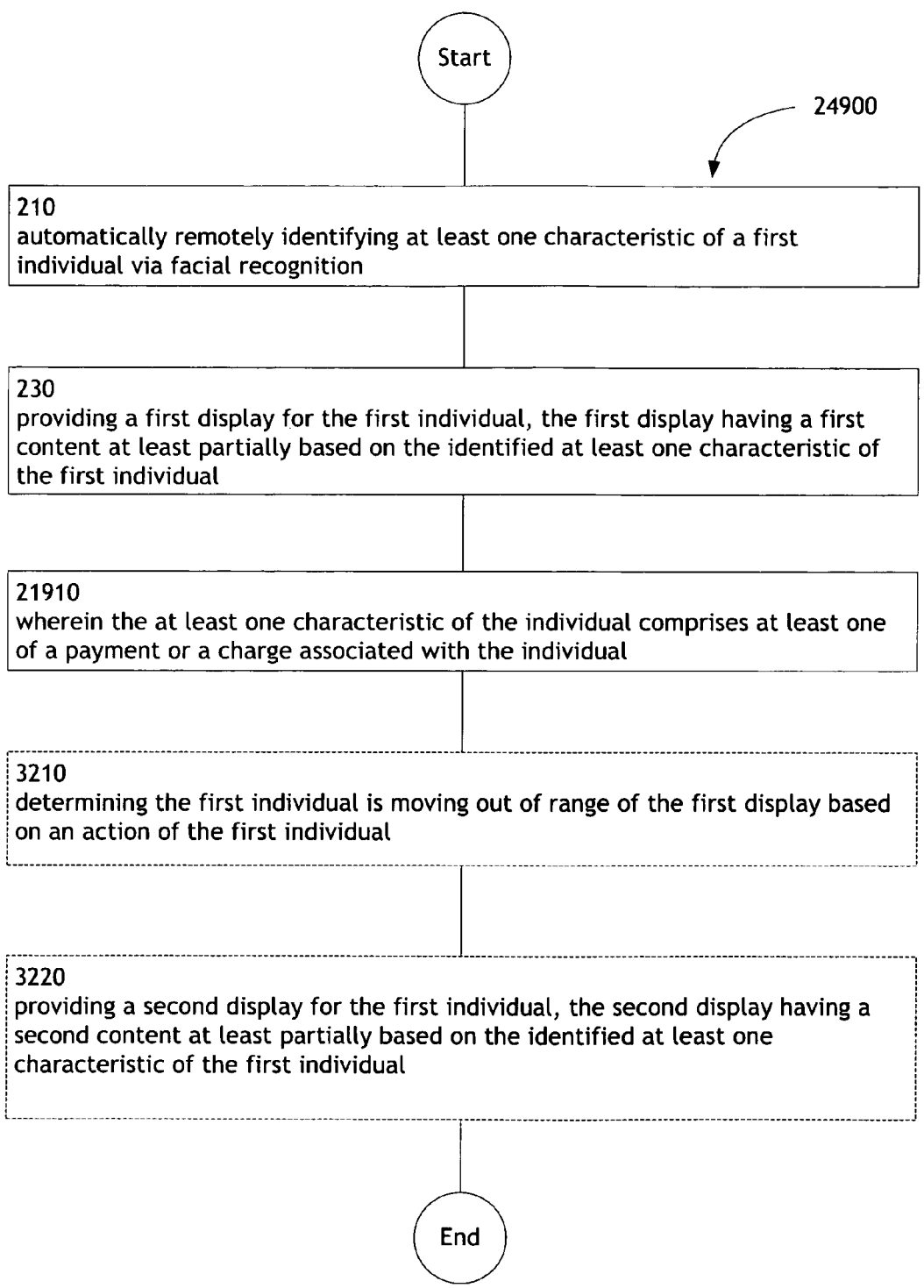

FIG. 249 illustrates an operational flow representing example operations related to automatically remotely identifying one or more characteristics of an individual utilizing facial recognition, providing a display for the individual having a content at least partially based on the one or more identified characteristics of the individual, wherein the at least one characteristic of the individual comprises at least one of a payment or a charge associated with the individual, determining the individual is moving out of range of the display based on an action of the individual, and providing a second display for the individual, the second display having a second content at least partially based on the identified at least one characteristic of the individual.

Figure 33:
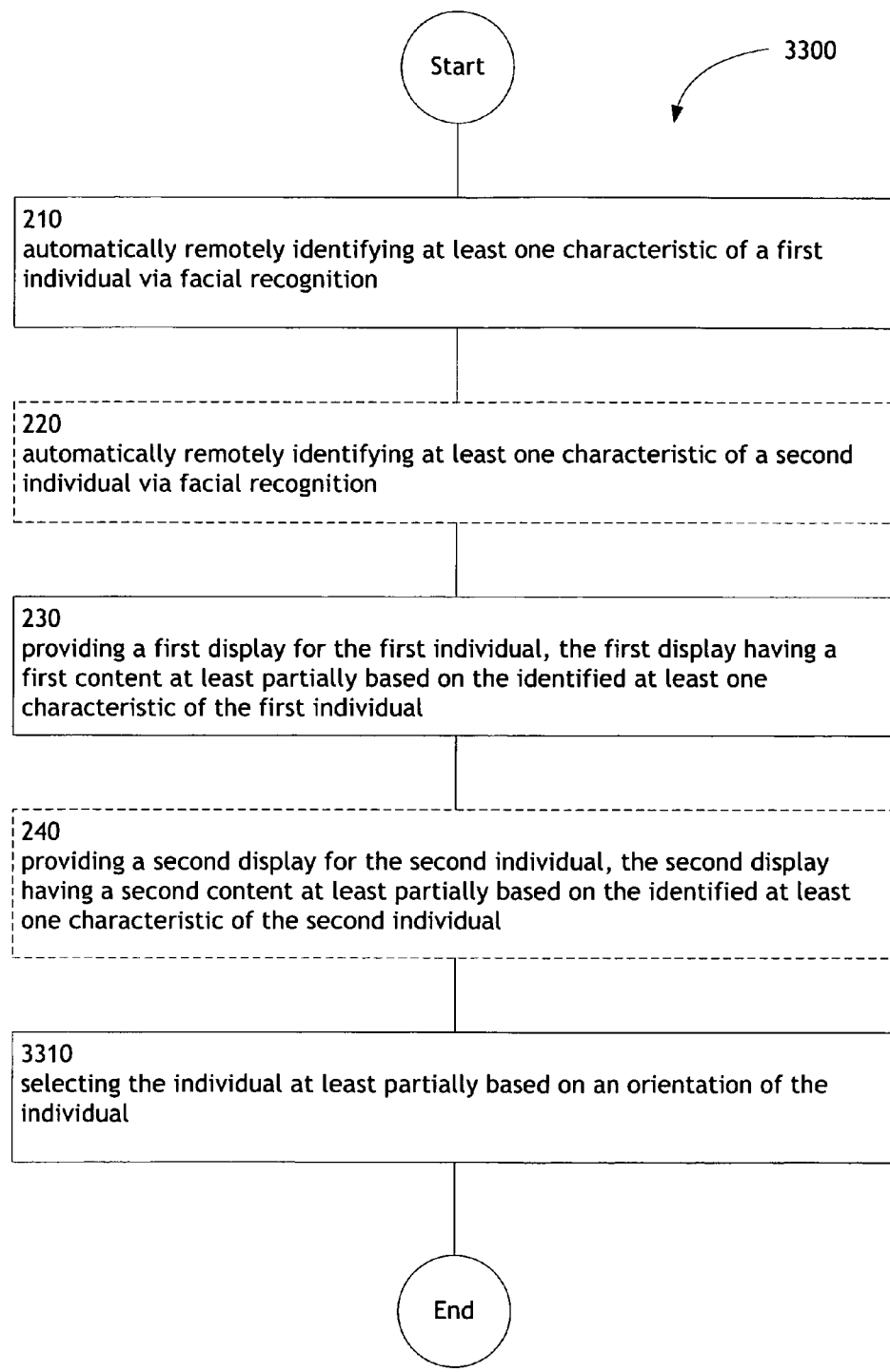
FIG. 33 illustrates an operational flow representing example operations related to automatically remotely identifying one or more characteristics of an individual utilizing facial recognition, providing a display for the individual having a content at least partially based on the one or more identified characteristics of the individual, and selecting the individual at least partially based on an orientation of the individual.
Figure 250:
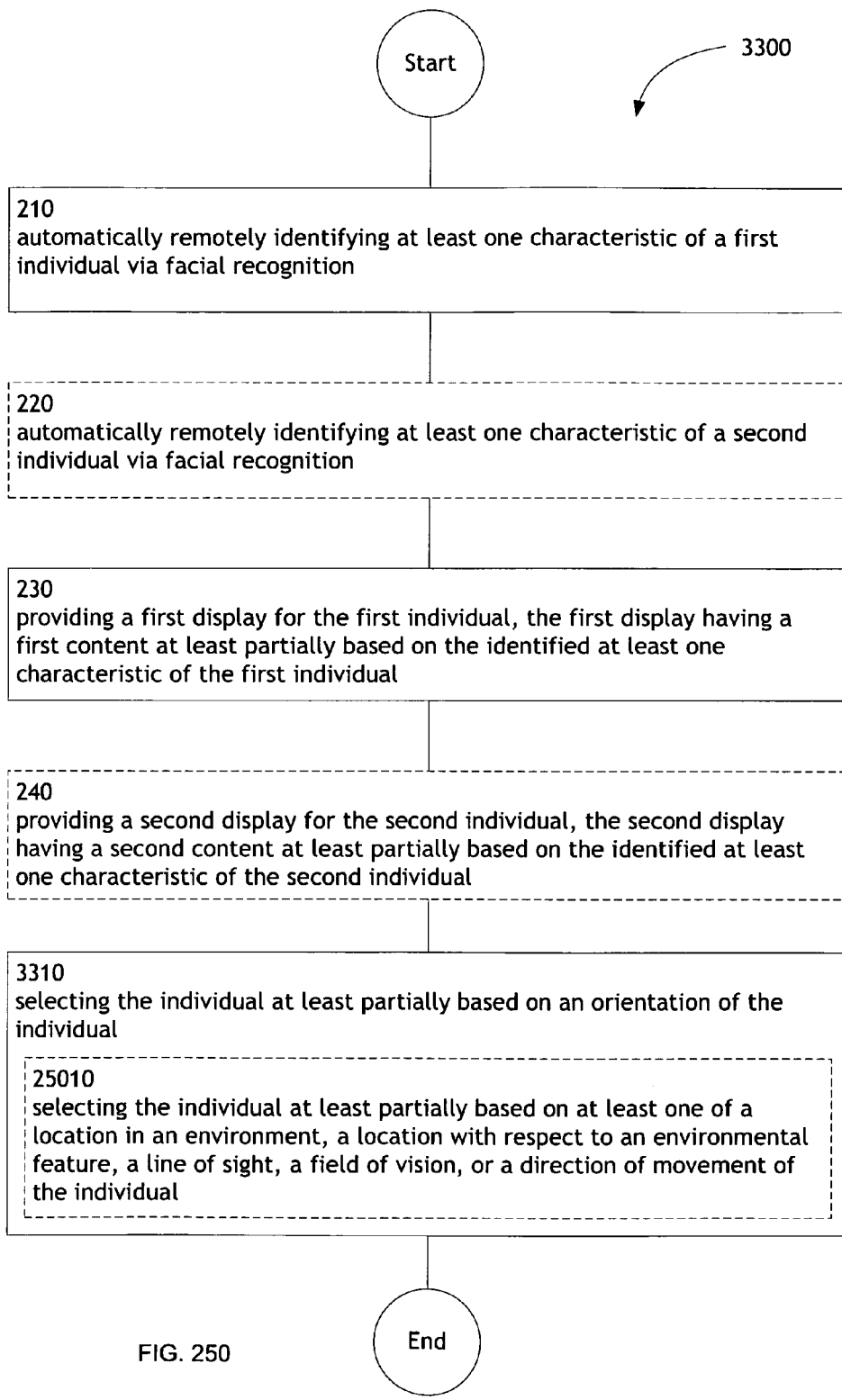

FIG. 250 illustrates an alternative embodiment of the operational flow of FIG. 33.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Figure 1A:
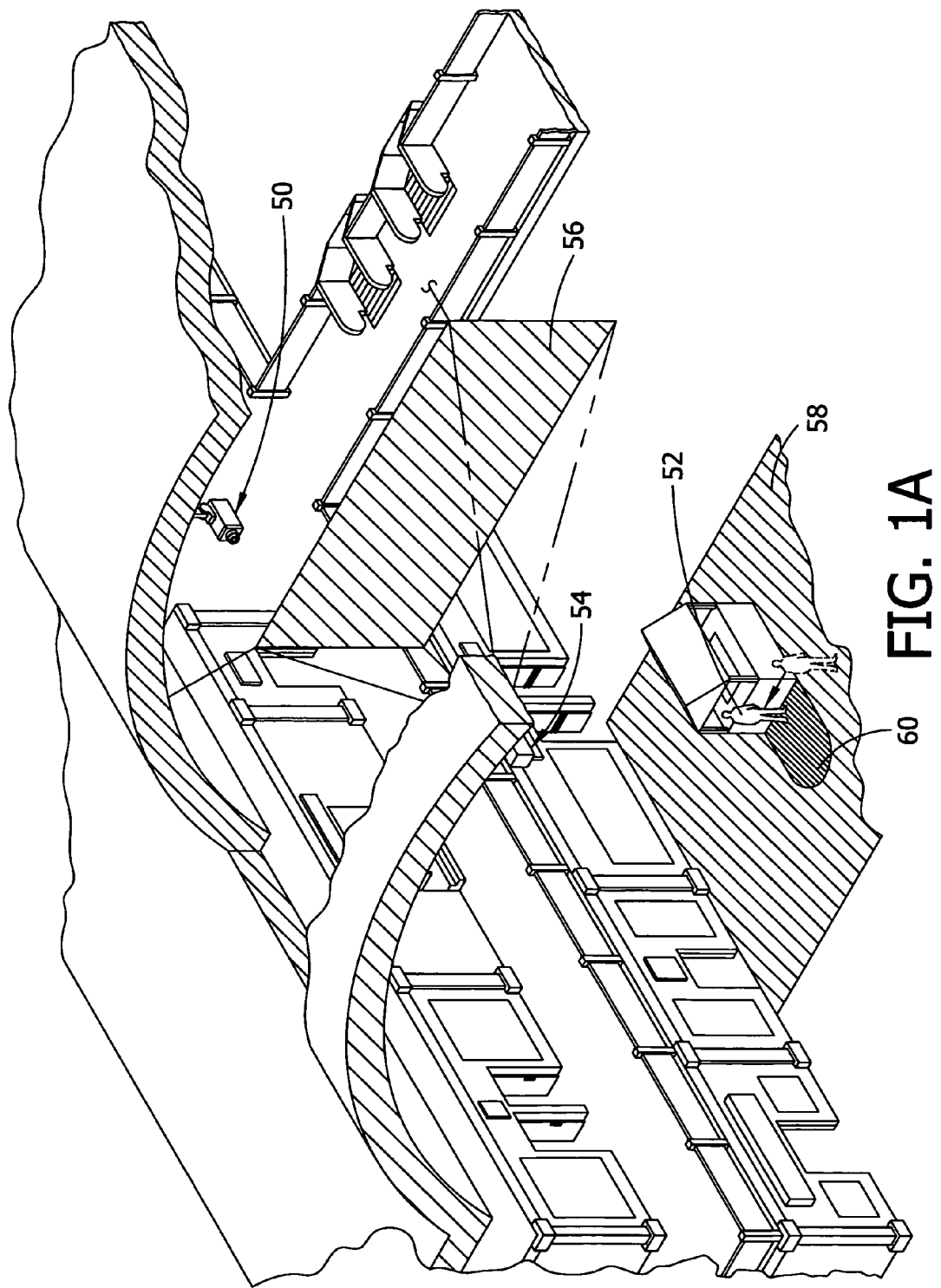
FIG. 1A is a schematic of a display.
Figure 1B:
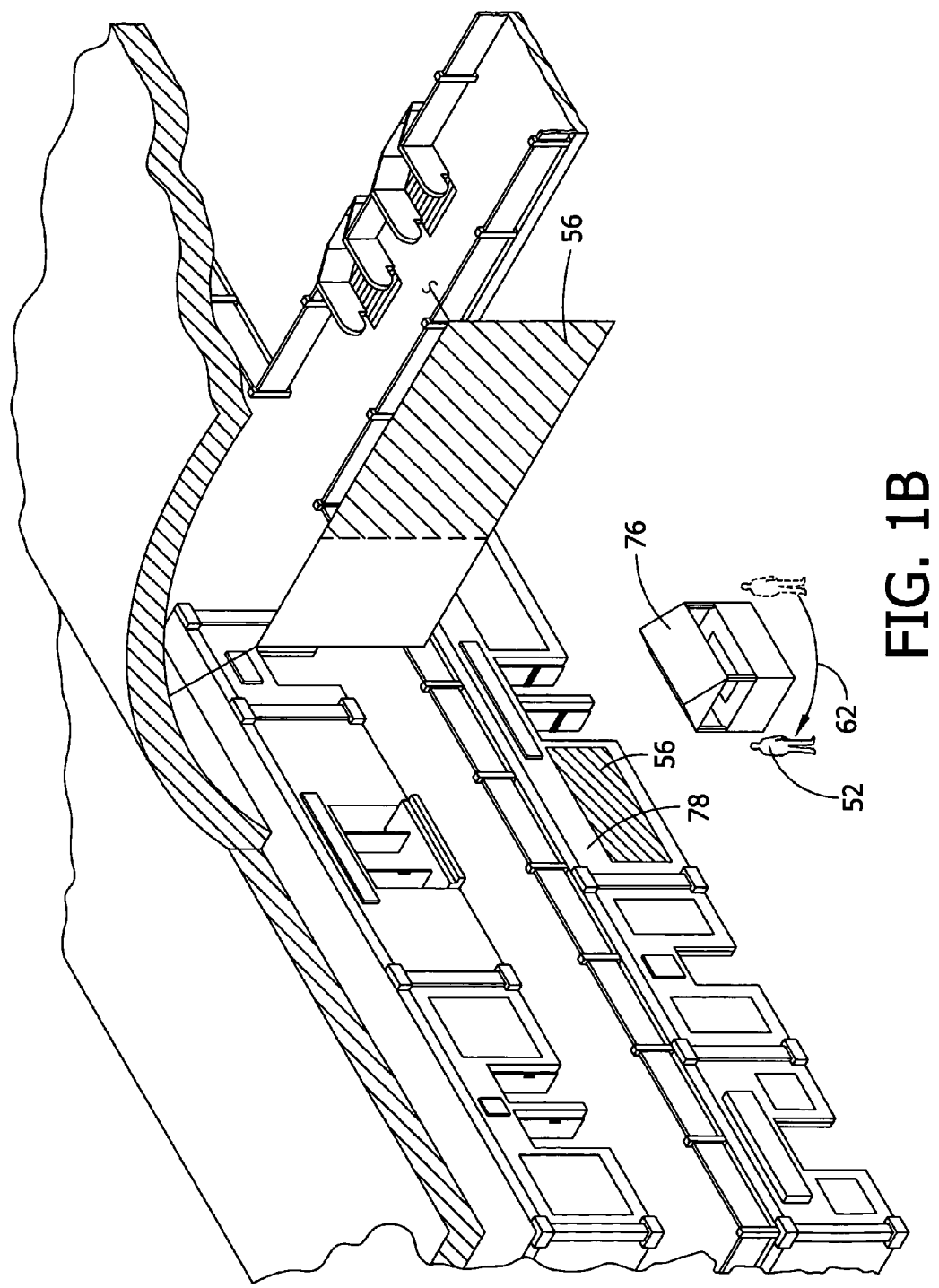
FIG. 1B is a schematic of one or more displays.
Figure 1D:
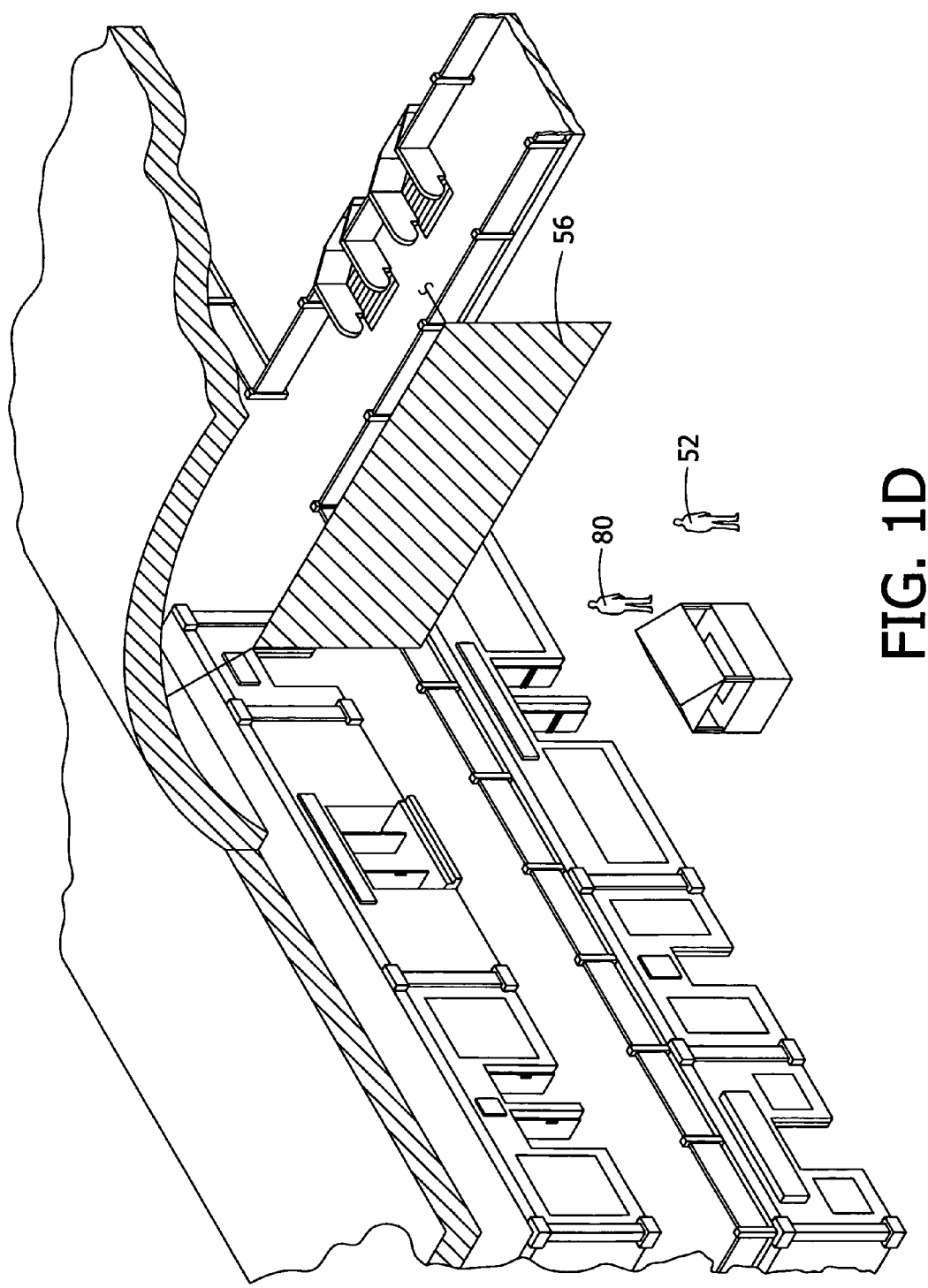
FIG. 1D is a schematic of a display.
Figure 1E:
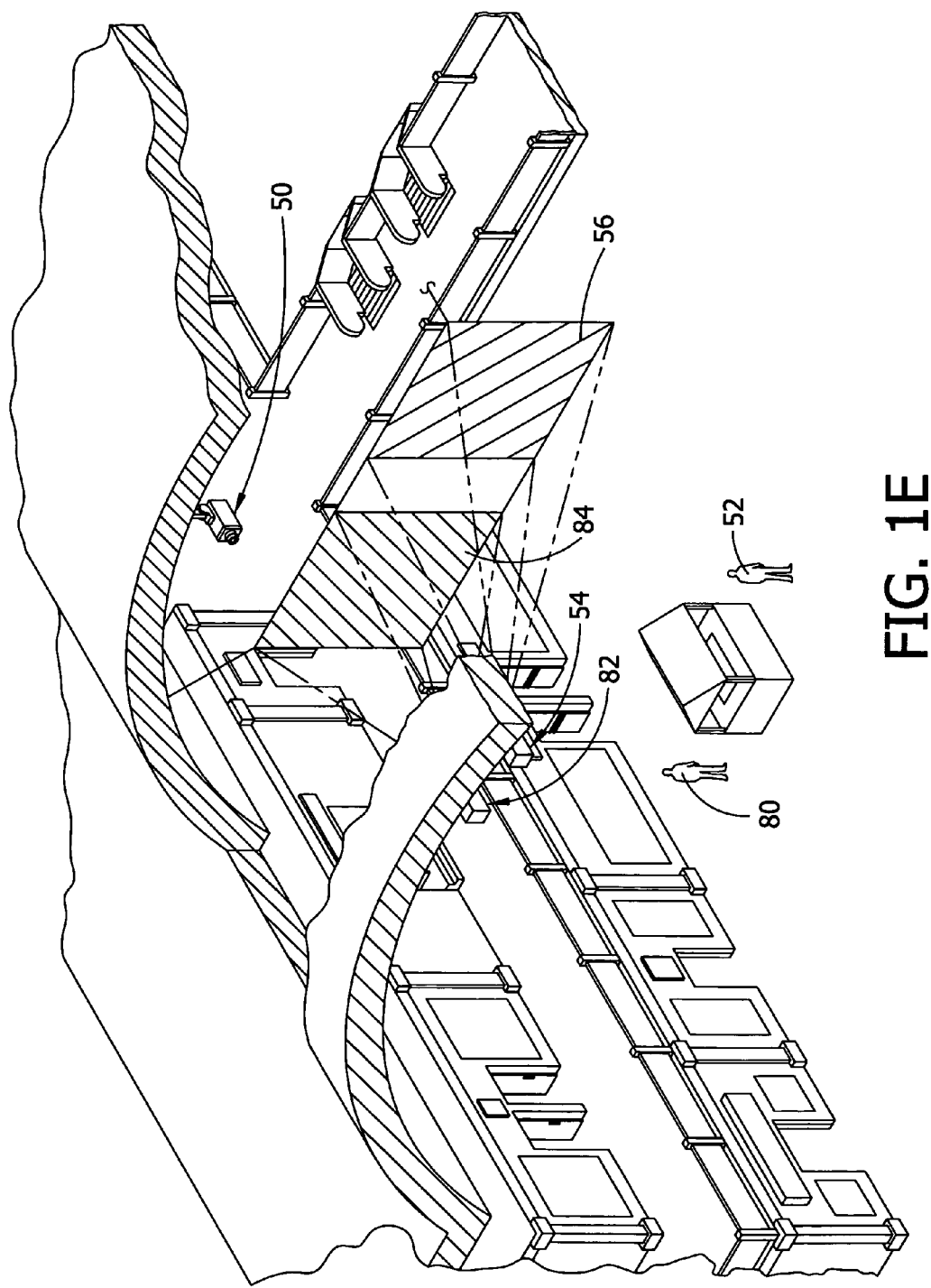
FIG. 1E is a schematic of one or more displays.
Figure 1F:
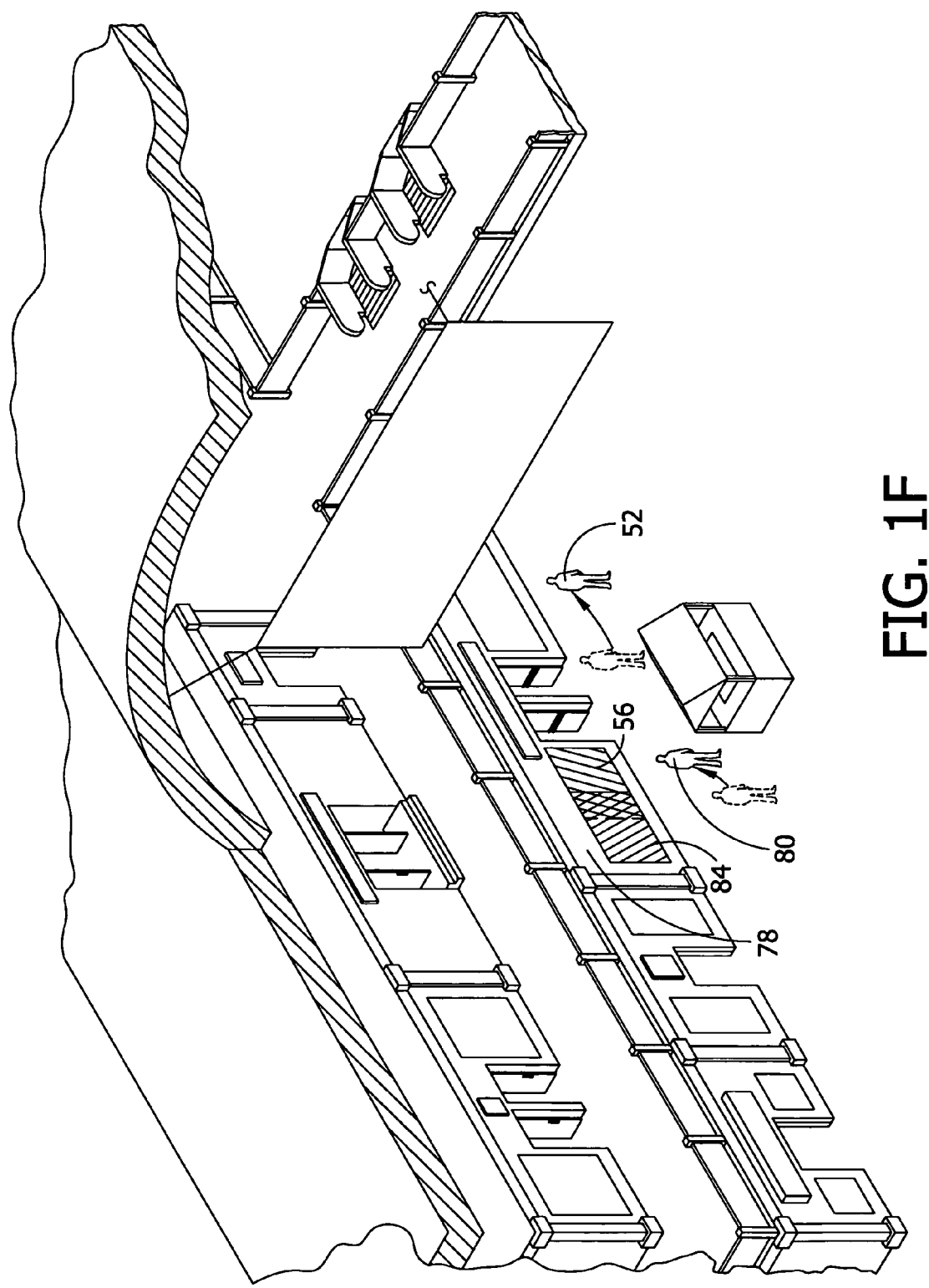
FIG. 1F is a schematic of one or more displays.
Figure 1G:
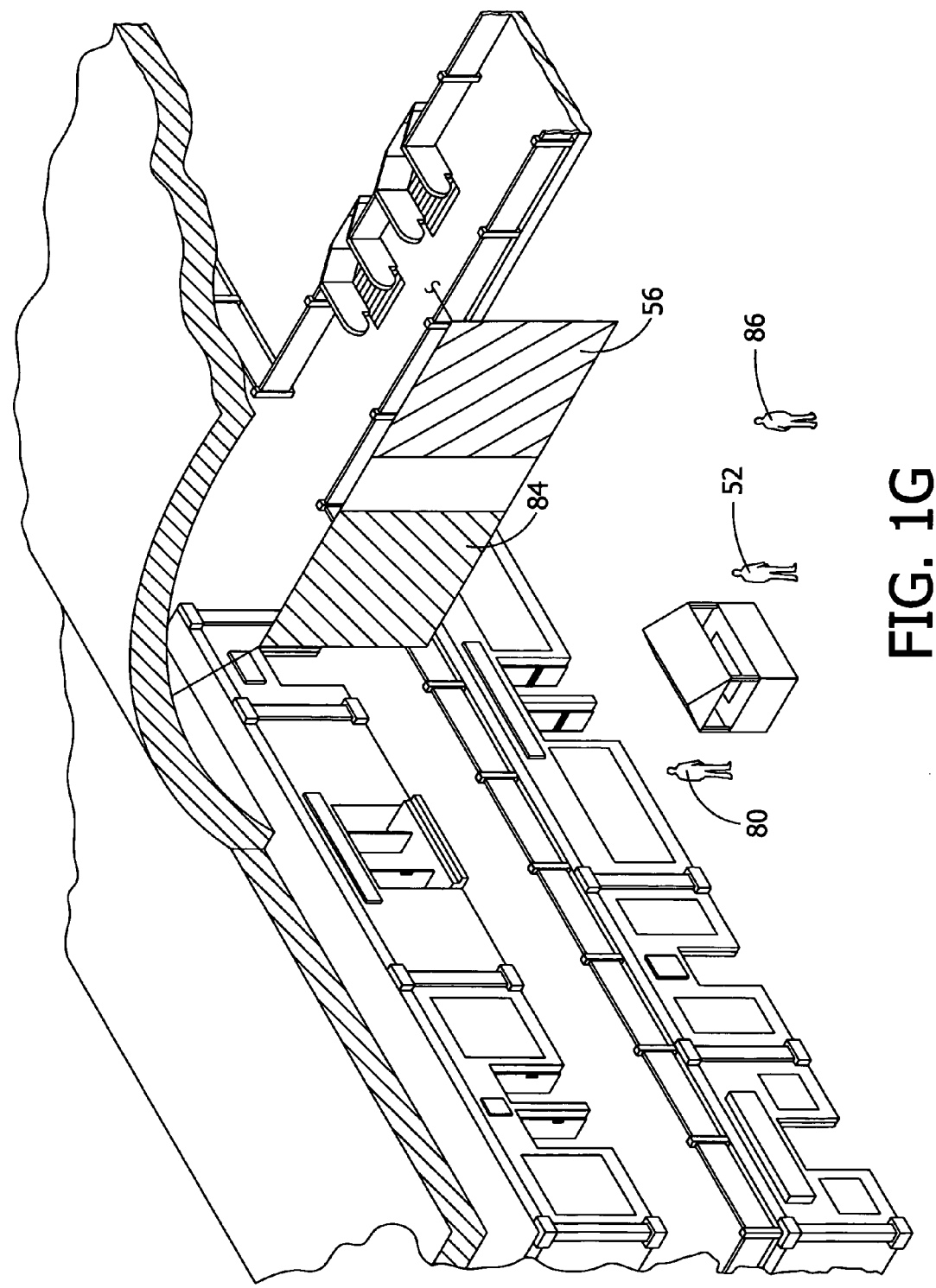
FIG. 1G is a schematic of one or more displays.
Figure 1H:
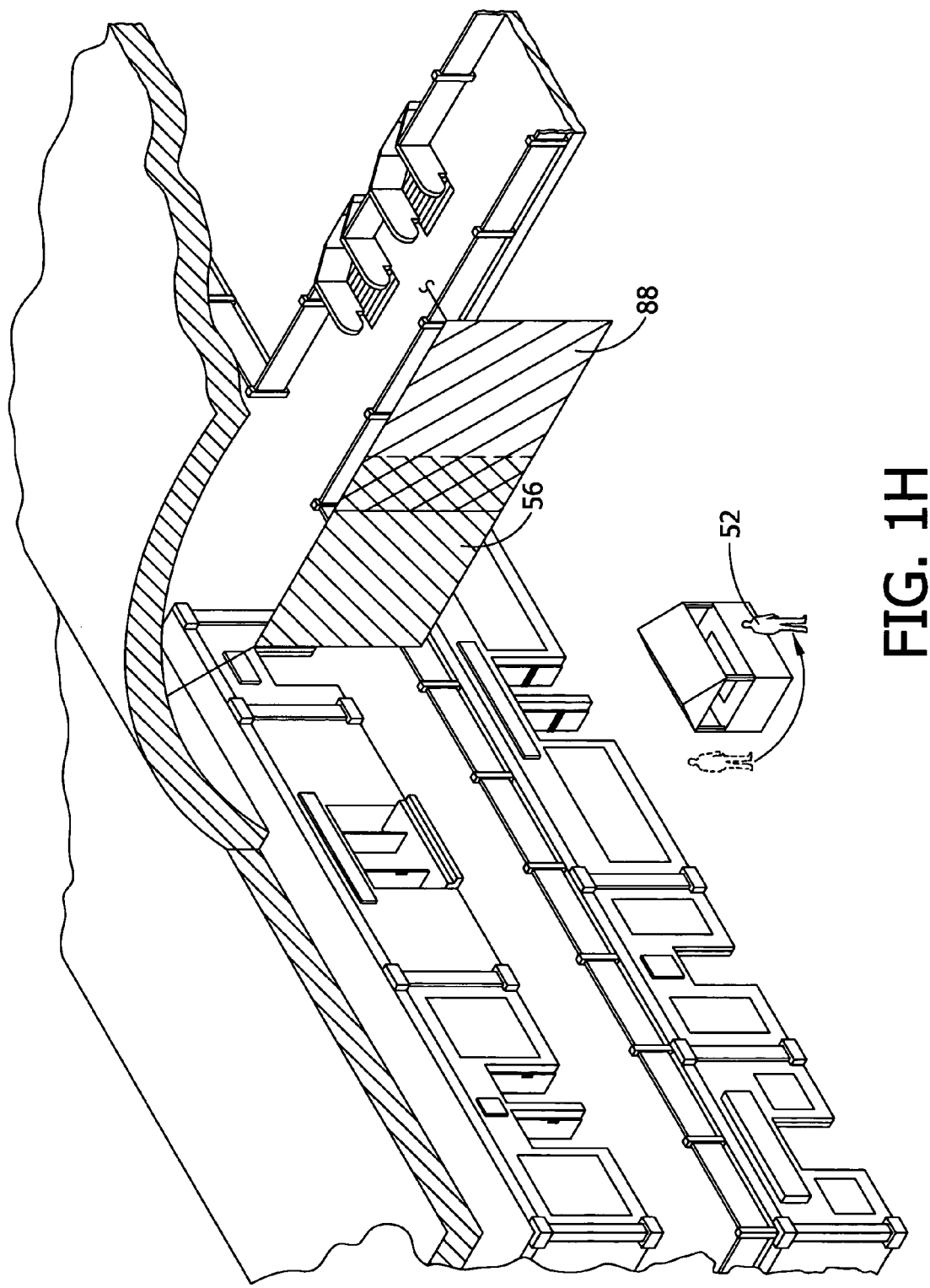
FIG. 1H is a schematic of one or more displays.
Figure 1J:
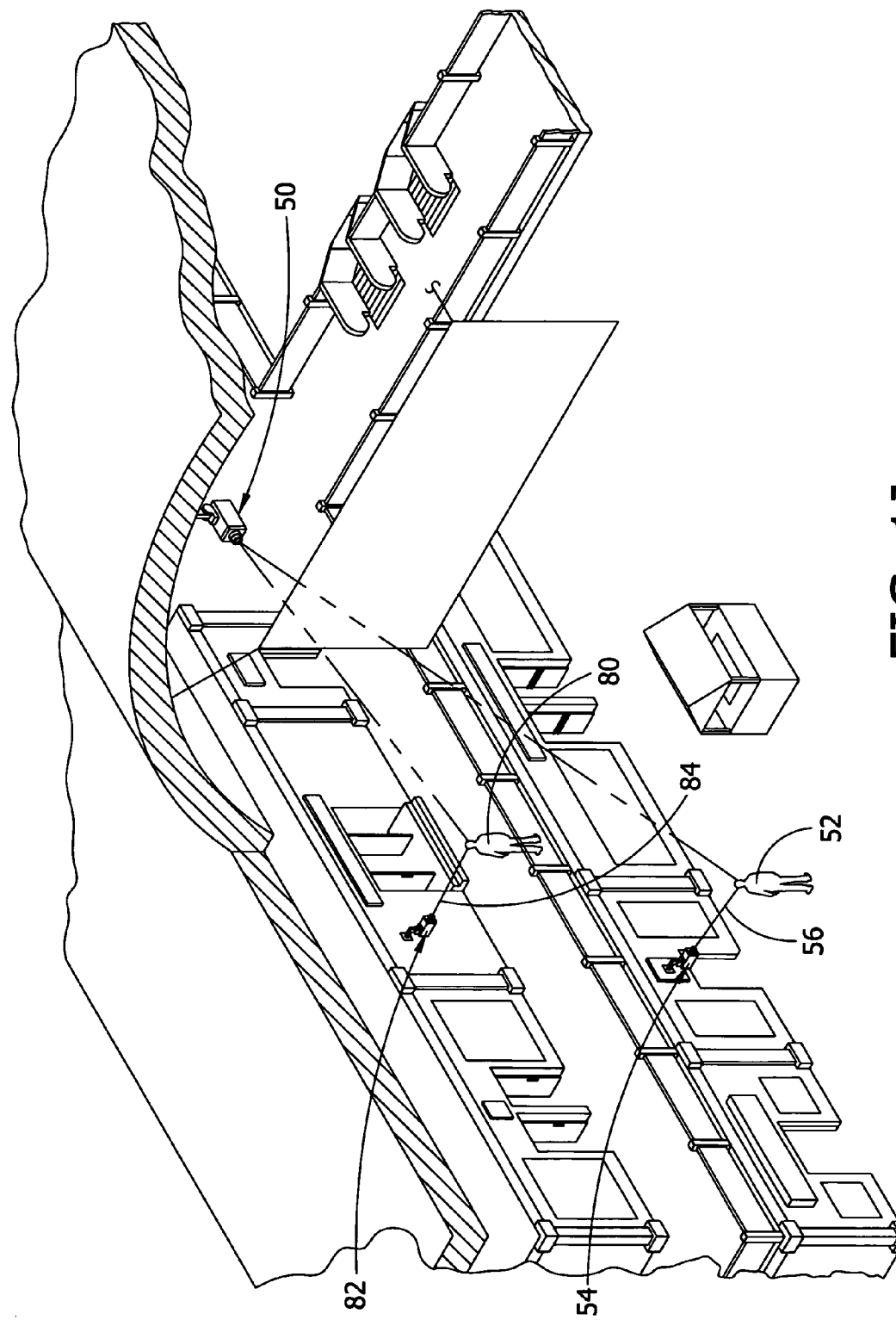
FIG. 1J is a schematic of one or more displays.
Figure 1K:
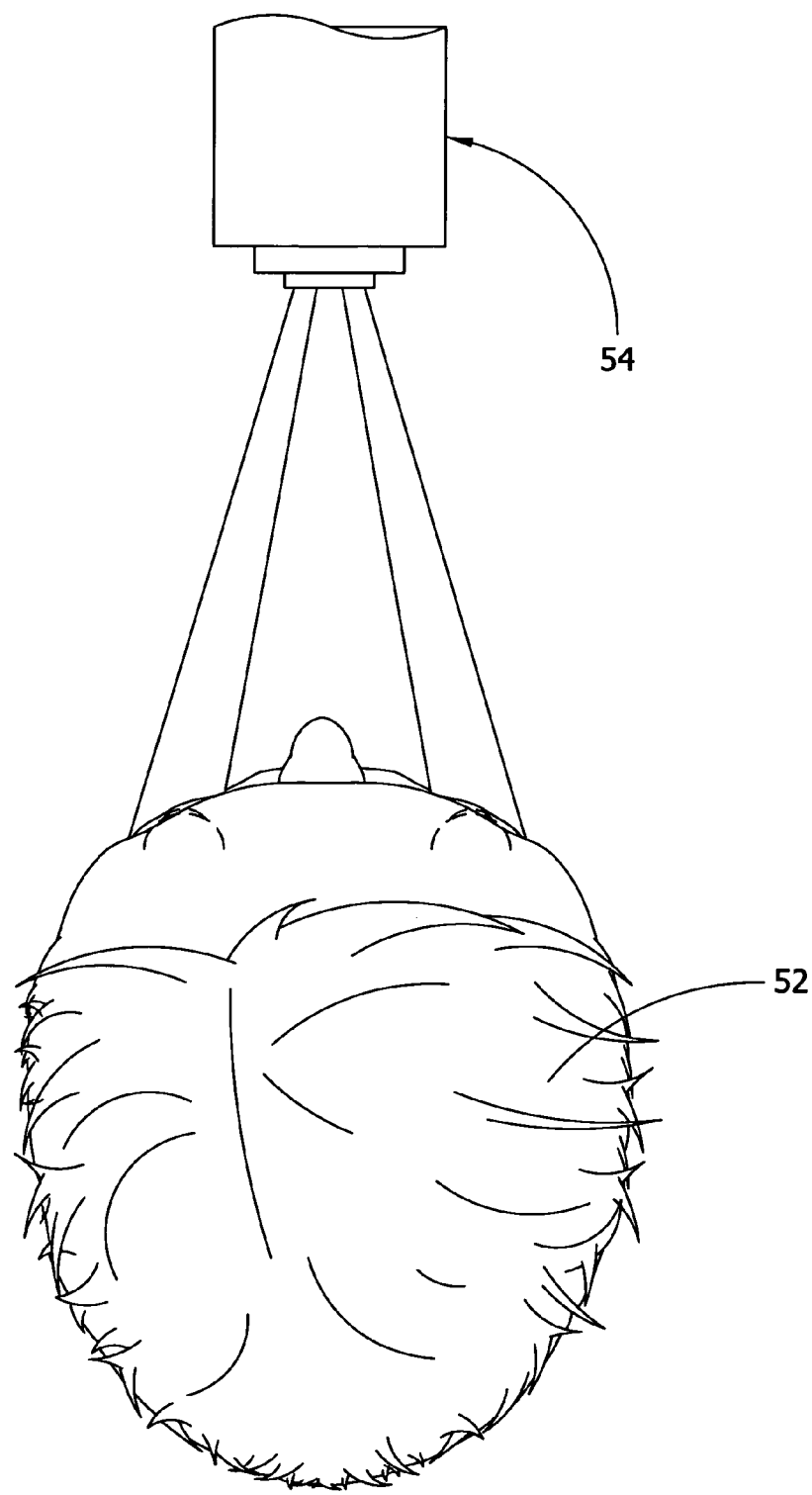
FIG. 1K is a schematic of a display.
Figure 1L:
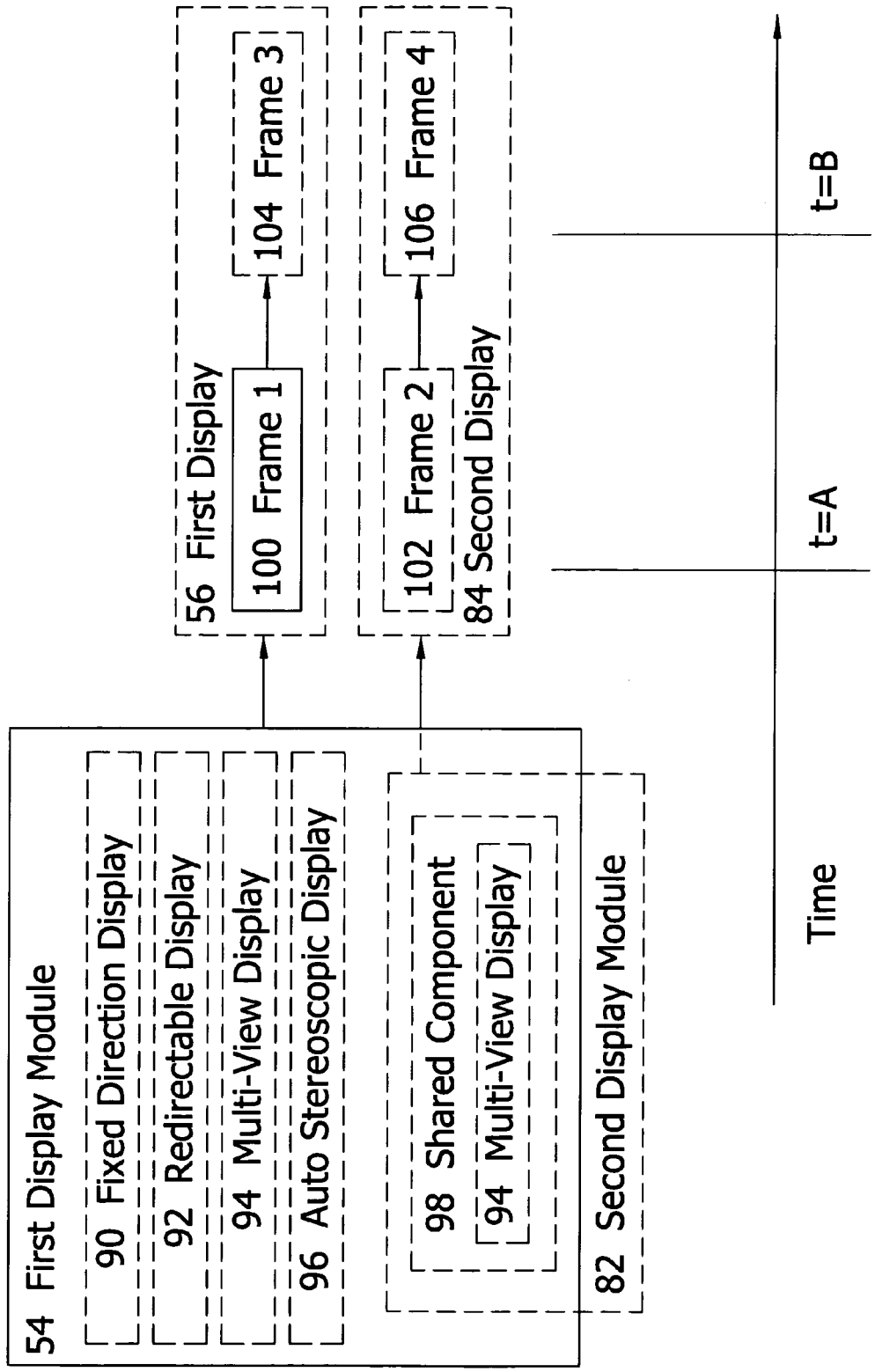
FIG. 1L is a schematic of one or more display modules.
Figure 1M:
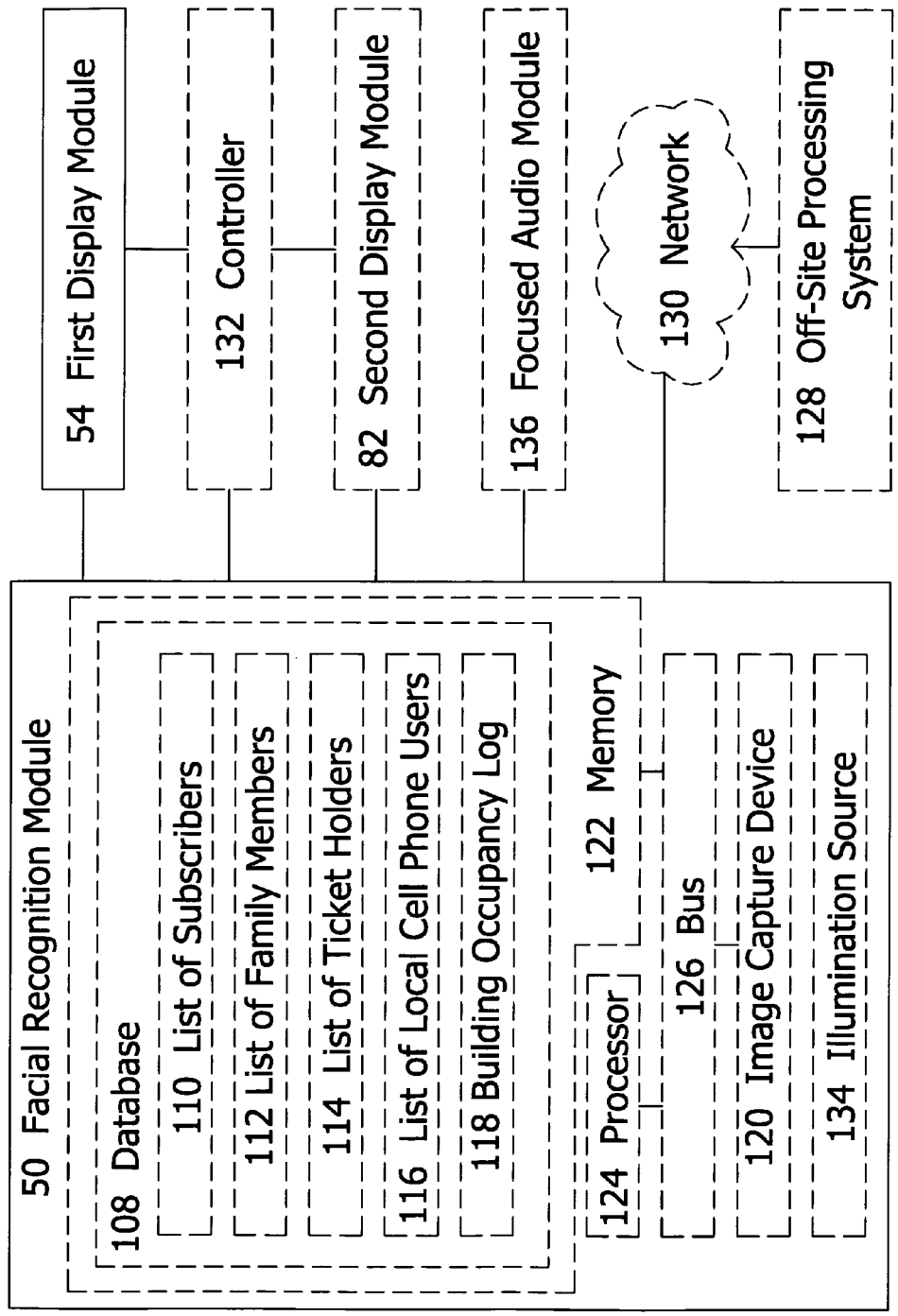
FIG. 1M is a schematic of a facial recognition module coupled with one or more display modules.

Referring now to FIGS. 1A and 1M, a facial recognition module 50 may be utilized to automatically remotely identify one or more characteristics of a first individual 52. In an embodiment, the facial recognition module 50 may include an image capture device 120, such as a digital camera, a video camera, or the like for capturing an image of the first individual 52. The facial recognition module 50 may also include hardware, software, firmware or the like for implementing one or more facial recognition algorithms to identify the first individual 52. For instance, one or more facial characteristics of the first individual 52 may be stored in a memory 122 (which may include a database or the like) accessible by the facial recognition module 50, and the facial recognition module 50 may utilize data (e.g., facial characteristic data) stored in the database to identify the first individual 52. For example, the memory 122 may be connected to a processor 124 (e.g., via bus 126) for implementing one or more facial recognition algorithms to identify the first individual 52. The facial recognition algorithms may be stored in the memory 122. Alternatively, the facial recognition module 50 may be remotely connected to an off-site processing system 128 or the like via a network 130 (e.g., the Internet, an intranet, a Local Area Network (LAN), a Wide Area Network (WAN), an ad-hoc network, or the like). The off-site processing system 128 may implement one or more facial recognition algorithms to identify the first individual 52 and communicate the results to the facial recognition module 50 via the network 130.

A first display module 54 may be utilized to provide a first display 56 for the first individual 52, where the first display 56 has a content at least partially based on the one or more identified characteristics of the first individual 52. The first display module 54 may provide a first display 56 comprising visual stimuli such as an image or a series of images (e.g., a video) visible to the first individual 52. In an embodiment, the first display module 54 may include a video projector, a slide projector, a film projector, or another device for projecting moving or still images visible to the individual. The first display module 54 may provide a first display 56 comprising audio stimuli such as a sound or a series of sounds (e.g., a series of spoken words) audible to the first individual 52. In an embodiment, the first display module 54 may include a speaker, a loudspeaker, a focused sound projector, or another device for projecting audio to the individual. For example, a focused sound projector may be utilized to project a narrow beam of sound at the first individual 52 while at least substantially excluding others from being able to hear the audio broadcast to the first individual 52. The first display module 54 may provide a first display 56 comprising olfactory or tactile stimuli such as a current of air that may be smelled or felt by the first individual 52. For example, a fan may be utilized to direct a scented stream of air at the first individual 52. In embodiments, the first display module 54 may provide a first display 56 comprising any combination of one or more images, sounds, or sensations for the first individual 52.

The first display module 54 may cease providing the first display 56 or the content of the first display 56 to the first individual 52 based on one or more of a change in the individual's environment or a change in the status of the first individual 52 (e.g., when the first individual 52 moves from a first region 58 where the first display 56 is visible to the first individual 52 to a second region 60 where the first display 56 is not visible to the first individual 52).

A change in the individual's environment may include the occurrence of an event (e.g., the individual is paged or receives a cellular telephone call) or a change in the status of some inanimate object (e.g., a sign previously facing the individual is now turned away from the individual). Additionally, a change in the individual's environment may include a change in one or more of movement, color, attitude, relationship, or time. A change in the status of the individual may include a change in a relationship between one or more of the individual and an inanimate article, an animate article, a person, a group of persons, or a set of articles. Further, a change in the status of the individual may include an action of the individual (e.g., moving from the first region 58 to the second region 60). It will be appreciated that a display module may cease providing the display or the content to an individual based on a change in the individual's environment, a change in the status of the individual, or a combination of a change in the individual's environment and a change in the status of the individual.

Referring now to FIGS. 1B and 1C, the content selected for the first individual 52 may be selected based on an action of the individual 62. The action of the individual 62 may include one or more of a gaze orientation 64, a gesture 66, an audio sound 68, a vocal sound 70, a motion of at least a part of a body 72, or an orientation of at least a part of a body 74. In an embodiment, gaze orientation 64 may include, for instance, glancing at an item but not moving towards it. In an embodiment, gesture 66 may include a facial expression. In an embodiment, the orientation of at least a part of a body 74 may include, but is not limited to, the posture or stance of the individual, the angle of the individual to the display, or the range of the individual from the display. The first display 56 may be projected onto a hanging screen and may have a first content when the first individual 52 is standing next to a kiosk 76 (e.g., an advertisement for merchandise sold at the kiosk 76). When the first individual 52 begins to move toward a storefront 78, the first display 56 may be projected onto a wall of the storefront 78 and may have a different content (e.g., an advertisement for merchandise sold within).

Referring now to FIG. 1D, the first display module 54 may cease providing the first display 56 to the first individual 52 based on automatically remotely identifying one or more characteristics of a second individual 80. The facial recognition module 50 may be utilized to automatically remotely identify one or more characteristics of the second individual 80. The second individual 80 may be a higher priority individual (according to any user-specified criteria) than the first individual 52, and the first display module 54 may be utilized to provide the first display 56 to the second individual 80, where the first display 56 has a content at least partially based on the one or more identified characteristics of the second individual 80. In an embodiment, a controller 132 may be connected to the facial recognition module 50 and the first display module 54. When the facial recognition module 50 identifies the second individual 80, the controller 132 may instruct the first display module 54 to cease providing the first display 56 to the first individual 52. Additionally, the controller 132 may instruct the first display module 54 to provide the first display 56 to the second individual 80.

Referring now to FIGS. 1E and 1F, the facial recognition module 50 may be utilized to automatically remotely identify one or more characteristics of a first individual 52. A first display module 54 may be utilized to provide a first display 56 for the first individual 52, where the first display 56 has a content at least partially based on the one or more identified characteristics of the first individual 52. Additionally, the facial recognition module 50 may be utilized to automatically remotely identify one or more characteristics of the second individual 80. A second display module 82 may be utilized to provide a second display 84 for the second individual 80, where the second display 84 has a content at least partially based on the one or more identified characteristics of the second individual 80. The first display module 54 may cease providing the first display 56 to the first individual 52 based on an action of the first individual 52 (e.g., when the first individual 52 moves away from the storefront 78 where the first display 56 is visible to the first individual 52). The second display module 82 may cease providing the second display 84 to the second individual 80 based on an action of the second individual 80 (e.g., when the second individual 80 moves away from the storefront 78 where the second display 84 is visible to the second individual 80).

Referring now to FIG. 1G, the facial recognition module 50 may be utilized to automatically remotely identify one or more characteristics of a third individual 86. The content for the first individual 52 or the content for the second individual 80 may be selected at least partially based on the third individual 86.

Referring now to FIG. 1H, the first display module 54 may cease providing the first display 56 to the first individual 52 based on an action of the first individual 52. The facial recognition module 50 may be utilized to identify the action of the first individual 52 (e.g., when the first individual 52 moves from a first region where the first display 56 is visible to the first individual 52 to a second region where the first display 56 is not visible to the first individual 52). The first display module 54 may be utilized to provide a third display 88 for the first individual 52, where the third display 88 has a content at least partially based on the one or more identified characteristics of the first individual 52. And that content may be the same or different from the content provided by the first display 56.

Referring now to FIG. 1L, the first display module 54 or the second display module 82 may include one or more of a fixed direction display 90 or a redirectable display 92. Alternatively, the first display module 54 or the second display module 82 may include one or more of a multi-view display 94 or an autostereoscopic display 96. Additionally, the first display module 54 and the second display module 82 may include a shared component 98. The shared component 98 may include the multi-view display 94. In an embodiment, the multi-view display 94 may include one or more of a lenticular lens assembly, one or more polarization filters, one or more LCD filters, or like hardware for providing different images to the first individual 52 and the second individual 80. For instance, the first display 56 and the second display 84 may include alternate frames displayable by the multi-view display 94.

The provision of the first display 56 to the first individual 52 may overlap in time with the provision of the second display 84 to the second individual 80 (e.g., a first frame 100 may be provided to the first individual 52 at a time t=A, while a second frame 102 may be provided to the second individual 80 at substantially the same time t=A; similarly, a third frame 104 may be provided to the first individual 52 at a time t=B, while a fourth frame 106 may be provided to the second individual 80 at substantially the same time t=B; and so forth).

Figure 2:
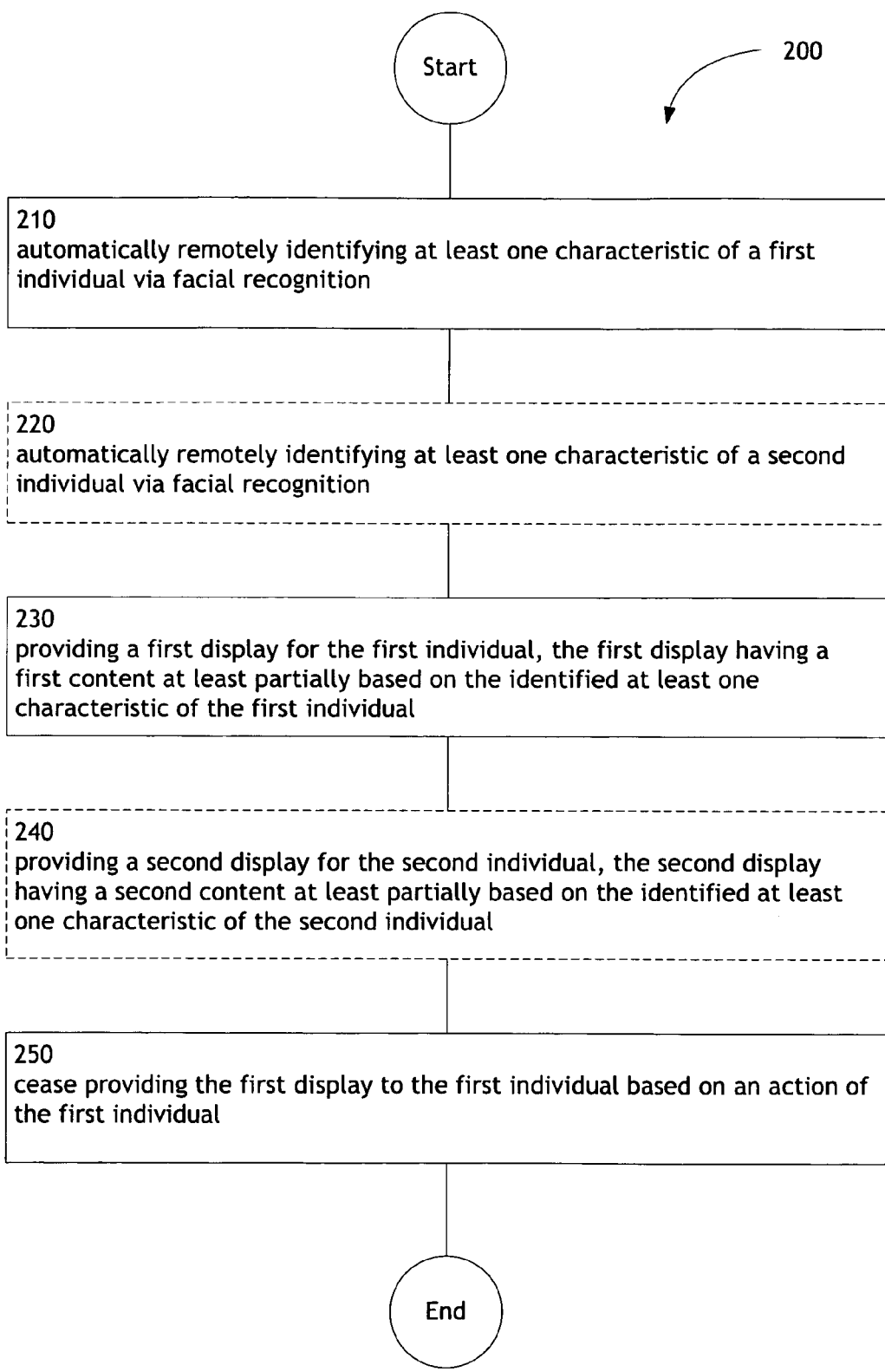
FIG. 2 illustrates an operational flow representing example operations related to automatically remotely identifying one or more characteristics of an individual utilizing facial recognition, providing a display for the individual having a content at least partially based on the one or more identified characteristics of the individual, and cease providing the display to the individual based on an action of the individual.

FIG. 2 illustrates an operational flow 200 representing example operations related to automatically remotely identifying one or more characteristics of an individual utilizing facial recognition and providing a display for the individual having a content at least partially based on the one or more identified characteristics of the individual. It should be understood that designations of "start" or "stop" in operational flow diagrams herein are not to be construed in a limiting fashion. Nothing herein is intended to convey that no other operations can be performed either or both prior to or following the operations depicted in the figures. In FIG. 2 and in following figures that include various examples of operational flows, discussion and explanation may be provided with respect to the above-described examples of FIGS. 1A through 1M, and/or with respect to other examples and contexts. However, it should be understood that the operational flows may be executed in a number of other environments and contexts, and/or in modified versions of FIGS. 1A through 1M. Also, although the various operational flows are presented in the sequence(s) illustrated, it should be understood that the various operations may be performed in other orders than those which are illustrated, or may be performed concurrently.

After a start operation, the operational flow 200 moves to an operation 210. Operation 210 depicts automatically remotely identifying at least one characteristic of a first individual via facial recognition. For example, as shown in FIGS. 1A through 1M, the facial recognition module 50 may be utilized to automatically remotely identify one or more characteristics of the first individual 52.

Then, operation 220 depicts automatically remotely identifying at least one characteristic of a second individual via facial recognition. For example, as shown in FIGS. 1A through 1M, the facial recognition module 50 may be utilized to automatically remotely identify one or more characteristics of the second individual 80.

Then, operation 230 depicts providing a first display for the first individual, the first display having a first content at least partially based on the identified at least one characteristic of the first individual. For example, as shown in FIGS. 1A through 1M, the first display module 54 may provide a first display 56 visible to the first individual 52, where the first display 56 has a content at least partially based on the one or more identified characteristics of the first individual 52.

Then, operation 240 depicts providing a second display for the second individual, the second display having a second content at least partially based on the identified at least one characteristic of the second individual. For example, as shown in FIGS. 1A through 1M, the second display module 82 may provide a second display 84 visible to the second individual 80, where the second display 84 has a content at least partially based on the one or more identified characteristics of the second individual 80.

Then, operation 250 depicts cease providing the first display to the first individual based on an action of the first individual. For example, as shown in FIGS. 1A through 1M, the first display module 54 may cease providing the first display 56 to the first individual 52 based on an action of the first individual 52 (e.g., when the first individual 52 moves from a first region 58 where the first display 56 is visible to the first individual 52 to a second region 60 where the first display 56 is not visible to the first individual 52). In an embodiment, the controller 132 may be coupled with the first display module 54. When the first individual 52 moves from the first region 58 to the second region 60, the controller 132 may signal the first display module 54 to cease providing the first display 56 to the first individual 52.

Figure 3:
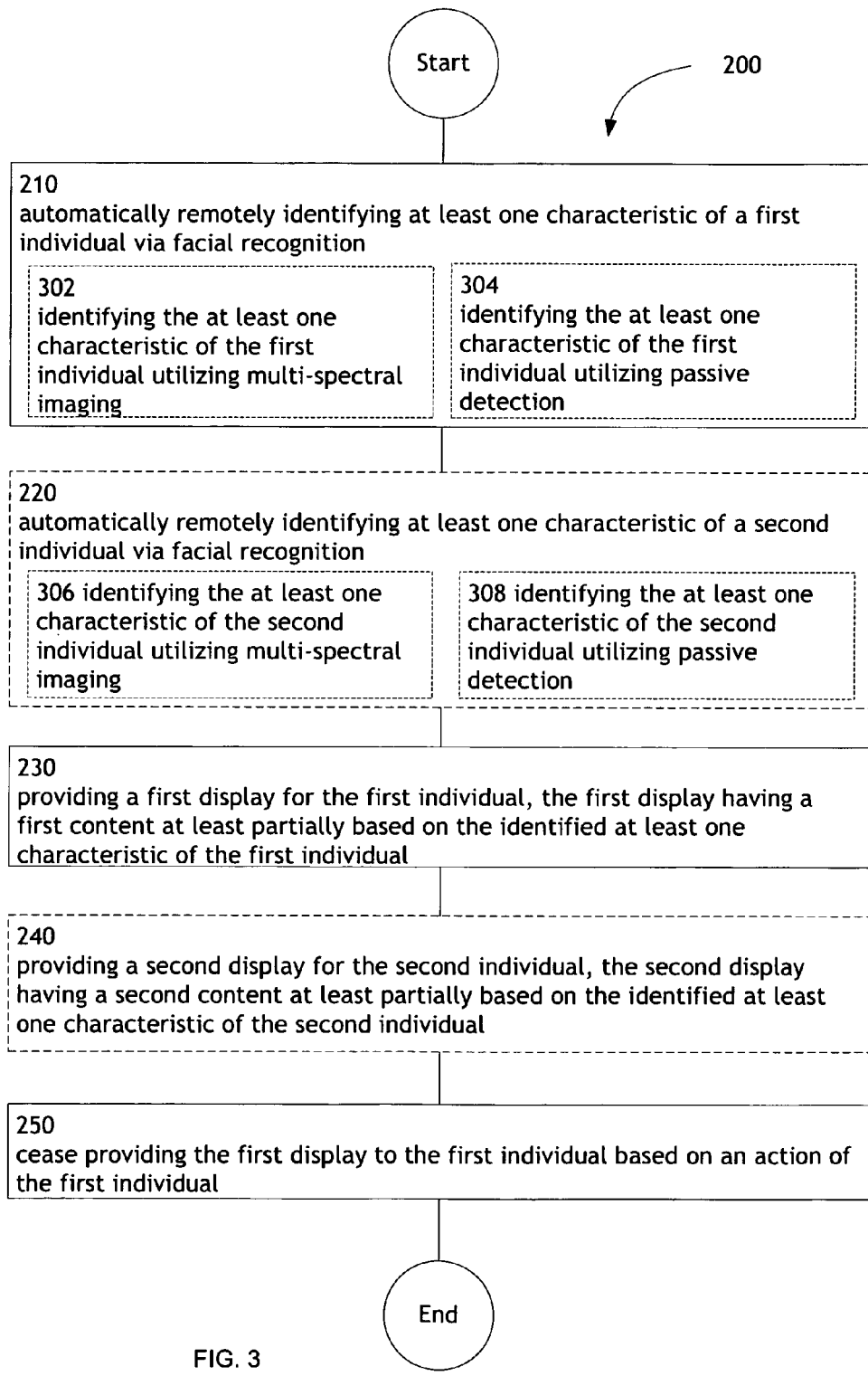
FIG. 3 illustrates an alternative embodiment of the operational flow of FIG. 2.

FIG. 3 illustrates alternative embodiments of the example operational flow 200 of FIG. 2. FIG. 3 illustrates example embodiments where the operations 210 and 220 may include at least one additional operation. Additional operations may include an operation 302, an operation 304, an operation 306, and/or an operation 308.

The operations 302 and 306 illustrate identifying the at least one characteristic of the first individual or the at least one characteristic of the second individual utilizing multi-spectral imaging. For example, as shown in FIGS. 1A through 1M, the facial recognition module 50 may utilize multi-spectral imaging to identify one or more characteristics of the first individual 52 or the second individual 80.

The operations 304 and 308 illustrate identifying the at least one characteristic of the first individual or the at least one characteristic of the second individual utilizing passive detection. For example, as shown in FIGS. 1A through 1M, the facial recognition module 50 may utilize passive detection to identify one or more characteristics of the first individual 52 or the second individual 80.

Figure 4:
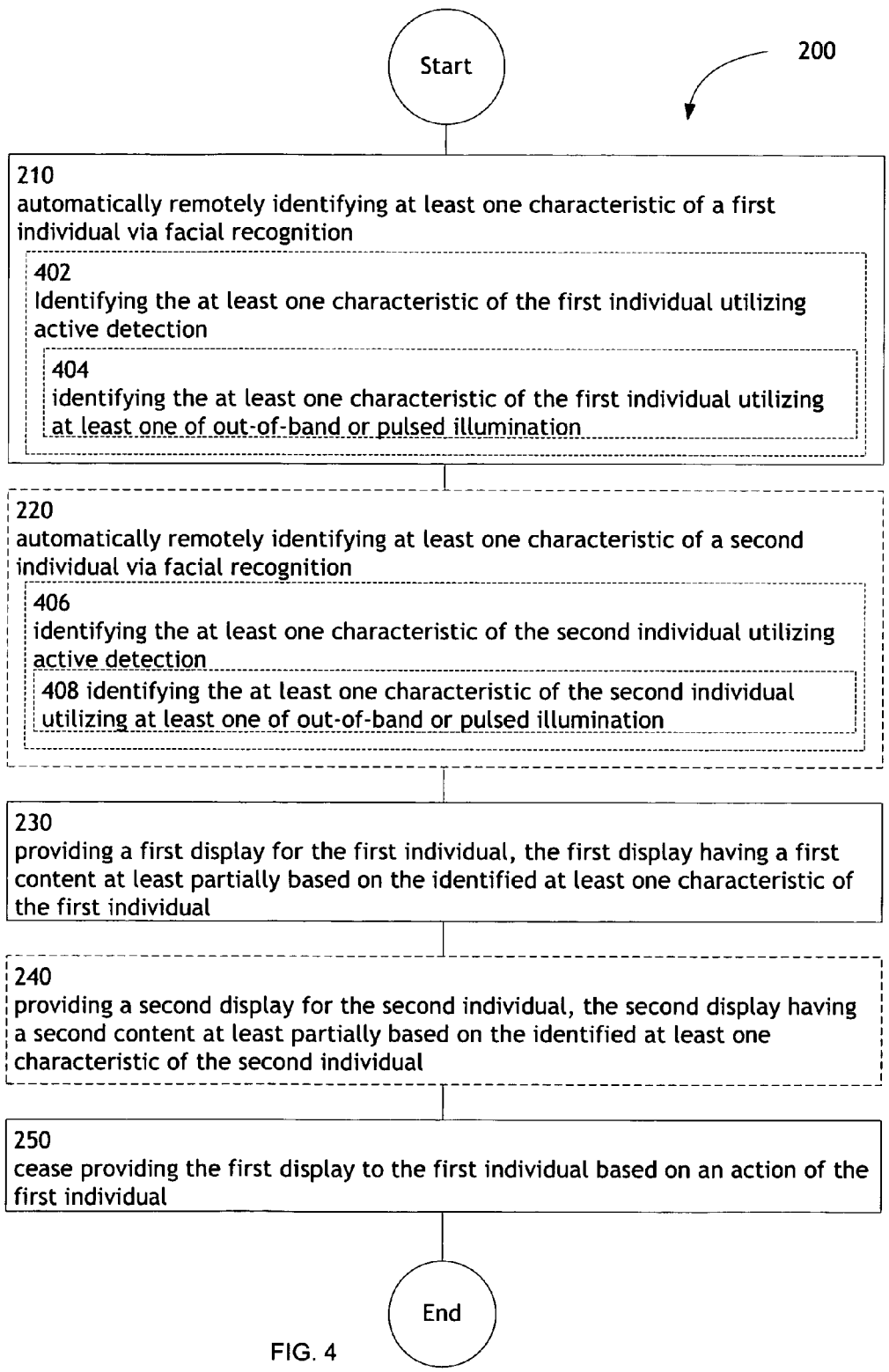
FIG. 4 illustrates an alternative embodiment of the operational flow of FIG. 2.

FIG. 4 illustrates alternative embodiments of the example operational flow 200 of FIG. 2. FIG. 4 illustrates example embodiments where the operations 210 and 220 may include at least one additional operation. Additional operations may include an operation 402, an operation 404, an operation 406, and/or an operation 408.

The operations 402 and 406 illustrate identifying the at least one characteristic of the first individual or the at least one characteristic of the second individual utilizing active detection. For example, as shown in FIGS. 1A through 1M, the facial recognition module 50 may utilize active detection to identify one or more characteristics of the first individual 52 or the second individual 80. In an embodiment, the facial recognition module 50 may include an illumination source 134 for actively illuminating the first individual 52 or the second individual 80. Further, the operations 404 and 408 illustrate identifying the at least one characteristic of the first individual or the at least one characteristic of the second individual utilizing at least one of out-of-band or pulsed illumination. For example, as shown in FIGS. 1A through 1M, the facial recognition module 50 may utilize out-of-band illumination to identify one or more characteristics of the first individual 52 or the second individual 80. Alternatively, the facial recognition module 50 may utilize pulsed illumination to identify one or more characteristics of the first individual 52 or the second individual 80. In an embodiment, the illumination source 134 may illuminate the first individual 52 or the second individual 80 utilizing out-of-band illumination (e.g., utilizing a radiation source providing non-visible illumination, such as infrared light).

Figure 5:
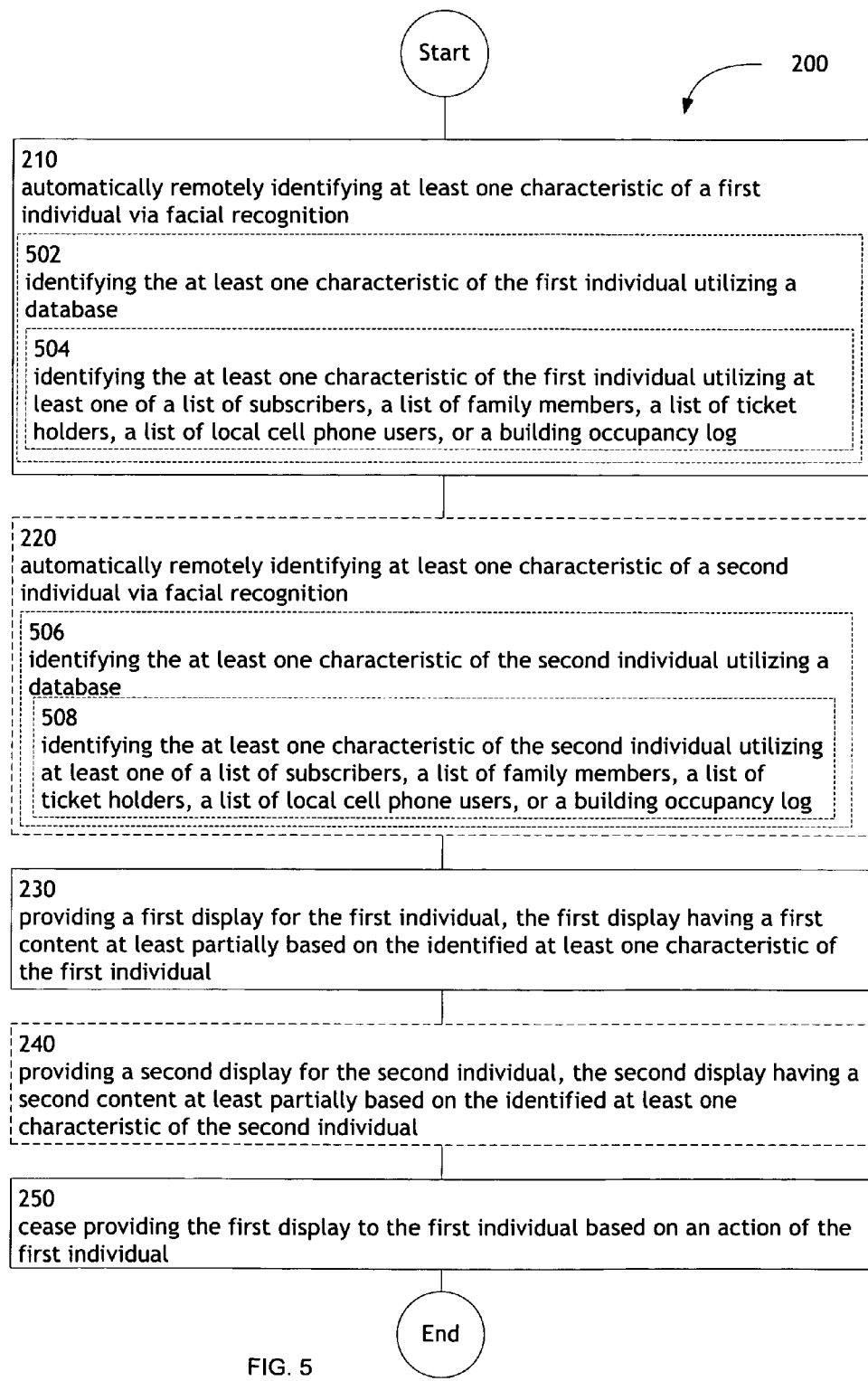
FIG. 5 illustrates an alternative embodiment of the operational flow of FIG. 2.

FIG. 5 illustrates alternative embodiments of the example operational flow 200 of FIG. 2. FIG. 5 illustrates example embodiments where the operations 210 and 220 may include at least one additional operation. Additional operations may include an operation 502, an operation 504, an operation 506, and/or an operation 508.

The operations 502 and 506 illustrate identifying the at least one characteristic of the first individual or the at least one characteristic of the second individual utilizing a database. For example, as shown in FIGS. 1 through 1M, the facial recognition module 50 may include a database 108 (e.g., a collection of records or data stored in a computer system). The information stored in the database 108 may be utilized to identify one or more characteristics of the first individual 52 or the second individual 80. Further, the operations 504 and 508 illustrate identifying the at least one characteristic of the first individual or the at least one characteristic of the second individual utilizing at least one of a list of subscribers, a list of family members, a list of ticket holders, a list of local cell phone users, or a building occupancy log. For example, as shown in FIGS. 1A through 1M, the database 108 may include information such as, but not limited to, a list of subscribers 110, a list of family members 112, a list of ticket holders 114, a list of local cell phone users 116, or a building occupancy log 118, which may be utilized to identify one or more characteristics of the first individual 52 or the second individual 80.

Figure 6:
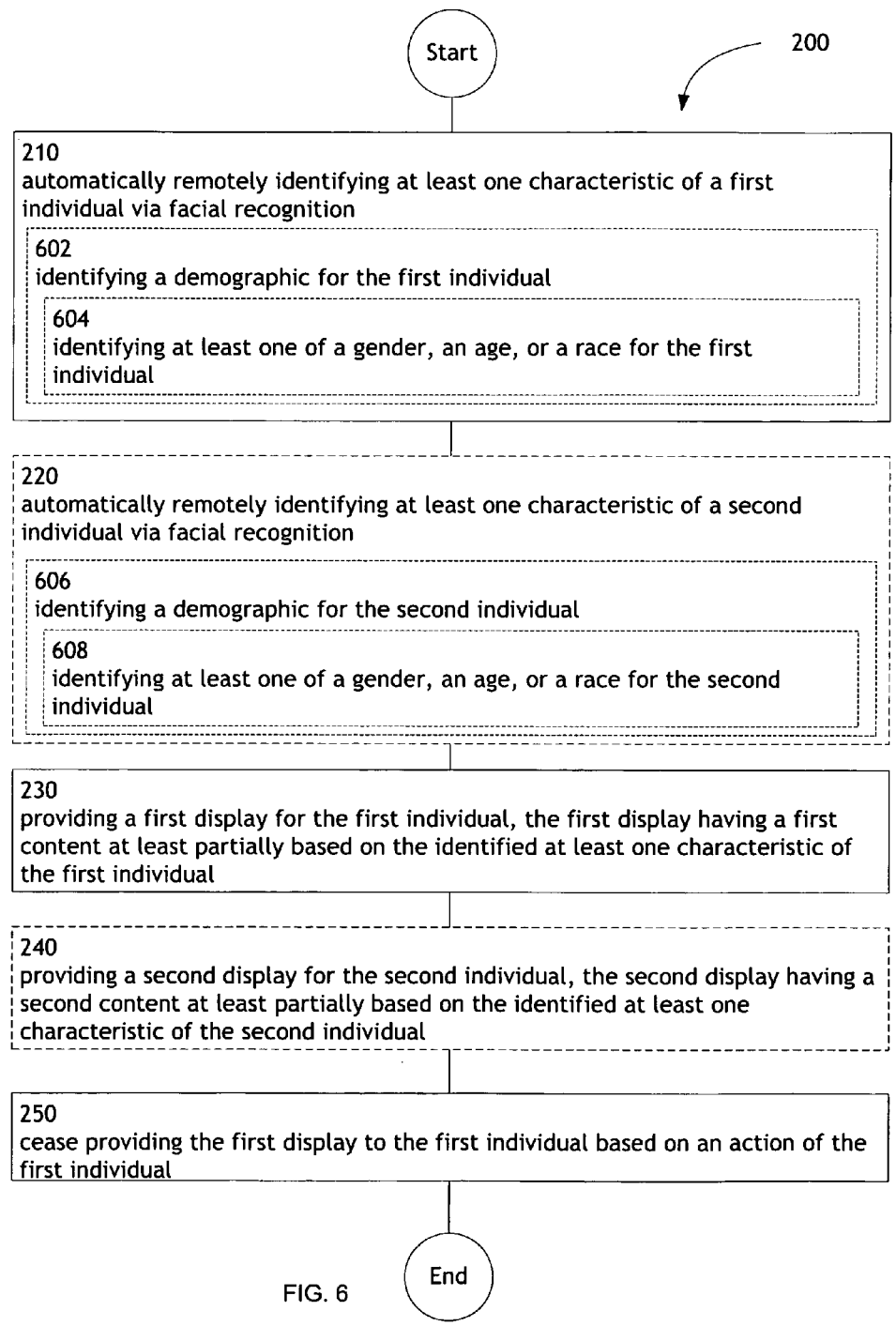
FIG. 6 illustrates an alternative embodiment of the operational flow of FIG. 2.

FIG. 6 illustrates alternative embodiments of the example operational flow 200 of FIG. 2. FIG. 6 illustrates example embodiments where the operations 210 and 220 may include at least one additional operation. Additional operations may include an operation 602, an operation 604, an operation 606, and/or an operation 608.

The operations 602 and 606 illustrate identifying a demographic for at least one of the first individual or the second individual. For example, as shown in FIGS. 1A through 1M, the facial recognition module 50 may identify one or more characteristics of the first individual 52 or the second individual 80. The facial recognition module 50 may identify a demographic for the first individual 52 or the second individual 80 (e.g., utilizing one or more identified characteristics of the first individual 52 or the second individual 80). Further, the operations 604 and 608 illustrate identifying at least one of a gender, an age, or a race for at least one of the first individual or the second individual. For example, as shown in FIGS. 1A through 1M, the facial recognition module 50 may identify an age for the first individual 52 or the second individual 80. In an embodiment, the processor 124 may utilize one or more algorithms to identify an age for the first individual 52 or the second individual 80. For example, the image capture device 120 may capture an image of the first individual 52 and the processor 124 may utilize an algorithm to examine one or more facial characteristics for the first individual 52, which may then be utilized to calculate an actual or approximate age for the first individual 52. Facial characteristics may include the size or placement of facial features, wrinkles, or an amount of hair.

Figure 7:
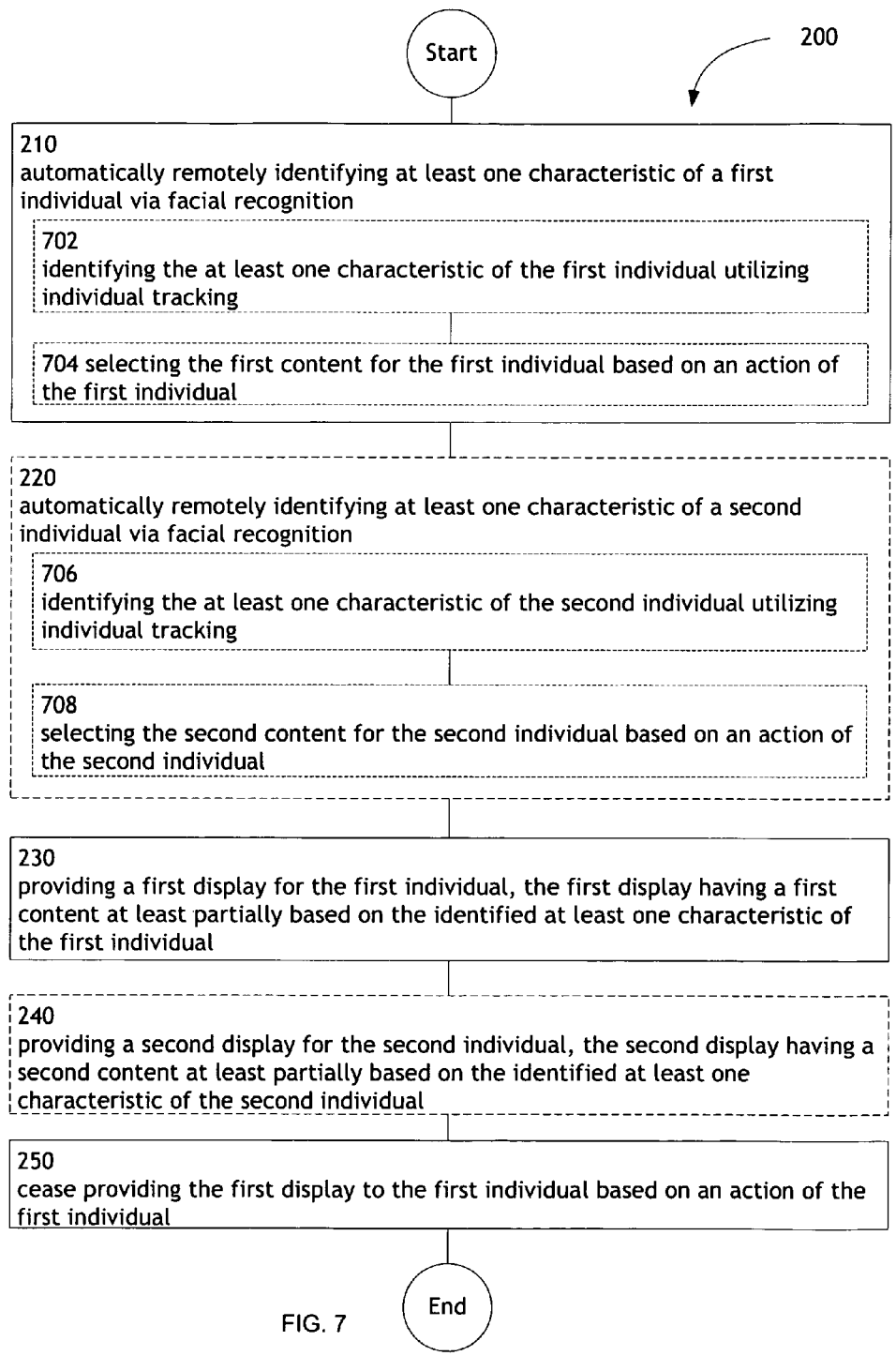
FIG. 7 illustrates an alternative embodiment of the operational flow of FIG. 2.

FIG. 7 illustrates alternative embodiments of the example operational flow 200 of FIG. 2. FIG. 7 illustrates example embodiments where the operations 210 and 220 may include at least one additional operation. Additional operations may include an operation 702, an operation 704, an operation 706, and/or an operation 708.

The operations 702 and 706 illustrate identifying the at least one characteristic of the first individual or the at least one characteristic of the second individual utilizing individual tracking. For example, as shown in FIGS. 1A through 1M, the facial recognition module 50 may utilize individual tracking to identify one or more characteristics of the first individual 52 or the second individual 80. Further, the operations 704 and 708 illustrate selecting at least one of the first content for the first individual or the second content for the second individual based on an action of at least one of the first individual or the second individual. For example, as shown in FIGS. 1A through 1M, content may be selected for the first individual 52 or the second individual 80 based on an action of the first individual 52 or the second individual 80.

Figure 8A:
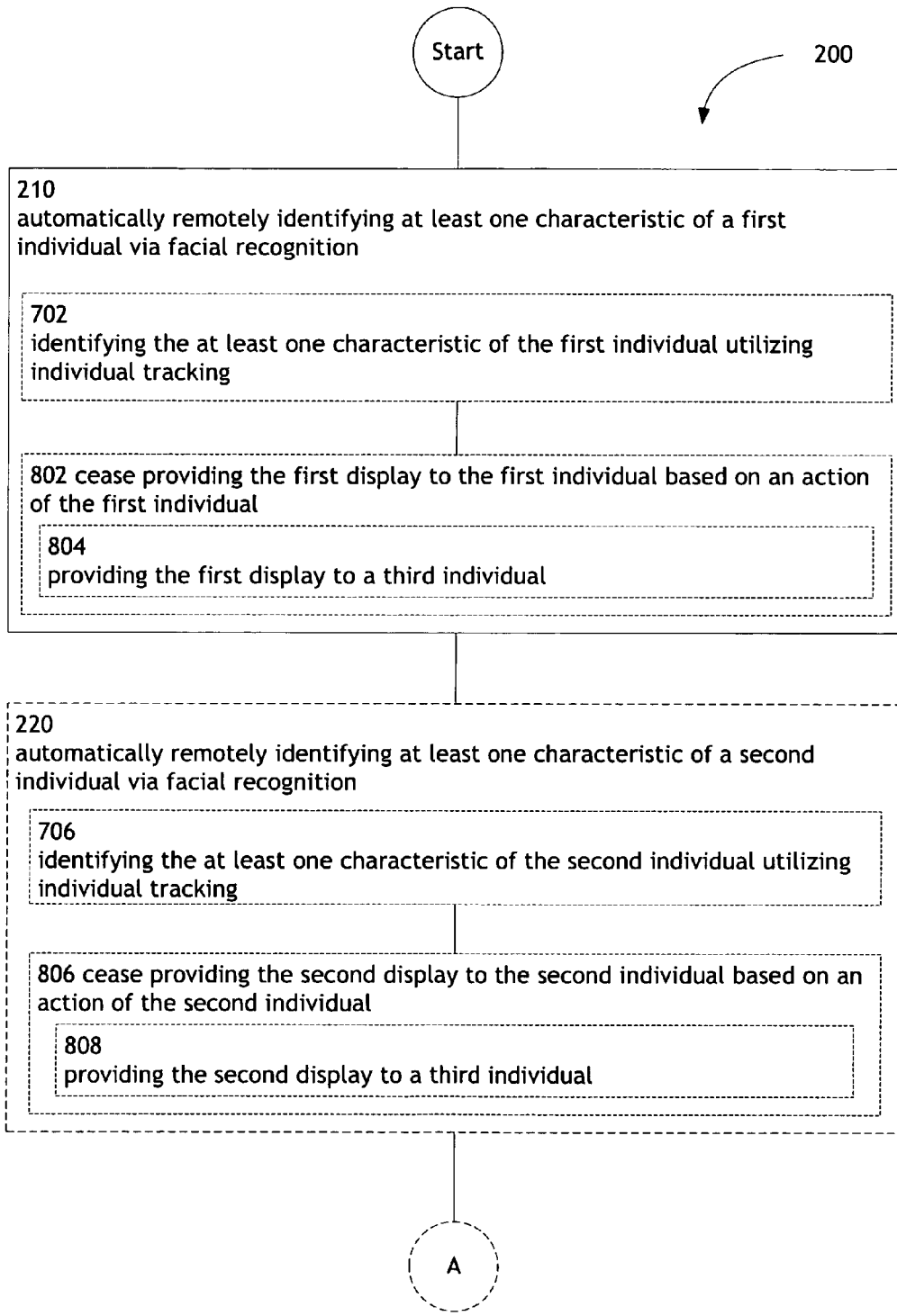
FIG. 8 illustrates an alternative embodiment of the operational flow of FIG. 2.
Figure 8B:
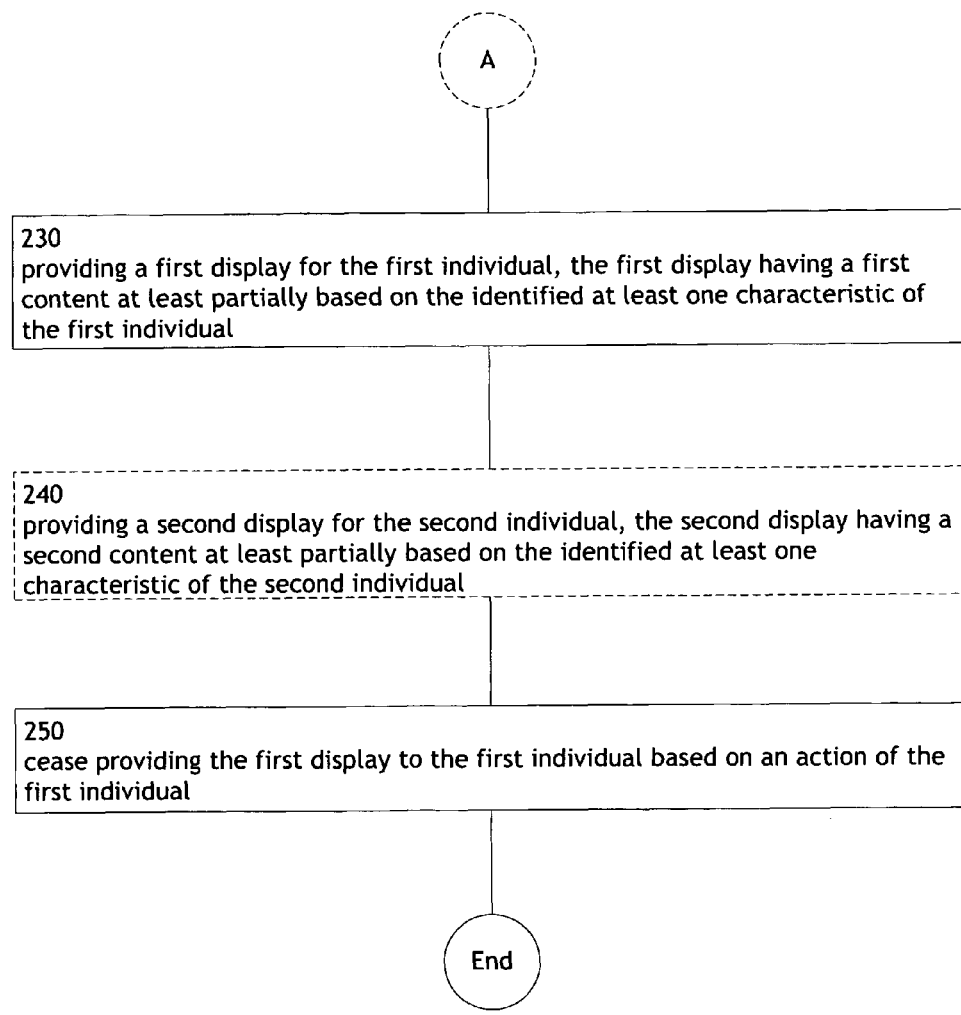

FIG. 8 illustrates alternative embodiments of the example operational flow 200 of FIG. 2. FIG. 8 illustrates example embodiments where the operations 210 and 220 may include at least one additional operation. Additional operations may include an operation 802, an operation 804, an operation 806, and/or an operation 808. Further, the operations 802 and 806 illustrate cease providing at least one of the first display to the first individual or the second display to the second individual based on an action of at least one of the first individual or the second individual. For example, as shown in FIGS. 1A through 1M, the first display module 54 may cease providing the first display 56 to the first individual 52 based on an action of the first individual 52. Alternatively, the second display module 82 may cease providing the second display 84 to the second individual 80 based on an action of the second individual 80. Further, the operations 804 and 808 illustrate providing at least one of the first display or the second display to a third individual. For example, as shown in FIGS. 1A through 1M, the first display module 54 or the second display module 82 may be utilized to provide the first display 56 or the second display 84 to the third individual 86.

Figure 9:
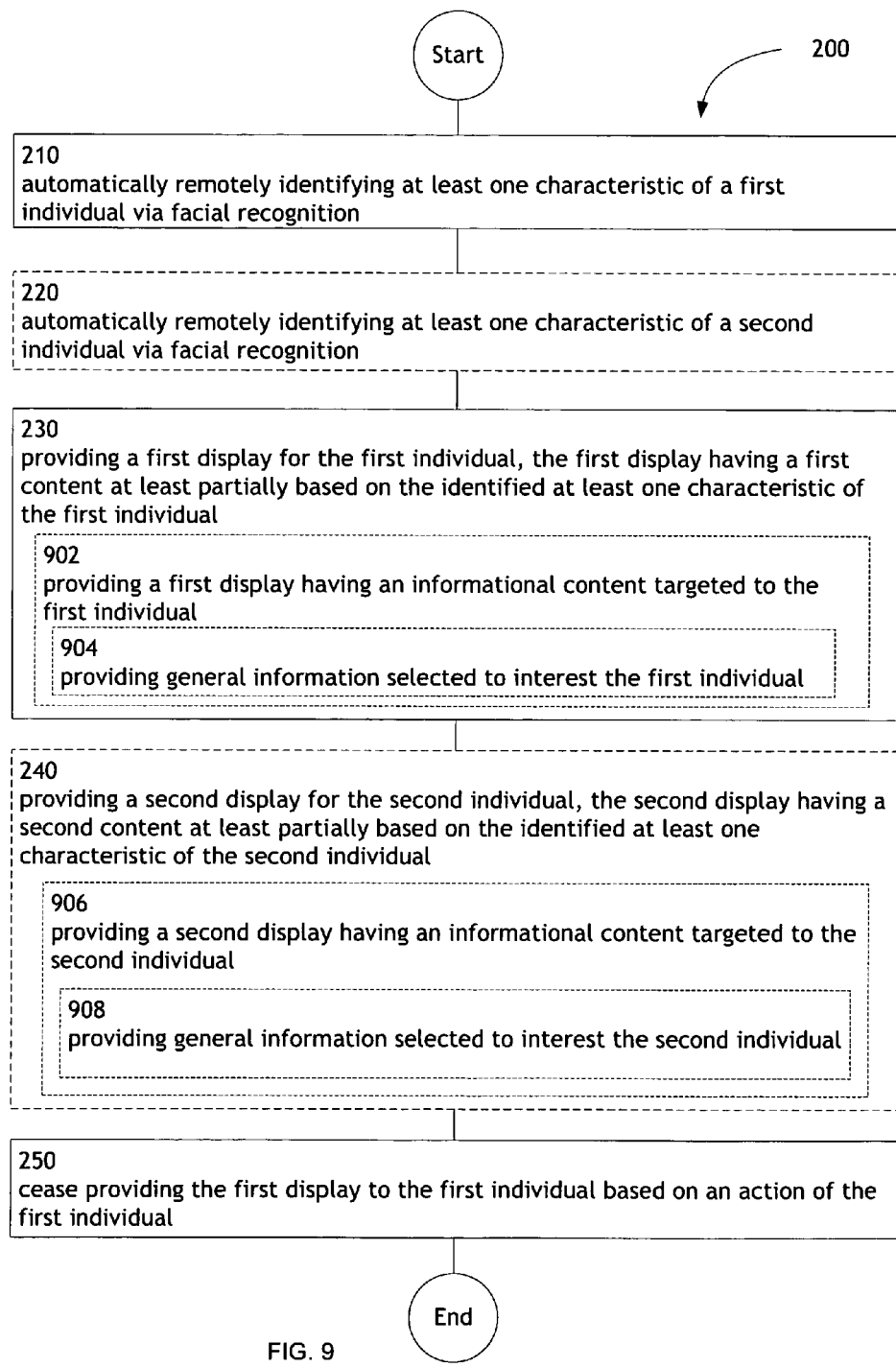
FIG. 9 illustrates an alternative embodiment of the operational flow of FIG. 2.

FIG. 9 illustrates alternative embodiments of the example operational flow 200 of FIG. 2. FIG. 9 illustrates example embodiments where the operations 230 and 240 may include at least one additional operation. Additional operations may include an operation 902, an operation 904, an operation 906, and/or an operation 908.

The operations 902 and 906 illustrate providing at least one of a first display having an informational content targeted to the first individual or a second display having an informational content targeted to the second individual. For example, as shown in FIGS. 1A through 1M, the first display 56 provided to the first individual 52 or the second display 84 provided to the second individual 80 may include an informational content targeted to the first individual 52 or the second individual 80 (e.g., targeted advertising content). Further, the operations 904 and 908 illustrate providing general information selected to interest at least one of the first individual or the second individual. For example, as shown in FIGS. 1A through 1M, the first display 56 may include general information selected to interest the first individual 52 (e.g., advertising content regarding a family of products). Alternatively, the second display 84 may include general information selected to interest the second individual 80.

Figure 10A:
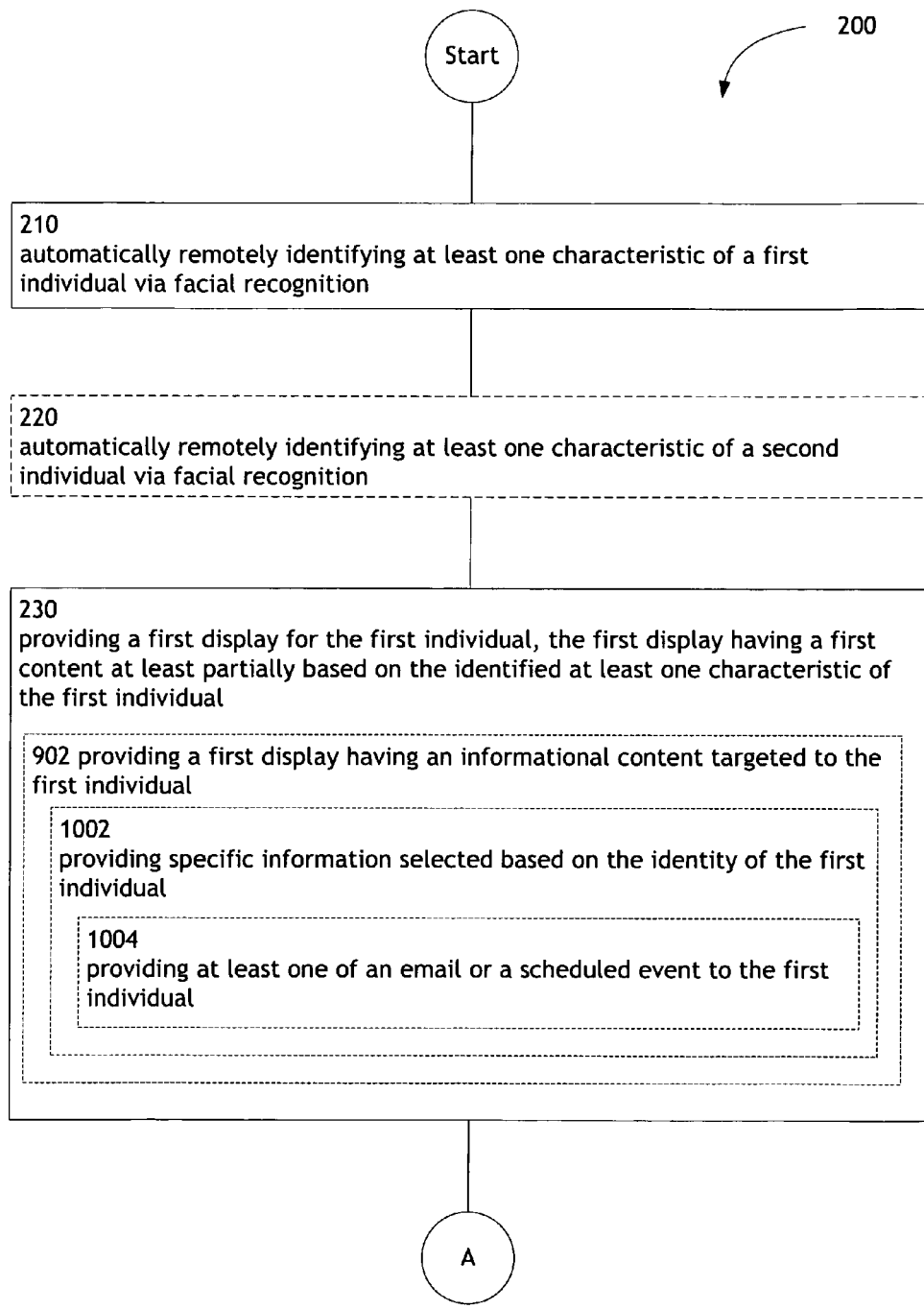
FIG. 10 illustrates an alternative embodiment of the operational flow of FIG. 2.
Figure 10B:
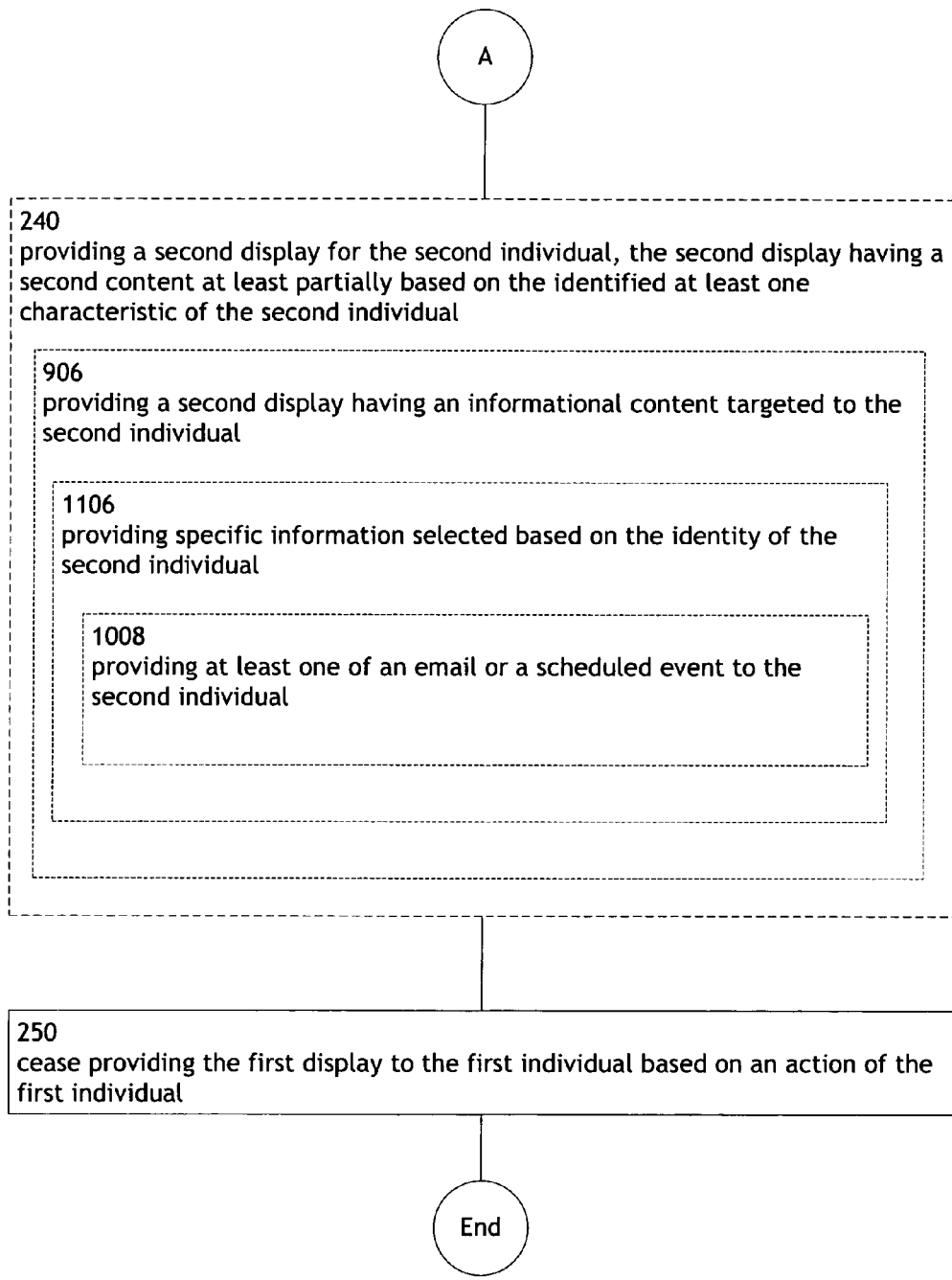

FIG. 10 illustrates alternative embodiments of the example operational flow 200 of FIG. 2. FIG. 10 illustrates example embodiments where the operations 230 and 240 may include at least one additional operation. Additional operations may include an operation 1002, an operation 1004, an operation 1006, and/or an operation 1008. Further, the operations 1002 and 1006 illustrate providing specific information selected based on the identity of at least one of the first individual or the second individual. For example, as shown in FIGS. 1A through 1M, the first display 56 provided to the first individual 52 or the second display 84 provided to the second individual 80 may include an informational content targeted to the first individual 52 or the second individual 80. The informational content may include specific information selected based on the identity of the first individual 52 or the second individual 80 (e.g., advertising content regarding a specific product). Further, the operations 1004 and 1008 illustrate providing at least one of an email or a scheduled event to at least one of the first individual or the second individual. For example, as shown in FIGS. 1A through 1M, the informational content may include a scheduled event for the first individual 52 or the second individual 80.

Figure 11:
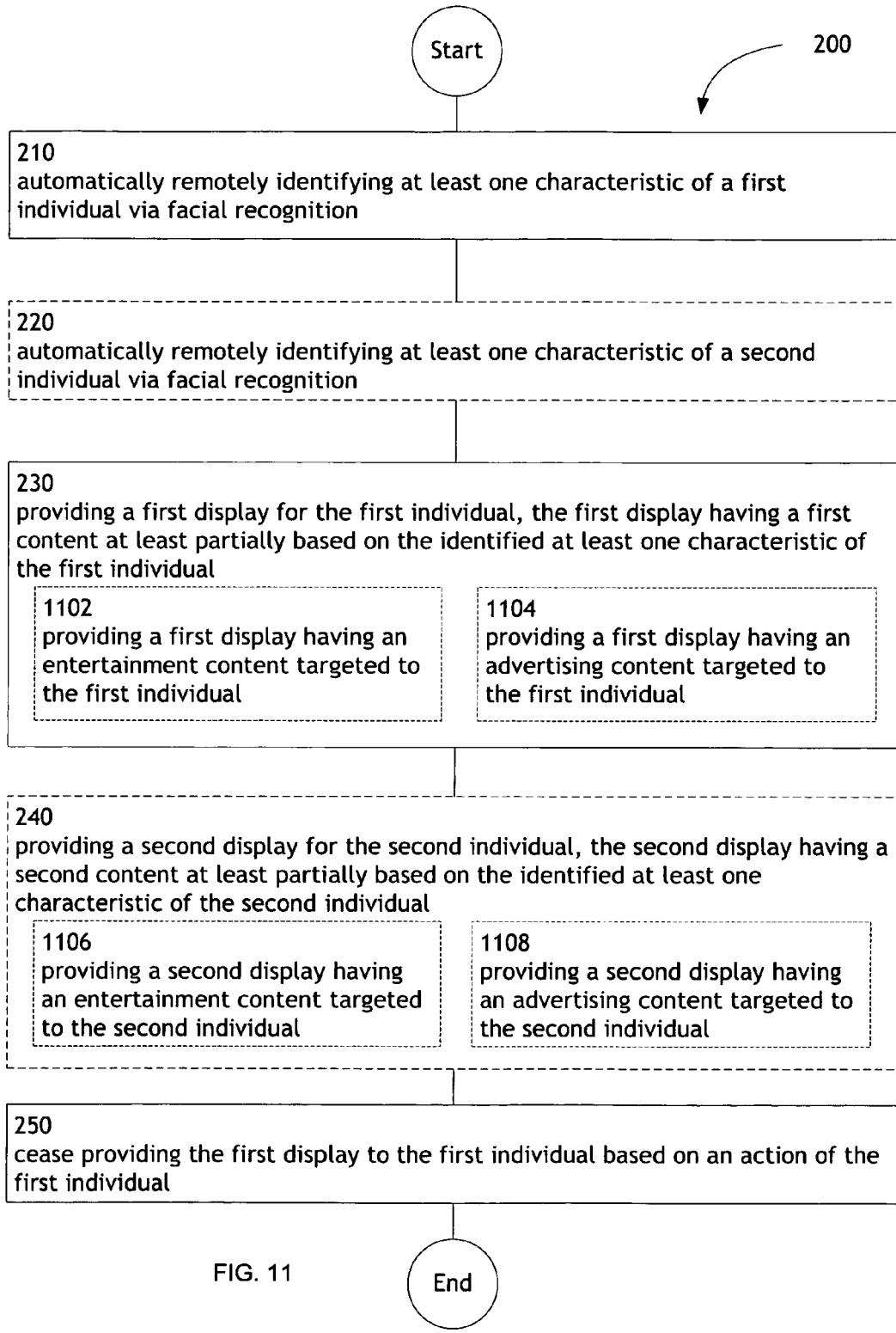
FIG. 11 illustrates an alternative embodiment of the operational flow of FIG. 2.

FIG. 11 illustrates alternative embodiments of the example operational flow 200 of FIG. 2. FIG. 11 illustrates example embodiments where the operations 230 and 240 may include at least one additional operation. Additional operations may include an operation 1102, an operation 1104, an operation 1106, and/or an operation 1108.

The operations 1102 and 1106 illustrate providing at least one of a first display having an entertainment content targeted to the first individual or a second display having an entertainment content targeted to the second individual. For example, as shown in FIGS. 1A through 1M, the first display 56 provided to the first individual 52 or the second display 84 provided to the second individual 80 may include an entertainment content targeted to the first individual 52 or the second individual 80.

The operations 1104 and 1108 illustrate providing at least one of a first display having an advertising content targeted to the first individual or a second display having an advertising content targeted to the second individual. For example, as shown in FIGS. 1A through 1M, the first display 56 provided to the first individual 52 or the second display 84 provided to the second individual 80 may include an advertising content targeted to the first individual 52 or the second individual 80. In an embodiment, the controller 132 may be coupled with the first display module 54 and configured for providing advertising content targeted to the first individual 52 via the first display module 54.

Figure 12:
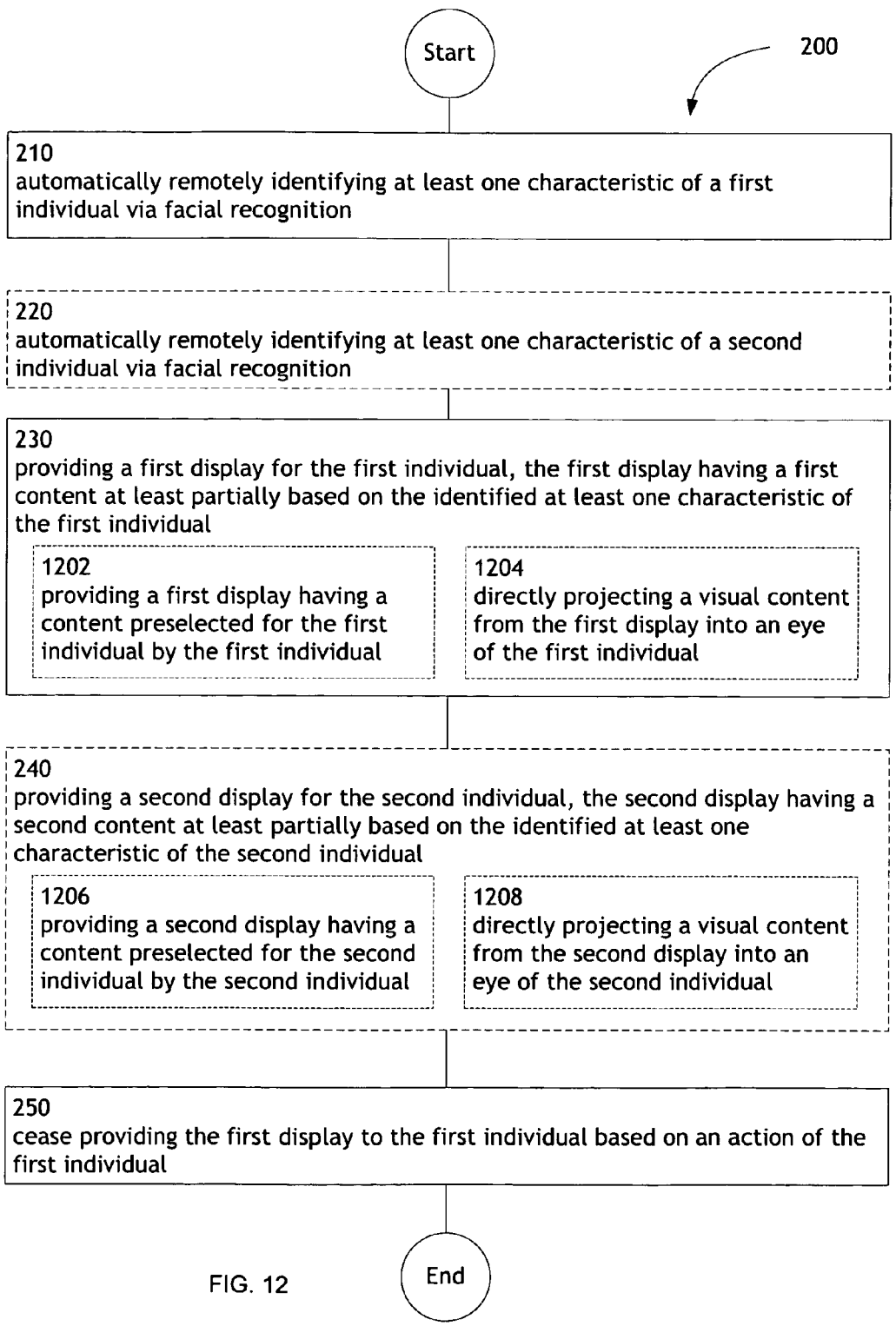
FIG. 12 illustrates an alternative embodiment of the operational flow of FIG. 2.

FIG. 12 illustrates alternative embodiments of the example operational flow 200 of FIG. 2. FIG. 12 illustrates example embodiments where the operations 230 and 240 may include at least one additional operation. Additional operations may include an operation 1202, an operation 1204, an operation 1206, and/or an operation 1208.

The operations 1202 and 1206 illustrate providing at least one of a first display having a content preselected for the first individual by the first individual or a second display having a content preselected for the second individual by the second individual. For example, as shown in FIGS. 1A through 1M, the first display 56 provided to the first individual 52 or the second display 84 provided to the second individual 80 may include a content preselected for the first individual 52 by the first individual 52 or a content preselected for the second individual 80 by the second individual 80.

The operations 1204 and 1208 illustrate directly projecting at least one of a visual content from the first display into an eye of the first individual or a visual content from the second display into an eye of the second individual. For example, as shown in FIGS. 1A through 1M, the first display 56 provided to the first individual 52 or the second display 84 provided to the second individual 80 may include a visual content directly projected into an eye of the first individual 52 or a visual content directly projected into any eye of the second individual 80.

Figure 13:
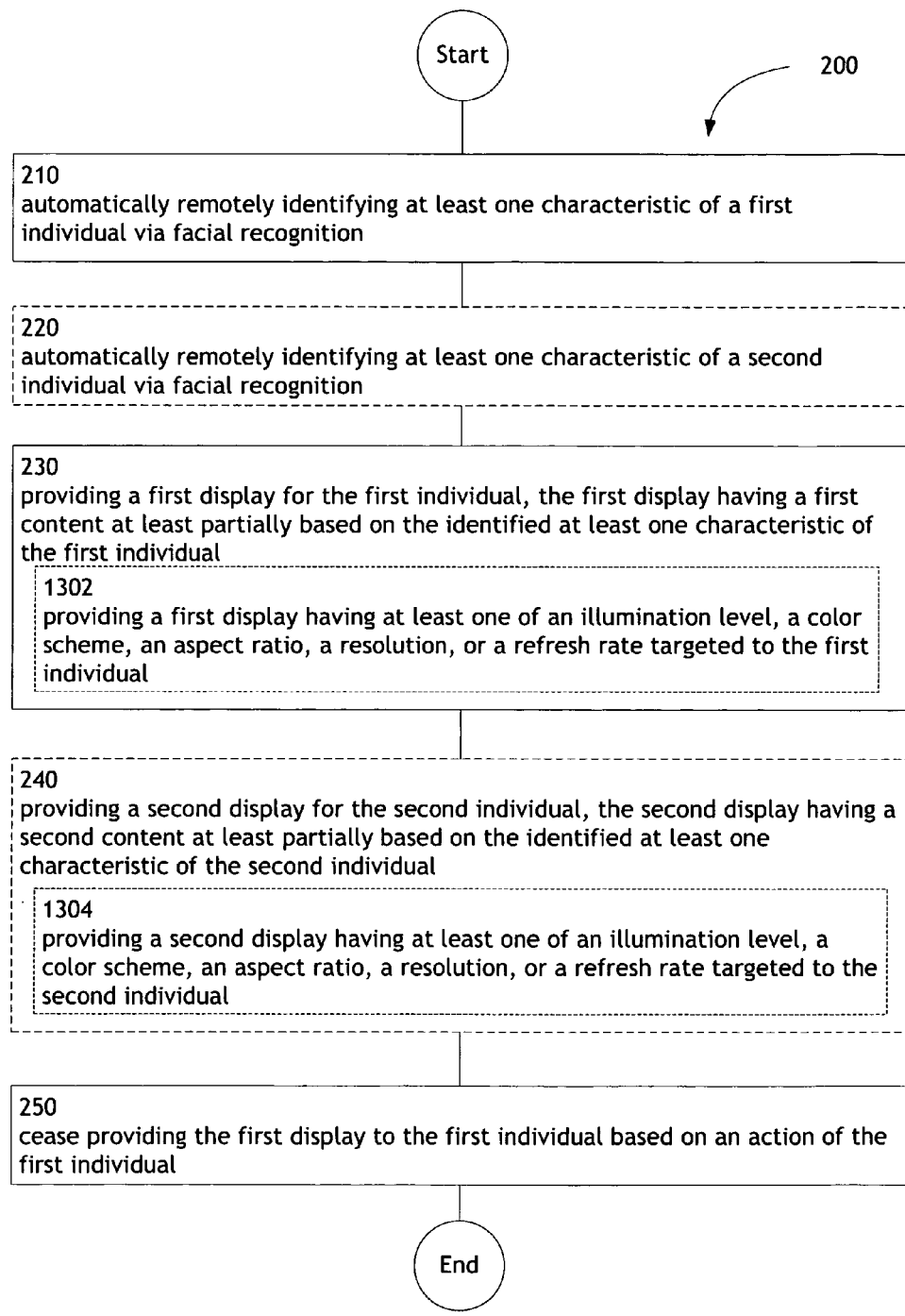
FIG. 13 illustrates an alternative embodiment of the operational flow of FIG. 2.

FIG. 13 illustrates alternative embodiments of the example operational flow 200 of FIG. 2. FIG. 13 illustrates example embodiments where the operations 230 and 240 may include at least one additional operation. Additional operations may include an operation 1302 and/or an operation 1304.

The operations 1302 and 1304 illustrate providing at least one of a first display or a second display having at least one of an illumination level, a color scheme, an aspect ratio, a resolution, or a refresh rate targeted to at least one of the first individual or the second individual. For example, as shown in FIGS. 1A through 1M, the first display 56 provided to the first individual 52 or the second display 84 provided to the second individual 80 may have a color scheme targeted to the first individual 52 or the second individual 80. In an embodiment, the controller 132 coupled with the first display module 54 may be utilized to target the first individual 52 with a color scheme targeted to the first individual 52.

Figure 14:
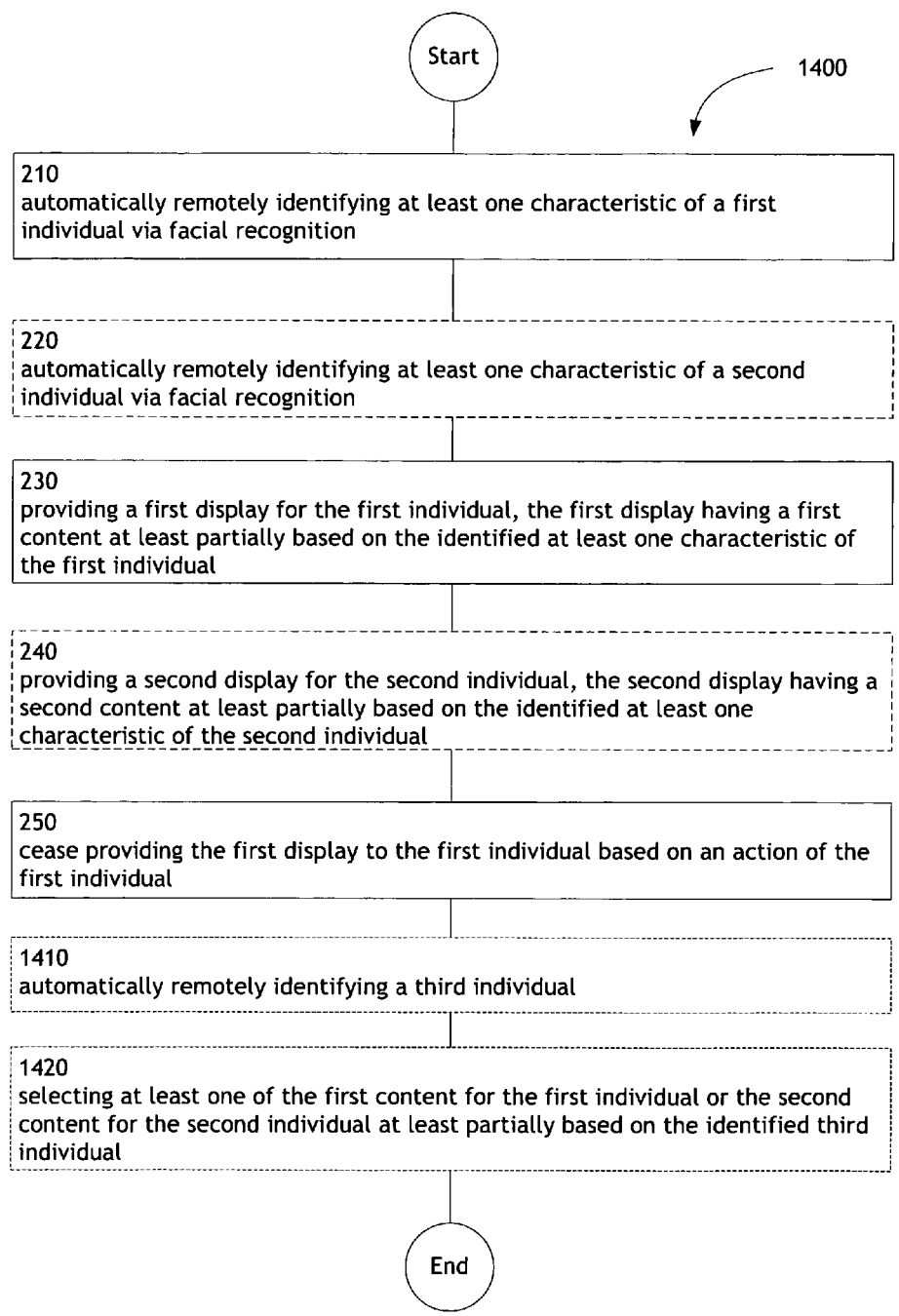
FIG. 14 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, automatically remotely identifying a third individual, and selecting the content for the first individual at least partially based on the identified third individual.

FIG. 14 illustrates an operational flow 1400 representing example operations related to automatically remotely identifying one or more characteristics of an individual utilizing facial recognition and providing a display for the individual having a content at least partially based on the one or more identified characteristics of the individual. FIG. 14 illustrates an example embodiment where the example operational flow 200 of FIG. 2 may include at least one additional operation. Additional operations may include an operation 1410, and/or an operation 1420.

After a start operation, an operation 210, an operation 220, an operation 230, an operation 240, and an operation 250, the operational flow 1400 moves to an operation 1410. Operation 1410 illustrates automatically remotely identifying a third individual. For example, as shown in FIGS. 1A through 1M, the facial recognition module 50 may automatically remotely identify a third individual 86.

Then, operation 1420 illustrates selecting at least one of the first content for the first individual or the second content for the second individual at least partially based on the identified third individual. For example, as shown in FIGS. 1A through 1M, the first content selected for the first individual 52 or the second content selected for the second individual 80 may be selected at least partially based on the third individual 86.

Figure 15A:
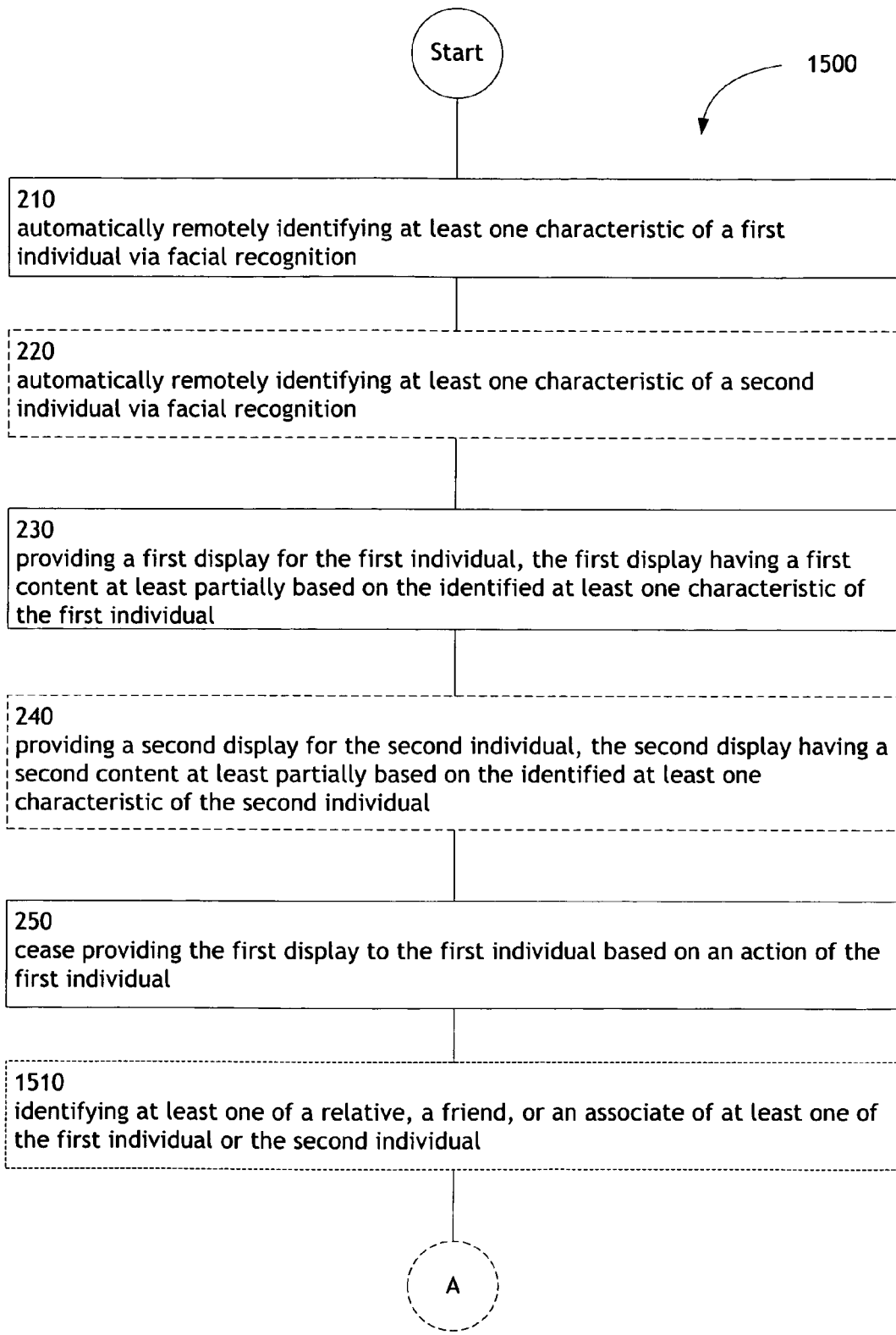
FIG. 15 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, identifying at least one of a relative, a friend, or an associate of the individual, and selecting the content for the individual at least partially based on the identity of the at least one of the relative, the friend, or the associate of the individual.

FIG. 15 illustrates an operational flow 1500 representing example operations related to automatically remotely identifying one or more characteristics of an individual utilizing facial recognition and providing a display for the individual having a content at least partially based on the one or more identified characteristics of the individual. FIG. 15 illustrates an example embodiment where the example operational flow 200 of FIG. 2 may include at least one additional operation. Additional operations may include an operation 1510, an operation 1520, an operation 1522, and/or an operation 1524.

After a start operation, an operation 210, an operation 220, an operation 230, an operation 240, and an operation 250, the operational flow 1500 moves to an operation 1510. Operation 1510 illustrates identifying at least one of a relative, a friend, or an associate of at least one of the first individual or the second individual. For example, as shown in FIGS. 1A through 1M, the list of family members 112 stored in the database 108 may be utilized to identify a relative of the first individual 52 or the second individual 80. In an embodiment, the mother of the first individual 52 may be identified utilizing the database 108, and the content of the first display 56 may be tailored to the first individual 52 accordingly (e.g., a recorded or simulated image of the individual's mother may suggest that the first individual 52 brush her teeth utilizing a certain brand of toothpaste).

Then, operation 1520 illustrates selecting at least one of the first content for the first individual or the second content for the second individual at least partially based on the identity of the at least one of the relative, the friend, or the associate of the at least one of the first individual or the second individual. For example, as shown in FIGS. 1A through 1M, the first content for the first individual 52 or the second content for the second individual 80 may be selected at least partially based on the identified relative of the first individual 52 or the second individual 80.

The operation 1522 illustrates selecting at least one of the first content for the first individual or the second content for the second individual at least partially based on a known characteristic of the at least one of the relative, the friend, or the associate of the at least one of the first individual or the second individual. For example, as shown in FIGS. 1A through 1M, the database 108 may be utilized to identify a known characteristic of the identified relative of the first individual 52 or the second individual 80. Additionally, the first content for the first individual 52 or the second content for the second individual 80 may be selected at least partially based on the known characteristic of the identified relative of the first individual 52 or the second individual 80. Further, the operation 1524 illustrates selecting at least one of the first content for the first individual or the second content for the second individual at least partially based on a facial characteristic of the at least one of the relative, the friend, or the associate of the at least one of the first individual or the second individual. For example, as shown in FIGS. 1A through 1M, the database 108 may be utilized to identify a facial characteristic of the identified relative of the first individual 52 or the second individual 80. Additionally, the first content for the first individual 52 or the second content for the second individual 80 may be selected at least partially based on the facial characteristic of the identified relative of the first individual 52 or the second individual 80.

Figure 16:
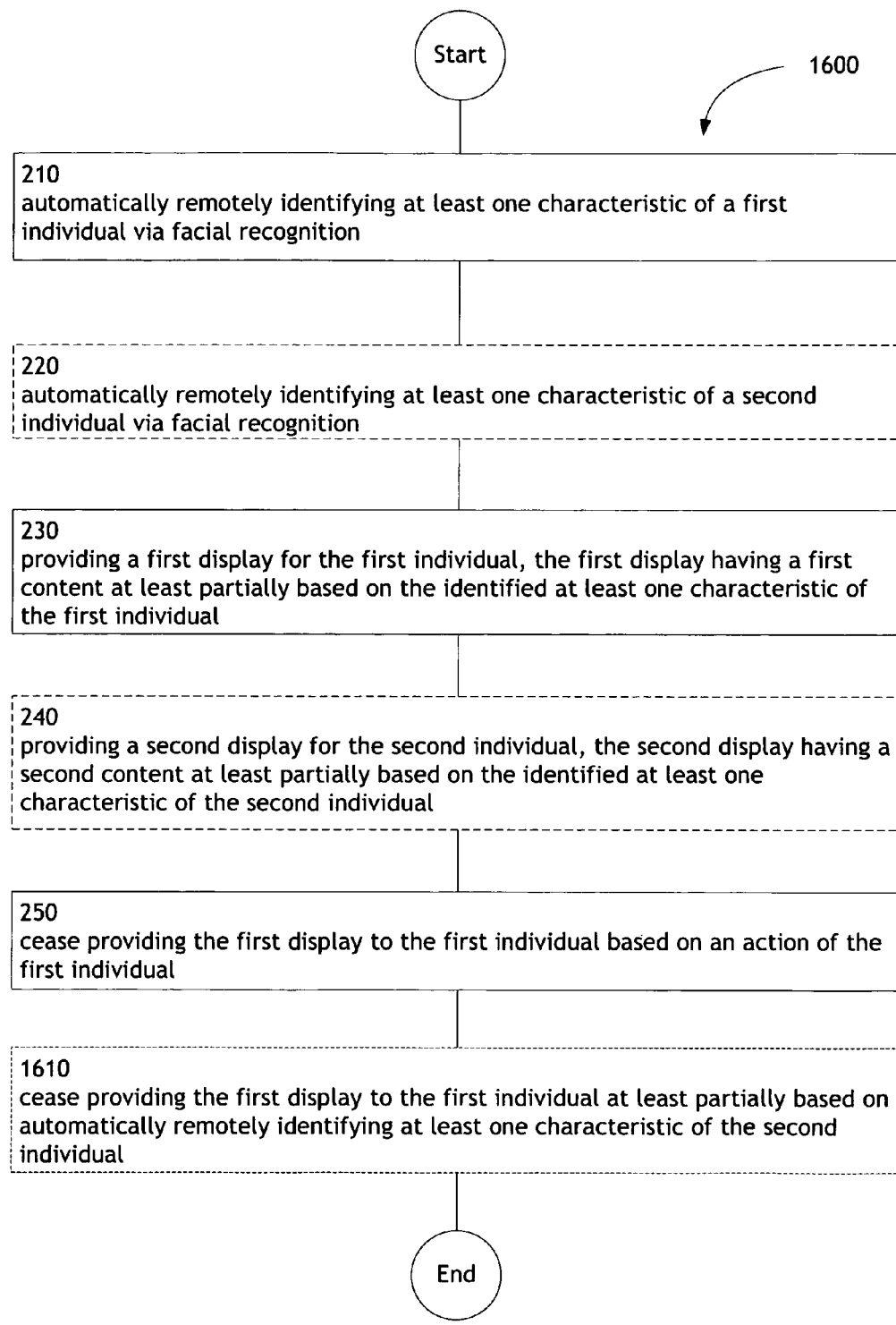
FIG. 16 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, and cease providing the display to the first individual at least partially based on automatically remotely identifying at least one characteristic of a second individual.

FIG. 16 illustrates an operational flow 1600 representing example operations related to automatically remotely identifying one or more characteristics of an individual utilizing facial recognition and providing a display for the individual having a content at least partially based on the one or more identified characteristics of the individual. FIG. 16 illustrates an example embodiment where the example operational flow 200 of FIG. 2 may include at least one additional operation. Additional operations may include an operation 1610.

After a start operation, an operation 210, an operation 220, an operation 230, an operation 240, and an operation 250, the operational flow 1600 moves to an operation 1610. Operation 1610 illustrates cease providing the first display to the first individual at least partially based on automatically remotely identifying at least one characteristic of the second individual. For example, as shown in FIGS. 1A through 1M, the facial recognition module 50 may be utilized to automatically remotely identify one or more characteristics of the second individual 80. The first display module 54 may cease providing the first display 56 to the first individual 52 at least partially based on the one or more identified characteristics of the second individual 80.

Figure 17A:
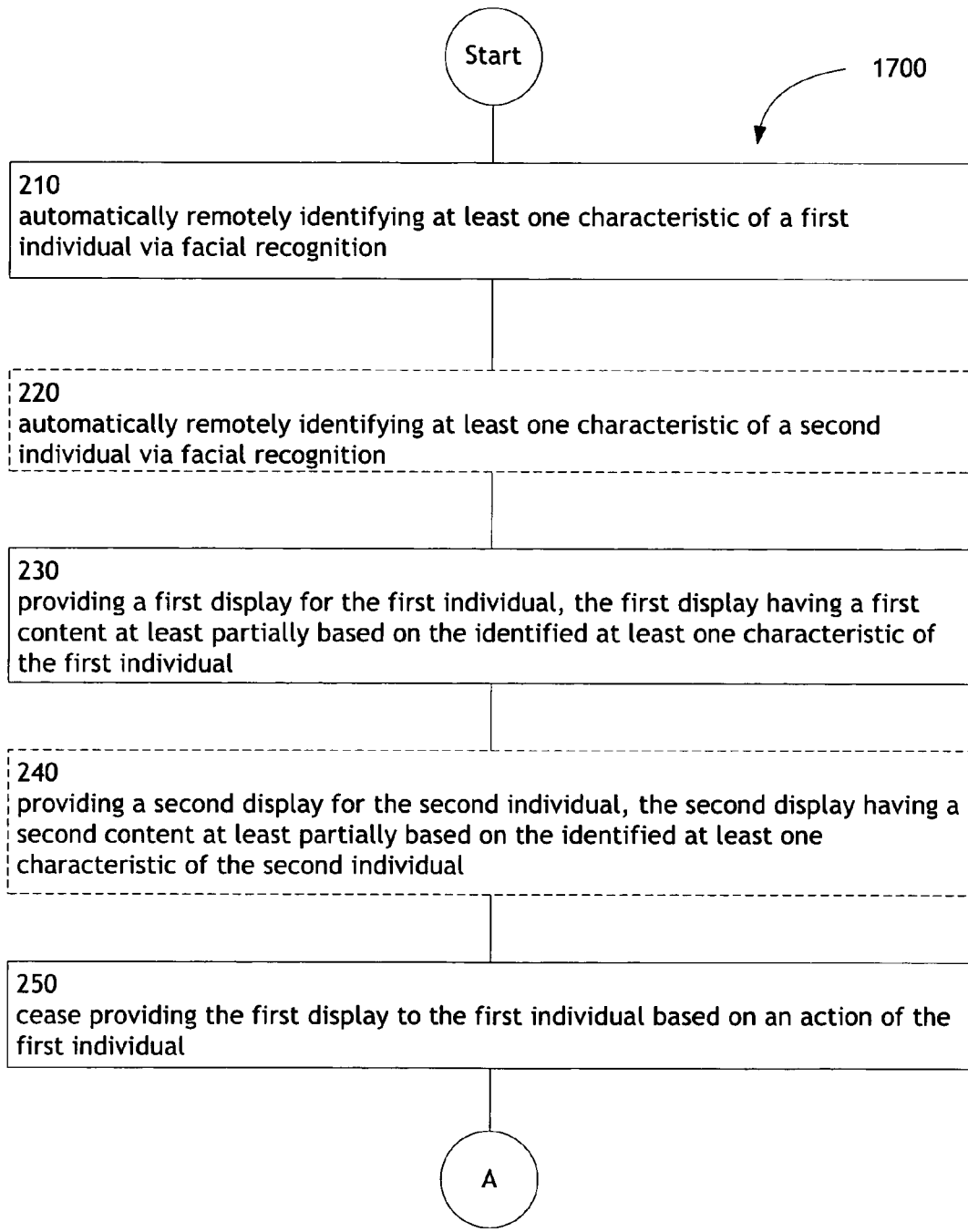
FIG. 17 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, automatically remotely identifying a third higher priority individual, and cease providing the display to the first individual at least partially based on the identified third higher priority individual.
Figure 17B:
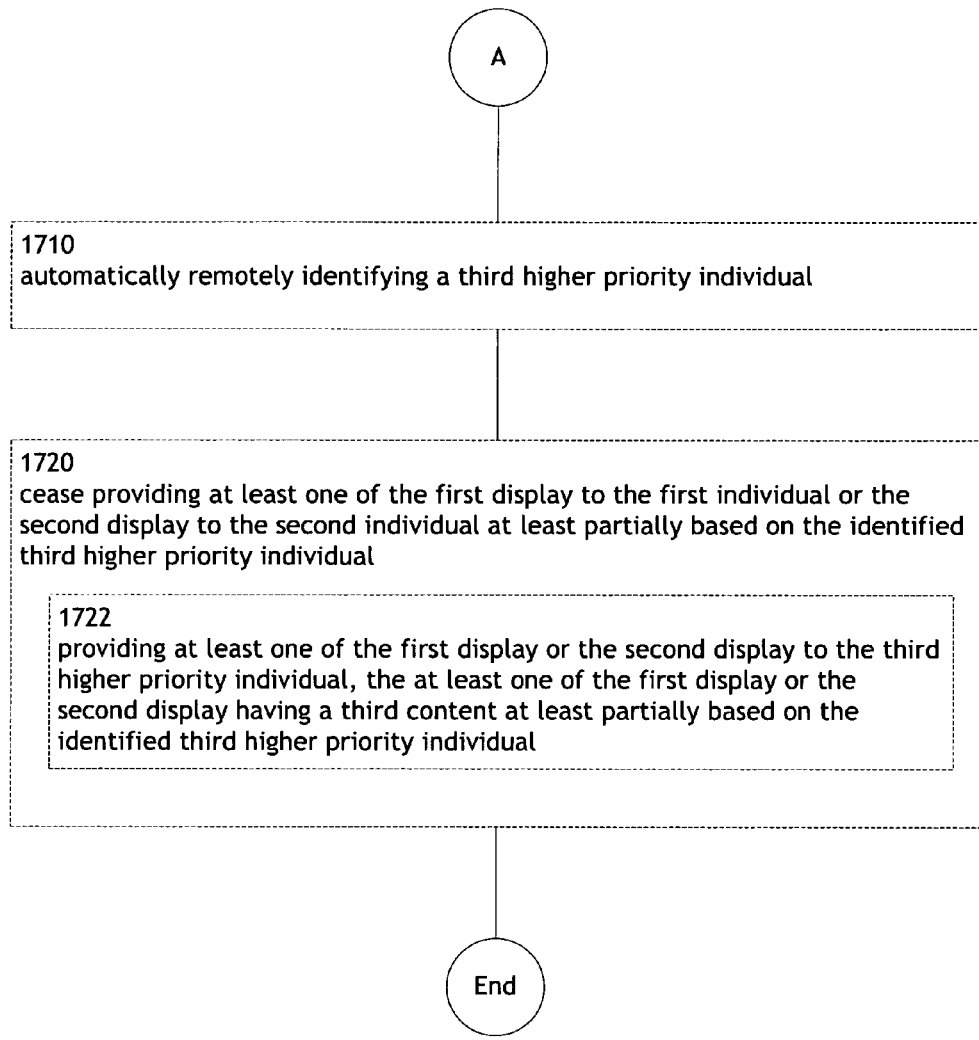

FIG. 17 illustrates an operational flow 1700 representing example operations related to automatically remotely identifying one or more characteristics of an individual utilizing facial recognition and providing a display for the individual having a content at least partially based on the one or more identified characteristics of the individual. FIG. 17 illustrates an example embodiment where the example operational flow 200 of FIG. 2 may include at least one additional operation. Additional operations may include an operation 1710, an operation 1720, and/or an operation 1722.

After a start operation, an operation 210, an operation 220, an operation 230, an operation 240, and an operation 250, the operational flow 1700 moves to an operation 1710. Operation 1710 illustrates automatically remotely identifying a third higher priority individual. For example, as shown in FIGS. 1A through 1M, the facial recognition module 50 may be utilized to automatically remotely identify the third individual 86.

Then, operation 1720 illustrates cease providing at least one of the first display to the first individual or the second display to the second individual at least partially based on the identified third higher priority individual. For example, as shown in FIGS. 1A through 1M, the first display module 54 may cease providing the first display 56 to the first individual 52 or the second display module 82 may cease providing the second display 84 to the second individual 80 at least partially based on the third individual 86.

The operation 1722 illustrates providing at least one of the first display or the second display to the third higher priority individual, the at least one of the first display or the second display having a third content at least partially based on the identified third higher priority individual. For example, as shown in FIGS. 1A through 1M, the first display module 54 or the second display module 82 may provide a first display 56 visible to the third individual 86 or a second display 84 visible to the third individual 86, where the first display 56 or the second display 84 has a content at least partially based on the third individual 86.

Figure 18:
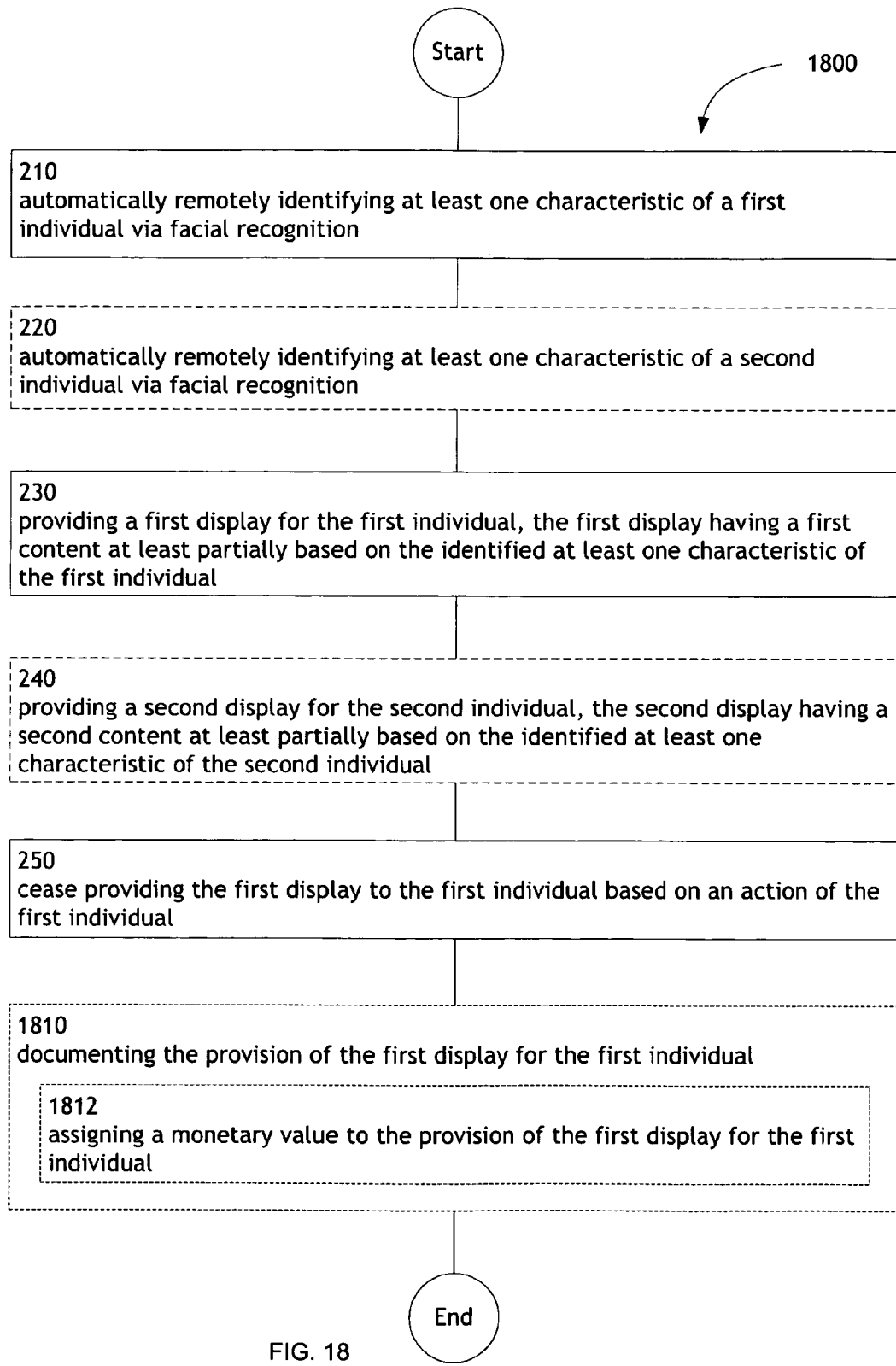
FIG. 18 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, and documenting the provision of the display for the individual.

FIG. 18 illustrates an operational flow 1800 representing example operations related to automatically remotely identifying one or more characteristics of an individual utilizing facial recognition and providing a display for the individual having a content at least partially based on the one or more identified characteristics of the individual. FIG. 18 illustrates an example embodiment where the example operational flow 200 of FIG. 2 may include at least one additional operation. Additional operations may include an operation 1810, and/or an operation 1812.

After a start operation, an operation 210, an operation 220, an operation 230, an operation 240, and an operation 250, the operational flow 1800 moves to an operation 1810. Operation 1810 illustrates documenting the provision of the first display for the first individual. For example, as shown in FIGS. 1A through 1M, the memory 122 may be utilized to store/document the provision of the first display 56 to the first individual 52.

The operation 1812 illustrates assigning a monetary value to the provision of the first display for the first individual. For example, as shown in FIGS. 1A through 1M, the memory 122 may be utilized to assign a monetary value to the provision of the first display 56 to the first individual 52.

Figure 19:
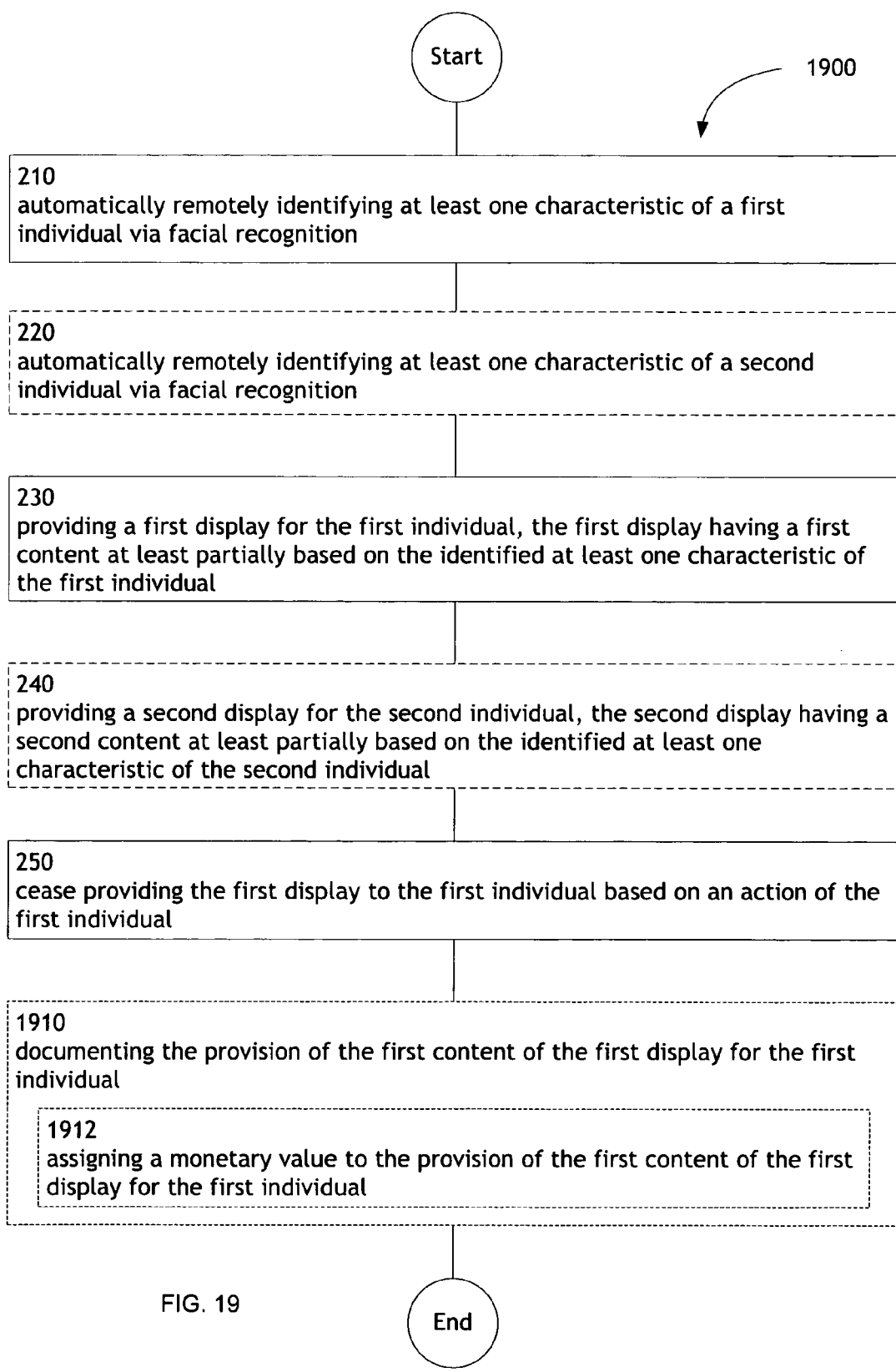
FIG. 19 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, and documenting the provision of the content of the display for the individual.

FIG. 19 illustrates an operational flow 1900 representing example operations related to automatically remotely identifying one or more characteristics of an individual utilizing facial recognition and providing a display for the individual having a content at least partially based on the one or more identified characteristics of the individual. FIG. 19 illustrates an example embodiment where the example operational flow 200 of FIG. 2 may include at least one additional operation. Additional operations may include an operation 1910, and/or an operation 1912.

After a start operation, an operation 210, an operation 220, an operation 230, an operation 240, and an operation 250, the operational flow 1900 moves to an operation 1910. Operation 1910 illustrates documenting the provision of the first content of the first display for the first individual. For example, as shown in FIGS. 1A through 1M, the memory 122 may be utilized to store/document the provision of the first content of the first display 56 to the first individual 52. In an embodiment, the controller 132 coupled with the first display module 54 may be utilized to document the provision of the first content of the first display 56 (e.g., the controller 132 may direct the facial recognition module 50 to store information regarding the provision of the content in the memory 122).

The operation 1912 illustrates assigning a monetary value to the provision of the first content of the first display for the first individual. For example, as shown in FIGS. 1A through 1M, the memory 122 may be utilized to assign a monetary value to the provision of the first content of the first display 56 to the first individual 52.

Figure 20:
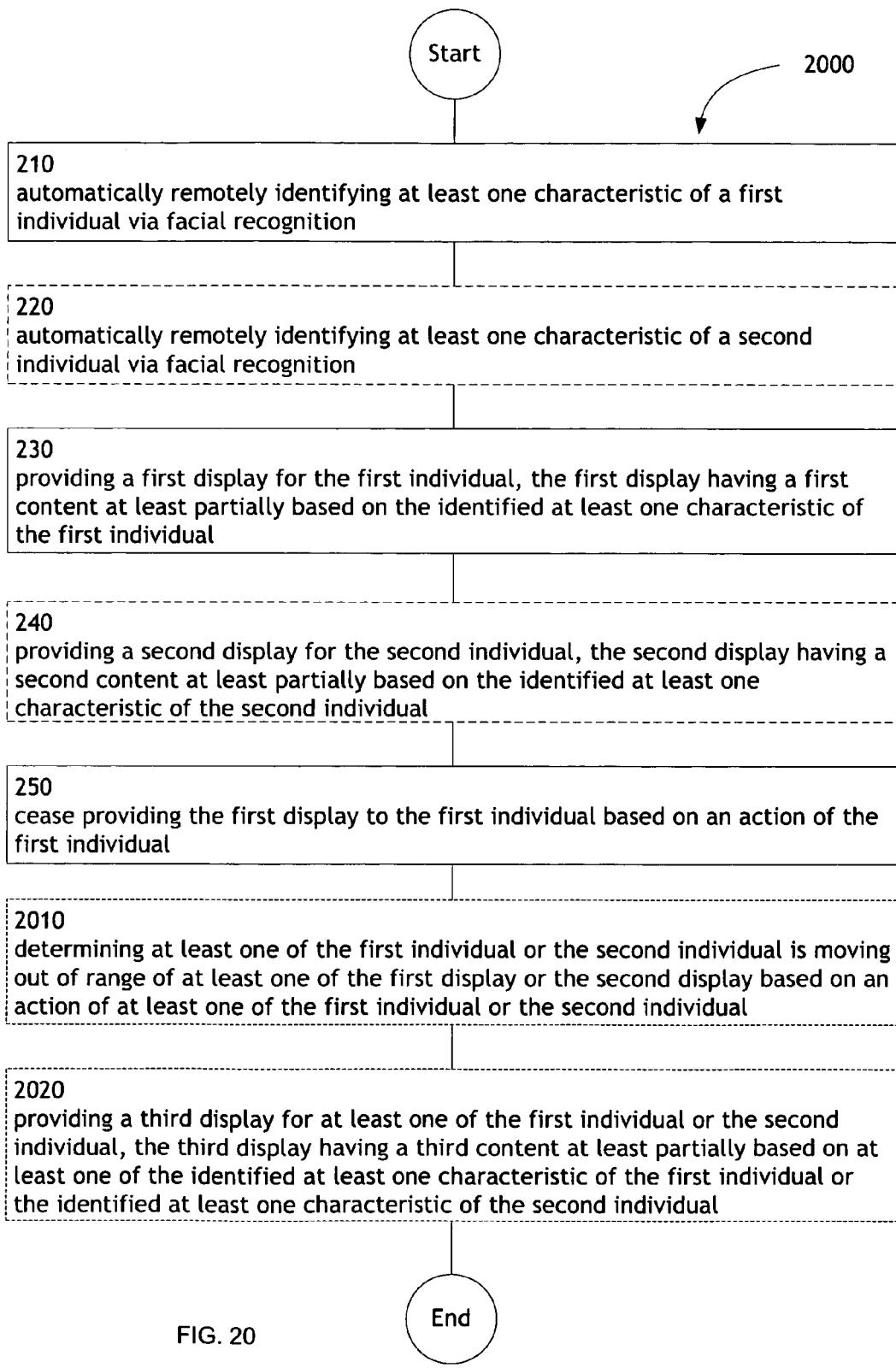
FIG. 20 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, determining the individual is moving out of range of the display based on an action of the individual, and providing a third display for the individual, the third display having a third content at least partially based on the identified at least one characteristic of the individual.

FIG. 20 illustrates an operational flow 2000 representing example operations related to automatically remotely identifying one or more characteristics of an individual utilizing facial recognition and providing a display for the individual having a content at least partially based on the one or more identified characteristics of the individual. FIG. 20 illustrates an example embodiment where the example operational flow 200 of FIG. 2 may include at least one additional operation. Additional operations may include an operation 2010, and/or an operation 2020.

After a start operation, an operation 210, an operation 220, an operation 230, an operation 240, and an operation 250, the operational flow 2000 moves to an operation 2010. Operation 2010 illustrates determining at least one of the first individual or the second individual is moving out of range of at least one of the first display or the second display based on an action of at least one of the first individual or the second individual. For example, as shown in FIGS. 1A through 1M, the facial recognition module 50 may be utilized to determine the first individual 52 or the second individual 80 is moving out of range of the first display 56 or the second display 84 based on an action of the first individual 52 or the second individual 80.

Then, operation 2020 illustrates providing a third display for at least one of the first individual or the second individual, the third display having a third content at least partially based on at least one of the identified at least one characteristic of the first individual or the identified at least one characteristic of the second individual. For example, as shown in FIGS. 1A through 1M, the first display module 54 or the second display module 82 may provide a third display 88 visible to the first individual 52 or the second individual 80, where the third display 88 has a content at least partially based on the one or more identified characteristics of the first individual 52 or the second individual 80.

Figure 21:
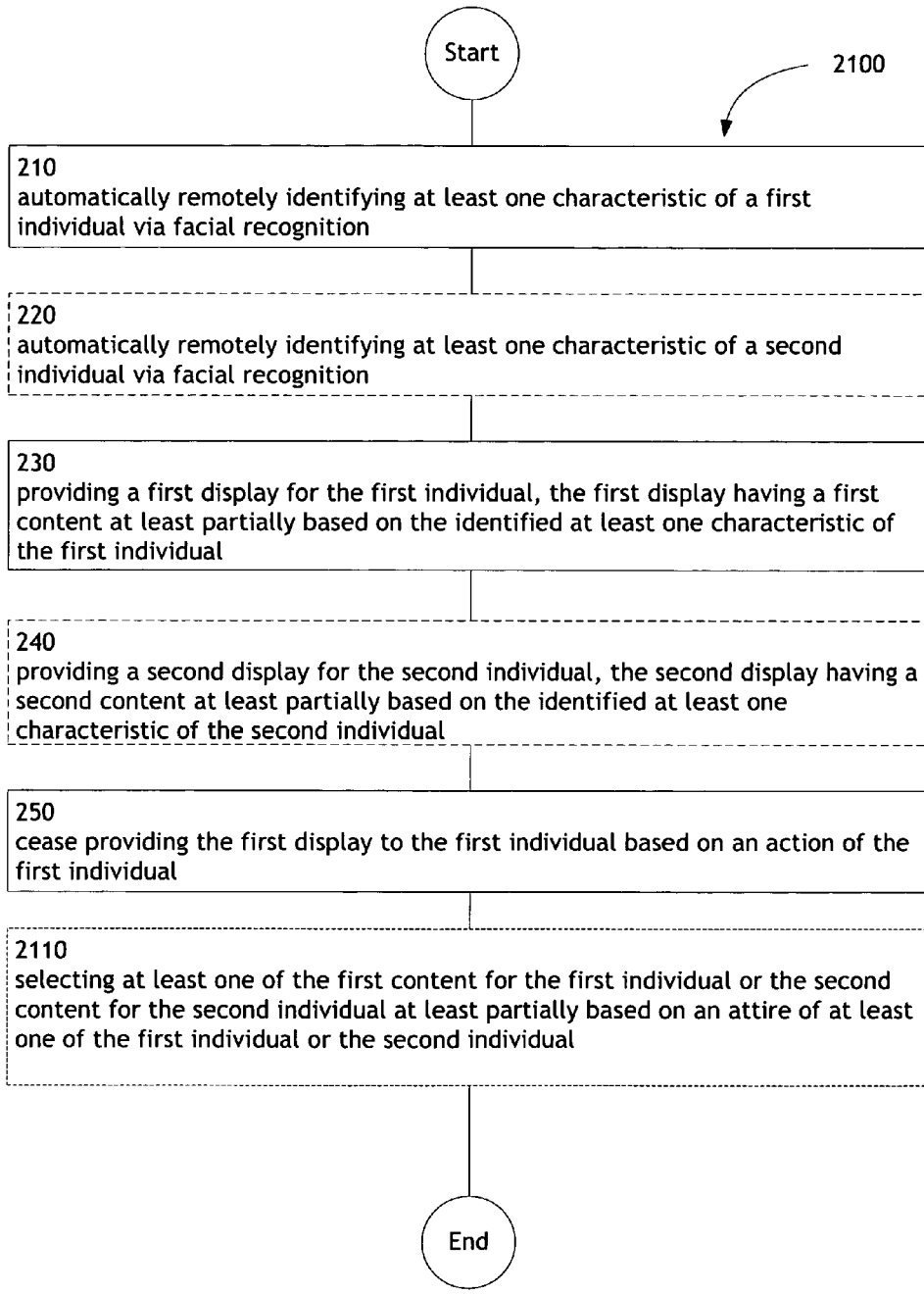
FIG. 21 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, selecting the content for the individual at least partially based on an attire of the individual.

FIG. 21 illustrates an operational flow 2100 representing example operations related to automatically remotely identifying one or more characteristics of an individual utilizing facial recognition and providing a display for the individual having a content at least partially based on the one or more identified characteristics of the individual. FIG. 21 illustrates an example embodiment where the example operational flow 200 of FIG. 2 may include at least one additional operation. Additional operations may include an operation 2110.

After a start operation, an operation 210, an operation 220, an operation 230, an operation 240, and an operation 250, the operational flow 2100 moves to an operation 2110. Operation 2110 illustrates selecting at least one of the first content for the first individual or the second content for the second individual at least partially based on an attire of at least one of the first individual or the second individual. For example, as shown in FIGS. 1A through 1M, the content displayed by the first display 56 or the second display 84 for the first individual 52 or the second individual 80 may be selected at least partially based on an attire of the first individual 52 or the second individual 80. In an embodiment, the attire of the first individual 52 or the second individual 80 may include, but is not limited to, clothing styles (such styles may be regionally dependent), brands (e.g., a type of purse), seasonal clothing, or the like.

Figure 22:
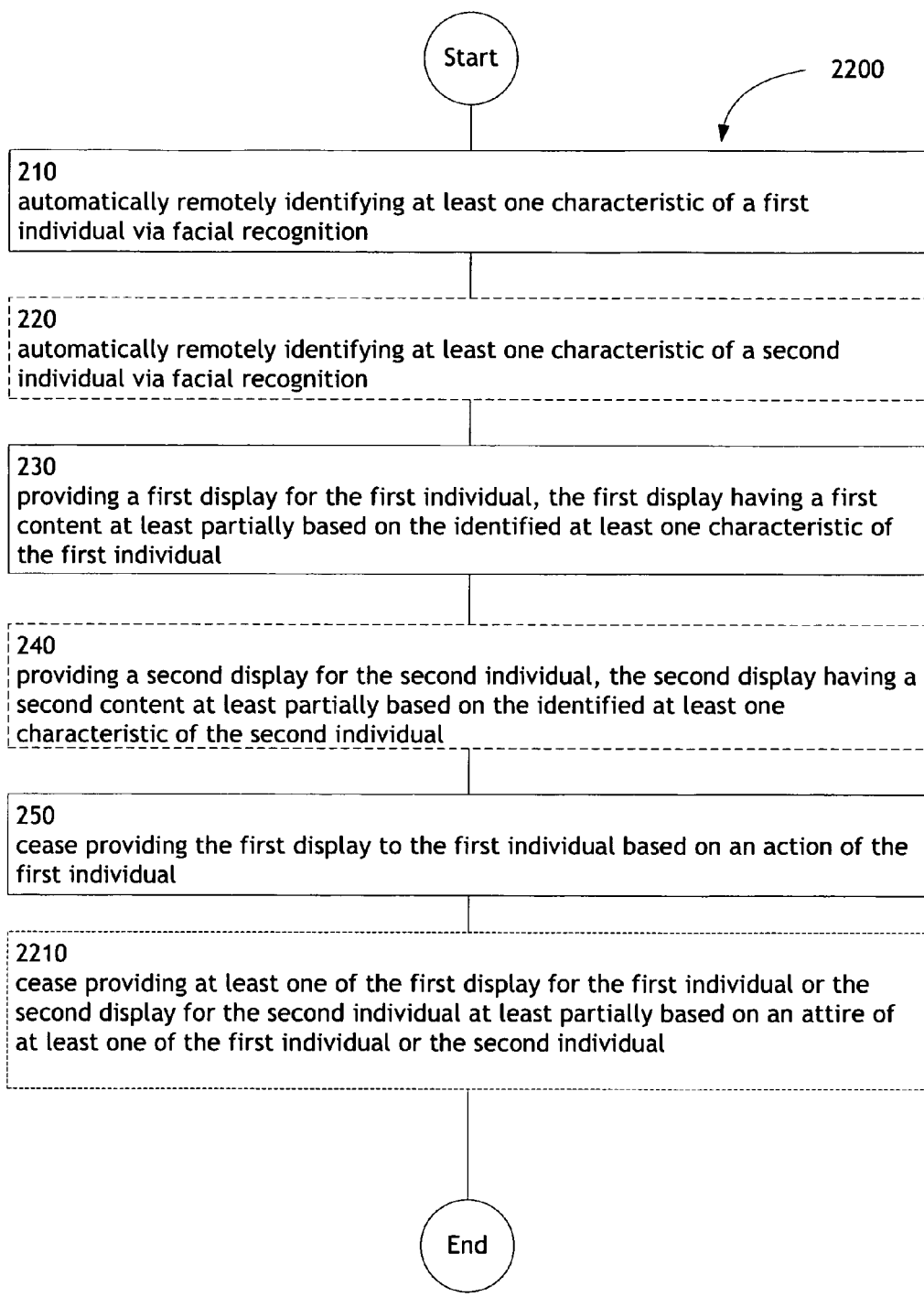
FIG. 22 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, and cease providing the display for the individual at least partially based on an attire of the individual.

FIG. 22 illustrates an operational flow 2200 representing example operations related to automatically remotely identifying one or more characteristics of an individual utilizing facial recognition and providing a display for the individual having a content at least partially based on the one or more identified characteristics of the individual. FIG. 22 illustrates an example embodiment where the example operational flow 200 of FIG. 2 may include at least one additional operation. Additional operations may include an operation 2210.

After a start operation, an operation 210, an operation 220, an operation 230, an operation 240, and an operation 250, the operational flow 2200 moves to an operation 2210. Operation 2210 illustrates cease providing at least one of the first display for the first individual or the second display for the second individual at least partially based on an attire of at least one of the first individual or the second individual. For example, as shown in FIGS. 1A through 1M, the first display module 54 or the second display module 82 may cease providing the first display 56 or the second display 84 to the first individual 52 or the second individual 80 at least partially based on an attire of the first individual 52 or the second individual 80.

Figure 23:
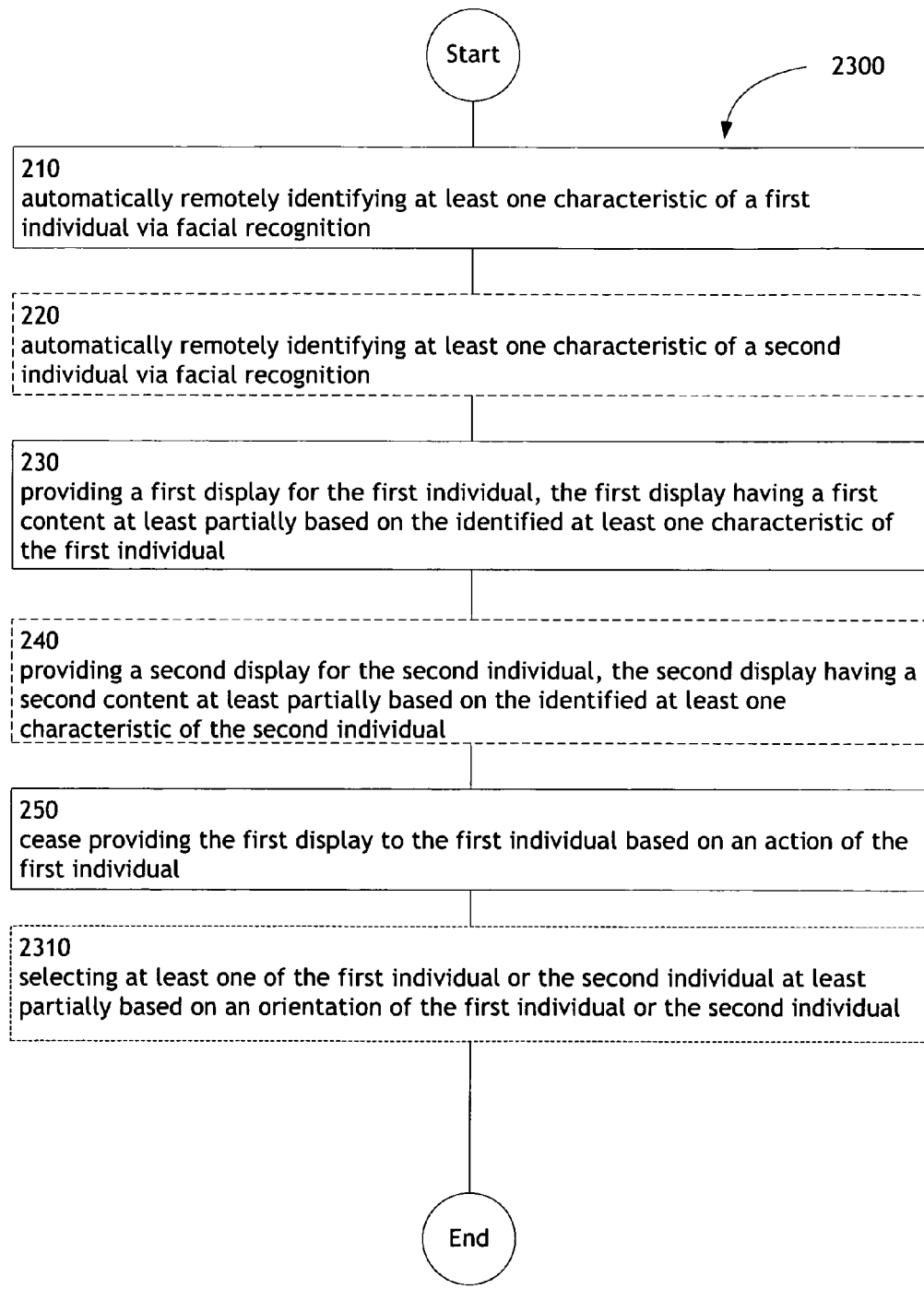
FIG. 23 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, and selecting the individual at least partially based on an orientation of the individual.

FIG. 23 illustrates an operational flow 2300 representing example operations related to automatically remotely identifying one or more characteristics of an individual utilizing facial recognition and providing a display for the individual having a content at least partially based on the one or more identified characteristics of the individual. FIG. 23 illustrates an example embodiment where the example operational flow 200 of FIG. 2 may include at least one additional operation. Additional operations may include an operation 2310.

After a start operation, an operation 210, an operation 220, an operation 230, an operation 240, and an operation 250, the operational flow 2300 moves to an operation 2310. Operation 2310 illustrates selecting at least one of the first individual or the second individual at least partially based on an orientation of the first individual or the second individual. For example, as shown in FIGS. 1A through 1M, the first individual 52 or the second individual 80 may be selected at least partially based on an orientation of the first individual 52 or the second individual 80. In an embodiment, the controller 132 coupled with the facial recognition module 50 may be utilized to select the first individual 52 at least partially based on an orientation of the first individual 52.

Figure 24A:
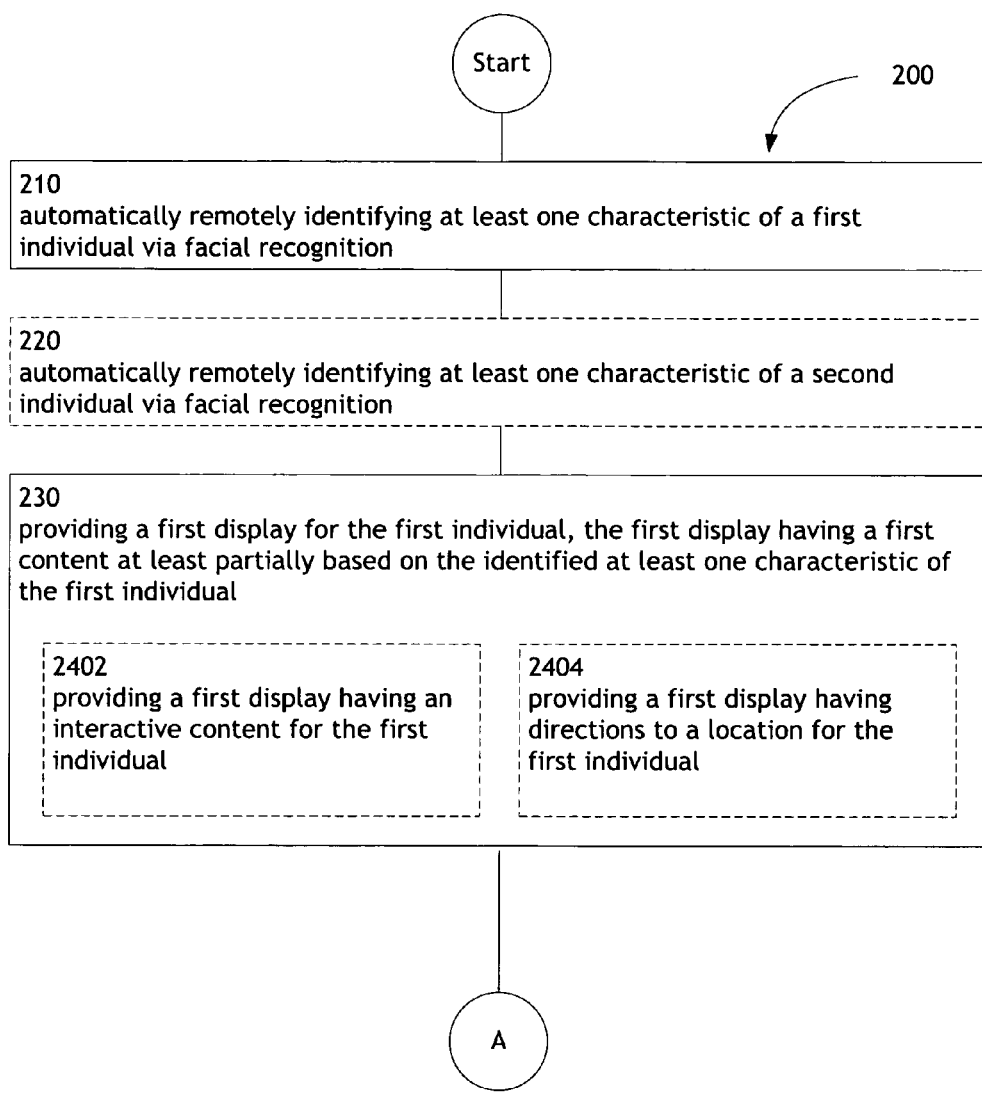
FIG. 24 illustrates an alternative embodiment of the operational flow of FIG. 2.
Figure 24B:
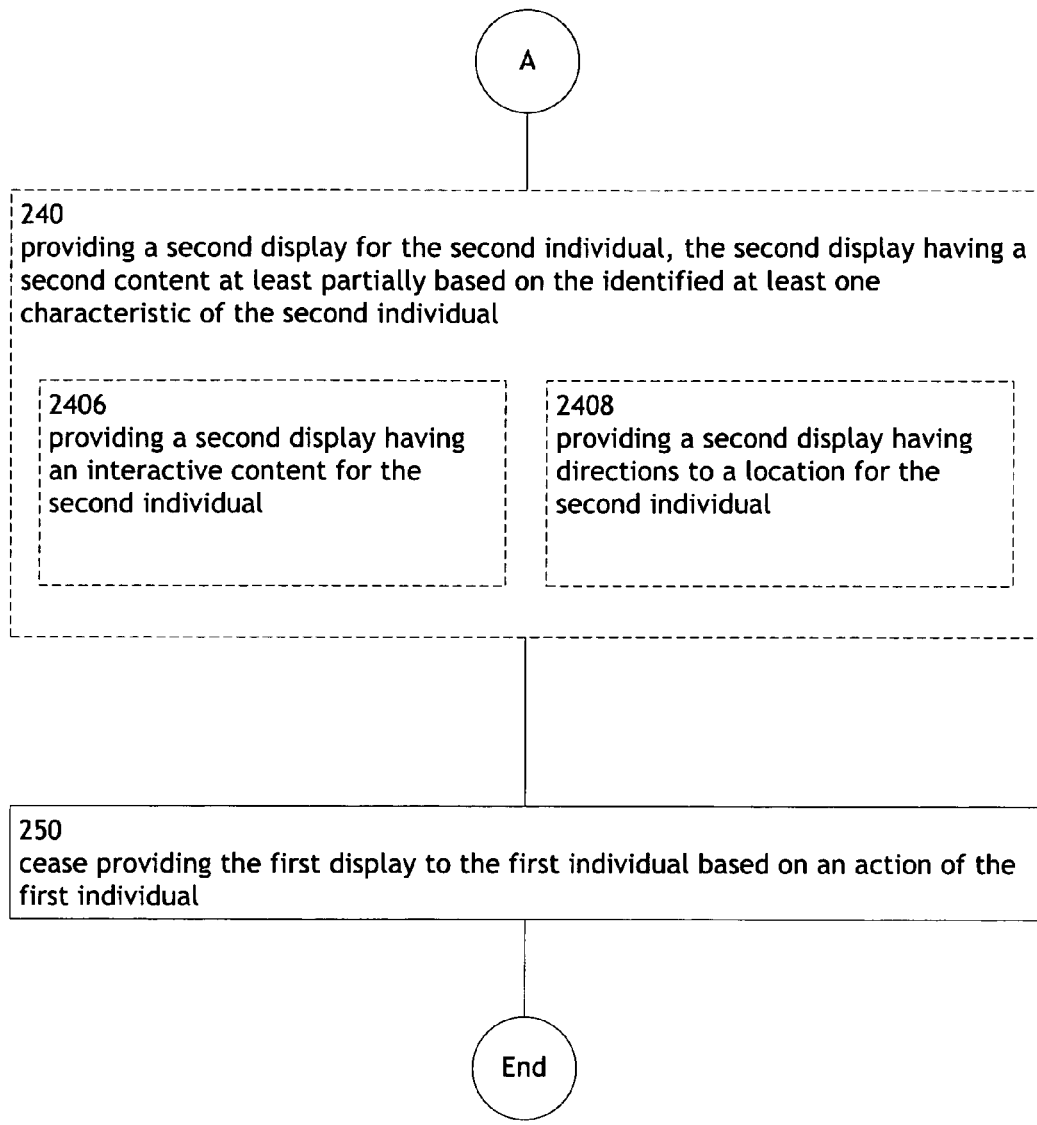

FIG. 24 illustrates alternative embodiments of the example operational flow 200 of FIG. 2. FIG. 24 illustrates example embodiments where the operations 230 and 240 may include at least one additional operation. Additional operations may include an operation 2402, an operation 2404, an operation 2406, and/or an operation 2408.

The operations 2402 and 2406 illustrate providing at least one of a first display having an interactive content for the first individual or a second display having an interactive content for the second individual. For example, as shown in FIGS. 1A through 1M, the first display module 54 may provide a first display 56 or the second display module 82 may provide a second display 84 for the first individual 52 or the second individual 80, where the first display 56 or the second display 84 has an interactive content.

The operations 2404 and 2408 illustrate providing at least one of a first display having directions to a location for the first individual or a second display having directions to a location for the second individual. For example, as shown in FIGS. 1A through 1M, the first display module 54 may provide a first display 56 or the second display module 82 may provide a second display 84 for the first individual 52 or the second individual 80, where the first display 56 or the second display 84 has directions to a location.

Figure 25A:
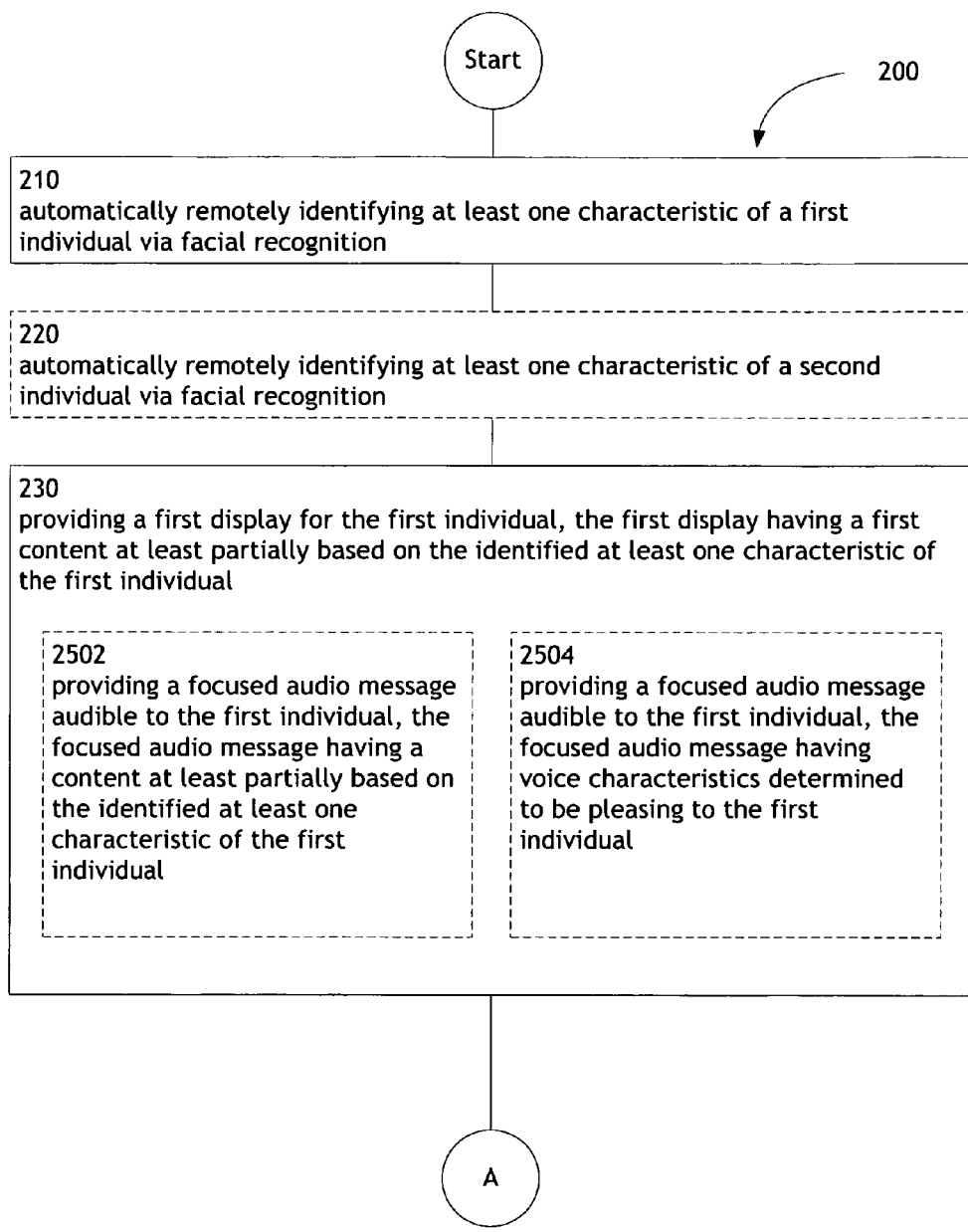
FIG. 25 illustrates an alternative embodiment of the operational flow of FIG. 2.
Figure 25B:
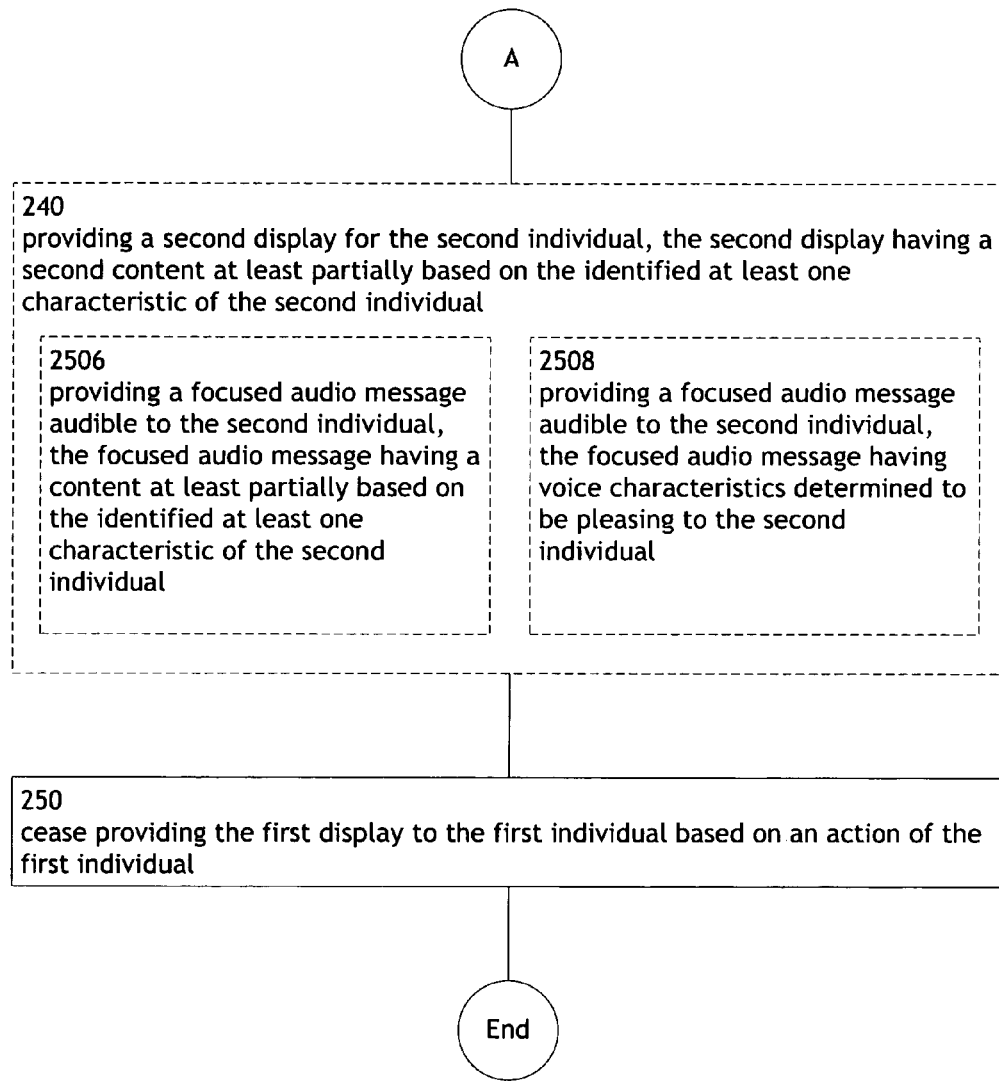

FIG. 25 illustrates alternative embodiments of the example operational flow 200 of FIG. 2. FIG. 25 illustrates example embodiments where the operations 230 and 240 may include at least one additional operation. Additional operations may include an operation 2502, an operation 2504, an operation 2506, and/or an operation 2508.

The operations 2502 and 2506 illustrate providing a focused audio message audible to at least one of the first individual or the second individual, the focused audio message having a content at least partially based on at least one of the identified at least one characteristic of the first individual or the identified at least one characteristic of the second individual. For example, as shown in FIGS. 1A through 1M, the focused audio module 136, the first display module 54, or the second display module 82 may provide a focused audio message audible to at least one of the first individual 52 or the second individual 80, where the focused audio message has a content at least partially based on the one or more identified characteristics of the first individual 52 or the second individual 80.

The operations 2504 and 2508 illustrate providing a focused audio message audible to at least one of the first individual or the second individual, the focused audio message having voice characteristics determined to be pleasing to at least one of the first individual or the second individual. For example, as shown in FIGS. 1A through 1M, the focused audio module 136, the first display module 54, or the second display module 82 may provide a focused audio message audible to at least one of the first individual 52 or the second individual 80, where the focused audio message has voice characteristics determined to be pleasing to the first individual 52 or the second individual 80. In an embodiment, the facial recognition module 50 may be coupled with the focused audio module 136 for providing a focused audio message to the first individual 52 or the second individual 80.

Figure 26A:
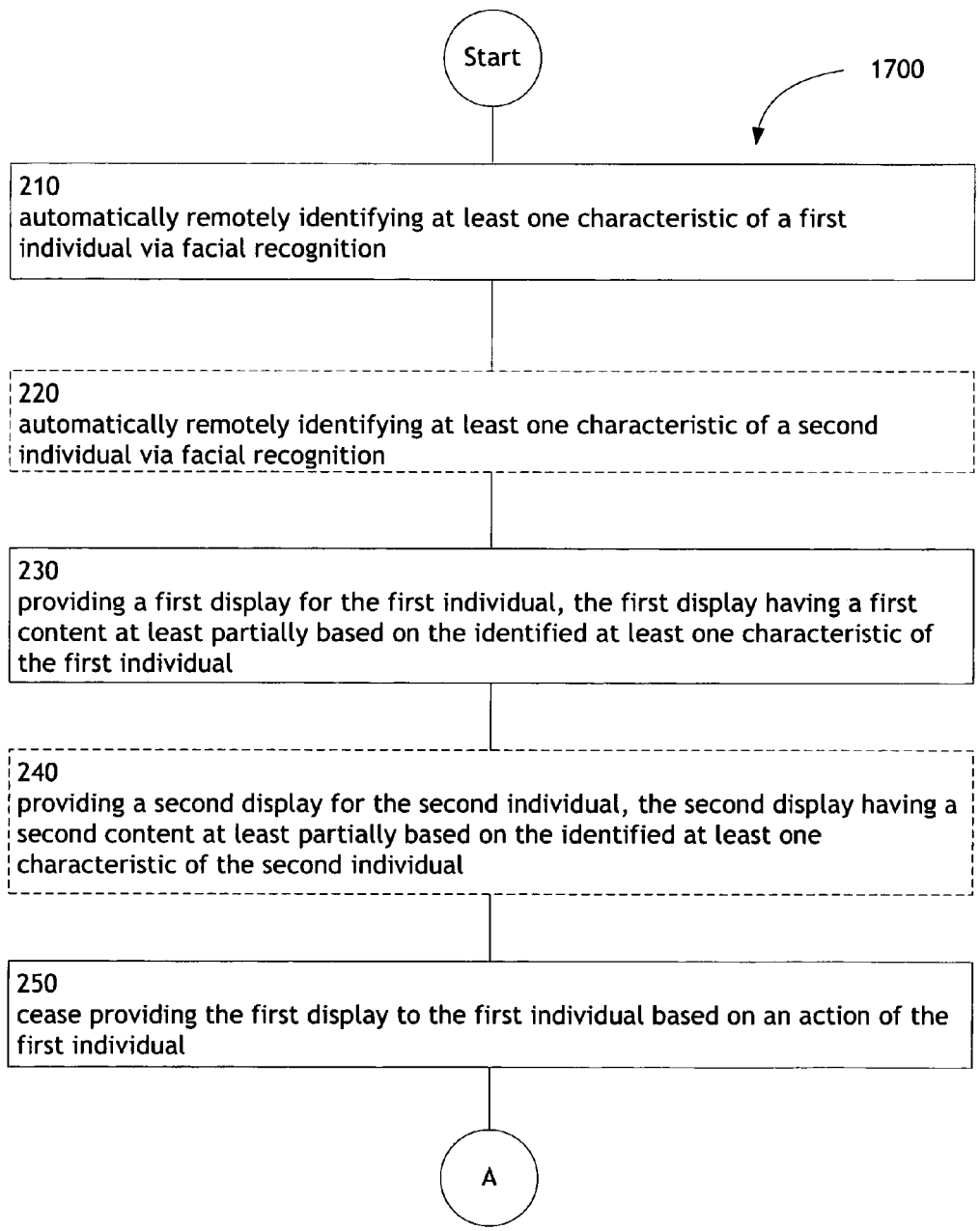
FIG. 26 illustrates an alternative embodiment of the operational flow of FIG. 17.
Figure 26B:
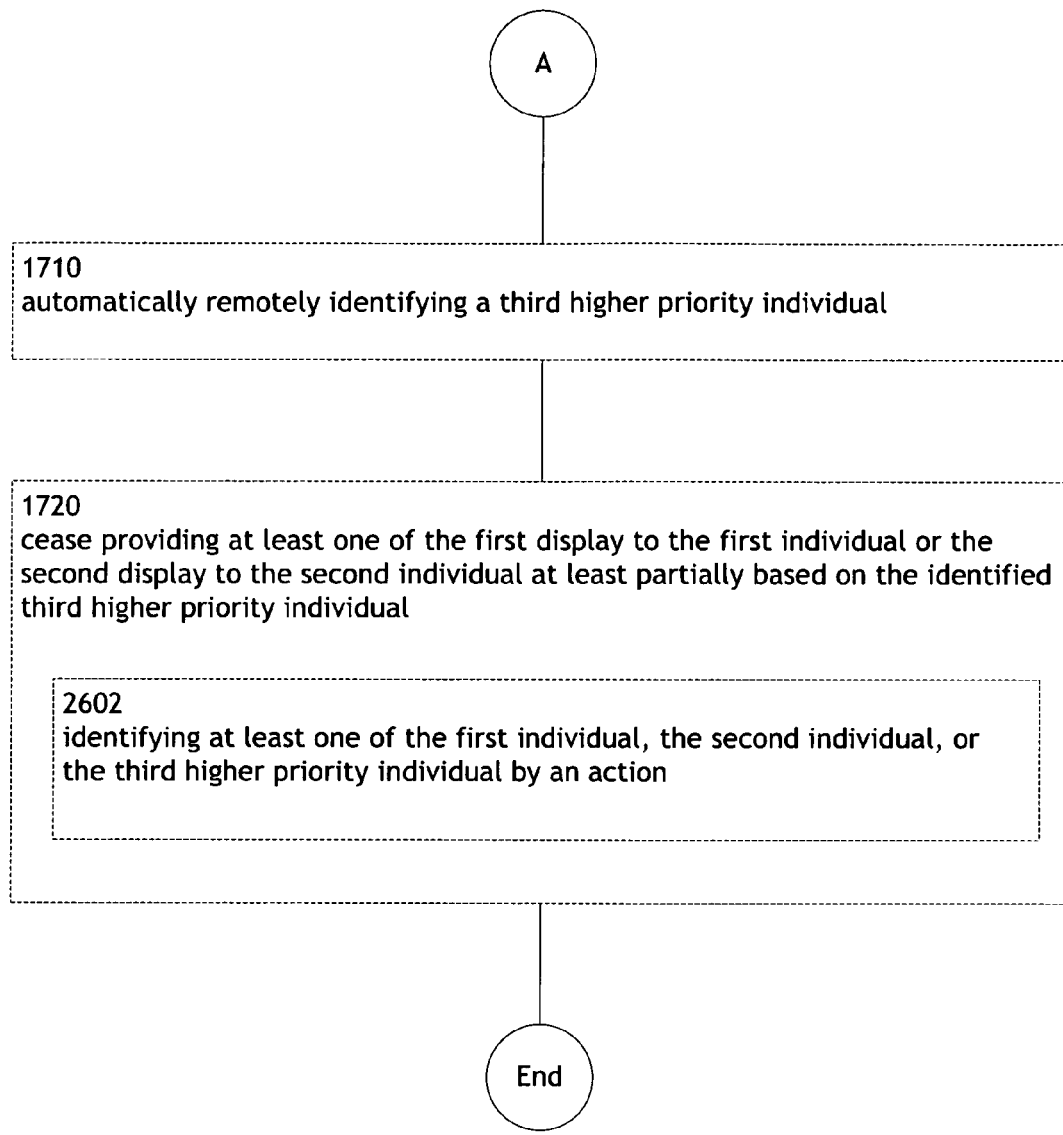

FIG. 26 illustrates alternative embodiments of the example operational flow 1700 of FIG. 17. FIG. 26 illustrates example embodiments where the operation 1720 may include at least one additional operation. Additional operations may include an operation 2602.

The operation 2602 illustrates identifying at least one of the first individual, the second individual, or the third higher priority individual by an action. For example, as shown in FIGS. 1A through 1M, the first individual 52, the second individual 80, or the third individual 86 may be identified by an action. In an embodiment, an action may include, but is not limited to, a facial expression.

Figure 27A:
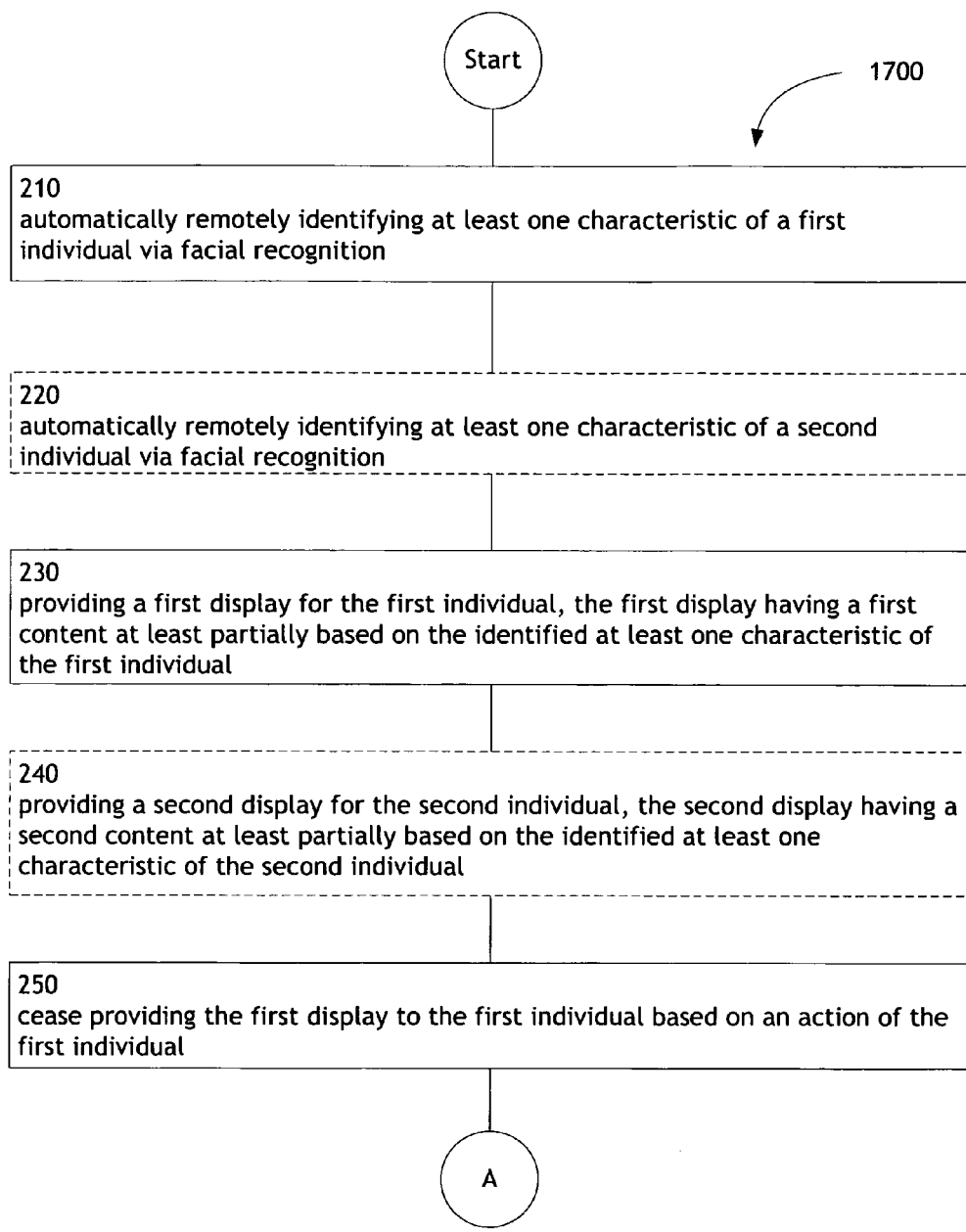
FIG. 27 illustrates an alternative embodiment of the operational flow of FIG. 17.

FIG. 27 illustrates alternative embodiments of the example operational flow 1700 of FIG. 17. FIG. 27 illustrates example embodiments where the operation 1720 may include at least one additional operation. Additional operations may include an operation 2702.

The operation 2702 illustrates identifying at least one of the first individual, the second individual, or the third higher priority individual by a lack of an action. For example, as shown in FIGS. 1A through 1M, the first individual 52, the second individual 80, or the third individual 86 may be identified by a lack of an action.

Figure 28:
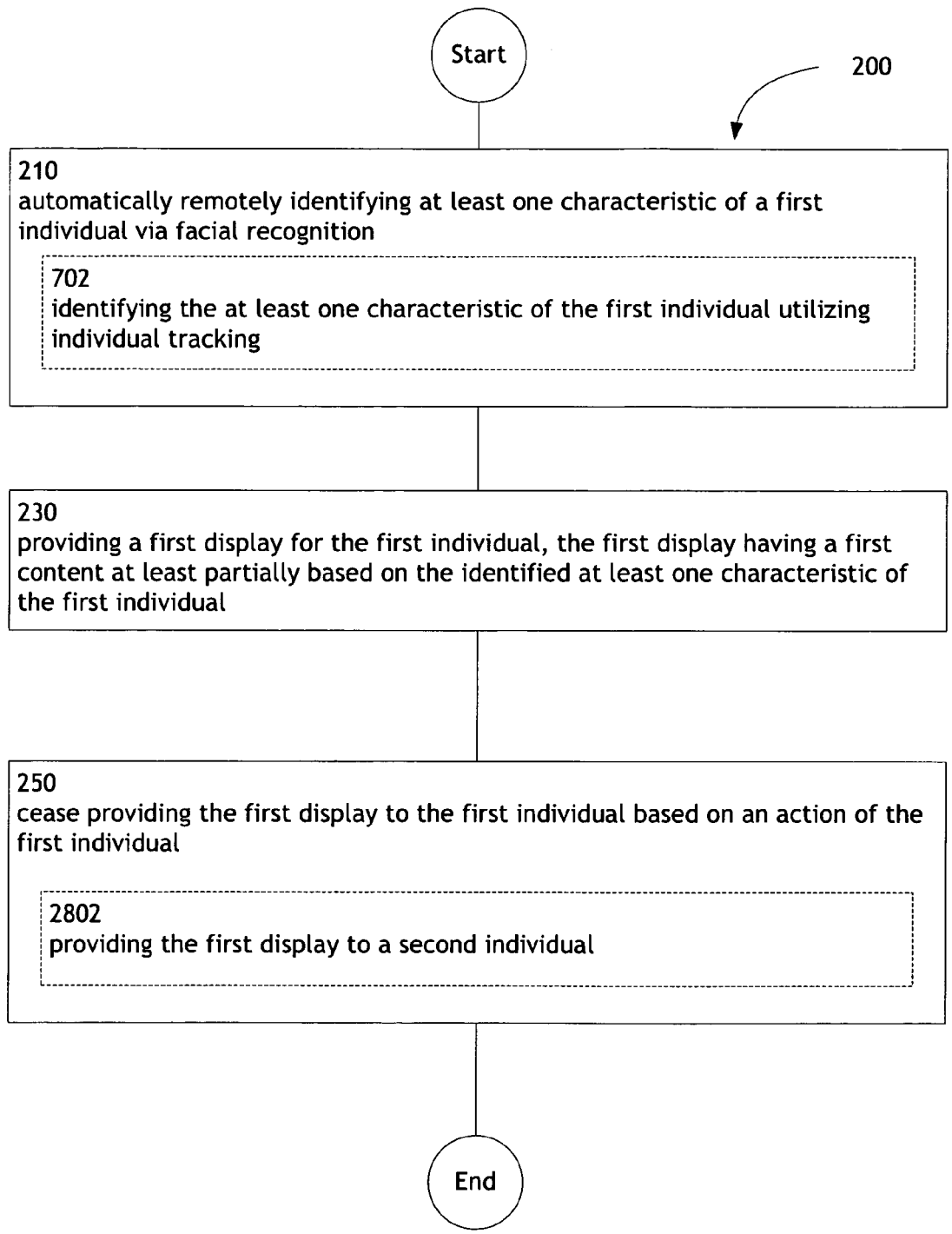
FIG. 28 illustrates an alternative embodiment of the operational flow of FIG. 2.

FIG. 28 illustrates alternative embodiments of the example operational flow 200 of FIG. 2. FIG. 28 illustrates example embodiments where the operation 250 may include at least one additional operation. Additional operations may include an operation 2802.

The operation 2802 illustrates providing the first display to a second individual. For example, as shown in FIGS. 1A through 1M, the first display module 54 may be utilized to provide the first display 56 to the second individual 80.

Figure 29:
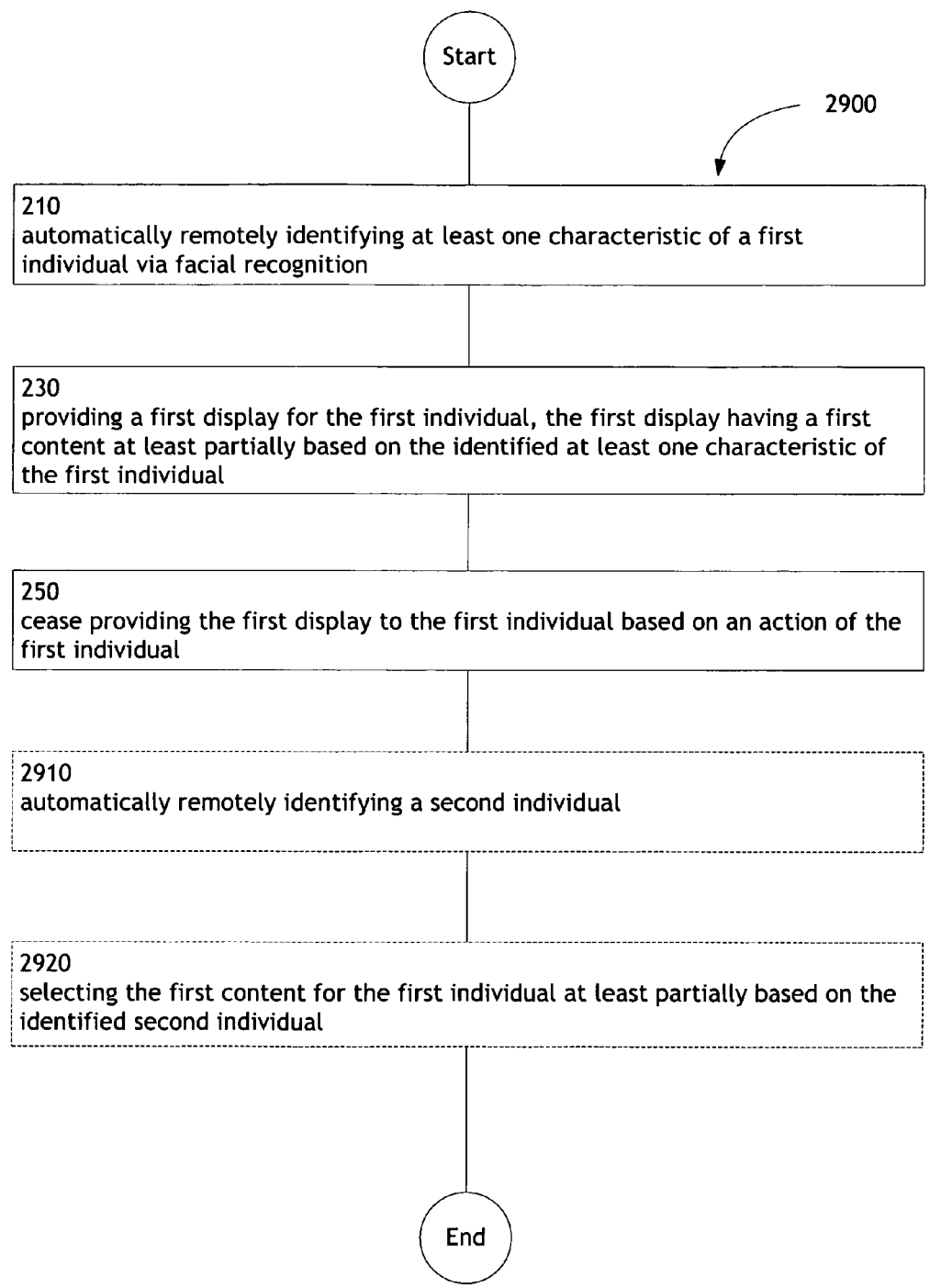
FIG. 29 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, automatically remotely identifying a second individual, and selecting the content for the first individual at least partially based on the identified second individual.

FIG. 29 illustrates an operational flow 2900 representing example operations related to automatically remotely identifying one or more characteristics of an individual utilizing facial recognition and providing a display for the individual having a content at least partially based on the one or more identified characteristics of the individual. FIG. 29 illustrates an example embodiment where the example operational flow 200 of FIG. 2 may include at least one additional operation. Additional operations may include an operation 2910, and/or an operation 2920.

After a start operation, an operation 210, an operation 230, and an operation 250, the operational flow 2900 moves to an operation 2910. Operation 2910 illustrates automatically remotely identifying a second individual. For example, as shown in FIGS. 1A through 1M, the facial recognition module 50 may be utilized to automatically remotely identify the second individual 80.

Then, operation 2920 illustrates selecting the first content for the first individual at least partially based on the identified second individual. For example, as shown in FIGS. 1A through 1M, the first content displayed by the first display 56 of the first display module 54 for the first individual 52 may be selected at least partially based on the second individual 80.

Figure 30:
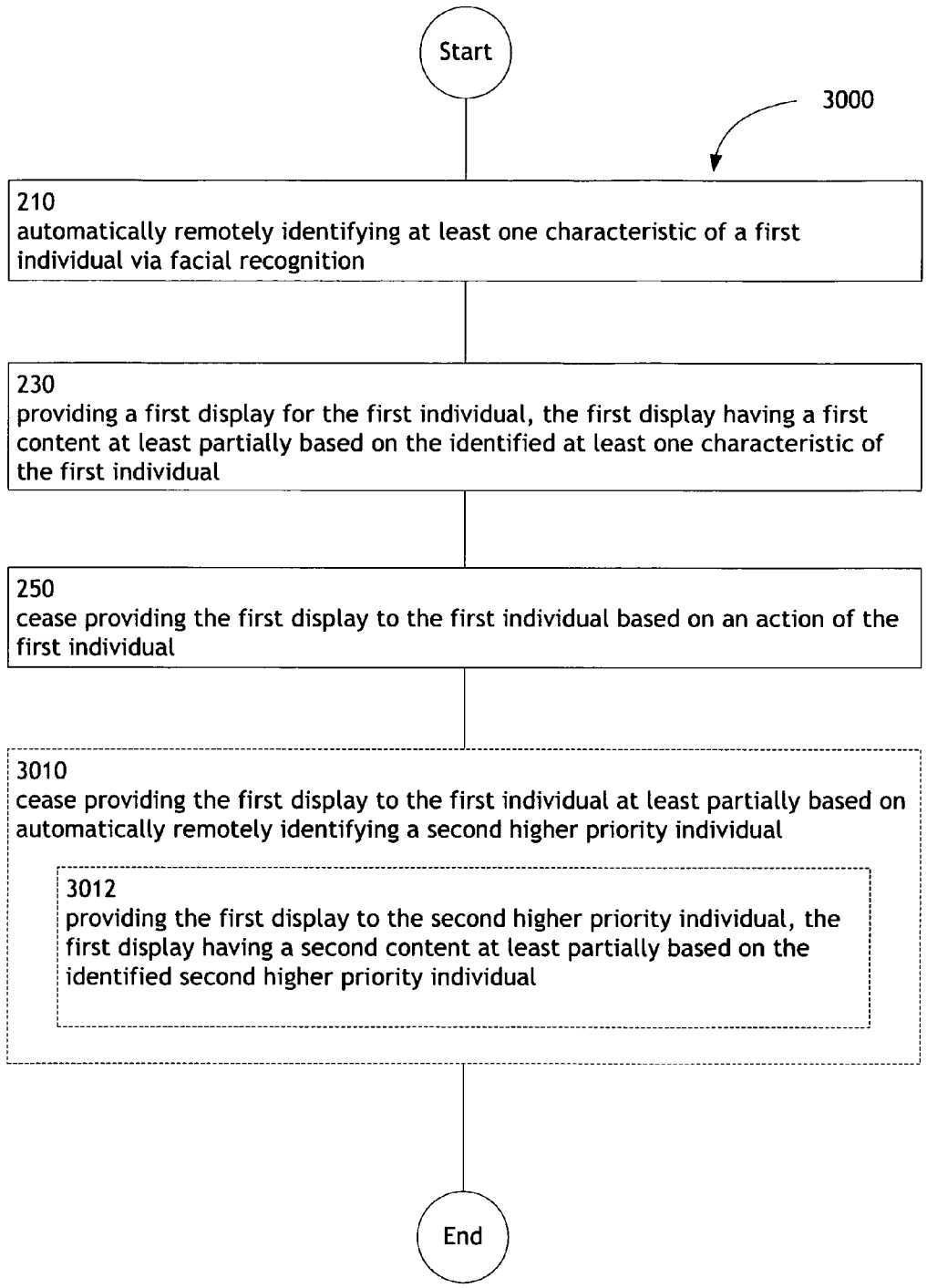
FIG. 30 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, and cease providing the display to the first individual at least partially based on automatically remotely identifying a second higher priority individual.

FIG. 30 illustrates an operational flow 3000 representing example operations related to automatically remotely identifying one or more characteristics of an individual utilizing facial recognition and providing a display for the individual having a content at least partially based on the one or more identified characteristics of the individual. FIG. 30 illustrates an example embodiment where the example operational flow 200 of FIG. 2 may include at least one additional operation. Additional operations may include an operation 3010, and/or an operation 3012.

After a start operation, an operation 210, an operation 230, and an operation 250, the operational flow 3000 moves to an operation 3010. Operation 3010 illustrates cease providing the first display to the first individual at least partially based on automatically remotely identifying a second higher priority individual. For example, as shown in FIGS. 1A through 1M, the first display module 54 may cease providing the first display 56 to the first individual 52 at least partially based on automatically remotely identifying the second individual 80, where the second individual 80 has a higher priority than the first individual 52. In an embodiment, the controller 132 may be coupled with the facial recognition module 50 and the first display module 54. The controller 132 may be utilized to signal the first display module 54 to cease providing the first display 56 to the first individual 52 when the facial recognition module 50 identifies the second individual 80.

The operation 3012 illustrates providing the first display to the second higher priority individual, the first display having a second content at least partially based on the identified second higher priority individual. For example, as shown in FIGS. 1A through 1M, the first display module 54 may be utilized to provide the first display 56 to the second higher priority individual 80, where the first display 56 has a second content at least partially based on the second individual 80.

Figure 31:
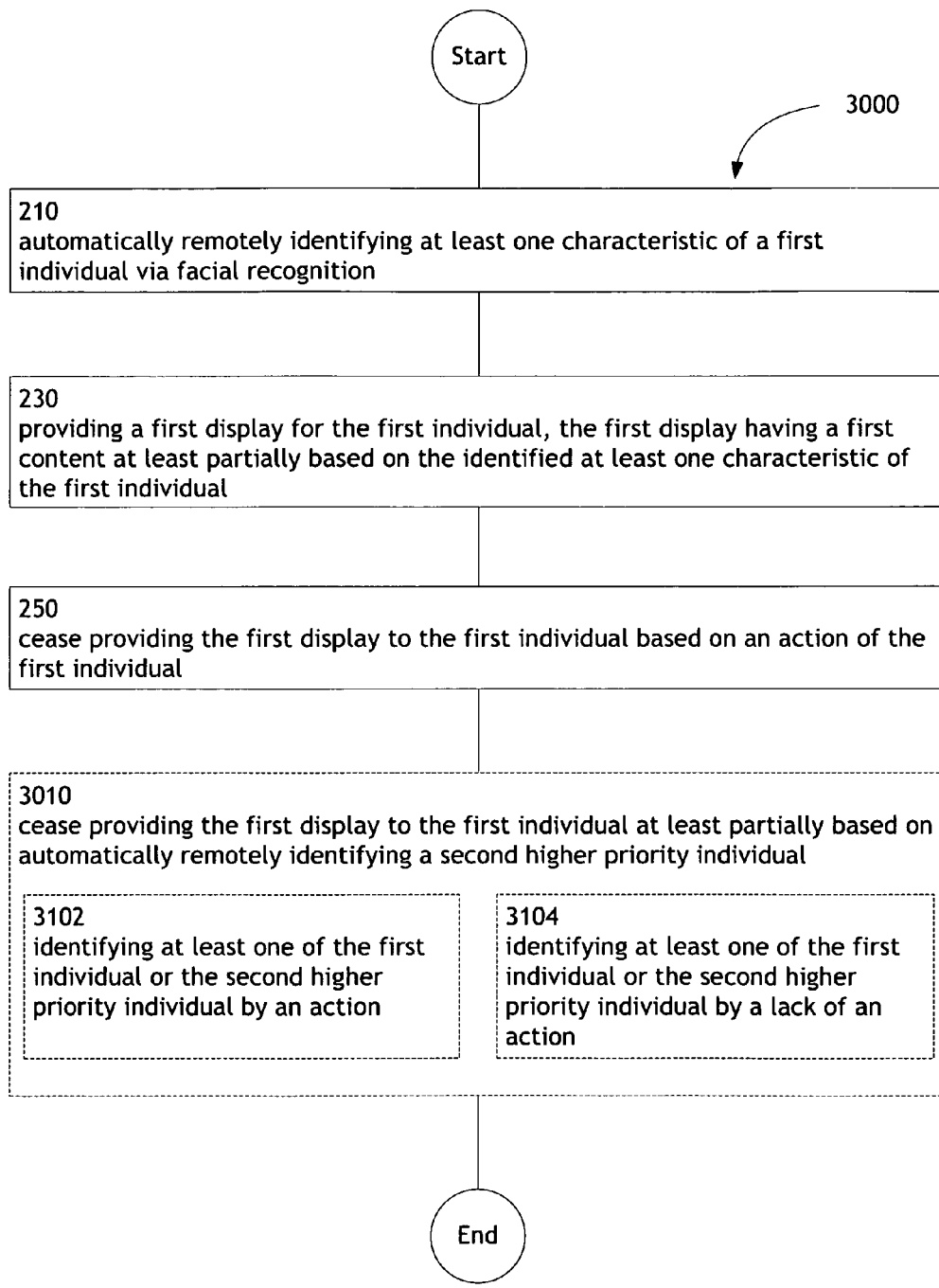
FIG. 31 illustrates an alternative embodiment of the operational flow of FIG. 30.

FIG. 31 illustrates alternative embodiments of the example operational flow 3000 of FIG. 30. FIG. 31 illustrates example embodiments where the operation 3010 may include at least one additional operation. Additional operations may include an operation 3102, and/or an operation 3104.

The operation 3102 illustrates identifying at least one of the first individual or the second higher priority individual by an action. For example, as shown in FIGS. 1A through 1M, the first individual 52 or the second higher priority individual 80 may be identified by an action.

The operation 3104 illustrates identifying at least one of the first individual or the second higher priority individual by a lack of an action. For example, as shown in FIGS. 1A through 1M, the first individual 52 or the second higher priority individual 80 may be identified by a lack of an action.

Figure 32:
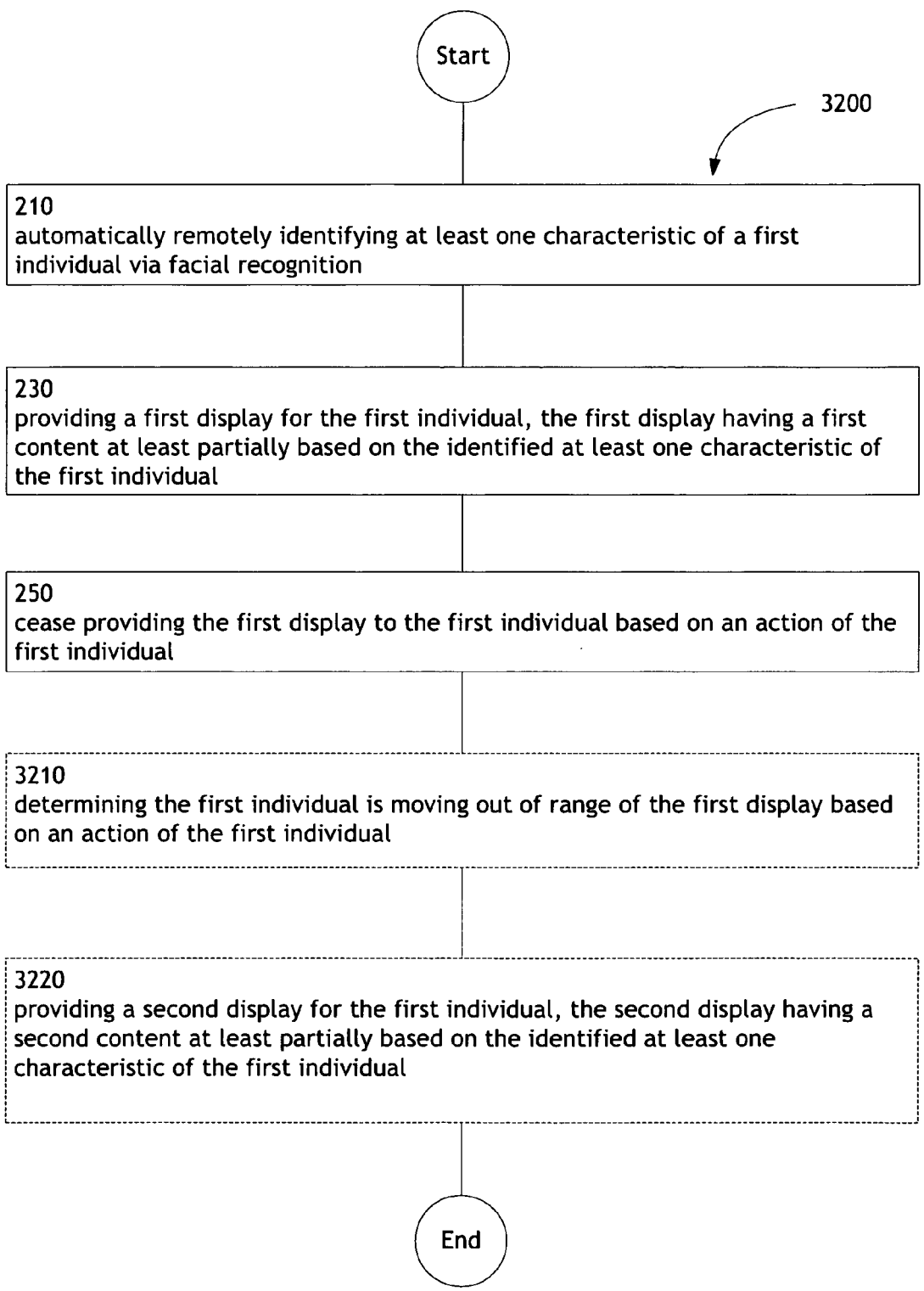
FIG. 32 illustrates an operational flow representing example operations related to automatically remotely identifying one or more characteristics of an individual utilizing facial recognition, providing a display for the individual having a content at least partially based on the one or more identified characteristics of the individual, cease providing the display to the individual based on an action of the individual, determining the individual is moving out of range of the display based on an action of the individual, and providing a second display for the individual, the second display having a second content at least partially based on the identified at least one characteristic of the individual.

FIG. 32 illustrates an operational flow 3200 representing example operations related to automatically remotely identifying one or more characteristics of an individual utilizing facial recognition and providing a display for the individual having a content at least partially based on the one or more identified characteristics of the individual. FIG. 32 illustrates an example embodiment where the example operational flow 200 of FIG. 2 may include at least one additional operation. Additional operations may include an operation 3210, and/or an operation 3220.

After a start operation, an operation 210, an operation 230, and an operation 250, the operational flow 3200 moves to an operation 3210. Operation 3210 illustrates determining the first individual is moving out of range of the first display based on an action of the first individual. For example, as shown in FIGS. 1A through 1M, the facial recognition module 50 may be utilized to determine the first individual 52 is moving out of range of the first display 56 based on an action of the first individual 52 (e.g., when the first individual 52 moves from a first region 58 where the first display 56 is visible to the first individual 52 to a second region 60 where the first display 56 is not visible to the first individual 52).

Then, operation 3220 illustrates providing a second display for the first individual, the second display having a second content at least partially based on the identified at least one characteristic of the first individual. For example, as shown in FIGS. 1A through 1M, the first display module 54 or the second display module 82 may be utilized to provide a second display 84 visible to the first individual 52, where the second display 84 has a second content at least partially based on one or more identified characteristics of the first individual 52.

FIG. 33 illustrates an operational flow 3300 representing example operations related to automatically remotely identifying one or more characteristics of an individual utilizing facial recognition and providing a display for the individual having a content at least partially based on the one or more identified characteristics of the individual. In FIG. 33 and in following figures that include various examples of operational flows, discussion and explanation may be provided with respect to the above-described examples of FIGS. 1A through 1M, and/or with respect to other examples and contexts. However, it should be understood that the operational flows may be executed in a number of other environments and contexts, and/or in modified versions of FIGS. 1A through 1M. Also, although the various operational flows are presented in the sequence(s) illustrated, it should be understood that the various operations may be performed in other orders than those which are illustrated, or may be performed concurrently.

After a start operation, an operation 210, an operation 220, an operation 230, and an operation 240, the operational flow 3300 moves to an operation 3310. Operation 3310 illustrates selecting the individual at least partially based on an orientation of the individual. For example, as shown in FIGS. 1A through 1M, the first individual 52 or the second individual 80 may be selected at least partially based on an orientation of the first individual 52 or the second individual 80. In an embodiment, the controller 132 coupled with the facial recognition module 50 may be utilized to select the first individual 52 at least partially based on an orientation of the first individual 52.

Figure 34:
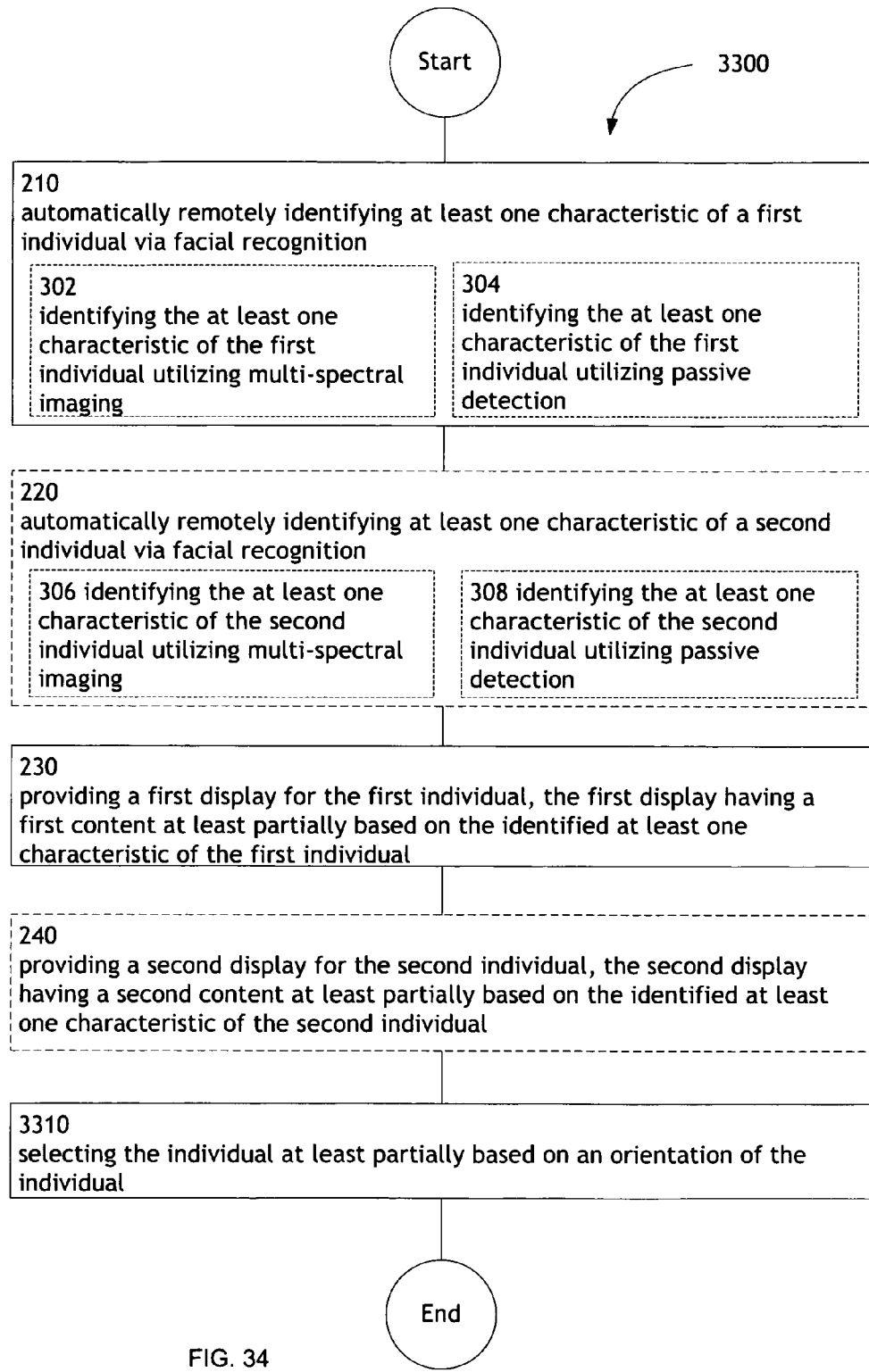
FIG. 34 illustrates an alternative embodiment of the operational flow of FIG. 33.

FIG. 34 illustrates alternative embodiments of the example operational flow 3300 of FIG. 33. FIG. 34 illustrates example embodiments where the operations 210 and 220 may include at least one additional operation. Additional operations may include an operation 302, an operation 304, an operation 306, and/or an operation 308.

Figure 35:
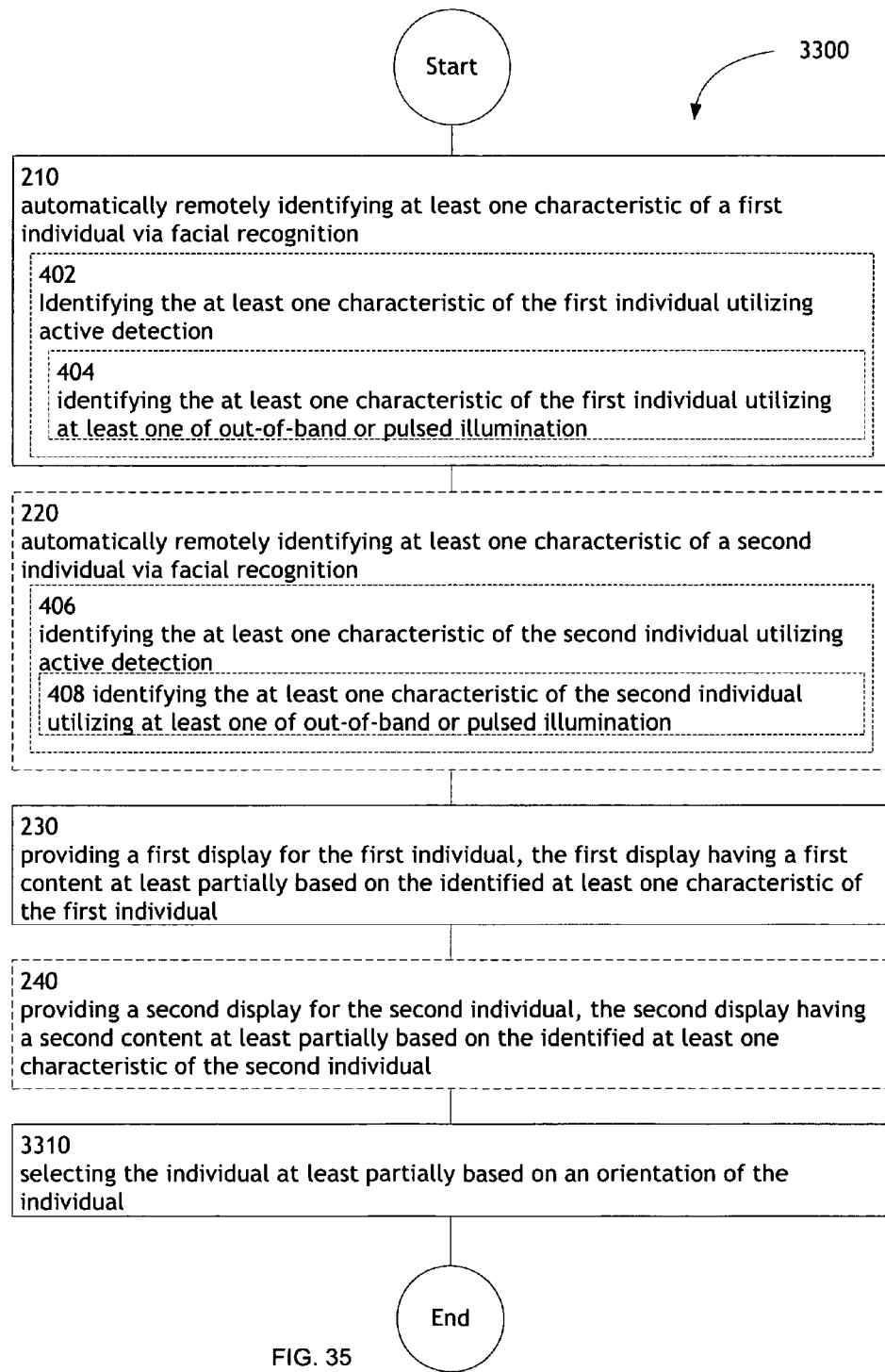
FIG. 35 illustrates an alternative embodiment of the operational flow of FIG. 33.

FIG. 35 illustrates alternative embodiments of the example operational flow 3300 of FIG. 33. FIG. 35 illustrates example embodiments where the operations 210 and 220 may include at least one additional operation. Additional operations may include an operation 402, an operation 404, an operation 406, and/or an operation 408.

Figure 36:
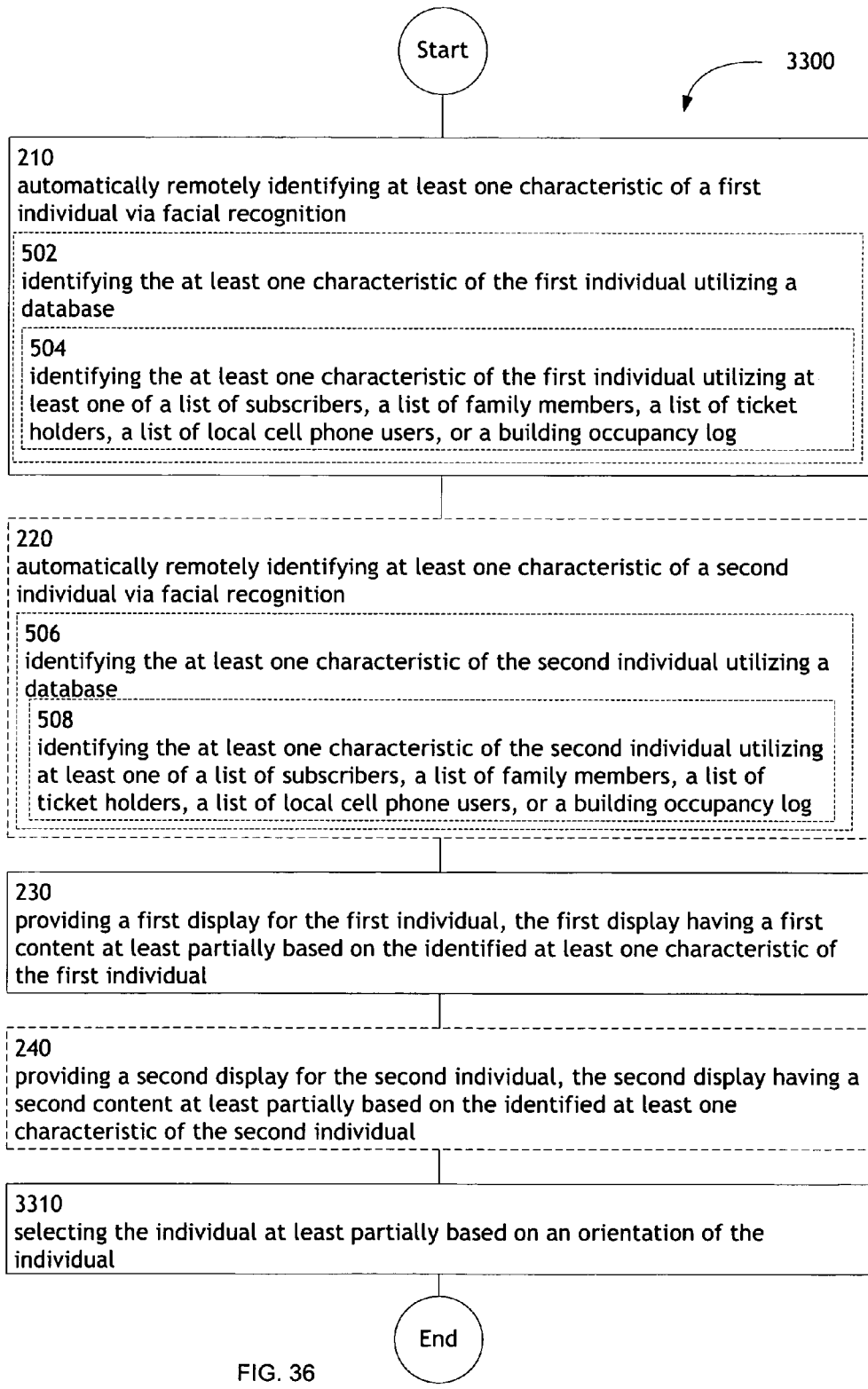
FIG. 36 illustrates an alternative embodiment of the operational flow of FIG. 33.

FIG. 36 illustrates alternative embodiments of the example operational flow 3300 of FIG. 33. FIG. 36 illustrates example embodiments where the operations 210 and 220 may include at least one additional operation. Additional operations may include an operation 502, an operation 504, an operation 506, and/or an operation 508.

Figure 37:
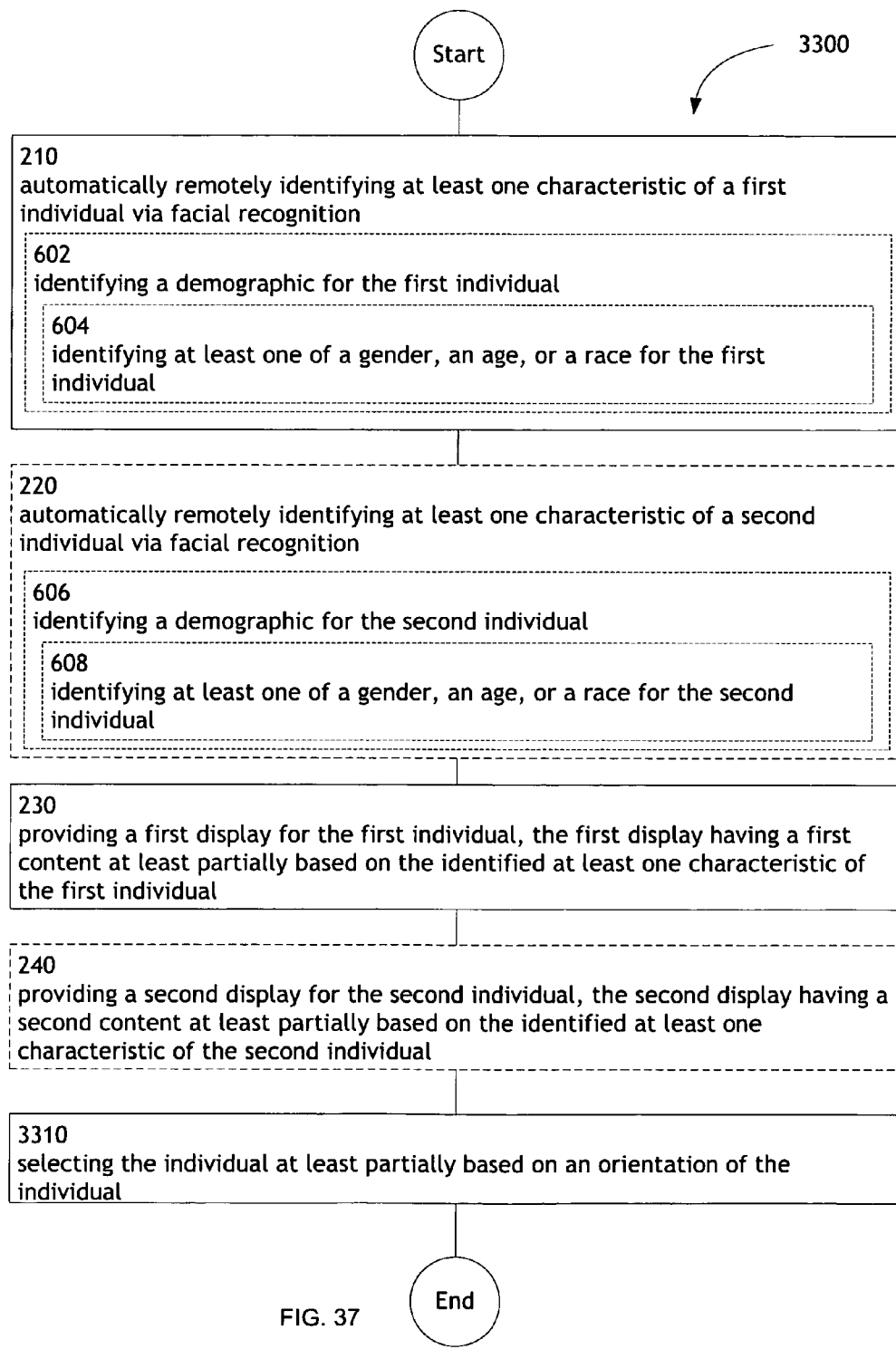
FIG. 37 illustrates an alternative embodiment of the operational flow of FIG. 33.

FIG. 37 illustrates alternative embodiments of the example operational flow 3300 of FIG. 33. FIG. 37 illustrates example embodiments where the operations 210 and 220 may include at least one additional operation. Additional operations may include an operation 602, an operation 604, an operation 606, and/or an operation 608.

Figure 38:
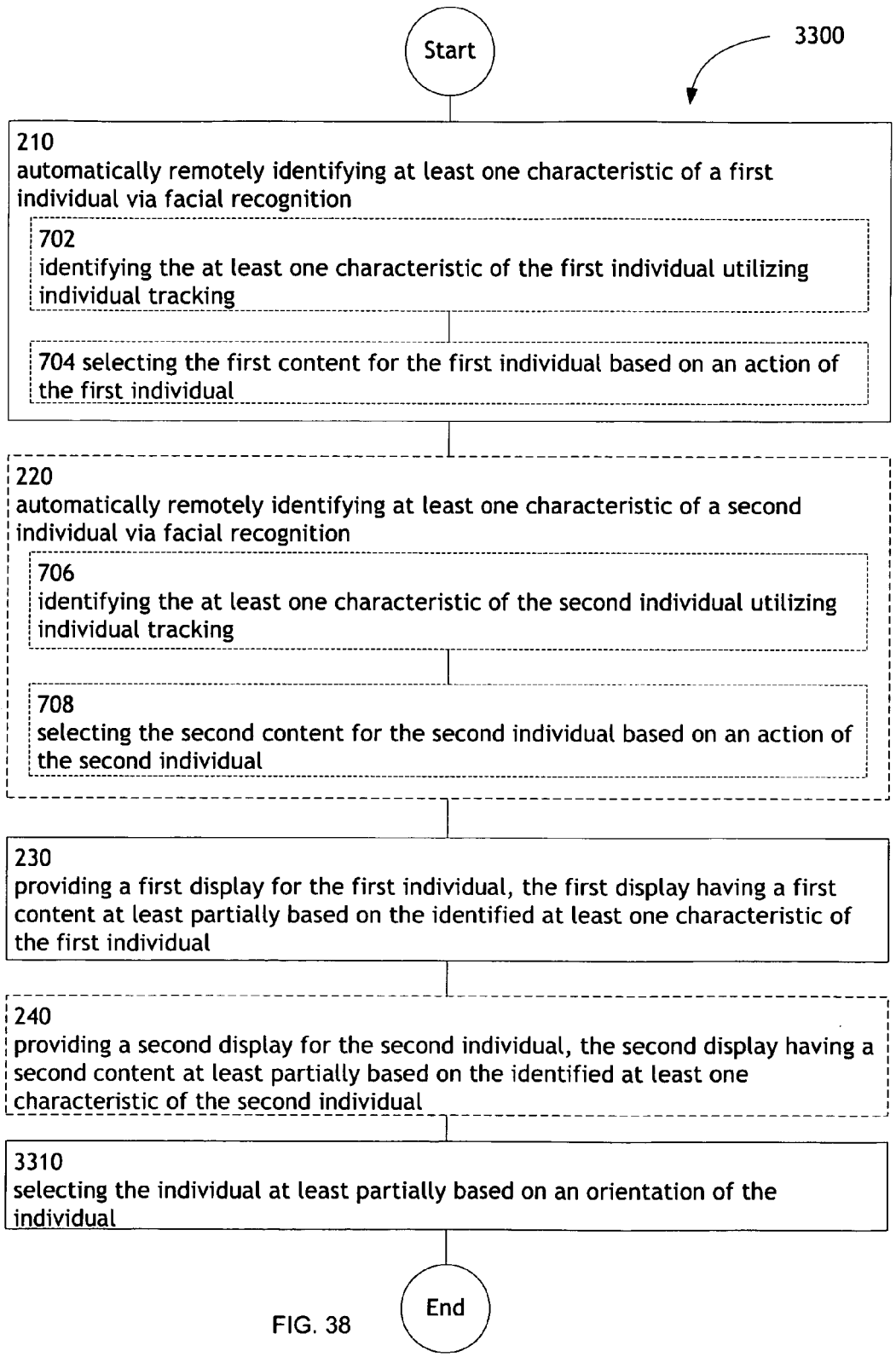
FIG. 38 illustrates an alternative embodiment of the operational flow of FIG. 33.

FIG. 38 illustrates alternative embodiments of the example operational flow 3300 of FIG. 33. FIG. 38 illustrates example embodiments where the operations 210 and 220 may include at least one additional operation. Additional operations may include an operation 702, an operation 704, an operation 706, and/or an operation 708.

Figure 39A:
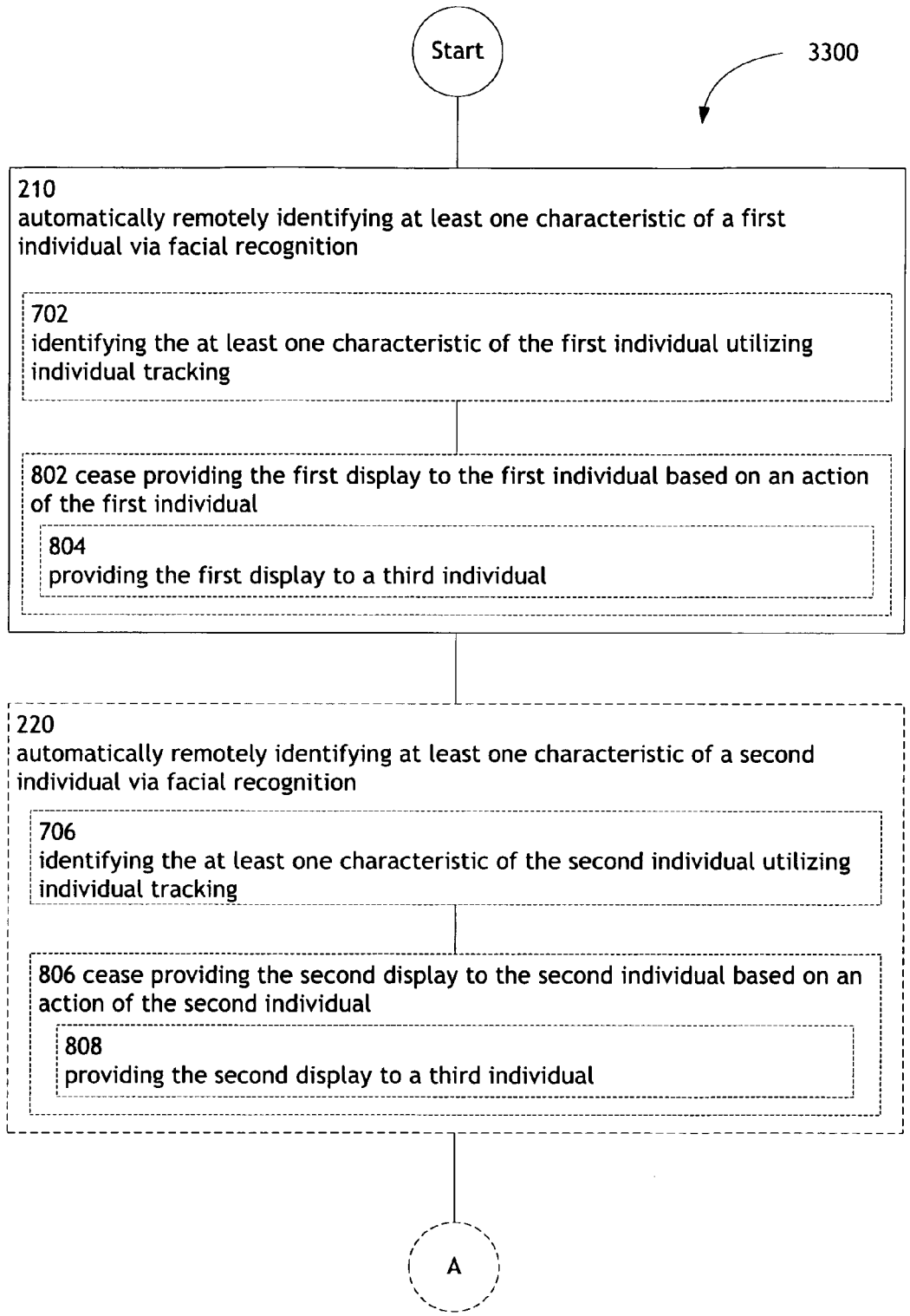
FIG. 39 illustrates an alternative embodiment of the operational flow of FIG. 33.
Figure 39B:
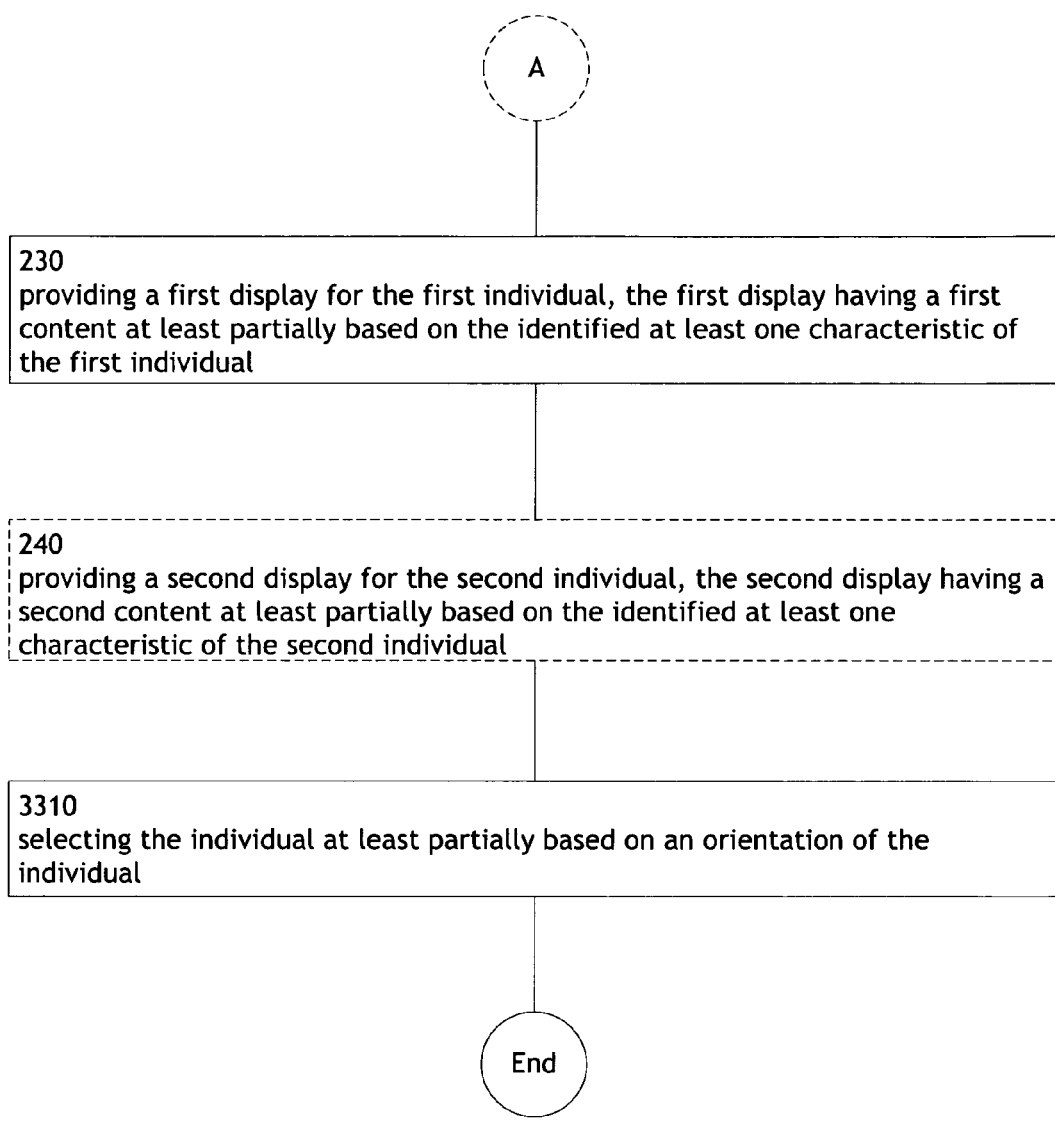

FIG. 39 illustrates alternative embodiments of the example operational flow 3300 of FIG. 33. FIG. 39 illustrates example embodiments where the operations 210 and 220 may include at least one additional operation. Additional operations may include an operation 802, an operation 804, an operation 806, and/or an operation 808.

Figure 40:
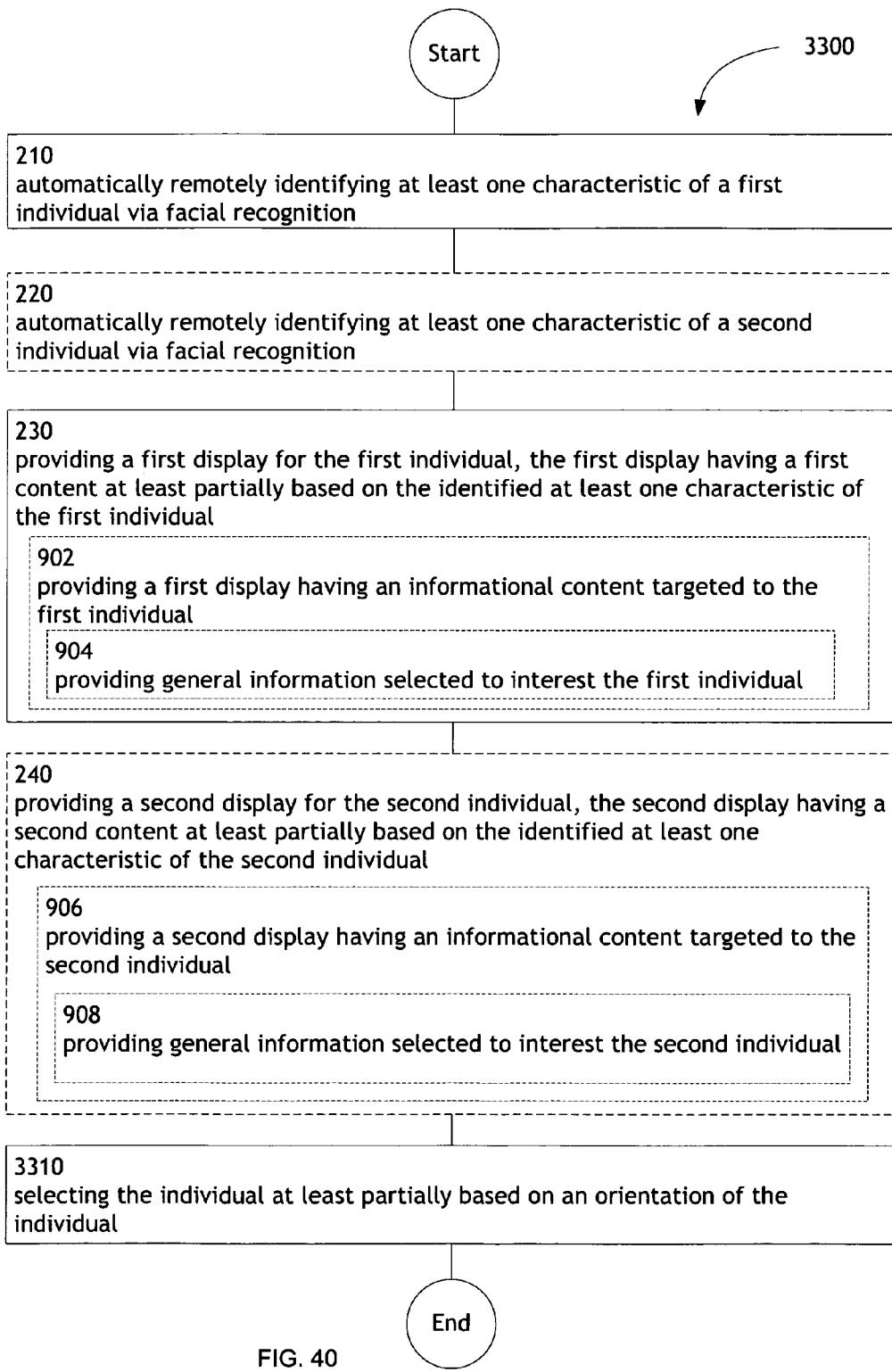
FIG. 40 illustrates an alternative embodiment of the operational flow of FIG. 33.

FIG. 40 illustrates alternative embodiments of the example operational flow 3300 of FIG. 33. FIG. 40 illustrates example embodiments where the operations 230 and 240 may include at least one additional operation. Additional operations may include an operation 902, an operation 904, an operation 906, and/or an operation 908.

Figure 41A:
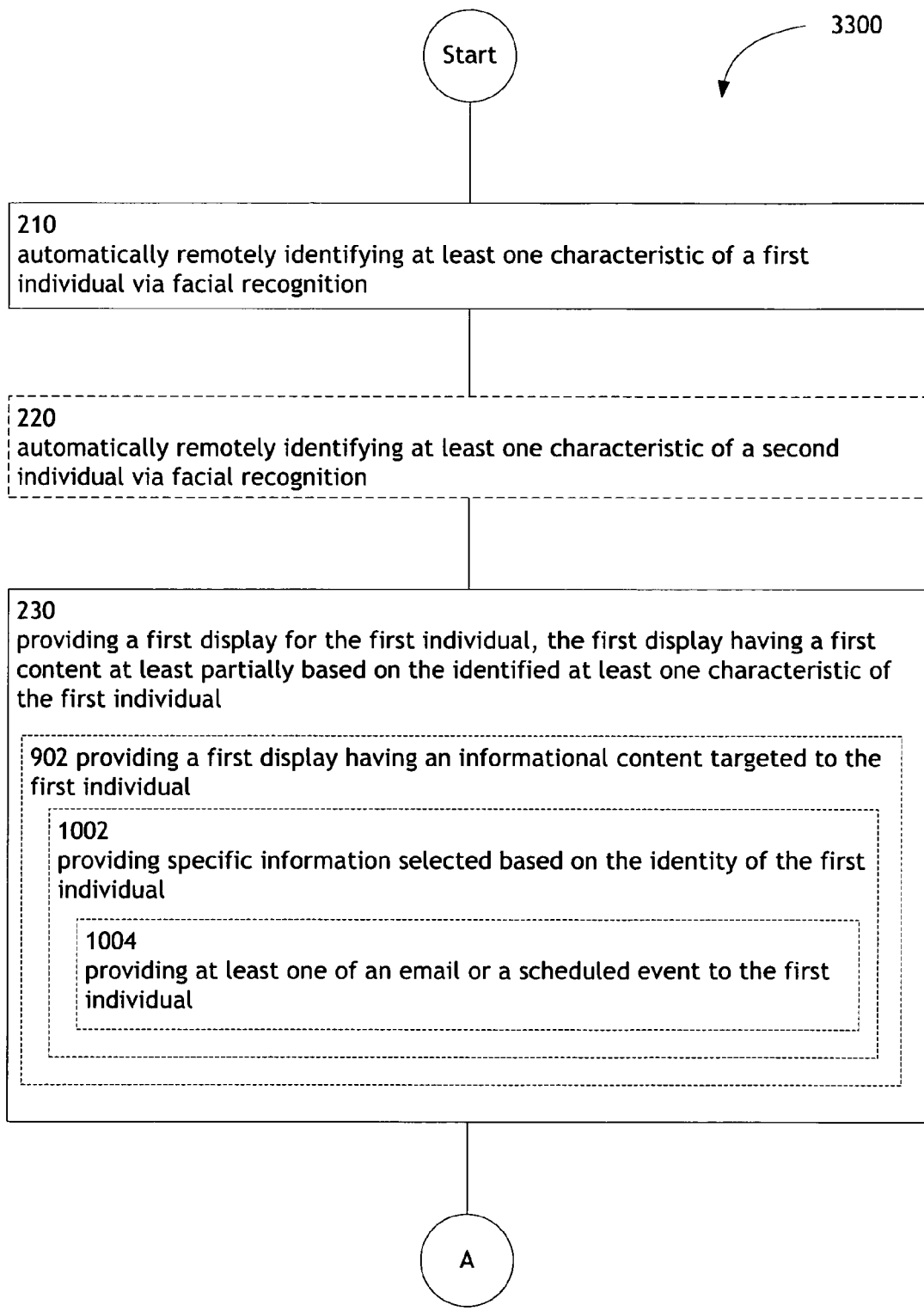
FIG. 41 illustrates an alternative embodiment of the operational flow of FIG. 33.

FIG. 41 illustrates alternative embodiments of the example operational flow 3300 of FIG. 33. FIG. 41 illustrates example embodiments where the operations 230 and 240 may include at least one additional operation. Additional operations may include an operation 1002, an operation 1004, an operation 1006, and/or an operation 1008.

Figure 42:
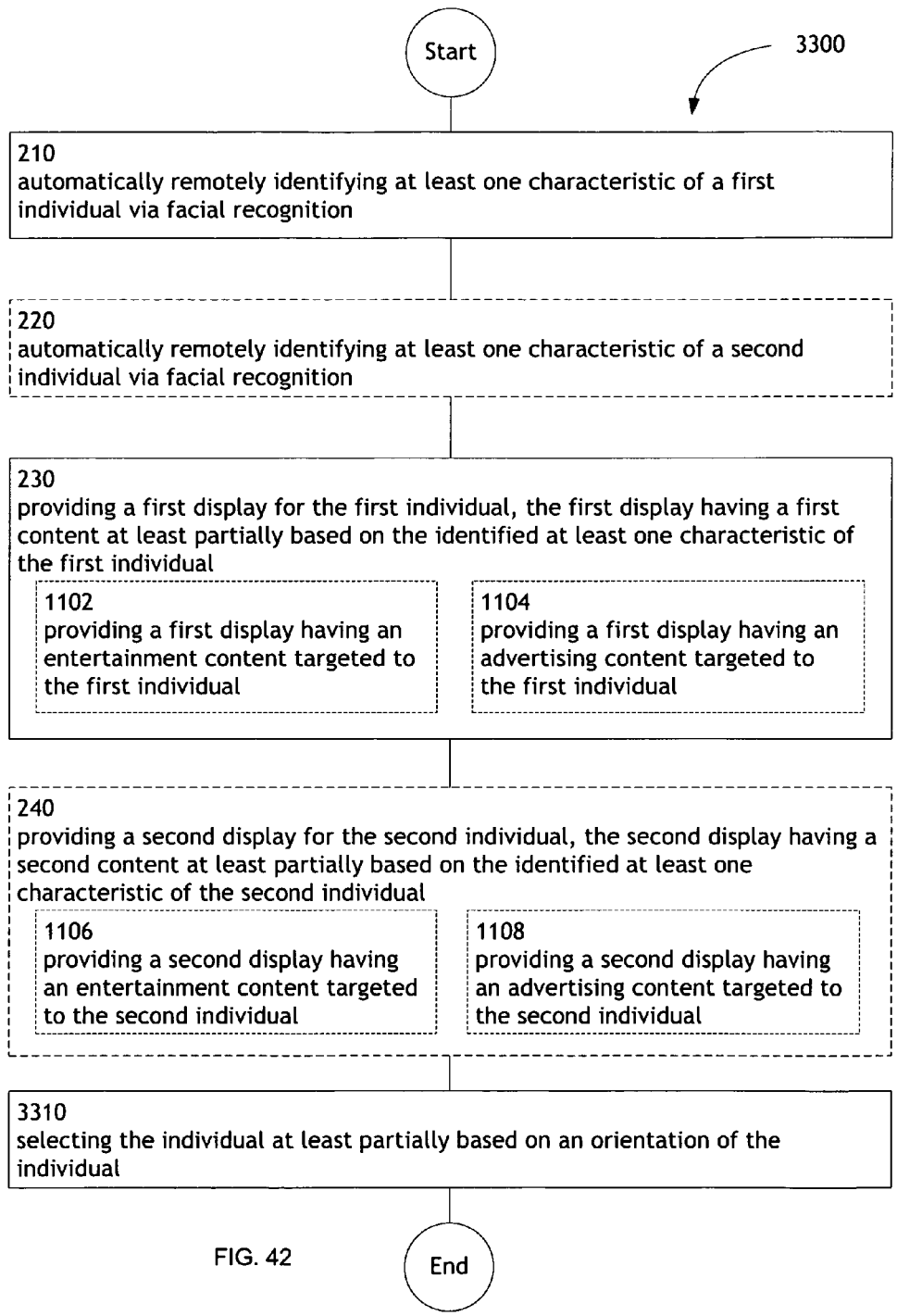
FIG. 42 illustrates an alternative embodiment of the operational flow of FIG. 33.

FIG. 42 illustrates alternative embodiments of the example operational flow 3300 of FIG. 33. FIG. 42 illustrates example embodiments where the operations 230 and 240 may include at least one additional operation. Additional operations may include an operation 1102, an operation 1104, an operation 1106, and/or an operation 1108.

Figure 43:
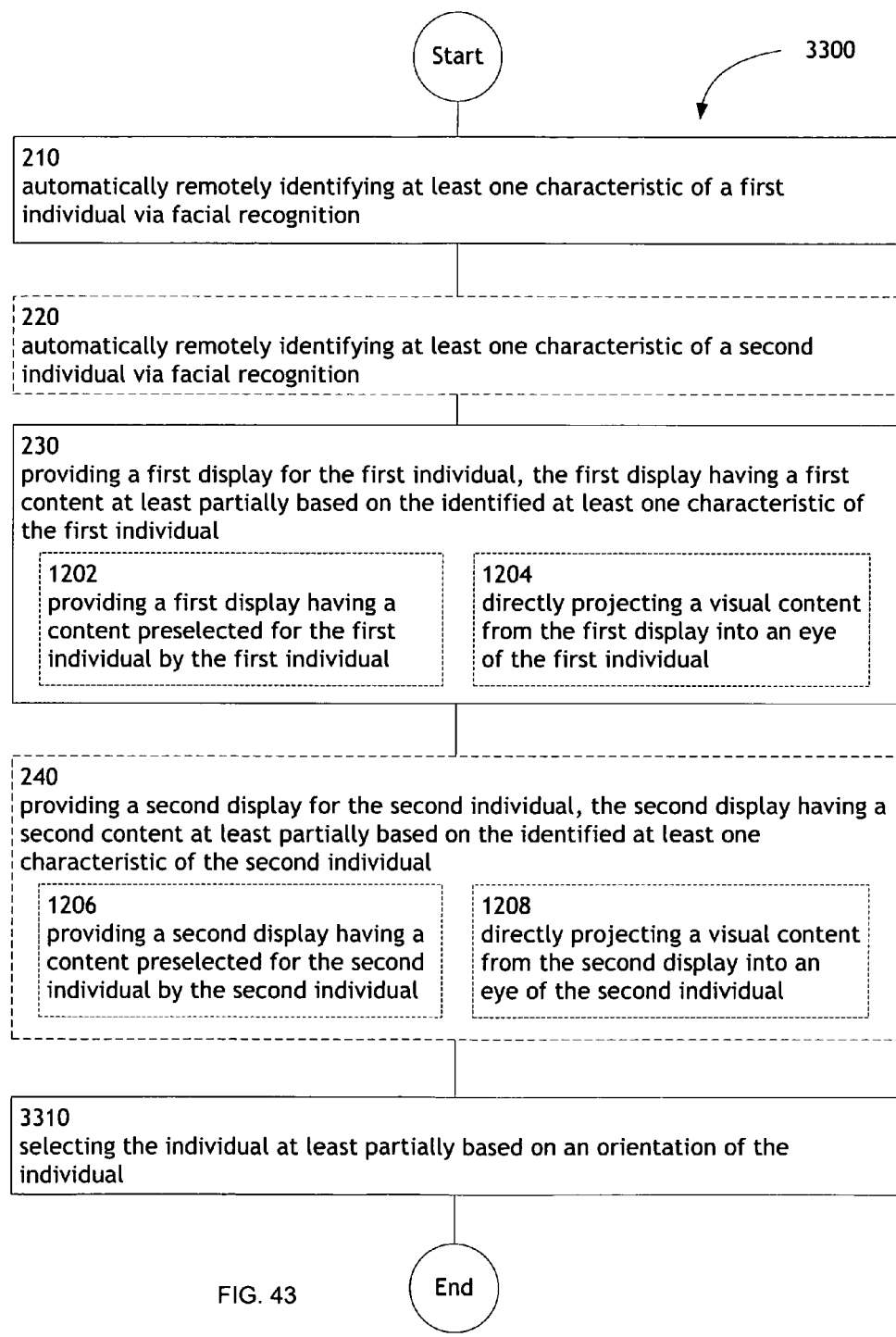
FIG. 43 illustrates an alternative embodiment of the operational flow of FIG. 33.

FIG. 43 illustrates alternative embodiments of the example operational flow 3300 of FIG. 33. FIG. 43 illustrates example embodiments where the operations 230 and 240 may include at least one additional operation. Additional operations may include an operation 1202, an operation 1204, an operation 1206, and/or an operation 1208.

Figure 44:
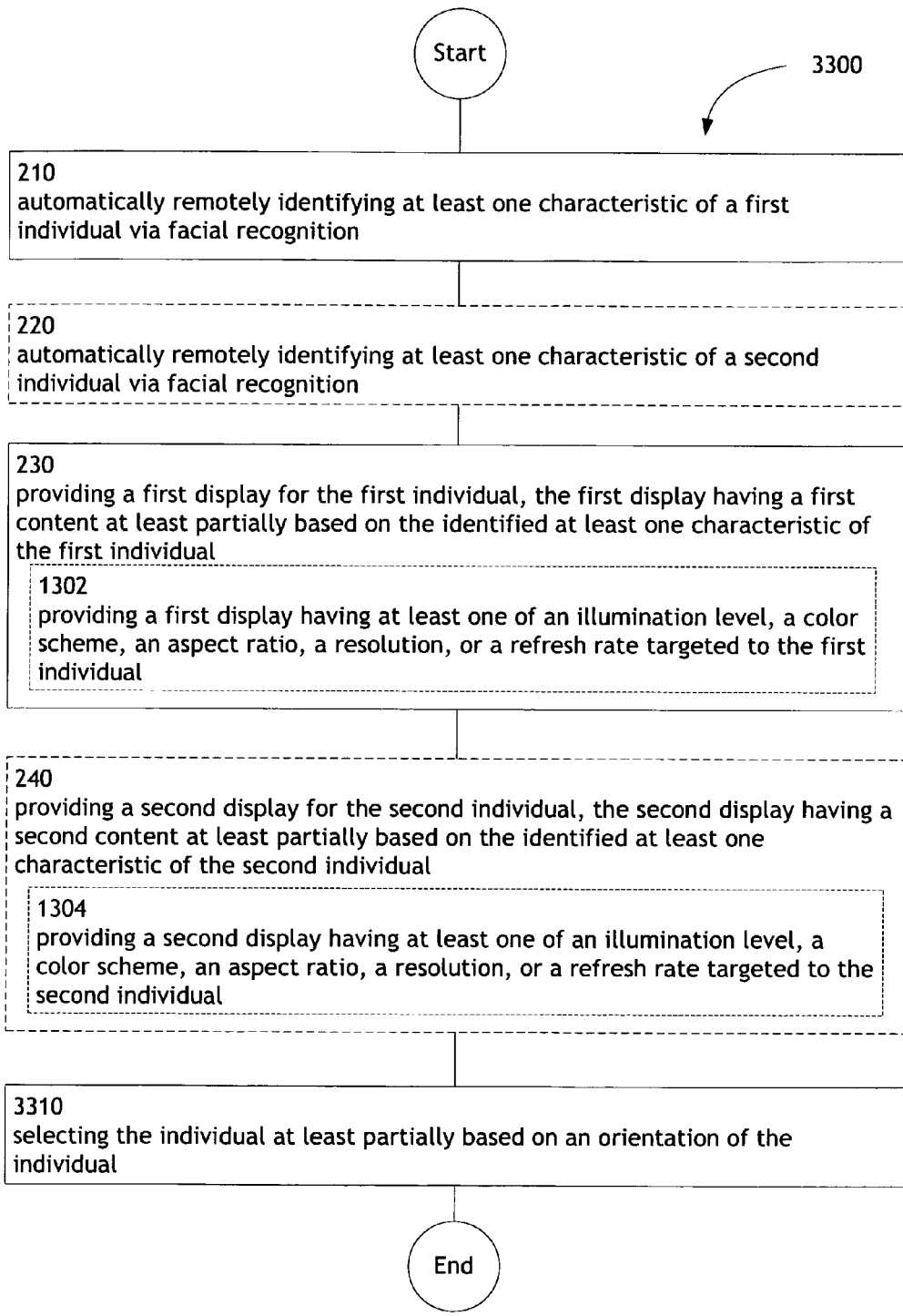
FIG. 44 illustrates an alternative embodiment of the operational flow of FIG. 33.

FIG. 44 illustrates alternative embodiments of the example operational flow 3300 of FIG. 33. FIG. 44 illustrates example embodiments where the operations 230 and 240 may include at least one additional operation. Additional operations may include an operation 1302 and/or an operation 1304.

Figure 45:
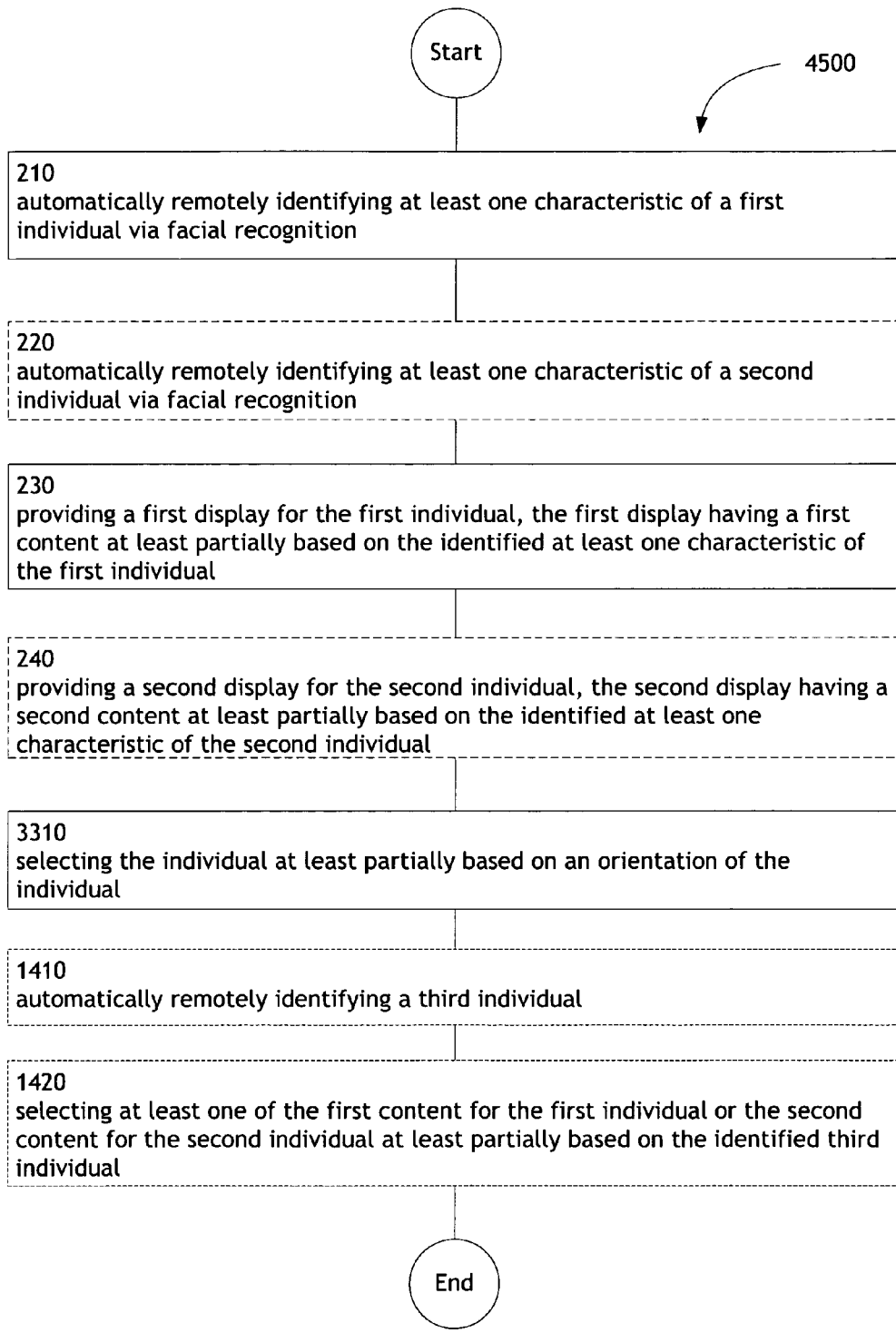
FIG. 45 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, automatically remotely identifying a third individual, and selecting the content for the first individual at least partially based on the identified third individual.

FIG. 45 illustrates an operational flow 4500 representing example operations related to automatically remotely identifying one or more characteristics of an individual utilizing facial recognition and providing a display for the individual having a content at least partially based on the one or more identified characteristics of the individual. FIG. 45 illustrates an example embodiment where the example operational flow 3300 of FIG. 33 may include at least one additional operation. Additional operations may include an operation 1410, and/or an operation 1420.

Figure 46A:
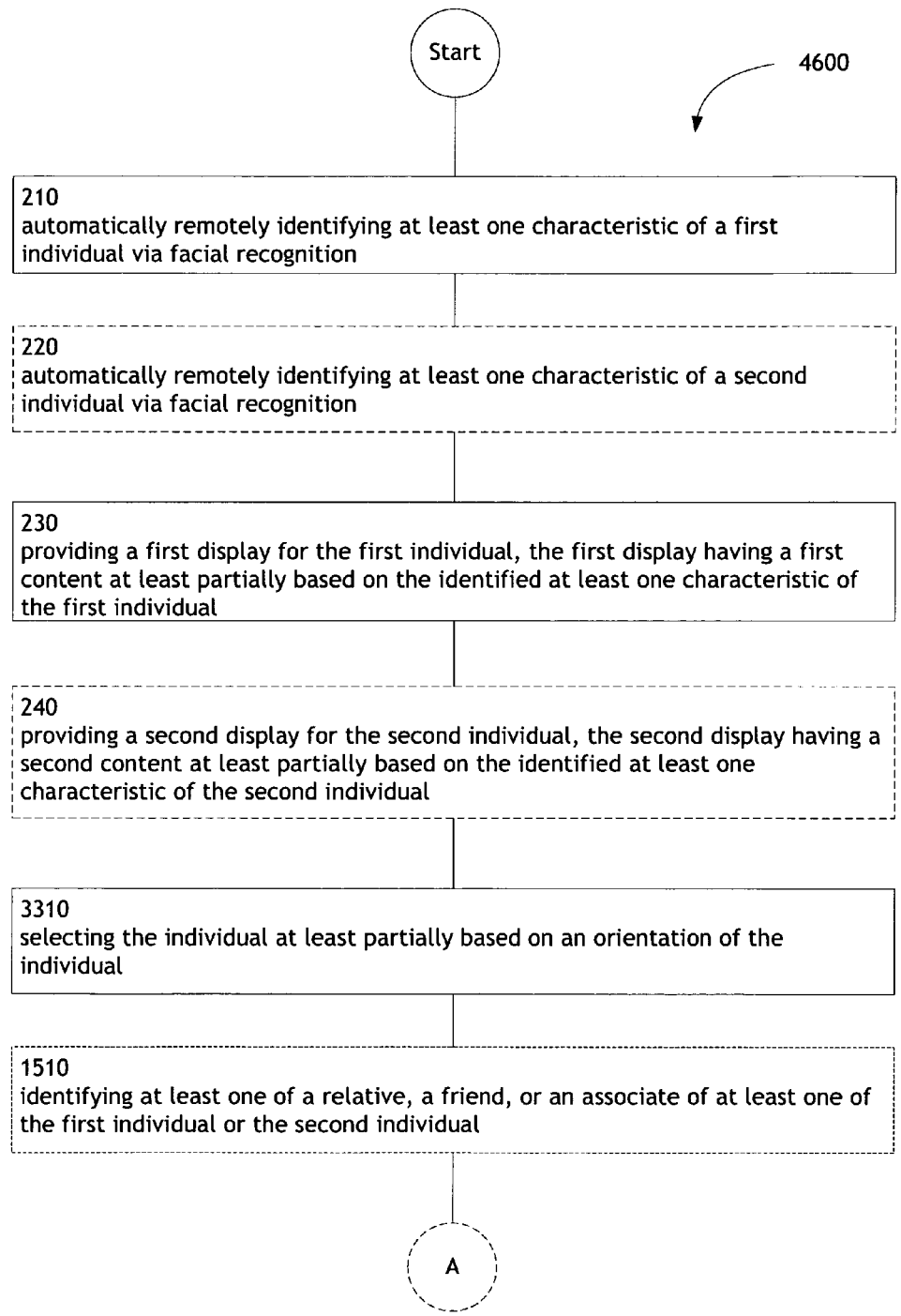
FIG. 46 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, identifying at least one of a relative, a friend, or an associate of the individual, and selecting the content for the individual at least partially based on the identity of the at least one of the relative, the friend, or the associate of the individual.

FIG. 46 illustrates an operational flow 4600 representing example operations related to automatically remotely identifying one or more characteristics of an individual utilizing facial recognition and providing a display for the individual having a content at least partially based on the one or more identified characteristics of the individual. FIG. 46 illustrates an example embodiment where the example operational flow 3300 of FIG. 33 may include at least one additional operation. Additional operations may include an operation 1510, an operation 1520, an operation 1522, and/or an operation 1524.

Figure 47:
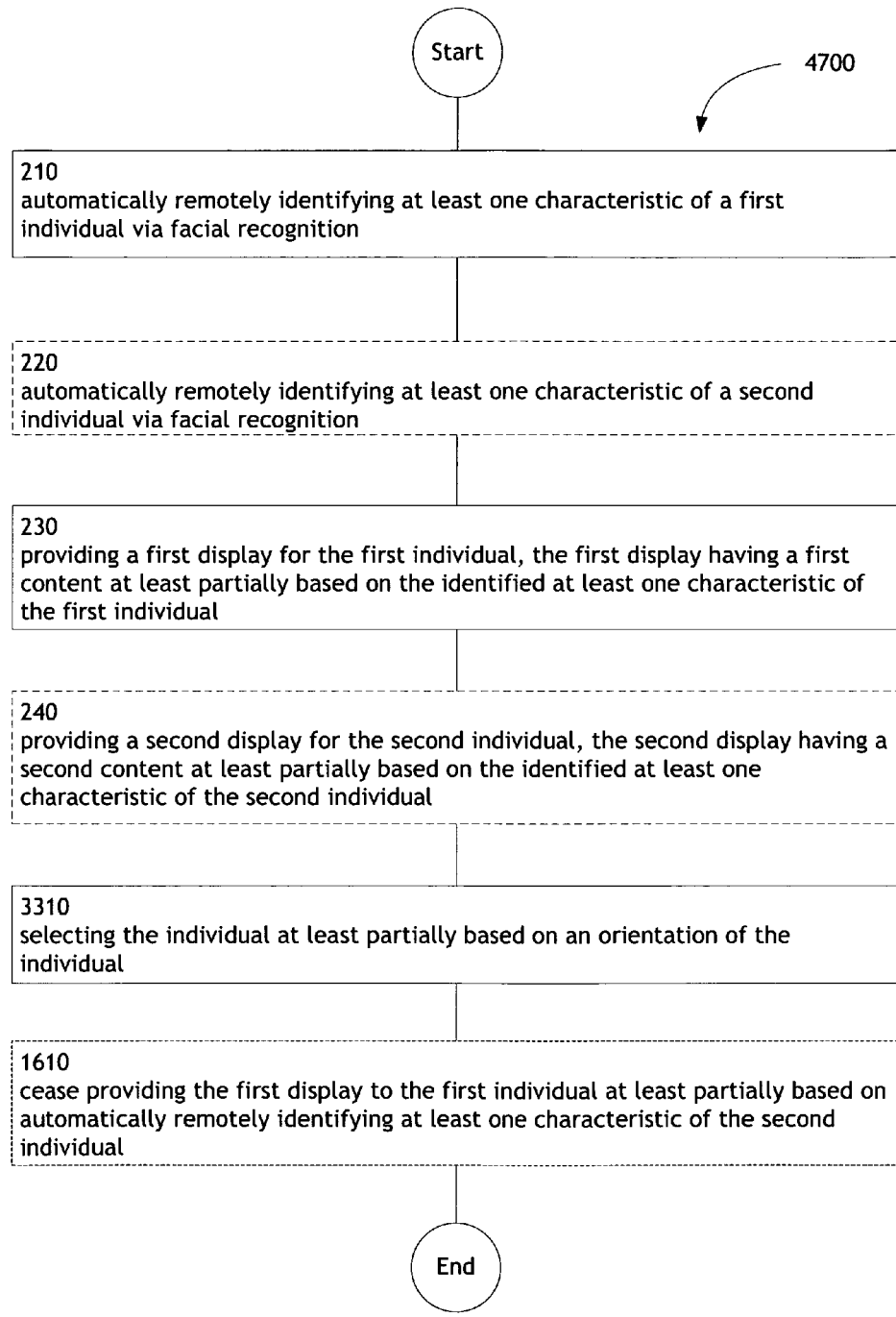
FIG. 47 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, and cease providing the display to the first individual at least partially based on automatically remotely identifying at least one characteristic of a second individual.

FIG. 47 illustrates an operational flow 4700 representing example operations related to automatically remotely identifying one or more characteristics of an individual utilizing facial recognition and providing a display for the individual having a content at least partially based on the one or more identified characteristics of the individual. FIG. 47 illustrates an example embodiment where the example operational flow 3300 of FIG. 33 may include at least one additional operation. Additional operations may include an operation 1610.

Figure 48A:
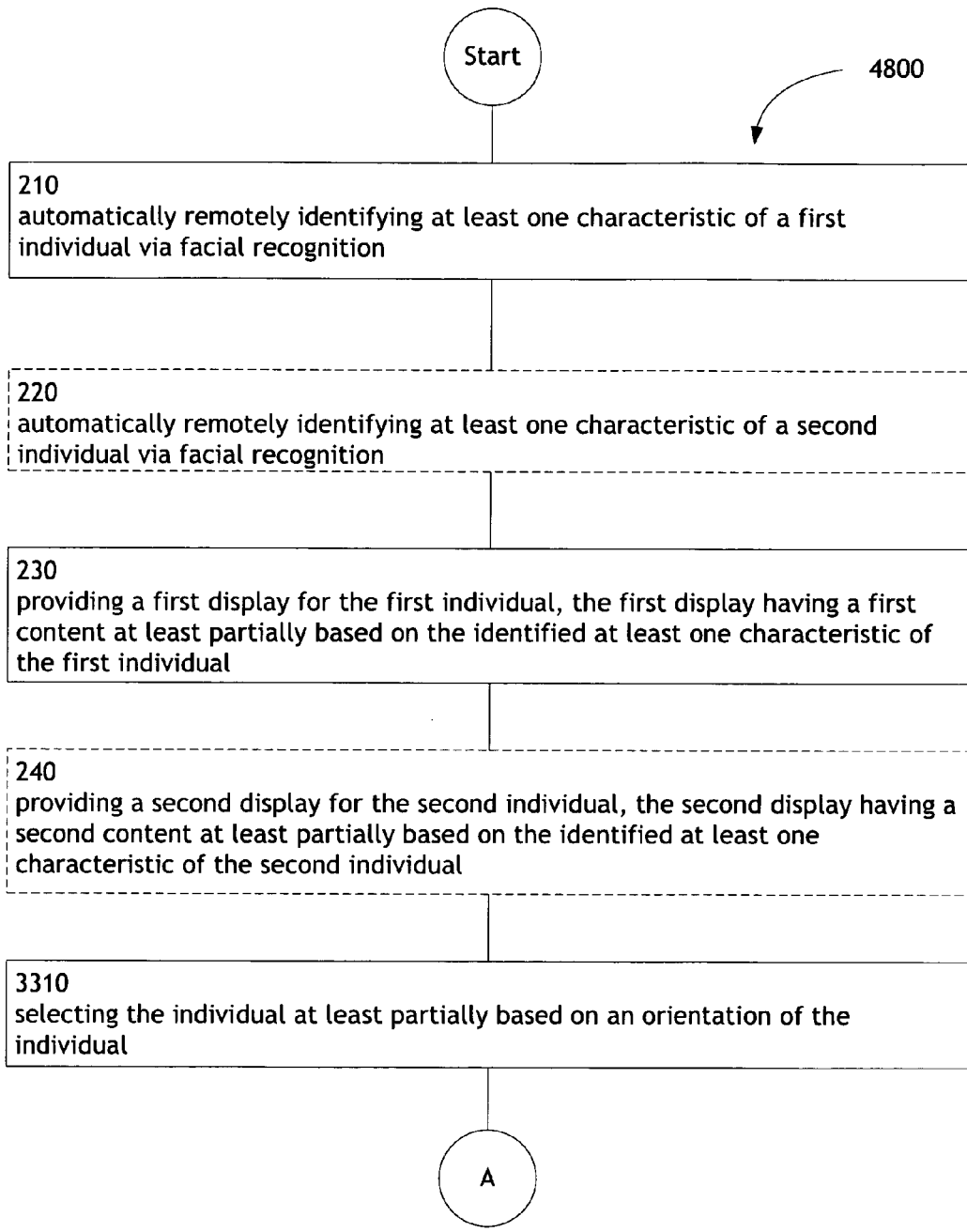
FIG. 48 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, automatically remotely identifying a third higher priority individual, and cease providing the display to the first individual at least partially based on the identified third higher priority individual.
Figure 48B:
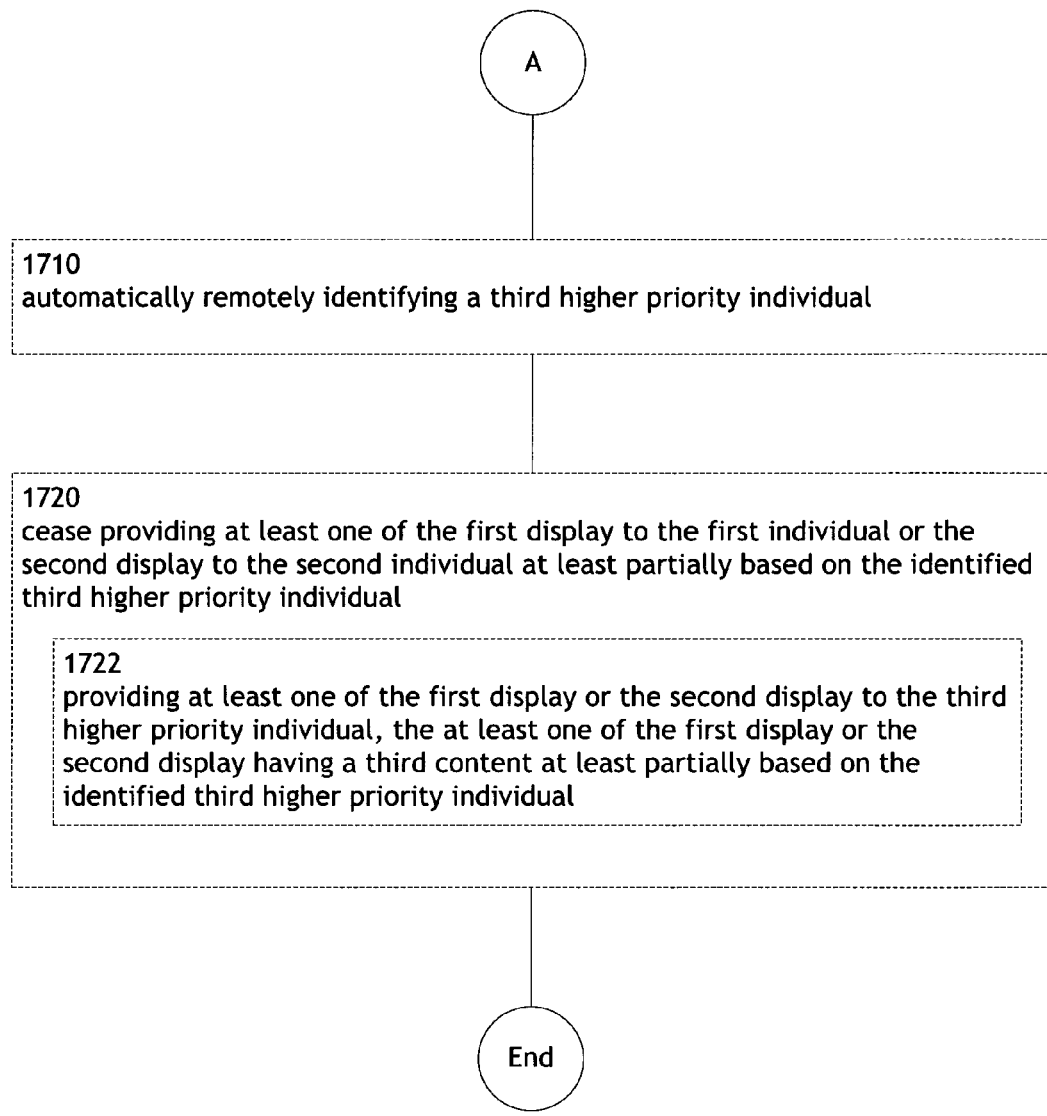

FIG. 48 illustrates an operational flow 4800 representing example operations related to automatically remotely identifying one or more characteristics of an individual utilizing facial recognition and providing a display for the individual having a content at least partially based on the one or more identified characteristics of the individual. FIG. 48 illustrates an example embodiment where the example operational flow 3300 of FIG. 33 may include at least one additional operation. Additional operations may include an operation 1710, an operation 1720, and/or an operation 1722.

Figure 49:
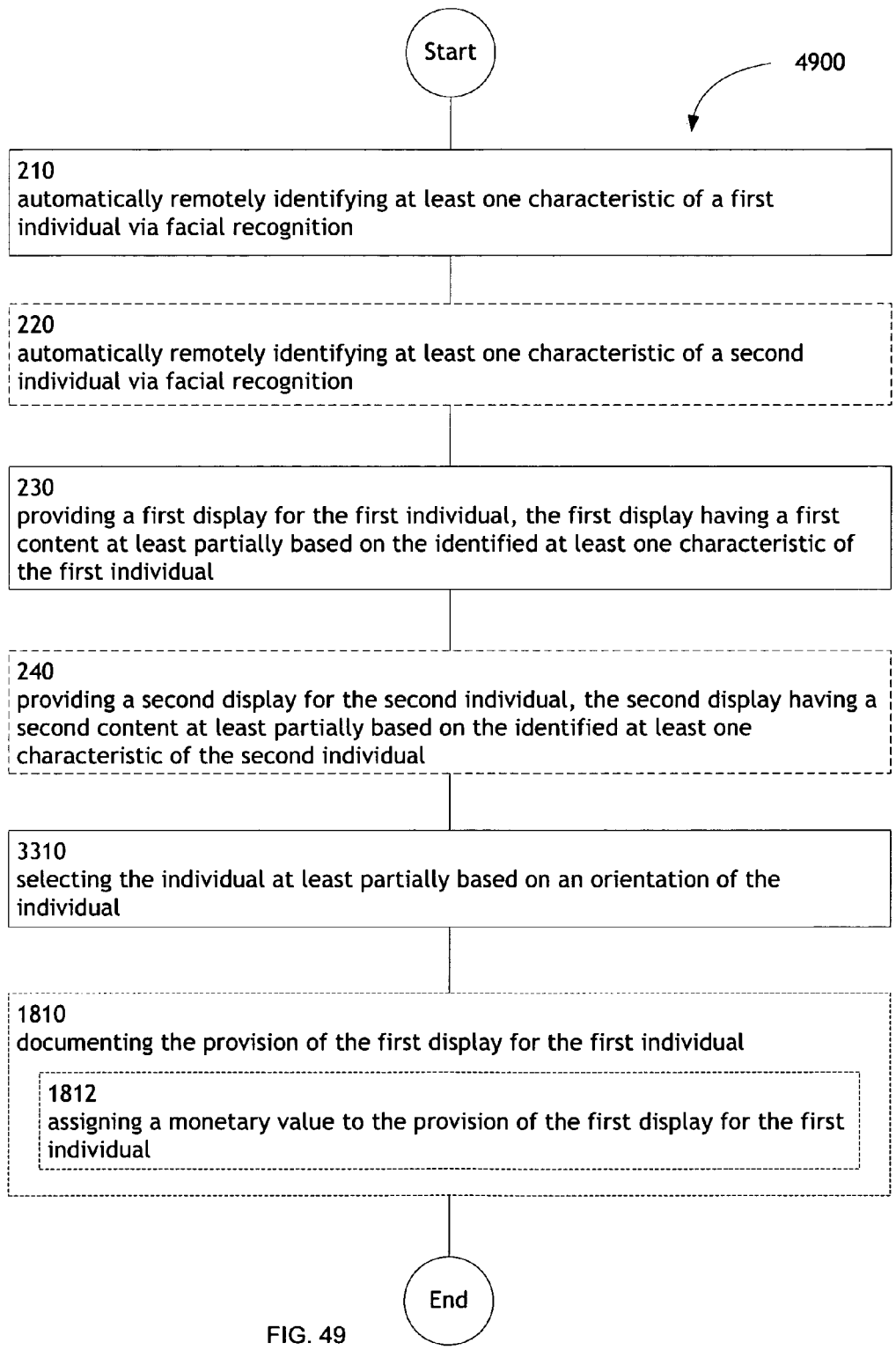
FIG. 49 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, and documenting the provision of the display for the individual.

FIG. 49 illustrates an operational flow 4900 representing example operations related to automatically remotely identifying one or more characteristics of an individual utilizing facial recognition and providing a display for the individual having a content at least partially based on the one or more identified characteristics of the individual. FIG. 49 illustrates an example embodiment where the example operational flow 3300 of FIG. 33 may include at least one additional operation. Additional operations may include an operation 1810, and/or an operation 1812.

Figure 50:
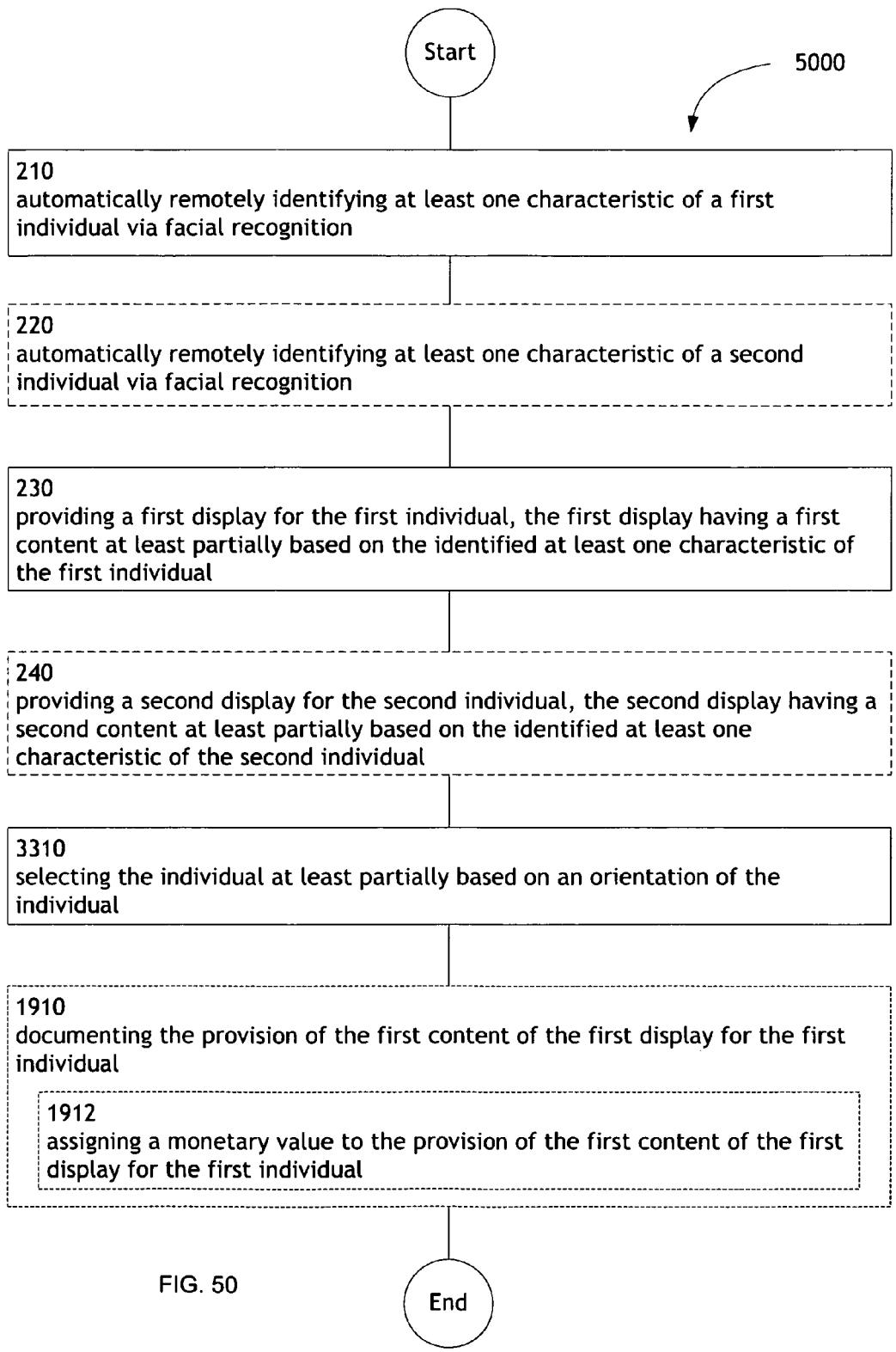
FIG. 50 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, and documenting the provision of the content of the display for the individual.

FIG. 50 illustrates an operational flow 5000 representing example operations related to automatically remotely identifying one or more characteristics of an individual utilizing facial recognition and providing a display for the individual having a content at least partially based on the one or more identified characteristics of the individual. FIG. 50 illustrates an example embodiment where the example operational flow 3300 of FIG. 33 may include at least one additional operation. Additional operations may include an operation 1910, and/or an operation 1912.

Figure 51:
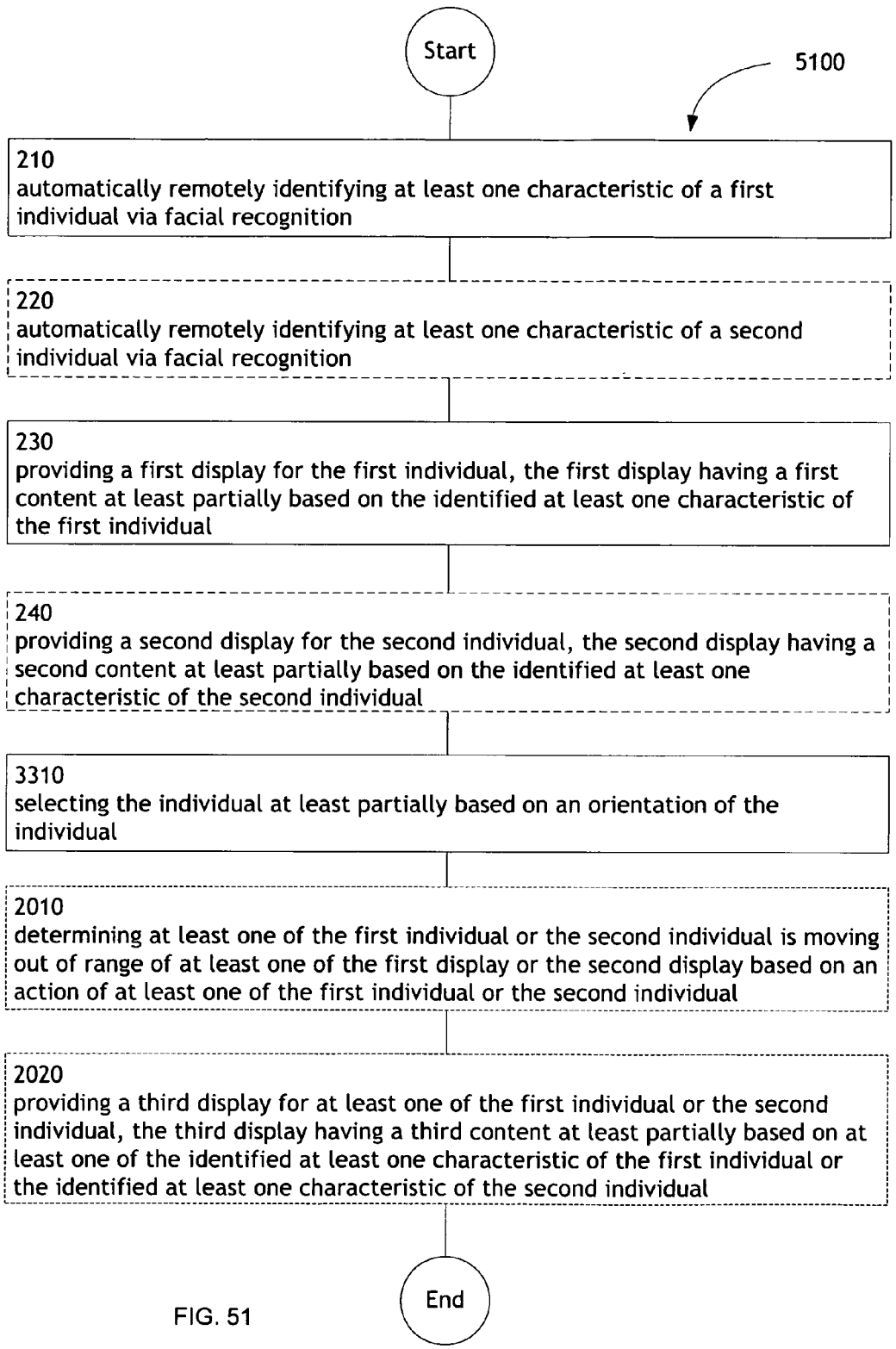
FIG. 51 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, determining the individual is moving out of range of the display based on an action of the individual, and providing a third display for the individual, the third display having a third content at least partially based on the identified at least one characteristic of the individual.

FIG. 51 illustrates an operational flow 5100 representing example operations related to automatically remotely identifying one or more characteristics of an individual utilizing facial recognition and providing a display for the individual having a content at least partially based on the one or more identified characteristics of the individual. FIG. 51 illustrates an example embodiment where the example operational flow 3300 of FIG. 33 may include at least one additional operation. Additional operations may include an operation 2010, and/or an operation 2020.

Figure 52:
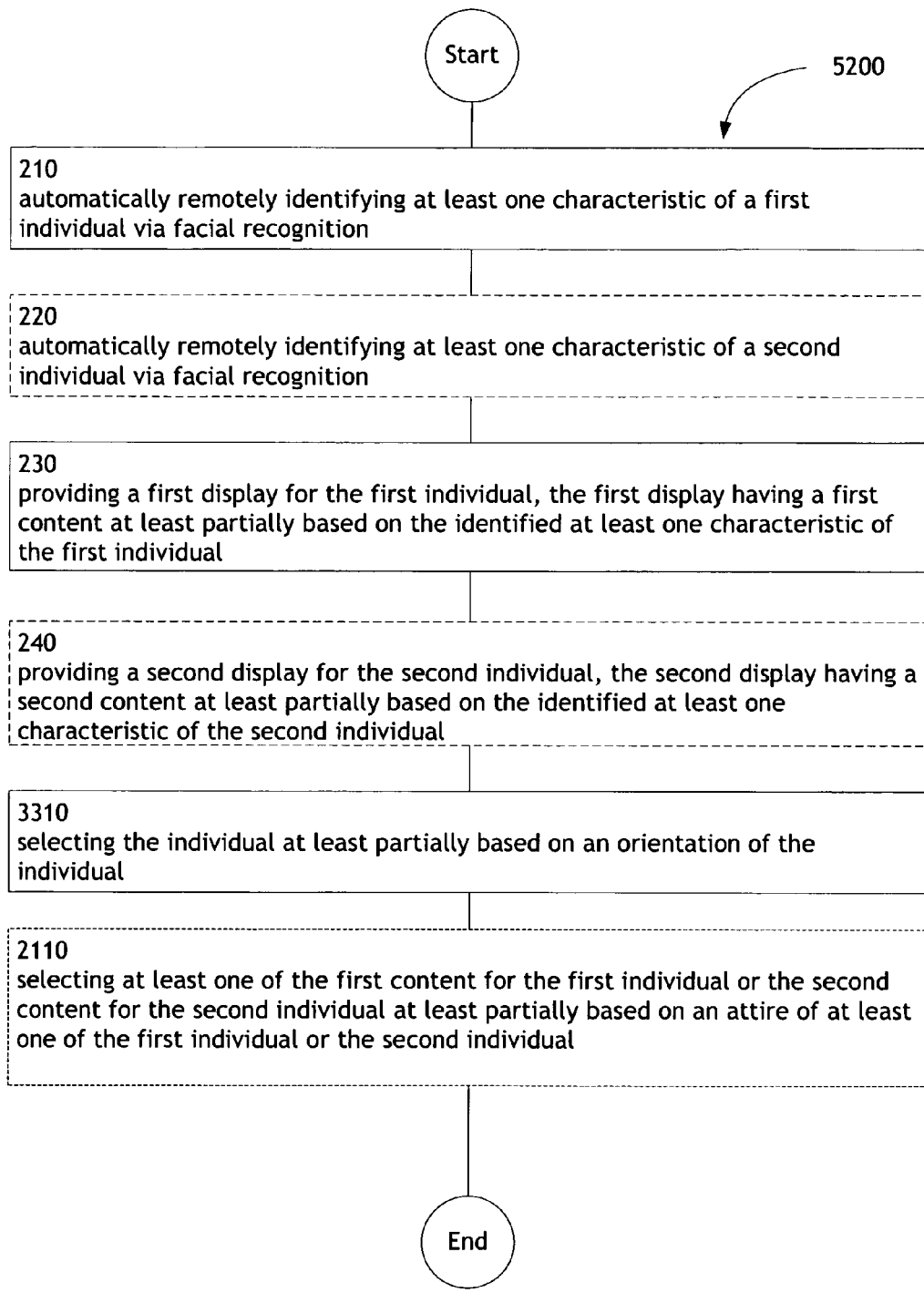
FIG. 52 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, selecting the content for the individual at least partially based on an attire of the individual.

FIG. 52 illustrates an operational flow 5200 representing example operations related to automatically remotely identifying one or more characteristics of an individual utilizing facial recognition and providing a display for the individual having a content at least partially based on the one or more identified characteristics of the individual. FIG. 52 illustrates an example embodiment where the example operational flow 3300 of FIG. 33 may include at least one additional operation. Additional operations may include an operation 2110.

Figure 53:
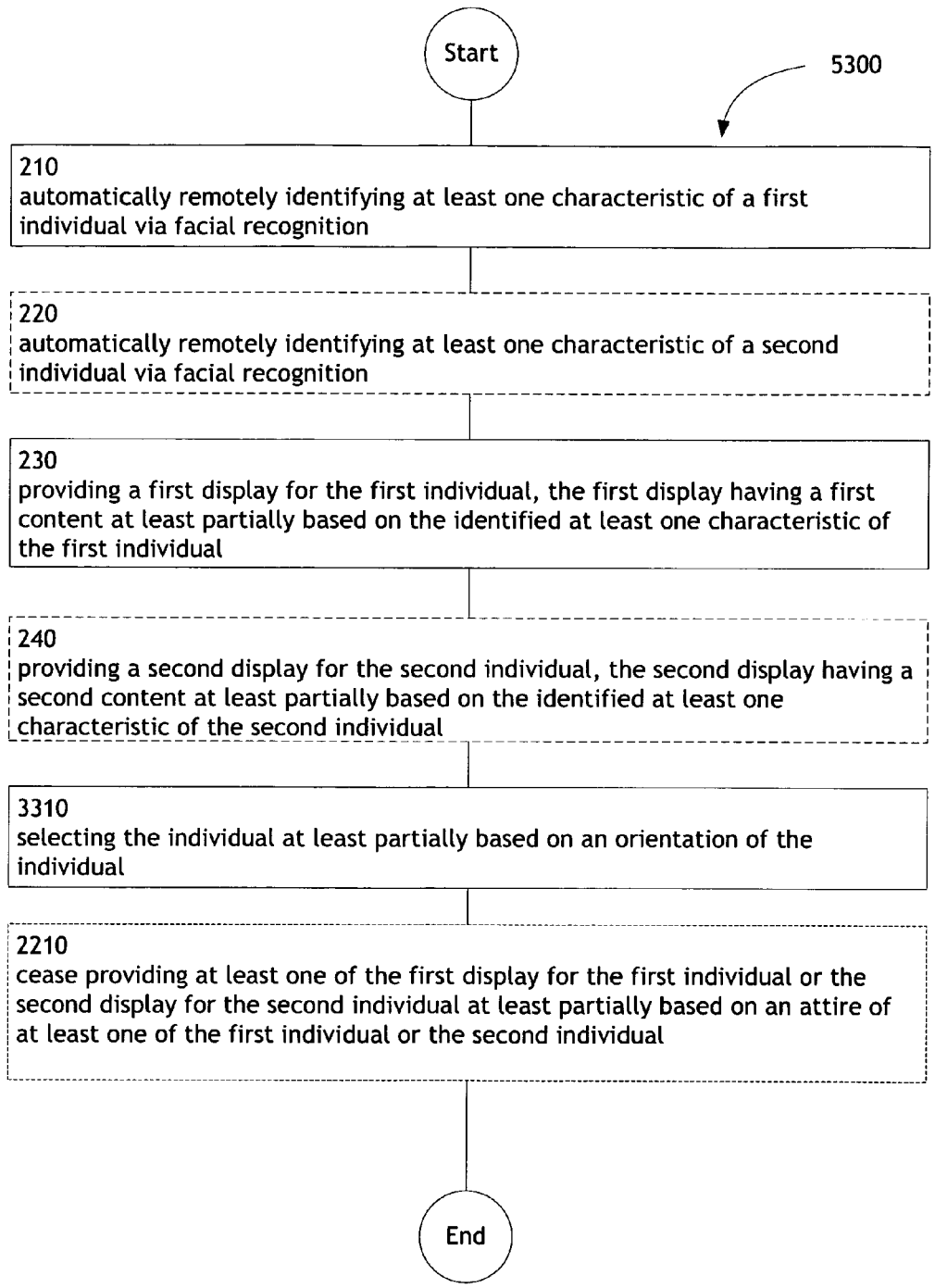
FIG. 53 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, and cease providing the display for the individual at least partially based on an attire of the individual.

FIG. 53 illustrates an operational flow 5300 representing example operations related to automatically remotely identifying one or more characteristics of an individual utilizing facial recognition and providing a display for the individual having a content at least partially based on the one or more identified characteristics of the individual. FIG. 53 illustrates an example embodiment where the example operational flow 3300 of FIG. 33 may include at least one additional operation. Additional operations may include an operation 2210.

Figure 54:
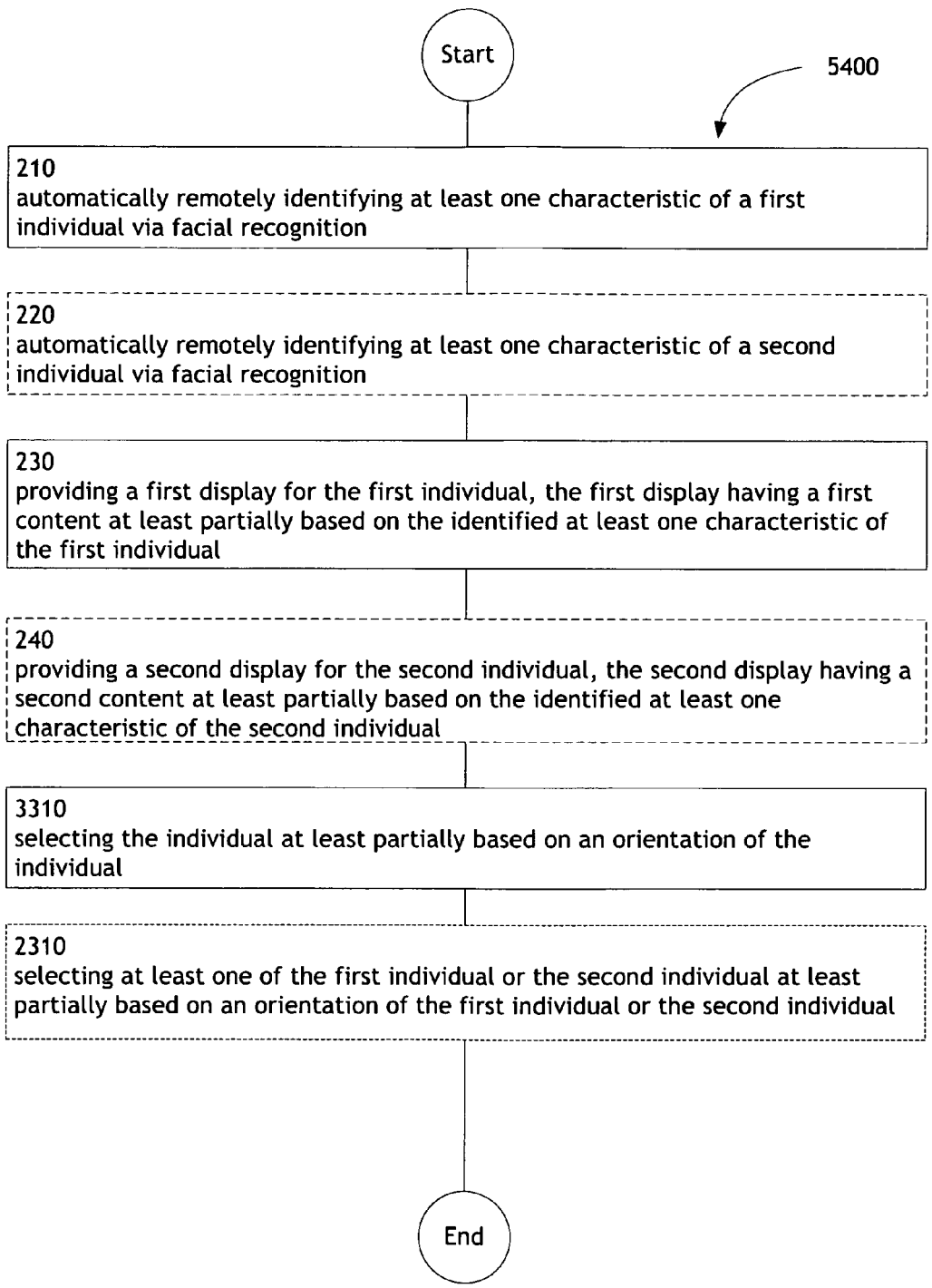
FIG. 54 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, and selecting the individual at least partially based on an orientation of the individual.

FIG. 54 illustrates an operational flow 5400 representing example operations related to automatically remotely identifying one or more characteristics of an individual utilizing facial recognition and providing a display for the individual having a content at least partially based on the one or more identified characteristics of the individual. FIG. 54 illustrates an example embodiment where the example operational flow 3300 of FIG. 33 may include at least one additional operation. Additional operations may include an operation 2310.

Figure 55A:
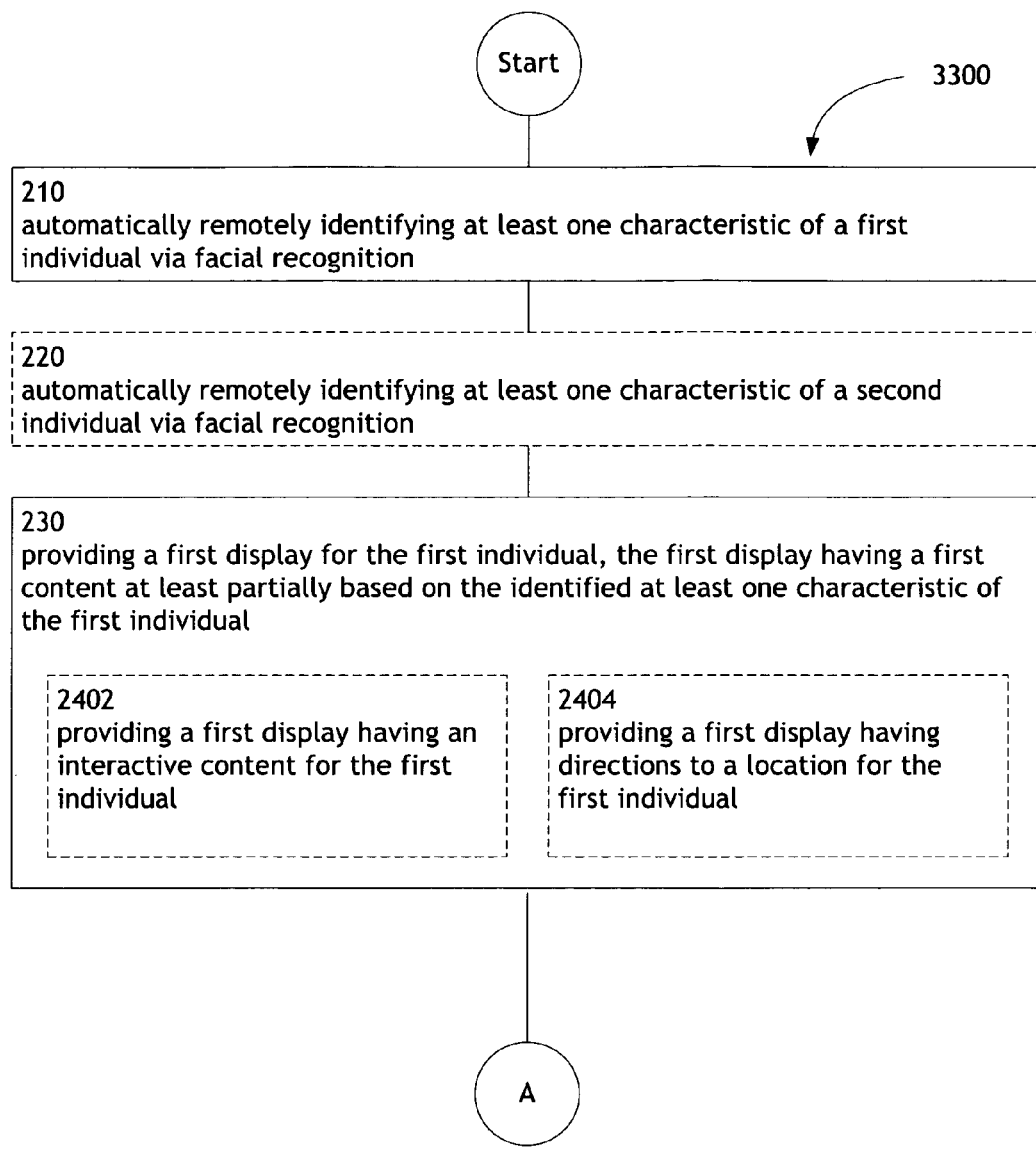
FIG. 55 illustrates an alternative embodiment of the operational flow of FIG. 33.
Figure 55B:
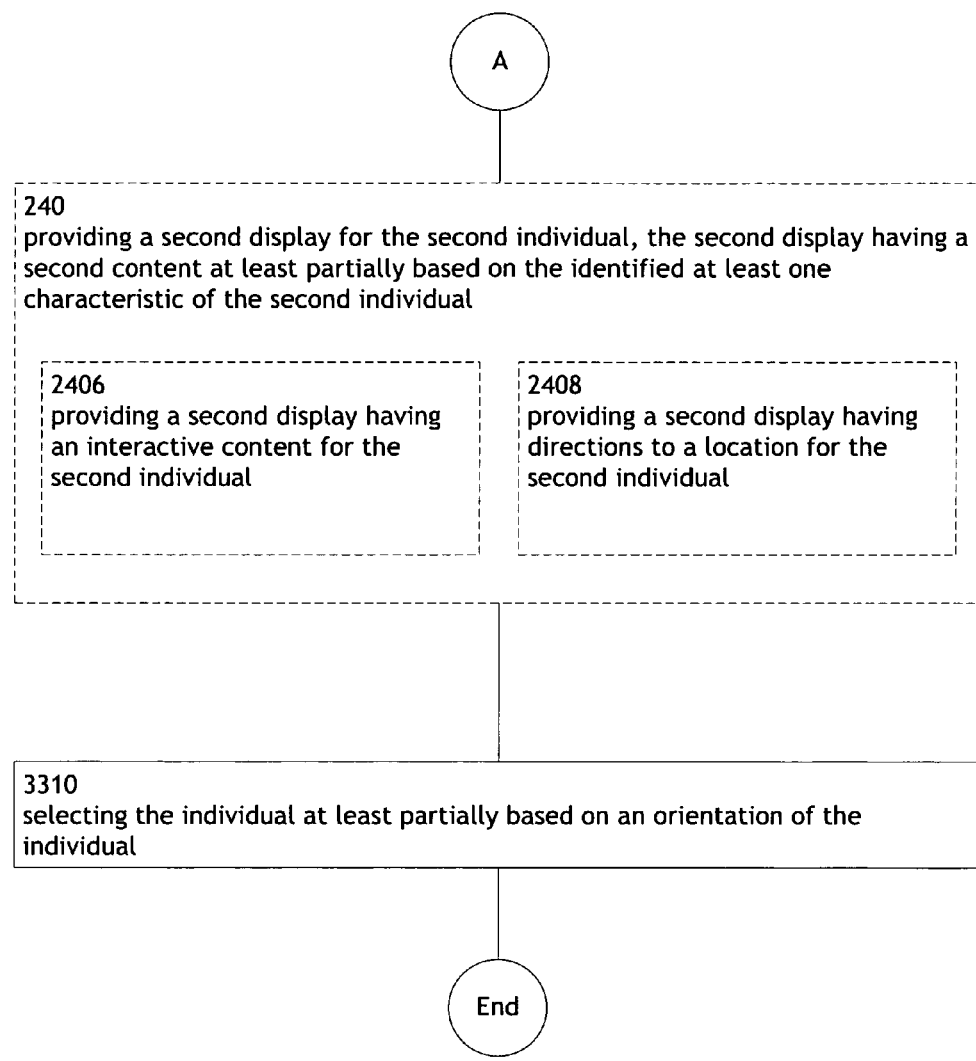

FIG. 55 illustrates alternative embodiments of the example operational flow 3300 of FIG. 33. FIG. 55 illustrates example embodiments where the operations 230 and 240 may include at least one additional operation. Additional operations may include an operation 2402, an operation 2404, an operation 2406, and/or an operation 2408.

Figure 56A:
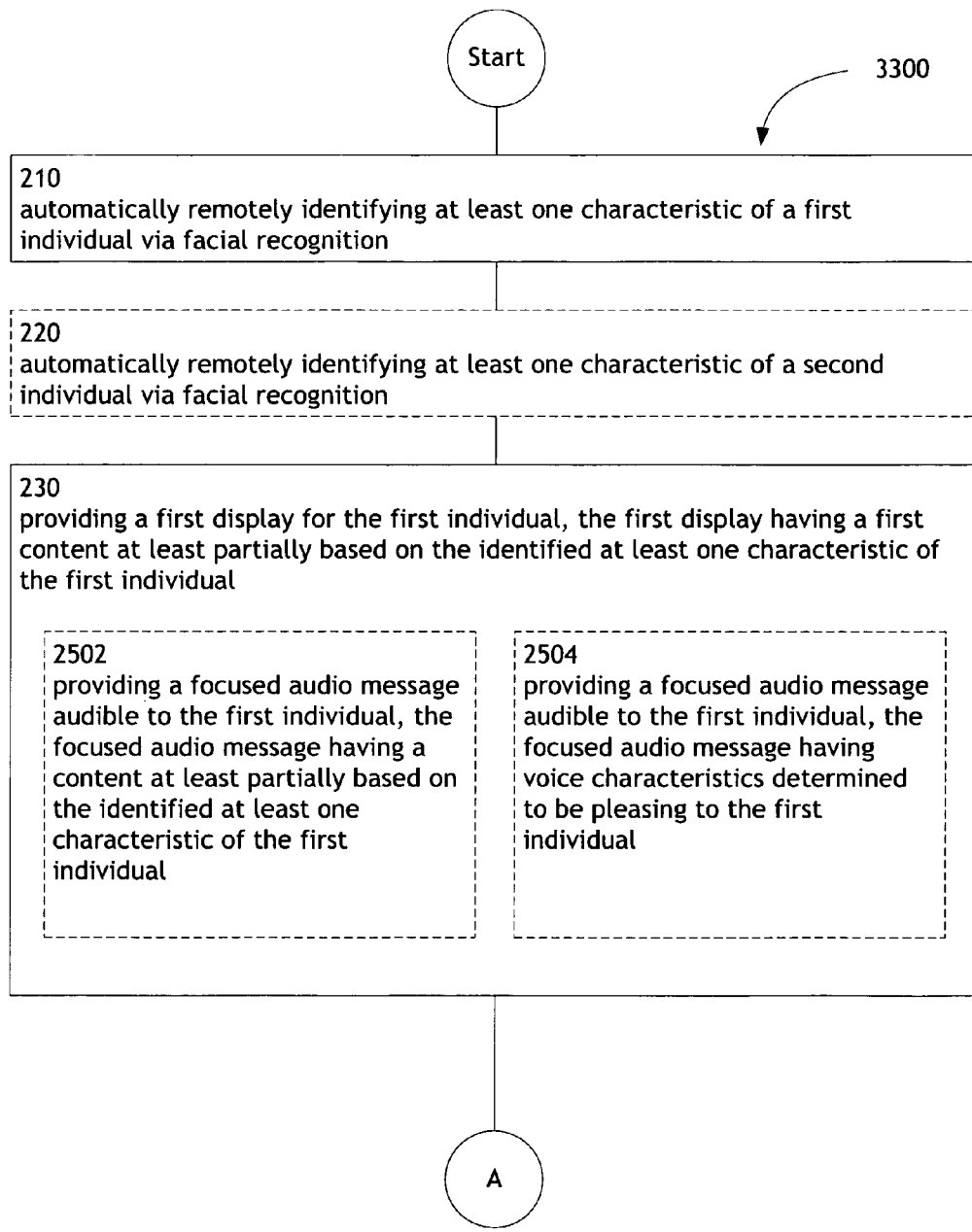
FIG. 56 illustrates an alternative embodiment of the operational flow of FIG. 33.
Figure 56B:
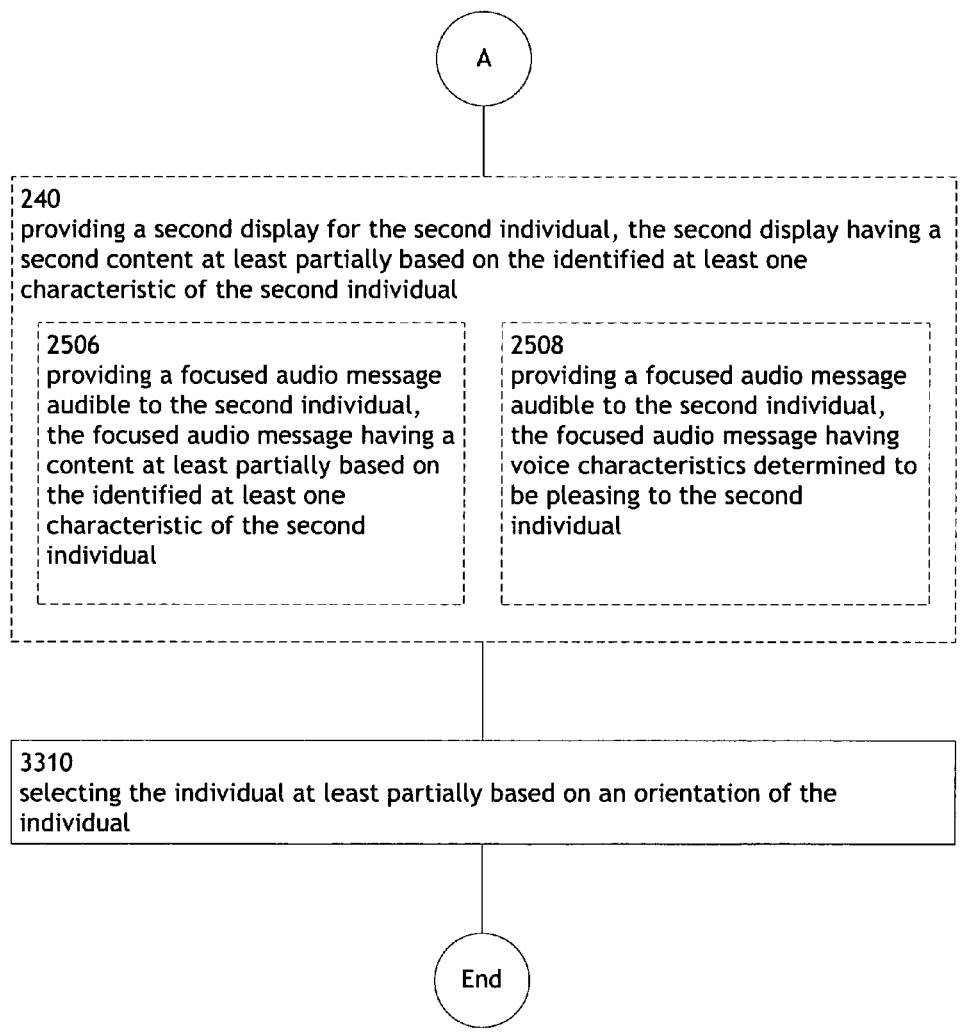

FIG. 56 illustrates alternative embodiments of the example operational flow 3300 of FIG. 33. FIG. 56 illustrates example embodiments where the operations 230 and 240 may include at least one additional operation. Additional operations may include an operation 2502, an operation 2504, an operation 2506, and/or an operation 2508.

Figure 57A:
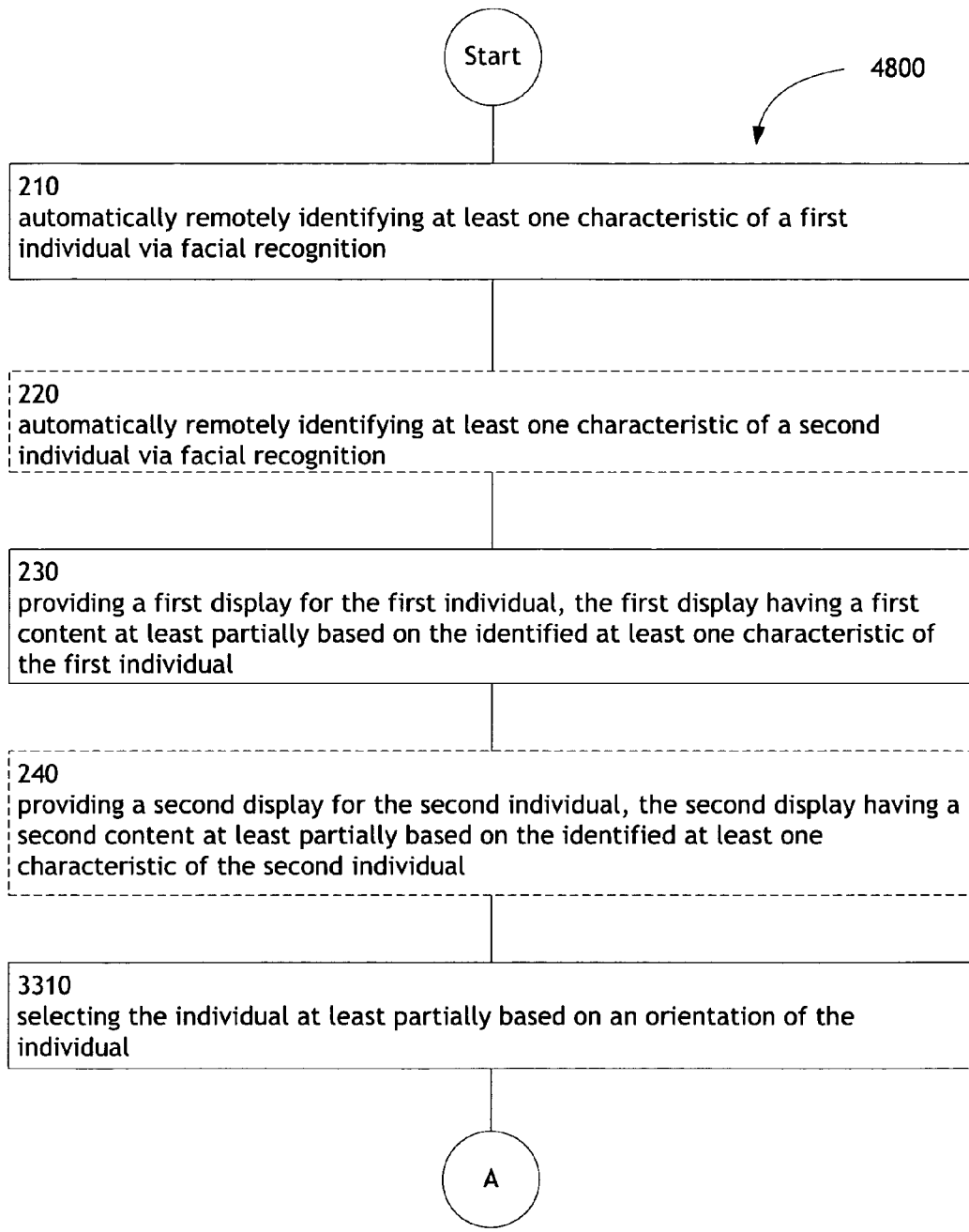
FIG. 57 illustrates an alternative embodiment of the operational flow of FIG. 48.
Figure 57B:
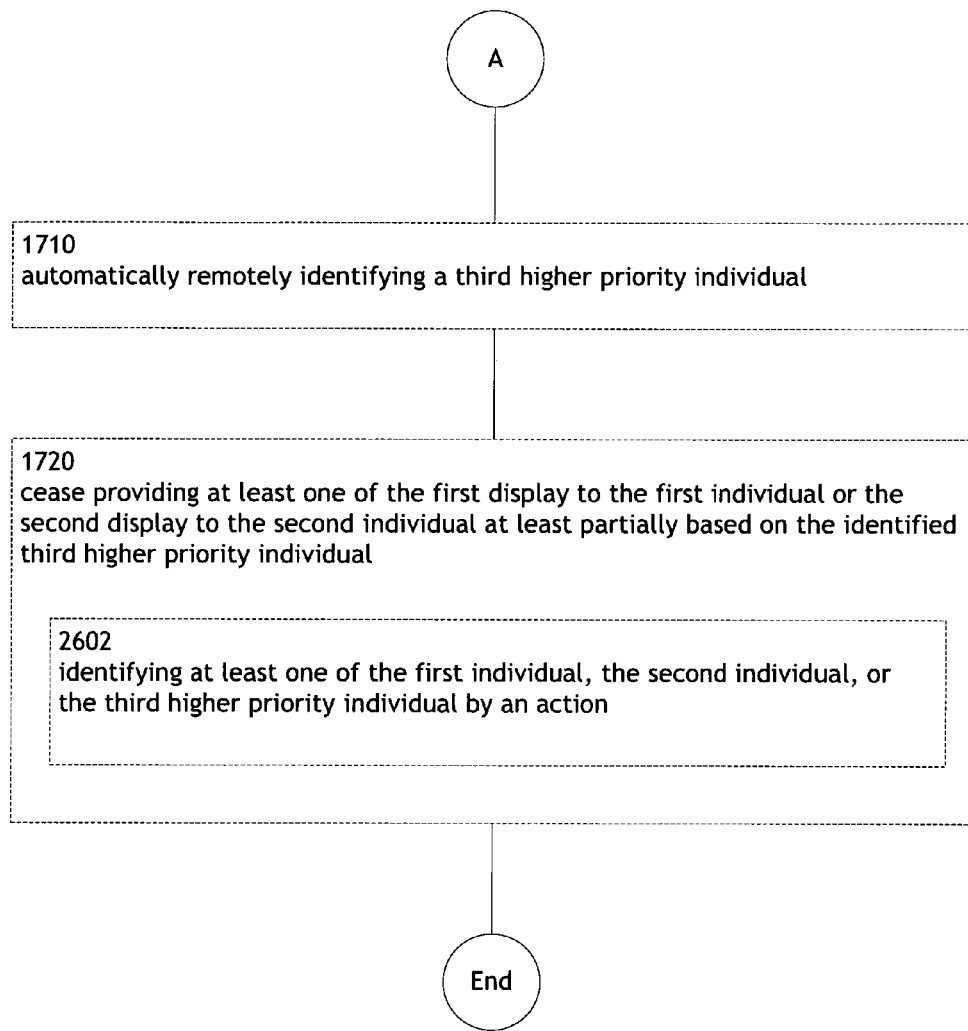

FIG. 57 illustrates alternative embodiments of the example operational flow 4800 of FIG. 48. FIG. 57 illustrates example embodiments where the operation 1720 may include at least one additional operation. Additional operations may include an operation 2602.

Figure 58A:
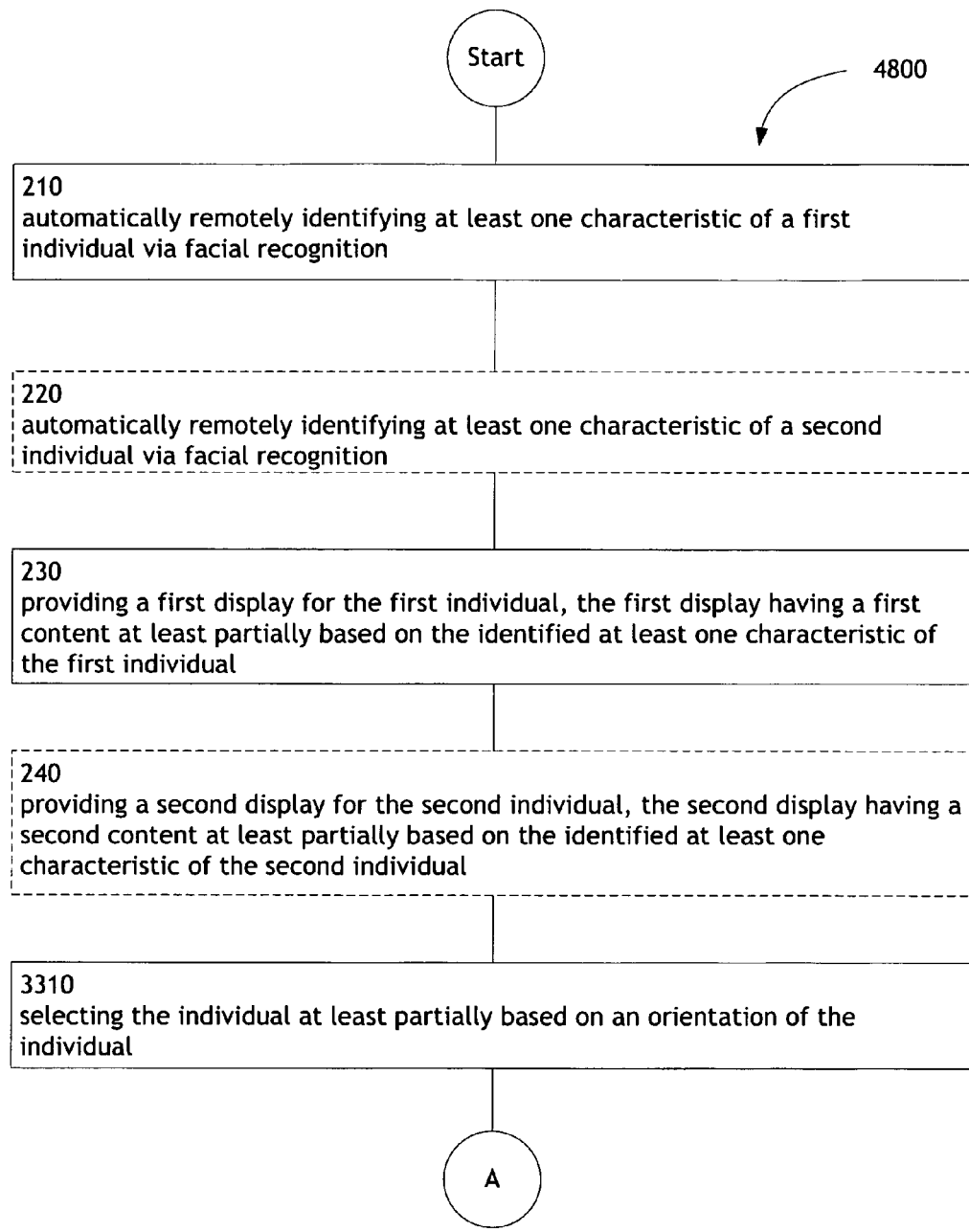
FIG. 58 illustrates an alternative embodiment of the operational flow of FIG. 48.

FIG. 58 illustrates alternative embodiments of the example operational flow 4800 of FIG. 48. FIG. 58 illustrates example embodiments where the operation 1720 may include at least one additional operation. Additional operations may include an operation 2702.

Figure 59:
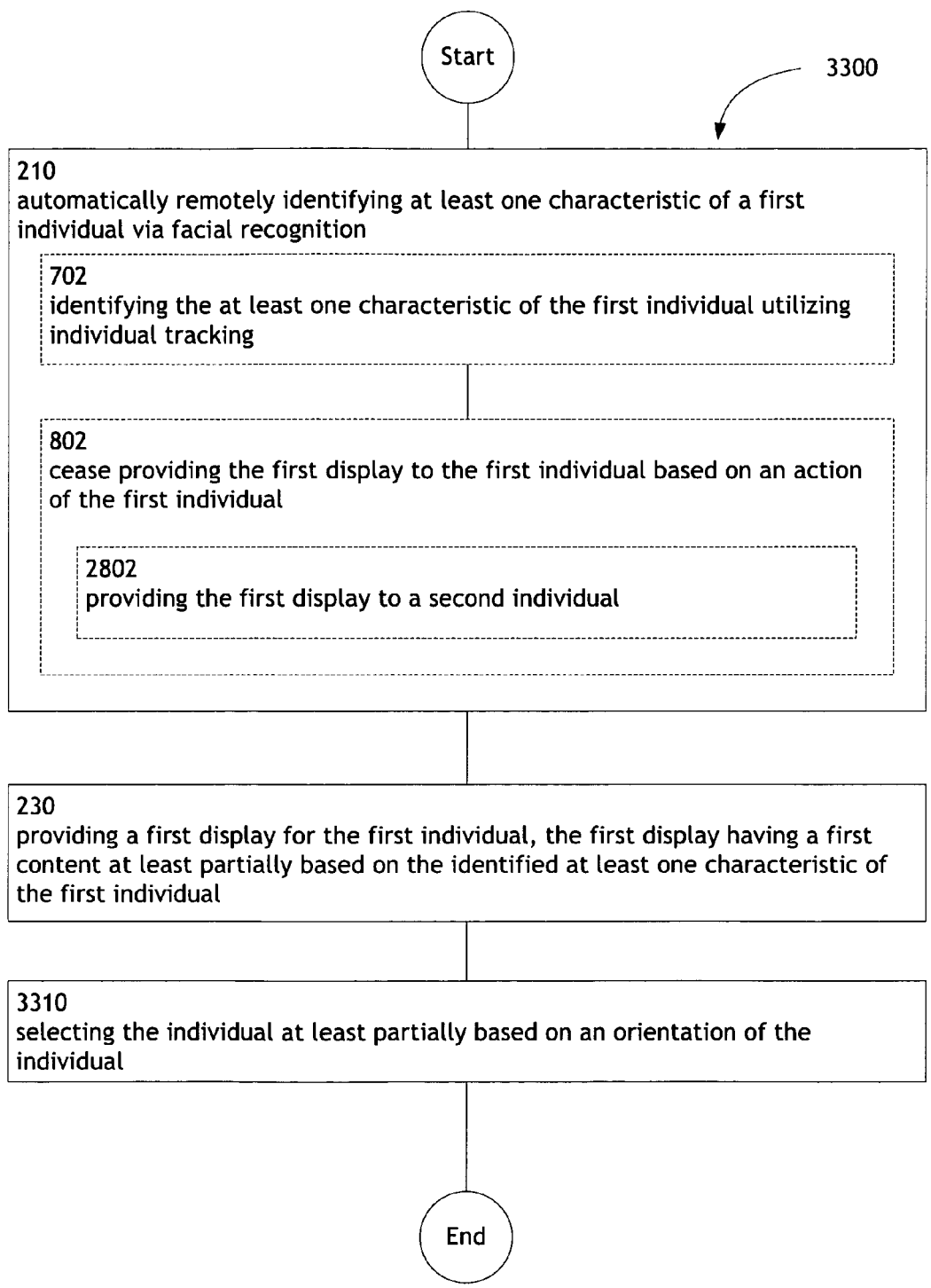
FIG. 59 illustrates an alternative embodiment of the operational flow of FIG. 33.

FIG. 59 illustrates alternative embodiments of the example operational flow 3300 of FIG. 33. FIG. 59 illustrates example embodiments where the operation 210 may include at least one additional operation. Additional operations may include an operation 2802.

Figure 60:
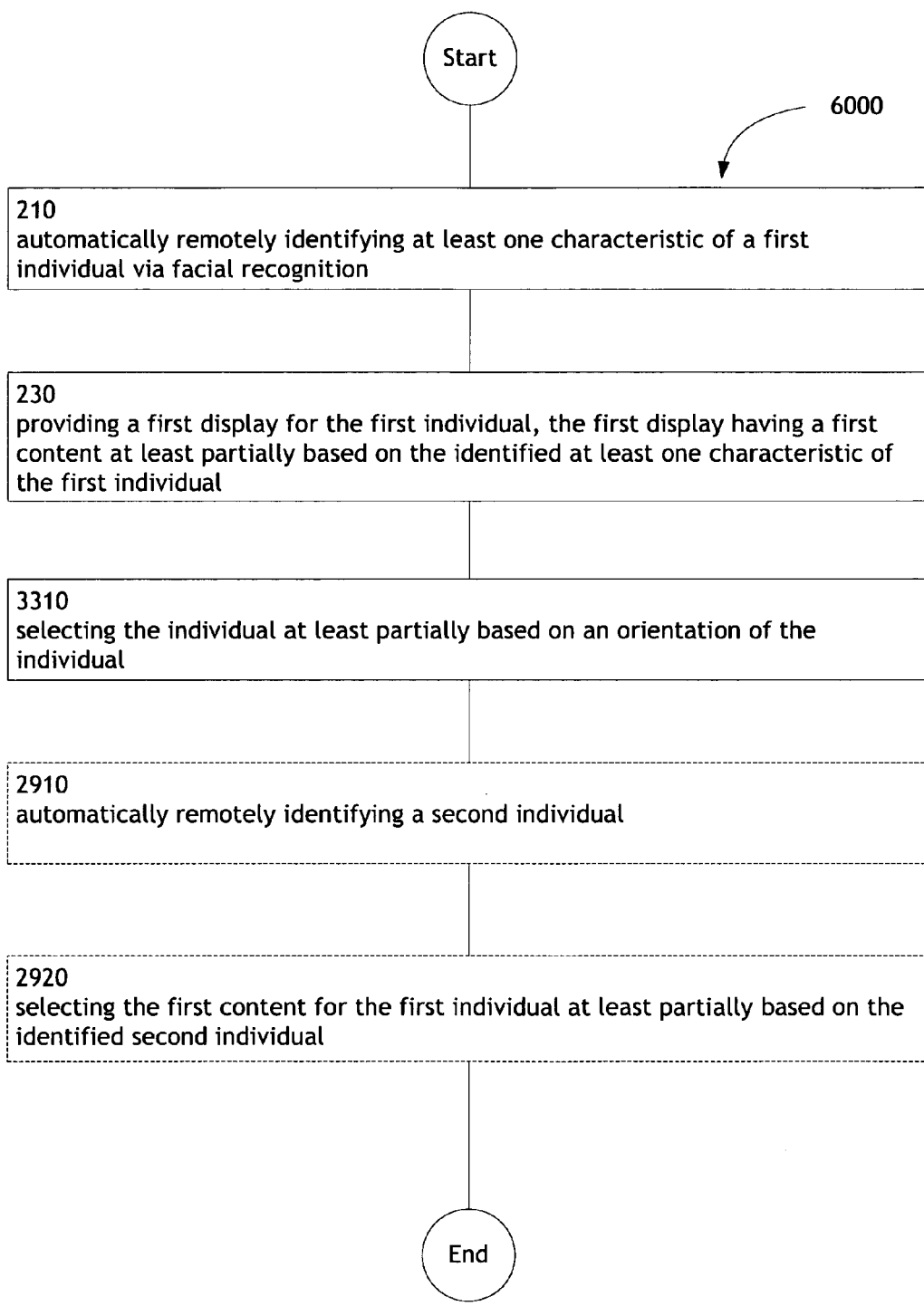
FIG. 60 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, automatically remotely identifying a second individual, and selecting the content for the first individual at least partially based on the identified second individual.

FIG. 60 illustrates an operational flow 6000 representing example operations related to automatically remotely identifying one or more characteristics of an individual utilizing facial recognition and providing a display for the individual having a content at least partially based on the one or more identified characteristics of the individual. FIG. 60 illustrates an example embodiment where the example operational flow 3300 of FIG. 33 may include at least one additional operation. Additional operations may include an operation 2910, and/or an operation 2920.

Figure 61:
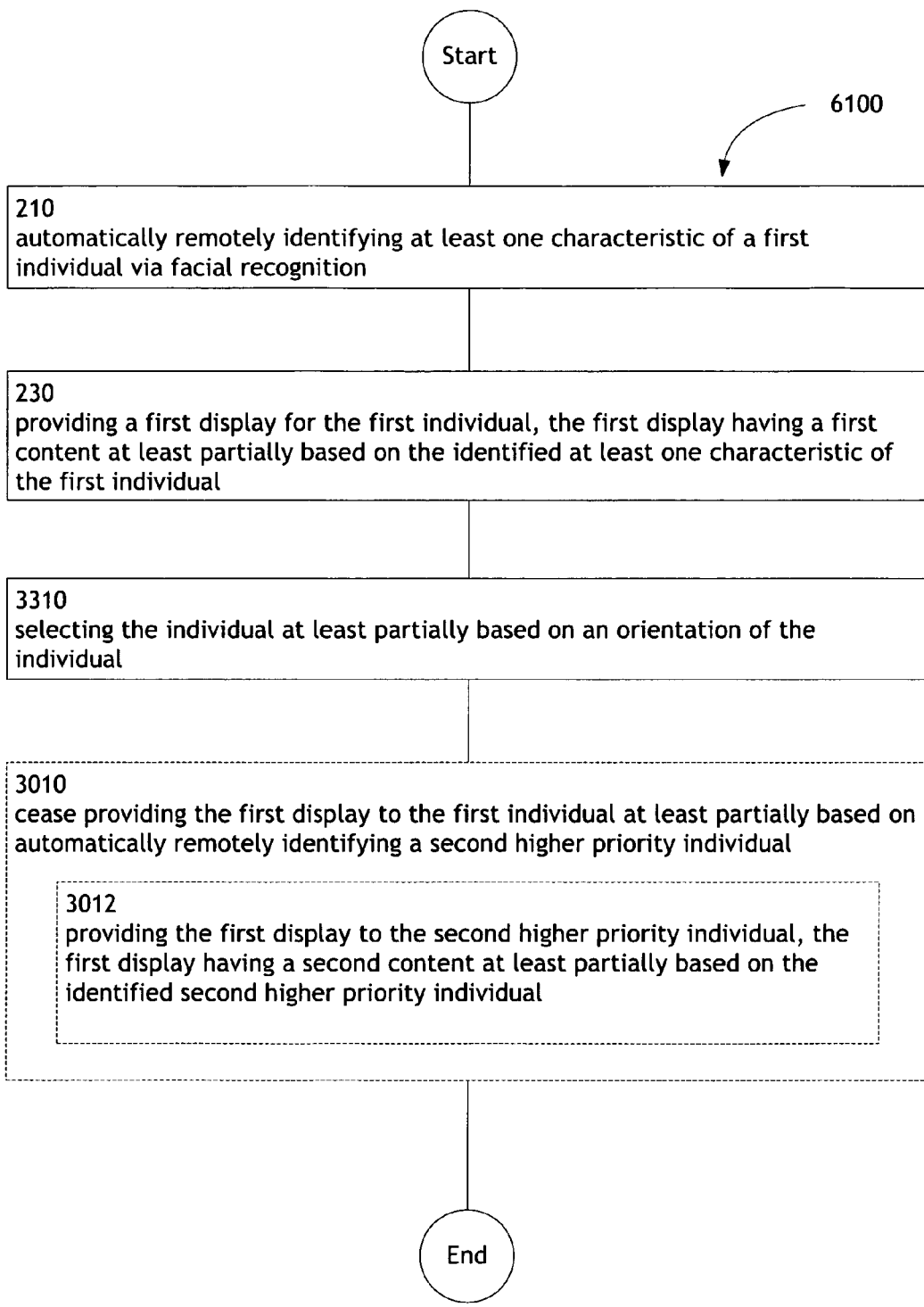
FIG. 61 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, and cease providing the display to the first individual at least partially based on automatically remotely identifying a second higher priority individual.

FIG. 61 illustrates an operational flow 6100 representing example operations related to automatically remotely identifying one or more characteristics of an individual utilizing facial recognition and providing a display for the individual having a content at least partially based on the one or more identified characteristics of the individual. FIG. 61 illustrates an example embodiment where the example operational flow 3300 of FIG. 33 may include at least one additional operation. Additional operations may include an operation 3010, and/or an operation 3012.

Figure 62:
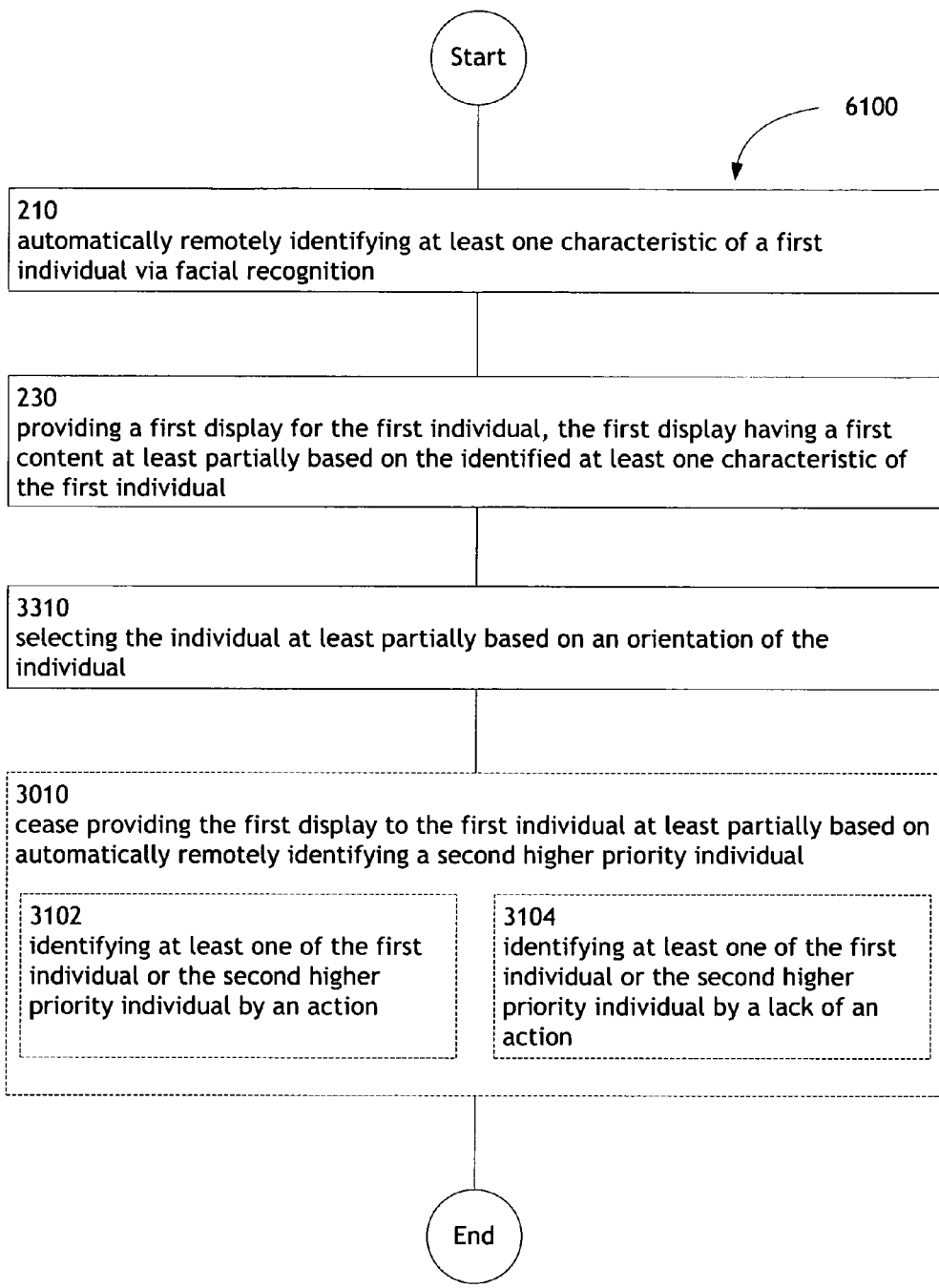
FIG. 62 illustrates an alternative embodiment of the operational flow of FIG. 61.

FIG. 62 illustrates alternative embodiments of the example operational flow 6100 of FIG. 61. FIG. 62 illustrates example embodiments where the operation 3010 may include at least one additional operation. Additional operations may include an operation 3102, and/or an operation 3104.

Figure 63:
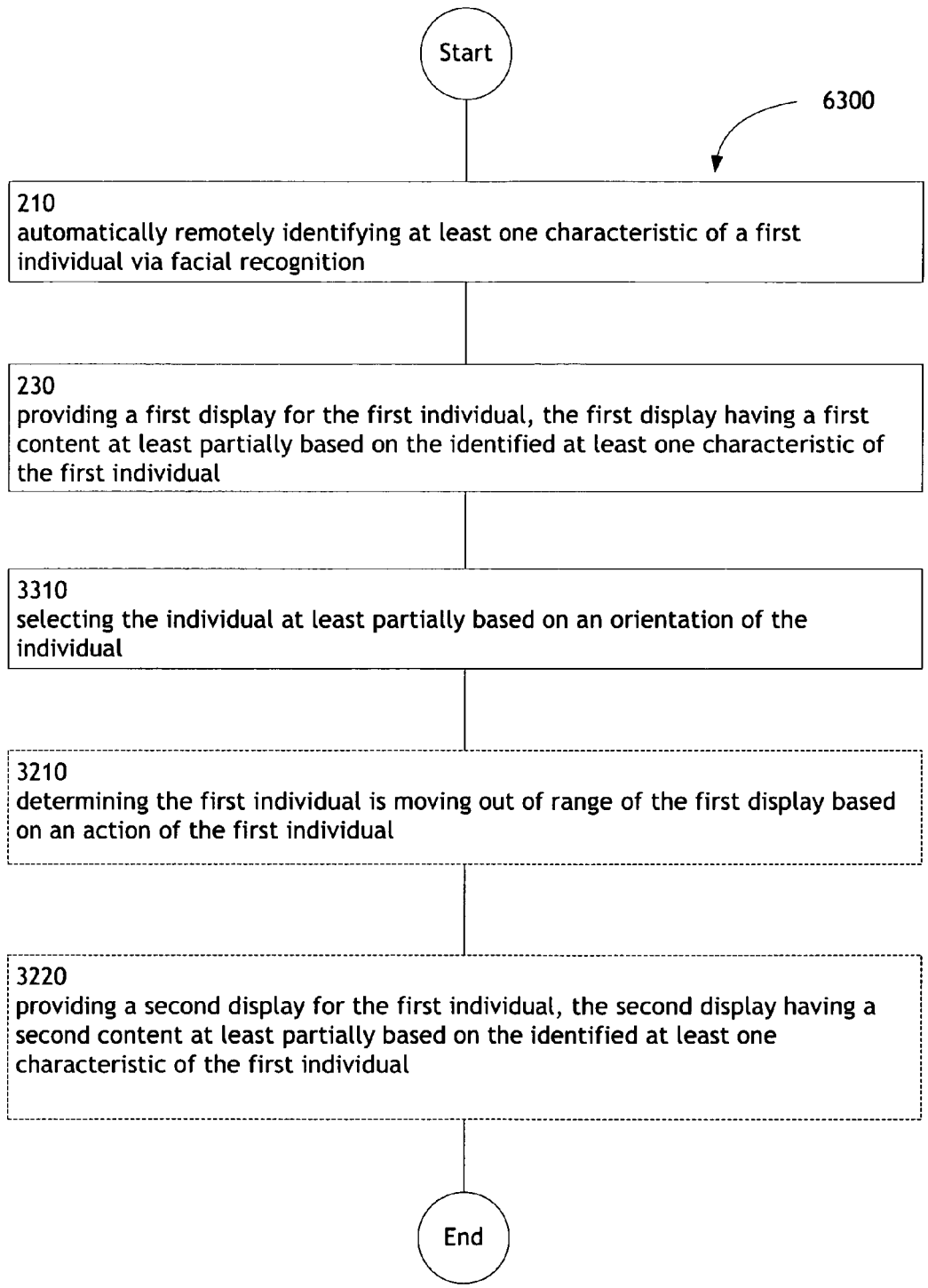
FIG. 63 illustrates an operational flow representing example operations related to automatically remotely identifying one or more characteristics of an individual utilizing facial recognition, providing a display for the individual having a content at least partially based on the one or more identified characteristics of the individual, selecting the individual at least partially based on an orientation of the individual, determining the individual is moving out of range of the display based on an action of the individual, and providing a second display for the individual, the second display having a second content at least partially based on the identified at least one characteristic of the individual.

FIG. 63 illustrates an operational flow 6300 representing example operations related to automatically remotely identifying one or more characteristics of an individual utilizing facial recognition and providing a display for the individual having a content at least partially based on the one or more identified characteristics of the individual. FIG. 63 illustrates an example embodiment where the example operational flow 3300 of FIG. 33 may include at least one additional operation. Additional operations may include an operation 3210, and/or an operation 3220.

Figure 64:
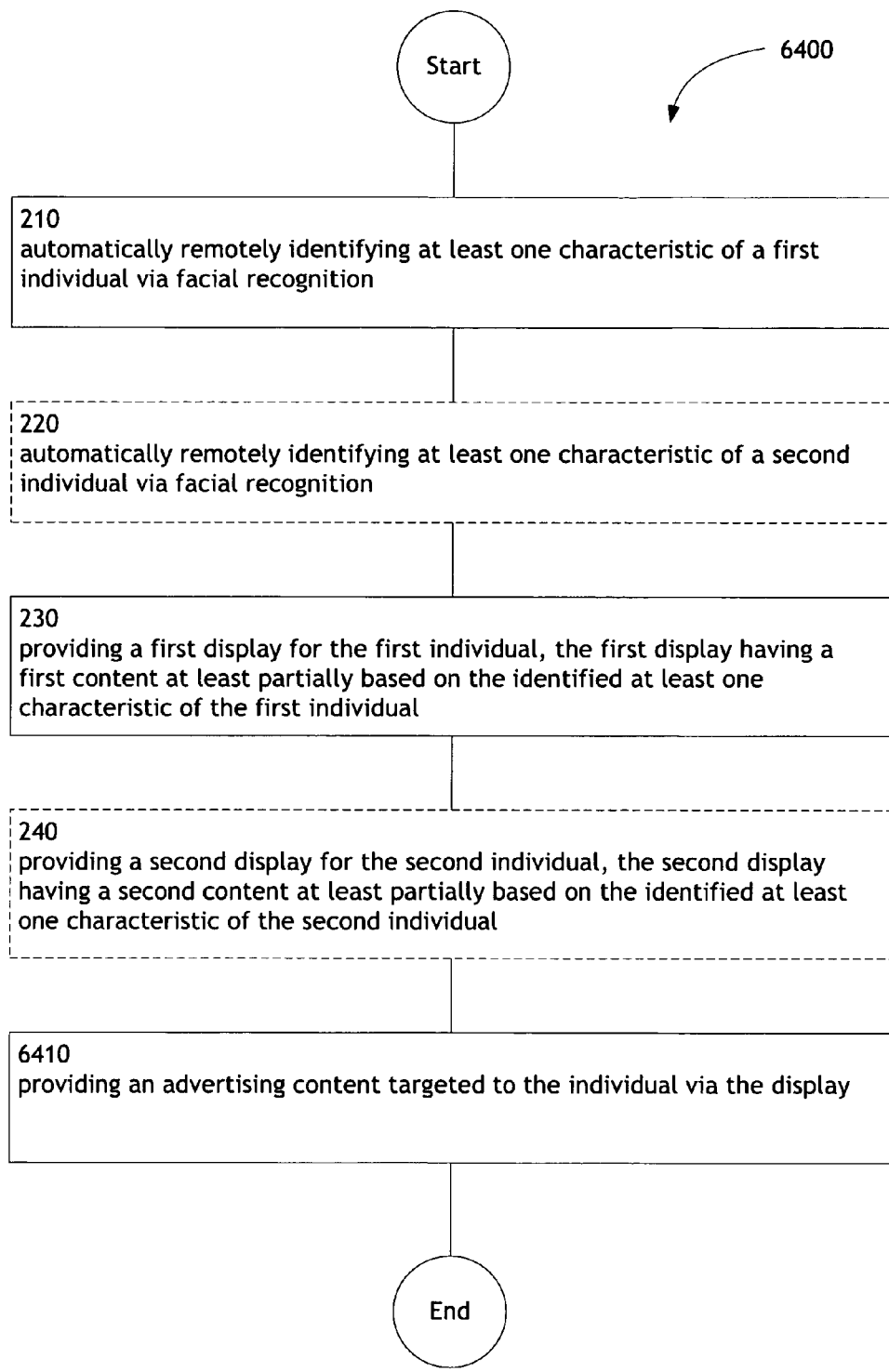
FIG. 64 illustrates an operational flow representing example operations related to automatically remotely identifying one or more characteristics of an individual utilizing facial recognition, providing a display for the individual having a content at least partially based on the one or more identified characteristics of the individual, and providing an advertising content targeted to the individual via the display.

FIG. 64 illustrates an operational flow 6400 representing example operations related to automatically remotely identifying one or more characteristics of an individual utilizing facial recognition and providing a display for the individual having a content at least partially based on the one or more identified characteristics of the individual. In FIG. 64 and in following figures that include various examples of operational flows, discussion and explanation may be provided with respect to the above-described examples of FIGS. 1A through 1M, and/or with respect to other examples and contexts. However, it should be understood that the operational flows may be executed in a number of other environments and contexts, and/or in modified versions of FIGS. 1A through 1M. Also, although the various operational flows are presented in the sequence(s) illustrated, it should be understood that the various operations may be performed in other orders than those which are illustrated, or may be performed concurrently.

After a start operation, an operation 210, an operation 220, an operation 230, and an operation 240, the operational flow 6400 moves to an operation 6410. Operation 6410 illustrates providing an advertising content targeted to the individual via the display. For example, as shown in FIGS. 1A through 1M, the first display 56 provided to the first individual 52 or the second display 84 provided to the second individual 80 may include an advertising content targeted to the first individual 52 or the second individual 80. In an embodiment, the controller 132 may be coupled with the first display module 54 and configured for providing advertising content targeted to the first individual 52 via the first display module 54.

Figure 65:
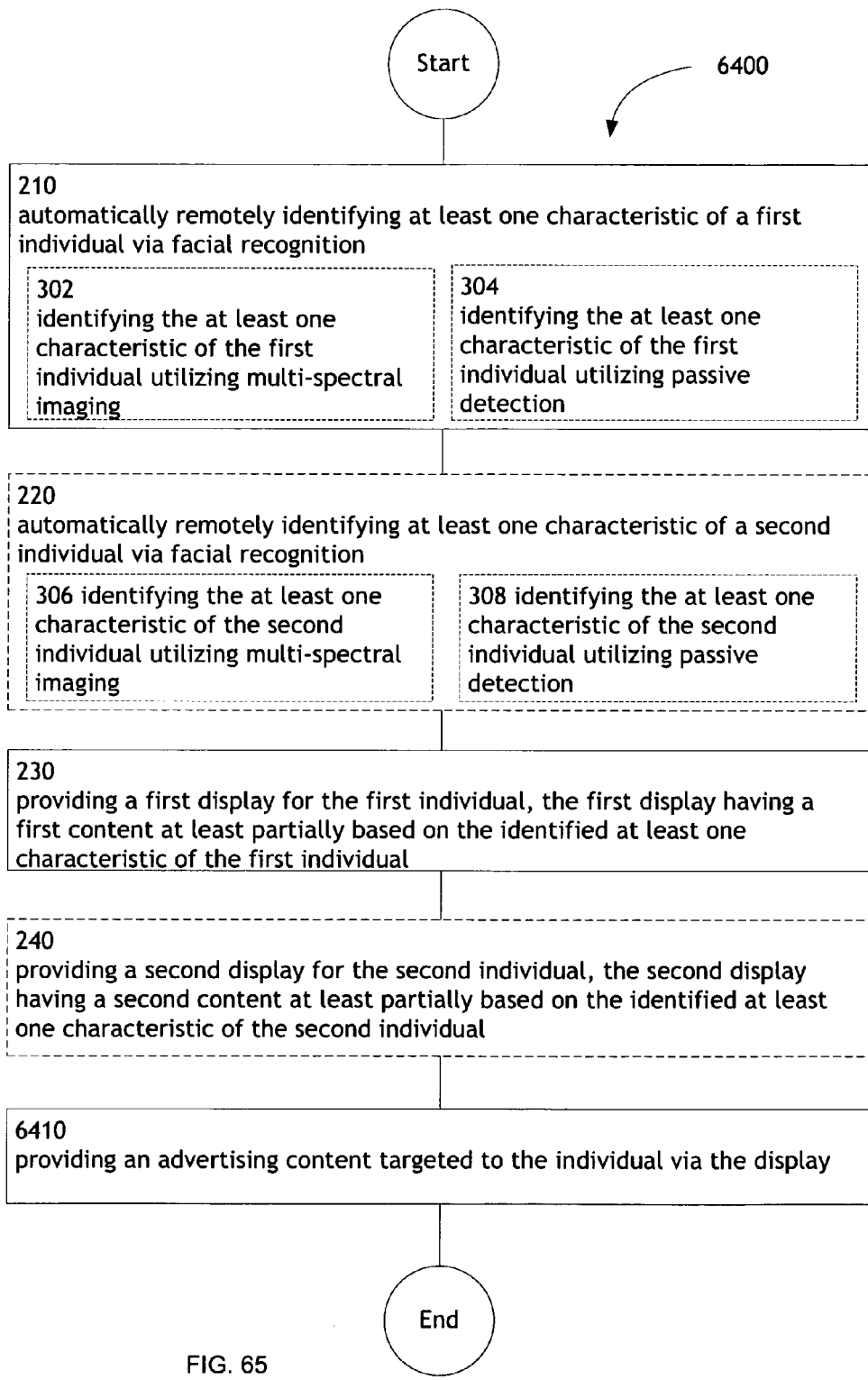
FIG. 65 illustrates an alternative embodiment of the operational flow of FIG. 64.

FIG. 65 illustrates alternative embodiments of the example operational flow 6400 of FIG. 64. FIG. 65 illustrates example embodiments where the operations 210 and 220 may include at least one additional operation. Additional operations may include an operation 302, an operation 304, an operation 306, and/or an operation 308.

Figure 66:
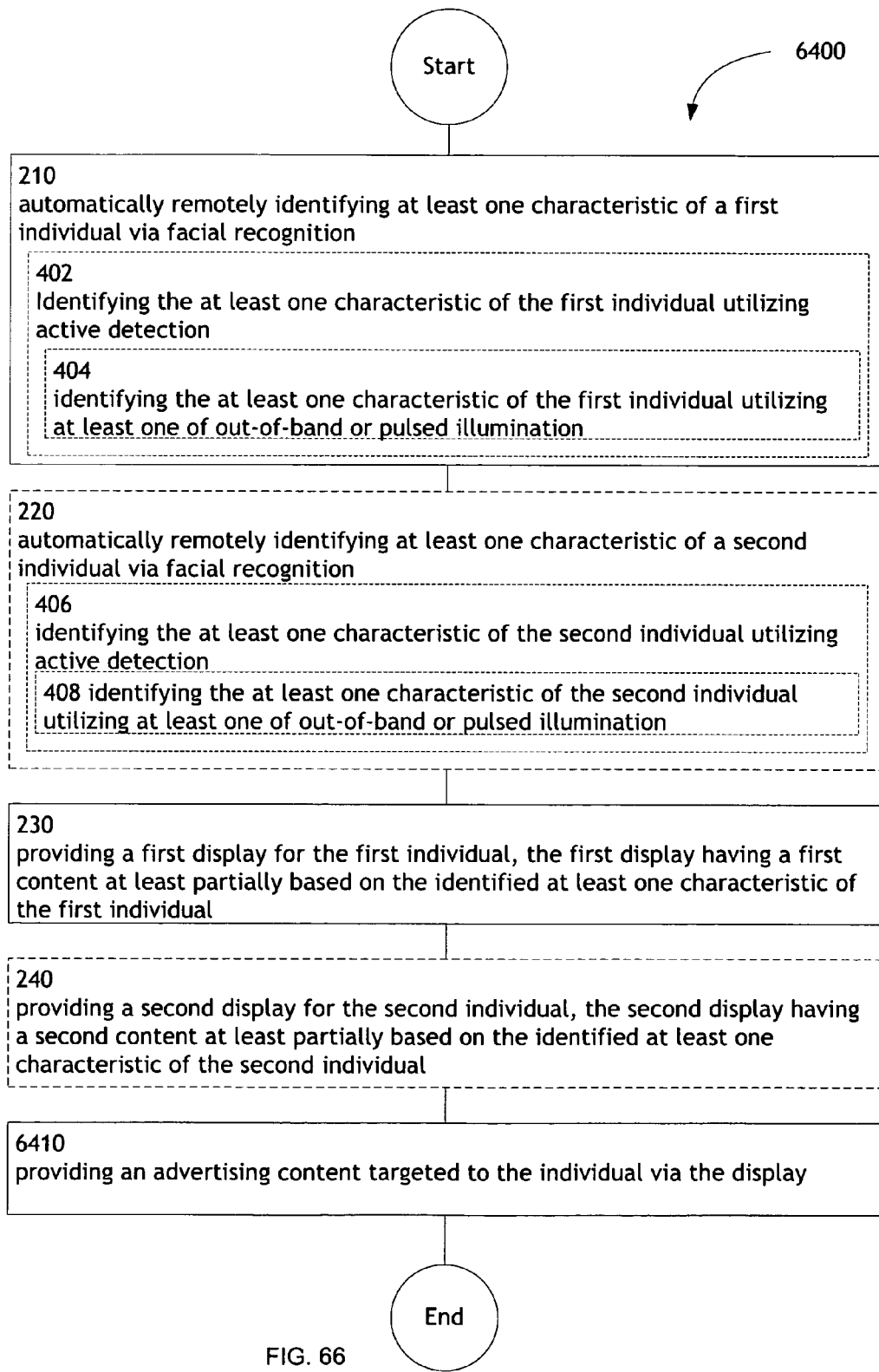
FIG. 66 illustrates an alternative embodiment of the operational flow of FIG. 64.

FIG. 66 illustrates alternative embodiments of the example operational flow 6400 of FIG. 64. FIG. 66 illustrates example embodiments where the operations 210 and 220 may include at least one additional operation. Additional operations may include an operation 402, an operation 404, an operation 406, and/or an operation 408.

Figure 67:
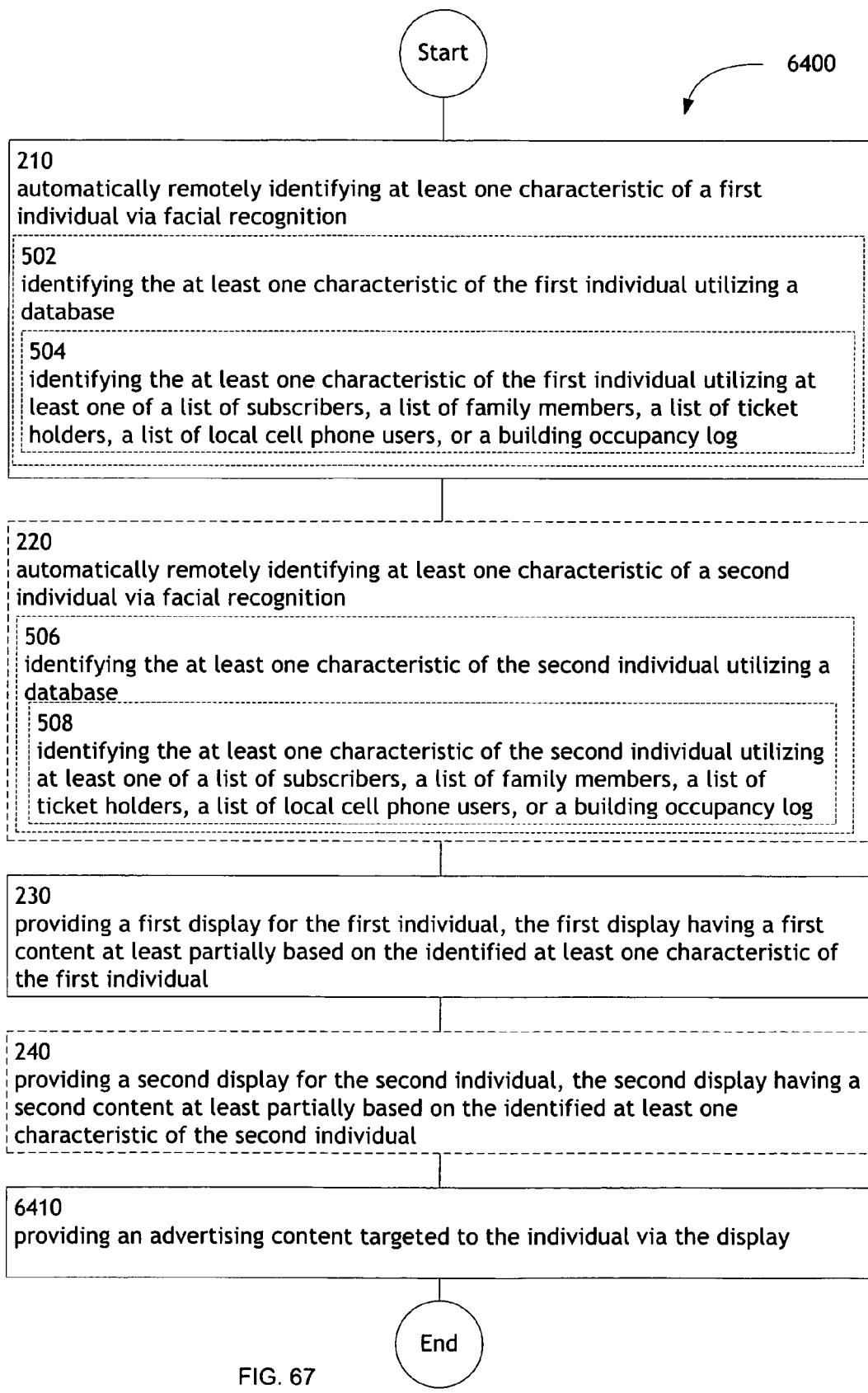
FIG. 67 illustrates an alternative embodiment of the operational flow of FIG. 64.

FIG. 67 illustrates alternative embodiments of the example operational flow 6400 of FIG. 64. FIG. 67 illustrates example embodiments where the operations 210 and 220 may include at least one additional operation. Additional operations may include an operation 502, an operation 504, an operation 506, and/or an operation 508.

Figure 68:
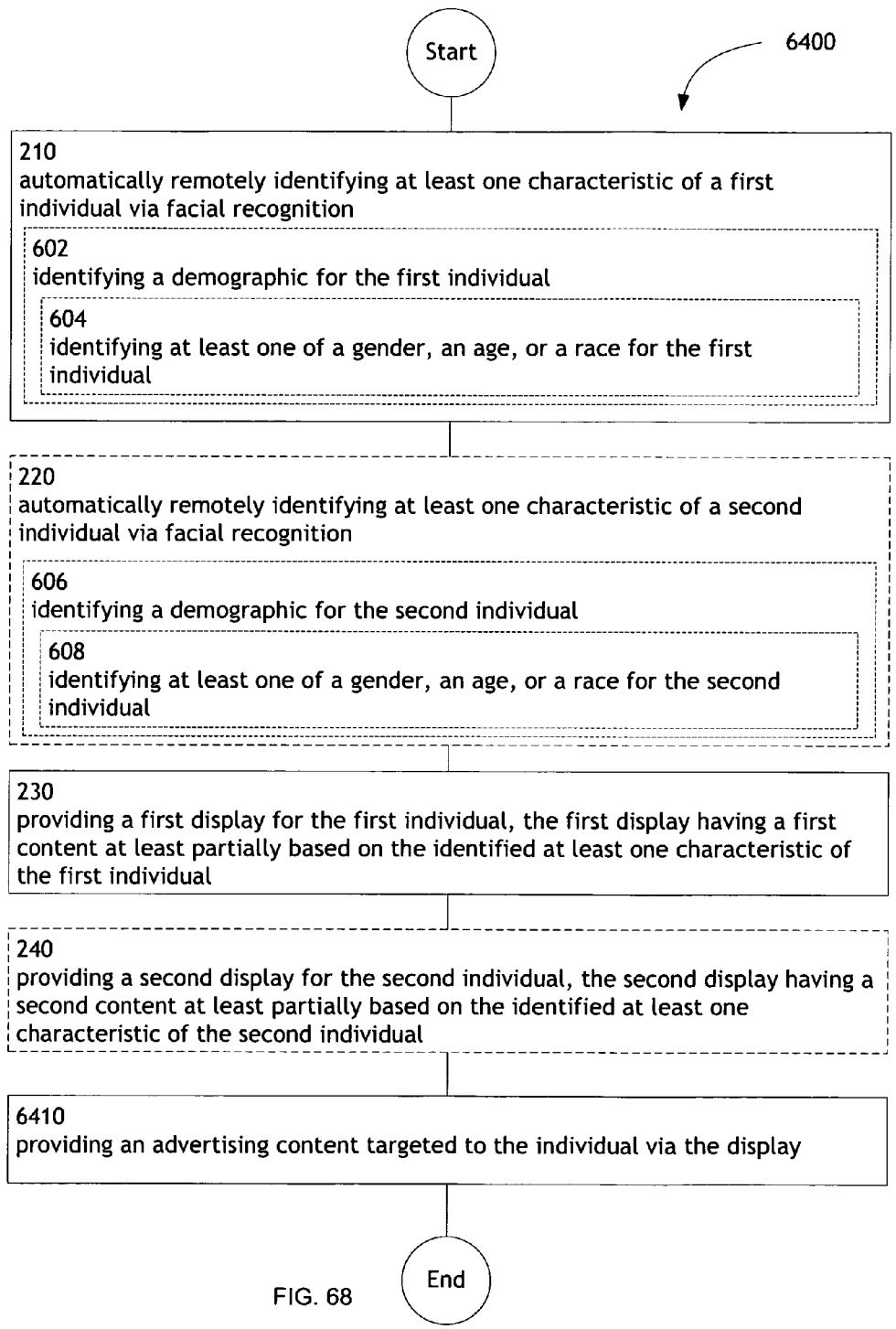
FIG. 68 illustrates an alternative embodiment of the operational flow of FIG. 64.

FIG. 68 illustrates alternative embodiments of the example operational flow 6400 of FIG. 64. FIG. 68 illustrates example embodiments where the operations 210 and 220 may include at least one additional operation. Additional operations may include an operation 602, an operation 604, an operation 606, and/or an operation 608.

Figure 69:
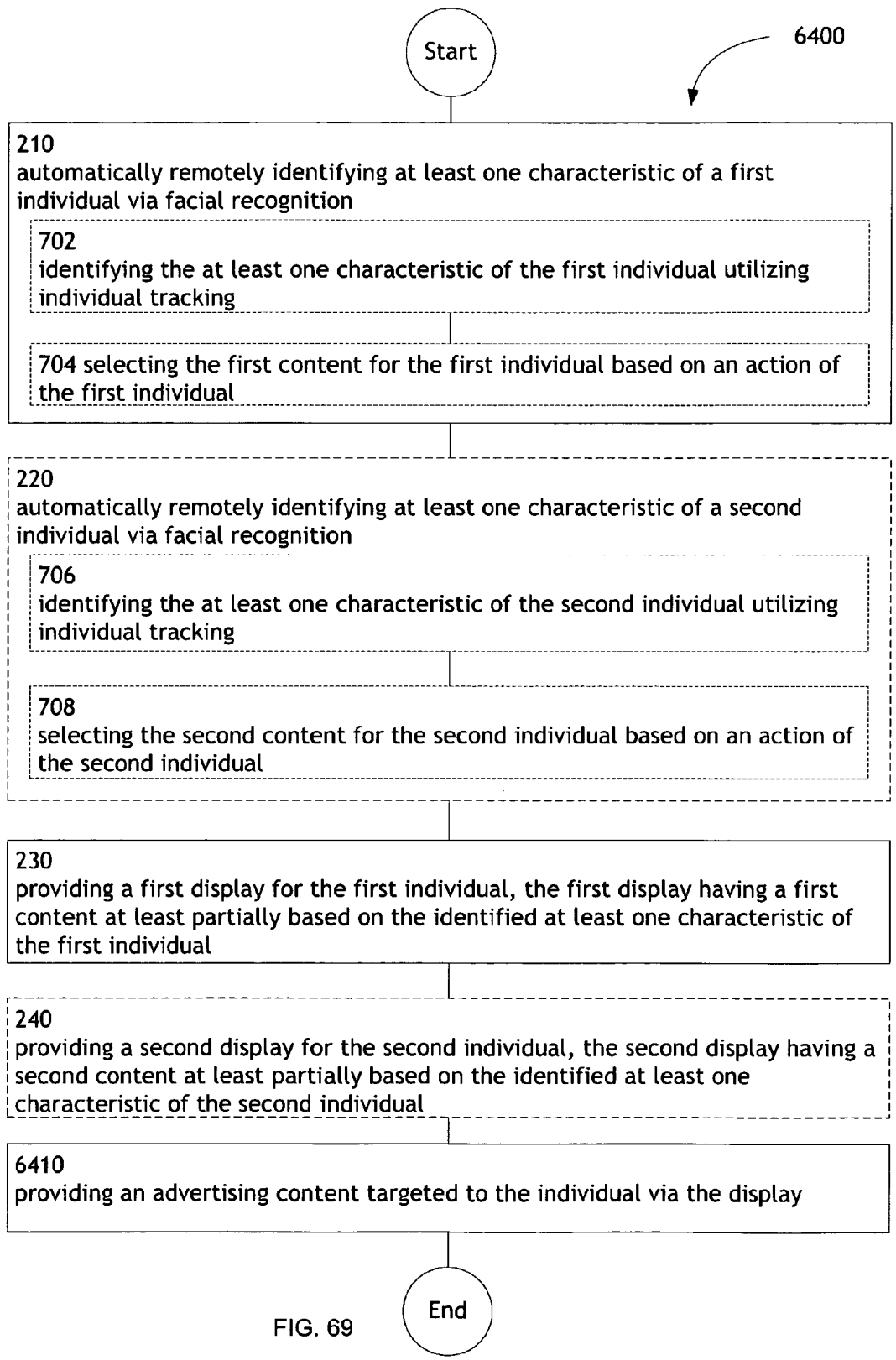
FIG. 69 illustrates an alternative embodiment of the operational flow of FIG. 64.

FIG. 69 illustrates alternative embodiments of the example operational flow 6400 of FIG. 64. FIG. 69 illustrates example embodiments where the operations 210 and 220 may include at least one additional operation. Additional operations may include an operation 702, an operation 704, an operation 706, and/or an operation 708.

Figure 70A:
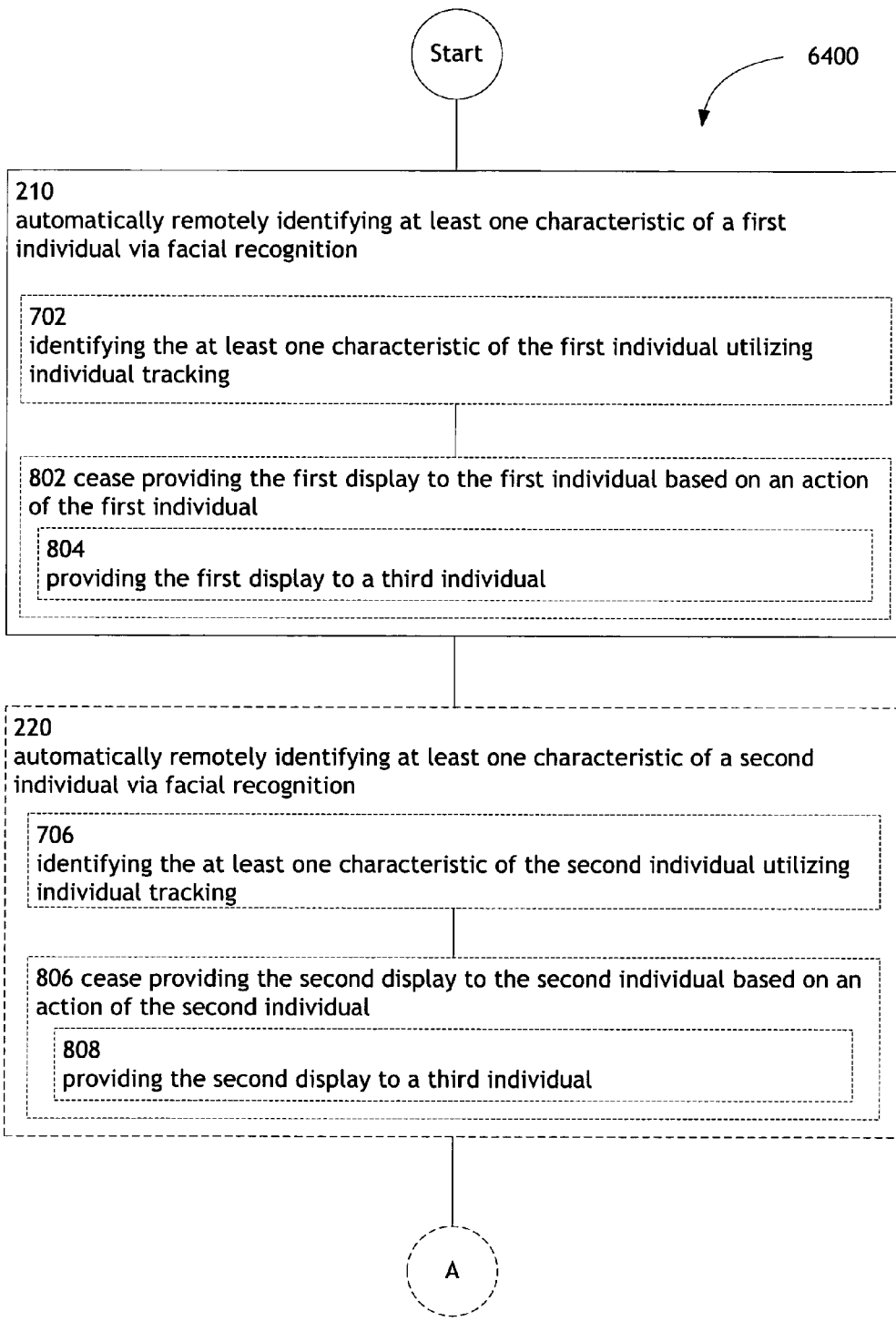
FIG. 70 illustrates an alternative embodiment of the operational flow of FIG. 64.
Figure 70B:
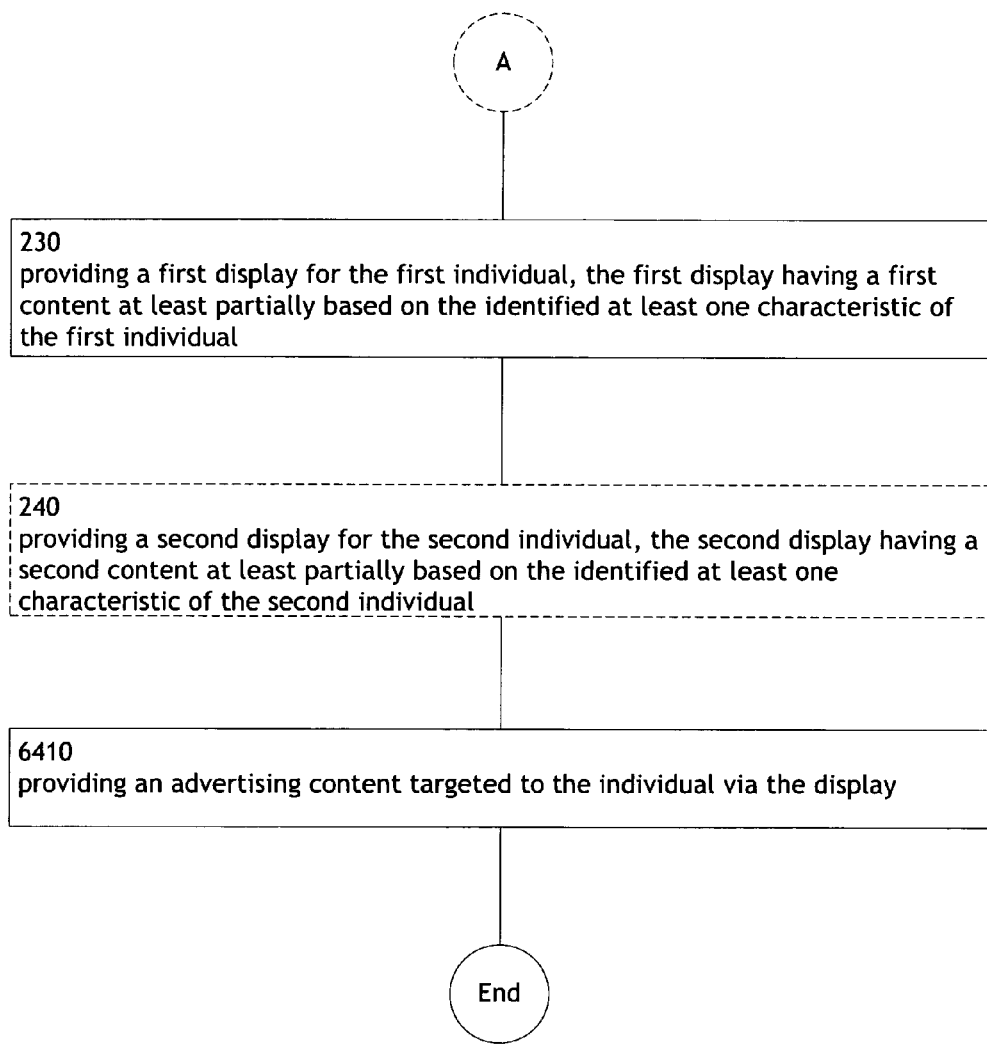

FIG. 70 illustrates alternative embodiments of the example operational flow 6400 of FIG. 64. FIG. 70 illustrates example embodiments where the operations 210 and 220 may include at least one additional operation. Additional operations may include an operation 802, an operation 804, an operation 806, and/or an operation 808.

Figure 71:
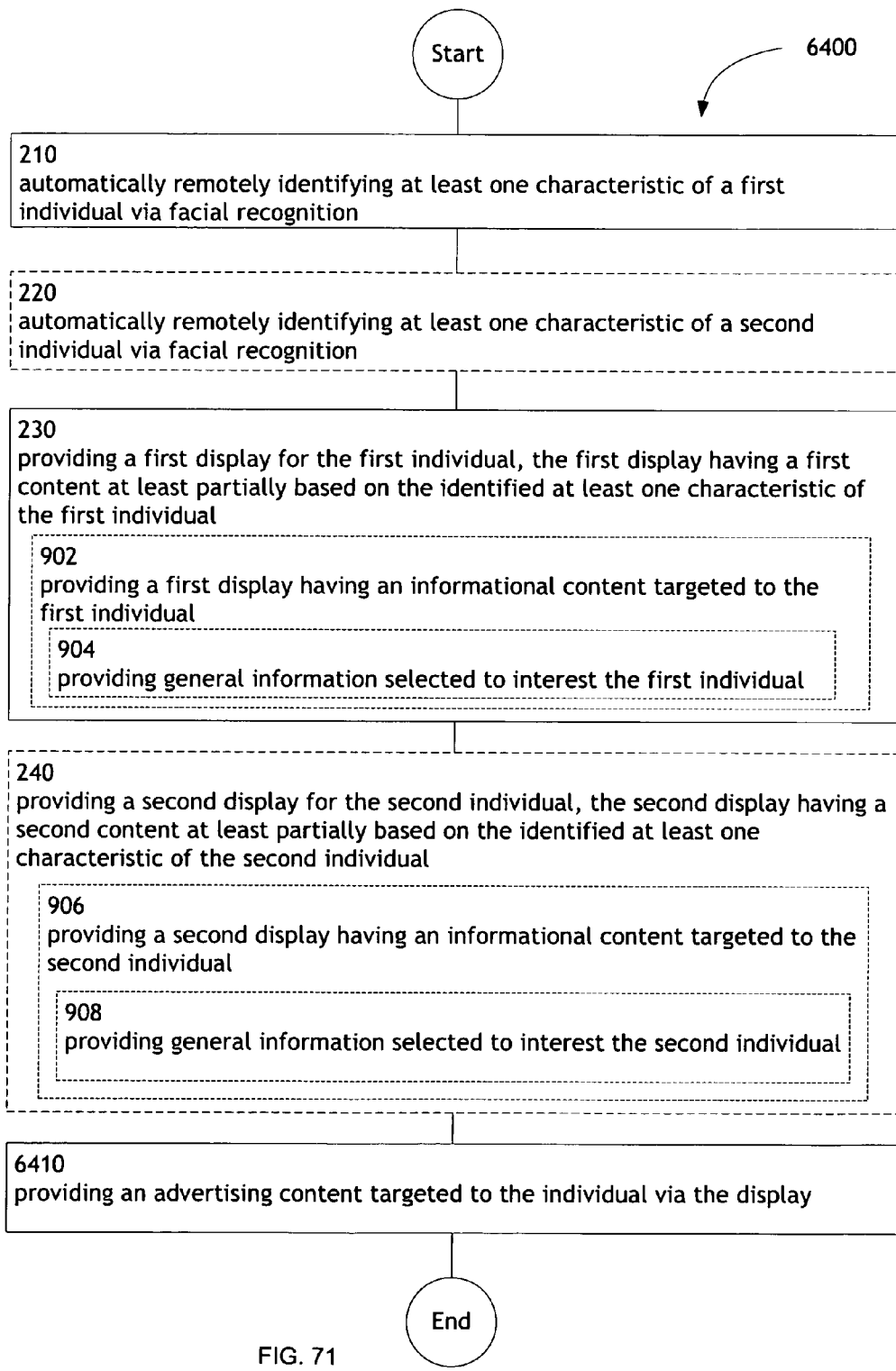
FIG. 71 illustrates an alternative embodiment of the operational flow of FIG. 64.

FIG. 71 illustrates alternative embodiments of the example operational flow 6400 of FIG. 64. FIG. 71 illustrates example embodiments where the operations 230 and 240 may include at least one additional operation. Additional operations may include an operation 902, an operation 904, an operation 906, and/or an operation 908.

Figure 72A:
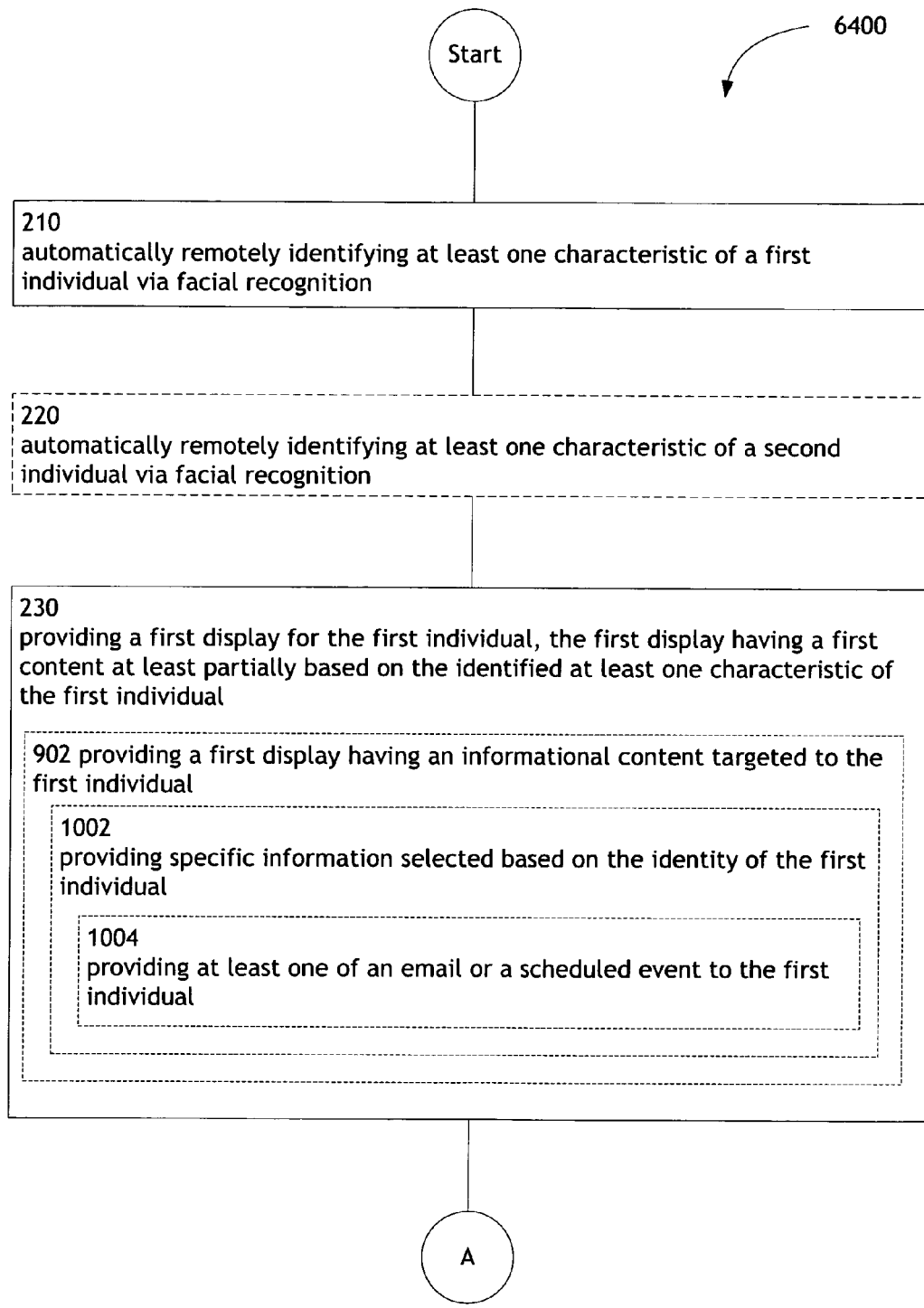
FIG. 72 illustrates an alternative embodiment of the operational flow of FIG. 64.
Figure 72B:
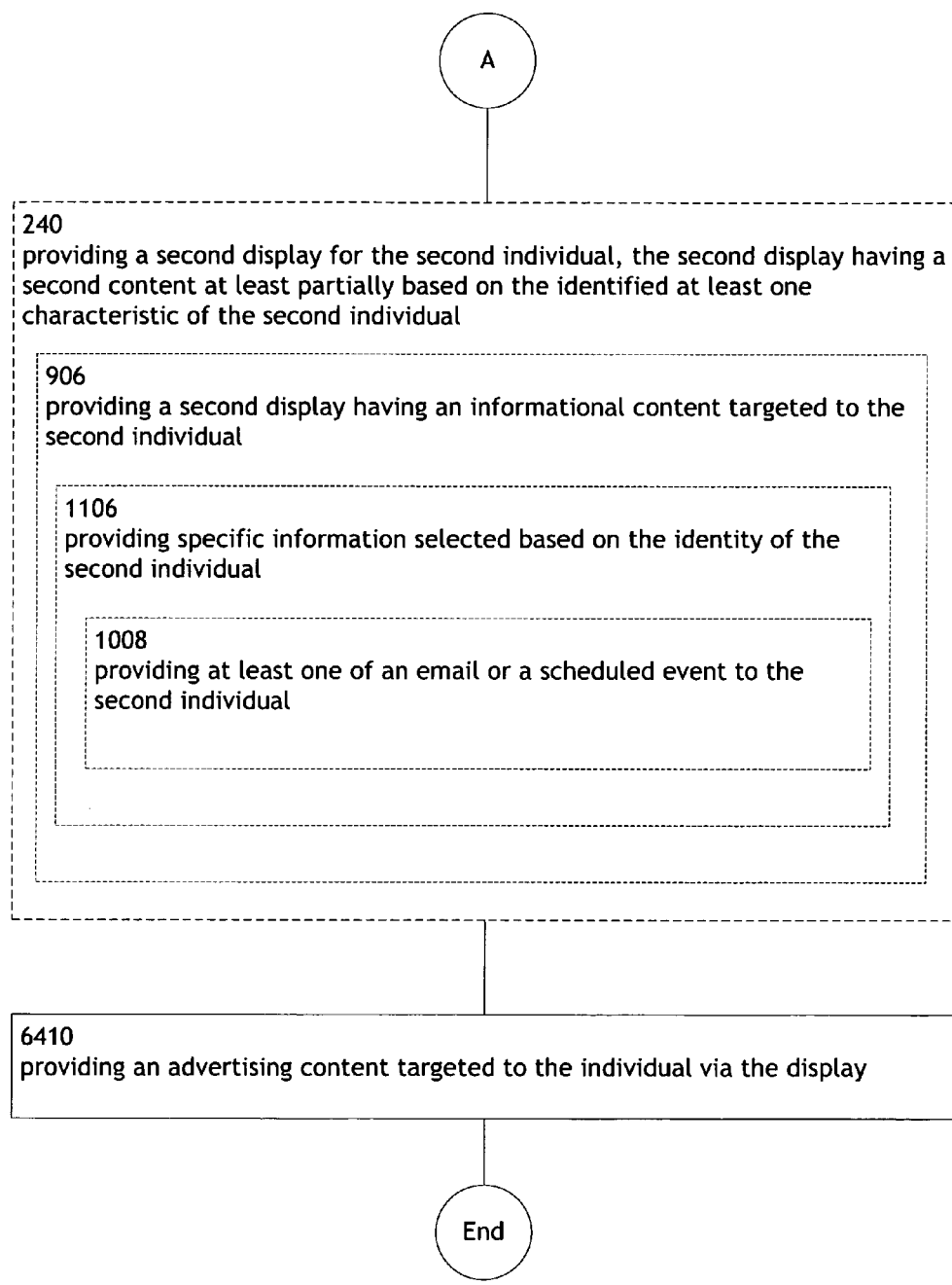

FIG. 72 illustrates alternative embodiments of the example operational flow 6400 of FIG. 64. FIG. 72 illustrates example embodiments where the operations 230 and 240 may include at least one additional operation. Additional operations may include an operation 1002, an operation 1004, an operation 1006, and/or an operation 1008.

Figure 73:
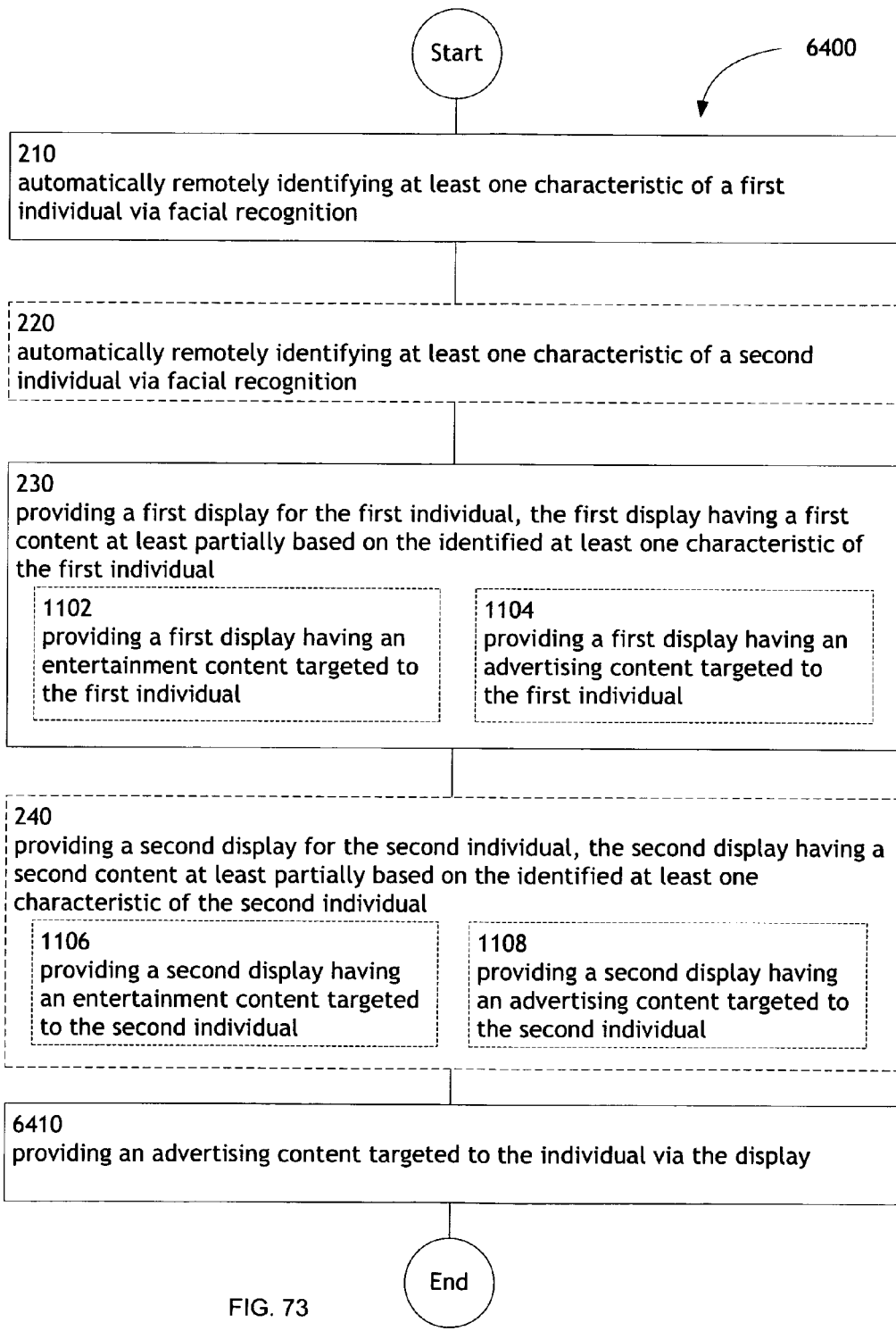
FIG. 73 illustrates an alternative embodiment of the operational flow of FIG. 64.

FIG. 73 illustrates alternative embodiments of the example operational flow 6400 of FIG. 64. FIG. 73 illustrates example embodiments where the operations 230 and 240 may include at least one additional operation. Additional operations may include an operation 1102, an operation 1104, an operation 1106, and/or an operation 1108.

Figure 74:
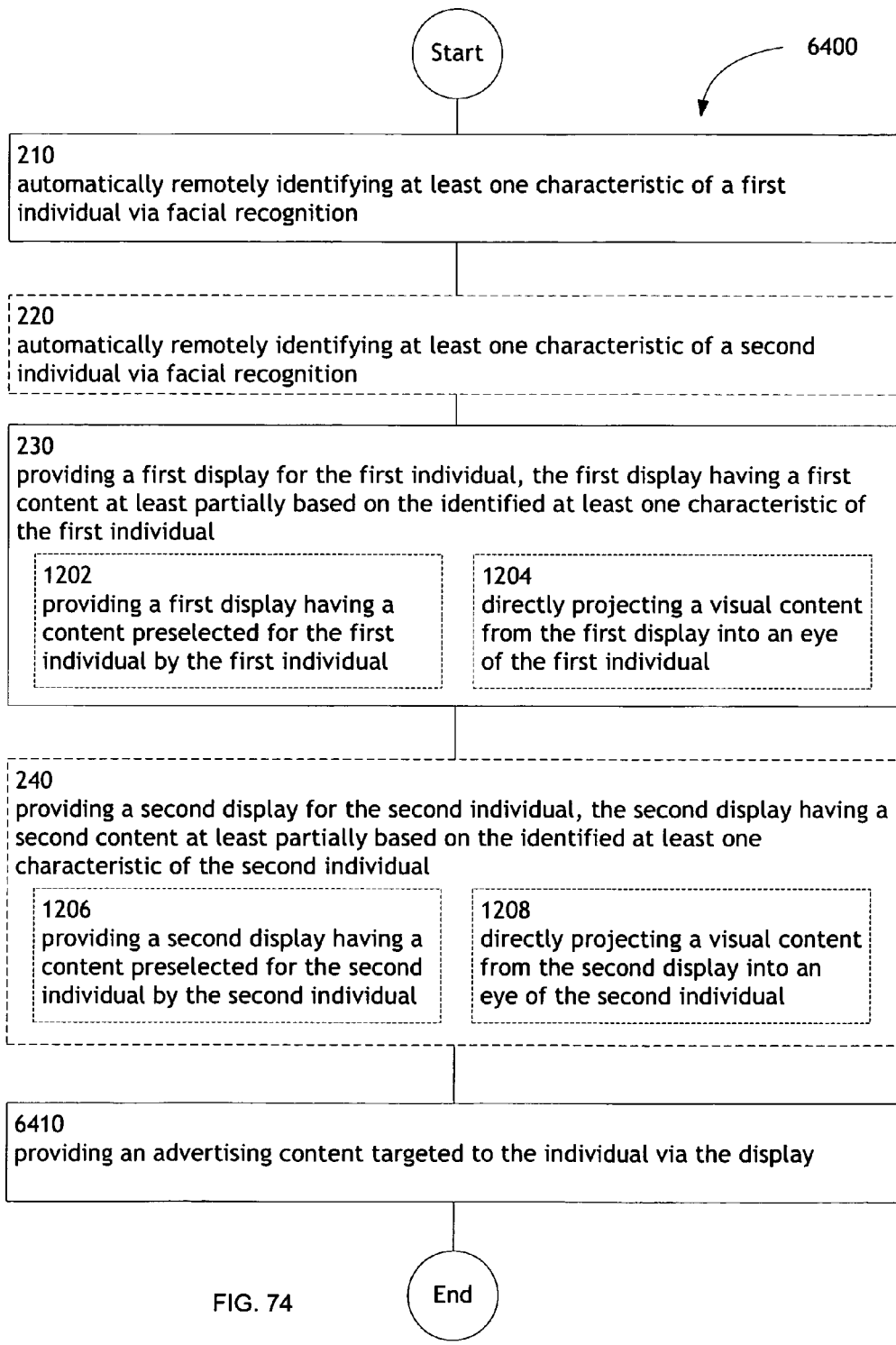
FIG. 74 illustrates an alternative embodiment of the operational flow of FIG. 64.

FIG. 74 illustrates alternative embodiments of the example operational flow 6400 of FIG. 64. FIG. 74 illustrates example embodiments where the operations 230 and 240 may include at least one additional operation. Additional operations may include an operation 1202, an operation 1204, an operation 1206, and/or an operation 1208.

Figure 75:
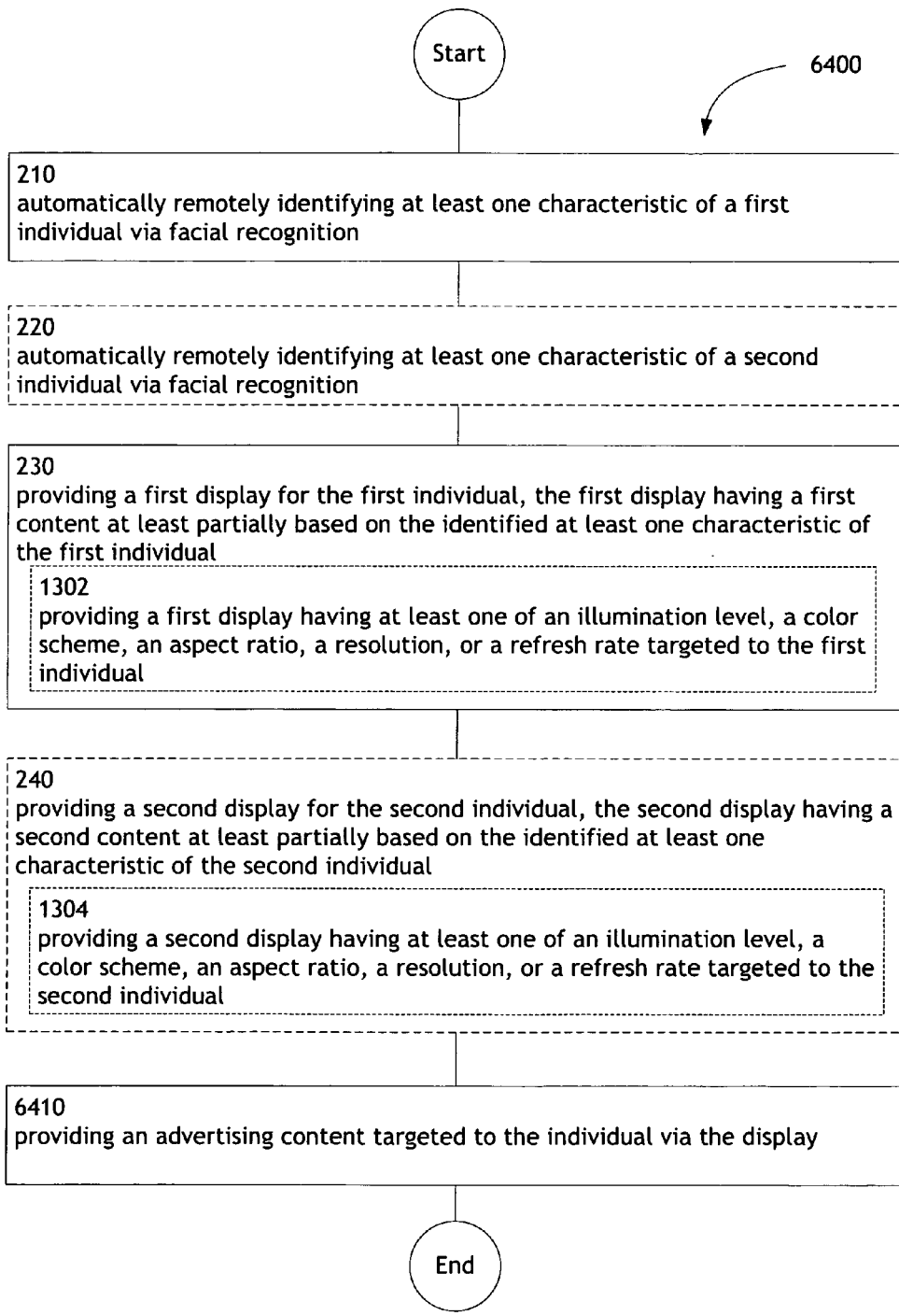
FIG. 75 illustrates an alternative embodiment of the operational flow of FIG. 64.

FIG. 75 illustrates alternative embodiments of the example operational flow 6400 of FIG. 64. FIG. 75 illustrates example embodiments where the operations 230 and 240 may include at least one additional operation. Additional operations may include an operation 1302 and/or an operation 1304.

Figure 76:
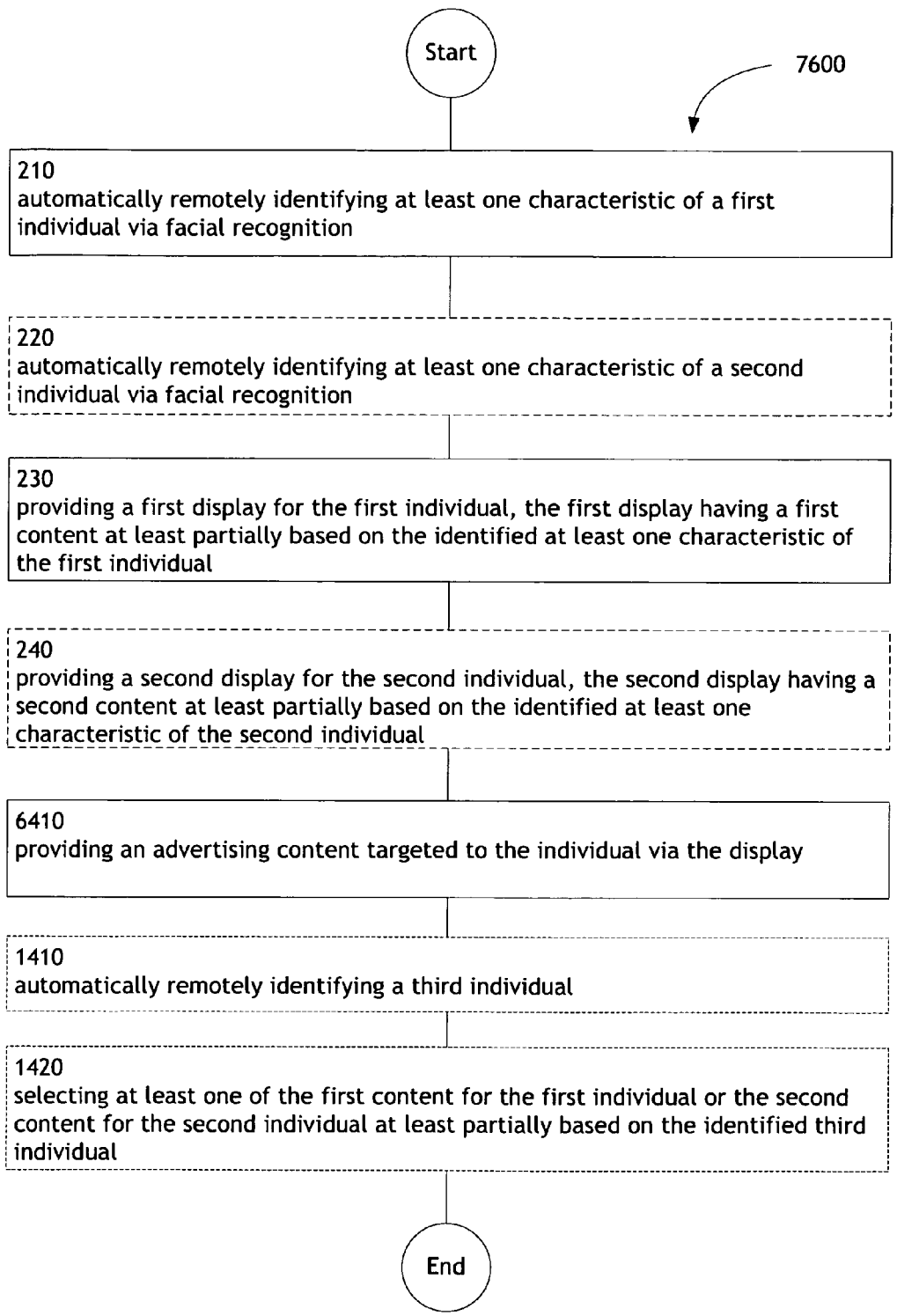
FIG. 76 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, automatically remotely identifying a third individual, and selecting the content for the first individual at least partially based on the identified third individual.

FIG. 76 illustrates an operational flow 7600 representing example operations related to automatically remotely identifying one or more characteristics of an individual utilizing facial recognition and providing a display for the individual having a content at least partially based on the one or more identified characteristics of the individual. FIG. 76 illustrates an example embodiment where the example operational flow 6400 of FIG. 64 may include at least one additional operation. Additional operations may include an operation 1410, and/or an operation 1420.

Figure 77A:
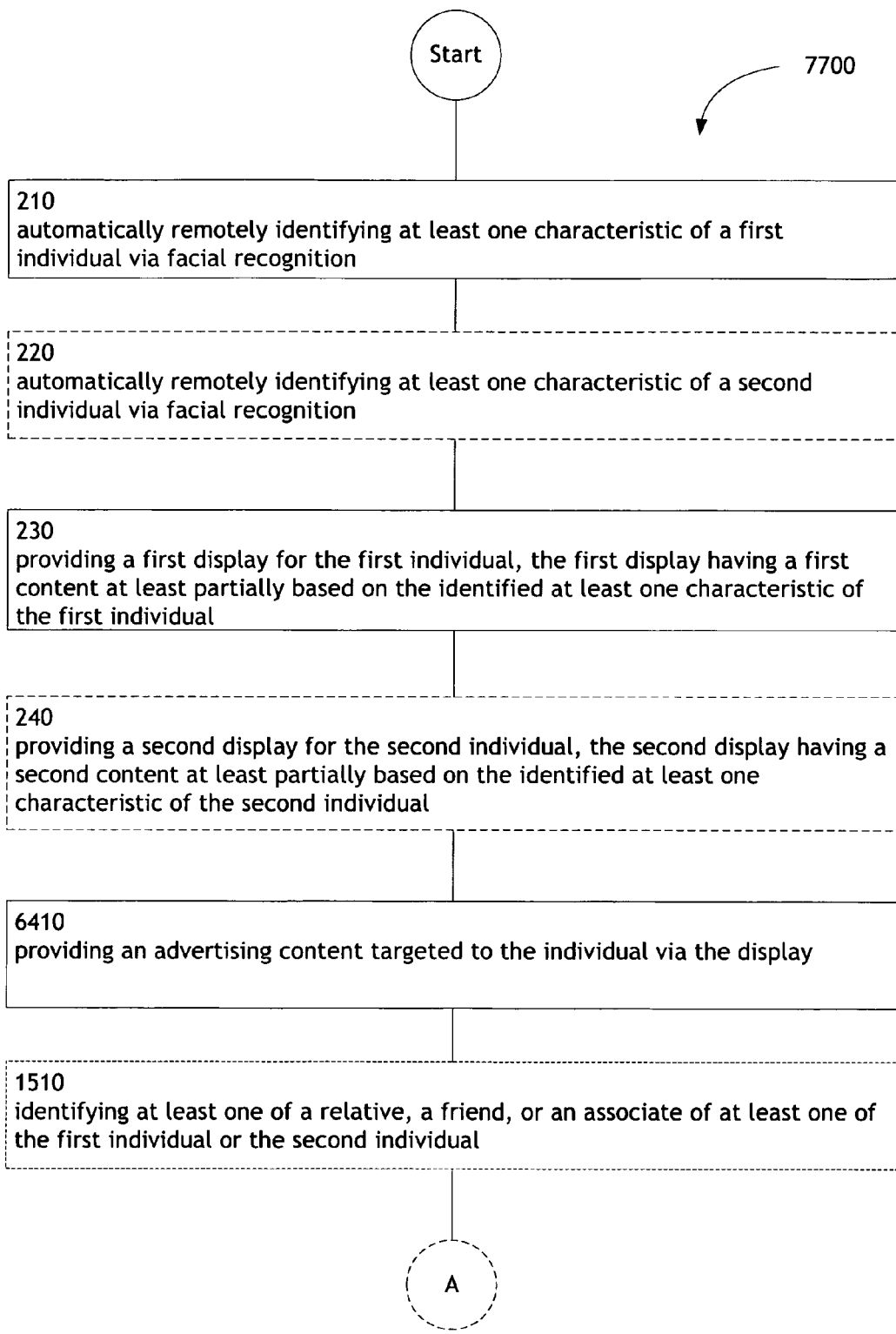
FIG. 77 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, identifying at least one of a relative, a friend, or an associate of the individual, and selecting the content for the individual at least partially based on the identity of the at least one of the relative, the friend, or the associate of the individual.

FIG. 77 illustrates an operational flow 7700 representing example operations related to automatically remotely identifying one or more characteristics of an individual utilizing facial recognition and providing a display for the individual having a content at least partially based on the one or more identified characteristics of the individual. FIG. 77 illustrates an example embodiment where the example operational flow 6400 of FIG. 64 may include at least one additional operation. Additional operations may include an operation 1510, an operation 1520, an operation 1522, and/or an operation 1524.

Figure 78:
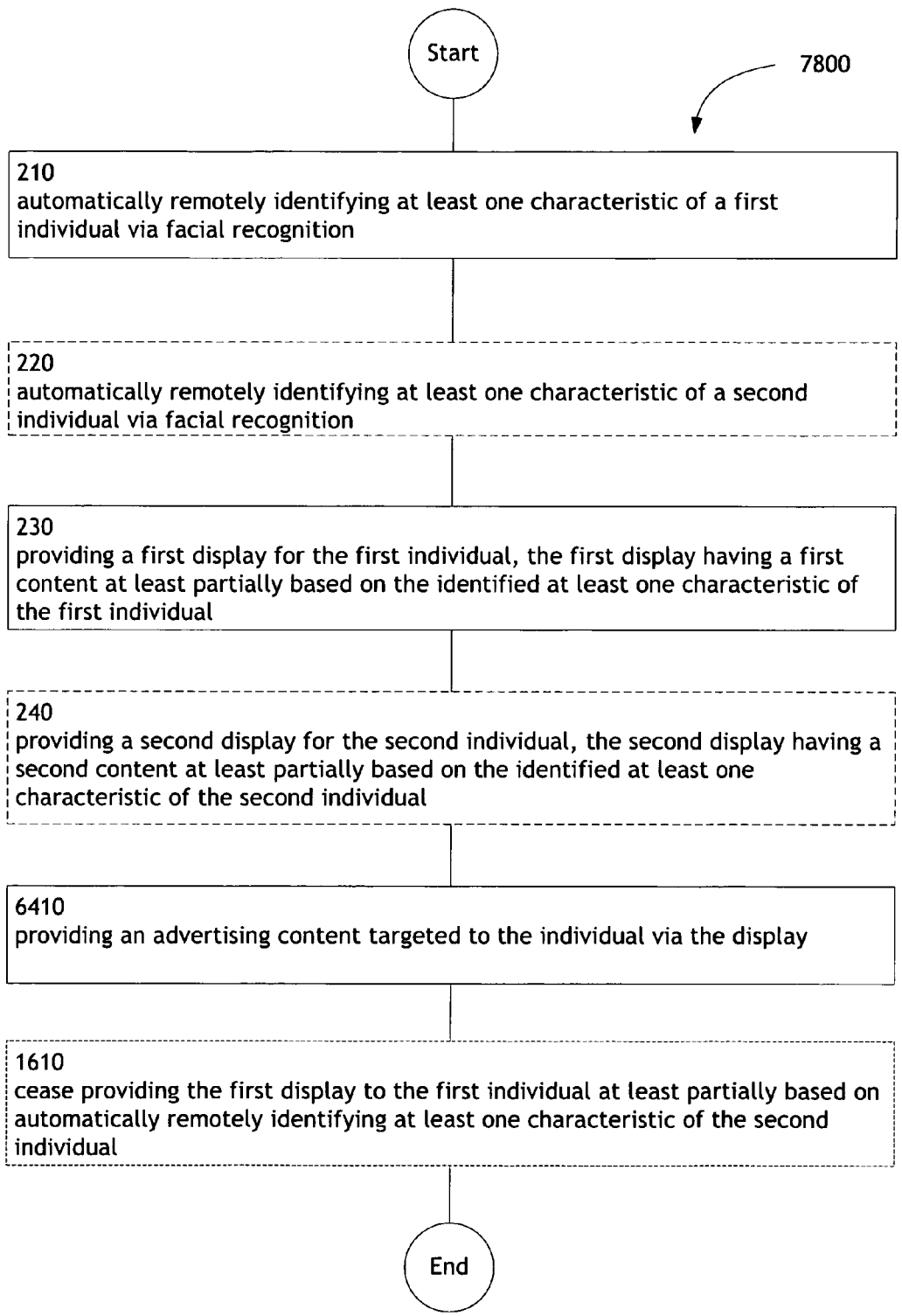
FIG. 78 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, and cease providing the display to the first individual at least partially based on automatically remotely identifying at least one characteristic of a second individual.

FIG. 78 illustrates an operational flow 7800 representing example operations related to automatically remotely identifying one or more characteristics of an individual utilizing facial recognition and providing a display for the individual having a content at least partially based on the one or more identified characteristics of the individual. FIG. 78 illustrates an example embodiment where the example operational flow 6400 of FIG. 64 may include at least one additional operation. Additional operations may include an operation 1610.

Figure 79A:
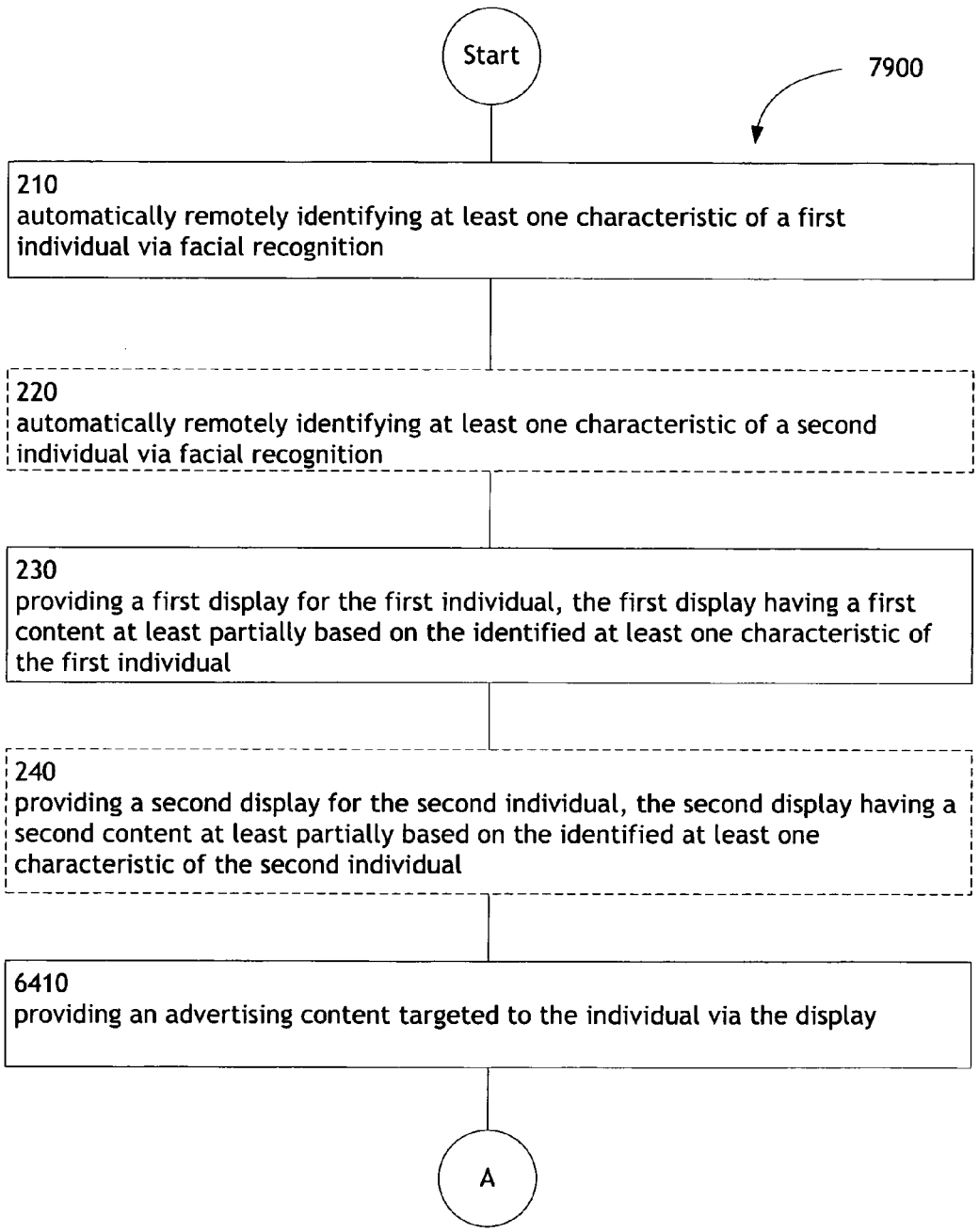
FIG. 79 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, automatically remotely identifying a third higher priority individual, and cease providing the display to the first individual at least partially based on the identified third higher priority individual.
Figure 79B:
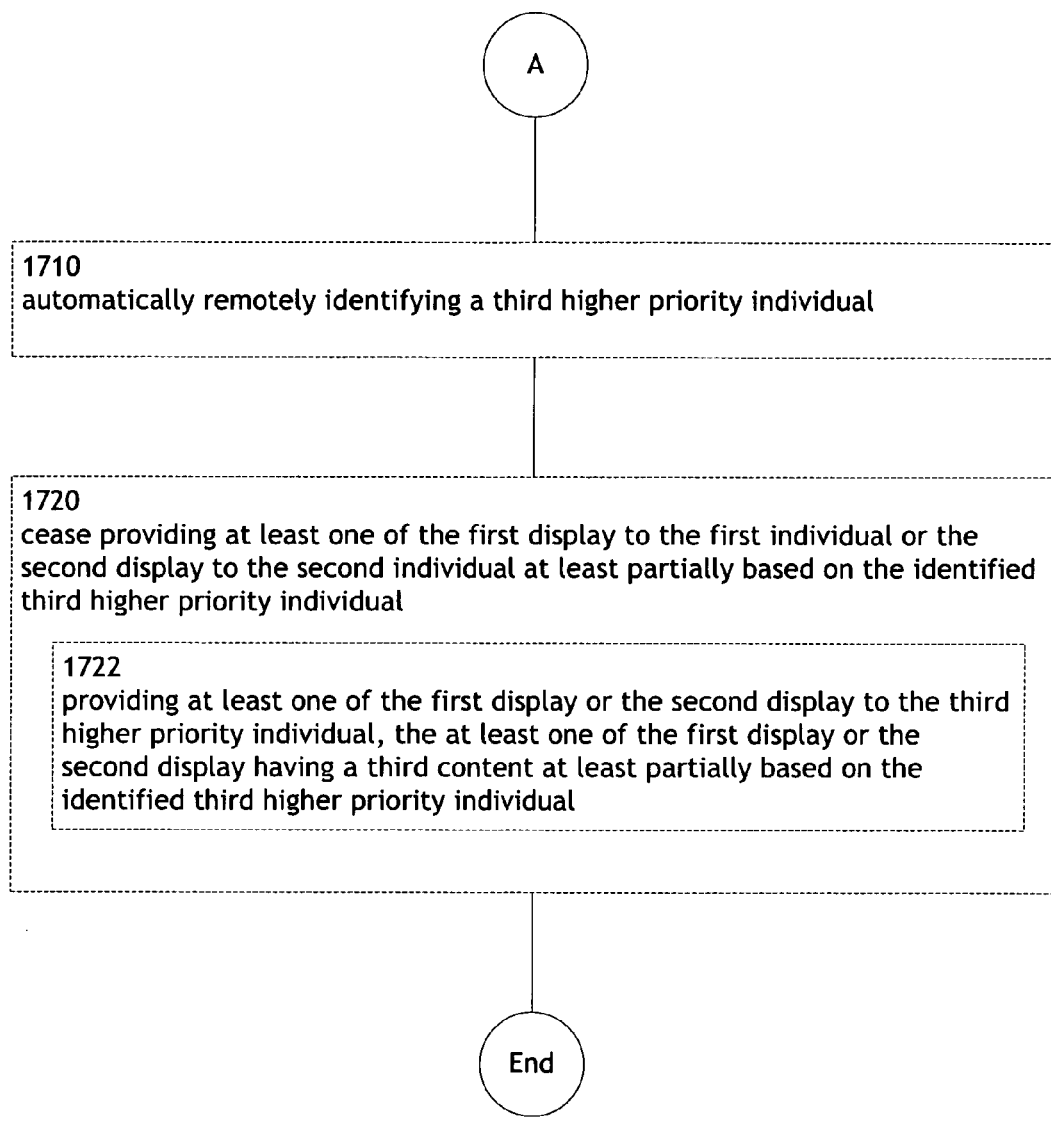

FIG. 79 illustrates an operational flow 7900 representing example operations related to automatically remotely identifying one or more characteristics of an individual utilizing facial recognition and providing a display for the individual having a content at least partially based on the one or more identified characteristics of the individual. FIG. 79 illustrates an example embodiment where the example operational flow 6400 of FIG. 64 may include at least one additional operation. Additional operations may include an operation 1710, an operation 1720, and/or an operation 1722.

Figure 80:
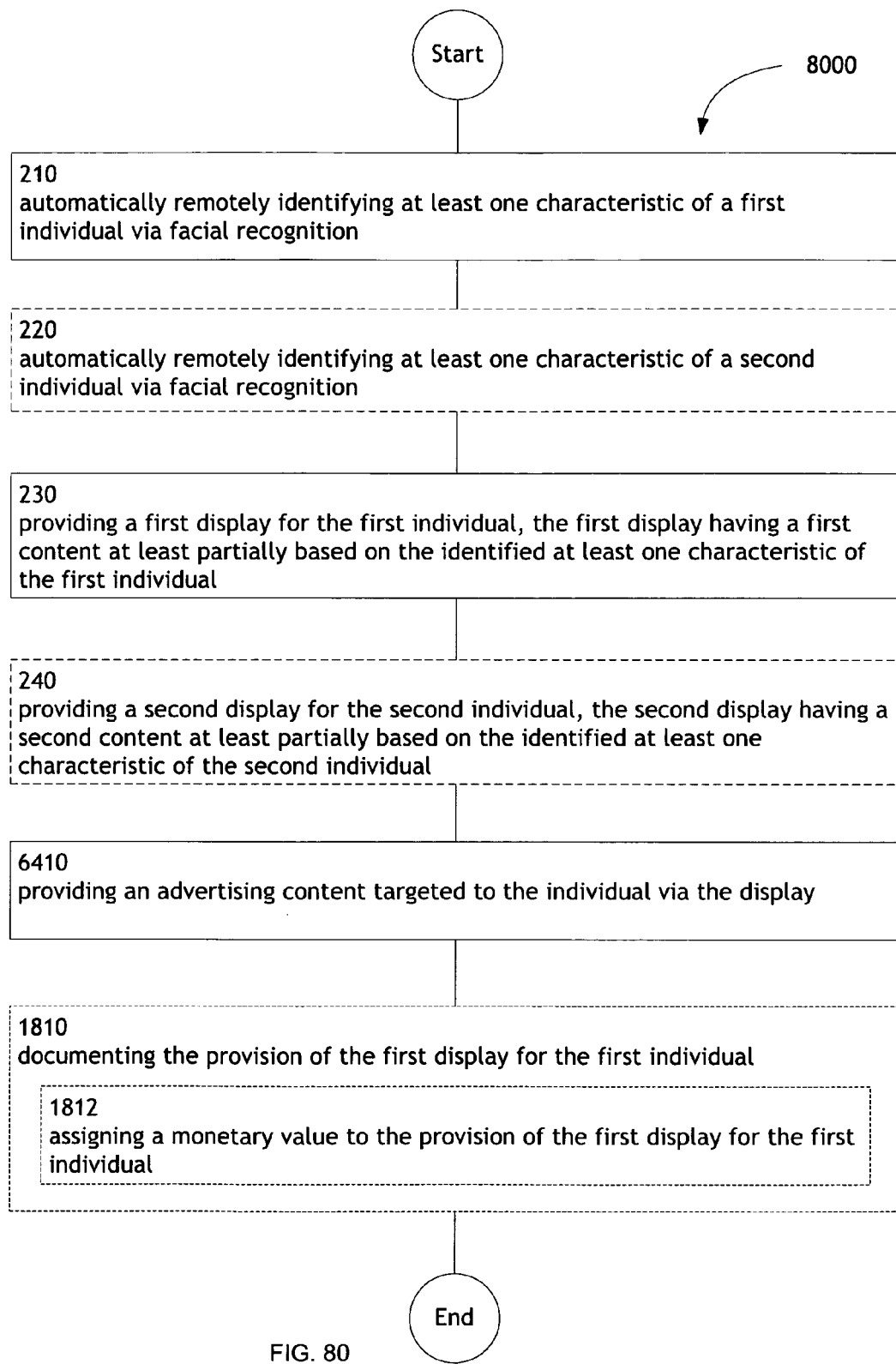
FIG. 80 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, and documenting the provision of the display for the individual.

FIG. 80 illustrates an operational flow 8000 representing example operations related to automatically remotely identifying one or more characteristics of an individual utilizing facial recognition and providing a display for the individual having a content at least partially based on the one or more identified characteristics of the individual. FIG. 80 illustrates an example embodiment where the example operational flow 6400 of FIG. 64 may include at least one additional operation. Additional operations may include an operation 1810, and/or an operation 1812.

Figure 81:
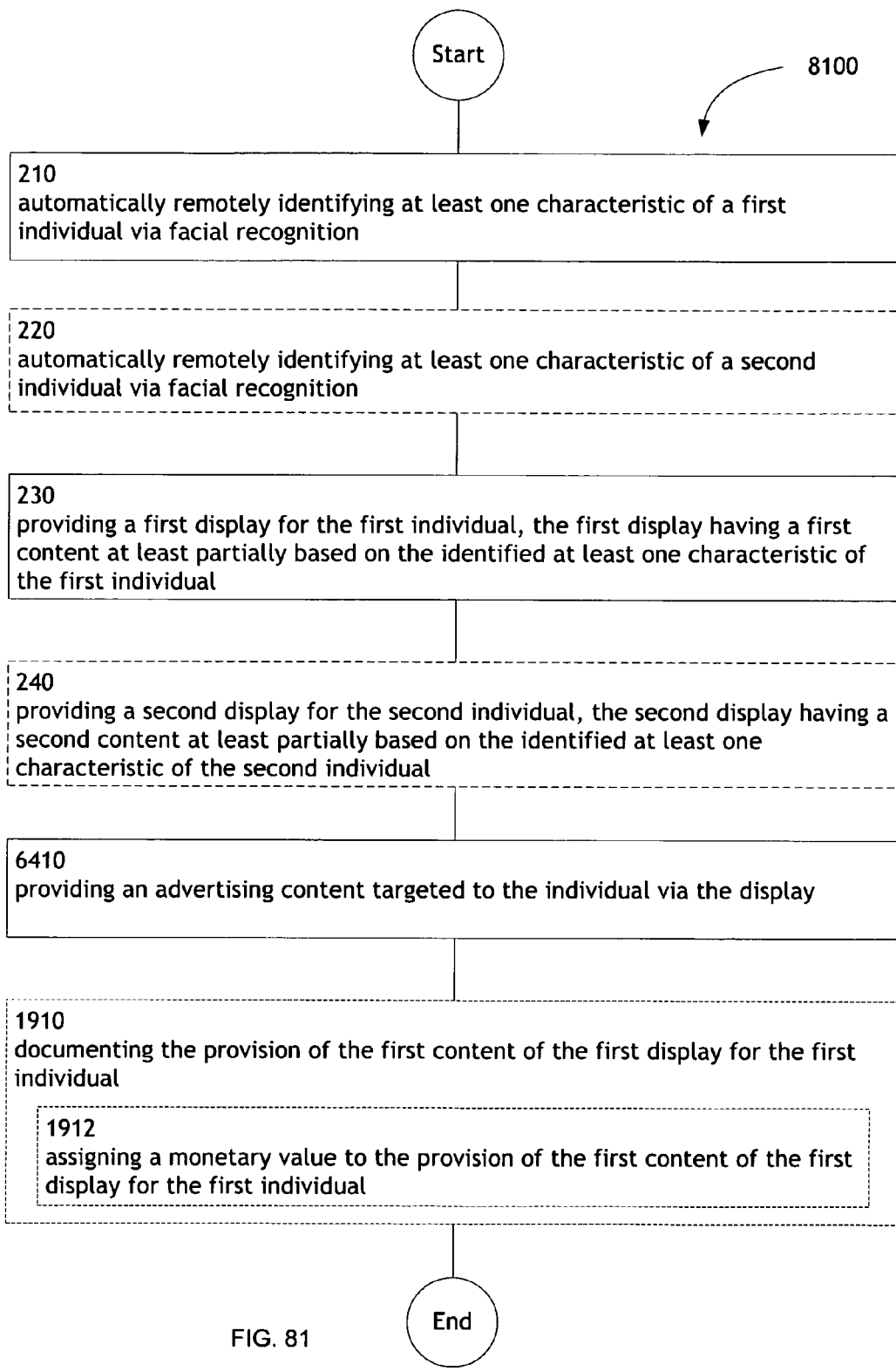
FIG. 81 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, and documenting the provision of the content of the display for the individual.

FIG. 81 illustrates an operational flow 8100 representing example operations related to automatically remotely identifying one or more characteristics of an individual utilizing facial recognition and providing a display for the individual having a content at least partially based on the one or more identified characteristics of the individual. FIG. 81 illustrates an example embodiment where the example operational flow 6400 of FIG. 64 may include at least one additional operation. Additional operations may include an operation 1910, and/or an operation 1912.

Figure 82:
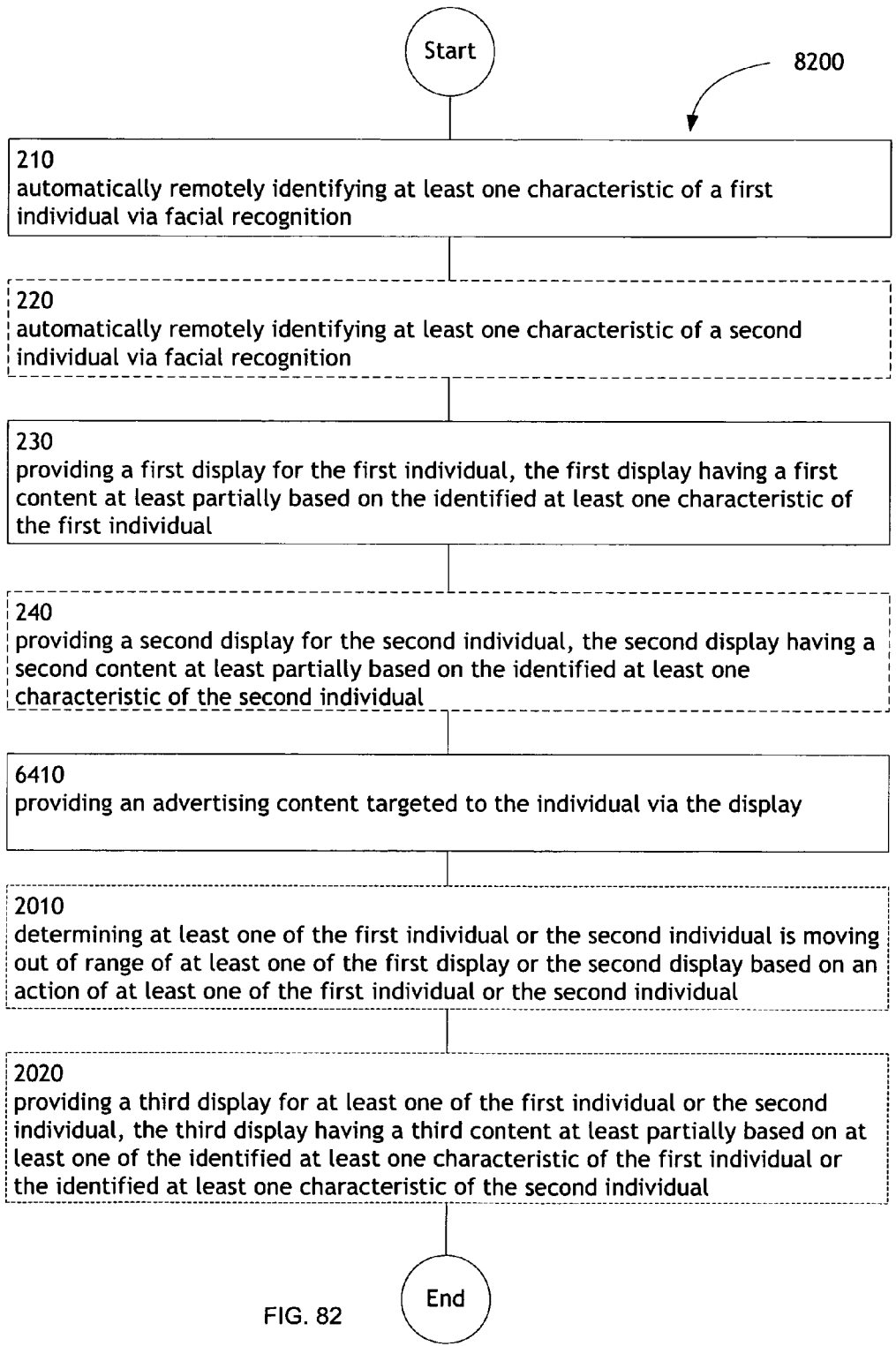
FIG. 82 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, determining the individual is moving out of range of the display based on an action of the individual, and providing a third display for the individual, the third display having a third content at least partially based on the identified at least one characteristic of the individual.

FIG. 82 illustrates an operational flow 8200 representing example operations related to automatically remotely identifying one or more characteristics of an individual utilizing facial recognition and providing a display for the individual having a content at least partially based on the one or more identified characteristics of the individual. FIG. 82 illustrates an example embodiment where the example operational flow 6400 of FIG. 64 may include at least one additional operation. Additional operations may include an operation 2010, and/or an operation 2020.

Figure 83:
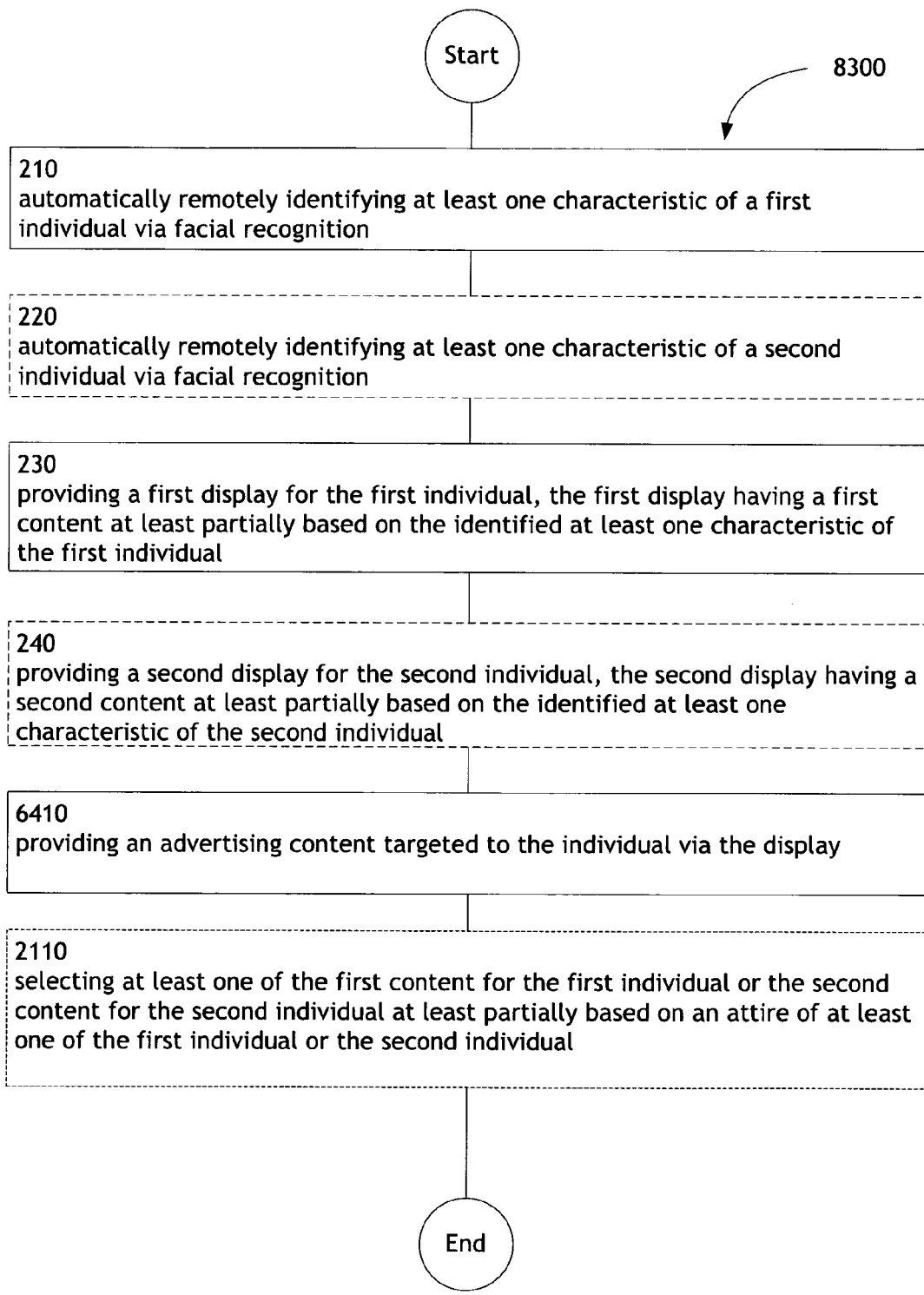
FIG. 83 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, selecting the content for the individual at least partially based on an attire of the individual.

FIG. 83 illustrates an operational flow 8300 representing example operations related to automatically remotely identifying one or more characteristics of an individual utilizing facial recognition and providing a display for the individual having a content at least partially based on the one or more identified characteristics of the individual. FIG. 83 illustrates an example embodiment where the example operational flow 6400 of FIG. 64 may include at least one additional operation. Additional operations may include an operation 2110.

Figure 84:
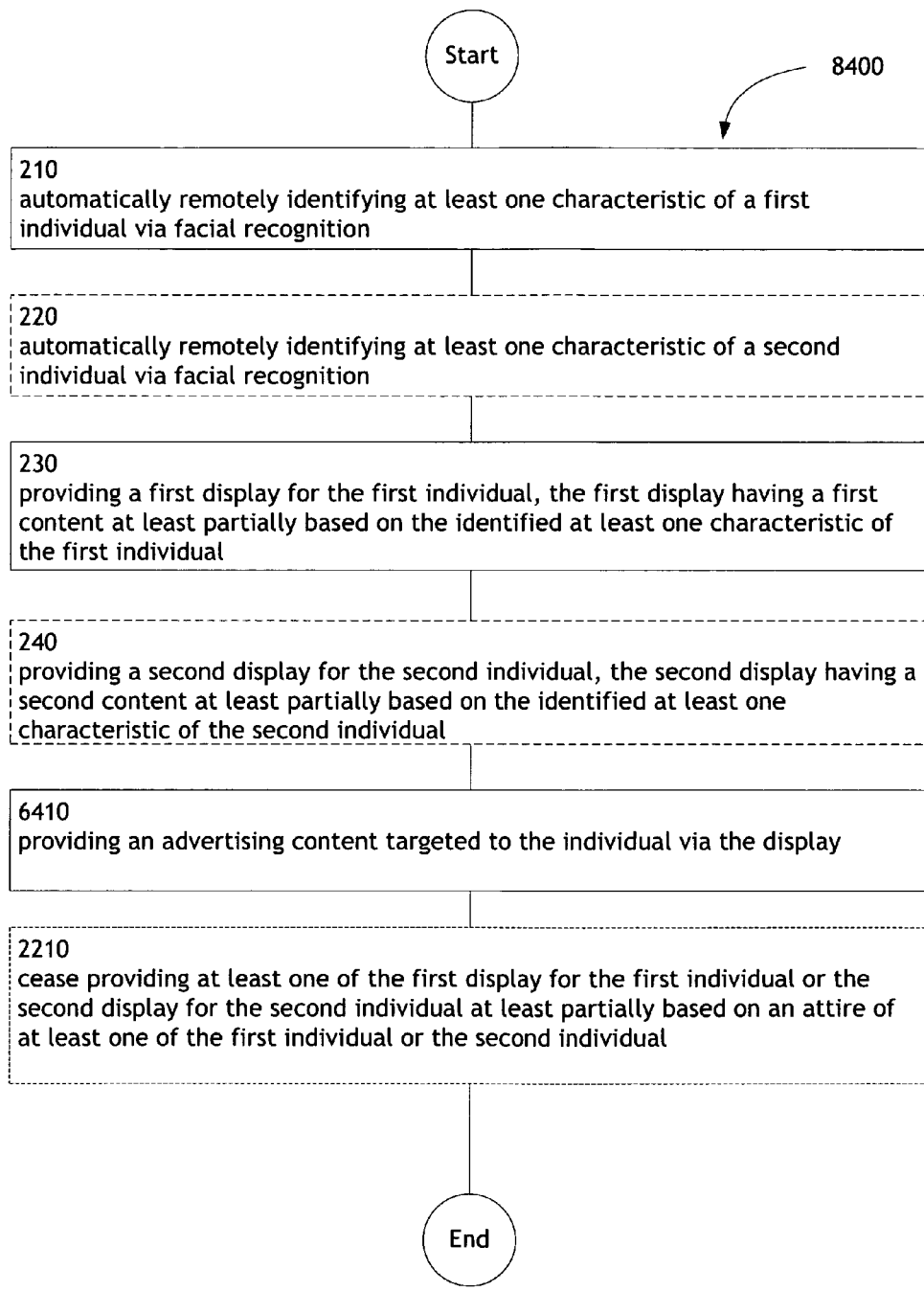
FIG. 84 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, and cease providing the display for the individual at least partially based on an attire of the individual.

FIG. 84 illustrates an operational flow 8400 representing example operations related to automatically remotely identifying one or more characteristics of an individual utilizing facial recognition and providing a display for the individual having a content at least partially based on the one or more identified characteristics of the individual. FIG. 84 illustrates an example embodiment where the example operational flow 6400 of FIG. 64 may include at least one additional operation. Additional operations may include an operation 2210.

Figure 85:
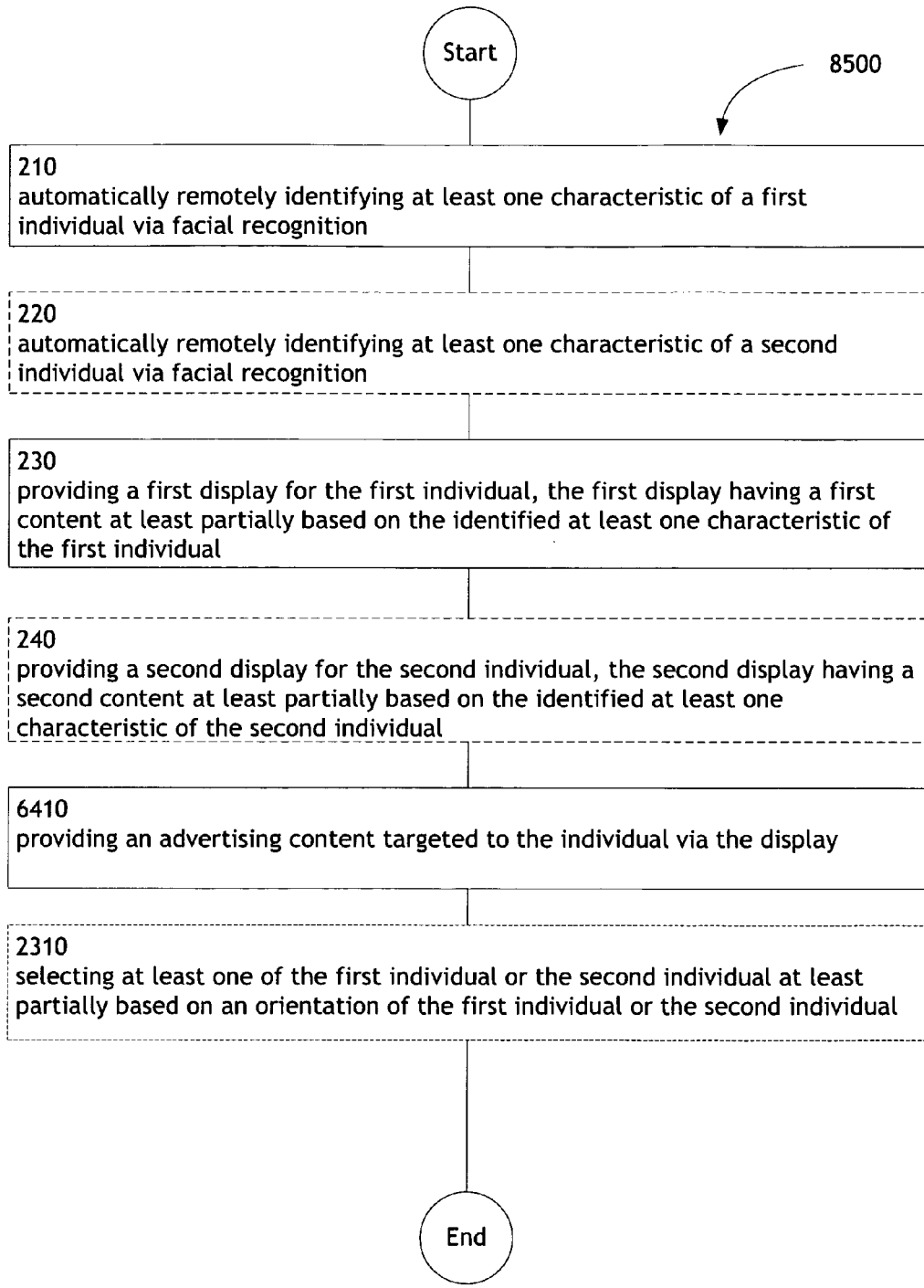
FIG. 85 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, and selecting the individual at least partially based on an orientation of the individual.

FIG. 85 illustrates an operational flow 8500 representing example operations related to automatically remotely identifying one or more characteristics of an individual utilizing facial recognition and providing a display for the individual having a content at least partially based on the one or more identified characteristics of the individual. FIG. 85 illustrates an example embodiment where the example operational flow 6400 of FIG. 64 may include at least one additional operation. Additional operations may include an operation 2310.

Figure 86A:
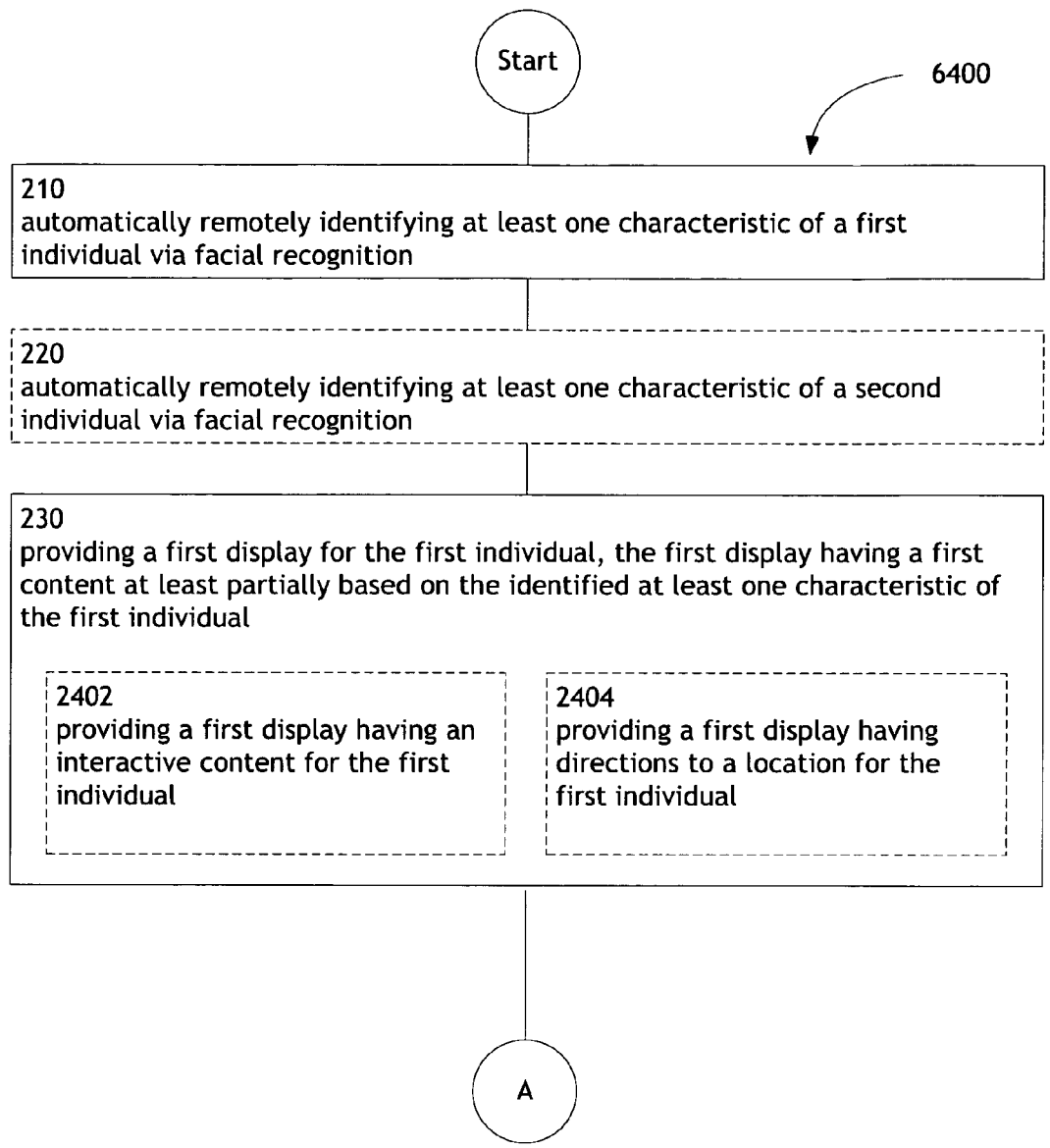
FIG. 86 illustrates an alternative embodiment of the operational flow of FIG. 64.
Figure 86B:
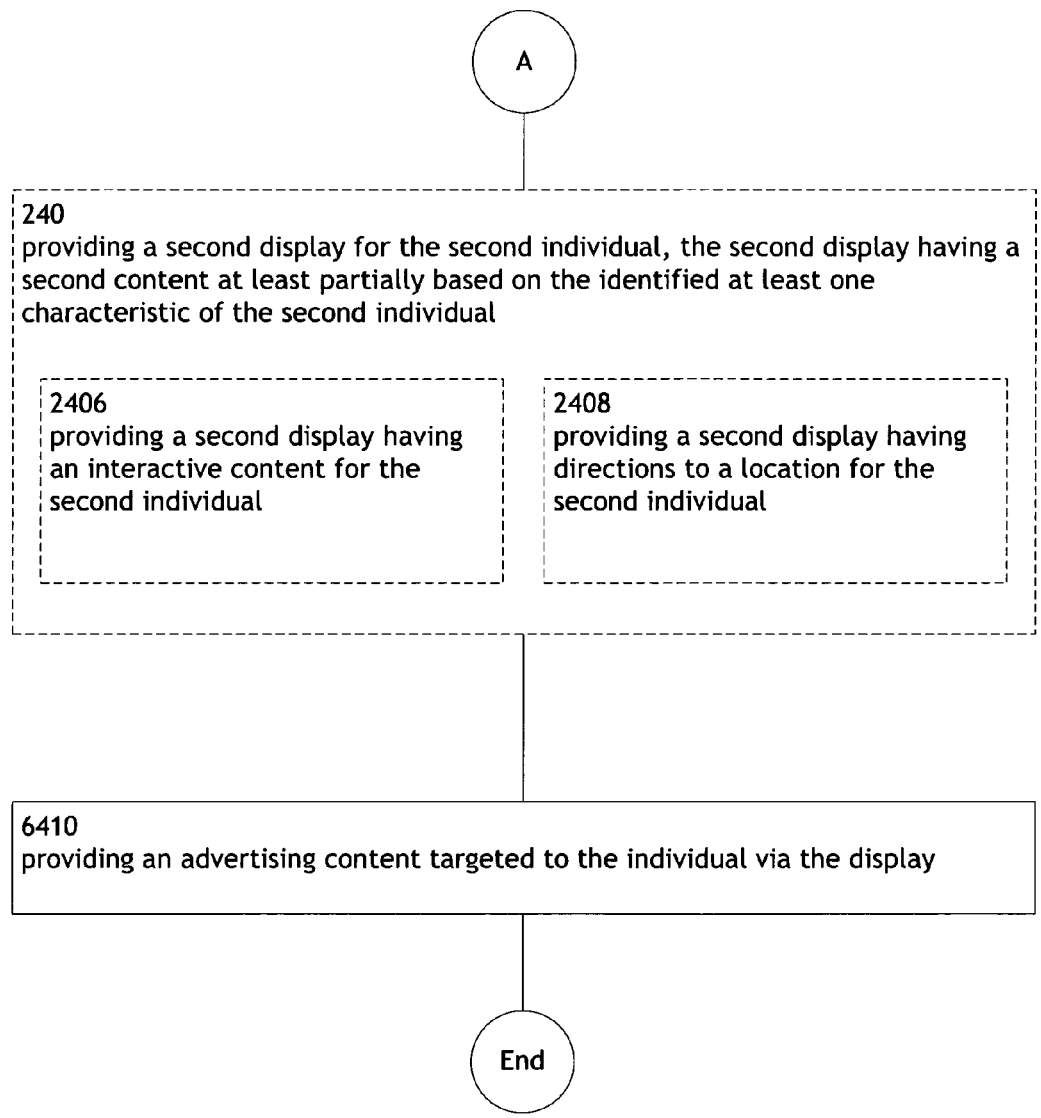

FIG. 86 illustrates alternative embodiments of the example operational flow 6400 of FIG. 64. FIG. 86 illustrates example embodiments where the operations 230 and 240 may include at least one additional operation. Additional operations may include an operation 2402, an operation 2404, an operation 2406, and/or an operation 2408.

Figure 87A:
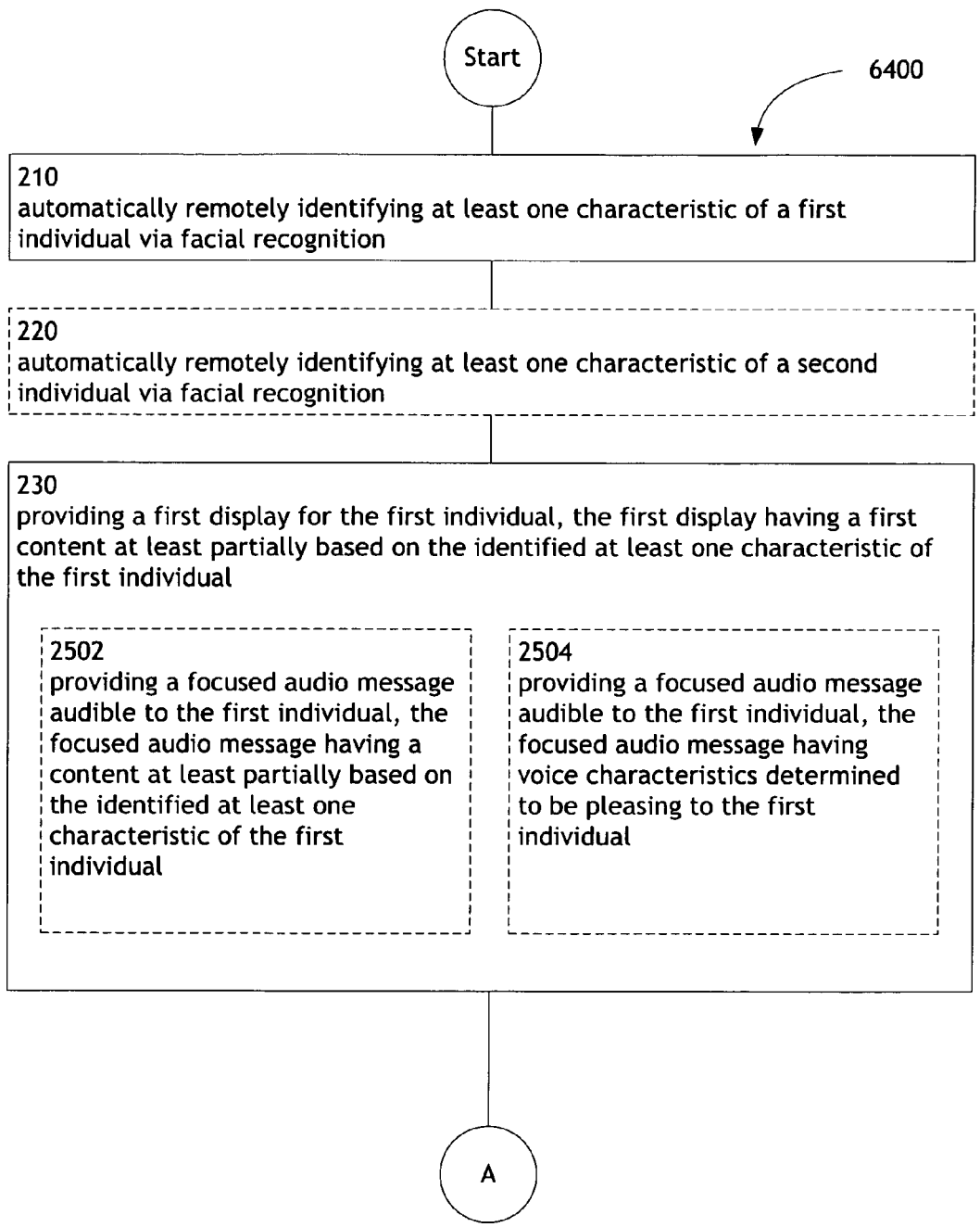
FIG. 87 illustrates an alternative embodiment of the operational flow of FIG. 64.
Figure 87B:
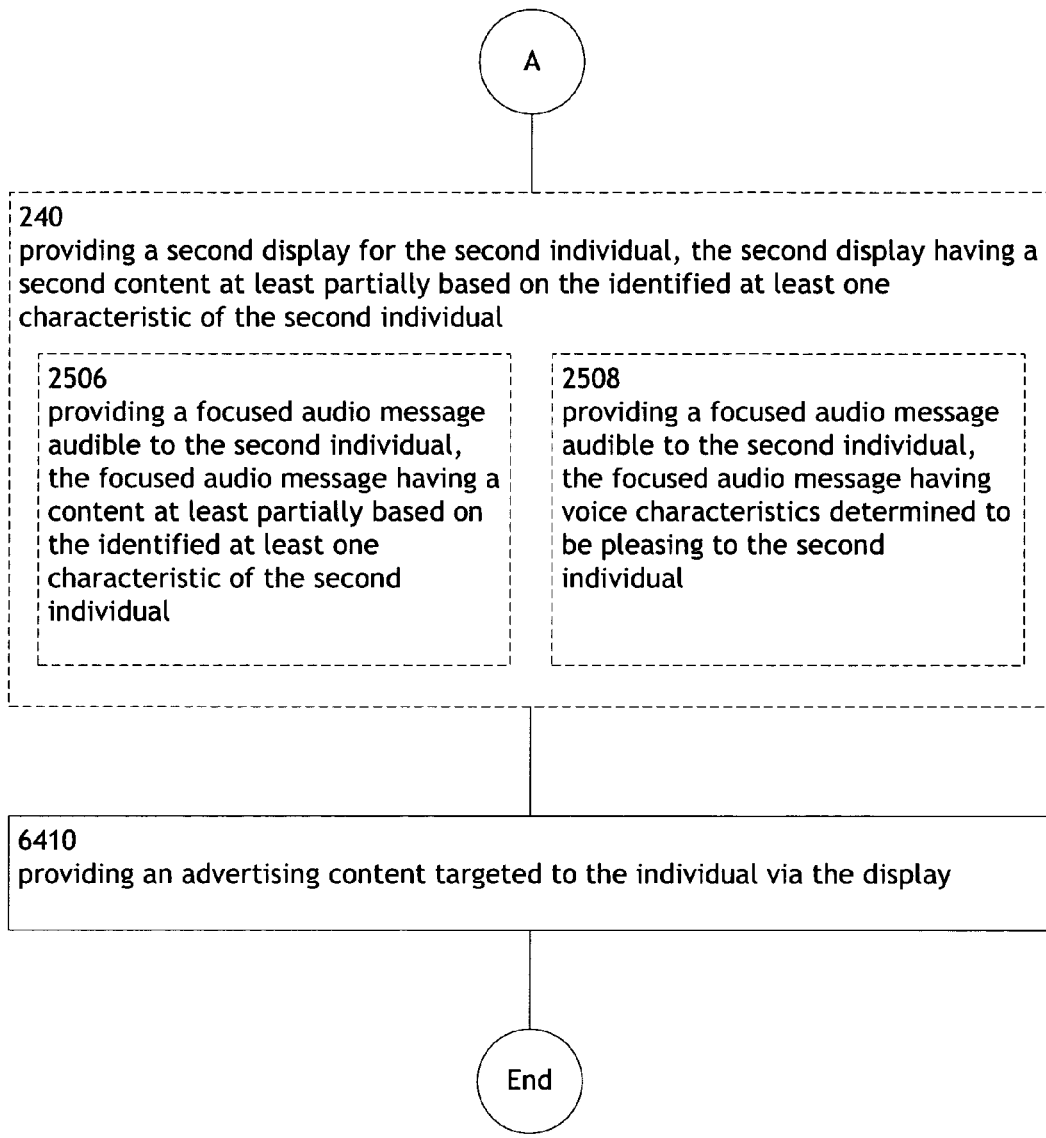

FIG. 87 illustrates alternative embodiments of the example operational flow 6400 of FIG. 64. FIG. 87 illustrates example embodiments where the operations 230 and 240 may include at least one additional operation. Additional operations may include an operation 2502, an operation 2504, an operation 2506, and/or an operation 2508.

Figure 88A:
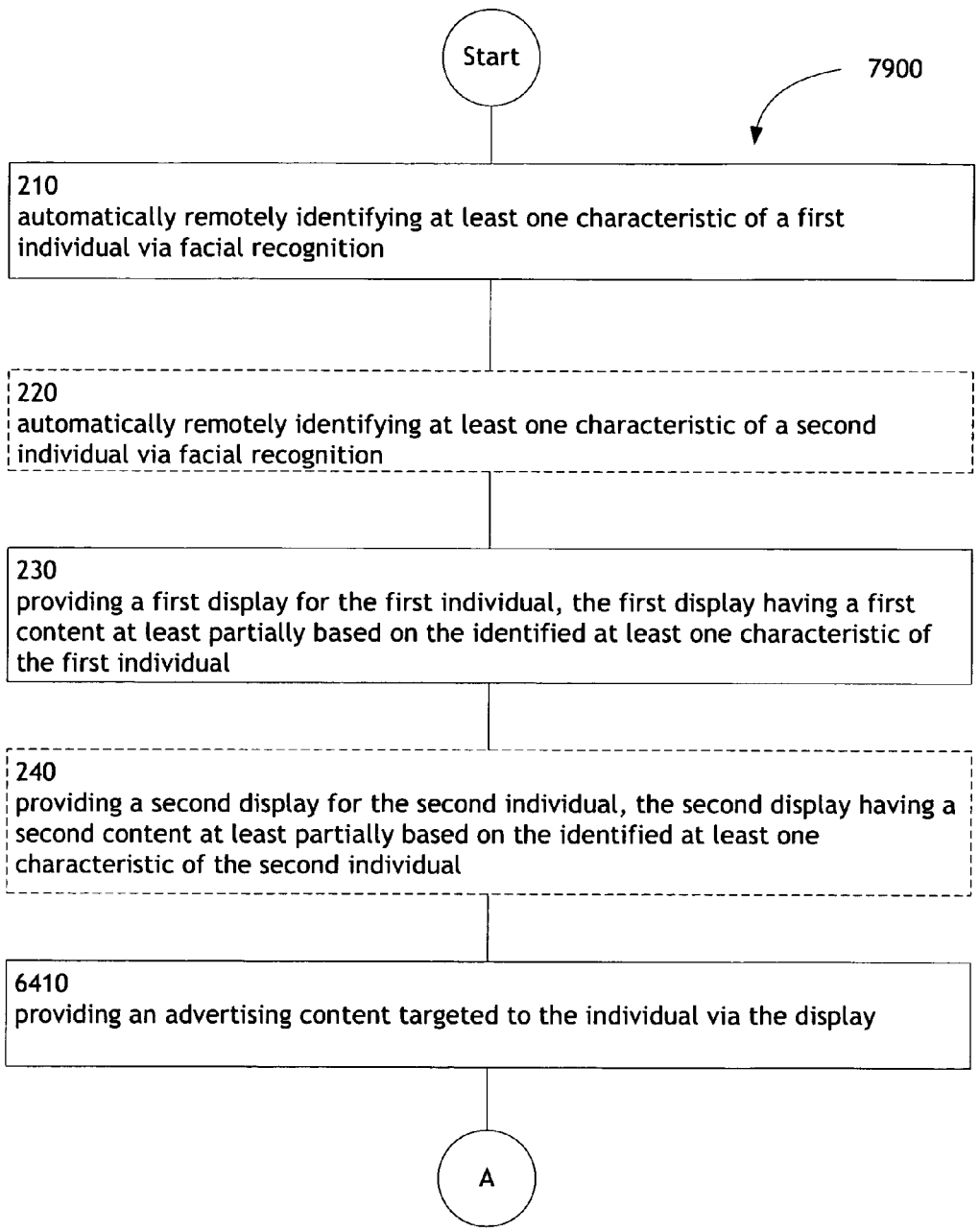
FIG. 88 illustrates an alternative embodiment of the operational flow of FIG. 79.
Figure 88B:
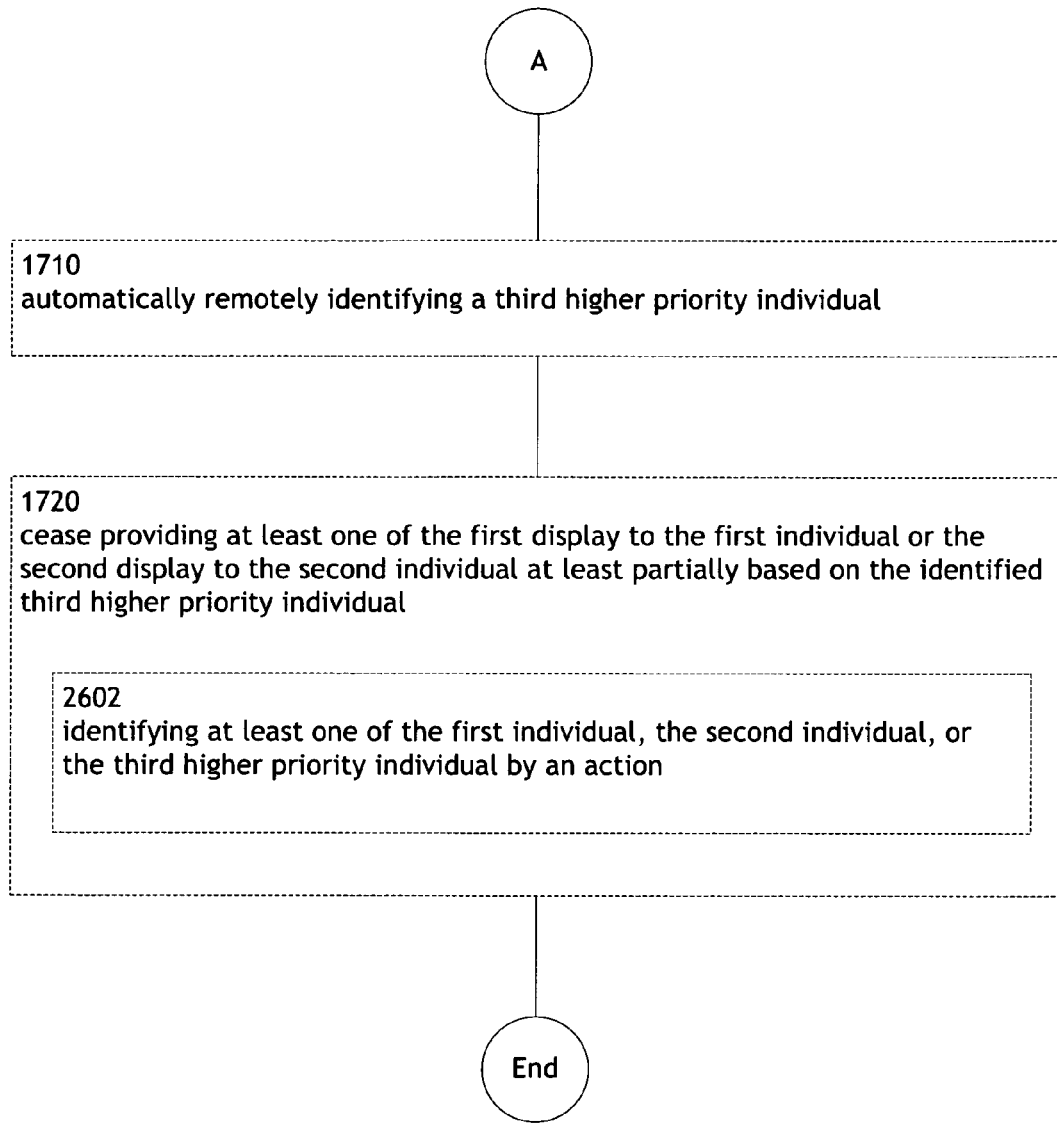

FIG. 88 illustrates alternative embodiments of the example operational flow 7900 of FIG. 79. FIG. 88 illustrates example embodiments where the operation 1720 may include at least one additional operation. Additional operations may include an operation 2602.

Figure 89A:
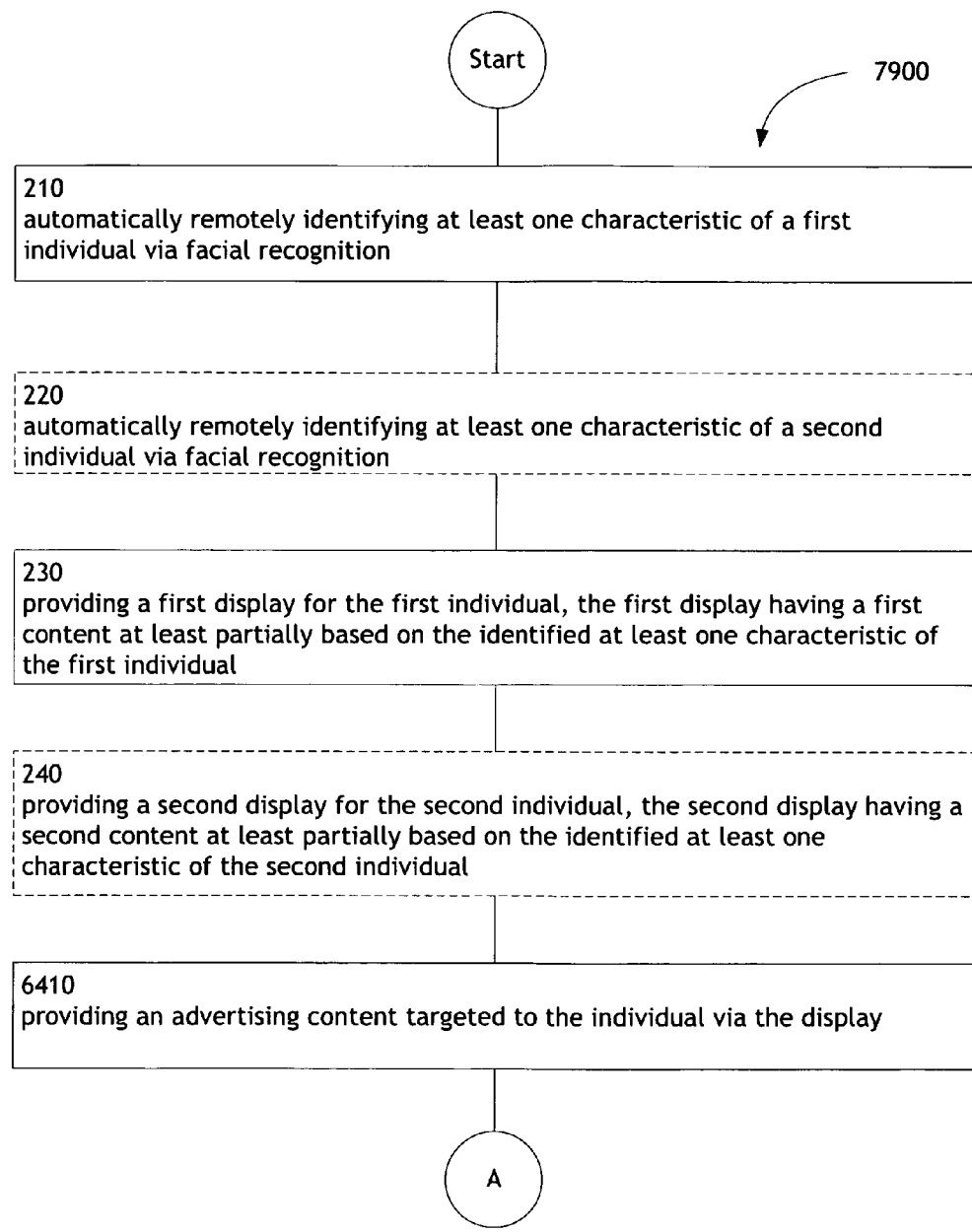
FIG. 89 illustrates an alternative embodiment of the operational flow of FIG. 79.

FIG. 89 illustrates alternative embodiments of the example operational flow 7900 of FIG. 79. FIG. 89 illustrates example embodiments where the operation 1720 may include at least one additional operation. Additional operations may include an operation 2702.

Figure 90:
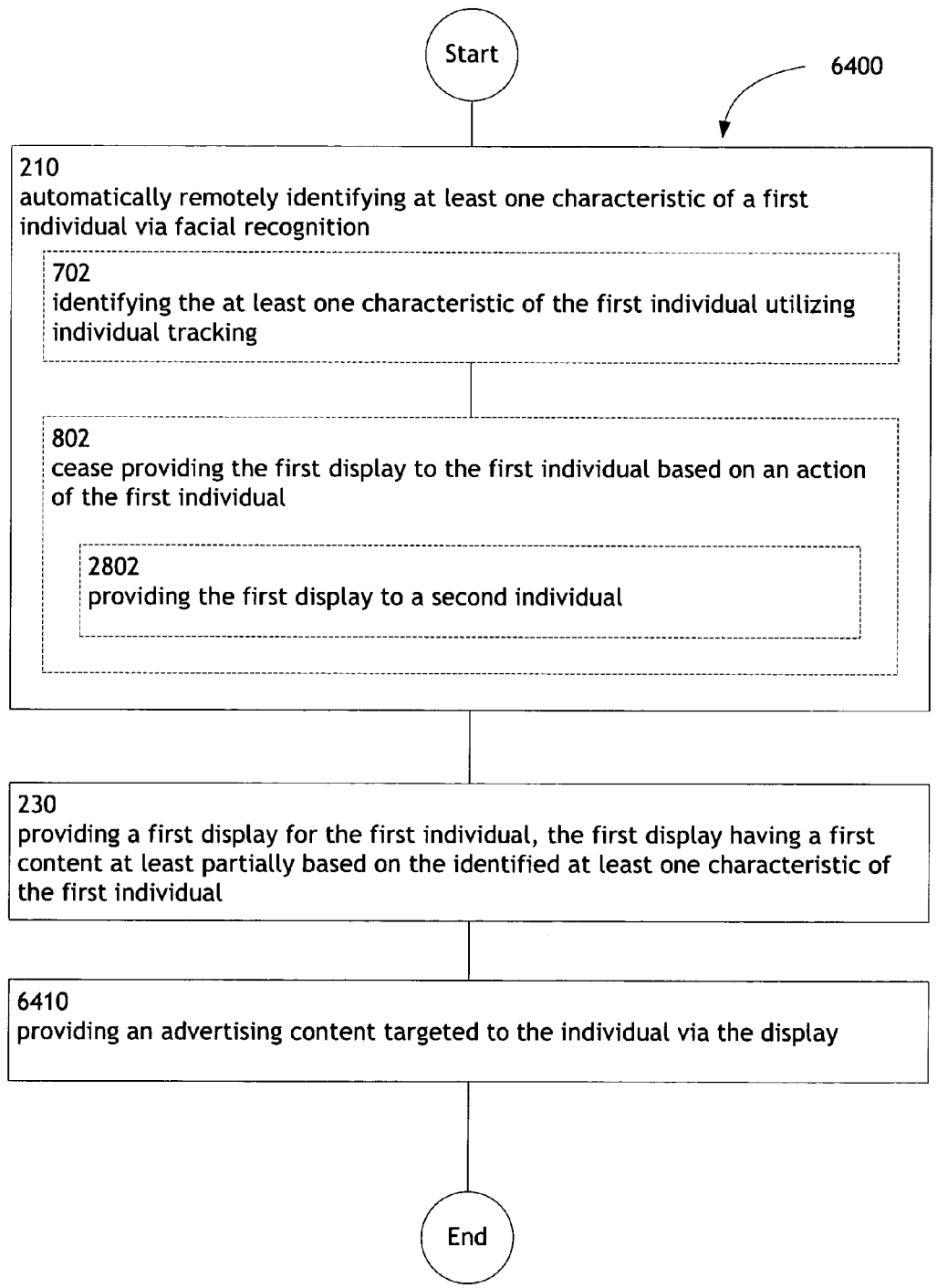
FIG. 90 illustrates an alternative embodiment of the operational flow of FIG. 64.

FIG. 90 illustrates alternative embodiments of the example operational flow 6400 of FIG. 64. FIG. 90 illustrates example embodiments where the operation 210 may include at least one additional operation. Additional operations may include an operation 2802.

Figure 91:
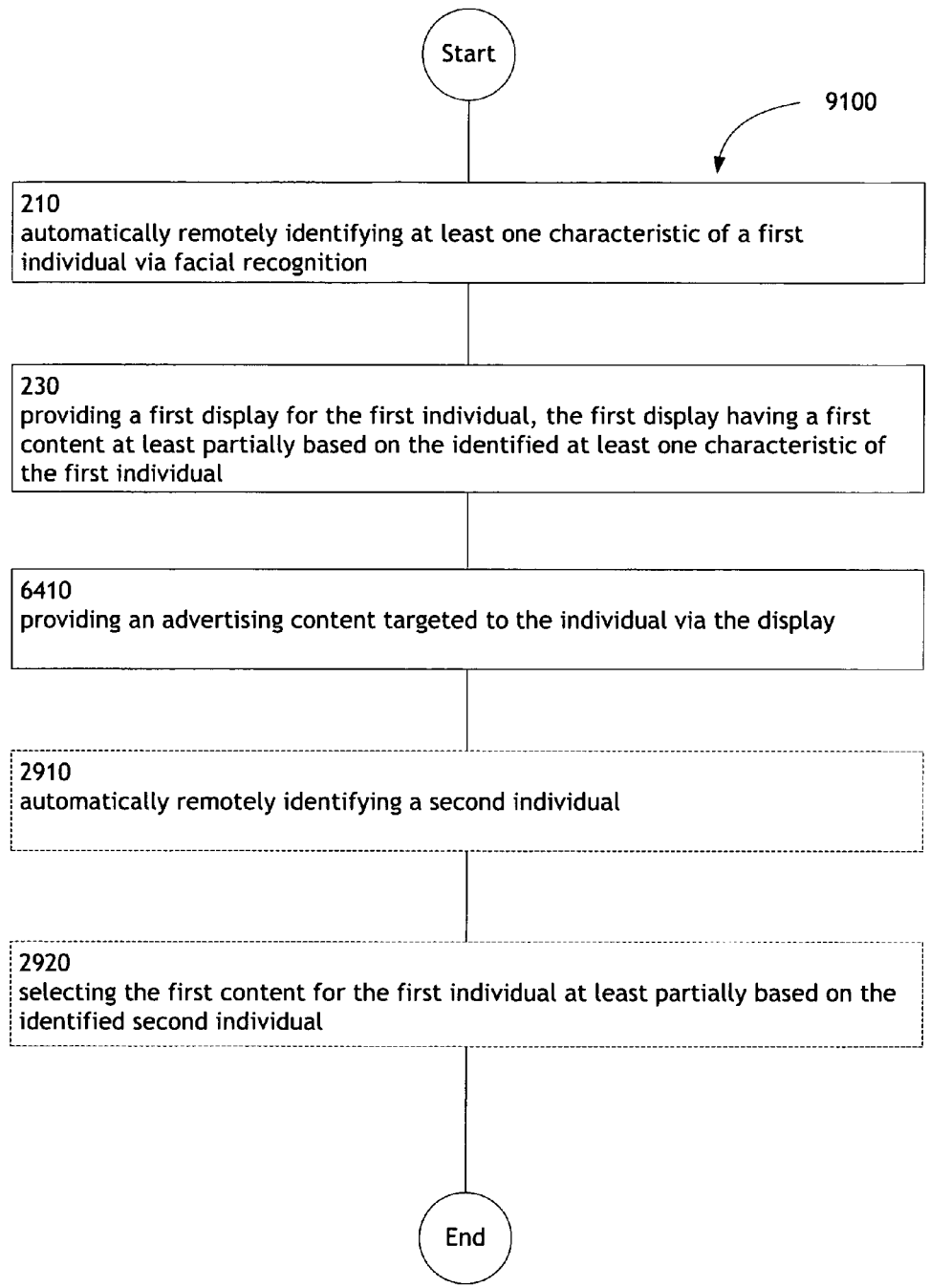
FIG. 91 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, automatically remotely identifying a second individual, and selecting the content for the first individual at least partially based on the identified second individual.

FIG. 91 illustrates an operational flow 9100 representing example operations related to automatically remotely identifying one or more characteristics of an individual utilizing facial recognition and providing a display for the individual having a content at least partially based on the one or more identified characteristics of the individual. FIG. 91 illustrates an example embodiment where the example operational flow 6400 of FIG. 64 may include at least one additional operation. Additional operations may include an operation 2910, and/or an operation 2920.

Figure 92:
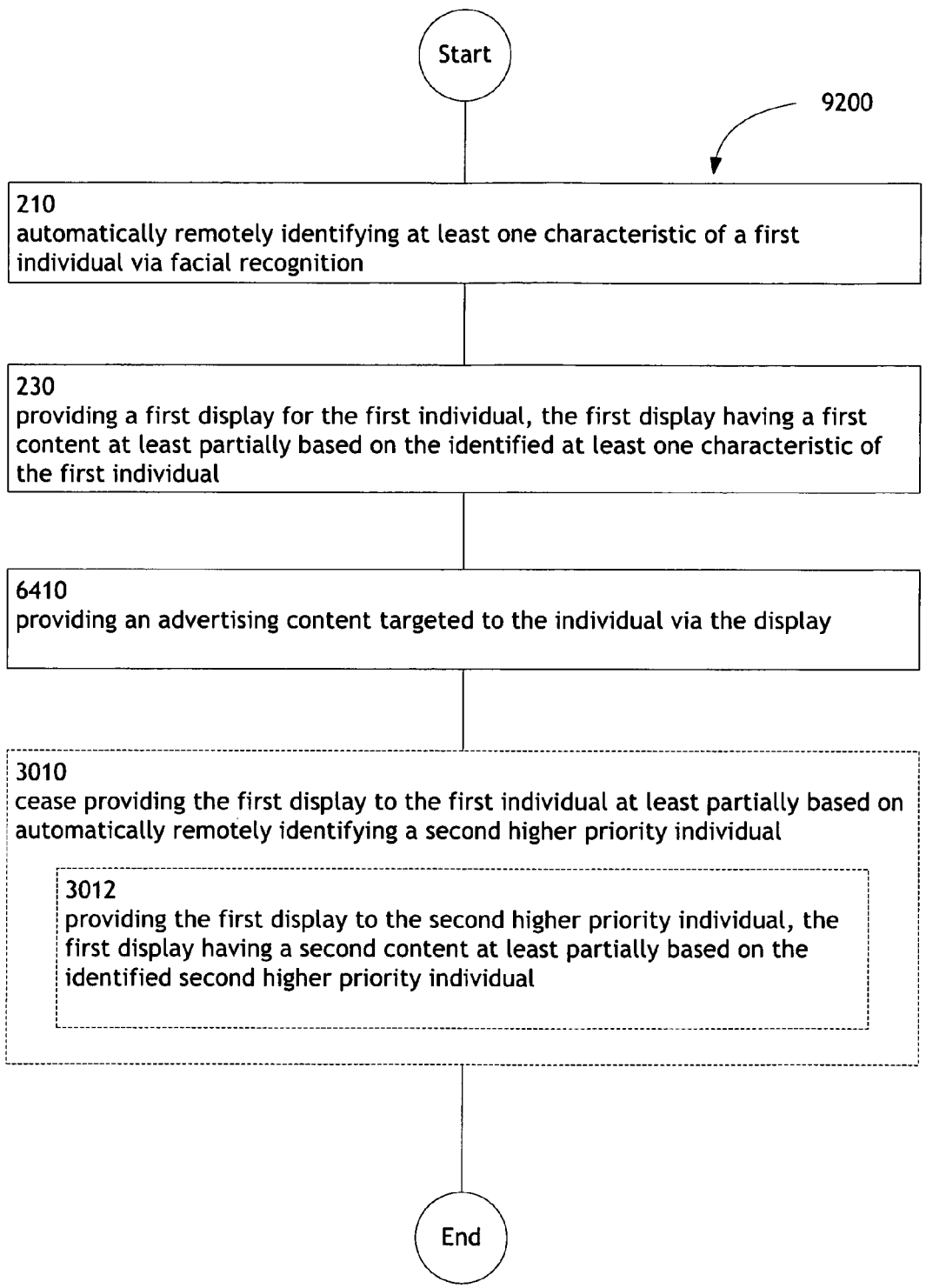
FIG. 92 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, and cease providing the display to the first individual at least partially based on automatically remotely identifying a second higher priority individual.

FIG. 92 illustrates an operational flow 9200 representing example operations related to automatically remotely identifying one or more characteristics of an individual utilizing facial recognition and providing a display for the individual having a content at least partially based on the one or more identified characteristics of the individual. FIG. 92 illustrates an example embodiment where the example operational flow 6400 of FIG. 64 may include at least one additional operation. Additional operations may include an operation 3010, and/or an operation 3012.

Figure 93:
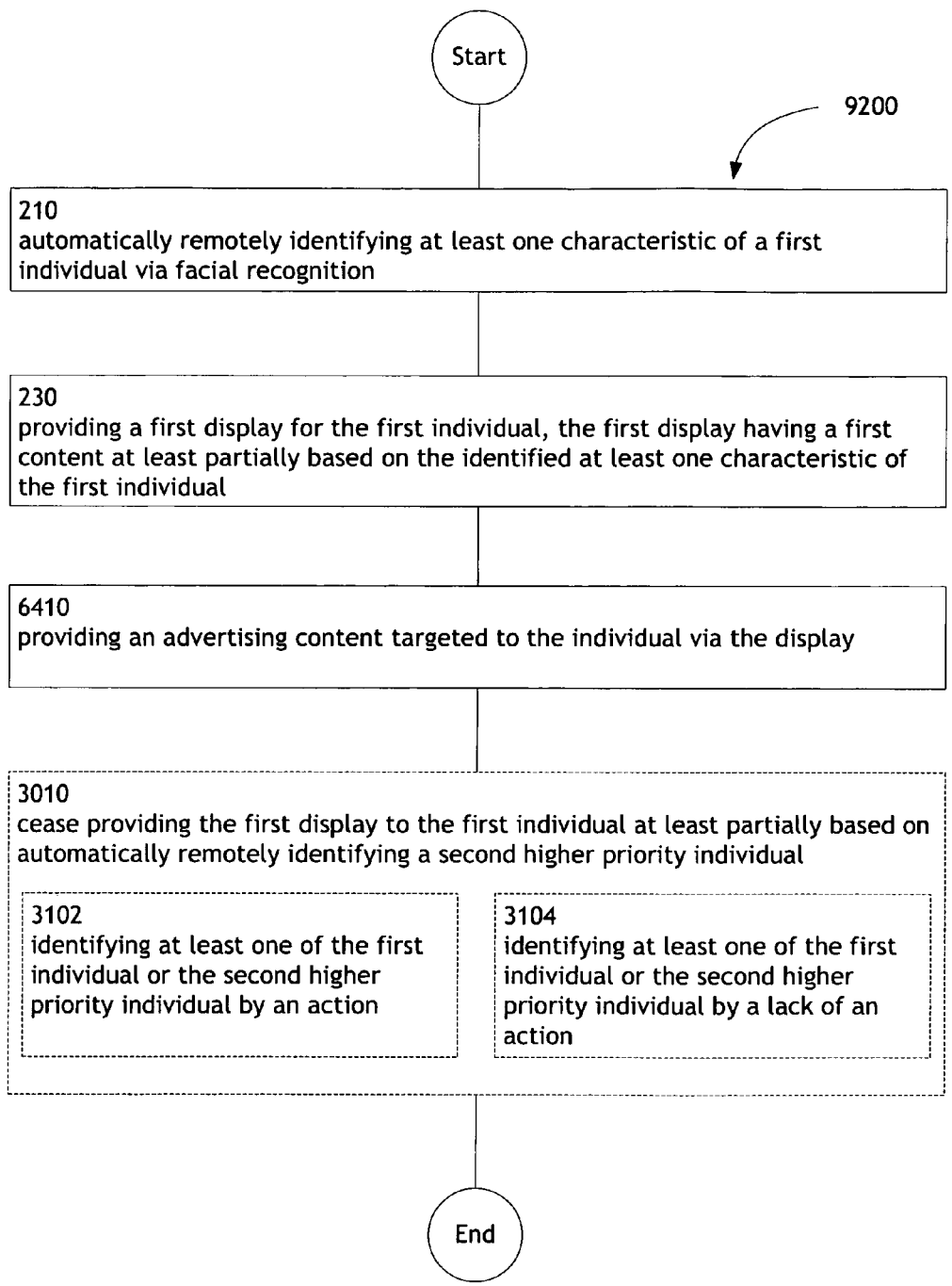
FIG. 93 illustrates an alternative embodiment of the operational flow of FIG. 92.

FIG. 93 illustrates alternative embodiments of the example operational flow 9200 of FIG. 92. FIG. 93 illustrates example embodiments where the operation 3010 may include at least one additional operation. Additional operations may include an operation 3102, and/or an operation 3104.

Figure 94:
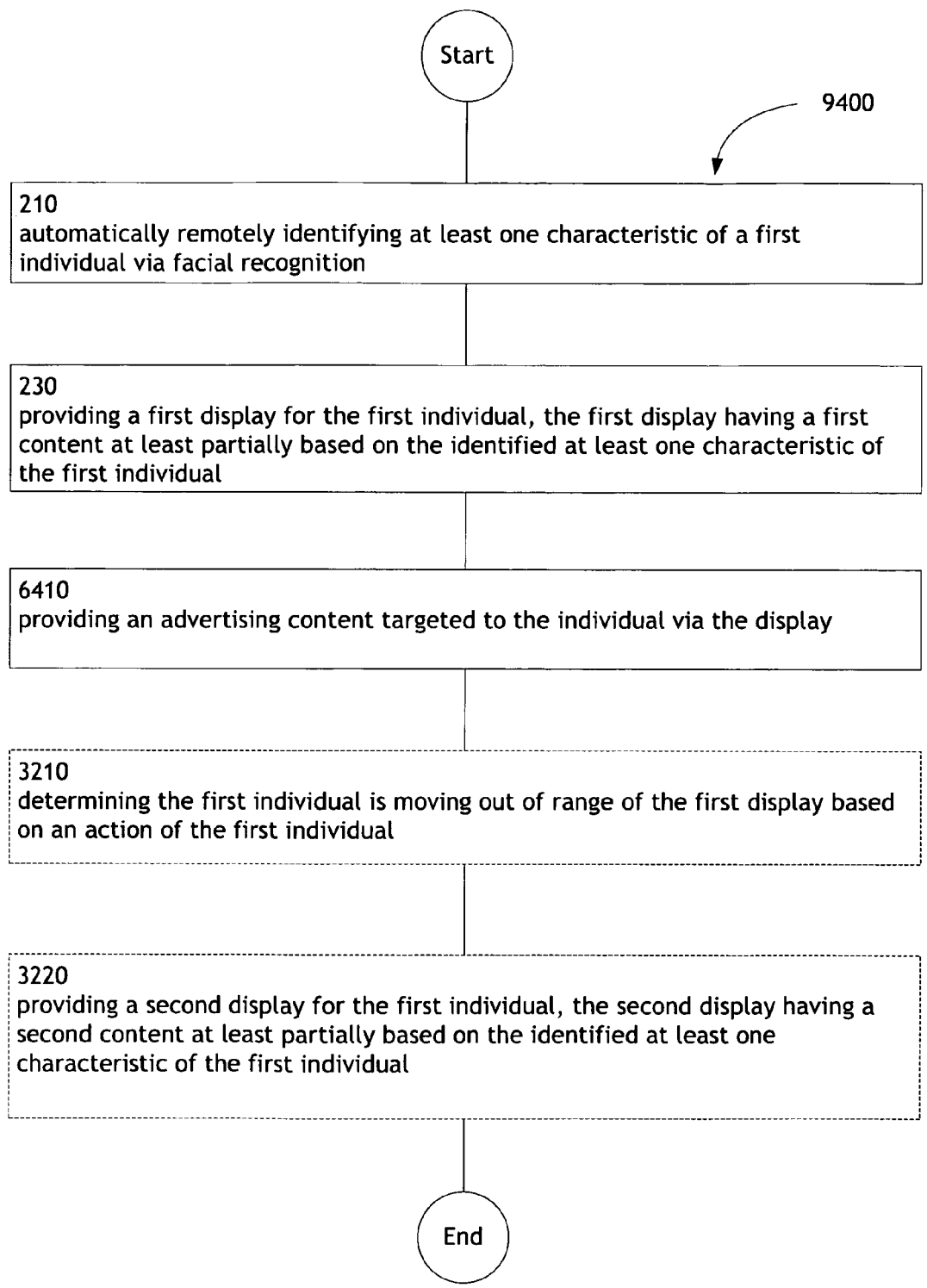
FIG. 94 illustrates an operational flow representing example operations related to automatically remotely identifying one or more characteristics of an individual utilizing facial recognition, providing a display for the individual having a content at least partially based on the one or more identified characteristics of the individual, providing an advertising content targeted to the individual via the display, determining the individual is moving out of range of the display based on an action of the individual, and providing a second display for the individual, the second display having a second content at least partially based on the identified at least one characteristic of the individual.

FIG. 94 illustrates an operational flow 9400 representing example operations related to automatically remotely identifying one or more characteristics of an individual utilizing facial recognition and providing a display for the individual having a content at least partially based on the one or more identified characteristics of the individual. FIG. 94 illustrates an example embodiment where the example operational flow 6400 of FIG. 64 may include at least one additional operation. Additional operations may include an operation 3210, and/or an operation 3220.

Figure 95:
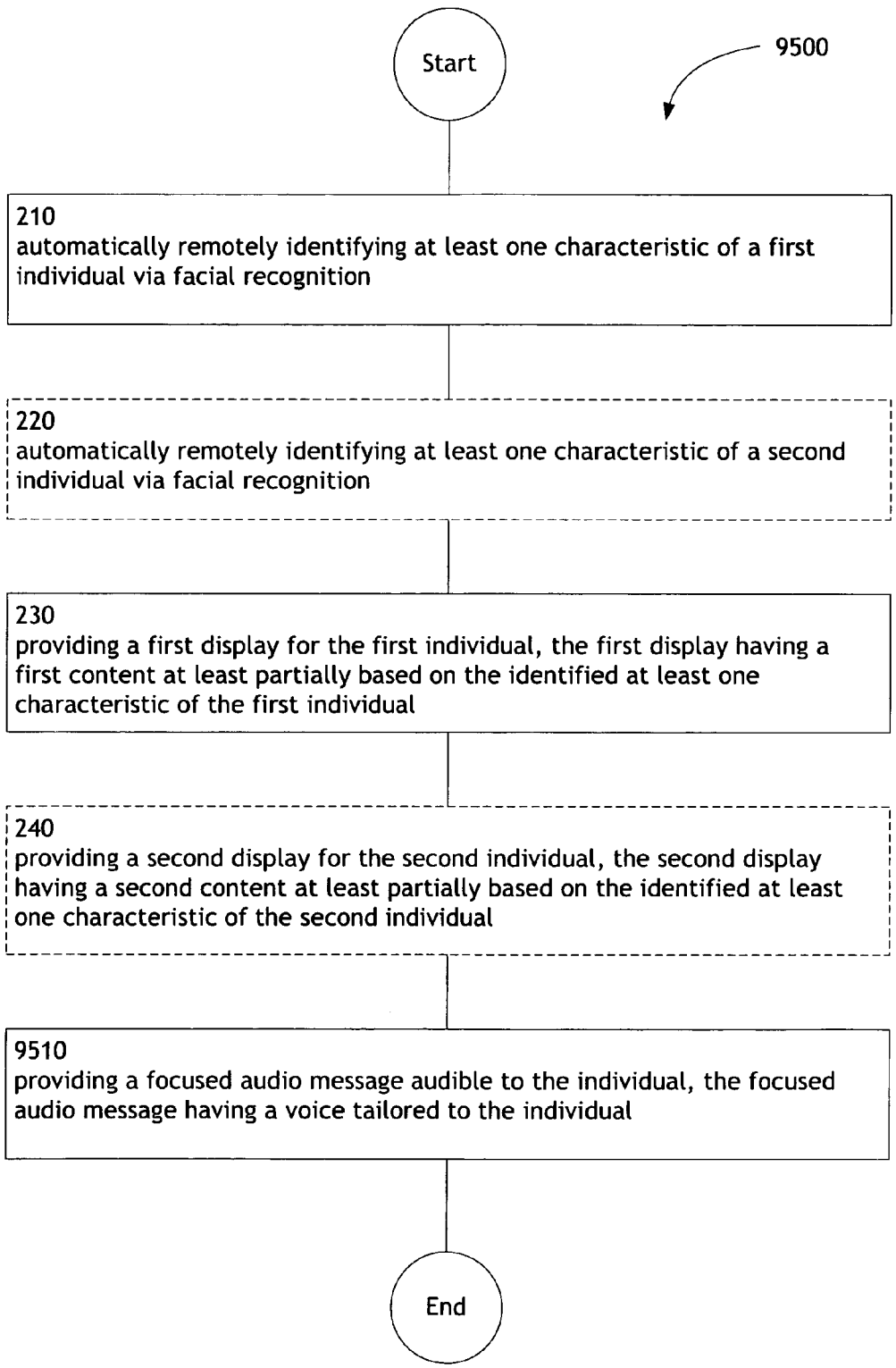
FIG. 95 illustrates an operational flow representing example operations related to automatically remotely identifying one or more characteristics of an individual utilizing facial recognition, providing a display for the individual having a content at least partially based on the one or more identified characteristics of the individual, and providing a focused audio message having voice characteristics determined to be pleasing to the individual.

FIG. 95 illustrates an operational flow 9500 representing example operations related to automatically remotely identifying one or more characteristics of an individual utilizing facial recognition and providing a display for the individual having a content at least partially based on the one or more identified characteristics of the individual. In FIG. 95 and in following figures that include various examples of operational flows, discussion and explanation may be provided with respect to the above-described examples of FIGS. 1A through 1M, and/or with respect to other examples and contexts. However, it should be understood that the operational flows may be executed in a number of other environments and contexts, and/or in modified versions of FIGS. 1A through 1M. Also, although the various operational flows are presented in the sequence(s) illustrated, it should be understood that the various operations may be performed in other orders than those which are illustrated, or may be performed concurrently.

After a start operation, an operation 210, an operation 220, an operation 230, and an operation 240, the operational flow 9500 moves to an operation 9510. Operation 9510 illustrates providing a focused audio message audible to the individual, the focused audio message having voice characteristics determined to be pleasing to the individual. For example, as shown in FIGS. 1A through 1M, the focused audio module 136, the first display module 54, or the second display module 82 may provide a focused audio message audible to at least one of the first individual 52 or the second individual 80, where the focused audio message has voice characteristics determined to be pleasing to the first individual 52 or the second individual 80.

Figure 96:
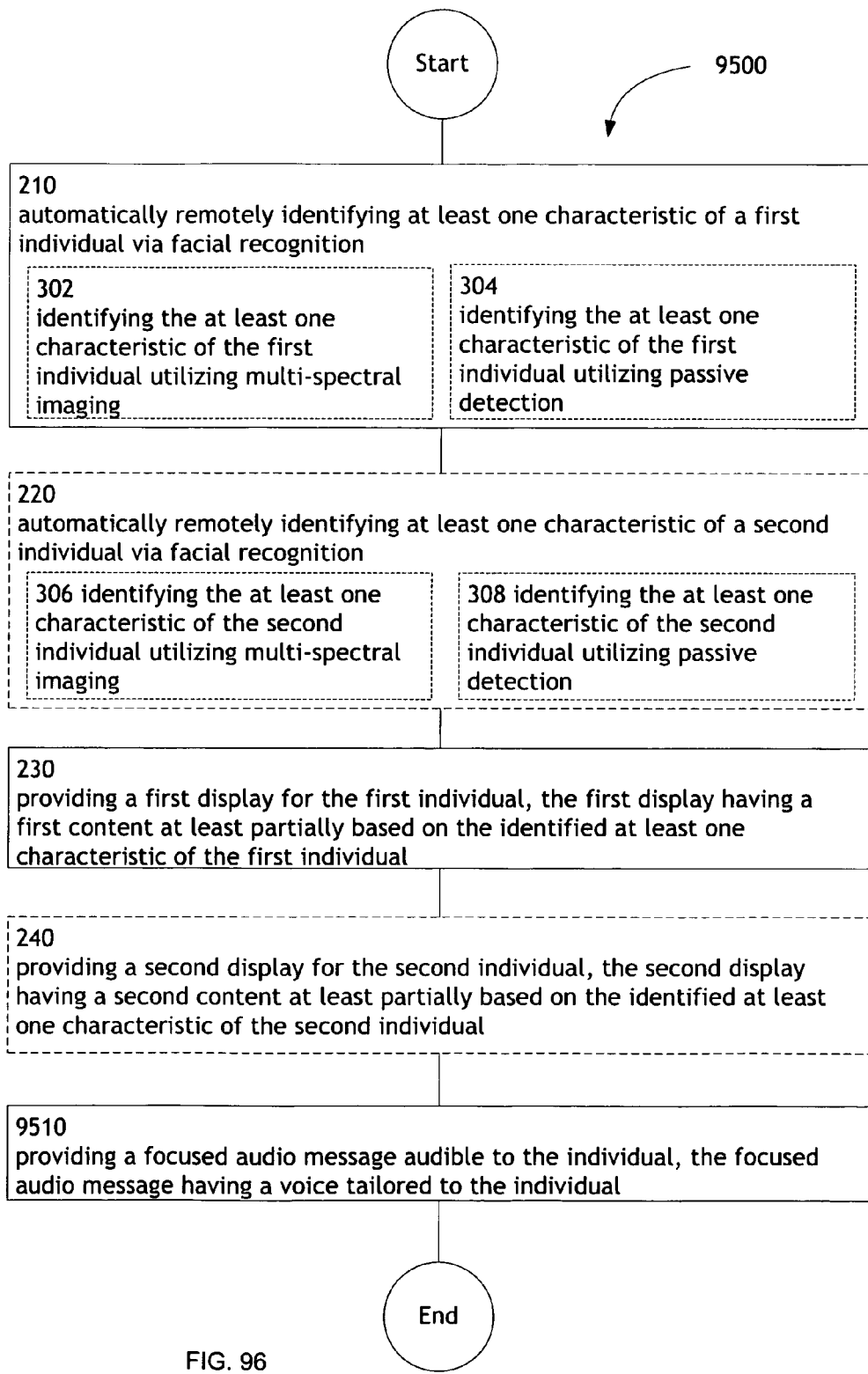
FIG. 96 illustrates an alternative embodiment of the operational flow of FIG. 95.

FIG. 96 illustrates alternative embodiments of the example operational flow 9500 of FIG. 95. FIG. 96 illustrates example embodiments where the operations 210 and 220 may include at least one additional operation. Additional operations may include an operation 302, an operation 304, an operation 306, and/or an operation 308.

Figure 97:
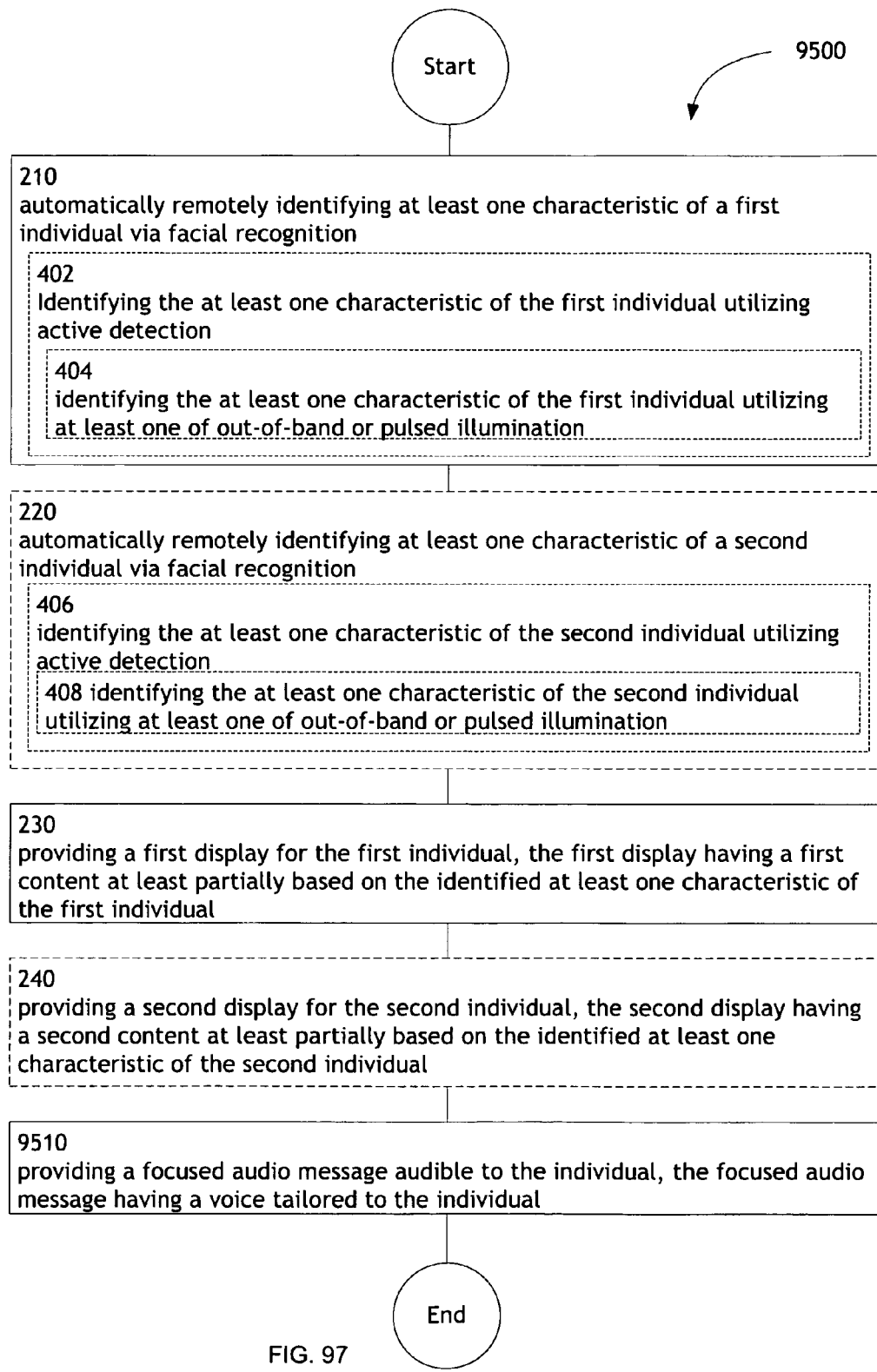
FIG. 97 illustrates an alternative embodiment of the operational flow of FIG. 95.

FIG. 97 illustrates alternative embodiments of the example operational flow 9500 of FIG. 95. FIG. 97 illustrates example embodiments where the operations 210 and 220 may include at least one additional operation. Additional operations may include an operation 402, an operation 404, an operation 406, and/or an operation 408.

Figure 98:
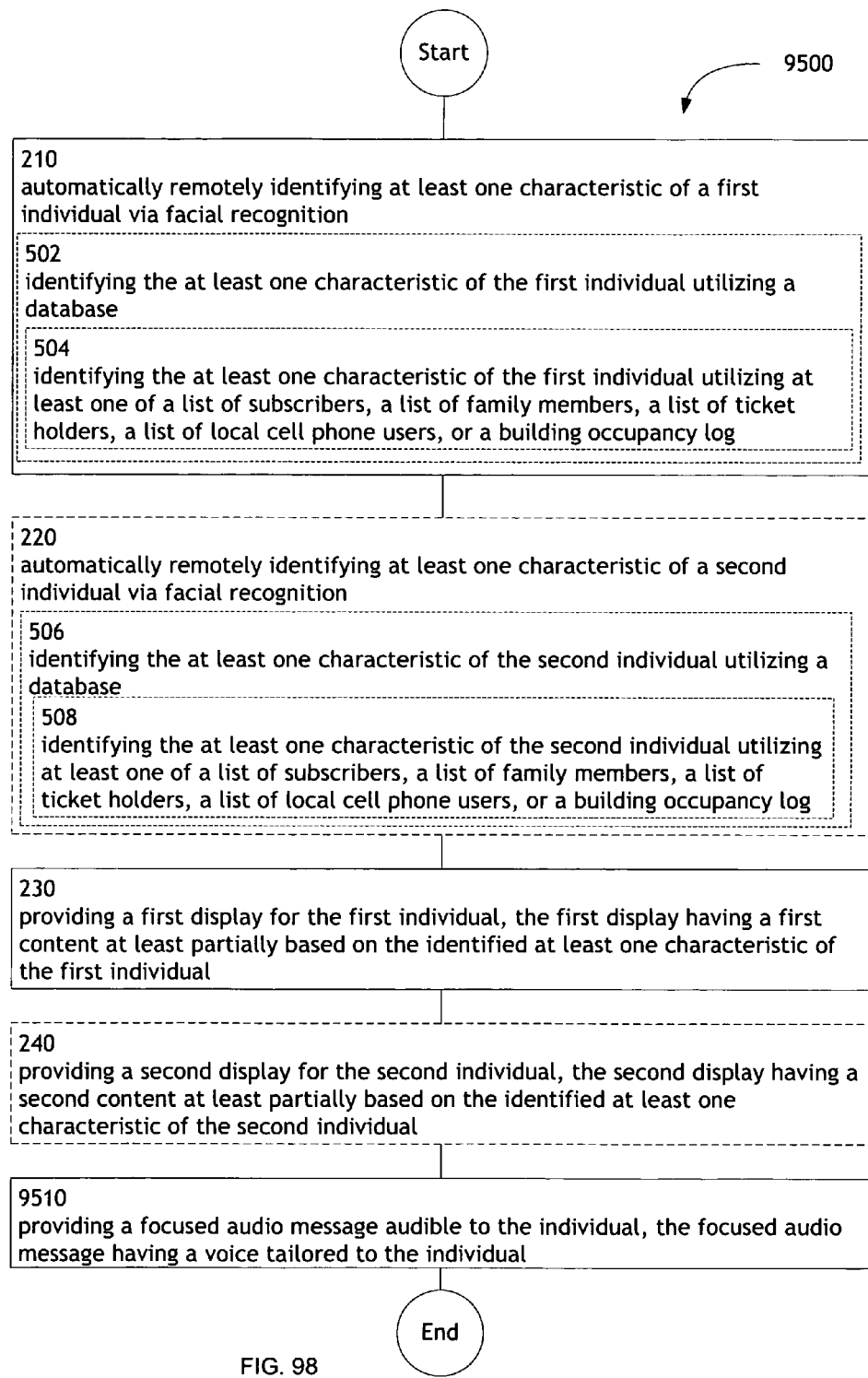
FIG. 98 illustrates an alternative embodiment of the operational flow of FIG. 95.

FIG. 98 illustrates alternative embodiments of the example operational flow 9500 of FIG. 95. FIG. 98 illustrates example embodiments where the operations 210 and 220 may include at least one additional operation. Additional operations may include an operation 502, an operation 504, an operation 506, and/or an operation 508.

Figure 99:
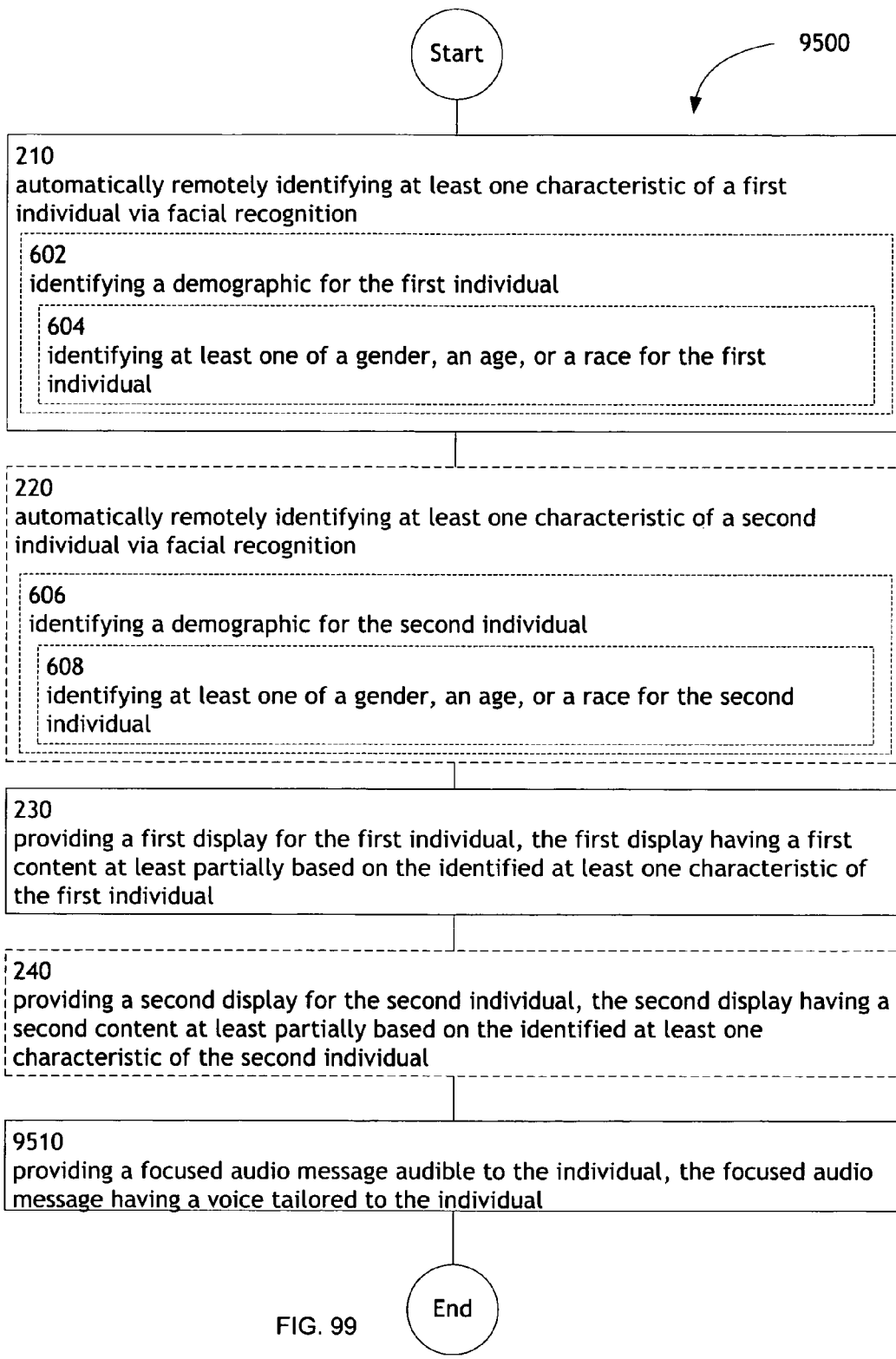
FIG. 99 illustrates an alternative embodiment of the operational flow of FIG. 95.

FIG. 99 illustrates alternative embodiments of the example operational flow 9500 of FIG. 95. FIG. 99 illustrates example embodiments where the operations 210 and 220 may include at least one additional operation. Additional operations may include an operation 602, an operation 604, an operation 606, and/or an operation 608.

Figure 100:
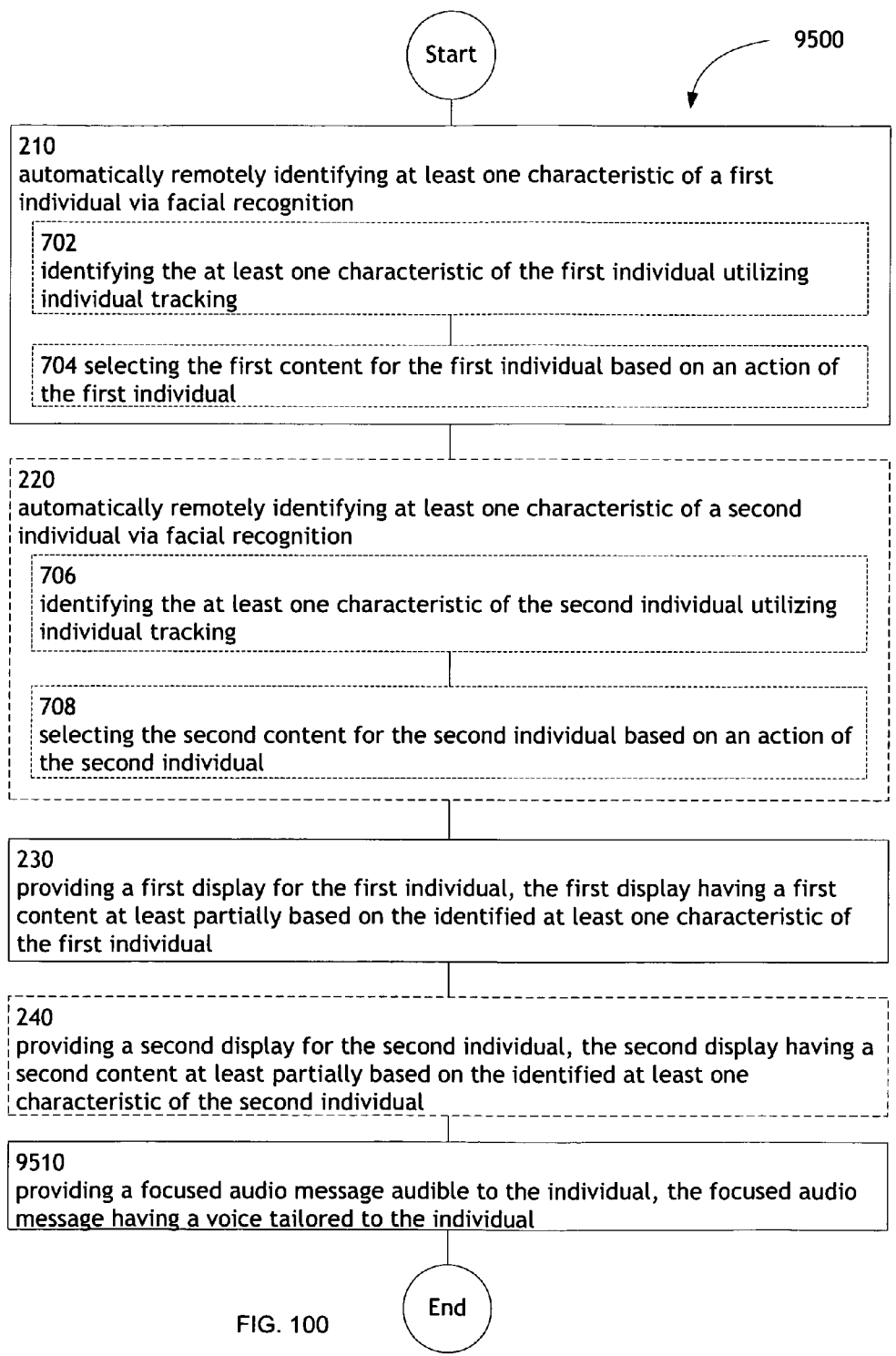
FIG. 100 illustrates an alternative embodiment of the operational flow of FIG. 95.

FIG. 100 illustrates alternative embodiments of the example operational flow 9500 of FIG. 95. FIG. 100 illustrates example embodiments where the operations 210 and 220 may include at least one additional operation. Additional operations may include an operation 702, an operation 704, an operation 706, and/or an operation 708.

Figure 101A:
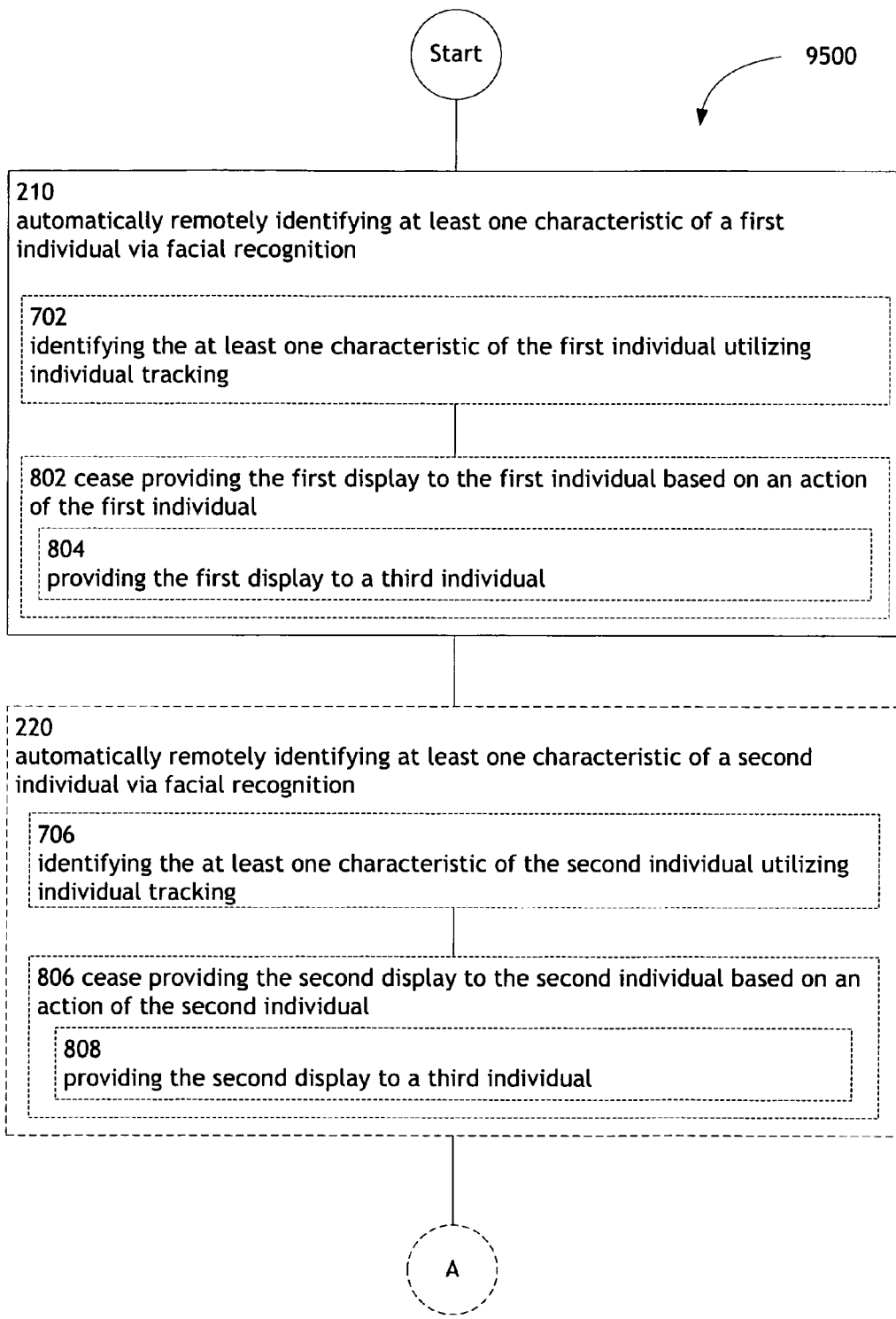
FIG. 101 illustrates an alternative embodiment of the operational flow of FIG. 95.
Figure 101B:
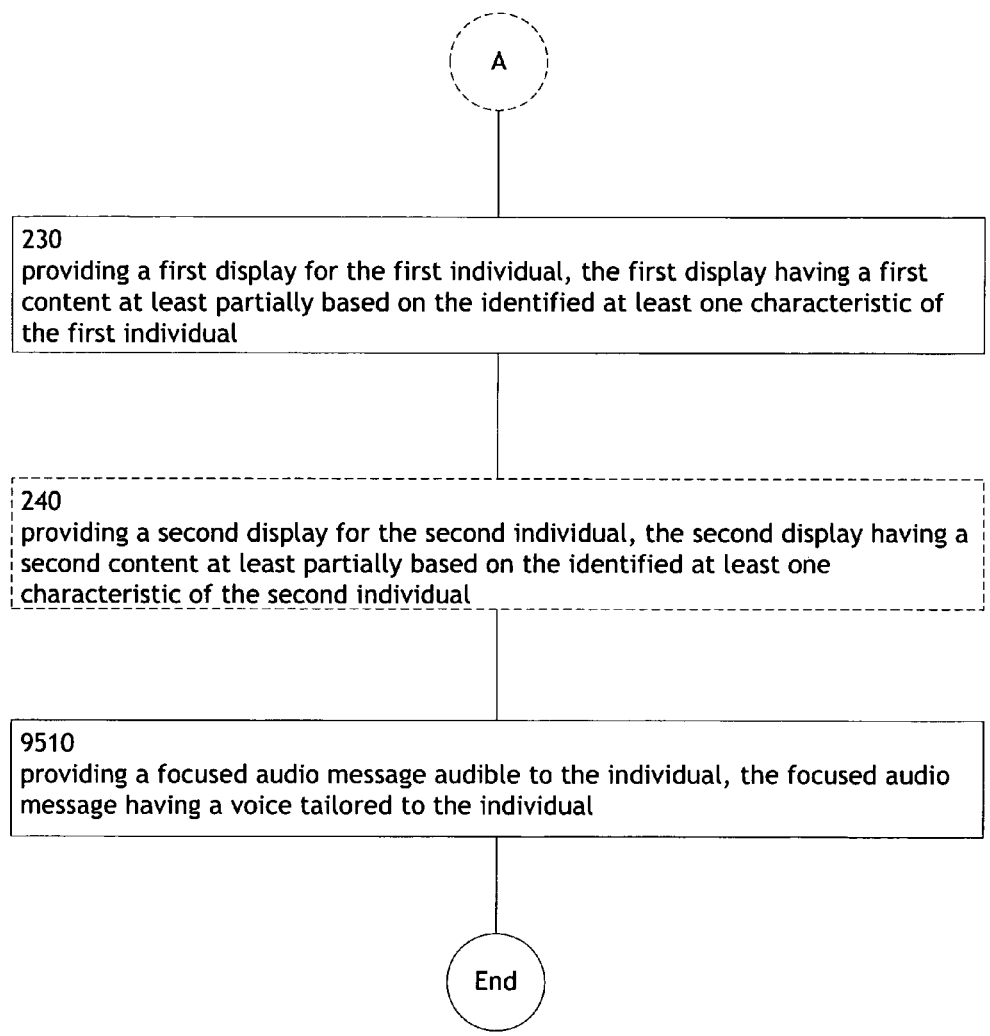

FIG. 101 illustrates alternative embodiments of the example operational flow 9500 of FIG. 95. FIG. 101 illustrates example embodiments where the operations 210 and 220 may include at least one additional operation. Additional operations may include an operation 802, an operation 804, an operation 806, and/or an operation 808.

Figure 102:
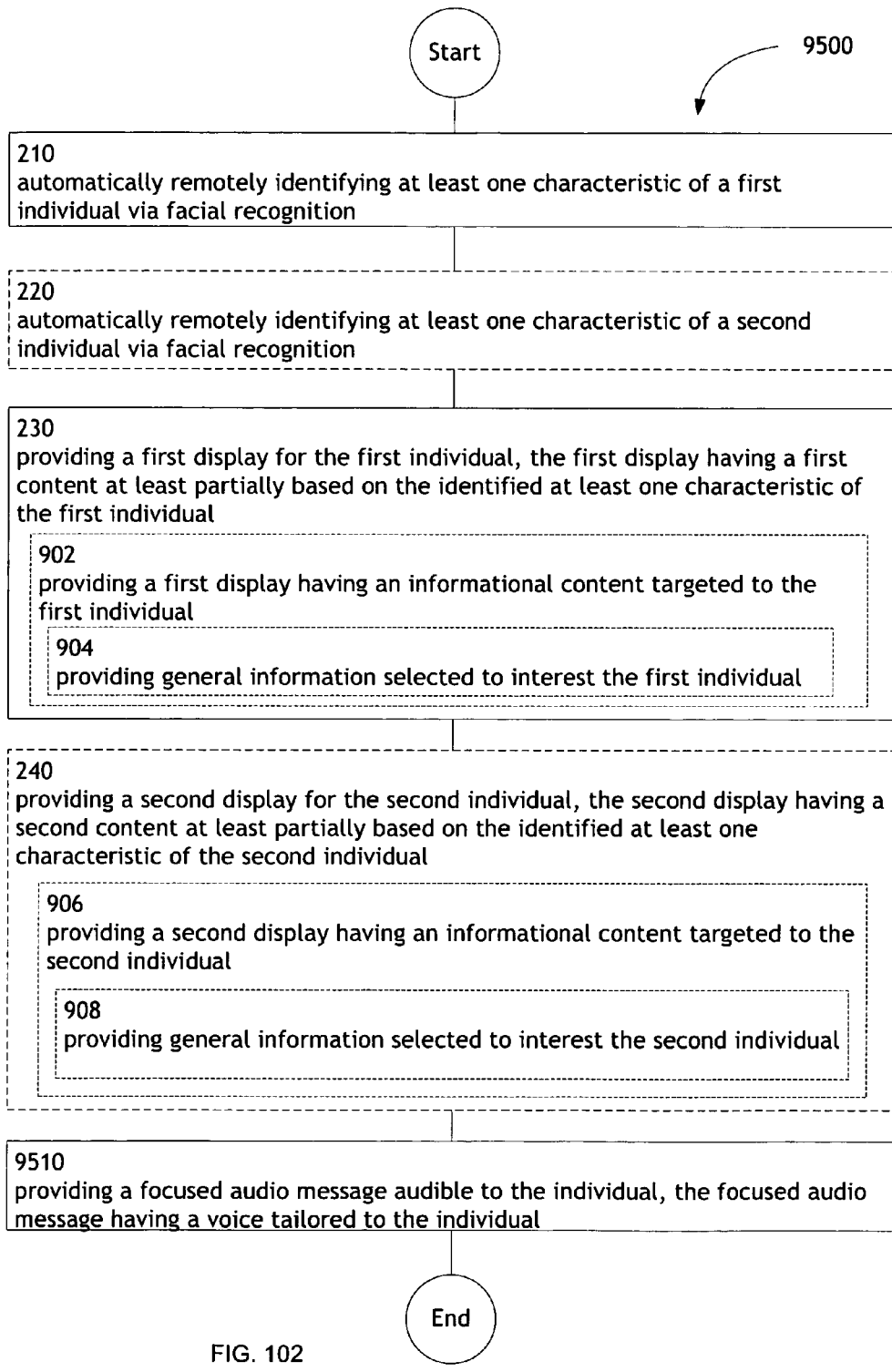
FIG. 102 illustrates an alternative embodiment of the operational flow of FIG. 95.

FIG. 102 illustrates alternative embodiments of the example operational flow 9500 of FIG. 95. FIG. 102 illustrates example embodiments where the operations 230 and 240 may include at least one additional operation. Additional operations may include an operation 902, an operation 904, an operation 906, and/or an operation 908.

Figure 103A:
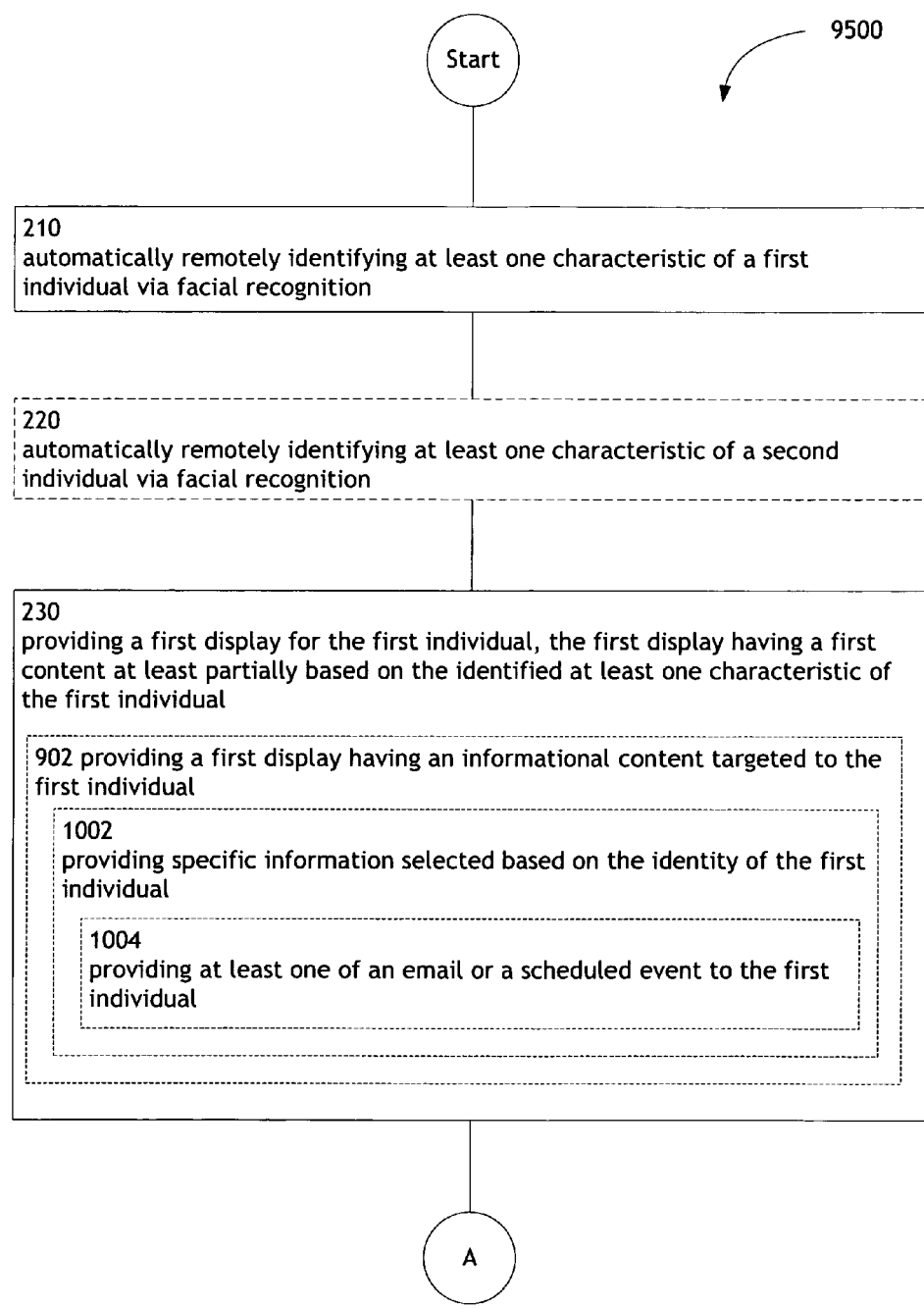
FIG. 103 illustrates an alternative embodiment of the operational flow of FIG. 95.

FIG. 103 illustrates alternative embodiments of the example operational flow 9500 of FIG. 95. FIG. 103 illustrates example embodiments where the operations 230 and 240 may include at least one additional operation. Additional operations may include an operation 1002, an operation 1004, an operation 1006, and/or an operation 1008.

Figure 104:
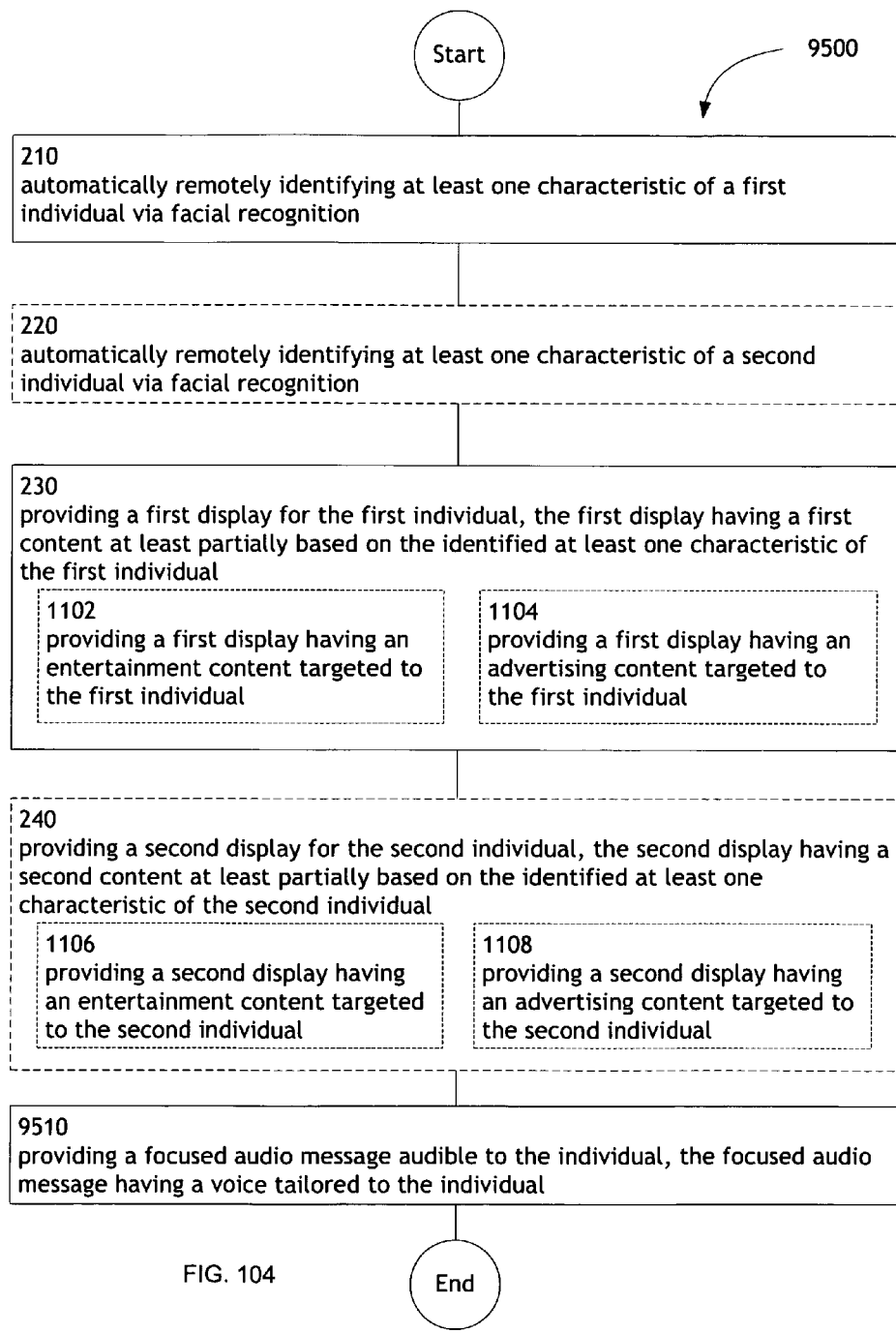
FIG. 104 illustrates an alternative embodiment of the operational flow of FIG. 95.

FIG. 104 illustrates alternative embodiments of the example operational flow 9500 of FIG. 95. FIG. 104 illustrates example embodiments where the operations 230 and 240 may include at least one additional operation. Additional operations may include an operation 1102, an operation 1104, an operation 1106, and/or an operation 1108.

Figure 105:
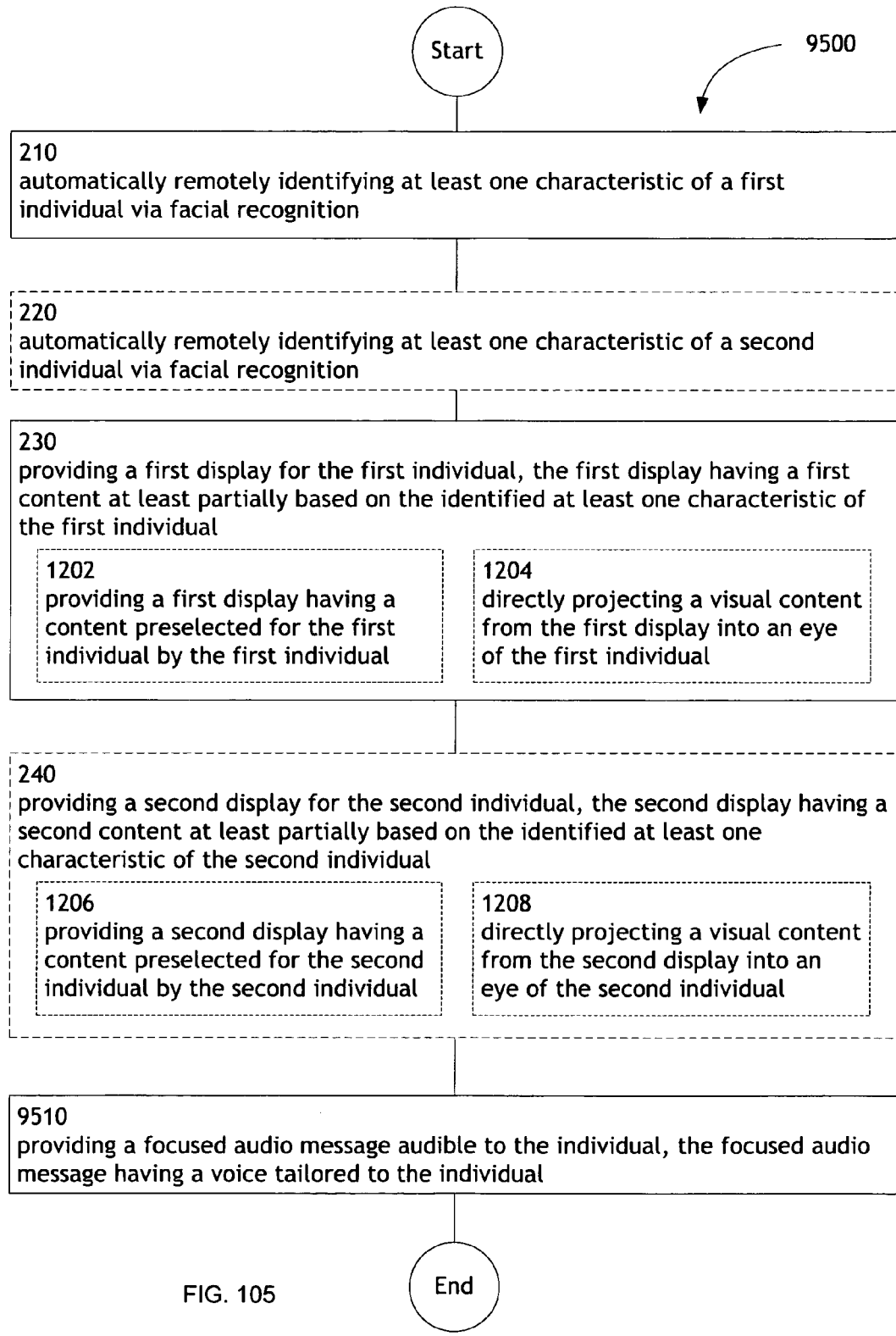
FIG. 105 illustrates an alternative embodiment of the operational flow of FIG. 95.

FIG. 105 illustrates alternative embodiments of the example operational flow 9500 of FIG. 95. FIG. 105 illustrates example embodiments where the operations 230 and 240 may include at least one additional operation. Additional operations may include an operation 1202, an operation 1204, an operation 1206, and/or an operation 1208.

Figure 106:
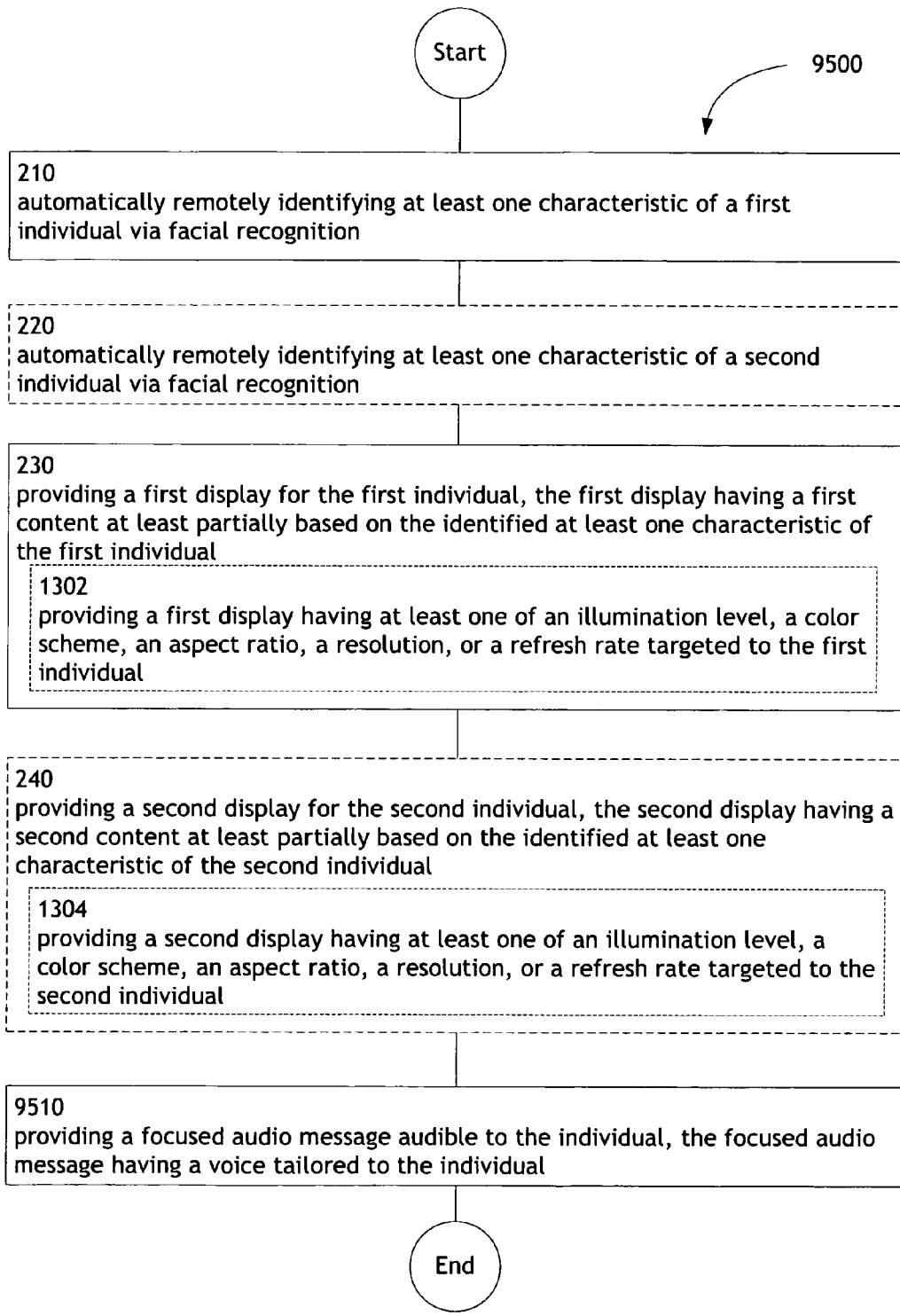
FIG. 106 illustrates an alternative embodiment of the operational flow of FIG. 95.

FIG. 106 illustrates alternative embodiments of the example operational flow 9500 of FIG. 95. FIG. 106 illustrates example embodiments where the operations 230 and 240 may include at least one additional operation. Additional operations may include an operation 1302 and/or an operation 1304.

Figure 107:
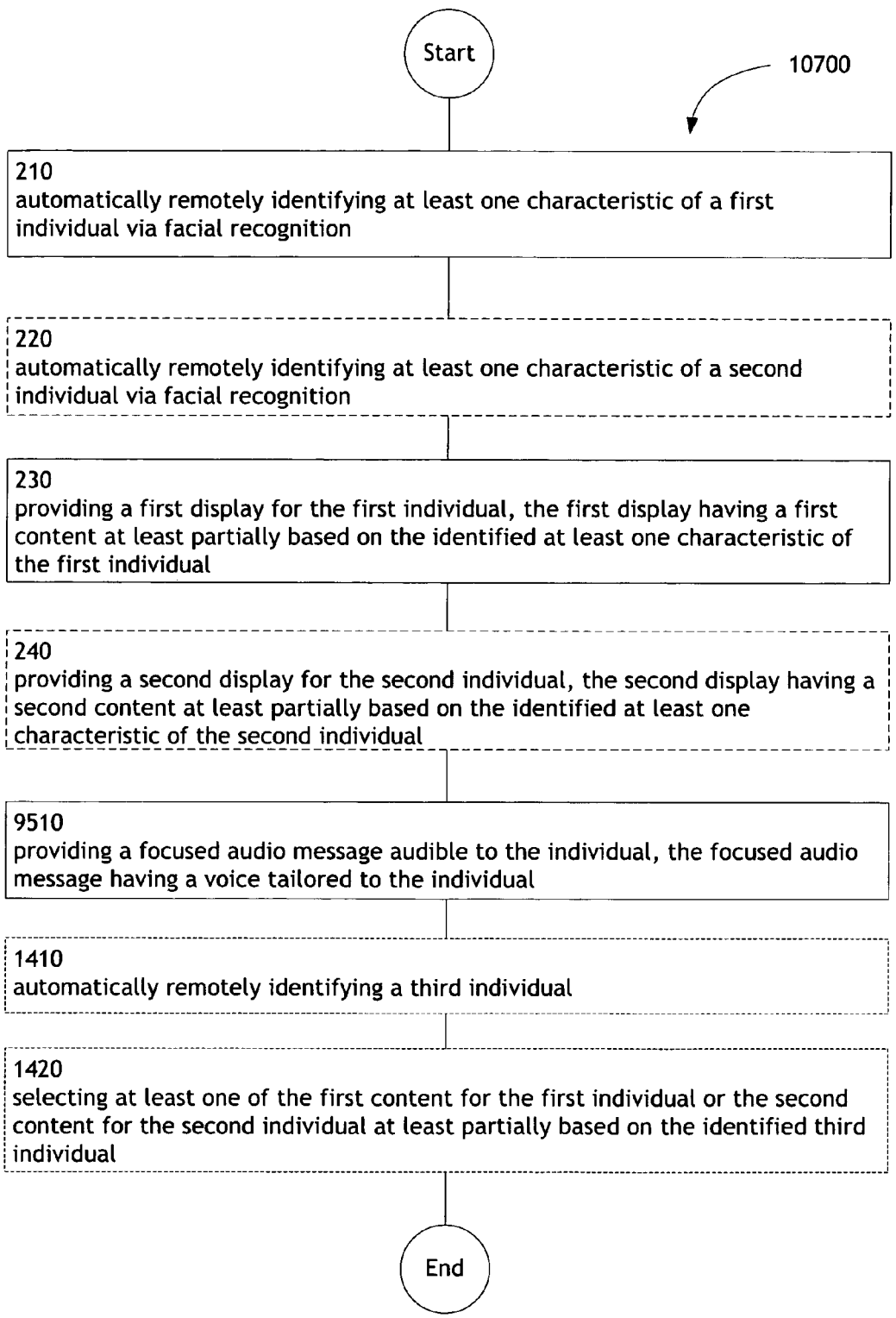
FIG. 107 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, automatically remotely identifying a third individual, and selecting the content for the first individual at least partially based on the identified third individual.

FIG. 107 illustrates an operational flow 10700 representing example operations related to automatically remotely identifying one or more characteristics of an individual utilizing facial recognition and providing a display for the individual having a content at least partially based on the one or more identified characteristics of the individual. FIG. 107 illustrates an example embodiment where the example operational flow 9500 of FIG. 95 may include at least one additional operation. Additional operations may include an operation 1410, and/or an operation 1420.

Figure 108A:
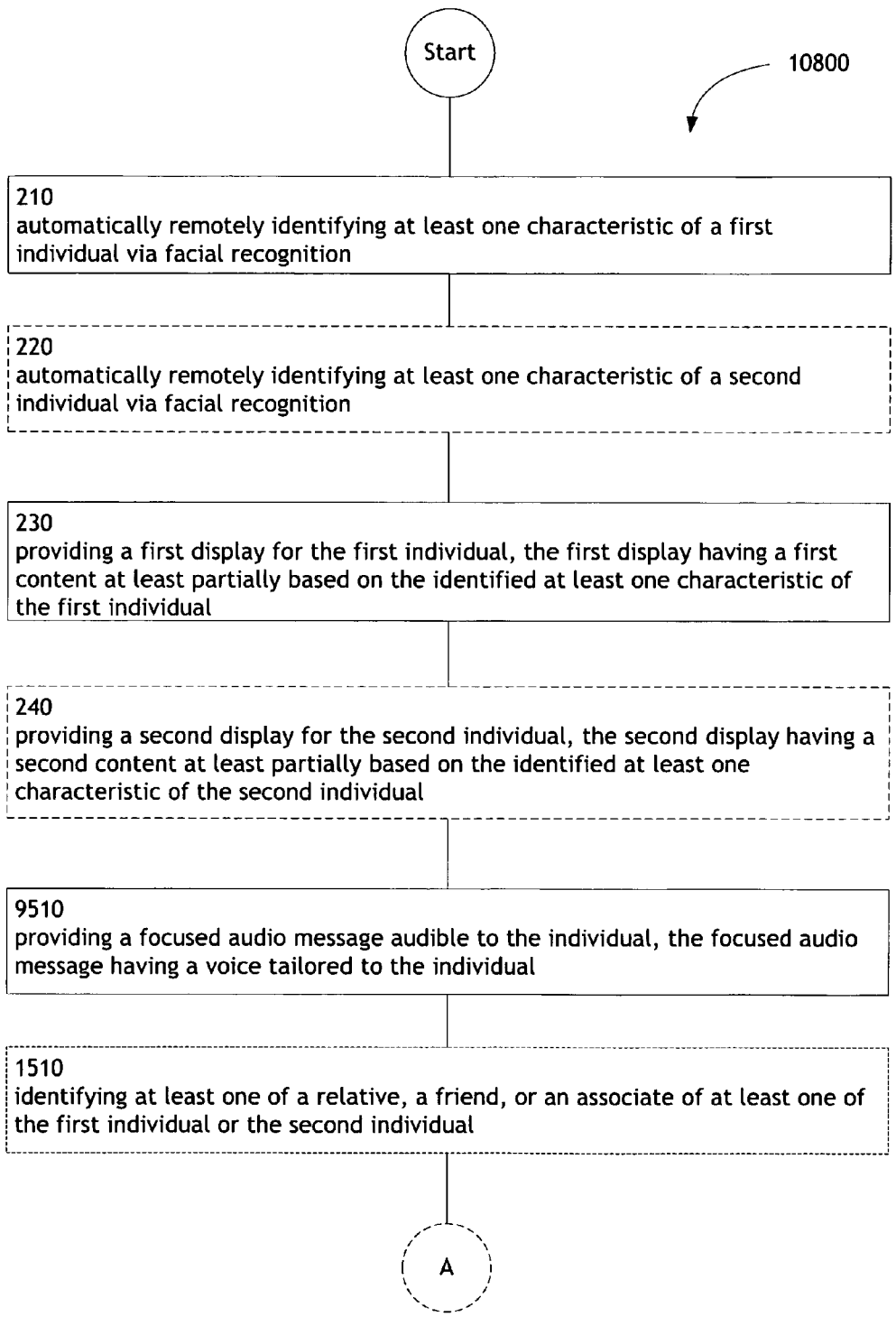
FIG. 108 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, identifying at least one of a relative, a friend, or an associate of the individual, and selecting the content for the individual at least partially based on the identity of the at least one of the relative, the friend, or the associate of the individual.

FIG. 108 illustrates an operational flow 10800 representing example operations related to automatically remotely identifying one or more characteristics of an individual utilizing facial recognition and providing a display for the individual having a content at least partially based on the one or more identified characteristics of the individual. FIG. 108 illustrates an example embodiment where the example operational flow 9500 of FIG. 95 may include at least one additional operation. Additional operations may include an operation 1510, an operation 1520, an operation 1522, and/or an operation 1524.

Figure 109:
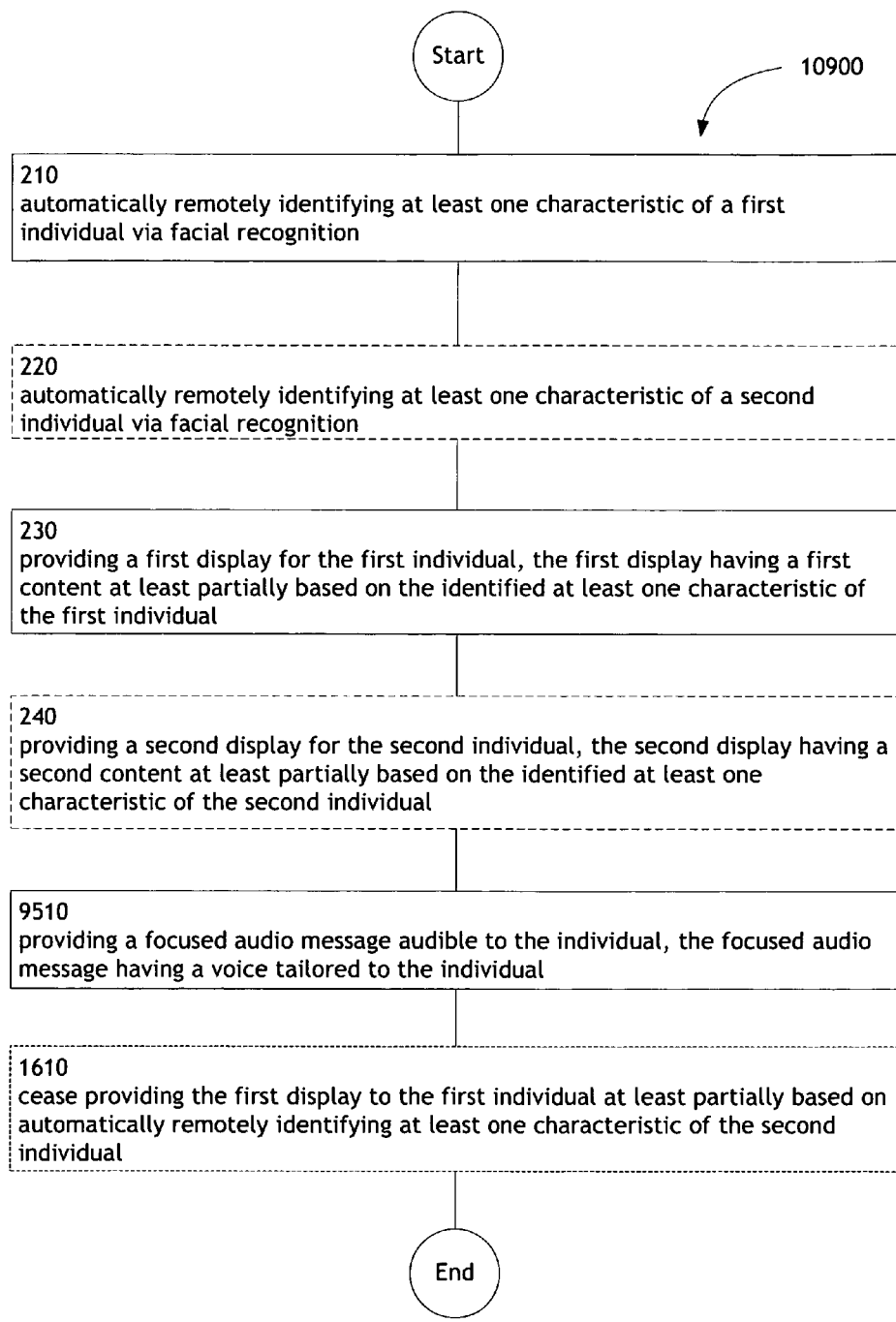
FIG. 109 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, and cease providing the display to the first individual at least partially based on automatically remotely identifying at least one characteristic of a second individual.

FIG. 109 illustrates an operational flow 10900 representing example operations related to automatically remotely identifying one or more characteristics of an individual utilizing facial recognition and providing a display for the individual having a content at least partially based on the one or more identified characteristics of the individual. FIG. 109 illustrates an example embodiment where the example operational flow 9500 of FIG. 95 may include at least one additional operation. Additional operations may include an operation 1610.

Figure 110A:
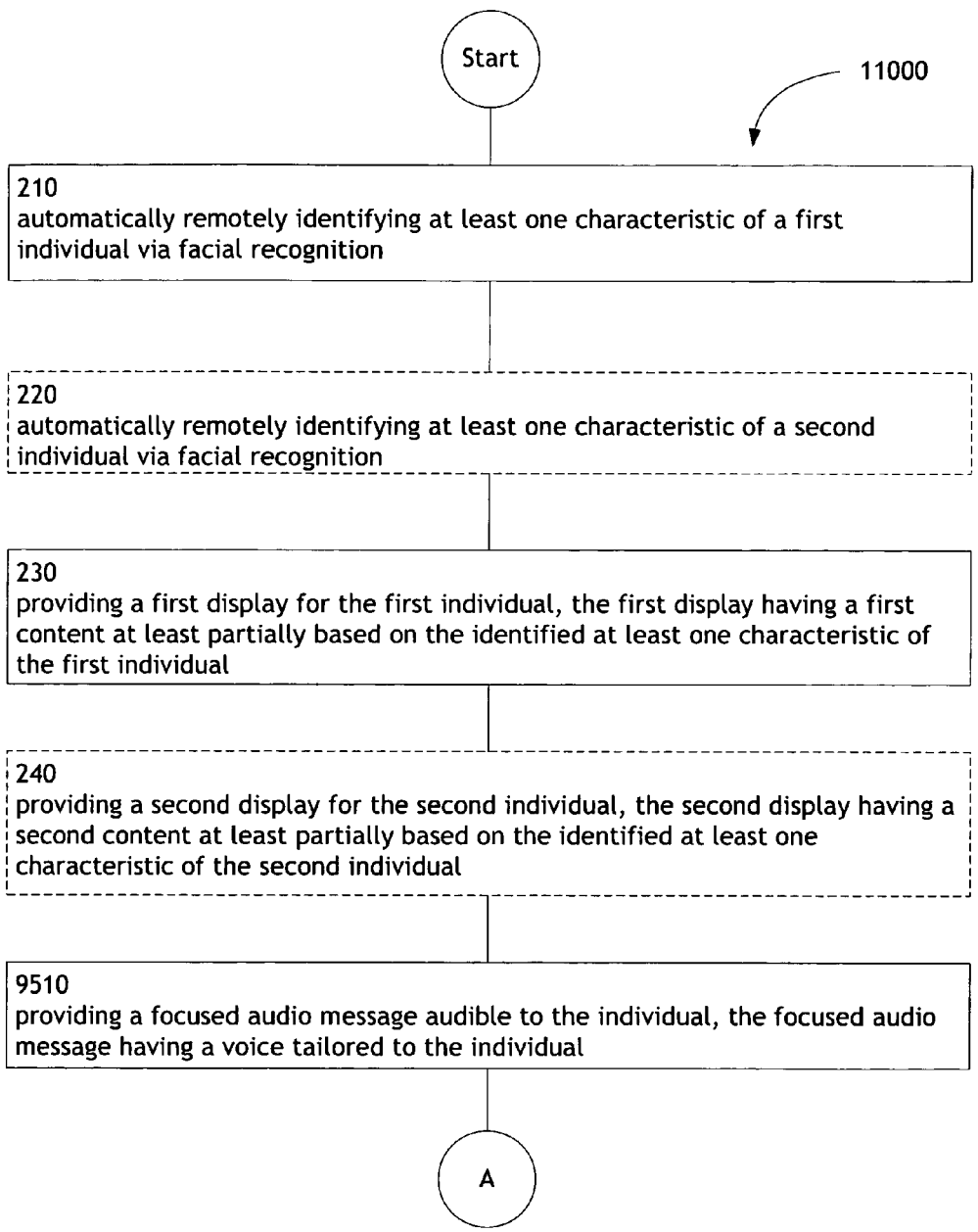
FIG. 110 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, automatically remotely identifying a third higher priority individual, and cease providing the display to the first individual at least partially based on the identified third higher priority individual.
Figure 110B:
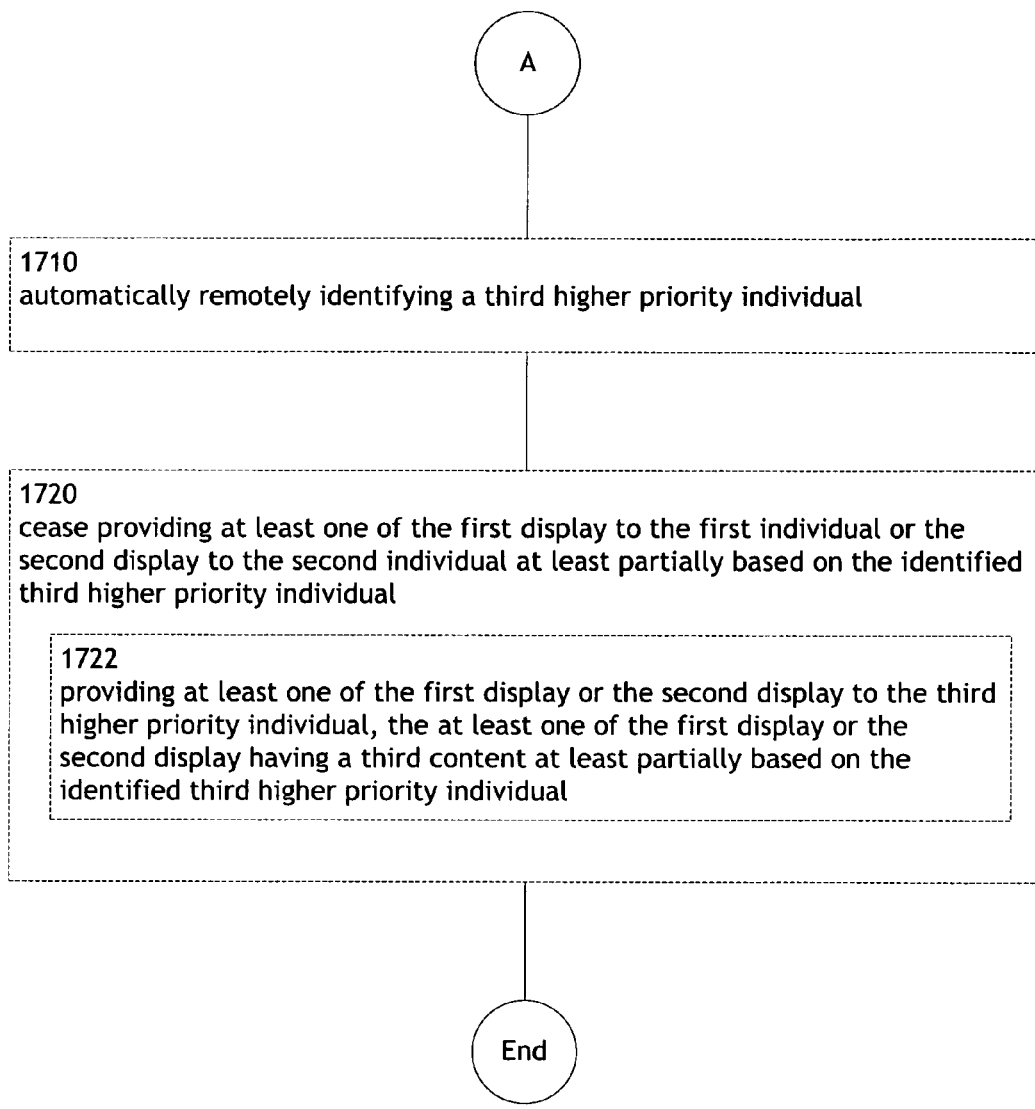

FIG. 110 illustrates an operational flow 11000 representing example operations related to automatically remotely identifying one or more characteristics of an individual utilizing facial recognition and providing a display for the individual having a content at least partially based on the one or more identified characteristics of the individual. FIG. 110 illustrates an example embodiment where the example operational flow 9500 of FIG. 95 may include at least one additional operation. Additional operations may include an operation 1710, an operation 1720, and/or an operation 1722.

Figure 111:
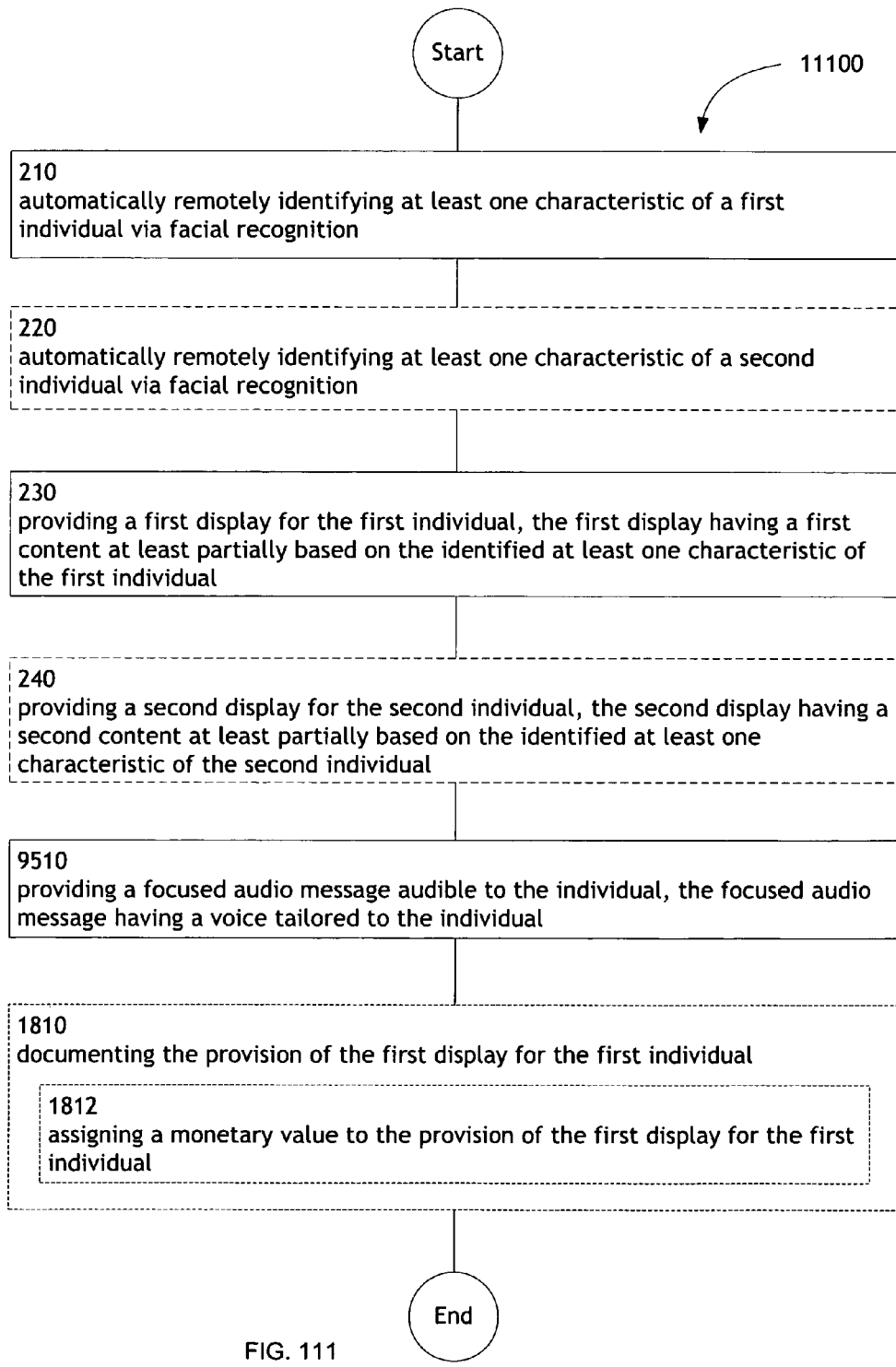
FIG. 111 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, and documenting the provision of the display for the individual.

FIG. 111 illustrates an operational flow 11100 representing example operations related to automatically remotely identifying one or more characteristics of an individual utilizing facial recognition and providing a display for the individual having a content at least partially based on the one or more identified characteristics of the individual. FIG. 111 illustrates an example embodiment where the example operational flow 9500 of FIG. 95 may include at least one additional operation. Additional operations may include an operation 1810, and/or an operation 1812.

Figure 112:
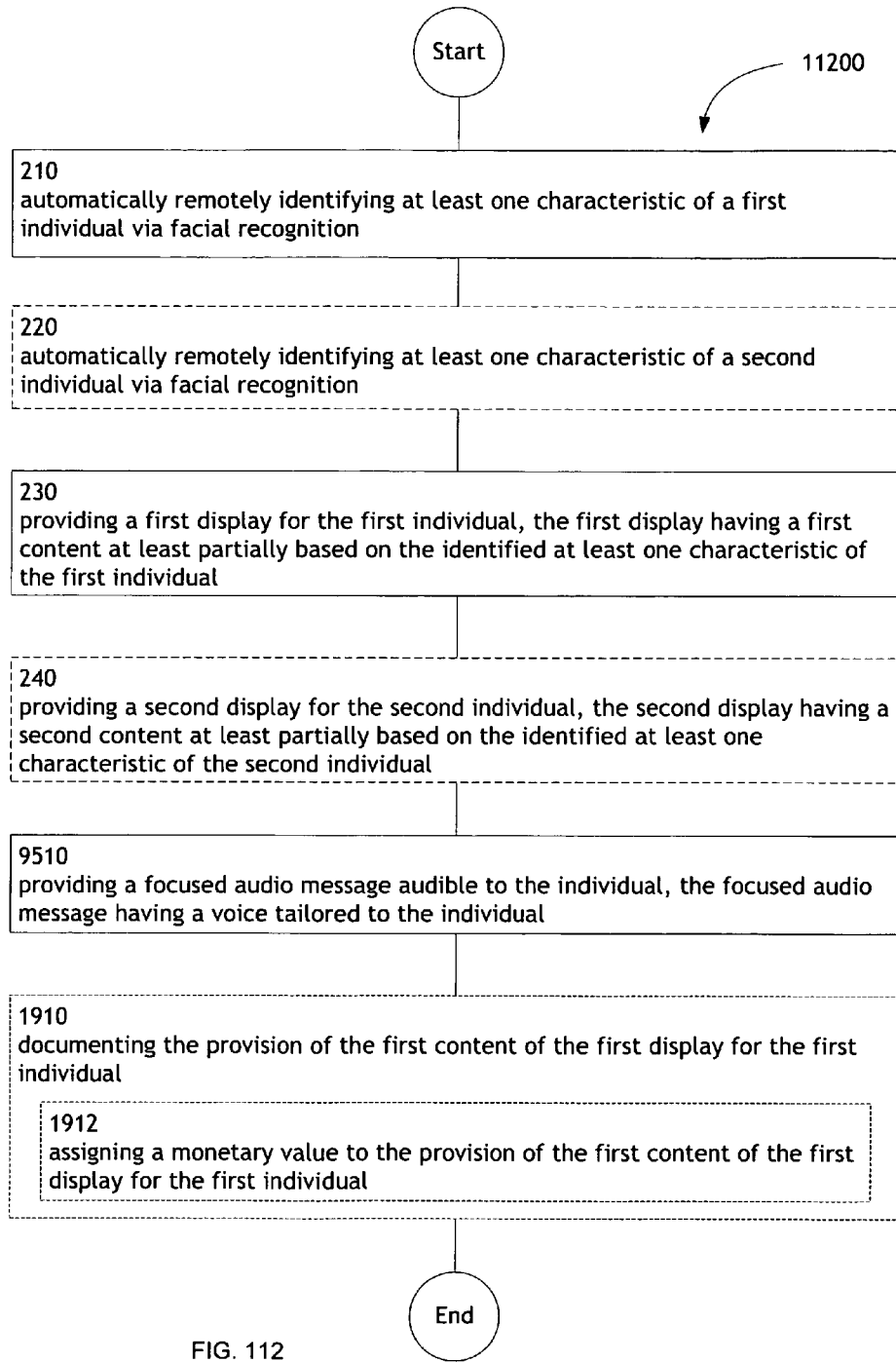
FIG. 112 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, and documenting the provision of the content of the display for the individual.

FIG. 112 illustrates an operational flow 11200 representing example operations related to automatically remotely identifying one or more characteristics of an individual utilizing facial recognition and providing a display for the individual having a content at least partially based on the one or more identified characteristics of the individual. FIG. 112 illustrates an example embodiment where the example operational flow 9500 of FIG. 95 may include at least one additional operation. Additional operations may include an operation 1910, and/or an operation 1912.

Figure 113:
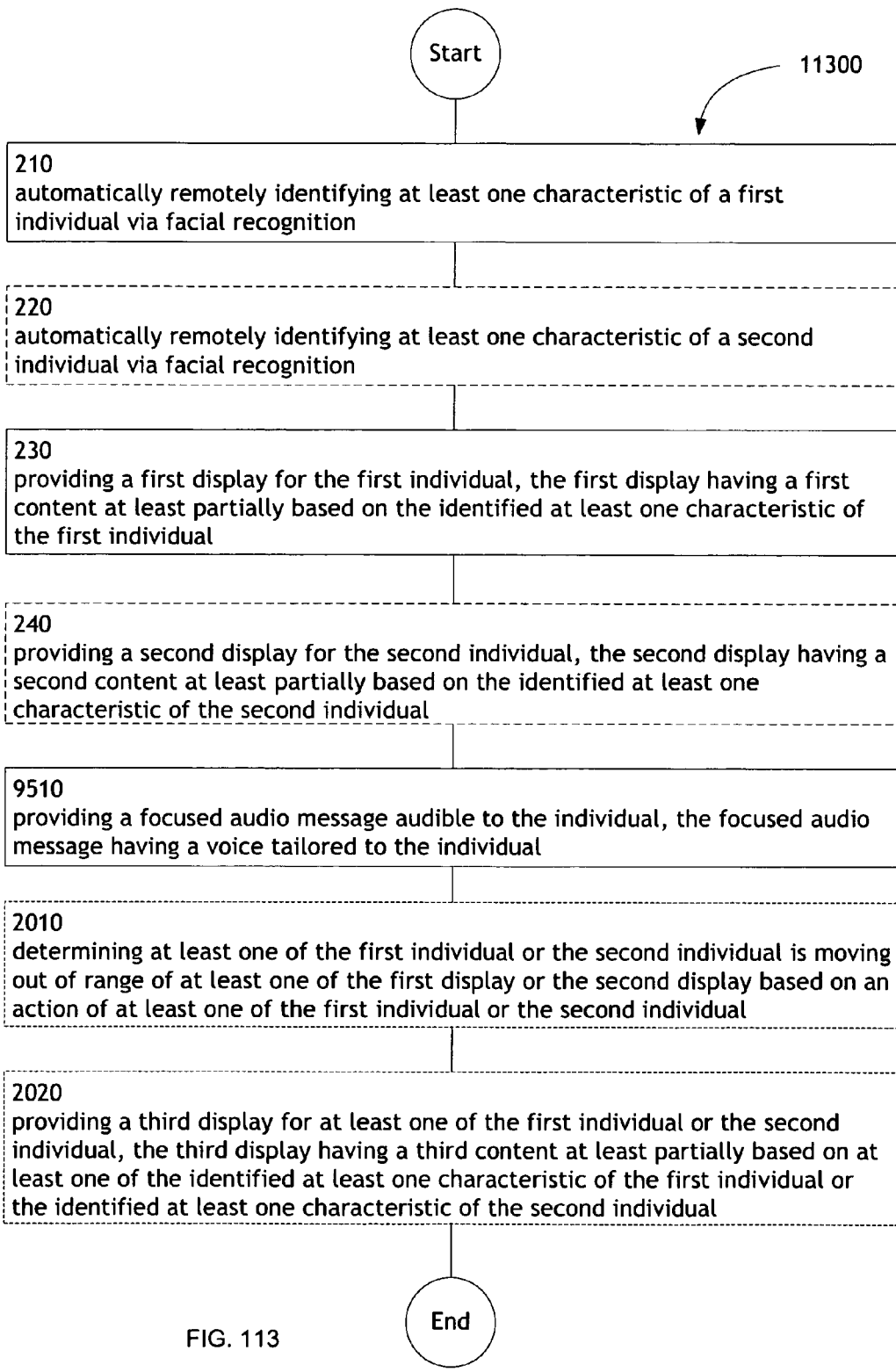
FIG. 113 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, determining the individual is moving out of range of the display based on an action of the individual, and providing a third display for the individual, the third display having a third content at least partially based on the identified at least one characteristic of the individual.

FIG. 113 illustrates an operational flow 11300 representing example operations related to automatically remotely identifying one or more characteristics of an individual utilizing facial recognition and providing a display for the individual having a content at least partially based on the one or more identified characteristics of the individual. FIG. 113 illustrates an example embodiment where the example operational flow 9500 of FIG. 95 may include at least one additional operation. Additional operations may include an operation 2010, and/or an operation 2020.

Figure 114:
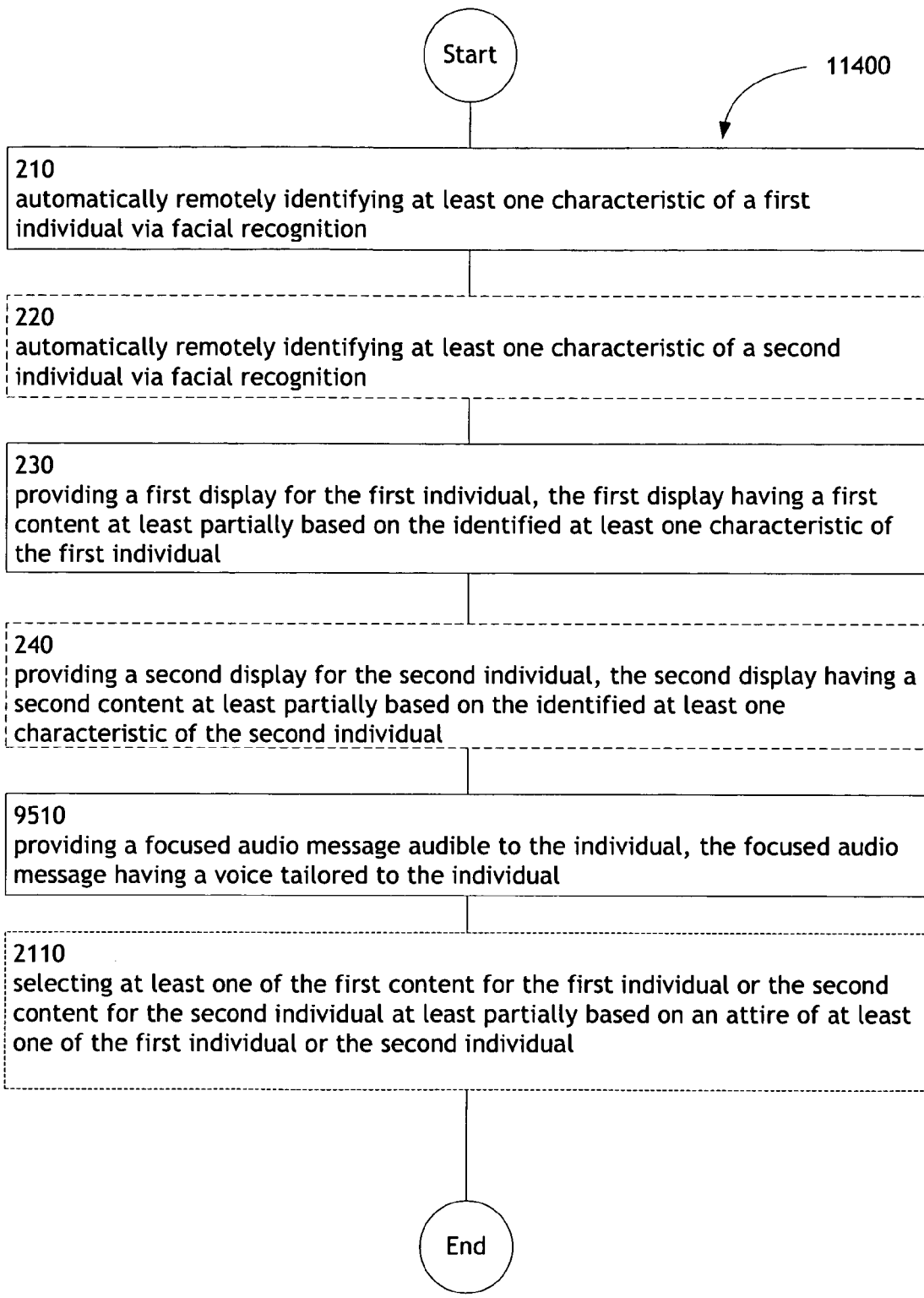
FIG. 114 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, selecting the content for the individual at least partially based on an attire of the individual.

FIG. 114 illustrates an operational flow 11400 representing example operations related to automatically remotely identifying one or more characteristics of an individual utilizing facial recognition and providing a display for the individual having a content at least partially based on the one or more identified characteristics of the individual. FIG. 114 illustrates an example embodiment where the example operational flow 9500 of FIG. 95 may include at least one additional operation. Additional operations may include an operation 2110.

Figure 115:
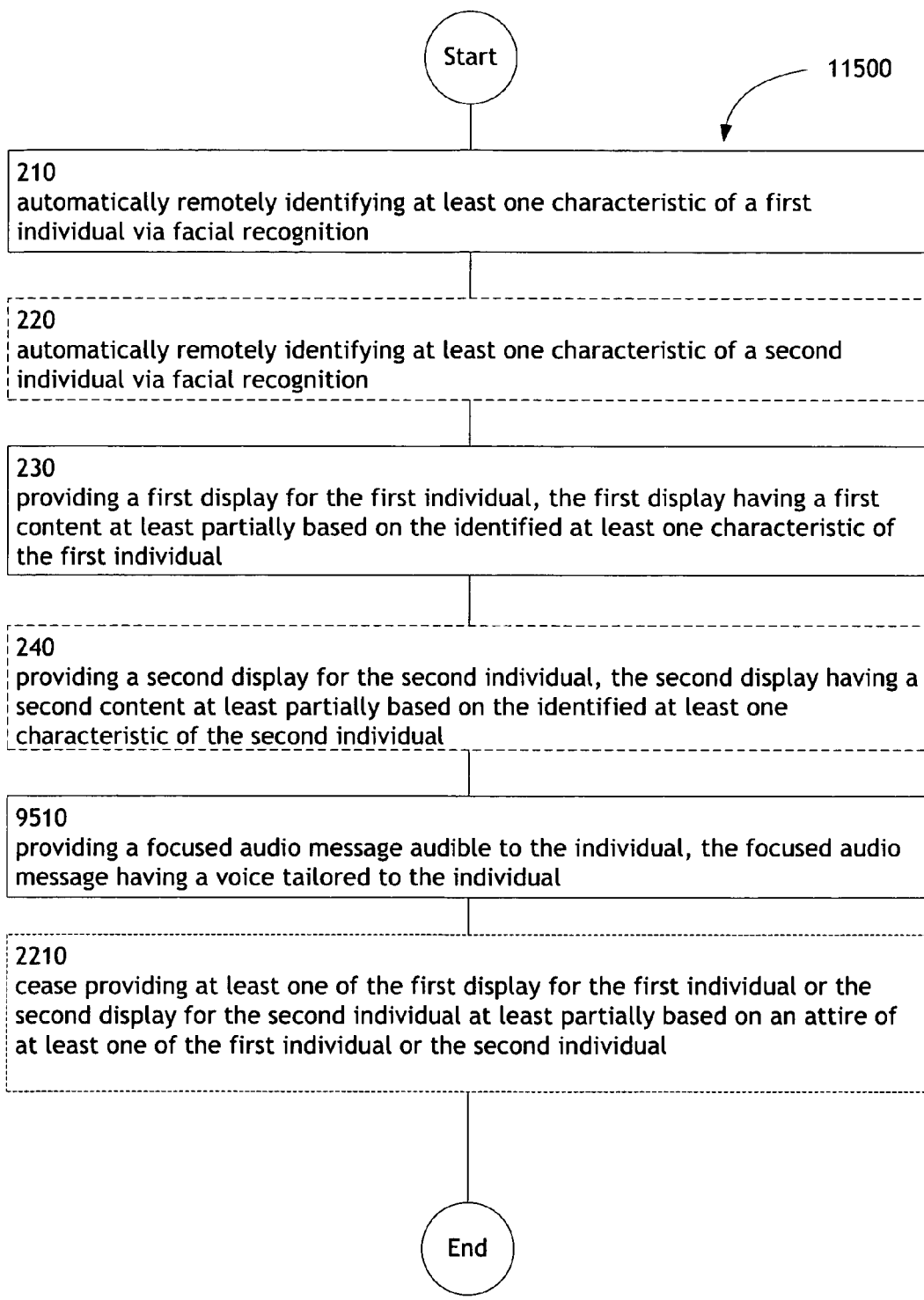
FIG. 115 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, and cease providing the display for the individual at least partially based on an attire of the individual.

FIG. 115 illustrates an operational flow 11500 representing example operations related to automatically remotely identifying one or more characteristics of an individual utilizing facial recognition and providing a display for the individual having a content at least partially based on the one or more identified characteristics of the individual. FIG. 115 illustrates an example embodiment where the example operational flow 9500 of FIG. 95 may include at least one additional operation. Additional operations may include an operation 2210.

Figure 116:
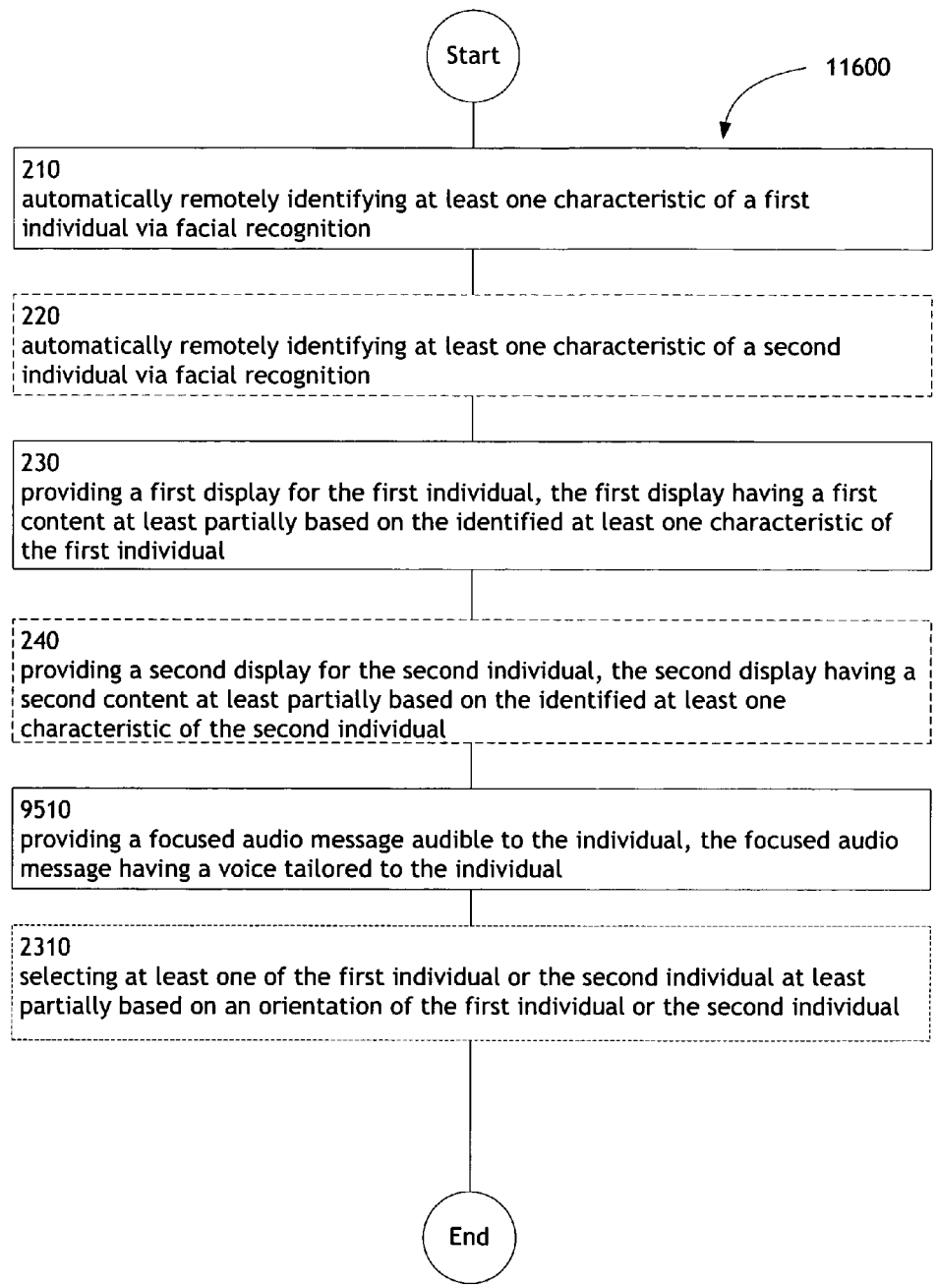
FIG. 116 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, and selecting the individual at least partially based on an orientation of the individual.

FIG. 116 illustrates an operational flow 11600 representing example operations related to automatically remotely identifying one or more characteristics of an individual utilizing facial recognition and providing a display for the individual having a content at least partially based on the one or more identified characteristics of the individual. FIG. 116 illustrates an example embodiment where the example operational flow 9500 of FIG. 95 may include at least one additional operation. Additional operations may include an operation 2310.

Figure 117A:
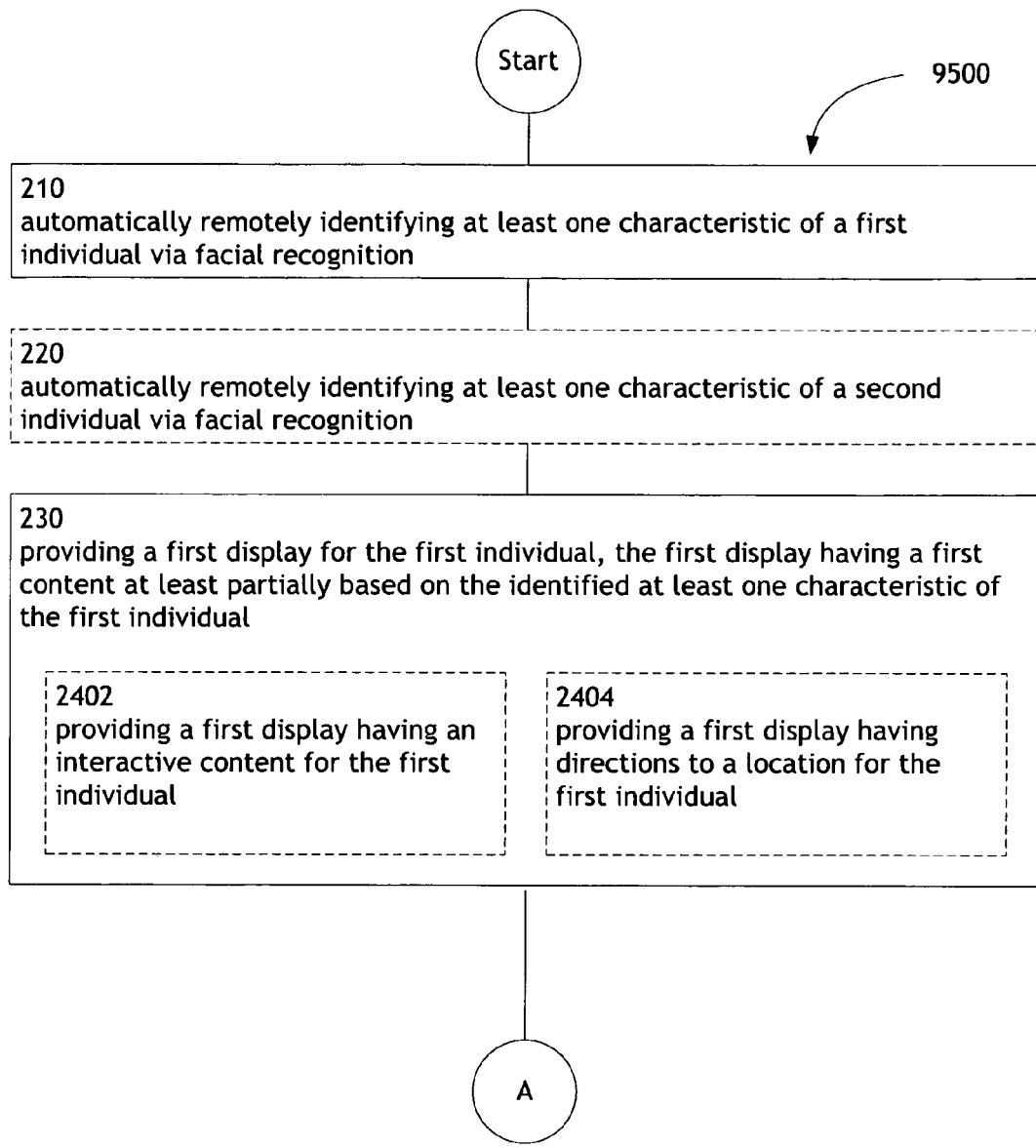
FIG. 117 illustrates an alternative embodiment of the operational flow of FIG. 95.
Figure 117B:
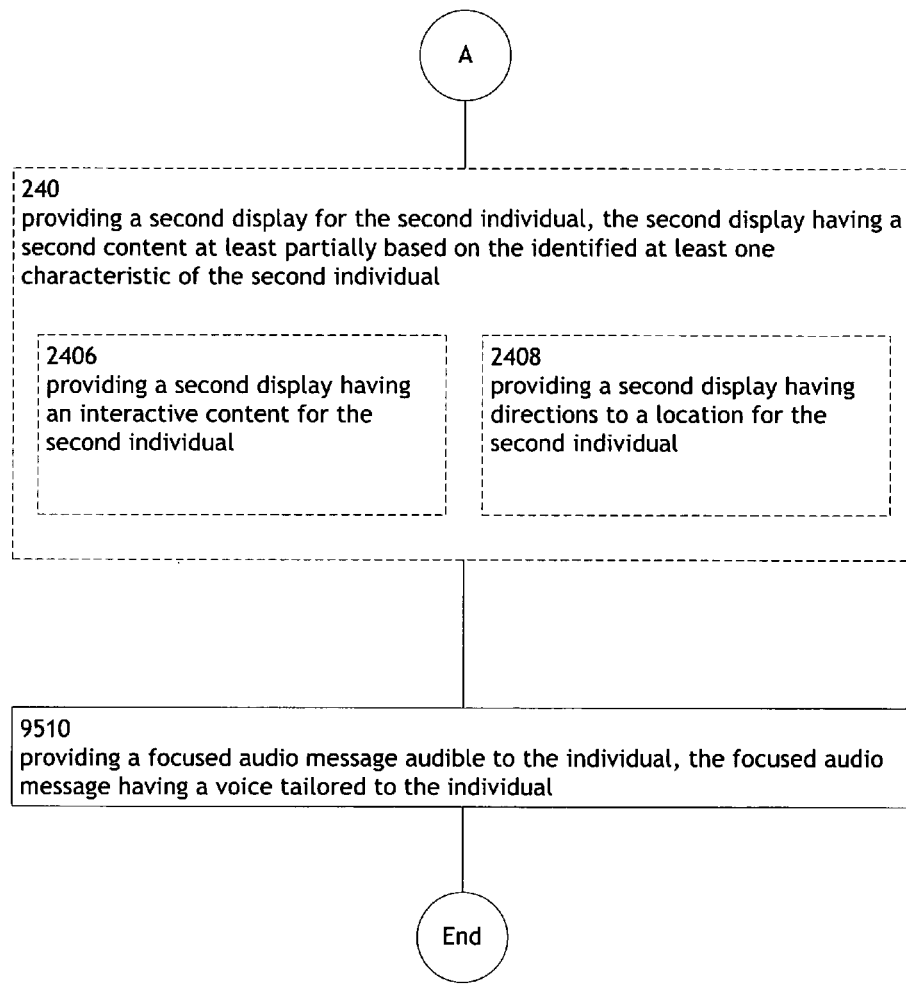

FIG. 117 illustrates alternative embodiments of the example operational flow 9500 of FIG. 95. FIG. 117 illustrates example embodiments where the operations 230 and 240 may include at least one additional operation. Additional operations may include an operation 2402, an operation 2404, an operation 2406, and/or an operation 2408.

Figure 118A:
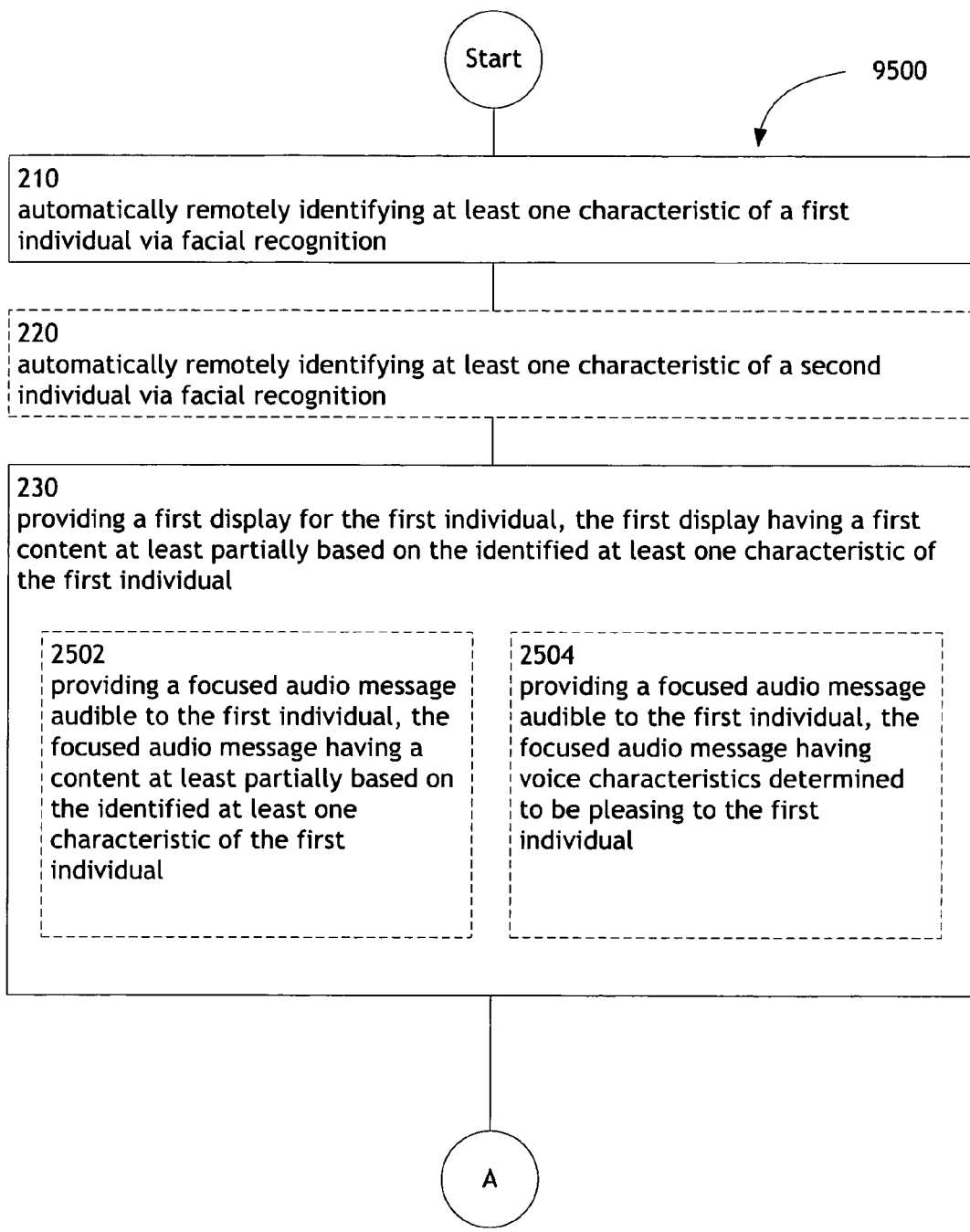
FIG. 118 illustrates an alternative embodiment of the operational flow of FIG. 95.
Figure 118B:
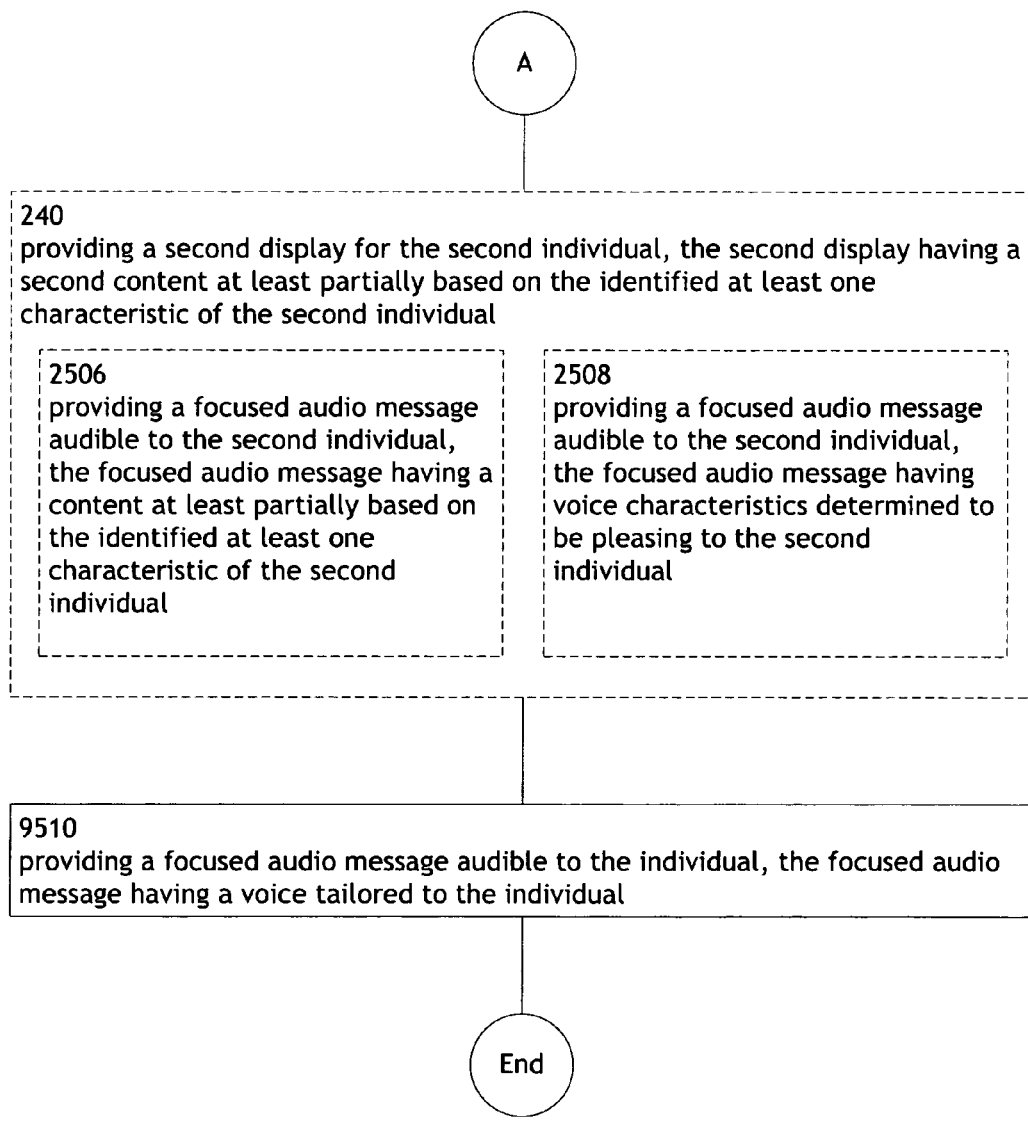

FIG. 118 illustrates alternative embodiments of the example operational flow 9500 of FIG. 95. FIG. 118 illustrates example embodiments where the operations 230 and 240 may include at least one additional operation. Additional operations may include an operation 2502, an operation 2504, an operation 2506, and/or an operation 2508.

Figure 119A:
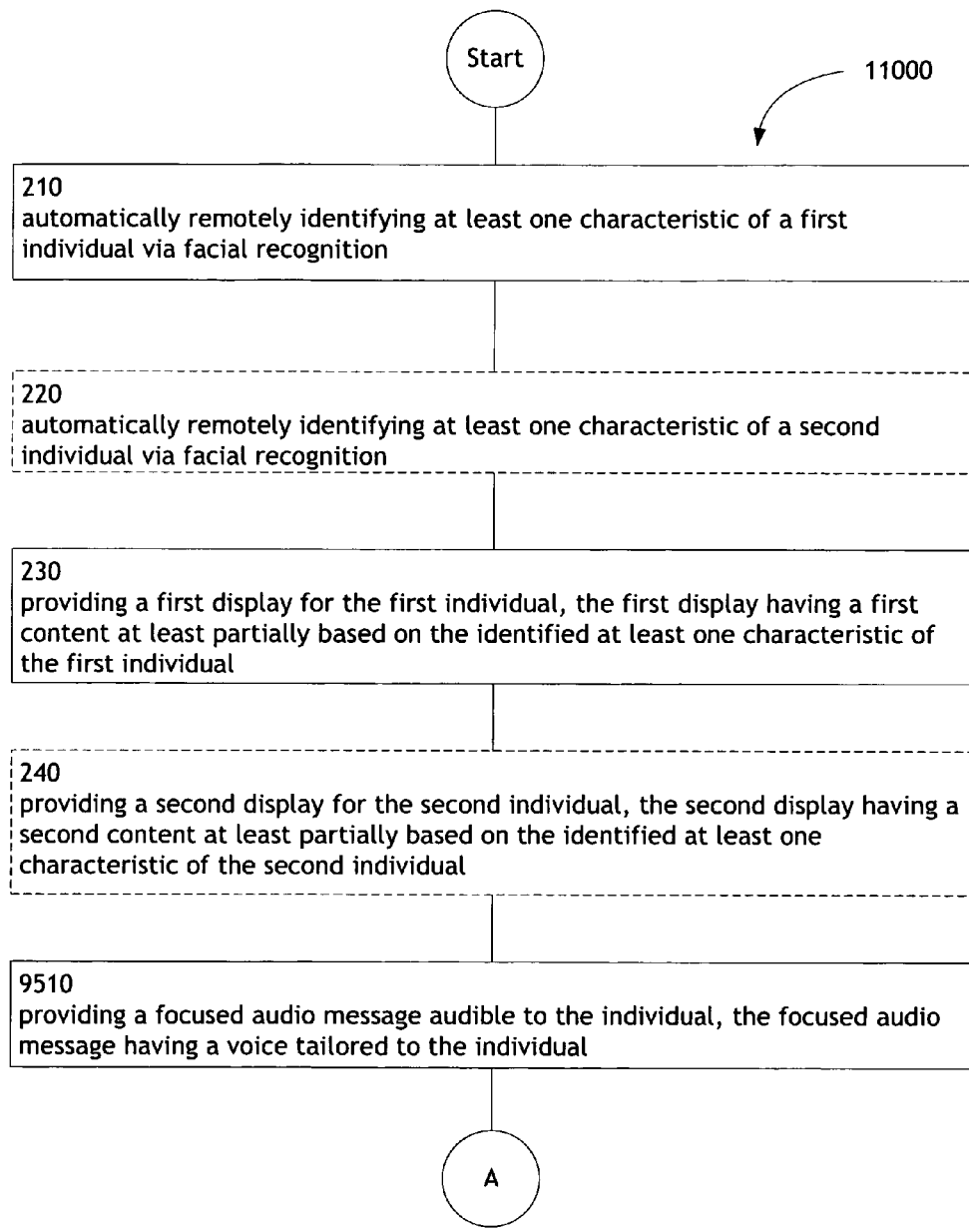
FIG. 119 illustrates an alternative embodiment of the operational flow of FIG. 110.
Figure 119B:
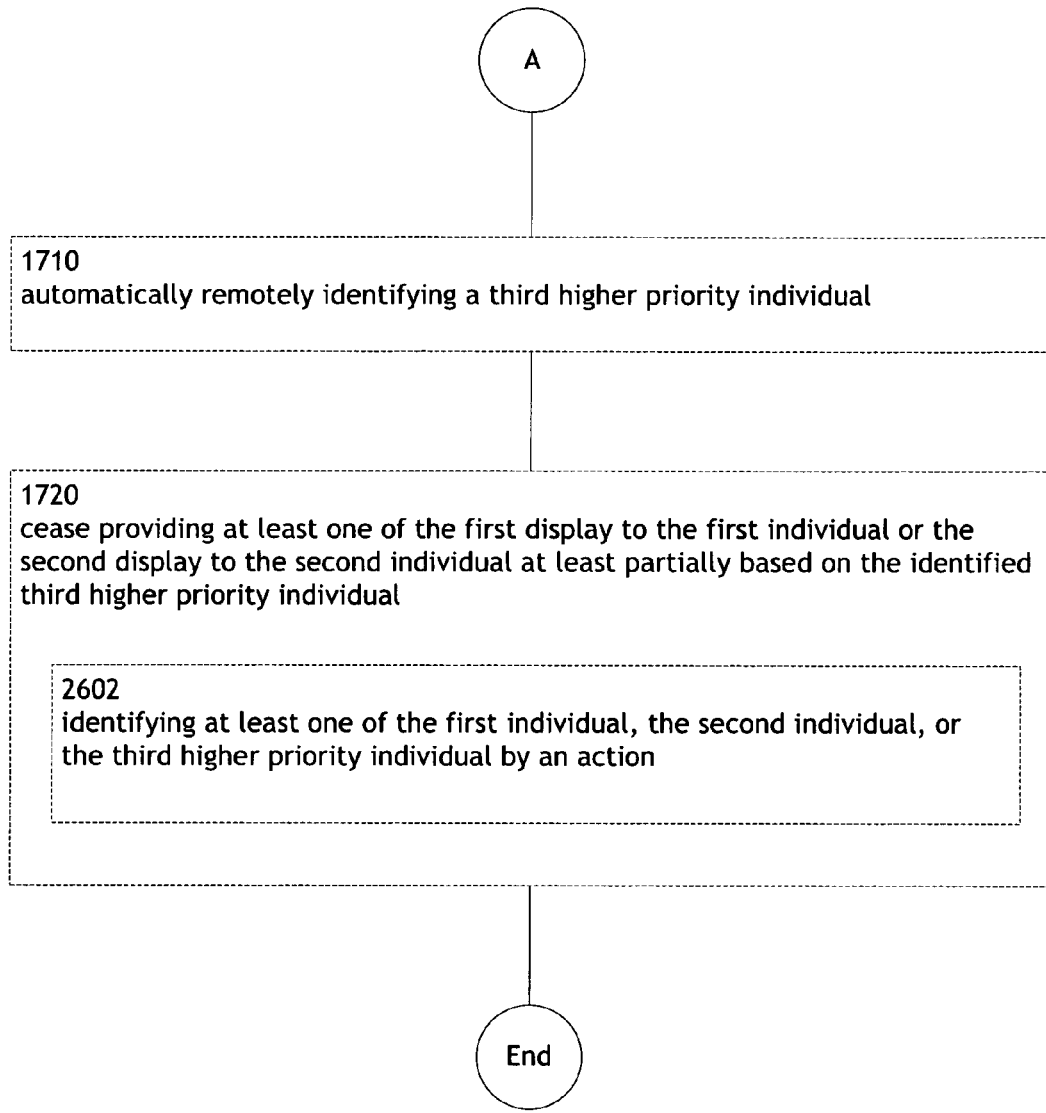

FIG. 119 illustrates alternative embodiments of the example operational flow 11000 of FIG. 110. FIG. 119 illustrates example embodiments where the operation 1720 may include at least one additional operation. Additional operations may include an operation 2602.

Figure 120A:
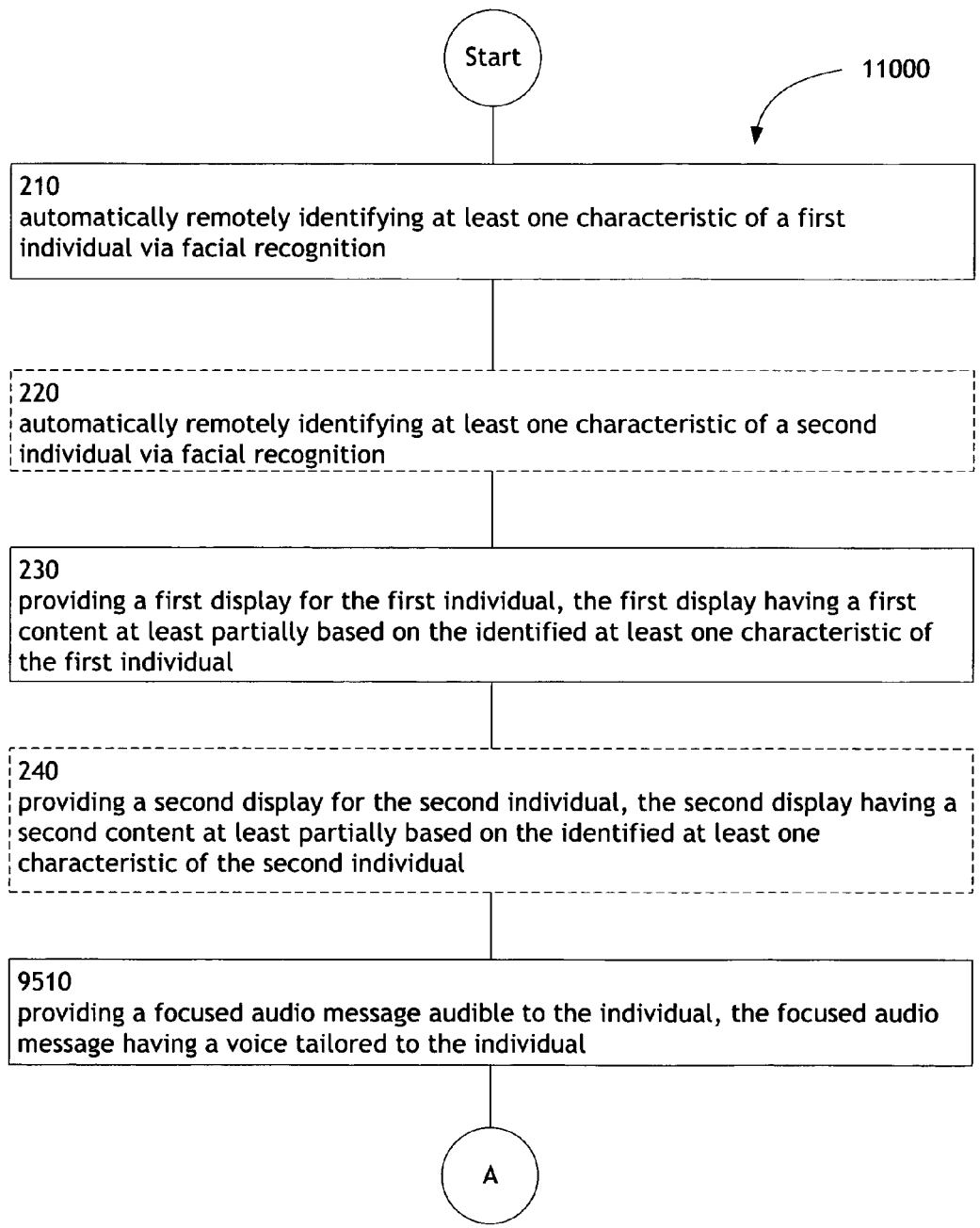
FIG. 120 illustrates an alternative embodiment of the operational flow of FIG. 110.
Figure 120B:
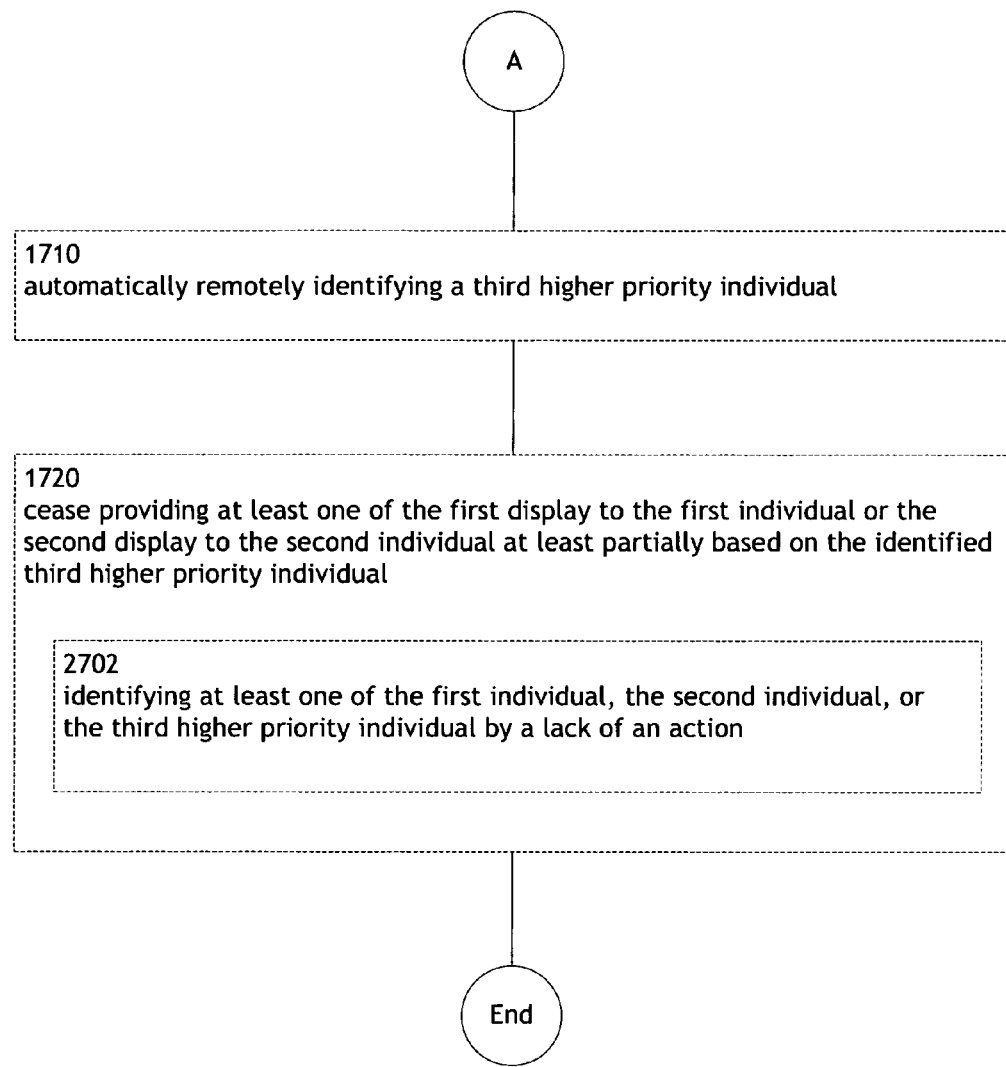

FIG. 120 illustrates alternative embodiments of the example operational flow 11000 of FIG. 110. FIG. 120 illustrates example embodiments where the operation 1720 may include at least one additional operation. Additional operations may include an operation 2702.

Figure 121:
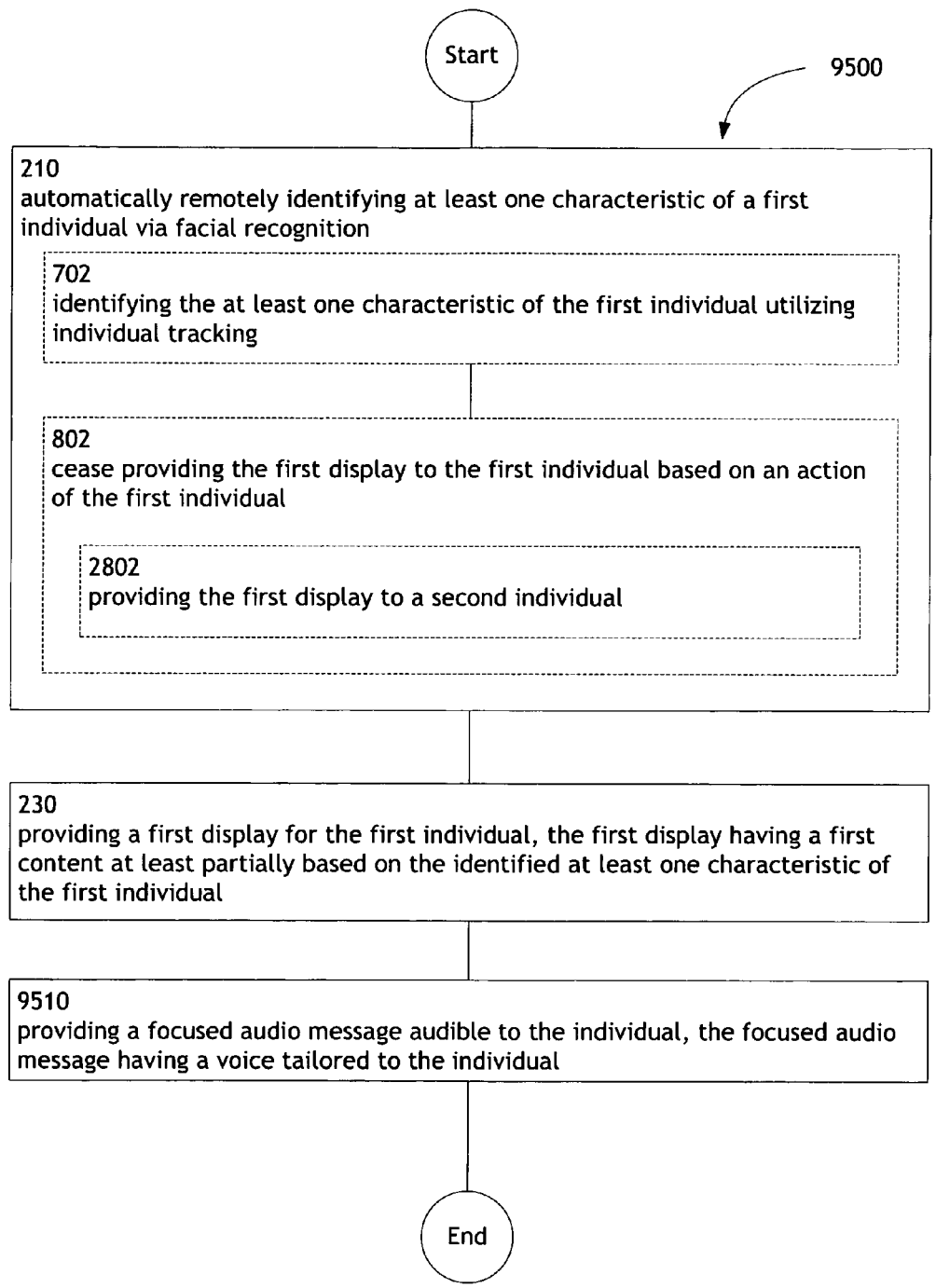
FIG. 121 illustrates an alternative embodiment of the operational flow of FIG. 95.

FIG. 121 illustrates alternative embodiments of the example operational flow 9500 of FIG. 95. FIG. 121 illustrates example embodiments where the operation 210 may include at least one additional operation. Additional operations may include an operation 2802.

Figure 122:
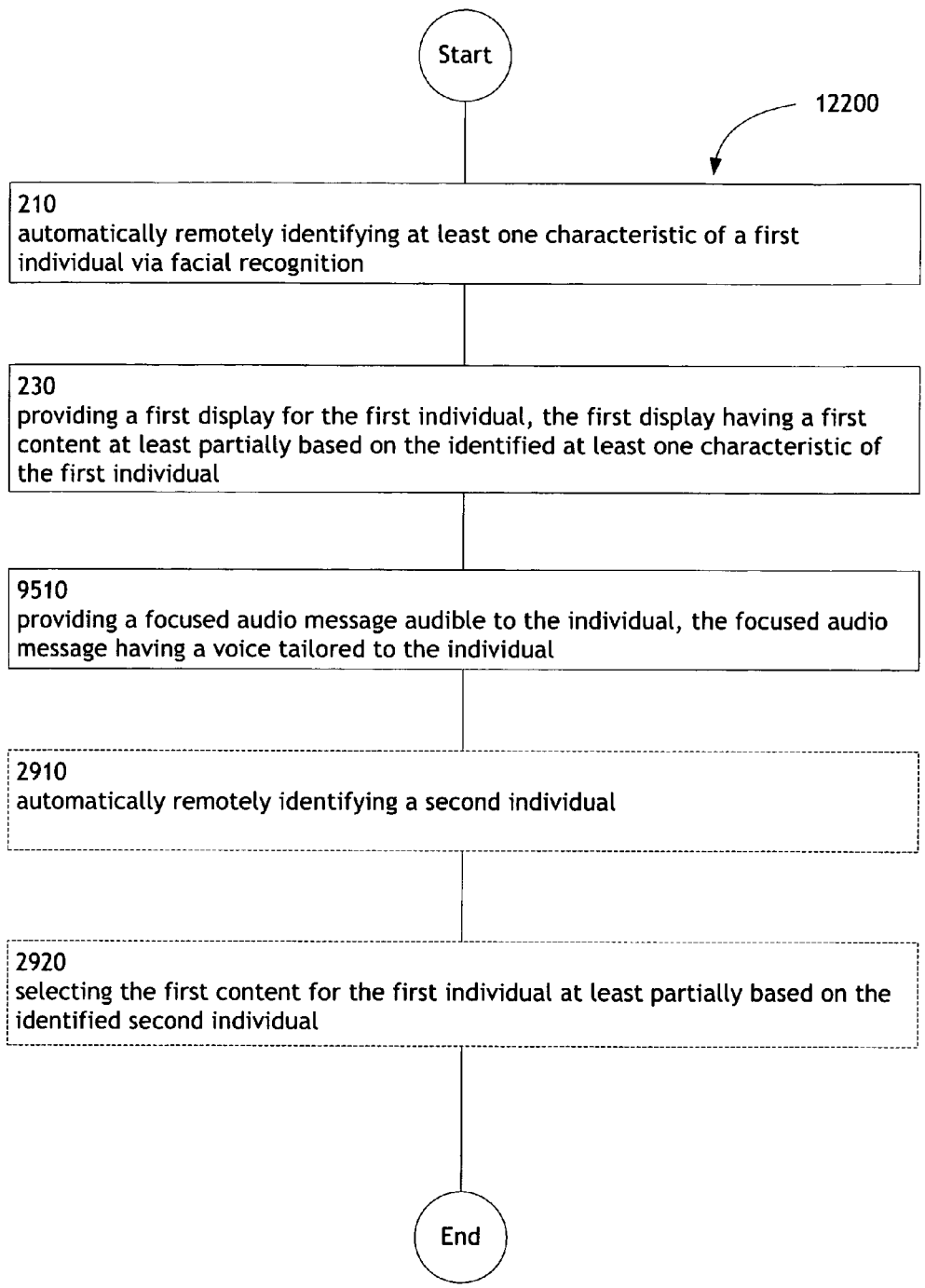
FIG. 122 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, automatically remotely identifying a second individual, and selecting the content for the first individual at least partially based on the identified second individual.

FIG. 122 illustrates an operational flow 12200 representing example operations related to automatically remotely identifying one or more characteristics of an individual utilizing facial recognition and providing a display for the individual having a content at least partially based on the one or more identified characteristics of the individual. FIG. 122 illustrates an example embodiment where the example operational flow 9500 of FIG. 95 may include at least one additional operation. Additional operations may include an operation 2910, and/or an operation 2920.

Figure 123:
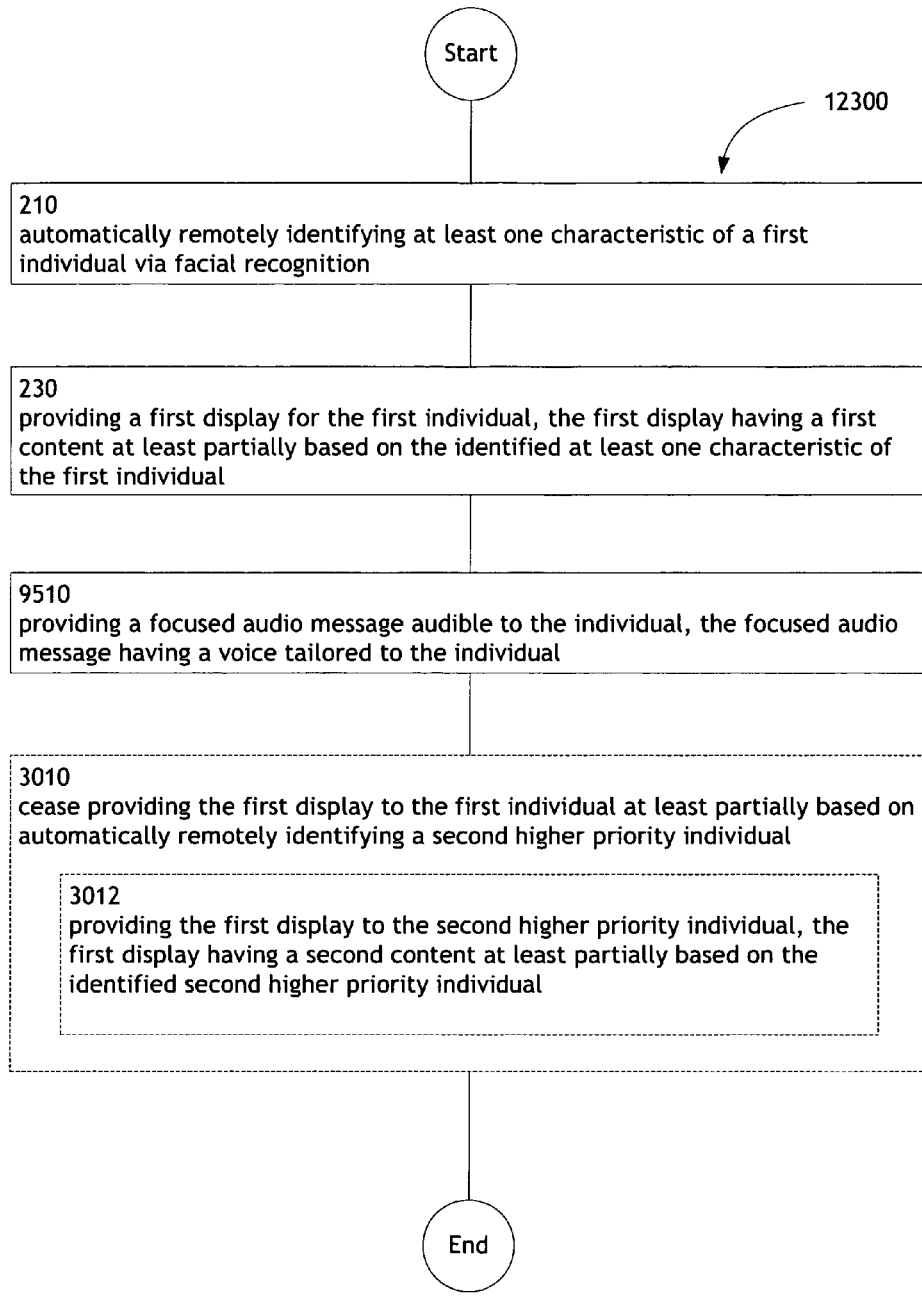
FIG. 123 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, and cease providing the display to the first individual at least partially based on automatically remotely identifying a second higher priority individual.

FIG. 123 illustrates an operational flow 12300 representing example operations related to automatically remotely identifying one or more characteristics of an individual utilizing facial recognition and providing a display for the individual having a content at least partially based on the one or more identified characteristics of the individual. FIG. 123 illustrates an example embodiment where the example operational flow 9500 of FIG. 95 may include at least one additional operation. Additional operations may include an operation 3010, and/or an operation 3012.

Figure 124:
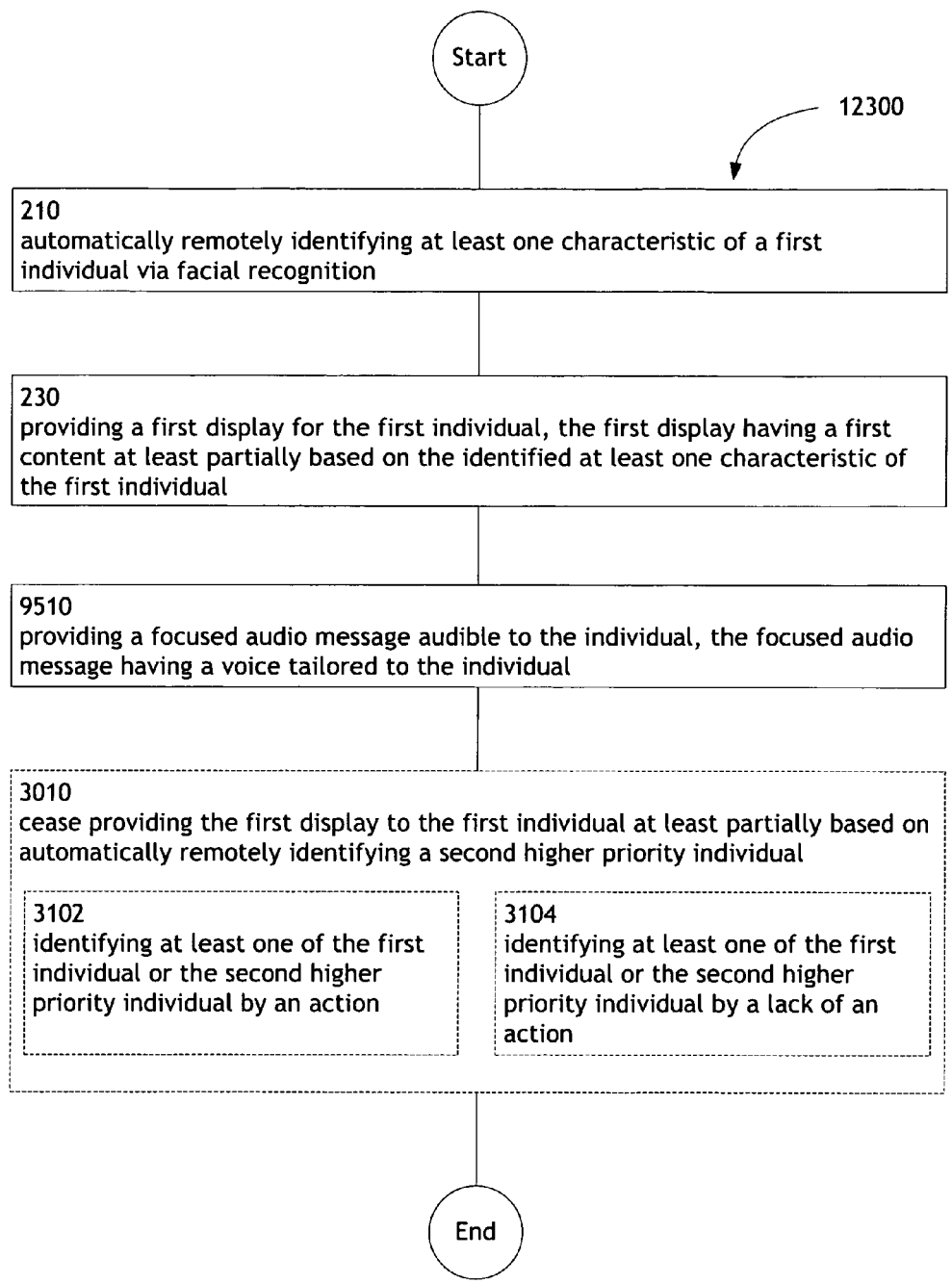
FIG. 124 illustrates an alternative embodiment of the operational flow of FIG. 123.

FIG. 124 illustrates alternative embodiments of the example operational flow 12300 of FIG. 123. FIG. 124 illustrates example embodiments where the operation 3010 may include at least one additional operation. Additional operations may include an operation 3102, and/or an operation 3104.

Figure 125:
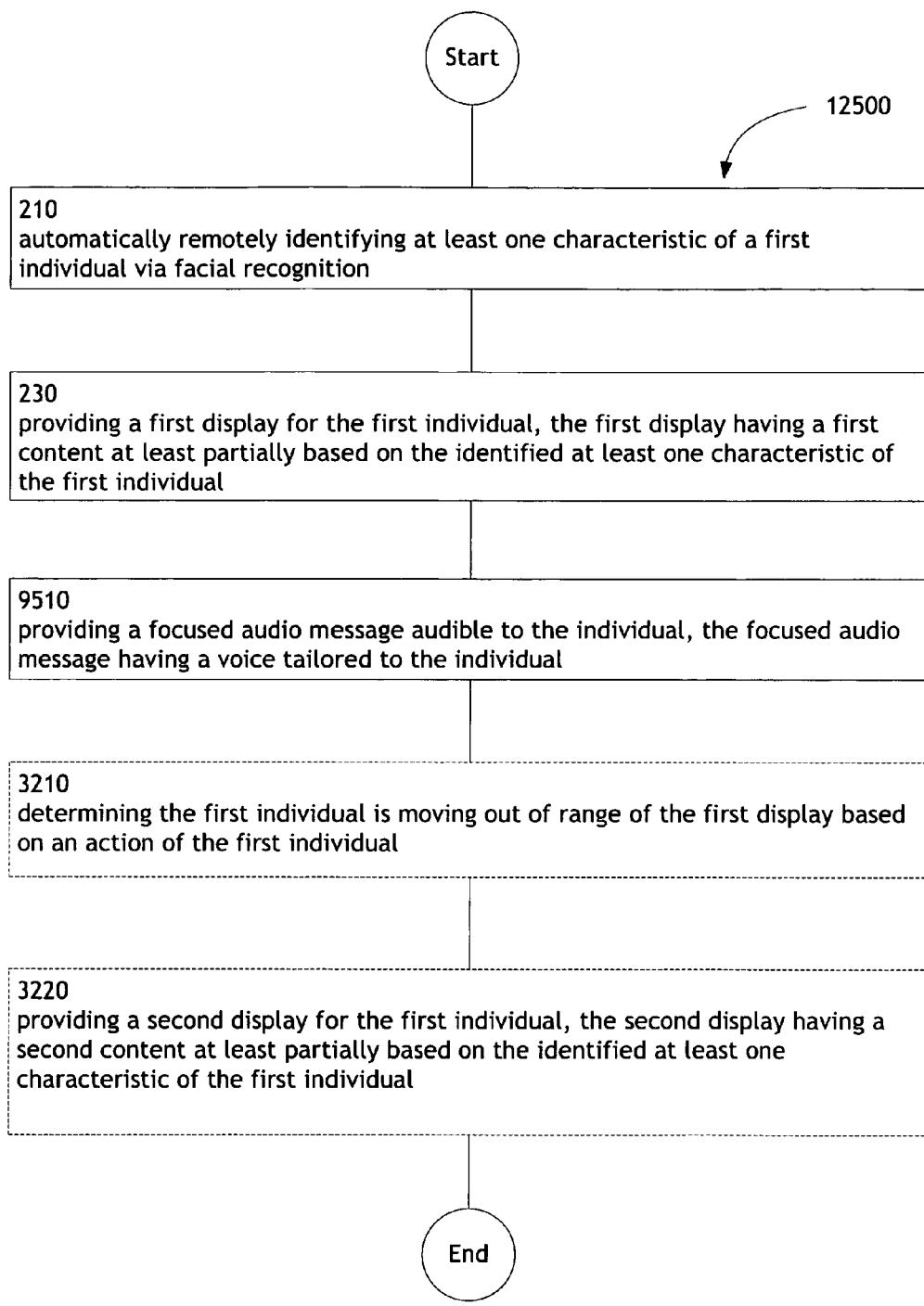
FIG. 125 illustrates an operational flow representing example operations related to automatically remotely identifying one or more characteristics of an individual utilizing facial recognition, providing a display for the individual having a content at least partially based on the one or more identified characteristics of the individual, providing a focused audio message having voice characteristics determined to be pleasing to the individual, determining the individual is moving out of range of the display based on an action of the individual, and providing a second display for the individual, the second display having a second content at least partially based on the identified at least one characteristic of the individual.

FIG. 125 illustrates an operational flow 12500 representing example operations related to automatically remotely identifying one or more characteristics of an individual utilizing facial recognition and providing a display for the individual having a content at least partially based on the one or more identified characteristics of the individual. FIG. 125 illustrates an example embodiment where the example operational flow 9500 of FIG. 95 may include at least one additional operation. Additional operations may include an operation 3210, and/or an operation 3220.

FIG. 126 illustrates an operational flow 12600 representing example operations related to automatically remotely identifying one or more characteristics of an individual utilizing facial recognition and providing a display for the individual having a content at least partially based on the one or more identified characteristics of the individual. In FIG. 126 and in following figures that include various examples of operational flows, discussion and explanation may be provided with respect to the above-described examples of FIGS. 1A through 1M, and/or with respect to other examples and contexts. However, it should be understood that the operational flows may be executed in a number of other environments and contexts, and/or in modified versions of FIGS. 1A through 1M. Also, although the various operational flows are presented in the sequence(s) illustrated, it should be understood that the various operations may be performed in other orders than those which are illustrated, or may be performed concurrently.

After a start operation, an operation 210, an operation 220, an operation 230, and an operation 240, the operational flow 12600 moves to an operation 12610. Operation 12610 illustrates providing a display having at least one of an illumination level, a color scheme, an aspect ratio, a resolution, or a refresh rate targeted to the individual. For example, as shown in FIGS. 1A through 1M, the first display 56 provided to the first individual 52 or the second display 84 provided to the second individual 80 may have a color scheme targeted to the first individual 52 or the second individual 80. In an embodiment, the controller 132 coupled with the first display module 54 may be utilized to provide the first individual 52 with the first display 56, where the first display 56 has a color scheme targeted to the first individual 52.

Figure 127:
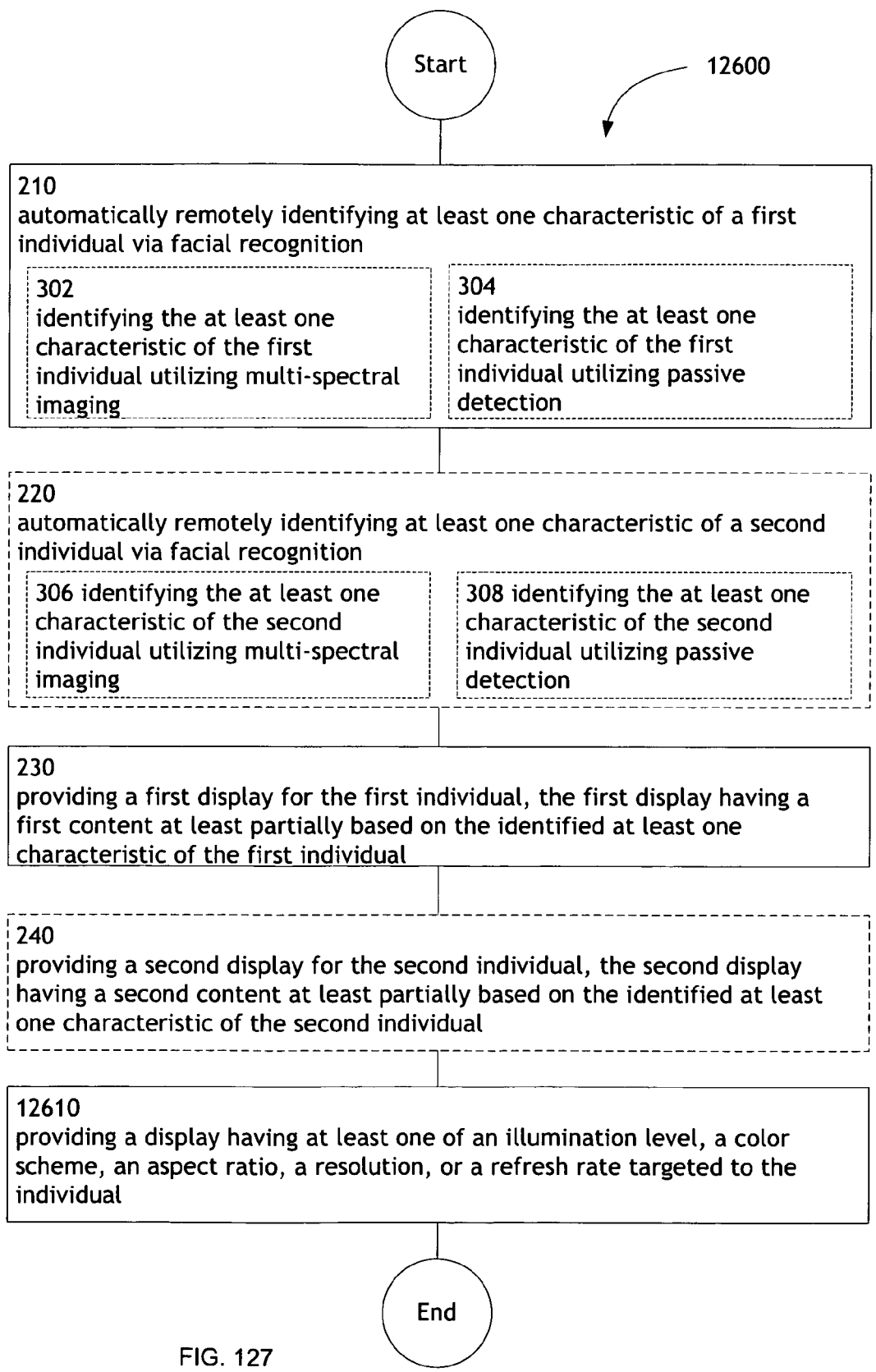
FIG. 127 illustrates an alternative embodiment of the operational flow of FIG. 126.

FIG. 127 illustrates alternative embodiments of the example operational flow 12600 of FIG. 126. FIG. 127 illustrates example embodiments where the operations 210 and 220 may include at least one additional operation. Additional operations may include an operation 302, an operation 304, an operation 306, and/or an operation 308.

Figure 128:
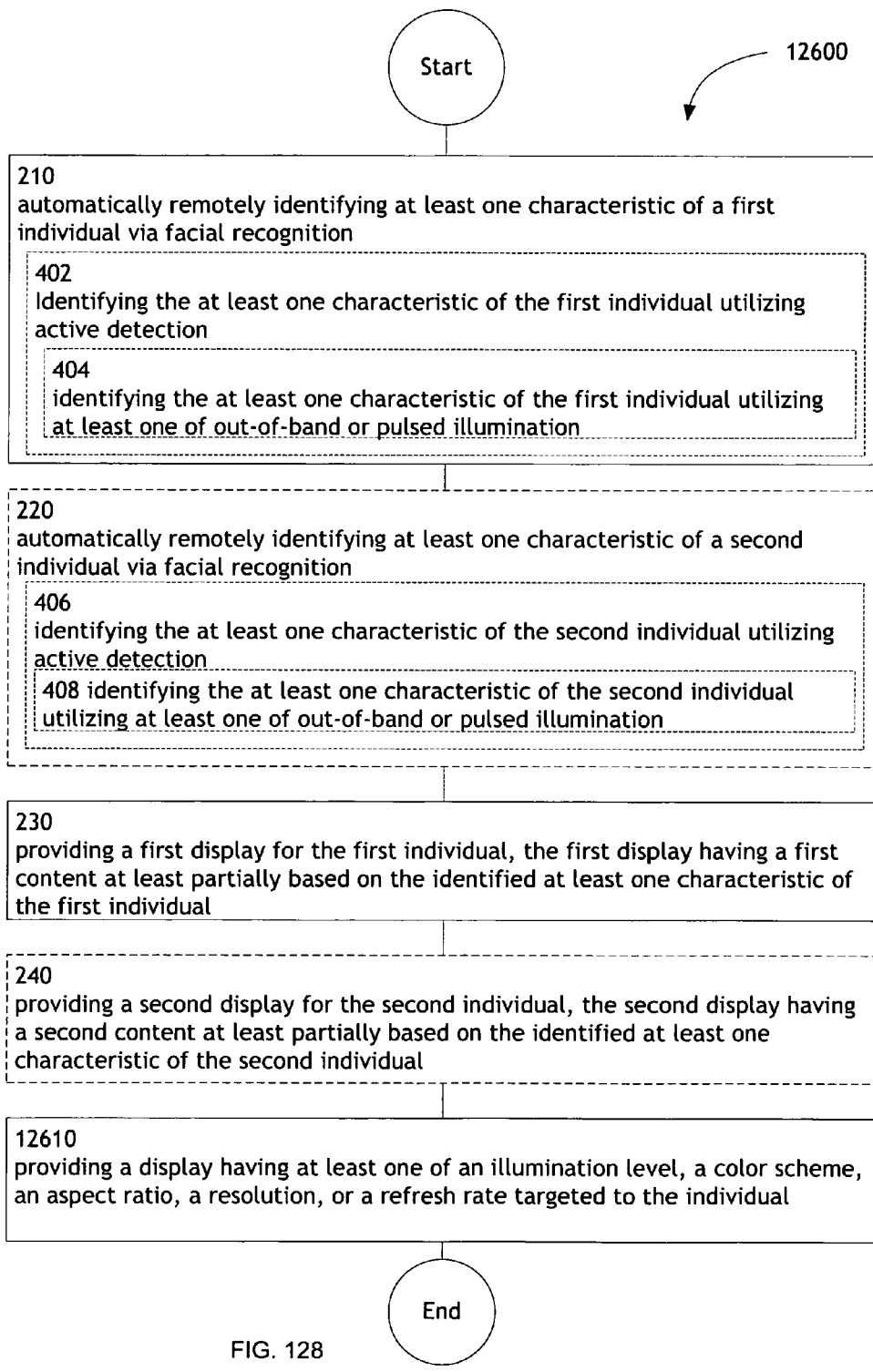
FIG. 128 illustrates an alternative embodiment of the operational flow of FIG. 126.

FIG. 128 illustrates alternative embodiments of the example operational flow 12600 of FIG. 126. FIG. 128 illustrates example embodiments where the operations 210 and 220 may include at least one additional operation. Additional operations may include an operation 402, an operation 404, an operation 406, and/or an operation 408.

Figure 129:
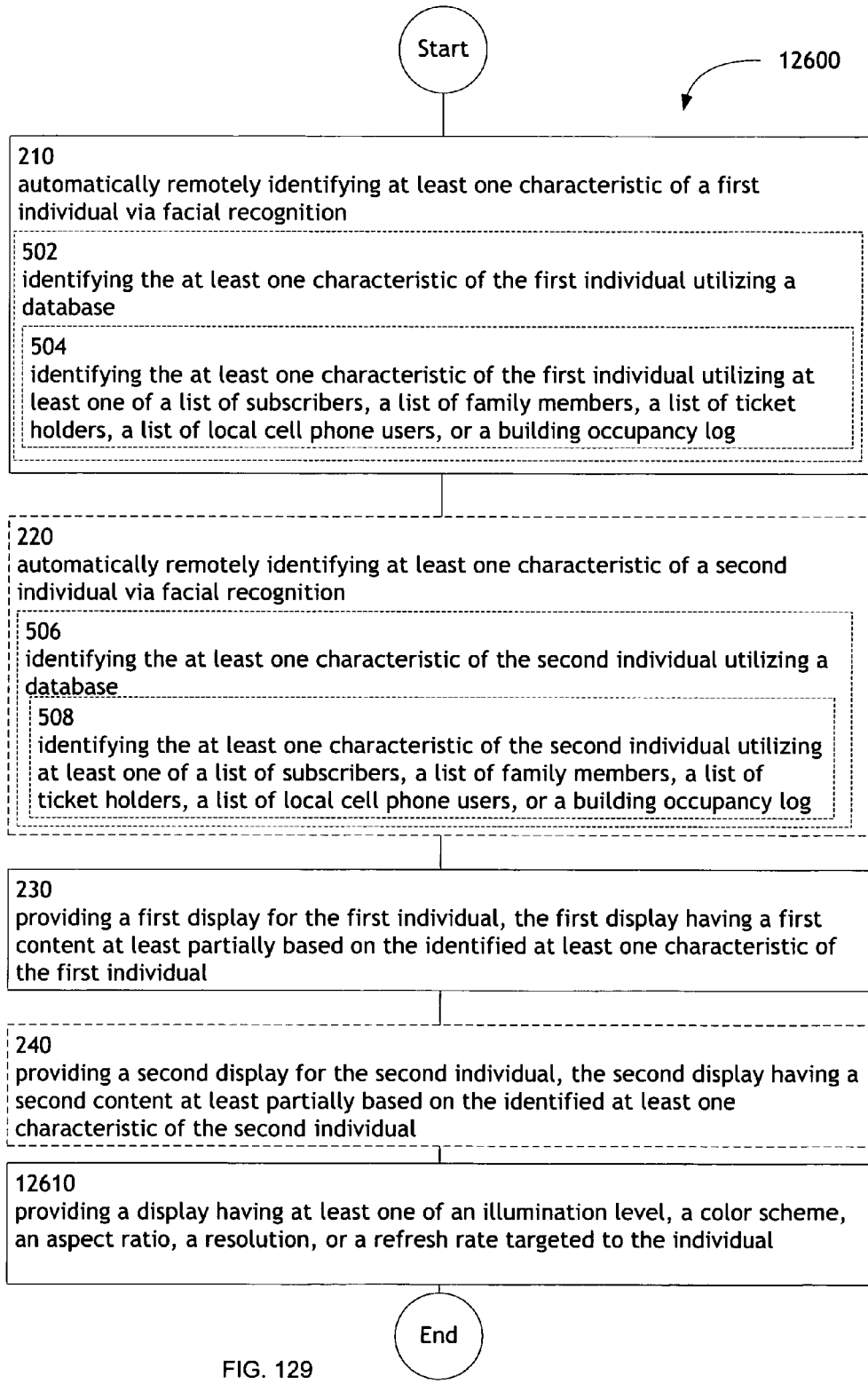
FIG. 129 illustrates an alternative embodiment of the operational flow of FIG. 126.

FIG. 129 illustrates alternative embodiments of the example operational flow 12600 of FIG. 126. FIG. 129 illustrates example embodiments where the operations 210 and 220 may include at least one additional operation. Additional operations may include an operation 502, an operation 504, an operation 506, and/or an operation 508.

Figure 130:
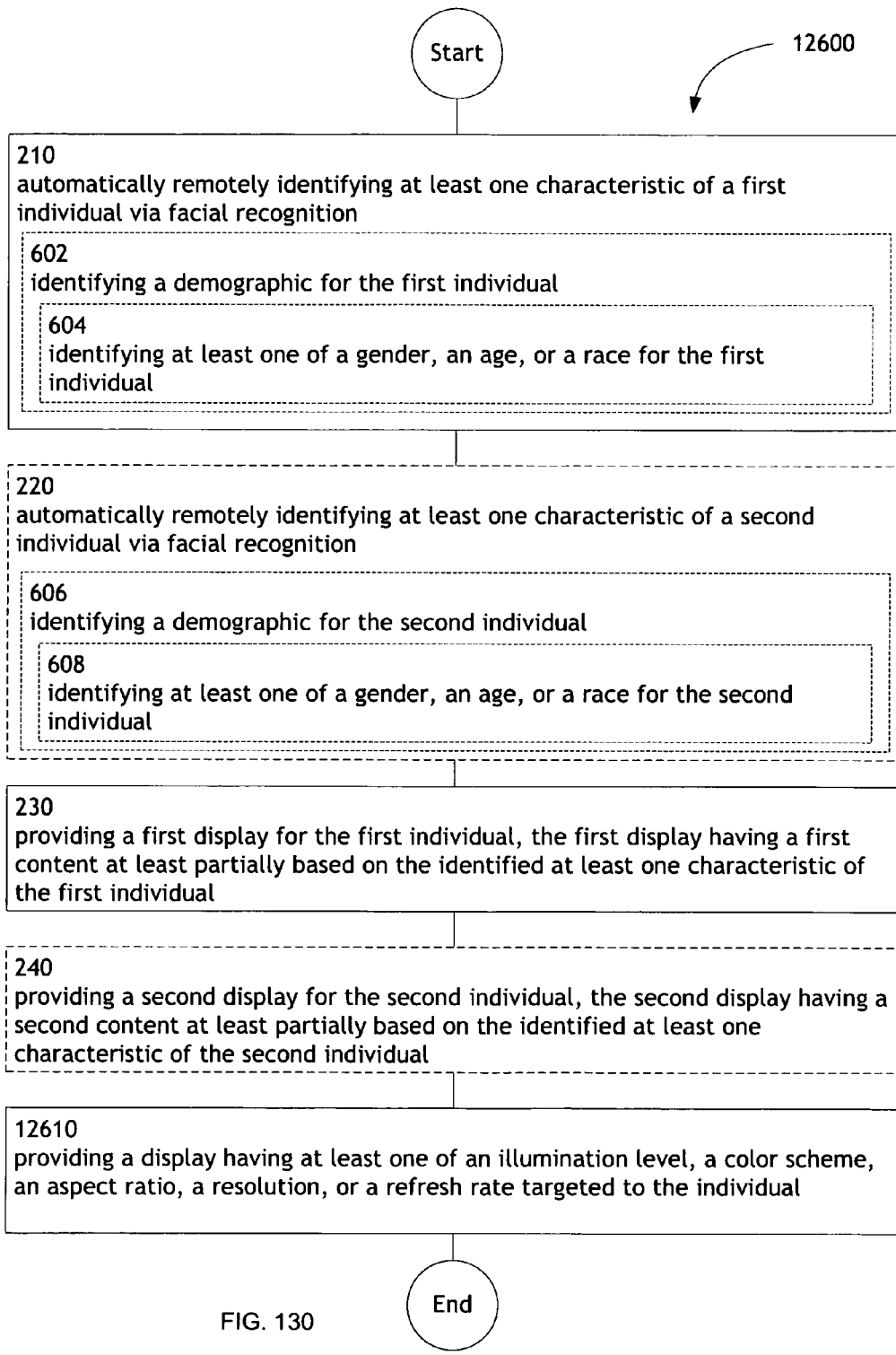

FIG. 130 illustrates alternative embodiments of the example operational flow 12600 of FIG. 126. FIG. 130 illustrates example embodiments where the operations 210 and 220 may include at least one additional operation. Additional operations may include an operation 602, an operation 604, an operation 606, and/or an operation 608.

Figure 131:
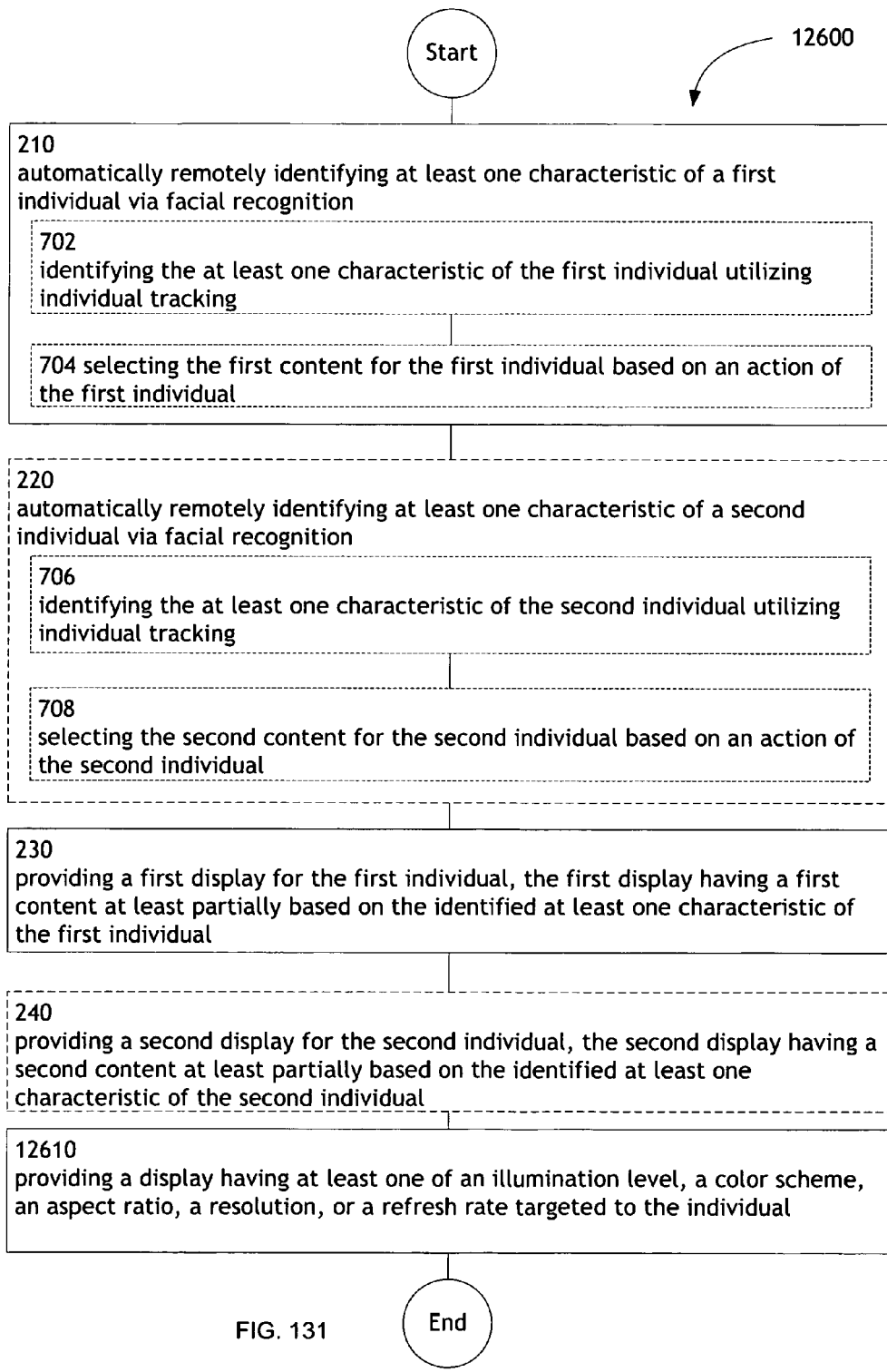

FIG. 131 illustrates alternative embodiments of the example operational flow 12600 of FIG. 126. FIG. 131 illustrates example embodiments where the operations 210 and 220 may include at least one additional operation. Additional operations may include an operation 702, an operation 704, an operation 706, and/or an operation 708.

Figure 132A:
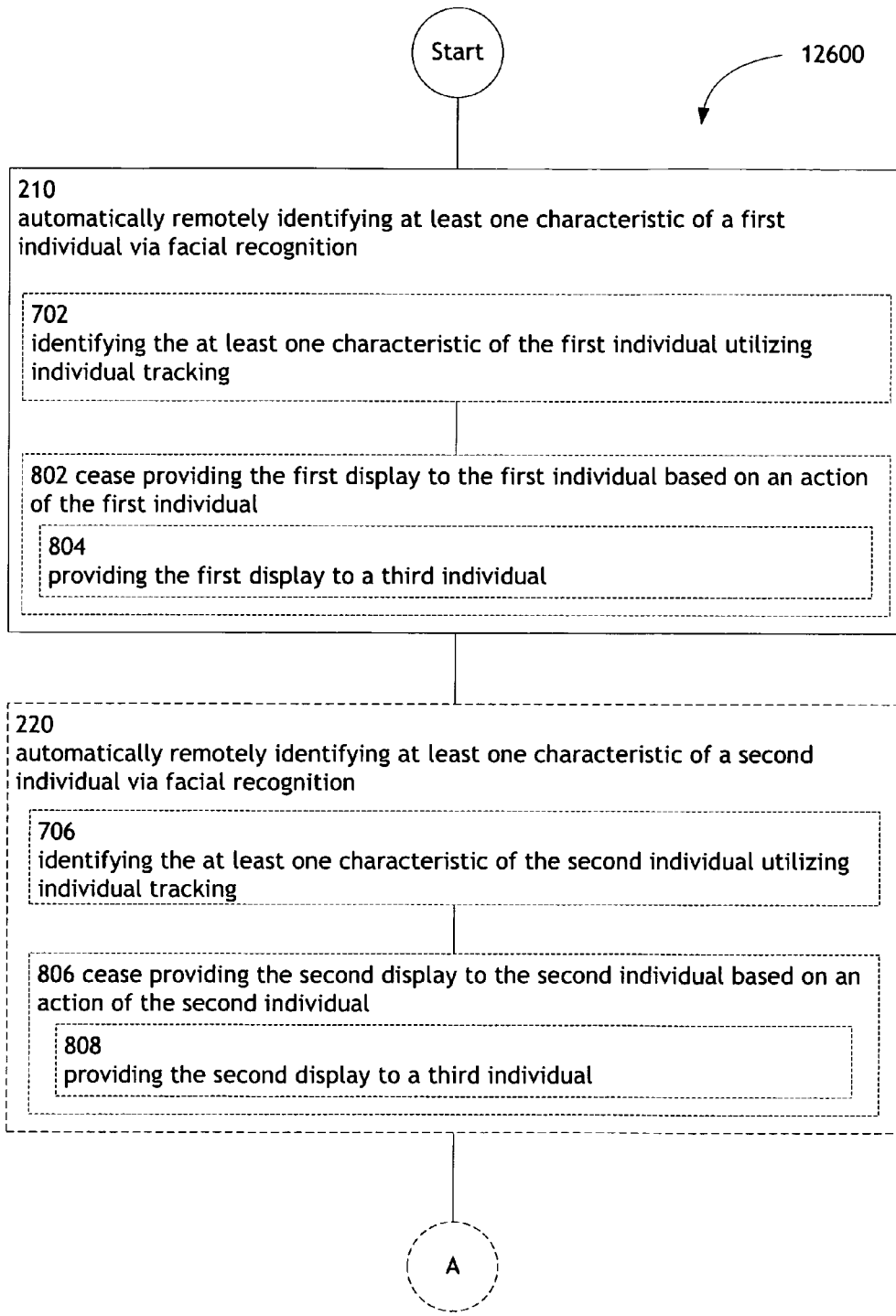
Figure 132B:
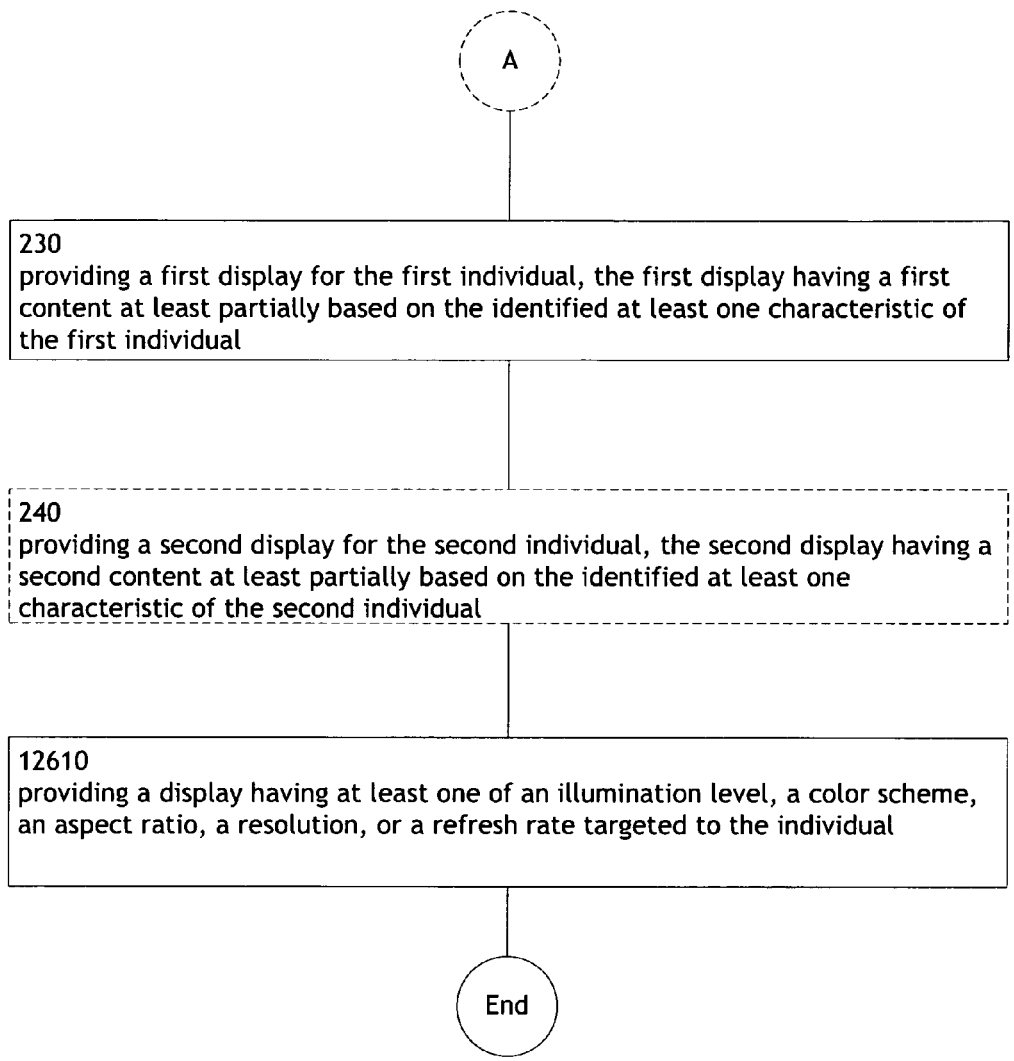

FIG. 132 illustrates alternative embodiments of the example operational flow 12600 of FIG. 126. FIG. 132 illustrates example embodiments where the operations 210 and 220 may include at least one additional operation. Additional operations may include an operation 802, an operation 804, an operation 806, and/or an operation 808.

Figure 133:
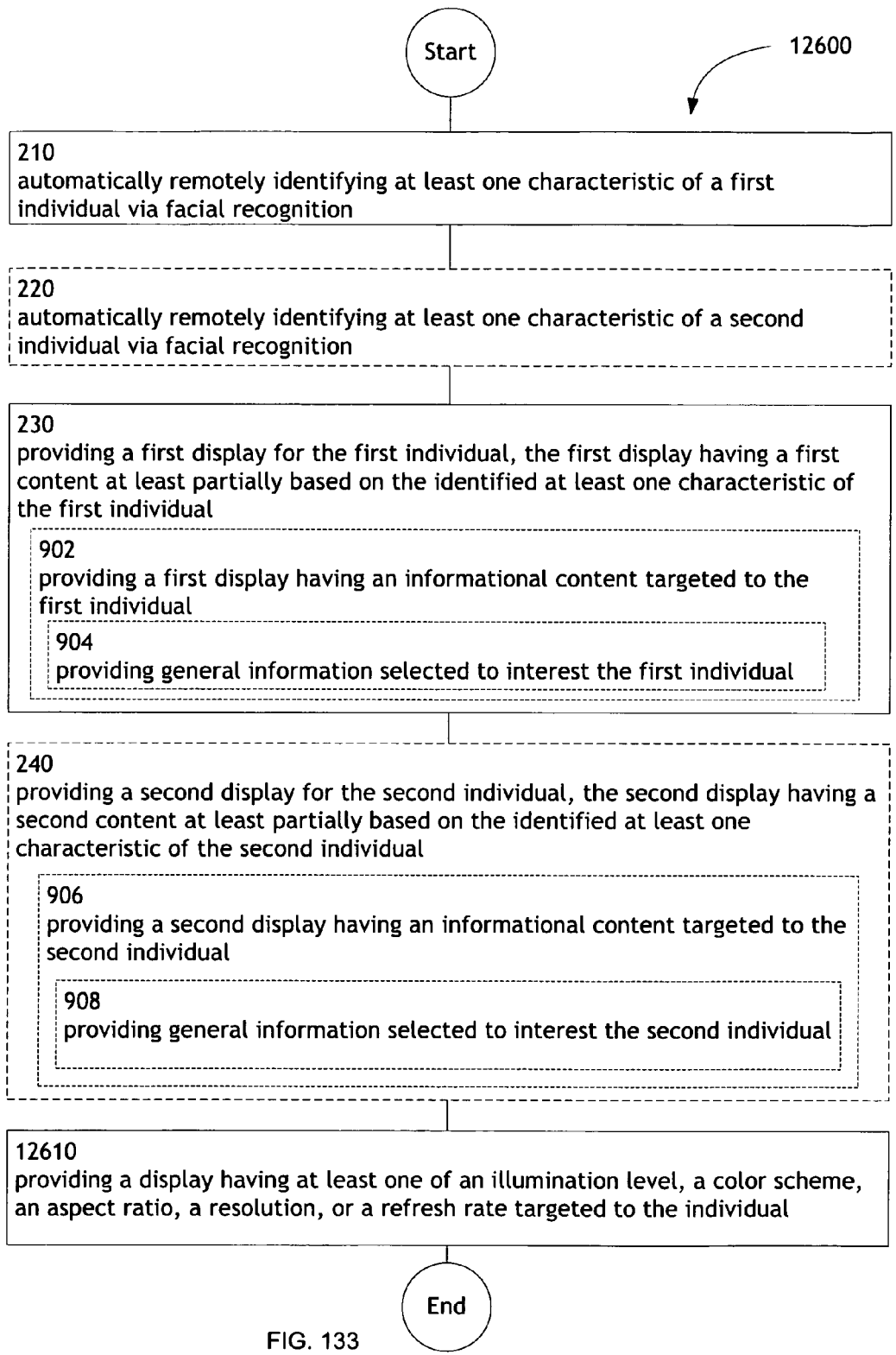

FIG. 133 illustrates alternative embodiments of the example operational flow 12600 of FIG. 126. FIG. 133 illustrates example embodiments where the operations 230 and 240 may include at least one additional operation. Additional operations may include an operation 902, an operation 904, an operation 906, and/or an operation 908.

Figure 134A:
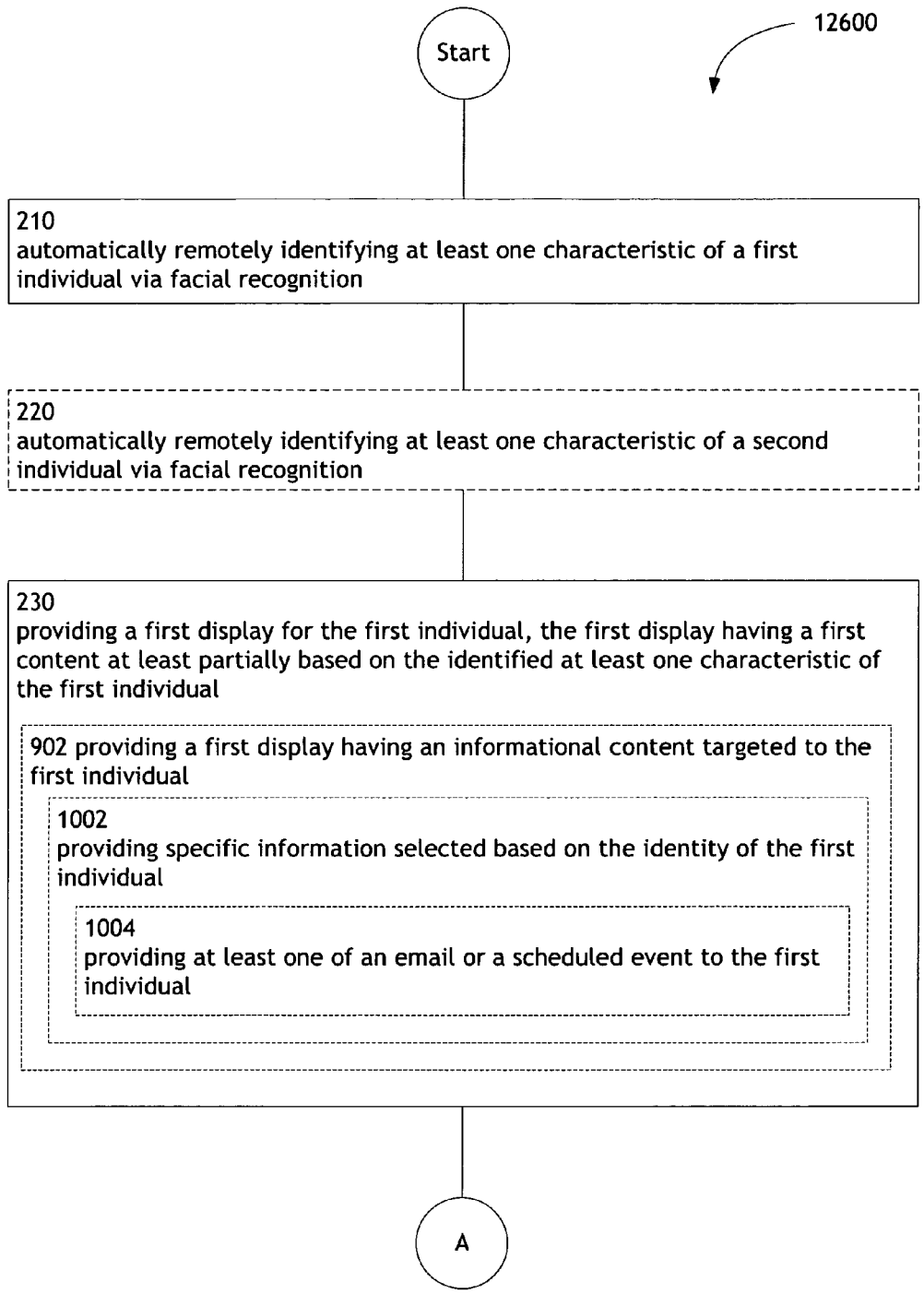

FIG. 134 illustrates alternative embodiments of the example operational flow 12600 of FIG. 126. FIG. 134 illustrates example embodiments where the operations 230 and 240 may include at least one additional operation. Additional operations may include an operation 1002, an operation 1004, an operation 1006, and/or an operation 1008.

Figure 135:
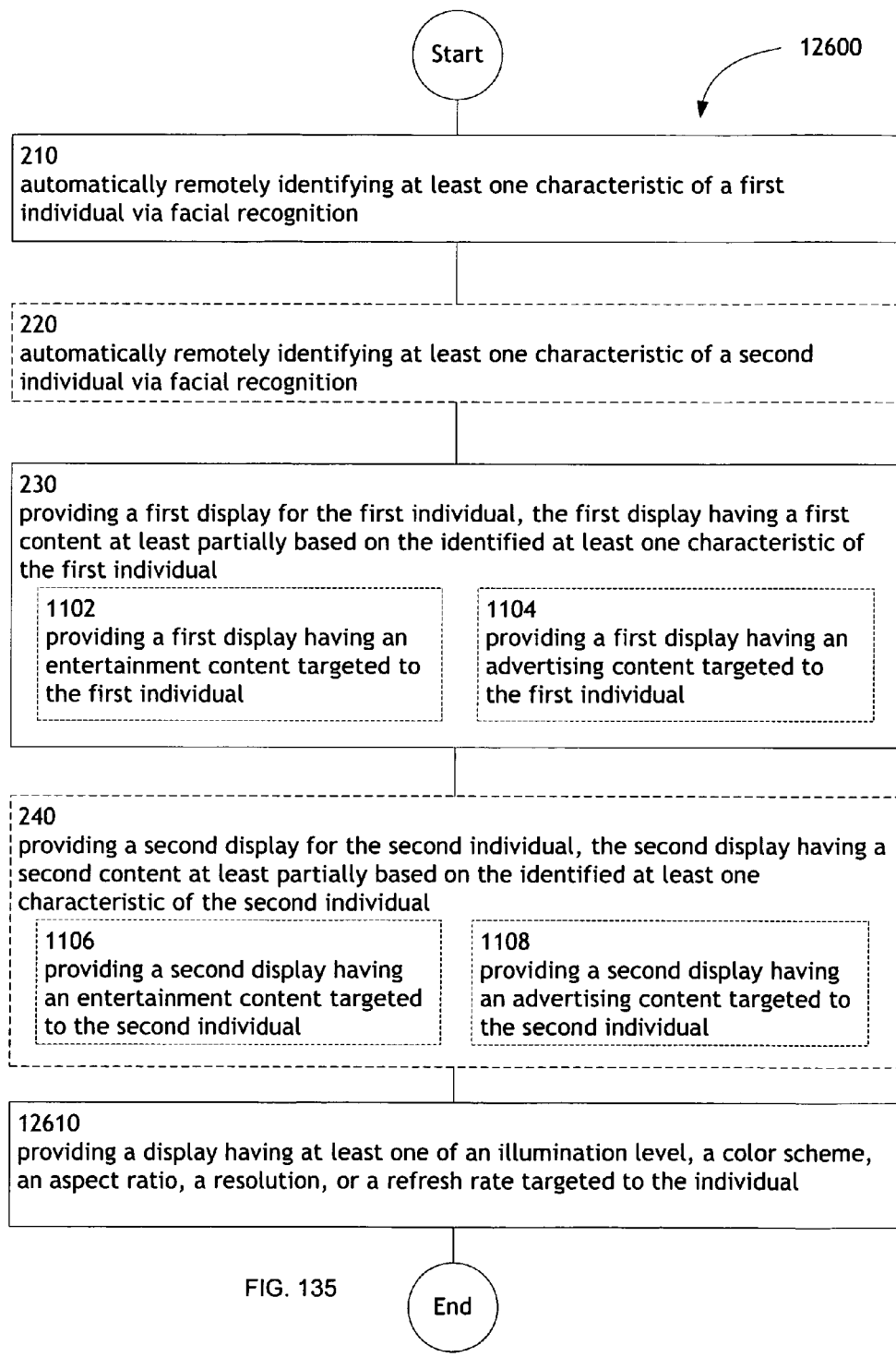

FIG. 135 illustrates alternative embodiments of the example operational flow 12600 of FIG. 126. FIG. 135 illustrates example embodiments where the operations 230 and 240 may include at least one additional operation. Additional operations may include an operation 1102, an operation 1104, an operation 1106, and/or an operation 1108.

Figure 136:
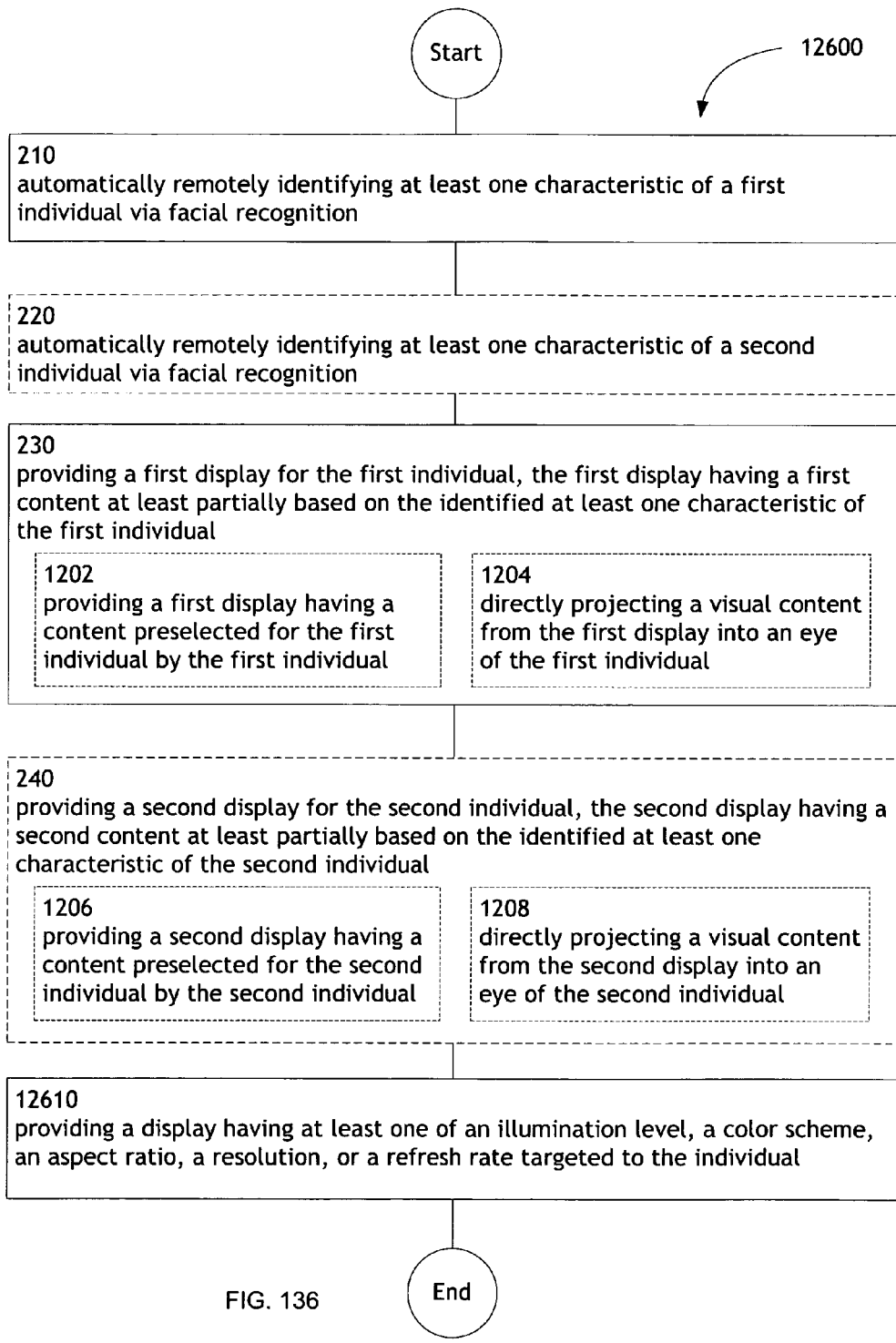

FIG. 136 illustrates alternative embodiments of the example operational flow 12600 of FIG. 126. FIG. 136 illustrates example embodiments where the operations 230 and 240 may include at least one additional operation. Additional operations may include an operation 1202, an operation 1204, an operation 1206, and/or an operation 1208.

Figure 137:
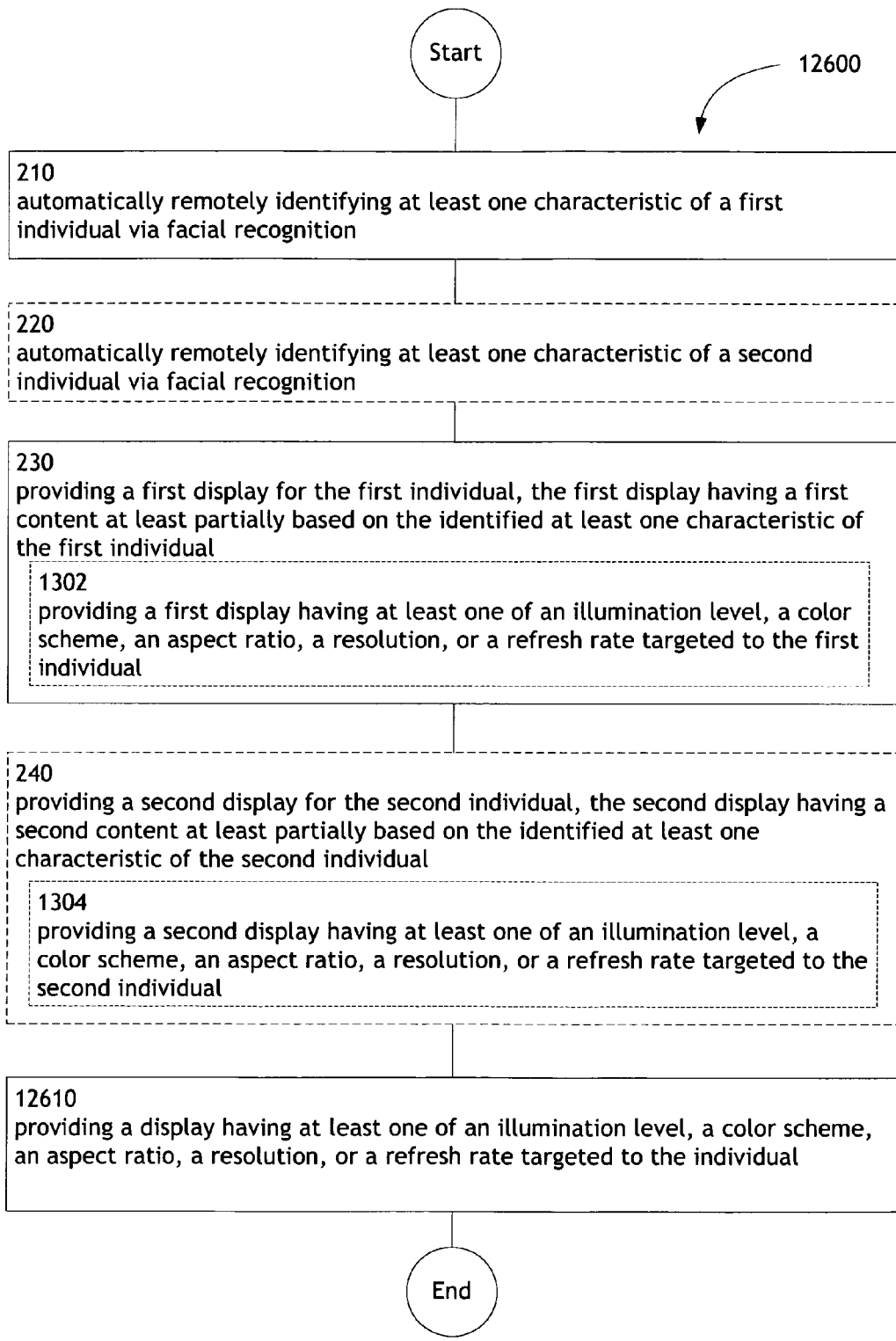

FIG. 137 illustrates alternative embodiments of the example operational flow 12600 of FIG. 126. FIG. 137 illustrates example embodiments where the operations 230 and 240 may include at least one additional operation. Additional operations may include an operation 1302 and/or an operation 1304.

FIG. 138 illustrates an operational flow 13800 representing example operations related to automatically remotely identifying one or more characteristics of an individual utilizing facial recognition and providing a display for the individual having a content at least partially based on the one or more identified characteristics of the individual. FIG. 138 illustrates an example embodiment where the example operational flow 12600 of FIG. 126 may include at least one additional operation. Additional operations may include an operation 1410, and/or an operation 1420.

FIG. 139 illustrates an operational flow 13900 representing example operations related to automatically remotely identifying one or more characteristics of an individual utilizing facial recognition and providing a display for the individual having a content at least partially based on the one or more identified characteristics of the individual. FIG. 139 illustrates an example embodiment where the example operational flow 12600 of FIG. 126 may include at least one additional operation. Additional operations may include an operation 1510, an operation 1520, an operation 1522, and/or an operation 1524.

FIG. 140 illustrates an operational flow 14000 representing example operations related to automatically remotely identifying one or more characteristics of an individual utilizing facial recognition and providing a display for the individual having a content at least partially based on the one or more identified characteristics of the individual. FIG. 140 illustrates an example embodiment where the example operational flow 12600 of FIG. 126 may include at least one additional operation. Additional operations may include an operation 1610.

FIG. 141 illustrates an operational flow 14100 representing example operations related to automatically remotely identifying one or more characteristics of an individual utilizing facial recognition and providing a display for the individual having a content at least partially based on the one or more identified characteristics of the individual. FIG. 141 illustrates an example embodiment where the example operational flow 12600 of FIG. 126 may include at least one additional operation. Additional operations may include an operation 1710, an operation 1720, and/or an operation 1722.

FIG. 142 illustrates an operational flow 14200 representing example operations related to automatically remotely identifying one or more characteristics of an individual utilizing facial recognition and providing a display for the individual having a content at least partially based on the one or more identified characteristics of the individual. FIG. 142 illustrates an example embodiment where the example operational flow 12600 of FIG. 126 may include at least one additional operation. Additional operations may include an operation 1810, and/or an operation 1812.

FIG. 143 illustrates an operational flow 14300 representing example operations related to automatically remotely identifying one or more characteristics of an individual utilizing facial recognition and providing a display for the individual having a content at least partially based on the one or more identified characteristics of the individual. FIG. 143 illustrates an example embodiment where the example operational flow 12600 of FIG. 126 may include at least one additional operation. Additional operations may include an operation 1910, and/or an operation 1912.

FIG. 144 illustrates an operational flow 14400 representing example operations related to automatically remotely identifying one or more characteristics of an individual utilizing facial recognition and providing a display for the individual having a content at least partially based on the one or more identified characteristics of the individual. FIG. 144 illustrates an example embodiment where the example operational flow 12600 of FIG. 126 may include at least one additional operation. Additional operations may include an operation 2010, and/or an operation 2020.

FIG. 145 illustrates an operational flow 14500 representing example operations related to automatically remotely identifying one or more characteristics of an individual utilizing facial recognition and providing a display for the individual having a content at least partially based on the one or more identified characteristics of the individual. FIG. 145 illustrates an example embodiment where the example operational flow 12600 of FIG. 126 may include at least one additional operation. Additional operations may include an operation 2110.

FIG. 146 illustrates an operational flow 14600 representing example operations related to automatically remotely identifying one or more characteristics of an individual utilizing facial recognition and providing a display for the individual having a content at least partially based on the one or more identified characteristics of the individual. FIG. 146 illustrates an example embodiment where the example operational flow 12600 of FIG. 126 may include at least one additional operation. Additional operations may include an operation 2210.

FIG. 147 illustrates an operational flow 14700 representing example operations related to automatically remotely identifying one or more characteristics of an individual utilizing facial recognition and providing a display for the individual having a content at least partially based on the one or more identified characteristics of the individual. FIG. 147 illustrates an example embodiment where the example operational flow 12600 of FIG. 126 may include at least one additional operation. Additional operations may include an operation 2310.

FIG. 148 illustrates alternative embodiments of the example operational flow 12600 of FIG. 126. FIG. 148 illustrates example embodiments where the operations 230 and 240 may include at least one additional operation. Additional operations may include an operation 2402, an operation 2404, an operation 2406, and/or an operation 2408.

FIG. 149 illustrates alternative embodiments of the example operational flow 12600 of FIG. 126. FIG. 149 illustrates example embodiments where the operations 230 and 240 may include at least one additional operation. Additional operations may include an operation 2502, an operation 2504, an operation 2506, and/or an operation 2508.

FIG. 150 illustrates alternative embodiments of the example operational flow 14100 of FIG. 141. FIG. 150 illustrates example embodiments where the operation 1720 may include at least one additional operation. Additional operations may include an operation 2602.

FIG. 151 illustrates alternative embodiments of the example operational flow 14100 of FIG. 141. FIG. 151 illustrates example embodiments where the operation 1720 may include at least one additional operation. Additional operations may include an operation 2702.

FIG. 152 illustrates alternative embodiments of the example operational flow 12600 of FIG. 126. FIG. 152 illustrates example embodiments where the operation 210 may include at least one additional operation. Additional operations may include an operation 2802.

FIG. 153 illustrates an operational flow 15300 representing example operations related to automatically remotely identifying one or more characteristics of an individual utilizing facial recognition and providing a display for the individual having a content at least partially based on the one or more identified characteristics of the individual. FIG. 153 illustrates an example embodiment where the example operational flow 12600 of FIG. 126 may include at least one additional operation. Additional operations may include an operation 2910, and/or an operation 2920.

FIG. 154 illustrates an operational flow 15400 representing example operations related to automatically remotely identifying one or more characteristics of an individual utilizing facial recognition and providing a display for the individual having a content at least partially based on the one or more identified characteristics of the individual. FIG. 154 illustrates an example embodiment where the example operational flow 12600 of FIG. 126 may include at least one additional operation. Additional operations may include an operation 3010, and/or an operation 3012.

FIG. 155 illustrates alternative embodiments of the example operational flow 15400 of FIG. 154. FIG. 155 illustrates example embodiments where the operation 3010 may include at least one additional operation. Additional operations may include an operation 3102, and/or an operation 3104.

FIG. 156 illustrates an operational flow 15600 representing example operations related to automatically remotely identifying one or more characteristics of an individual utilizing facial recognition and providing a display for the individual having a content at least partially based on the one or more identified characteristics of the individual. FIG. 156 illustrates an example embodiment where the example operational flow 12600 of FIG. 126 may include at least one additional operation. Additional operations may include an operation 3210, and/or an operation 3220.

FIG. 157 illustrates an operational flow 15700 representing example operations related to automatically remotely identifying one or more characteristics of an individual utilizing facial recognition and providing a display for the individual having a content at least partially based on the one or more identified characteristics of the individual. In FIG. 157 and in following figures that include various examples of operational flows, discussion and explanation may be provided with respect to the above-described examples of FIGS. 1A through 1M, and/or with respect to other examples and contexts. However, it should be understood that the operational flows may be executed in a number of other environments and contexts, and/or in modified versions of FIGS. 1A through 1M. Also, although the various operational flows are presented in the sequence(s) illustrated, it should be understood that the various operations may be performed in other orders than those which are illustrated, or may be performed concurrently.

After a start operation, an operation 210, an operation 220, an operation 230, and an operation 240, the operational flow 15700 moves to an operation 15710. Operation 15710 illustrates cease providing the display to the individual at least partially based on automatically remotely identifying a second higher priority individual. For example, as shown in FIGS. 1A through 1M, The first display module 54 may cease providing the first display 56 to the first individual 52 at least partially based on automatically remotely identifying the second individual 80, where the second individual 80 has a higher priority than the first individual 52. The facial recognition module 50 may be utilized to automatically remotely identify the second individual 80. In an embodiment, the controller 132 may be coupled with the facial recognition module 50 and the first display module 54. When the facial recognition module 50 identifies the second individual 80, the controller 132 may be utilized to signal the first display module 54 to cease providing the first display 56 to the first individual 52.

FIG. 158 illustrates alternative embodiments of the example operational flow 15700 of FIG. 157. FIG. 158 illustrates example embodiments where the operations 210 and 220 may include at least one additional operation. Additional operations may include an operation 302, an operation 304, an operation 306, and/or an operation 308.

FIG. 159 illustrates alternative embodiments of the example operational flow 15700 of FIG. 157. FIG. 159 illustrates example embodiments where the operations 210 and 220 may include at least one additional operation. Additional operations may include an operation 402, an operation 404, an operation 406, and/or an operation 408.

FIG. 160 illustrates alternative embodiments of the example operational flow 15700 of FIG. 157. FIG. 160 illustrates example embodiments where the operations 210 and 220 may include at least one additional operation. Additional operations may include an operation 502, an operation 504, an operation 506, and/or an operation 508.

FIG. 161 illustrates alternative embodiments of the example operational flow 15700 of FIG. 157. FIG. 161 illustrates example embodiments where the operations 210 and 220 may include at least one additional operation. Additional operations may include an operation 602, an operation 604, an operation 606, and/or an operation 608.

FIG. 162 illustrates alternative embodiments of the example operational flow 15700 of FIG. 157. FIG. 162 illustrates example embodiments where the operations 210 and 220 may include at least one additional operation. Additional operations may include an operation 702, an operation 704, an operation 706, and/or an operation 708.

FIG. 163 illustrates alternative embodiments of the example operational flow 15700 of FIG. 157. FIG. 163 illustrates example embodiments where the operations 210 and 220 may include at least one additional operation. Additional operations may include an operation 802, an operation 804, an operation 806, and/or an operation 808.

FIG. 164 illustrates alternative embodiments of the example operational flow 15700 of FIG. 157. FIG. 164 illustrates example embodiments where the operations 230 and 240 may include at least one additional operation. Additional operations may include an operation 902, an operation 904, an operation 906, and/or an operation 908.

FIG. 165 illustrates alternative embodiments of the example operational flow 15700 of FIG. 157. FIG. 165 illustrates example embodiments where the operations 230 and 240 may include at least one additional operation. Additional operations may include an operation 1002, an operation 1004, an operation 1006, and/or an operation 1008.

FIG. 166 illustrates alternative embodiments of the example operational flow 15700 of FIG. 157. FIG. 166 illustrates example embodiments where the operations 230 and 240 may include at least one additional operation. Additional operations may include an operation 1102, an operation 1104, an operation 1106, and/or an operation 1108.

FIG. 167 illustrates alternative embodiments of the example operational flow 15700 of FIG. 157. FIG. 167 illustrates example embodiments where the operations 230 and 240 may include at least one additional operation. Additional operations may include an operation 1202, an operation 1204, an operation 1206, and/or an operation 1208.

FIG. 168 illustrates alternative embodiments of the example operational flow 15700 of FIG. 157. FIG. 168 illustrates example embodiments where the operations 230 and 240 may include at least one additional operation. Additional operations may include an operation 1302 and/or an operation 1304.

FIG. 169 illustrates an operational flow 16900 representing example operations related to automatically remotely identifying one or more characteristics of an individual utilizing facial recognition and providing a display for the individual having a content at least partially based on the one or more identified characteristics of the individual. FIG. 169 illustrates an example embodiment where the example operational flow 15700 of FIG. 157 may include at least one additional operation. Additional operations may include an operation 1410, and/or an operation 1420.

FIG. 170 illustrates an operational flow 17000 representing example operations related to automatically remotely identifying one or more characteristics of an individual utilizing facial recognition and providing a display for the individual having a content at least partially based on the one or more identified characteristics of the individual. FIG. 170 illustrates an example embodiment where the example operational flow 15700 of FIG. 157 may include at least one additional operation. Additional operations may include an operation 1510, an operation 1520, an operation 1522, and/or an operation 1524.

FIG. 171 illustrates an operational flow 17100 representing example operations related to automatically remotely identifying one or more characteristics of an individual utilizing facial recognition and providing a display for the individual having a content at least partially based on the one or more identified characteristics of the individual. FIG. 171 illustrates an example embodiment where the example operational flow 15700 of FIG. 157 may include at least one additional operation. Additional operations may include an operation 1610.

FIG. 172 illustrates an operational flow 17200 representing example operations related to automatically remotely identifying one or more characteristics of an individual utilizing facial recognition and providing a display for the individual having a content at least partially based on the one or more identified characteristics of the individual. FIG. 172 illustrates an example embodiment where the example operational flow 15700 of FIG. 157 may include at least one additional operation. Additional operations may include an operation 1710, an operation 1720, and/or an operation 1722.

FIG. 173 illustrates an operational flow 17300 representing example operations related to automatically remotely identifying one or more characteristics of an individual utilizing facial recognition and providing a display for the individual having a content at least partially based on the one or more identified characteristics of the individual. FIG. 173 illustrates an example embodiment where the example operational flow 15700 of FIG. 157 may include at least one additional operation. Additional operations may include an operation 1810, and/or an operation 1812.

FIG. 174 illustrates an operational flow 17400 representing example operations related to automatically remotely identifying one or more characteristics of an individual utilizing facial recognition and providing a display for the individual having a content at least partially based on the one or more identified characteristics of the individual. FIG. 174 illustrates an example embodiment where the example operational flow 15700 of FIG. 157 may include at least one additional operation. Additional operations may include an operation 1910, and/or an operation 1912.

FIG. 175 illustrates an operational flow 17500 representing example operations related to automatically remotely identifying one or more characteristics of an individual utilizing facial recognition and providing a display for the individual having a content at least partially based on the one or more identified characteristics of the individual. FIG. 175 illustrates an example embodiment where the example operational flow 15700 of FIG. 157 may include at least one additional operation. Additional operations may include an operation 2010, and/or an operation 2020.

FIG. 176 illustrates an operational flow 17600 representing example operations related to automatically remotely identifying one or more characteristics of an individual utilizing facial recognition and providing a display for the individual having a content at least partially based on the one or more identified characteristics of the individual. FIG. 176 illustrates an example embodiment where the example operational flow 15700 of FIG. 157 may include at least one additional operation. Additional operations may include an operation 2110.

FIG. 177 illustrates an operational flow 17700 representing example operations related to automatically remotely identifying one or more characteristics of an individual utilizing facial recognition and providing a display for the individual having a content at least partially based on the one or more identified characteristics of the individual. FIG. 177 illustrates an example embodiment where the example operational flow 15700 of FIG. 157 may include at least one additional operation. Additional operations may include an operation 2210.

FIG. 178 illustrates an operational flow 17800 representing example operations related to automatically remotely identifying one or more characteristics of an individual utilizing facial recognition and providing a display for the individual having a content at least partially based on the one or more identified characteristics of the individual. FIG. 178 illustrates an example embodiment where the example operational flow 15700 of FIG. 157 may include at least one additional operation. Additional operations may include an operation 2310.

FIG. 179 illustrates alternative embodiments of the example operational flow 15700 of FIG. 157. FIG. 179 illustrates example embodiments where the operations 230 and 240 may include at least one additional operation. Additional operations may include an operation 2402, an operation 2404, an operation 2406, and/or an operation 2408.

FIG. 180 illustrates alternative embodiments of the example operational flow 15700 of FIG. 157. FIG. 180 illustrates example embodiments where the operations 230 and 240 may include at least one additional operation. Additional operations may include an operation 2502, an operation 2504, an operation 2506, and/or an operation 2508.

FIG. 181 illustrates alternative embodiments of the example operational flow 17200 of FIG. 172. FIG. 181 illustrates example embodiments where the operation 1720 may include at least one additional operation. Additional operations may include an operation 2602.

FIG. 182 illustrates alternative embodiments of the example operational flow 17200 of FIG. 172. FIG. 182 illustrates example embodiments where the operation 1720 may include at least one additional operation. Additional operations may include an operation 2702.

FIG. 183 illustrates alternative embodiments of the example operational flow 15700 of FIG. 157. FIG. 183 illustrates example embodiments where the operation 210 may include at least one additional operation. Additional operations may include an operation 2802.

FIG. 184 illustrates an operational flow 18400 representing example operations related to automatically remotely identifying one or more characteristics of an individual utilizing facial recognition and providing a display for the individual having a content at least partially based on the one or more identified characteristics of the individual. FIG. 184 illustrates an example embodiment where the example operational flow 15700 of FIG. 157 may include at least one additional operation. Additional operations may include an operation 2910, and/or an operation 2920.

FIG. 185 illustrates an operational flow 18500 representing example operations related to automatically remotely identifying one or more characteristics of an individual utilizing facial recognition and providing a display for the individual having a content at least partially based on the one or more identified characteristics of the individual. FIG. 185 illustrates an example embodiment where the example operational flow 15700 of FIG. 157 may include at least one additional operation. Additional operations may include an operation 3012.

FIG. 186 illustrates alternative embodiments of the example operational flow 18500 of FIG. 185. FIG. 186 illustrates example embodiments where the operation 15710 may include at least one additional operation. Additional operations may include an operation 3102, and/or an operation 3104.

FIG. 187 illustrates an operational flow 18700 representing example operations related to automatically remotely identifying one or more characteristics of an individual utilizing facial recognition and providing a display for the individual having a content at least partially based on the one or more identified characteristics of the individual. FIG. 187 illustrates an example embodiment where the example operational flow 15700 of FIG. 157 may include at least one additional operation. Additional operations may include an operation 3210, and/or an operation 3220.

FIG. 188 illustrates an operational flow 18800 representing example operations related to automatically remotely identifying one or more characteristics of an individual utilizing facial recognition and providing a display for the individual having a content at least partially based on the one or more identified characteristics of the individual. In FIG. 188 and in following figures that include various examples of operational flows, discussion and explanation may be provided with respect to the above-described examples of FIGS. 1A through 1M, and/or with respect to other examples and contexts. However, it should be understood that the operational flows may be executed in a number of other environments and contexts, and/or in modified versions of FIGS. 1A through 1M. Also, although the various operational flows are presented in the sequence(s) illustrated, it should be understood that the various operations may be performed in other orders than those which are illustrated, or may be performed concurrently.

After a start operation, an operation 210, an operation 220, an operation 230, and an operation 240, the operational flow 18800 moves to an operation 18810. Operation 18810 illustrates documenting the provision of the content of the display for the individual. For example, as shown in FIGS. 1A through 1M, the memory 122 may be utilized to document the provision of the first content of the first display 56 to the first individual 52. In an embodiment, the controller 132 coupled with the first display module 54 may be utilized to document the provision of the first content of the first display 56 (e.g., the controller 132 may direct the facial recognition module 50 to store information regarding the provision of the content in the memory 122).

FIG. 189 illustrates alternative embodiments of the example operational flow 18800 of FIG. 188. FIG. 189 illustrates example embodiments where the operations 210 and 220 may include at least one additional operation. Additional operations may include an operation 302, an operation 304, an operation 306, and/or an operation 308.

FIG. 190 illustrates alternative embodiments of the example operational flow 18800 of FIG. 188. FIG. 190 illustrates example embodiments where the operations 210 and 220 may include at least one additional operation. Additional operations may include an operation 402, an operation 404, an operation 406, and/or an operation 408.

FIG. 191 illustrates alternative embodiments of the example operational flow 18800 of FIG. 188. FIG. 191 illustrates example embodiments where the operations 210 and 220 may include at least one additional operation. Additional operations may include an operation 502, an operation 504, an operation 506, and/or an operation 508.

FIG. 192 illustrates alternative embodiments of the example operational flow 18800 of FIG. 188. FIG. 192 illustrates example embodiments where the operations 210 and 220 may include at least one additional operation. Additional operations may include an operation 602, an operation 604, an operation 606, and/or an operation 608.

FIG. 193 illustrates alternative embodiments of the example operational flow 18800 of FIG. 188. FIG. 193 illustrates example embodiments where the operations 210 and 220 may include at least one additional operation. Additional operations may include an operation 702, an operation 704, an operation 706, and/or an operation 708.

FIG. 194 illustrates alternative embodiments of the example operational flow 18800 of FIG. 188. FIG. 194 illustrates example embodiments where the operations 210 and 220 may include at least one additional operation. Additional operations may include an operation 802, an operation 804, an operation 806, and/or an operation 808.

FIG. 195 illustrates alternative embodiments of the example operational flow 18800 of FIG. 188. FIG. 195 illustrates example embodiments where the operations 230 and 240 may include at least one additional operation. Additional operations may include an operation 902, an operation 904, an operation 906, and/or an operation 908.

FIG. 196 illustrates alternative embodiments of the example operational flow 18800 of FIG. 188. FIG. 196 illustrates example embodiments where the operations 230 and 240 may include at least one additional operation. Additional operations may include an operation 1002, an operation 1004, an operation 1006, and/or an operation 1008.

FIG. 197 illustrates alternative embodiments of the example operational flow 18800 of FIG. 188. FIG. 197 illustrates example embodiments where the operations 230 and 240 may include at least one additional operation. Additional operations may include an operation 1102, an operation 1104, an operation 1106, and/or an operation 1108.

FIG. 198 illustrates alternative embodiments of the example operational flow 18800 of FIG. 188. FIG. 198 illustrates example embodiments where the operations 230 and 240 may include at least one additional operation. Additional operations may include an operation 1202, an operation 1204, an operation 1206, and/or an operation 1208.

FIG. 199 illustrates alternative embodiments of the example operational flow 18800 of FIG. 188. FIG. 199 illustrates example embodiments where the operations 230 and 240 may include at least one additional operation. Additional operations may include an operation 1302 and/or an operation 1304.

FIG. 200 illustrates an operational flow 20000 representing example operations related to automatically remotely identifying one or more characteristics of an individual utilizing facial recognition and providing a display for the individual having a content at least partially based on the one or more identified characteristics of the individual. FIG. 200 illustrates an example embodiment where the example operational flow 18800 of FIG. 188 may include at least one additional operation. Additional operations may include an operation 1410, and/or an operation 1420.

FIG. 201 illustrates an operational flow 20100 representing example operations related to automatically remotely identifying one or more characteristics of an individual utilizing facial recognition and providing a display for the individual having a content at least partially based on the one or more identified characteristics of the individual. FIG. 201 illustrates an example embodiment where the example operational flow 18800 of FIG. 188 may include at least one additional operation. Additional operations may include an operation 1510, an operation 1520, an operation 1522, and/or an operation 1524.

FIG. 202 illustrates an operational flow 20200 representing example operations related to automatically remotely identifying one or more characteristics of an individual utilizing facial recognition and providing a display for the individual having a content at least partially based on the one or more identified characteristics of the individual. FIG. 202 illustrates an example embodiment where the example operational flow 18800 of FIG. 188 may include at least one additional operation. Additional operations may include an operation 1610.

FIG. 203 illustrates an operational flow 20300 representing example operations related to automatically remotely identifying one or more characteristics of an individual utilizing facial recognition and providing a display for the individual having a content at least partially based on the one or more identified characteristics of the individual. FIG. 203 illustrates an example embodiment where the example operational flow 18800 of FIG. 188 may include at least one additional operation. Additional operations may include an operation 1710, an operation 1720, and/or an operation 1722.

FIG. 204 illustrates an operational flow 20400 representing example operations related to automatically remotely identifying one or more characteristics of an individual utilizing facial recognition and providing a display for the individual having a content at least partially based on the one or more identified characteristics of the individual. FIG. 204 illustrates an example embodiment where the example operational flow 18800 of FIG. 188 may include at least one additional operation. Additional operations may include an operation 1810, and/or an operation 1812.

FIG. 205 illustrates an operational flow 20500 representing example operations related to automatically remotely identifying one or more characteristics of an individual utilizing facial recognition and providing a display for the individual having a content at least partially based on the one or more identified characteristics of the individual. FIG. 205 illustrates an example embodiment where the example operational flow 18800 of FIG. 188 may include at least one additional operation. Additional operations may include an operation 1912.

FIG. 206 illustrates an operational flow 20600 representing example operations related to automatically remotely identifying one or more characteristics of an individual utilizing facial recognition and providing a display for the individual having a content at least partially based on the one or more identified characteristics of the individual. FIG. 206 illustrates an example embodiment where the example operational flow 18800 of FIG. 188 may include at least one additional operation. Additional operations may include an operation 2010, and/or an operation 2020.

FIG. 207 illustrates an operational flow 20700 representing example operations related to automatically remotely identifying one or more characteristics of an individual utilizing facial recognition and providing a display for the individual having a content at least partially based on the one or more identified characteristics of the individual. FIG. 207 illustrates an example embodiment where the example operational flow 18800 of FIG. 188 may include at least one additional operation. Additional operations may include an operation 2110.

FIG. 208 illustrates an operational flow 20800 representing example operations related to automatically remotely identifying one or more characteristics of an individual utilizing facial recognition and providing a display for the individual having a content at least partially based on the one or more identified characteristics of the individual. FIG. 208 illustrates an example embodiment where the example operational flow 18800 of FIG. 188 may include at least one additional operation. Additional operations may include an operation 2210.

FIG. 209 illustrates an operational flow 20900 representing example operations related to automatically remotely identifying one or more characteristics of an individual utilizing facial recognition and providing a display for the individual having a content at least partially based on the one or more identified characteristics of the individual. FIG. 209 illustrates an example embodiment where the example operational flow 18800 of FIG. 188 may include at least one additional operation. Additional operations may include an operation 2310.

FIG. 210 illustrates alternative embodiments of the example operational flow 18800 of FIG. 188. FIG. 210 illustrates example embodiments where the operations 230 and 240 may include at least one additional operation. Additional operations may include an operation 2402, an operation 2404, an operation 2406, and/or an operation 2408.

FIG. 211 illustrates alternative embodiments of the example operational flow 18800 of FIG. 188. FIG. 211 illustrates example embodiments where the operations 230 and 240 may include at least one additional operation. Additional operations may include an operation 2502, an operation 2504, an operation 2506, and/or an operation 2508.

FIG. 212 illustrates alternative embodiments of the example operational flow 20300 of FIG. 203. FIG. 212 illustrates example embodiments where the operation 1720 may include at least one additional operation. Additional operations may include an operation 2602.

FIG. 213 illustrates alternative embodiments of the example operational flow 20300 of FIG. 203. FIG. 213 illustrates example embodiments where the operation 1720 may include at least one additional operation. Additional operations may include an operation 2702.

FIG. 214 illustrates alternative embodiments of the example operational flow 18800 of FIG. 188. FIG. 214 illustrates example embodiments where the operation 210 may include at least one additional operation. Additional operations may include an operation 2802.

FIG. 215 illustrates an operational flow 21500 representing example operations related to automatically remotely identifying one or more characteristics of an individual utilizing facial recognition and providing a display for the individual having a content at least partially based on the one or more identified characteristics of the individual. FIG. 215 illustrates an example embodiment where the example operational flow 18800 of FIG. 188 may include at least one additional operation. Additional operations may include an operation 2910, and/or an operation 2920.

FIG. 216 illustrates an operational flow 21600 representing example operations related to automatically remotely identifying one or more characteristics of an individual utilizing facial recognition and providing a display for the individual having a content at least partially based on the one or more identified characteristics of the individual. FIG. 216 illustrates an example embodiment where the example operational flow 18800 of FIG. 188 may include at least one additional operation. Additional operations may include an operation 3010, and/or an operation 3012.

FIG. 217 illustrates alternative embodiments of the example operational flow 21600 of FIG. 216. FIG. 217 illustrates example embodiments where the operation 3010 may include at least one additional operation. Additional operations may include an operation 3102, and/or an operation 3104.

FIG. 218 illustrates an operational flow 21800 representing example operations related to automatically remotely identifying one or more characteristics of an individual utilizing facial recognition and providing a display for the individual having a content at least partially based on the one or more identified characteristics of the individual. FIG. 218 illustrates an example embodiment where the example operational flow 18800 of FIG. 188 may include at least one additional operation. Additional operations may include an operation 3210, and/or an operation 3220.

FIG. 219 illustrates an operational flow 21900 representing example operations related to automatically remotely identifying one or more characteristics of an individual utilizing facial recognition and providing a display for the individual having a content at least partially based on the one or more identified characteristics of the individual. In FIG. 219 and in following figures that include various examples of operational flows, discussion and explanation may be provided with respect to the above-described examples of FIGS. 1A through 1M, and/or with respect to other examples and contexts. However, it should be understood that the operational flows may be executed in a number of other environments and contexts, and/or in modified versions of FIGS. 1A through 1M. Also, although the various operational flows are presented in the sequence(s) illustrated, it should be understood that the various operations may be performed in other orders than those which are illustrated, or may be performed concurrently.

After a start operation, an operation 210, an operation 220, an operation 230, and an operation 240, the operational flow 21900 moves to an operation 21910. Operation 21910 illustrates where the at least one characteristic of the individual comprises at least one of a payment or a charge associated with the individual. For example, as shown in FIGS. 1A through 1M, one or more characteristics identified by the facial recognition module 50 may include a payment or a charge associated with the first individual 52 or the second individual 80. In an embodiment, information regarding a payment or a charge may be stored in the memory 122.

FIG. 220 illustrates alternative embodiments of the example operational flow 21900 of FIG. 219. FIG. 220 illustrates example embodiments where the operations 210 and 220 may include at least one additional operation. Additional operations may include an operation 302, an operation 304, an operation 306, and/or an operation 308.

FIG. 221 illustrates alternative embodiments of the example operational flow 21900 of FIG. 219. FIG. 221 illustrates example embodiments where the operations 210 and 220 may include at least one additional operation. Additional operations may include an operation 402, an operation 404, an operation 406, and/or an operation 408.

FIG. 222 illustrates alternative embodiments of the example operational flow 21900 of FIG. 219. FIG. 222 illustrates example embodiments where the operations 210 and 220 may include at least one additional operation. Additional operations may include an operation 502, an operation 504, an operation 506, and/or an operation 508.

FIG. 223 illustrates alternative embodiments of the example operational flow 21900 of FIG. 219. FIG. 223 illustrates example embodiments where the operations 210 and 220 may include at least one additional operation. Additional operations may include an operation 602, an operation 604, an operation 606, and/or an operation 608.

FIG. 224 illustrates alternative embodiments of the example operational flow 21900 of FIG. 219. FIG. 224 illustrates example embodiments where the operations 210 and 220 may include at least one additional operation. Additional operations may include an operation 702, an operation 704, an operation 706, and/or an operation 708.

FIG. 225 illustrates alternative embodiments of the example operational flow 21900 of FIG. 219. FIG. 225 illustrates example embodiments where the operations 210 and 220 may include at least one additional operation. Additional operations may include an operation 802, an operation 804, an operation 806, and/or an operation 808.

FIG. 226 illustrates alternative embodiments of the example operational flow 21900 of FIG. 219. FIG. 226 illustrates example embodiments where the operations 230 and 240 may include at least one additional operation. Additional operations may include an operation 902, an operation 904, an operation 906, and/or an operation 908.

FIG. 227 illustrates alternative embodiments of the example operational flow 21900 of FIG. 219. FIG. 227 illustrates example embodiments where the operations 230 and 240 may include at least one additional operation. Additional operations may include an operation 1002, an operation 1004, an operation 1006, and/or an operation 1008.

FIG. 228 illustrates alternative embodiments of the example operational flow 21900 of FIG. 219. FIG. 228 illustrates example embodiments where the operations 230 and 240 may include at least one additional operation. Additional operations may include an operation 1102, an operation 1104, an operation 1106, and/or an operation 1108.

FIG. 229 illustrates alternative embodiments of the example operational flow 21900 of FIG. 219. FIG. 229 illustrates example embodiments where the operations 230 and 240 may include at least one additional operation. Additional operations may include an operation 1202, an operation 1204, an operation 1206, and/or an operation 1208.

FIG. 230 illustrates alternative embodiments of the example operational flow 21900 of FIG. 219. FIG. 230 illustrates example embodiments where the operations 230 and 240 may include at least one additional operation. Additional operations may include an operation 1302 and/or an operation 1304.

FIG. 231 illustrates an operational flow 23100 representing example operations related to automatically remotely identifying one or more characteristics of an individual utilizing facial recognition and providing a display for the individual having a content at least partially based on the one or more identified characteristics of the individual. FIG. 231 illustrates an example embodiment where the example operational flow 21900 of FIG. 219 may include at least one additional operation. Additional operations may include an operation 1410, and/or an operation 1420.

FIG. 232 illustrates an operational flow 23200 representing example operations related to automatically remotely identifying one or more characteristics of an individual utilizing facial recognition and providing a display for the individual having a content at least partially based on the one or more identified characteristics of the individual. FIG. 232 illustrates an example embodiment where the example operational flow 21900 of FIG. 219 may include at least one additional operation. Additional operations may include an operation 1510, an operation 1520, an operation 1522, and/or an operation 1524.

FIG. 233 illustrates an operational flow 23300 representing example operations related to automatically remotely identifying one or more characteristics of an individual utilizing facial recognition and providing a display for the individual having a content at least partially based on the one or more identified characteristics of the individual. FIG. 233 illustrates an example embodiment where the example operational flow 21900 of FIG. 219 may include at least one additional operation. Additional operations may include an operation 1610.

FIG. 234 illustrates an operational flow 23400 representing example operations related to automatically remotely identifying one or more characteristics of an individual utilizing facial recognition and providing a display for the individual having a content at least partially based on the one or more identified characteristics of the individual. FIG. 234 illustrates an example embodiment where the example operational flow 21900 of FIG. 219 may include at least one additional operation. Additional operations may include an operation 1710, an operation 1720, and/or an operation 1722.

FIG. 235 illustrates an operational flow 23500 representing example operations related to automatically remotely identifying one or more characteristics of an individual utilizing facial recognition and providing a display for the individual having a content at least partially based on the one or more identified characteristics of the individual. FIG. 235 illustrates an example embodiment where the example operational flow 21900 of FIG. 219 may include at least one additional operation. Additional operations may include an operation 1810, and/or an operation 1812.

FIG. 236 illustrates an operational flow 23600 representing example operations related to automatically remotely identifying one or more characteristics of an individual utilizing facial recognition and providing a display for the individual having a content at least partially based on the one or more identified characteristics of the individual. FIG. 236 illustrates an example embodiment where the example operational flow 21900 of FIG. 219 may include at least one additional operation. Additional operations may include an operation 1910, and/or an operation 1912.

FIG. 237 illustrates an operational flow 23700 representing example operations related to automatically remotely identifying one or more characteristics of an individual utilizing facial recognition and providing a display for the individual having a content at least partially based on the one or more identified characteristics of the individual. FIG. 237 illustrates an example embodiment where the example operational flow 21900 of FIG. 219 may include at least one additional operation. Additional operations may include an operation 2010, and/or an operation 2020.

FIG. 238 illustrates an operational flow 23800 representing example operations related to automatically remotely identifying one or more characteristics of an individual utilizing facial recognition and providing a display for the individual having a content at least partially based on the one or more identified characteristics of the individual. FIG. 238 illustrates an example embodiment where the example operational flow 21900 of FIG. 219 may include at least one additional operation. Additional operations may include an operation 2110.

FIG. 239 illustrates an operational flow 23900 representing example operations related to automatically remotely identifying one or more characteristics of an individual utilizing facial recognition and providing a display for the individual having a content at least partially based on the one or more identified characteristics of the individual. FIG. 239 illustrates an example embodiment where the example operational flow 21900 of FIG. 219 may include at least one additional operation. Additional operations may include an operation 2210.

FIG. 240 illustrates an operational flow 24000 representing example operations related to automatically remotely identifying one or more characteristics of an individual utilizing facial recognition and providing a display for the individual having a content at least partially based on the one or more identified characteristics of the individual. FIG. 240 illustrates an example embodiment where the example operational flow 21900 of FIG. 219 may include at least one additional operation. Additional operations may include an operation 2310.

FIG. 241 illustrates alternative embodiments of the example operational flow 21900 of FIG. 219. FIG. 241 illustrates example embodiments where the operations 230 and 240 may include at least one additional operation. Additional operations may include an operation 2402, an operation 2404, an operation 2406, and/or an operation 2408.

FIG. 242 illustrates alternative embodiments of the example operational flow 21900 of FIG. 219. FIG. 242 illustrates example embodiments where the operations 230 and 240 may include at least one additional operation. Additional operations may include an operation 2502, an operation 2504, an operation 2506, and/or an operation 2508.

FIG. 243 illustrates alternative embodiments of the example operational flow 23400 of FIG. 234. FIG. 243 illustrates example embodiments where the operation 1720 may include at least one additional operation. Additional operations may include an operation 2602.

FIG. 244 illustrates alternative embodiments of the example operational flow 23400 of FIG. 234. FIG. 244 illustrates example embodiments where the operation 1720 may include at least one additional operation. Additional operations may include an operation 2702.

FIG. 245 illustrates alternative embodiments of the example operational flow 21900 of FIG. 219. FIG. 245 illustrates example embodiments where the operation 210 may include at least one additional operation. Additional operations may include an operation 2802.

FIG. 246 illustrates an operational flow 24600 representing example operations related to automatically remotely identifying one or more characteristics of an individual utilizing facial recognition and providing a display for the individual having a content at least partially based on the one or more identified characteristics of the individual. FIG. 246 illustrates an example embodiment where the example operational flow 21900 of FIG. 219 may include at least one additional operation. Additional operations may include an operation 2910, and/or an operation 2920.

FIG. 247 illustrates an operational flow 24700 representing example operations related to automatically remotely identifying one or more characteristics of an individual utilizing facial recognition and providing a display for the individual having a content at least partially based on the one or more identified characteristics of the individual. FIG. 247 illustrates an example embodiment where the example operational flow 21900 of FIG. 219 may include at least one additional operation. Additional operations may include an operation 3010, and/or an operation 3012.

FIG. 248 illustrates alternative embodiments of the example operational flow 24700 of FIG. 247. FIG. 248 illustrates example embodiments where the operation 3010 may include at least one additional operation. Additional operations may include an operation 3102, and/or an operation 3104.

FIG. 249 illustrates an operational flow 24900 representing example operations related to automatically remotely identifying one or more characteristics of an individual utilizing facial recognition and providing a display for the individual having a content at least partially based on the one or more identified characteristics of the individual. FIG. 249 illustrates an example embodiment where the example operational flow 21900 of FIG. 219 may include at least one additional operation. Additional operations may include an operation 3210, and/or an operation 3220.

FIG. 250 illustrates alternative embodiments of the example operational flow 3300 of FIG. 33. FIG. 250 illustrates example embodiments where the operation 3310 may include at least one additional operation. Additional operations may include an operation 25010. Operation 25010 illustrates selecting the individual at least partially based on one or more of a location in an environment, a location with respect to an environmental feature, a line of sight, a field of vision, or a direction of movement of the individual. For example, as shown in FIGS. 1A through 1M, the first individual 52 or the second individual 80 may be selected at least partially based on a location of the first individual 52 or the second individual 80 in an environment, such as the second region 60 where the first display 56 is not visible to the first individual 52. In an embodiment, the controller 132 coupled with the facial recognition module 50 may be utilized to select the first individual 52 at least partially based on a direction of movement of the first individual 52 (e.g., movement in a direction away from the first display 56 or movement into the second region 60).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
    automatically remotely identifying at least one characteristic of an individual via facial recognition, wherein the identified at least one characteristic of the individual comprises a demographic of the individual;
    providing a display for the individual, the display having a content at least partially based on the identified at least one characteristic of the individual;
    cease providing the display to the individual at least partially based on determining that the individual is moving out of range of the display; and
    providing a second display for the individual, the second display having a second content at least partially based on the identified at least one characteristic of the individual and at least partially based on determining that the individual is moving out of range of the display.

2. The method of claim 1, wherein automatically remotely identifying at least one characteristic of an individual via facial recognition comprises:
    identifying the at least one characteristic of the individual utilizing individual tracking.

3. The method of claim 1, further comprising:
    selecting the individual at least partially based on an orientation of the individual.

4. The method of claim 1, wherein providing a display for the individual, the display having a content at least partially based on the identified at least one characteristic of the individual comprises:
    providing a display having an informational content targeted to the individual.

5. The method of claim 1, wherein providing a display for the individual, the display having a content at least partially based on the identified at least one characteristic of the individual comprises:
    providing an advertising content targeted to the individual via the display.

6. The method of claim 1, wherein providing a display for the individual, the display having a content at least partially based on the identified at least one characteristic of the individual further comprises:
    providing a focused audio message audible to the individual, the focused audio message having a content at least partially based on the identified at least one characteristic of the individual.

7. The method of claim 1, further comprising:
    automatically remotely identifying at least one characteristic of a second individual; and
    cease providing the display to the individual at least partially based on the identified at least one characteristic of the second individual.

8. The method of claim 1, further comprising:
    documenting the provision of the content of the display for the individual.

9. The method of claim 1, wherein the at least one characteristic of the individual comprises at least one of a payment or a charge associated with the individual.

10. The method of claim 1, further comprising:
    automatically remotely identifying at least one characteristic of a second individual via facial recognition; and
    providing a second display for the second individual, the second display having a second content at least partially based on the identified at least one characteristic of the second individual.

11. A system, comprising:
    means for automatically remotely identifying at least one characteristic of an individual via facial recognition, wherein the identified at least one characteristic of the individual comprises a demographic of the individual;
    means for providing a display for the individual, the display having a content at least partially based on the identified at least one characteristic of the individual;
    means to cease providing the display to the individual at least partially based on determining that the individual is moving out of range of the display; and
    means for providing a second display for the individual, the second display having a second content at least partially based on the identified at least one characteristic of the individual and at least partially based on determining that the individual is moving out of range of the display.

12. The system of claim 11, wherein means for automatically remotely identifying at least one characteristic of an individual via facial recognition comprises:
    means for identifying the at least one characteristic of the individual utilizing a database.

13. The system of claim 11, wherein means for automatically remotely identifying at least one characteristic of an individual via facial recognition comprises:
    means for identifying the at least one characteristic of the individual utilizing individual tracking.

14. The system of claim 11, further comprising:
    means for selecting the content for the individual at least partially based on an attire of the individual.

15. The system of claim 11, further comprising:
    means to cease providing the display to the individual at least partially based on an attire of the individual.

16. The system of claim 11, further comprising:
    means for selecting the individual at least partially based on an orientation of the individual.

17. The system of claim 11, wherein means for providing a display for the individual, the display having a content at least partially based on the identified at least one characteristic of the individual comprises:
    means for providing a display having an entertainment content targeted to the individual.

18. The system of claim 11, wherein means for providing a display for the individual, the display having a content at least partially based on the identified at least one characteristic of the individual comprises:
    means for providing an advertising content targeted to the individual via the display.

19. The system of claim 11, wherein means for providing a display for the individual, the display having a content at least partially based on the identified at least one characteristic of the individual comprises:
    means for providing a display having an interactive content for the individual.

20. The system of claim 11, wherein means for providing a display for the individual, the display having a content at least partially based on the identified at least one characteristic of the individual comprises:

means for providing a display having directions to a location for the individual.

21. The system of claim 11, wherein means for providing a display for the individual, the display having a content at least partially based on the identified at least one characteristic of the individual further comprises:
means for providing a focused audio message audible to the individual, the focused audio message having a content at least partially based on the identified at least one characteristic of the individual.

22. The system of claim 11, wherein means for providing a display for the individual, the display having a content at least partially based on the identified at least one characteristic of the individual comprises:
means for directly projecting a visual content from the display into an eye of the individual.

23. The system of claim 11, further comprising:
means for automatically remotely identifying a second individual; and
means for selecting the content for the individual at least partially based on the identified second individual.

24. The system of claim 11, further comprising:
means for identifying at least one of a relative, a friend, or an associate of the individual; and
means for selecting the content for the individual at least partially based on the identity of the at least one of the relative, the friend, or the associate of the at least one of the individual.

25. The system of claim 11, further comprising:
means for automatically remotely identifying at least one characteristic of a second individual; and
means to cease providing the display to the individual at least partially based on the identified at least one characteristic of the second individual.

26. The system of claim 11, further comprising:
means to cease providing the display to the individual at least partially based on automatically remotely identifying a second higher priority individual.

27. The system of claim 11, further comprising:
means for documenting the provision of the display for the individual.

28. The system of claim 11, further comprising:
means for documenting the provision of the content of the display for the individual.

29. The system of claim 11, wherein the display comprises at least one of a fixed direction display or a redirectable display.

30. The system of claim 11, wherein the first display and a second display comprise at least one shared component.

31. The system of claim 11, wherein the at least one characteristic of the individual comprises at least one of a payment or a charge associated with the individual.

32. The system of claim 11, further comprising:
means for automatically remotely identifying at least one characteristic of a second individual via facial recognition; and
means for providing a second display for the second individual, the second display having a second content at least partially based on the identified at least one characteristic of the second individual.

33. The system of claim 32, wherein means for providing a display for the individual, the display having a content at least partially based on the identified at least one characteristic of the individual or the means for providing a second display for the second individual, the second display having a second content at least partially based on the identified at least one characteristic of the second individual comprises:
means for providing at least one of a first display having an entertainment content targeted to the first individual or a second display having an entertainment content targeted to the second individual.

34. The system of claim 32, wherein means for providing a display for the individual, the display having a content at least partially based on the identified at least one characteristic of the individual or the means for providing a second display for the second individual, the second display having a second content at least partially based on the identified at least one characteristic of the second individual comprises:
means for providing at least one of a first display having an advertising content targeted to the first individual or a second display having an advertising content targeted to the second individual.

35. The system of claim 32, wherein means for providing a display for the individual, the display having a content at least partially based on the identified at least one characteristic of the individual or the means for providing a second display for the second individual, the second display having a second content at least partially based on the identified at least one characteristic of the second individual comprises:
means for providing at least one of a first display having directions to a location for the first individual or a second display having directions to a location for the second individual.

36. The system of claim 32, wherein means for providing a display for the individual, the display having a content at least partially based on the identified at least one characteristic of the individual or the means for providing a second display for the second individual, the second display having a second content at least partially based on the identified at least one characteristic of the second individual further comprises:
means for providing a focused audio message audible to at least one of the first individual or the second individual, the focused audio message having a content at least partially based on at least one of the identified at least one characteristic of the first individual or the identified at least one characteristic of the second individual.

37. The system of claim 32, further comprising:
means to cease providing the first display to the first individual at least partially based on the identified at least one characteristic of the second individual.

38. The method of claim 1, wherein the second content at least partially based on the at least one identified characteristic of the individual and at least partially based on determining that the individual is moving out of range of the display is different from the first content at least partially based one the at least one identified characteristic of the individual.

39. A method, comprising:
automatically remotely identifying at least one characteristic of an individual via facial recognition, wherein the identified at least one characteristic of the individual comprises a demographic of the individual;
providing a first display for the individual, the display having a content at least partially based on the identified at least one characteristic of the individual;
cease providing the first display to the individual based on an action of the individual; and
providing a second display for the individual, the second display having a second content at least partially based on the action of the individual.

40. The method of claim 39, wherein the second content at least partially based on the action of the individual is different from the first content at least partially based one the at least one identified characteristic of the individual.

* * * * *

UNITED STATES PATENT AND TRADEMARK OFFICE
CERTIFICATE OF CORRECTION

| | | |
|---|---|---|
| PATENT NO. | : 8,712,110 B2 | Page 1 of 1 |
| APPLICATION NO. | : 12/655179 | |
| DATED | : April 29, 2014 | |
| INVENTOR(S) | : Philip A. Eckhoff et al. | |

It is certified that error appears in the above-identified patent and that said Letters Patent is hereby corrected as shown below:

In the Claims:

Column 76, Line 50, Claim 38 should read, --difference from the first content at least partially based on the--

Column 77, Line 1, Claim 40 should read, --from the first content at least partially based on the at least--

Signed and Sealed this
Twenty-second Day of July, 2014

Michelle K. Lee
*Deputy Director of the United States Patent and Trademark Office*